US012528214B2

(12) United States Patent
Robertson et al.

(10) Patent No.: US 12,528,214 B2
(45) **Date of Patent: *Jan. 20, 2026**

(54) SHAVING DEVICE

(71) Applicant: INSIGNIA IP DEVELOPMENT COMPANY, LLC, Sandwich, MA (US)

(72) Inventors: Ruairidh Robertson, Sandwich, MA (US); David Carpenter, Jaffrey, NH (US); Alan Kenneth Stratton, Milford, NH (US); George K. Bonnoitt, Amherst, NH (US)

(73) Assignee: INSIGNIA IP DEVELOPMENT COMPANY, LLC, Magnolia, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/105,537

(22) Filed: Feb. 3, 2023

(65) Prior Publication Data

US 2024/0025065 A1 Jan. 25, 2024

Related U.S. Application Data

(63) Continuation of application No. 15/708,635, filed on Sep. 19, 2017, now abandoned, which is a
(Continued)

(51) Int. Cl.
*B26B 21/52* (2006.01)
*B26B 21/10* (2006.01)
(Continued)

(52) U.S. Cl.
CPC ............ *B26B 21/521* (2013.01); *B26B 21/10* (2013.01); *B26B 21/22* (2013.01); *B26B 21/225* (2013.01);
(Continued)

(58) Field of Classification Search
CPC ....... B26B 21/521; B26B 21/10; B26B 21/22; B26B 21/225; B26B 21/24;
(Continued)

(56) References Cited

U.S. PATENT DOCUMENTS 3,740,841 A * 6/1973 Risher ..................... B26B 21/16 30/57
5,167,069 A 12/1992 Quinn
(Continued)

FOREIGN PATENT DOCUMENTS

CN 2074705 U 4/1991
CN 103648735 A 3/2014
(Continued)

OTHER PUBLICATIONS

Office Action dated Apr. 9, 2015, issued in U.S. Appl. No. 14/627,282, 15 pages.
(Continued)

*Primary Examiner* — Liang Dong
(74) *Attorney, Agent, or Firm* — Grossman, Tucker, Perreault & Pfleger, PLLC

(57) ABSTRACT

A shaving device comprising a head assembly including a support member having at least one support member magnet and a blade cartridge having at least one face with at least one razor blade and configured to be rotatably coupled to the support member about a pivot axis. The blade cartridge includes at least one blade cartridge magnet having a pole aligned with a pole of the support member magnet to generate a magnetic force that urges the blade cartridge about the pivot axis towards an initial starting position (ISP), wherein the blade cartridge is further configured to rotate about the pivot axis away from the ISP upon application of
(Continued)

an external force sufficient to overcome the magnetic force between the support member magnet and the blade cartridge magnet.

20 Claims, 170 Drawing Sheets

Related U.S. Application Data continuation of application No. 15/241,042, filed on Aug. 18, 2016, now Pat. No. 9,764,487, which is a continuation-in-part of application No. 15/135,485, filed on Apr. 21, 2016, now Pat. No. 9,687,989, which is a continuation-in-part of application No. 14/977, 560, filed on Dec. 21, 2015, now Pat. No. 9,550,303, which is a continuation-in-part of application No. 14/873,857, filed on Oct. 2, 2015, now Pat. No. 9,808,945, which is a continuation of application No. 14/627,282, filed on Feb. 20, 2015, now Pat. No. 9,259,846.

(60) Provisional application No. 62/060,700, filed on Oct. 7, 2014, provisional application No. 62/201,551, filed on Aug. 5, 2015.

(51) Int. Cl.
*B26B 21/22* (2006.01)
*B26B 21/24* (2006.01)
*B26B 21/40* (2006.01)
*B26B 21/44* (2006.01)

(52) U.S. Cl.
CPC .......... *B26B 21/24* (2013.01); *B26B 21/4012* (2013.01); *B26B 21/4062* (2013.01); *B26B 21/443* (2013.01); *B26B 21/52* (2013.01); *B26B 21/523* (2013.01); *B26B 21/4018* (2013.01)

(58) Field of Classification Search
CPC ............ B26B 21/4012; B26B 21/4062; B26B 21/443; B26B 21/52; B26B 21/523; B26B 21/4018
See application file for complete search history.

(56) References Cited

U.S. PATENT DOCUMENTS 5,343,622 A 9/1994 Andrews
5,522,137 A 6/1996 Andrews
5,575,068 A 11/1996 Pedersen
D388,540 S 12/1997 Ramar
5,911,480 A 6/1999 Morgan
6,082,007 A 7/2000 Andrews
6,115,924 A 9/2000 Oldroyd
6,125,542 A 10/2000 Somma
6,161,288 A 12/2000 Andrews
6,189,222 B1 2/2001 Doyle
6,266,888 B1 7/2001 Zowaski
6,434,828 B1 8/2002 Andrews
6,725,550 B1 4/2004 Shah
6,915,580 B2 7/2005 Dassel
7,086,160 B2 8/2006 Coffin et al.
7,140,116 B2 11/2006 Coffin
7,578,062 B2 8/2009 Blackburn
7,895,754 B2 3/2011 Blackburn
7,913,393 B2 3/2011 Royle et al.
7,937,837 B2 5/2011 Psimadas et al.
8,122,606 B2 2/2012 Hart
D656,677 S 3/2012 Cavazos Jimenez et al.
D659,285 S 5/2012 Lukan et al.
8,205,343 B2 6/2012 Winter et al.
D664,712 S 7/2012 Christie et al.
8,474,144 B2 7/2013 Royle
8,567,068 B2 10/2013 Luxton
8,595,938 B2 12/2013 Bodet
D700,995 S 3/2014 Lee et al.
8,745,876 B2 6/2014 Hage et al.
8,745,883 B2 6/2014 Murgida et al.
9,032,631 B2 5/2015 Christie et al.
D749,264 S 2/2016 Leatherman et al.
D749,267 S 2/2016 Letherman
9,259,846 B1 2/2016 Robertson
9,522,472 B2 12/2016 Leicht et al.
9,550,303 B2 1/2017 Robertson et al.
9,687,989 B2 6/2017 Robertson et al.
9,764,487 B2 9/2017 Robertson et al.
9,808,945 B2 11/2017 Robertson
D806,950 S 1/2018 Robertson
2005/0005400 A1 * 1/2005 Park .................... H04M 1/0212 16/367
2005/0034314 A1 2/2005 Cuisinier
2005/0138814 A1 6/2005 Pennella et al.
2005/0198840 A1 9/2005 Worrick, III et al.
2005/0198841 A1 9/2005 Worrick, III
2007/0089960 A1 4/2007 Kanehisa
2008/0155831 A1 7/2008 Royle
2009/0013534 A1 1/2009 Mallaridas
2010/0083505 A1 4/2010 Royle et al.
2010/0101093 A1 4/2010 Avans et al.
2011/0146079 A1 6/2011 Clarke et al.
2011/0277326 A1 11/2011 Bodet
2011/0283539 A1 11/2011 Bryan
2012/0137526 A1 * 6/2012 Forman ................... B26B 13/12 30/146
2012/0198698 A1 8/2012 Szczepanowski et al.
2012/0255185 A1 10/2012 Patel et al.
2012/0311865 A1 12/2012 Hamilton et al.
2013/0152400 A1 6/2013 Nunez
2013/0312265 A1 11/2013 Wilson et al.
2013/0312272 A1 11/2013 Wilson et al.
2014/0026726 A1 1/2014 Griffin et al.
2014/0083265 A1 3/2014 Provost et al.
2014/0096402 A1 4/2014 Nakasuka et al.
2014/0116211 A1 5/2014 Griffin et al.
2014/0165800 A1 6/2014 Griffin et al.
2014/0237830 A1 8/2014 Wilson et al.
2015/0090085 A1 4/2015 Griffin et al.
2015/0157109 A1 6/2015 Provost et al.
2015/0158192 A1 6/2015 Tucker et al.
2015/0174775 A1 6/2015 Hodgson
2015/0174776 A1 6/2015 Hawes
2015/0190935 A1 7/2015 Griffin et al.
2015/0190936 A1 7/2015 Griffin et al.
2015/0321366 A1 11/2015 Papadopoulos-Papageorgis et al.
2016/0096280 A1 4/2016 Robertson
2016/0107324 A1 4/2016 Robertson
2017/0021513 A1 1/2017 Liberatore
2017/0043492 A1 2/2017 Robertson et al.
2017/0282387 A1 10/2017 Robertson et al.
2017/0291320 A1 10/2017 Robertson et al.
2017/0361481 A1 12/2017 Robertson et al.
2018/0001496 A1 1/2018 Robertson et al.
2022/0055240 A1 2/2022 Wilson et al.

FOREIGN PATENT DOCUMENTS

CN 104582913 A 4/2015
DE 102009050344 A1 5/2011
EP 2379289 10/2011
RU 2441746 C2 2/2012
WO 9727030 7/1997
WO WO-9727030 A1 * 7/1997 ............ B26B 21/14
WO 03095162 11/2003
WO 2008085002 7/2008
WO WO-2008085002 A1 * 7/2008 ............ B26B 21/14
WO 2013148480 10/2013
WO 2013165954 11/2013
WO 2015134700 9/2015

(56) References Cited

FOREIGN PATENT DOCUMENTS

| | | |
|---|---|---|
| WO | 2016057066 | 4/2016 |
| WO | 2017024156 | 2/2017 |

OTHER PUBLICATIONS

International Search Report and Written Opinion dated May 15, 2015, issued in PCT Patent Application No. PCT/US15/16767, 14 pages.
Notice of Allowance dated Aug. 14, 2015, issued in U.S. Appl. No. 14/627,282, 11 pages.
Office Action dated Mar. 24, 2016, issued in U.S. Appl. No. 14/873,857, 12 pages.
Office Action dated Jun. 15, 2016, issued in U.S. Appl. No. 14/977,560, 13 pages.
Final Office Action dated Jul. 27, 2016, issued in U.S. Appl. No. 14/873,857, 13 pages.
Notice of Allowance dated Sep. 1, 2016, issued in U.S. Appl. No. 14/977,560, 10 pages.
International Search Report and Written Opinion dated Oct. 14, 2016, issued in PCT International Patent Application No. PCT/US2016/045591, 10 pages.
Office Action dated Sep. 21, 2016, issued in U.S. Appl. No. 15/135,485, 19 pages.
U.S. Office Action dated Dec. 15, 2016, issued in U.S. Appl. No. 14/873,857, 21 pages.
U.S. Notice of Allowance dated Feb. 9, 2017, issued in U.S. Appl. No. 15/135,485, 12 pages.
U.S. Office Action dated Feb. 22, 2017, issued in U.S. Appl. No. 15/241,042, 13 pages.
U.S. Notice of Allowance dated Apr. 10, 2017, issued in U.S. Appl. No. 15/241,042, 13 pages.
Preliminary Report on Patentability dated Apr. 20, 2017, issued in PCT Patent Application No. PCT/US2015/016767, 12 pages.
Preliminary Report on Patentability dated Apr. 20, 2017, issued in PCT Patent Application No. PCT/US2015/054155, 6 pages.
U.S. Final Office Action dated May 4, 2017, issued in U.S. Appl. No. 14/873,857, 17 pages.
Notice of Allowance mailed Jul. 28, 2017, issued in U.S. Appl. No. 14/873,857, 15 pages.
U.S. Office Action mailed May 21, 2018, issued in U.S. Appl. No. 15/716,504, 13 pages.
U.S. Office Action mailed May 22, 2018, issued in U.S. Appl. No. 15/708,635, 12 pages.
U.S. Notice of Allowance mailed Aug. 7, 2018, issued in U.S. Appl. No. 15/716,504, 11 pages.
U.S. Office Action mailed Jan. 10, 2018, issued in U.S. Appl. No. 15/628,082, 19 pages,.
International Search Report and Written Opinion mailed Oct. 25, 2017, issued in PCT Patent Application No. PCT/US2017/047496, 8 pages.
Notice of Allowance mailed Jan. 12, 2021, issued in U.S. Appl. No. 15/433,988.
U.S. Office Action mailed Nov. 24, 2021, received in U.S. Appl. No. 15/708,635.
U.S. Office Action mailed Dec. 7, 2021, received in U.S. Appl. No. 16/871,544.
U.S. Office Action mailed May 12, 2021, received in U.S. Appl. No. 15/708,635.
Indian Office Action with English translation issued May 31, 2021, received in Indian Patent Application No. 201927010292.
Brazilian Office Action with English translation issued Jun. 15, 2021, received in Brazil Patent Application No. BR12-2020-015146-3.
Brazilian Office Action with English translation issued Jul. 21, 2021, received in Brazil Patent Application No. BR11-2019-003255-0.
Chinese Office Action with English translation issued Jul. 21, 2021, received in Chinese Patent Application No. CN201780060517.1.
Japan Office Action from related application 2021-131391 mailed Aug. 30, 2022, with English translation.
Canada Office Action from related application 2,994,679 mailed Nov. 3, 2022.
Brazil Office Action from related application BR112019003255-0 mailed Aug. 9, 2022 with English translation.
First Examination Report from related Indian Appln. No. 202128020189, dated May 31, 2022, with English translation.
First Office Action from related Chinese Appln. No. 202110190114.7, dated Jun. 2, 2022. English translation attached.
European Office Action from related application 20156592.6 dated Jun. 2, 2022.

* cited by examiner

10

10

SHAVING DEVICE

CROSS REFERENCE TO RELATED APPLICATION

This application is a continuation of U.S. patent application Ser. No. 15/708,635, filed Sep. 19, 2017, which is a continuation of U.S. patent application Ser. No. 15/241,042 (now U.S. Pat. No. 9,764,487) filed Aug. 18, 2016, which is a continuation in part of U.S. patent application Ser. No. 15/135,485 (now U.S. Pat. No. 9,687,989) filed Apr. 21, 2016, which itself is a continuation in part of U.S. patent application Ser. No. 14/977,560 (now U.S. Pat. No. 9,550,303) filed Dec. 21, 2015, which itself is a continuation in part of U.S. patent application Ser. No. 14/873,857 (now U.S. Pat. No. 9,808,945) filed Oct. 2, 2015, which itself is a continuation of U.S. patent application Ser. No. 14/627,282 (now U.S. Pat. No. 9,259,846) filed Feb. 20, 2015 which claims the benefit of U.S. Provisional Application Ser. No. 62/060,700, filed Oct. 7, 2014, the entire disclosures of which are fully incorporated herein by reference. This application also claims the benefit of U.S. Provisional Application Ser. No. 62/201,551, filed Aug. 5, 2015, the entire disclosure of which is fully incorporated herein by reference.

FIELD

The present disclosure relates generally to personal grooming device and, more particularly, to a personal shaving device for shaving hair.

BACKGROUND

Shaving razors are available in a variety of forms. For example, shaving razors may include a disposable razor cartridge configured to be selectively coupled a handle. The razor cartridge may include one or more razor blades disposed on a cutting surface of the disposable razor cartridge. Once the razor blades are dull, the user may disconnect the razor cartridge from the handle and reconnect a new razor cartridge.

FIGURES

The above-mentioned and other features of this disclosure, and the manner of attaining them, will become more apparent and better understood by reference to the following description of embodiments described herein taken in conjunction with the accompanying drawings, wherein.

Figure 18:
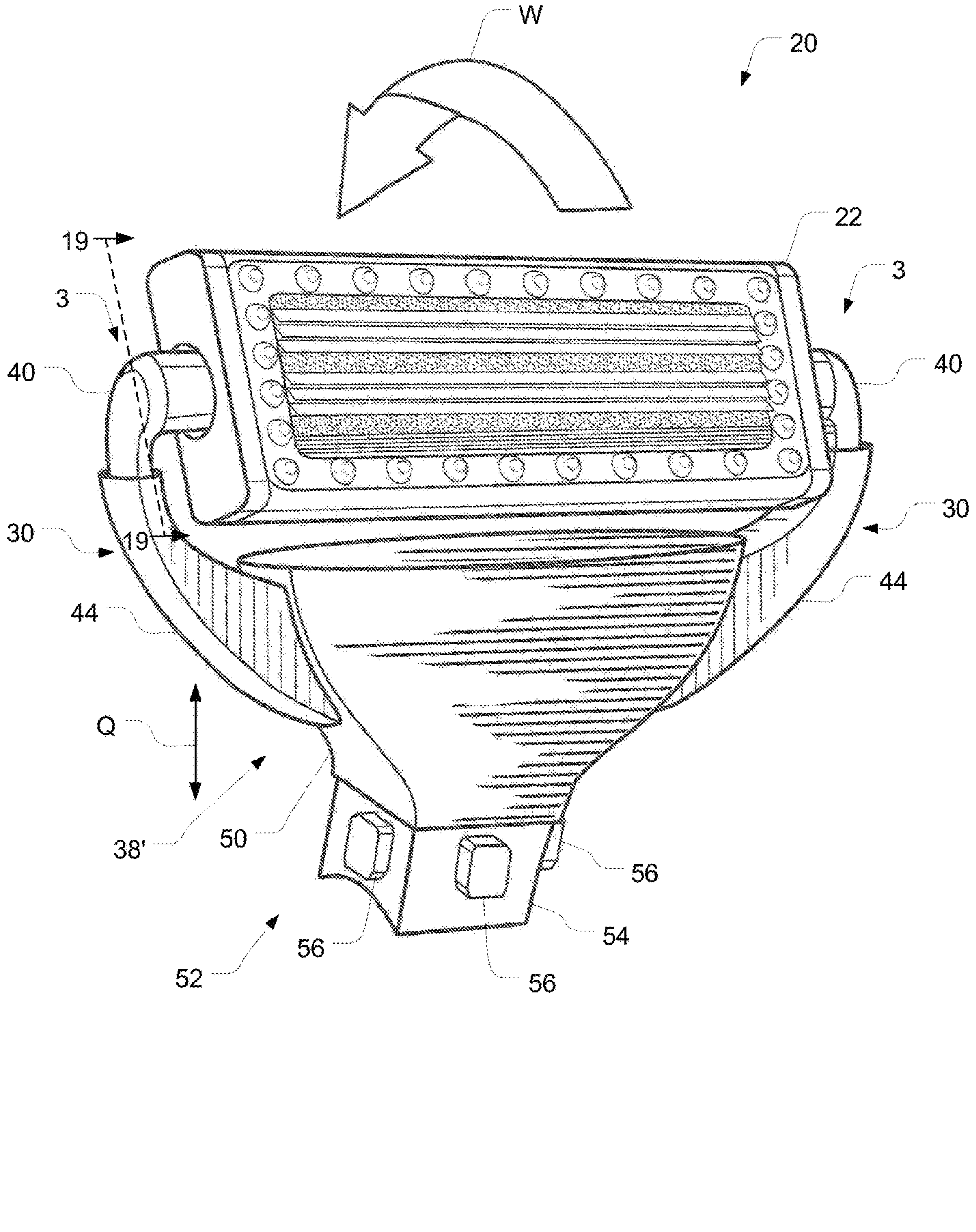
Figure 19:
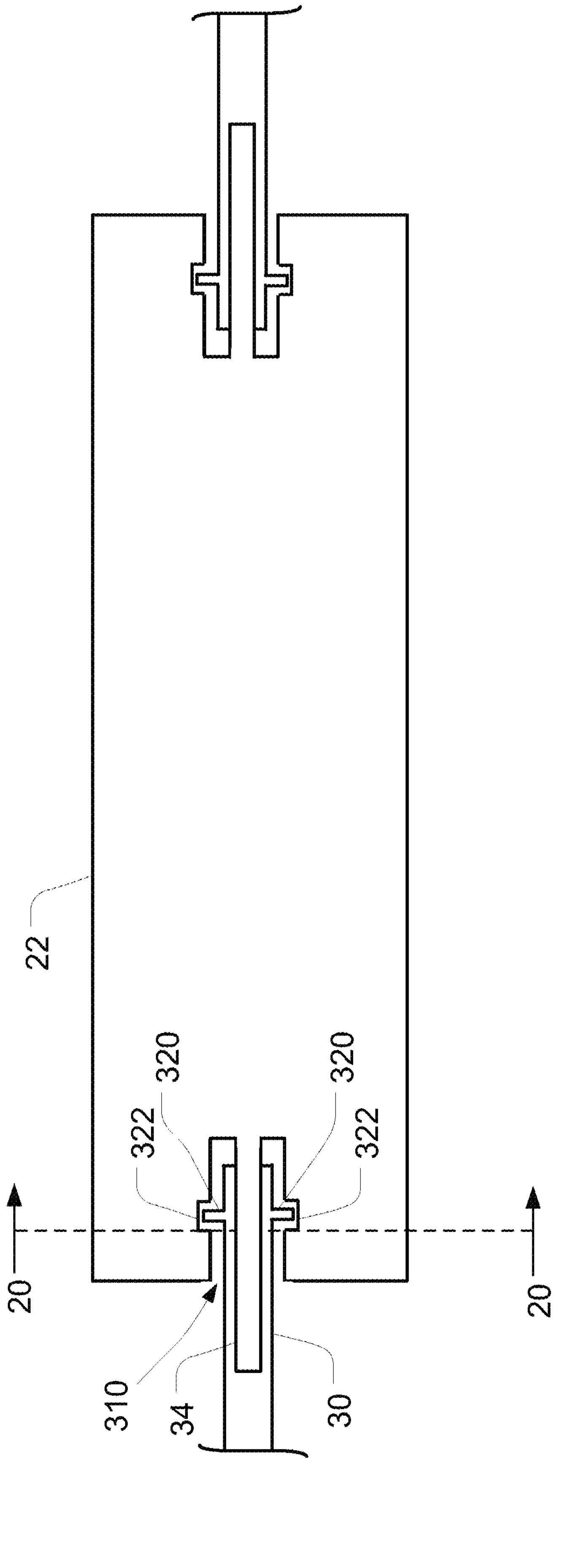
Figure 20:
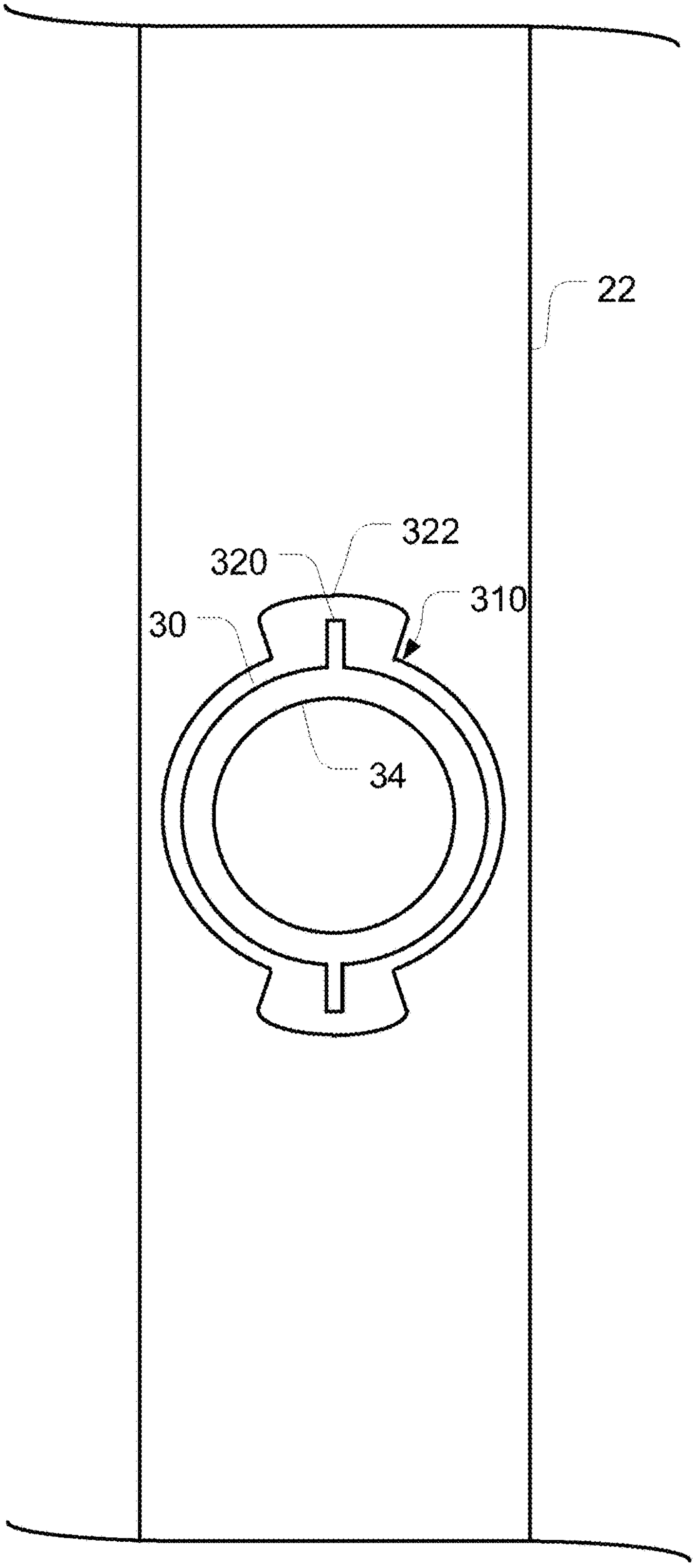
Figure 21:
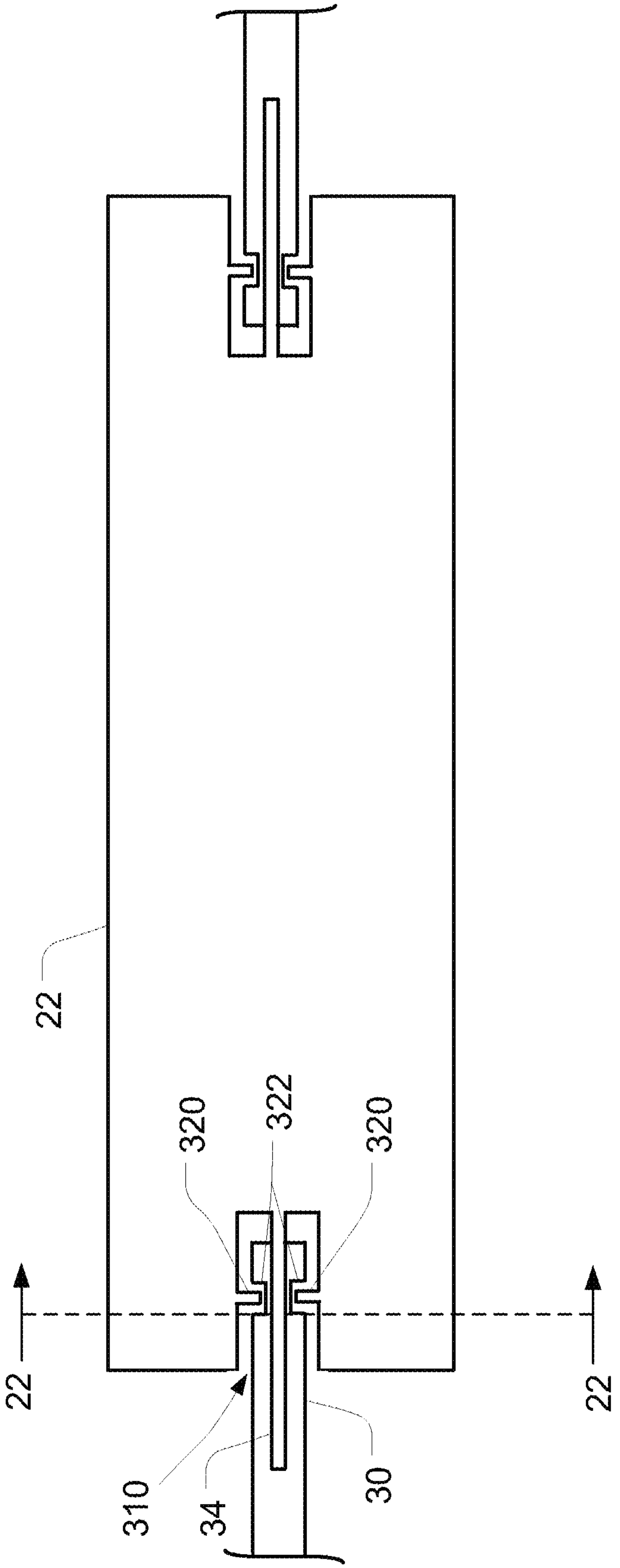
Figure 22:
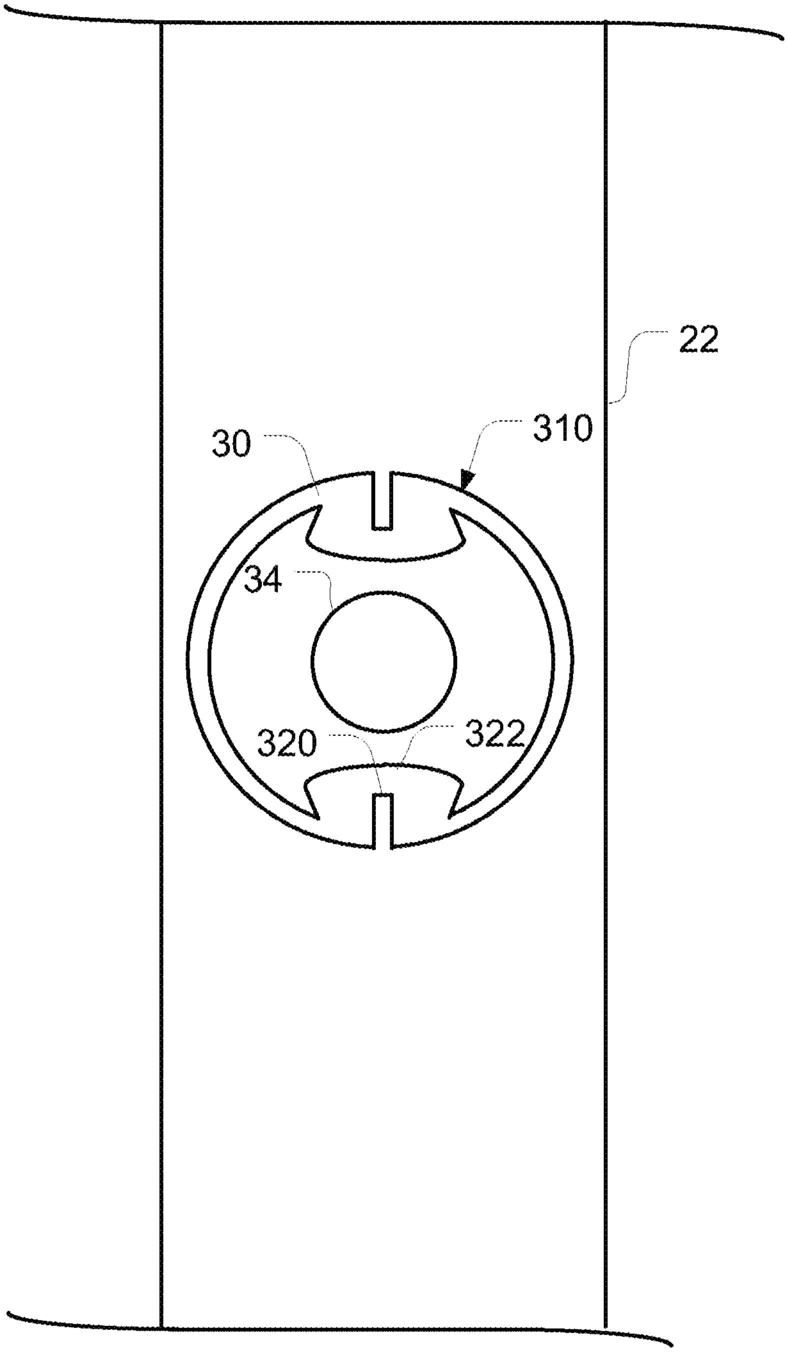
Figure 23:
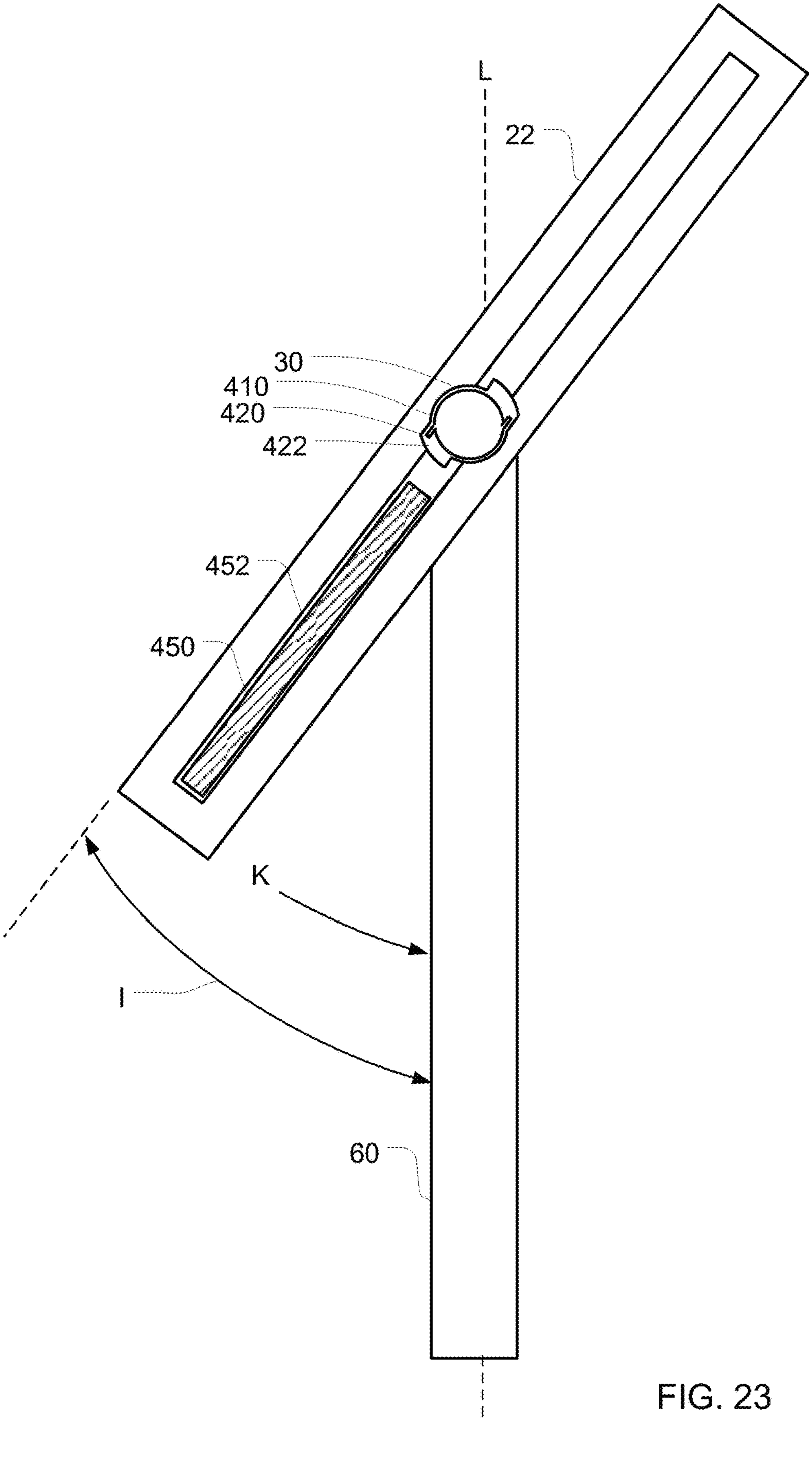
Figure 24:
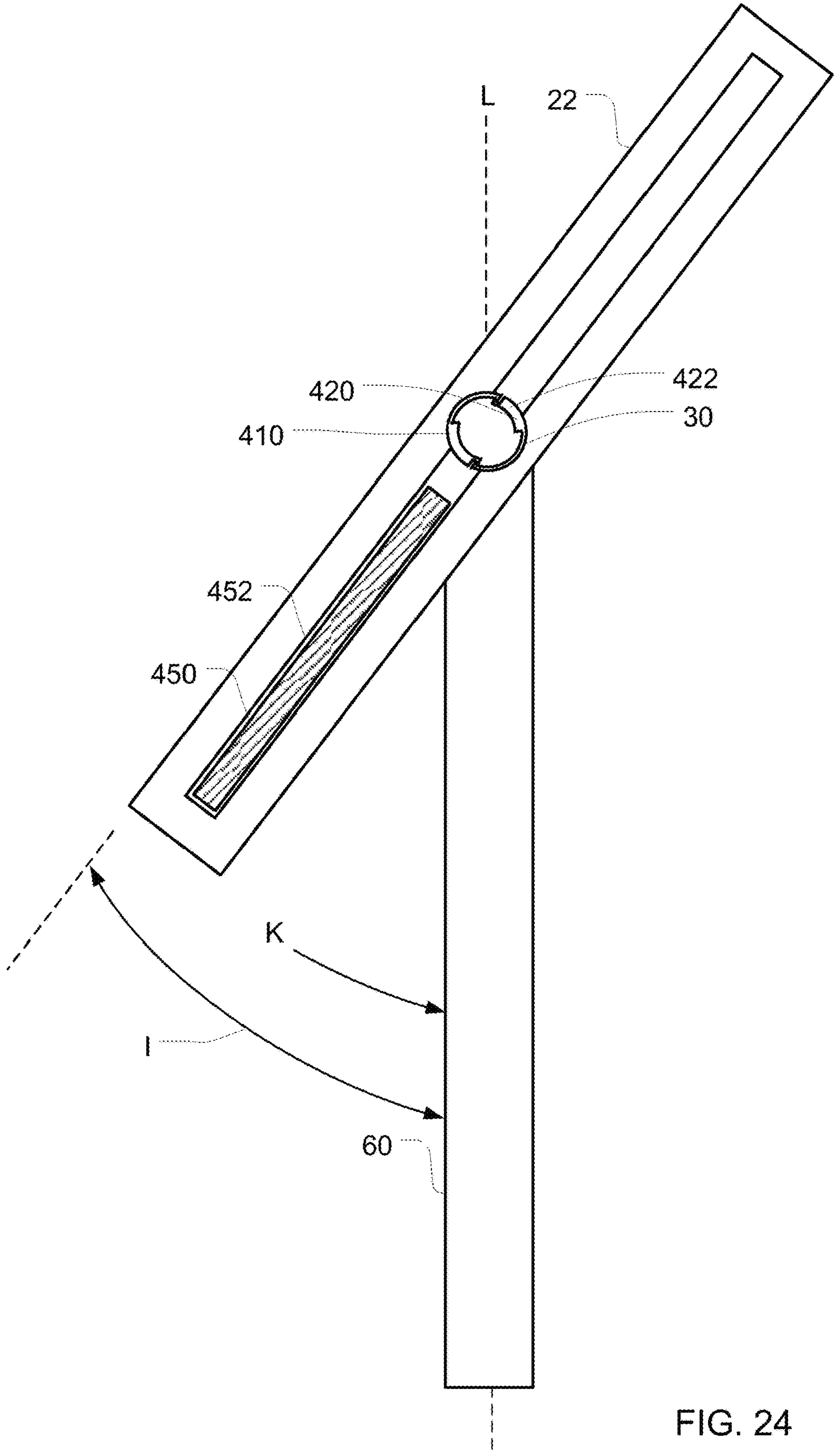
Figure 25:
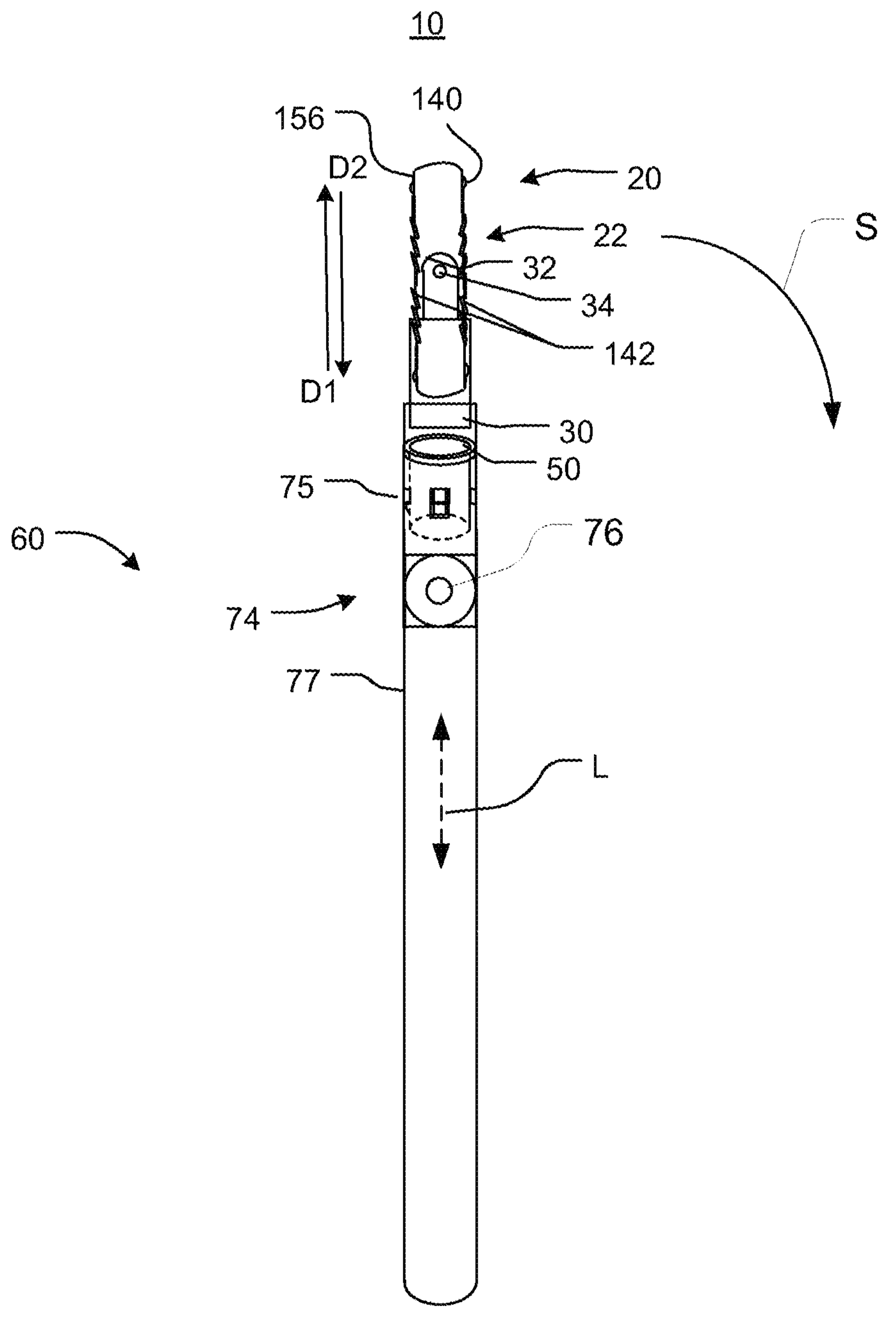
Figure 26:
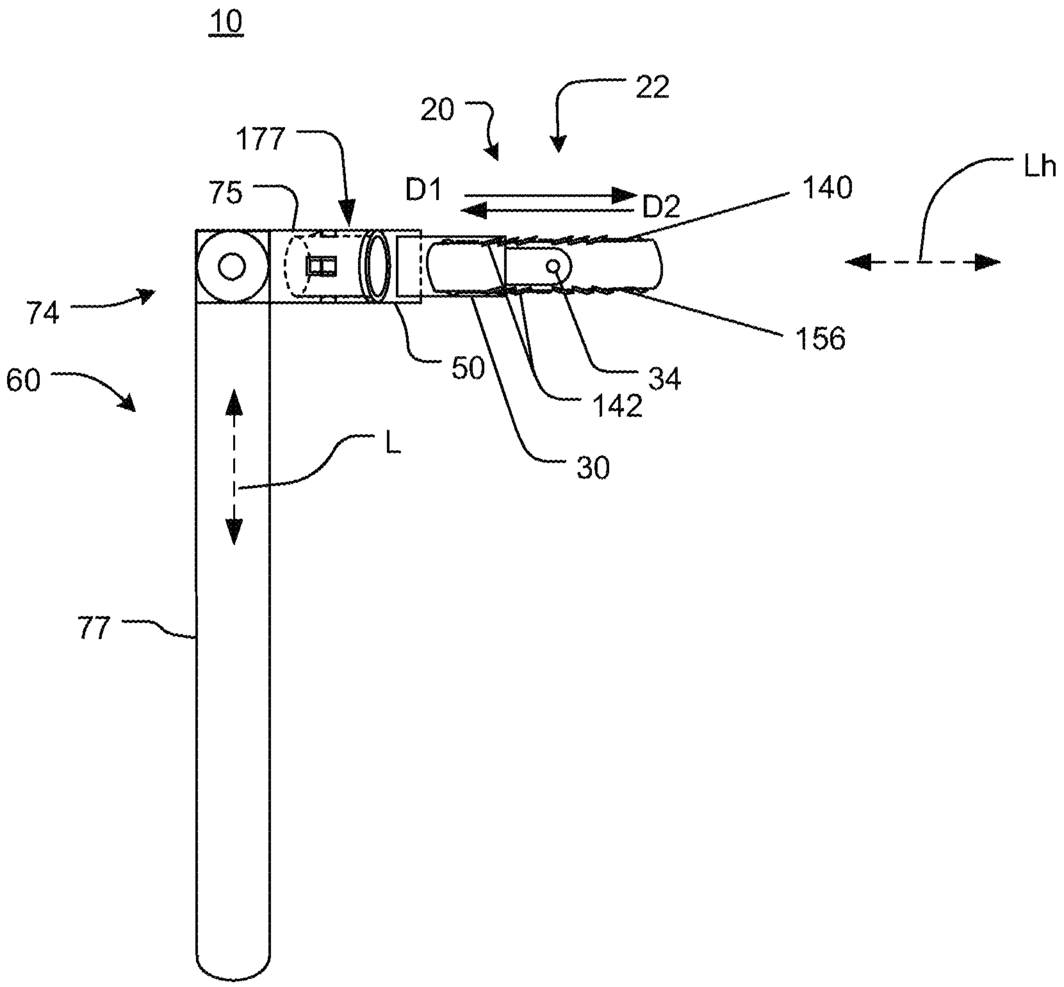
Figure 27:
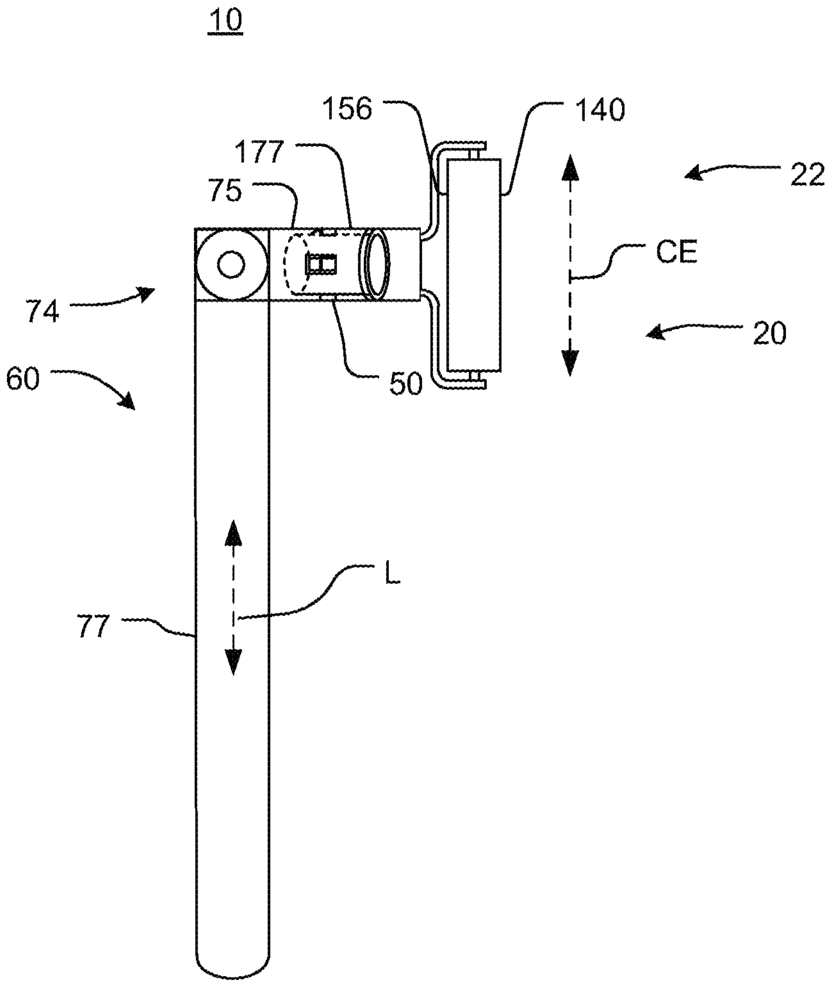
Figure 28:
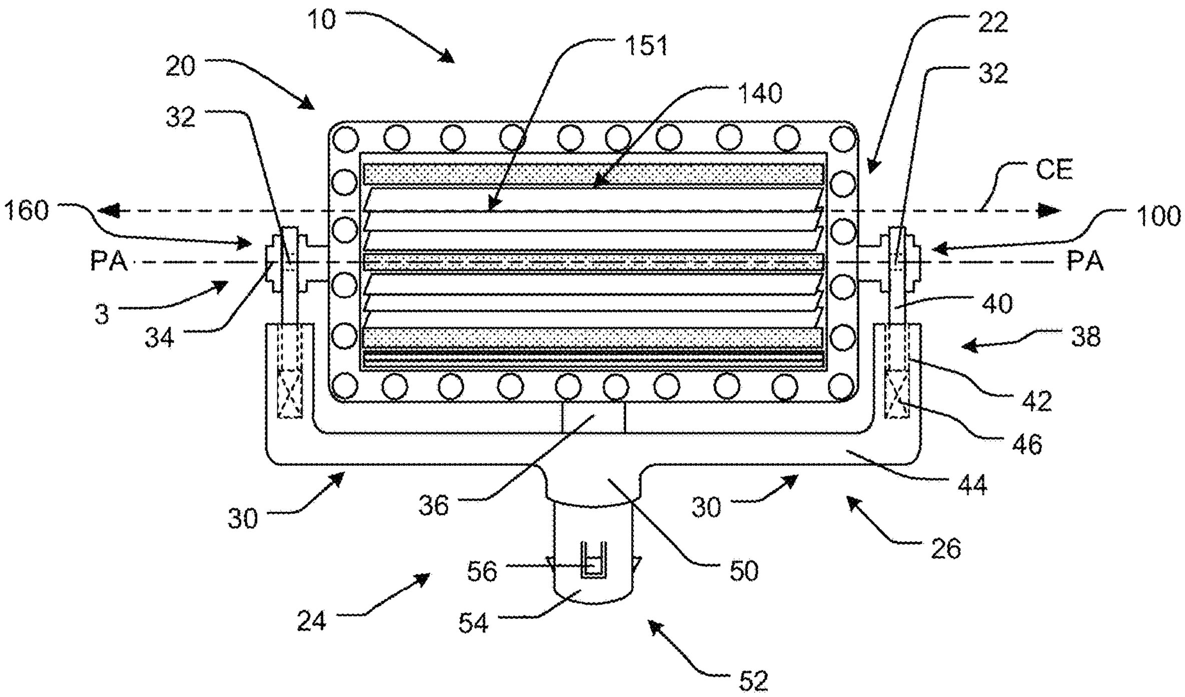
Figure 29:
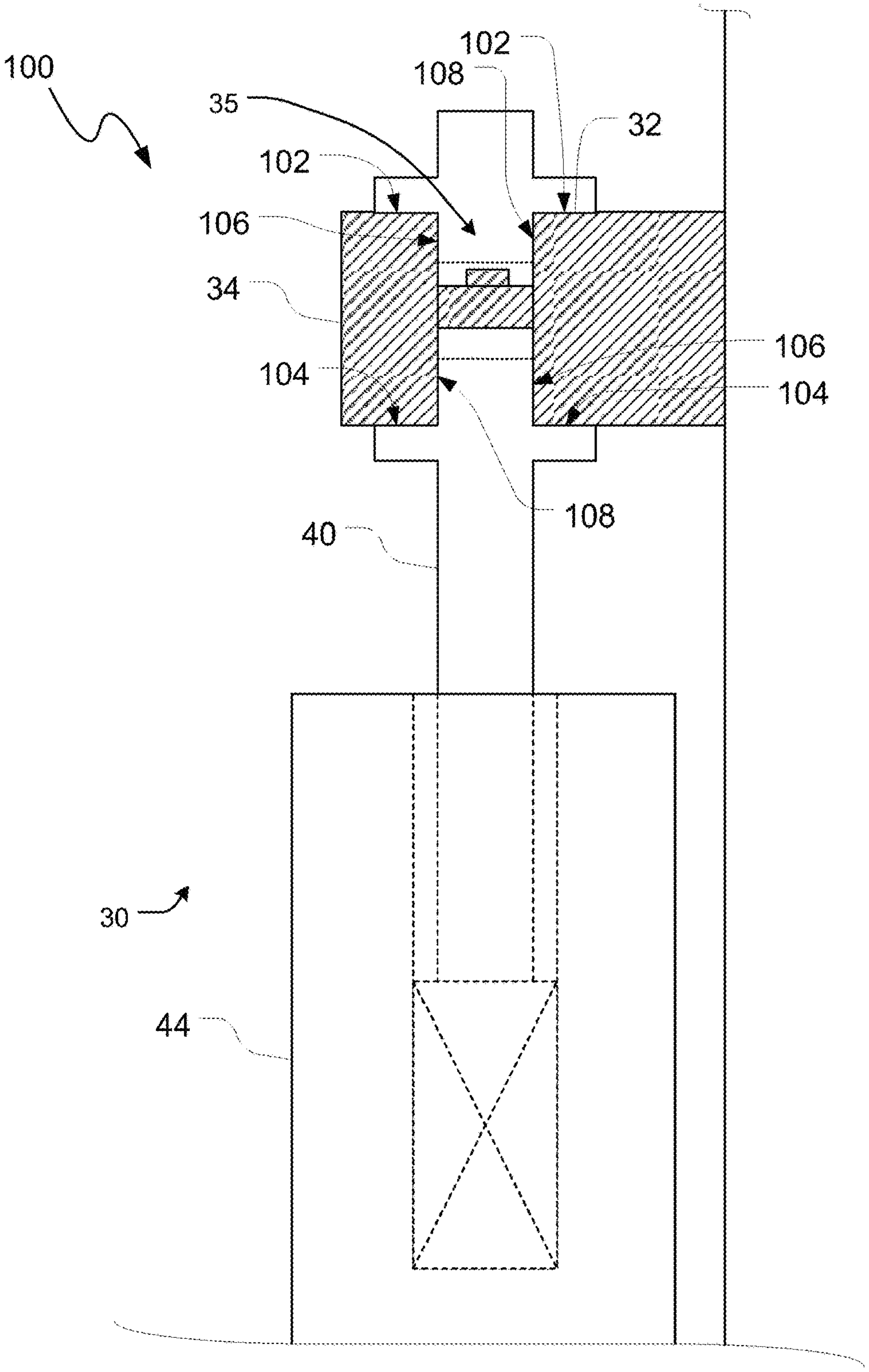
Figure 30A:
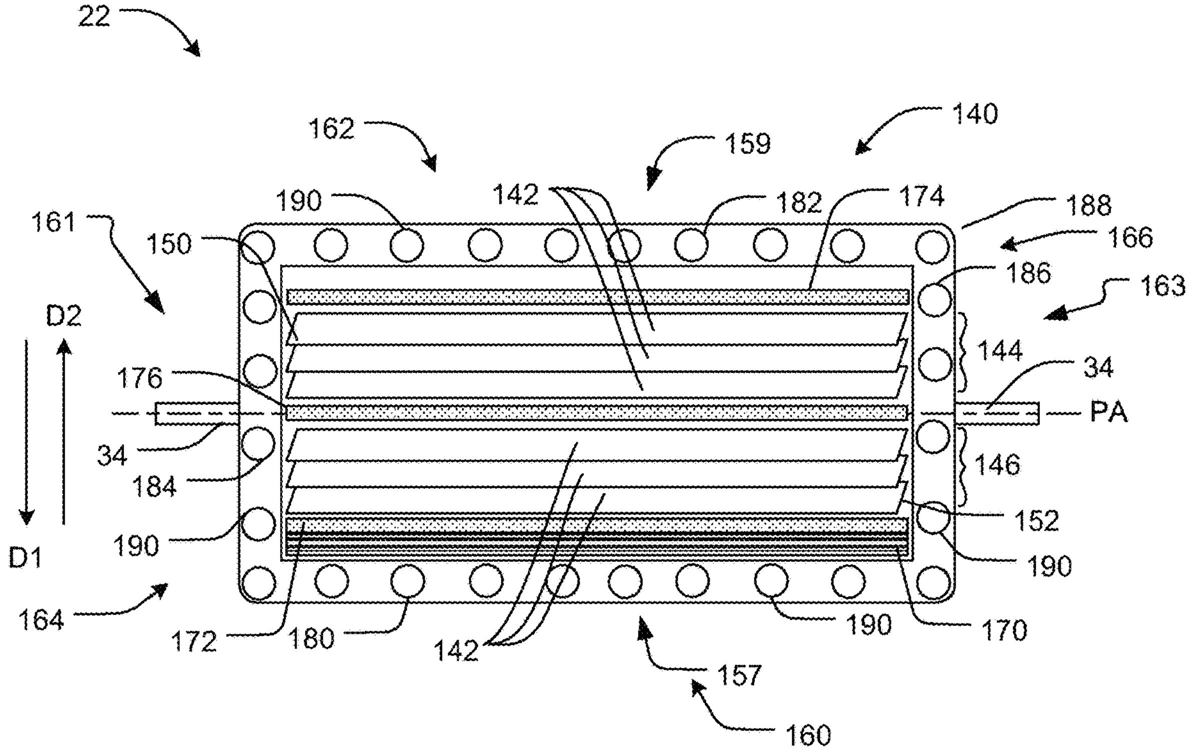
Figure 30B:
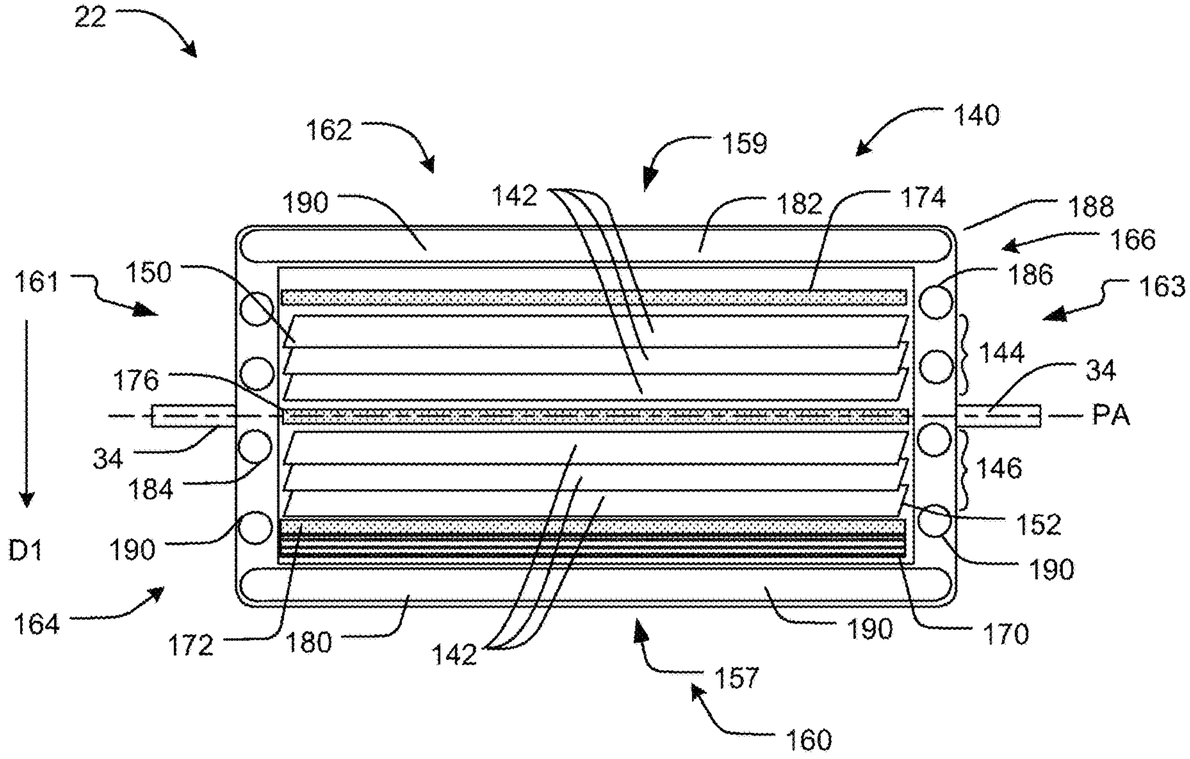
Figure 31:
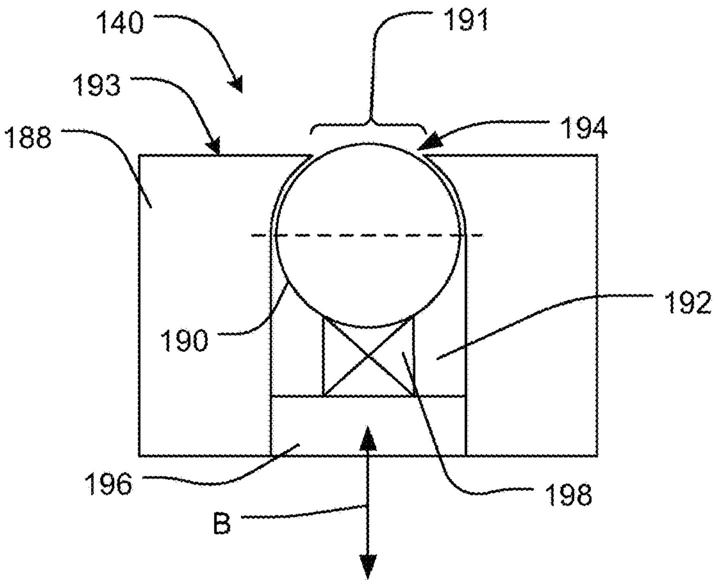
Figure 32:
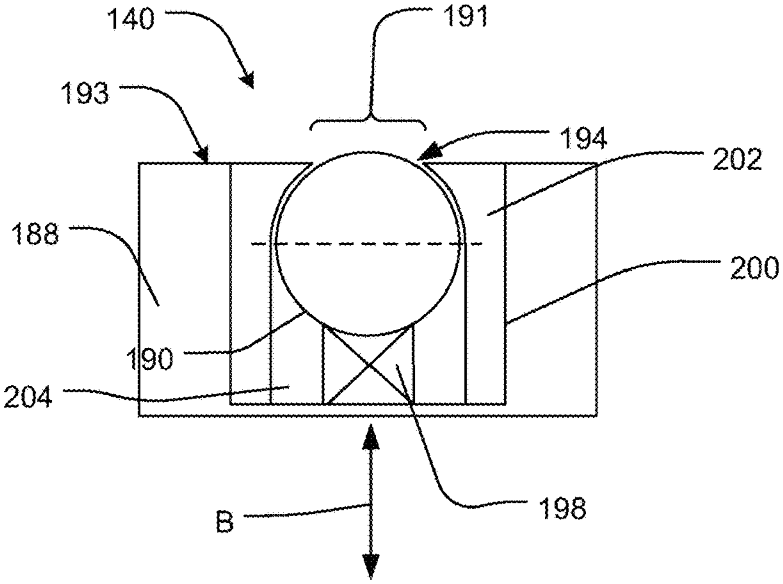
Figure 33:
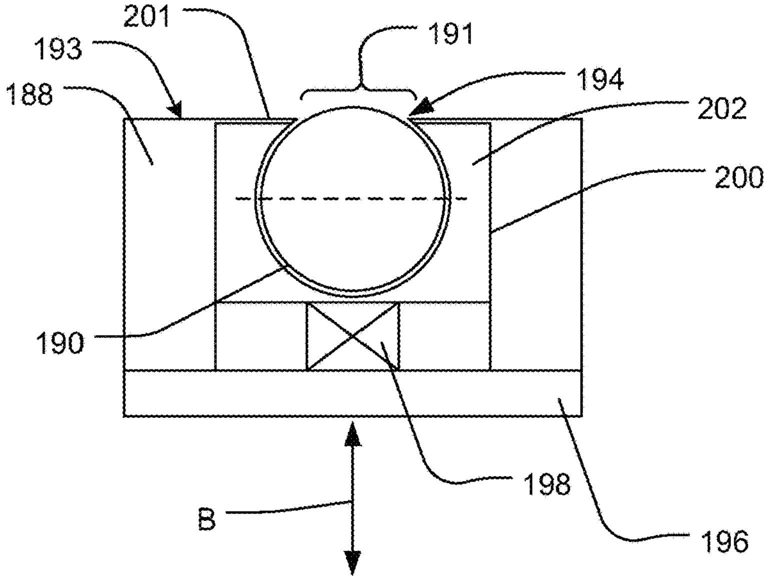
Figure 34:
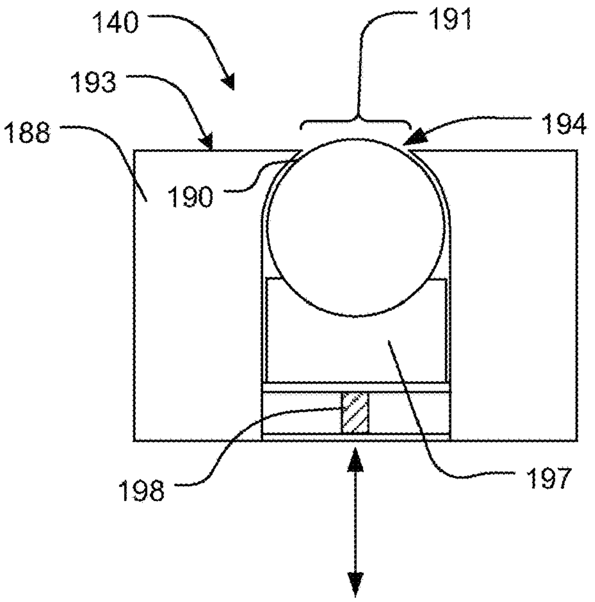
Figure 35A:
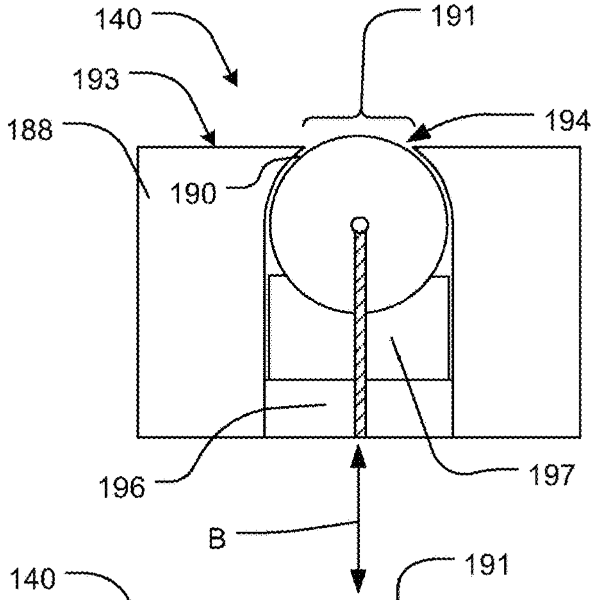
Figure 35B:
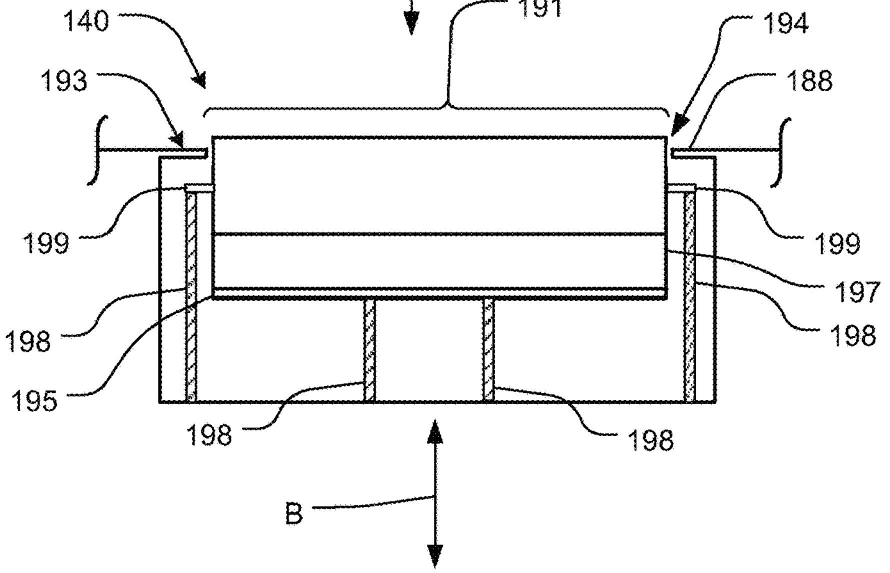
Figure 35C:
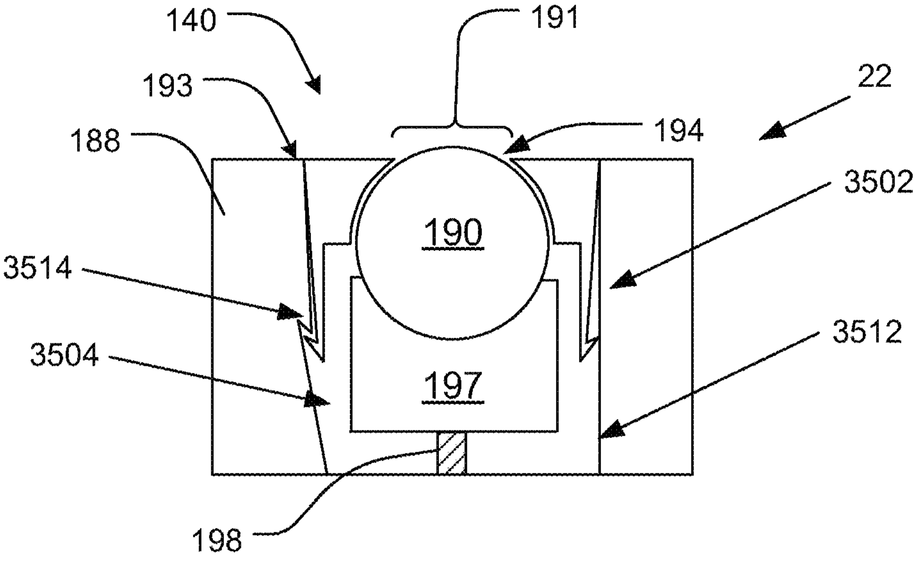
Figure 35D:
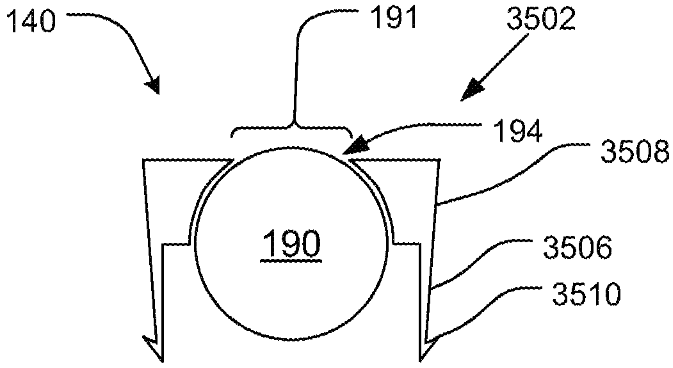
Figure 35E:
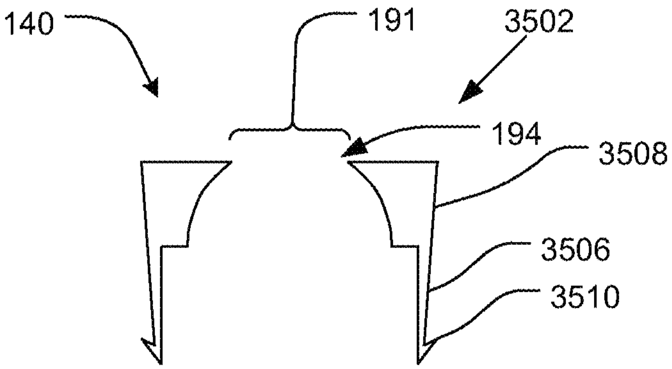
Figure 35F:
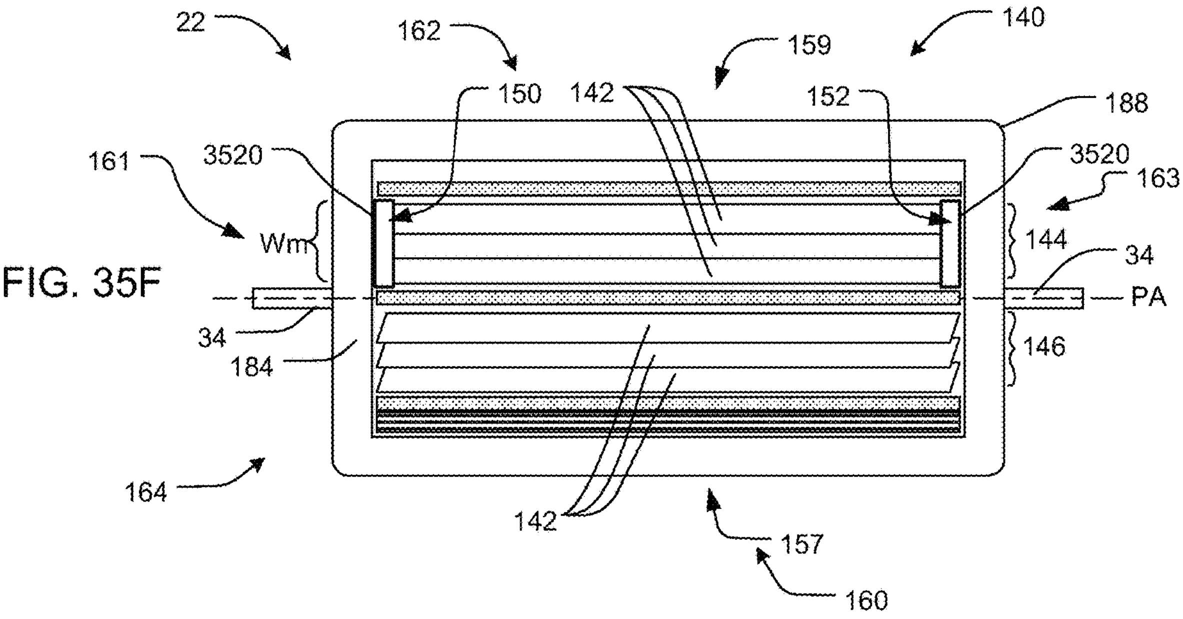
Figure 35G:
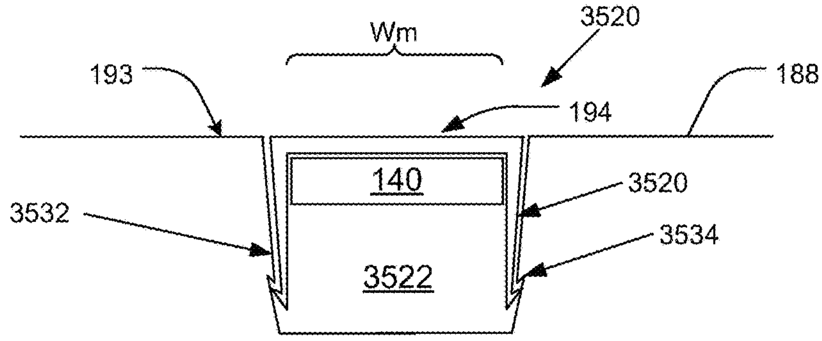
Figure 35H:
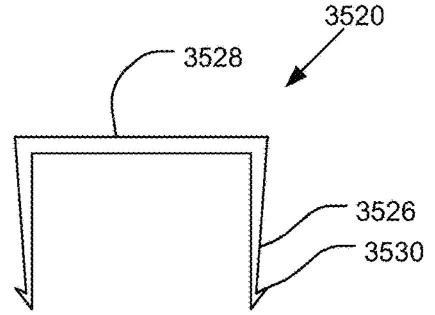
Figure 36:
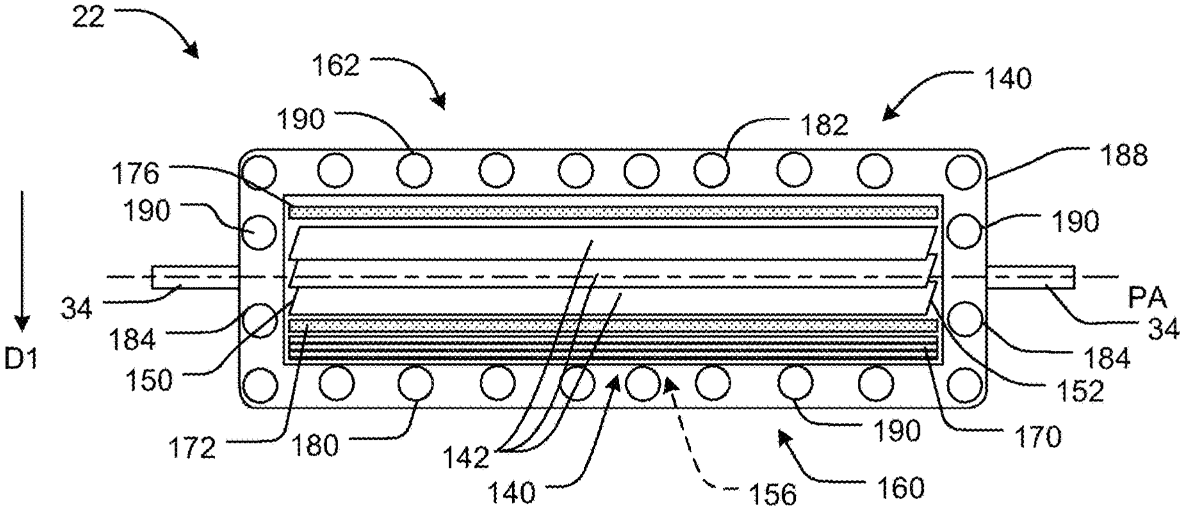
Figure 37:
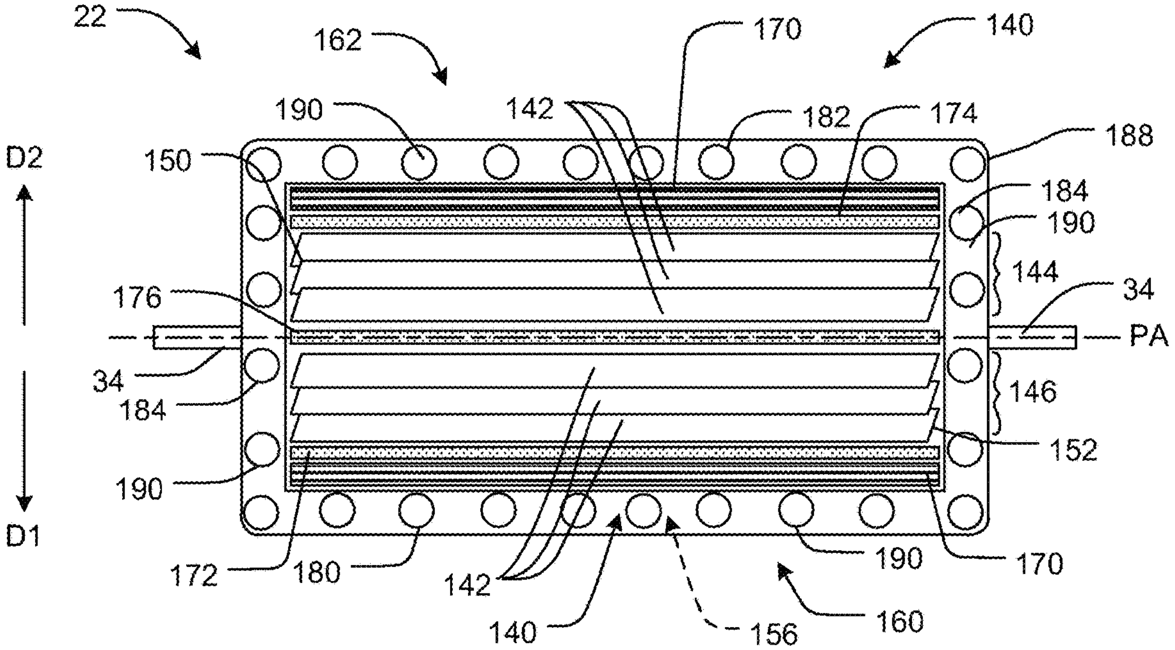
Figure 38:
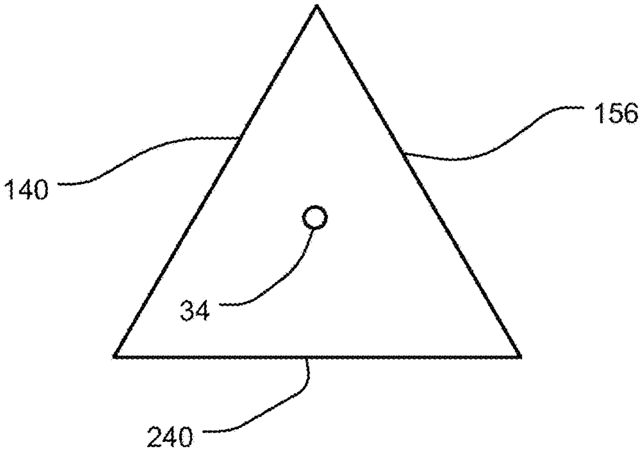
Figure 39:
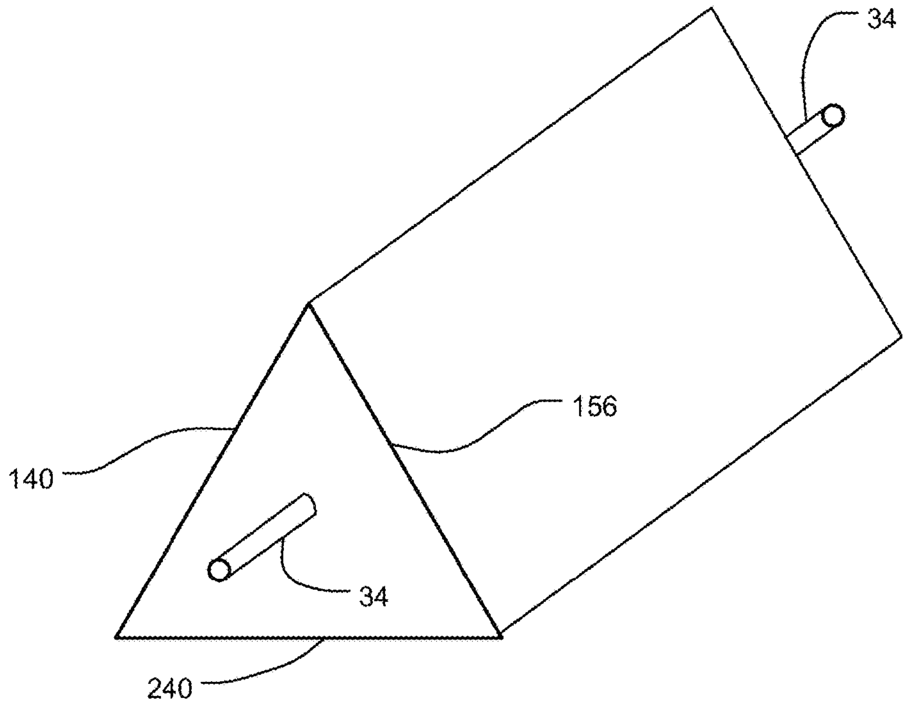
Figure 40:
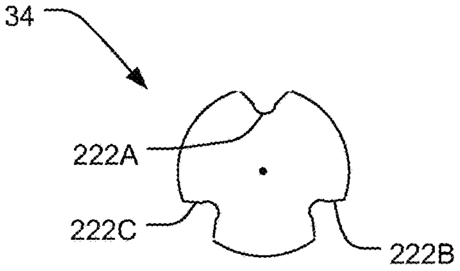
Figure 41:
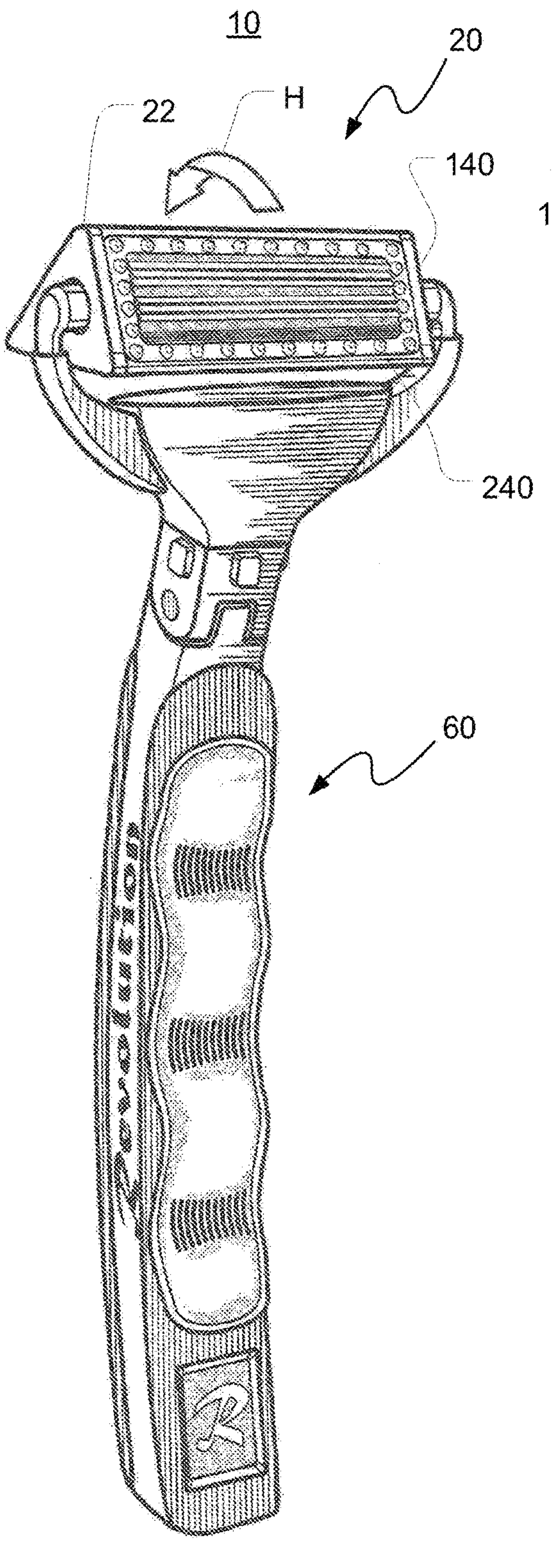
Figure 42:
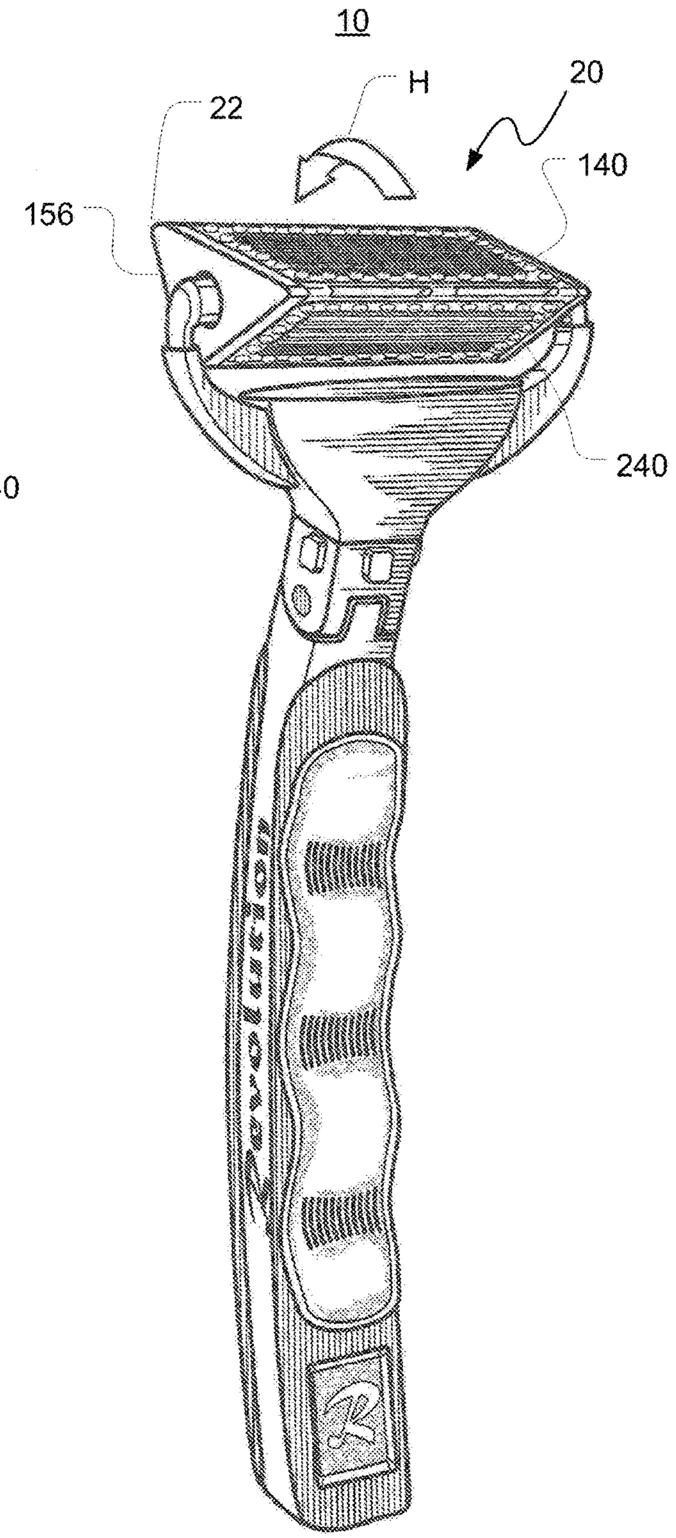
Figure 43:
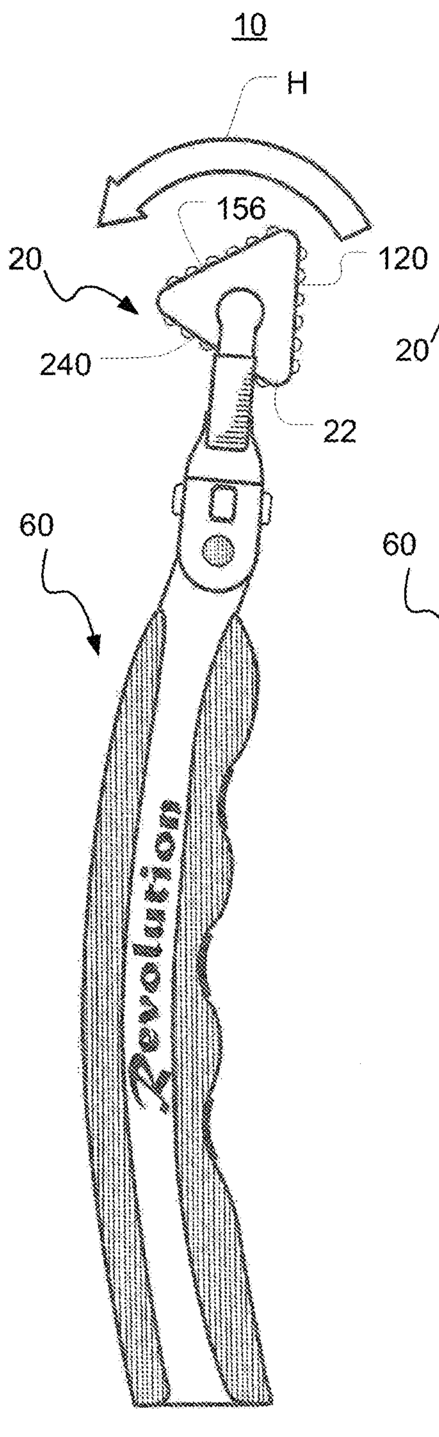
Figure 44:
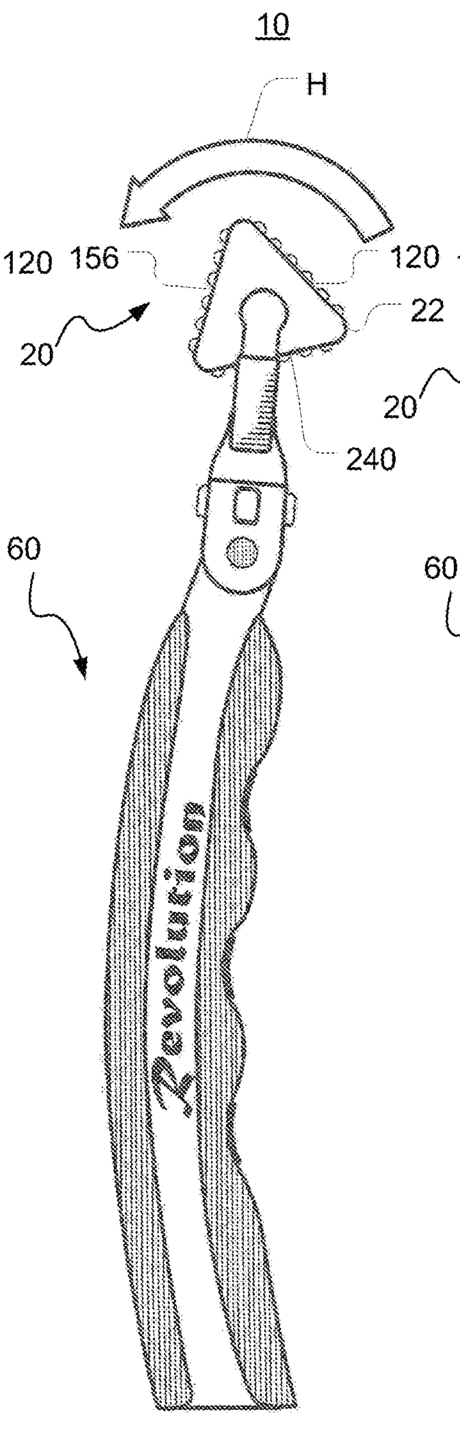
Figure 45:
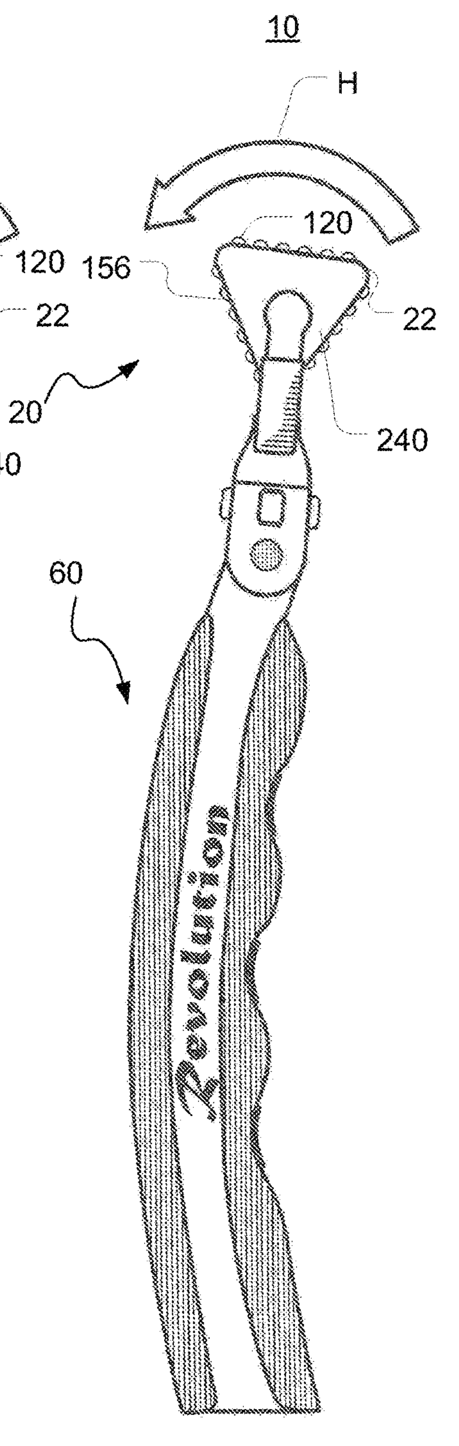
Figure 46:
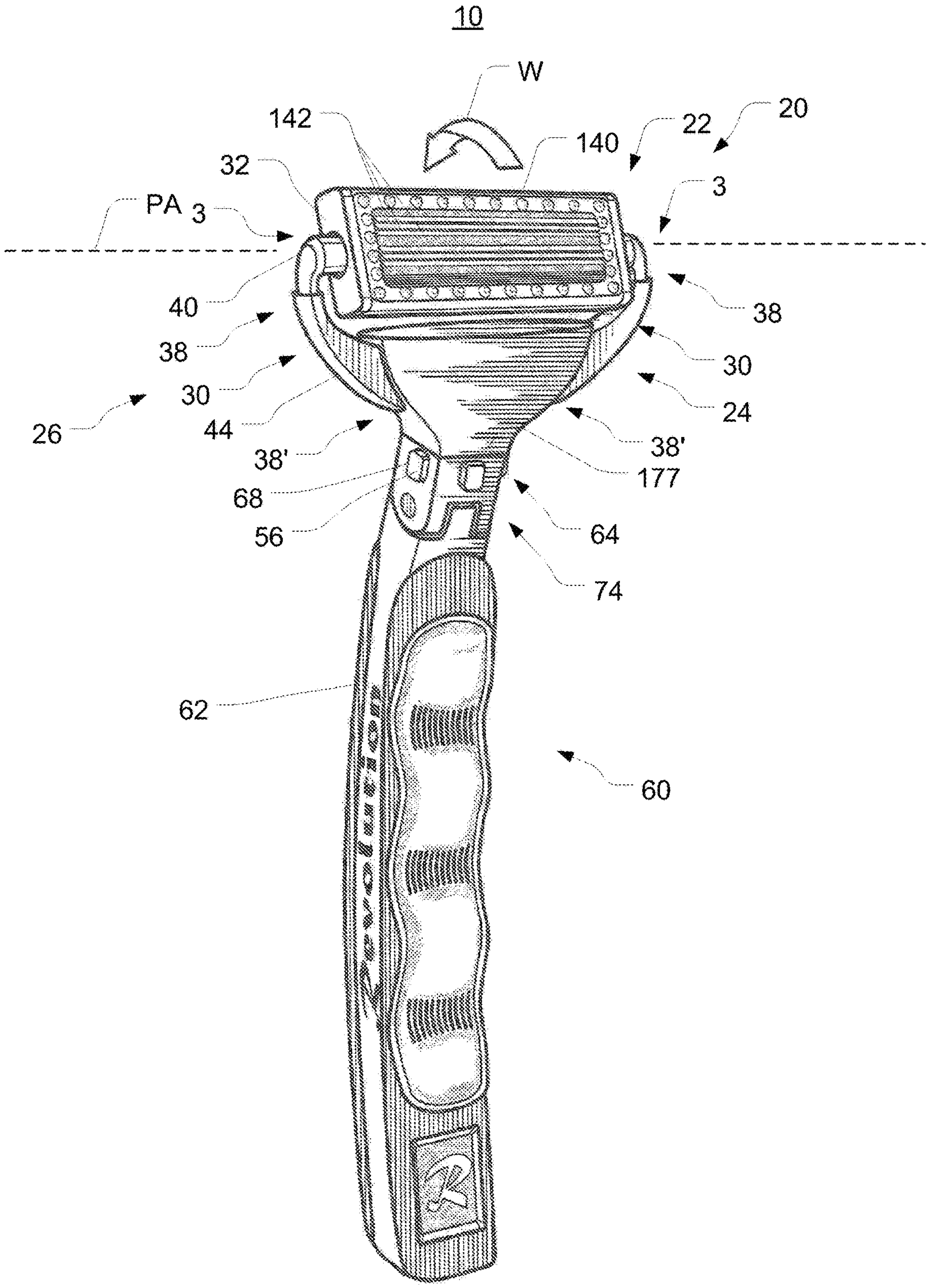
Figure 47:
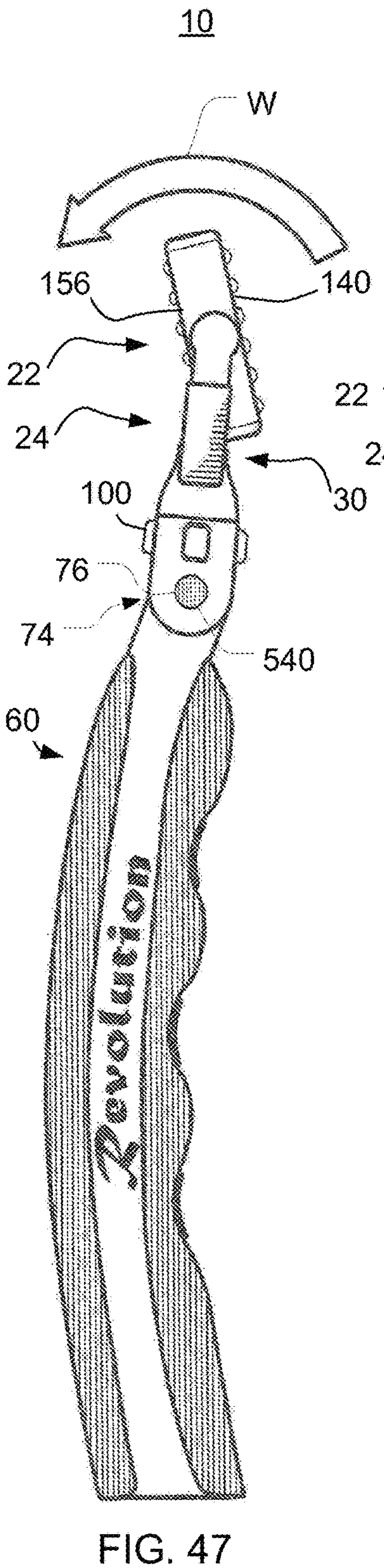
Figure 48:
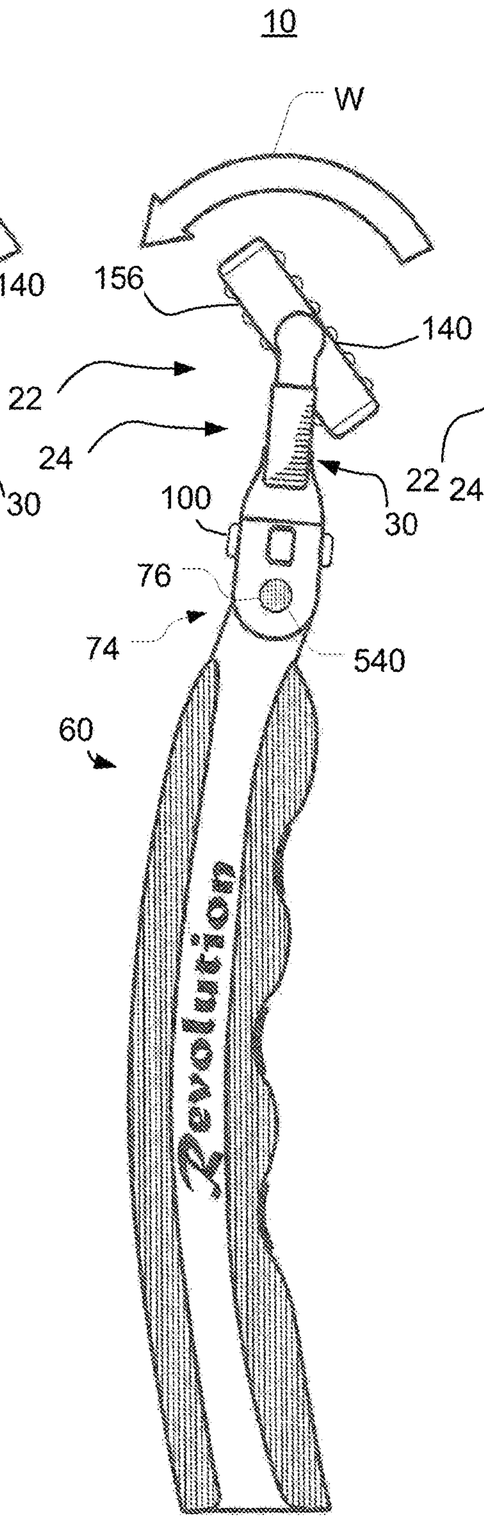
Figure 49:
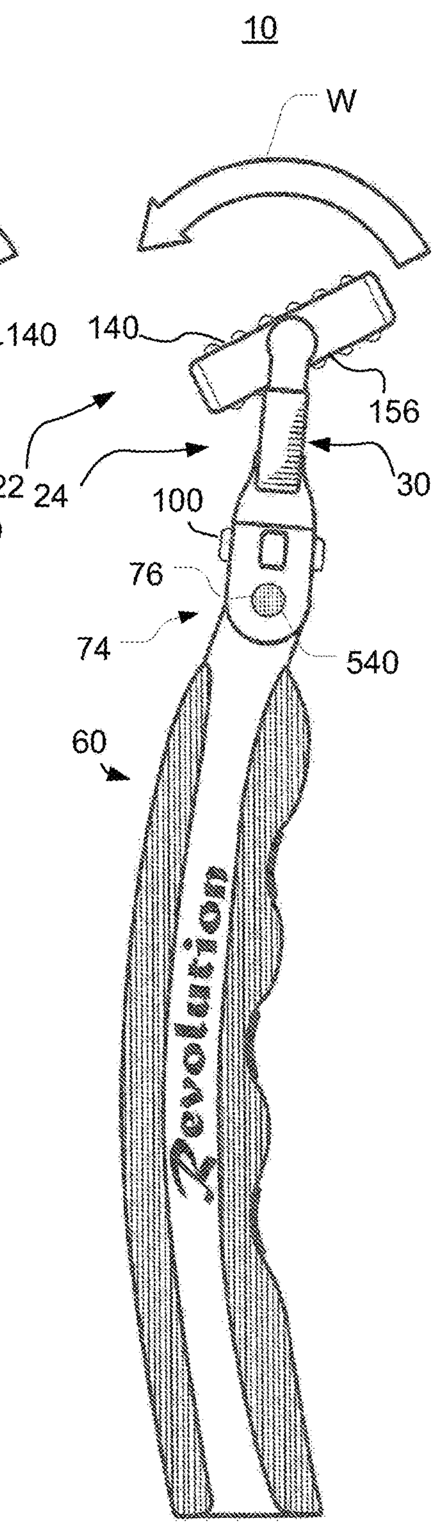
Figure 50:
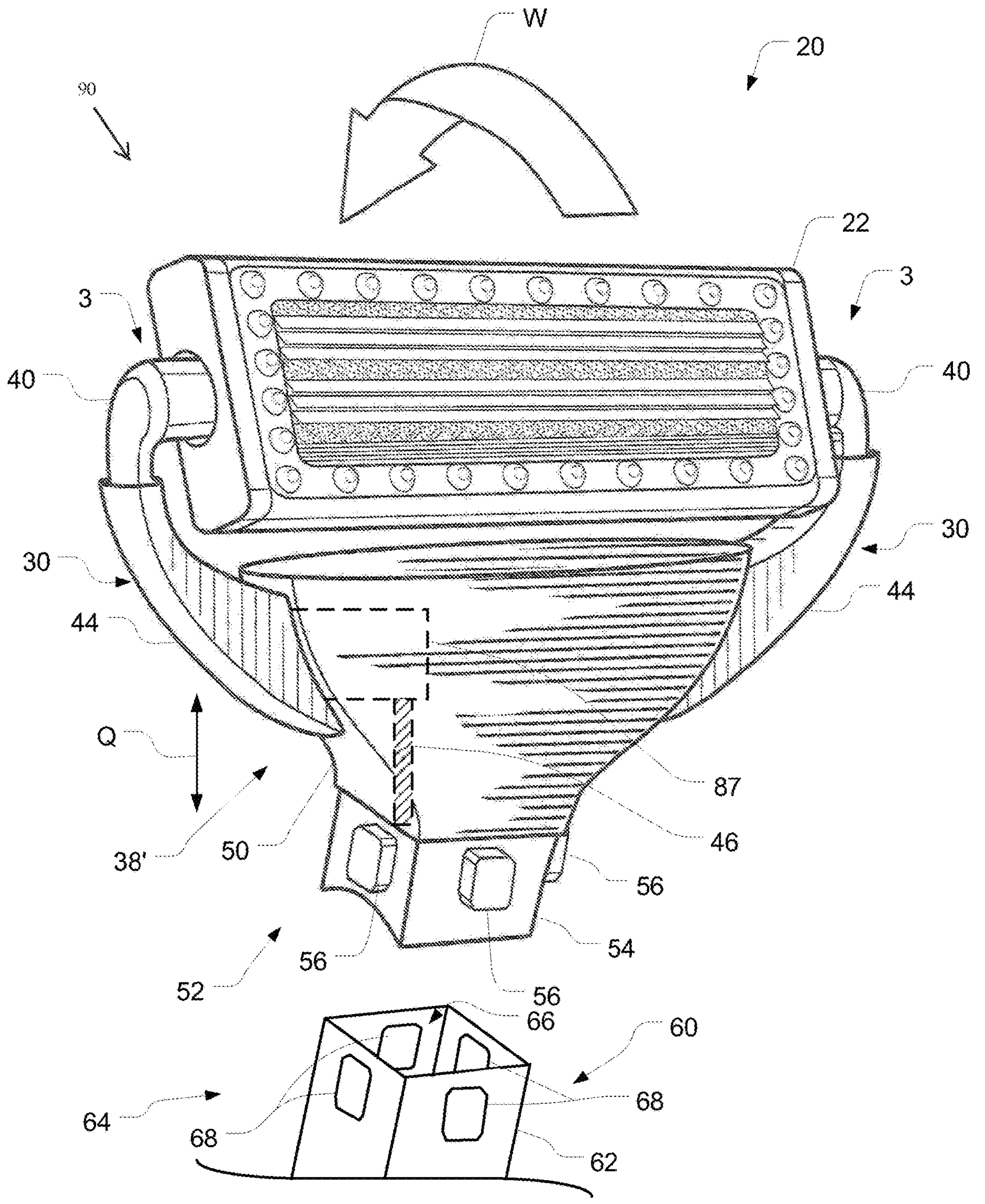
Figure 51:
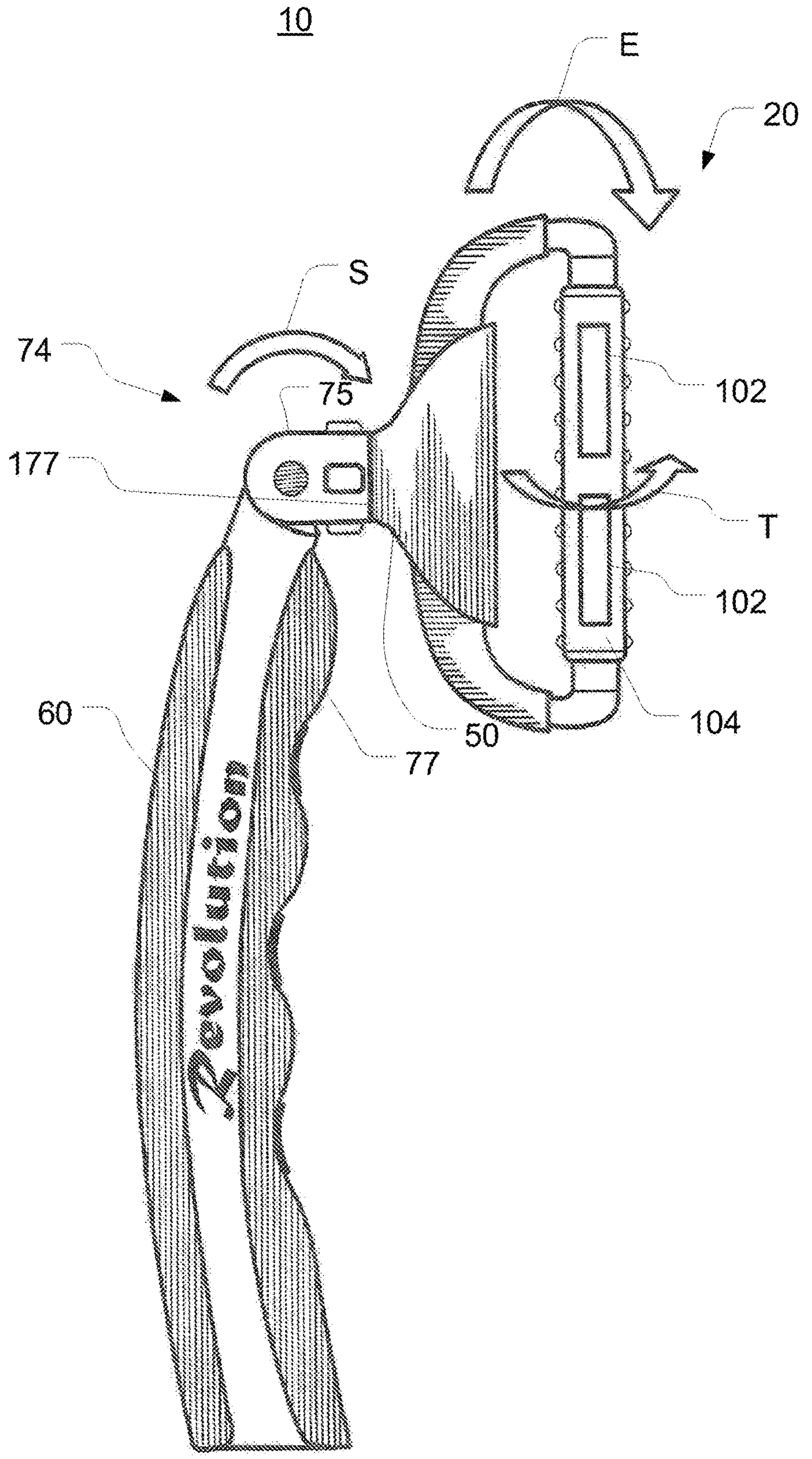
Figure 52:
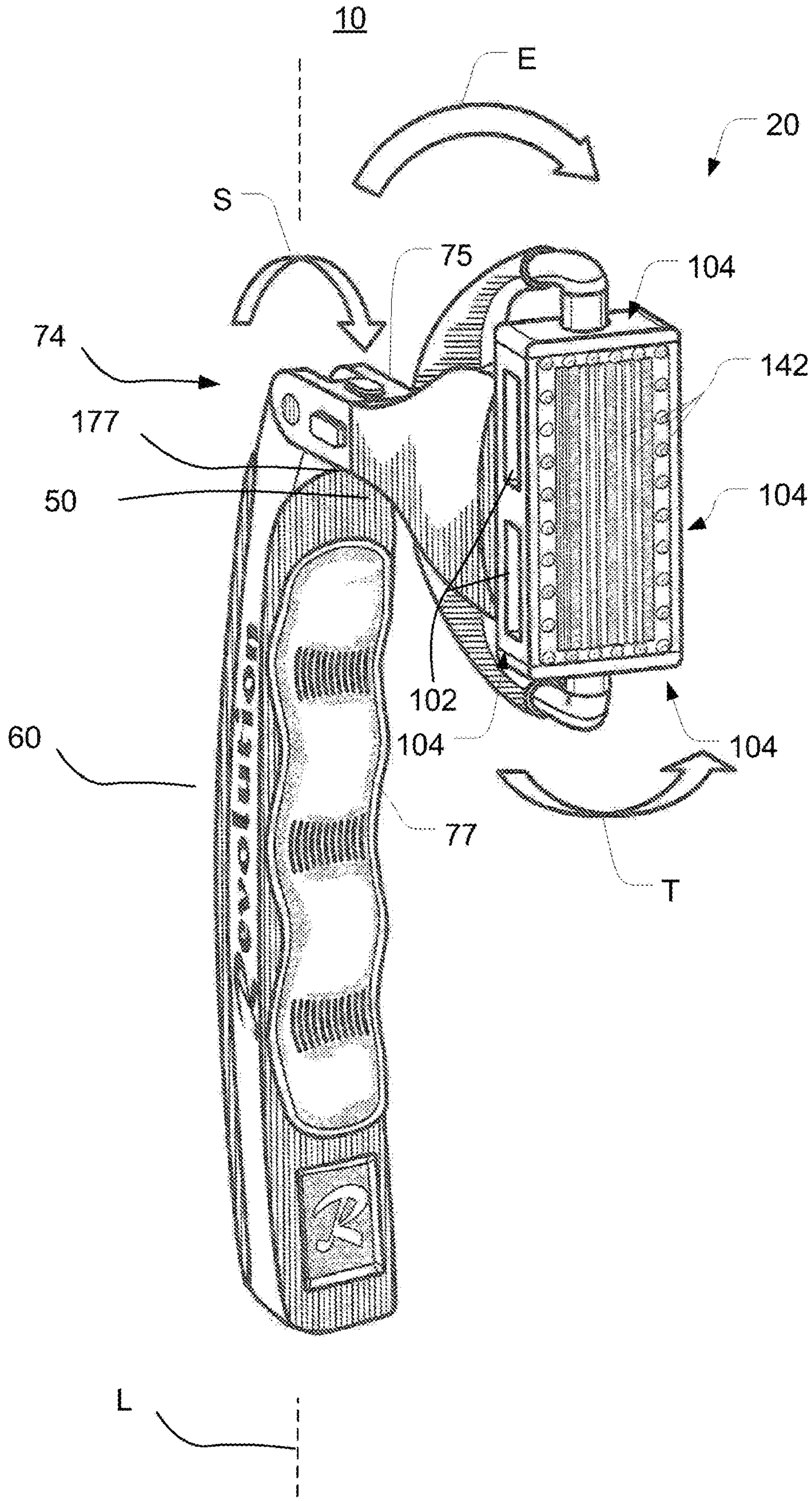
Figure 53:
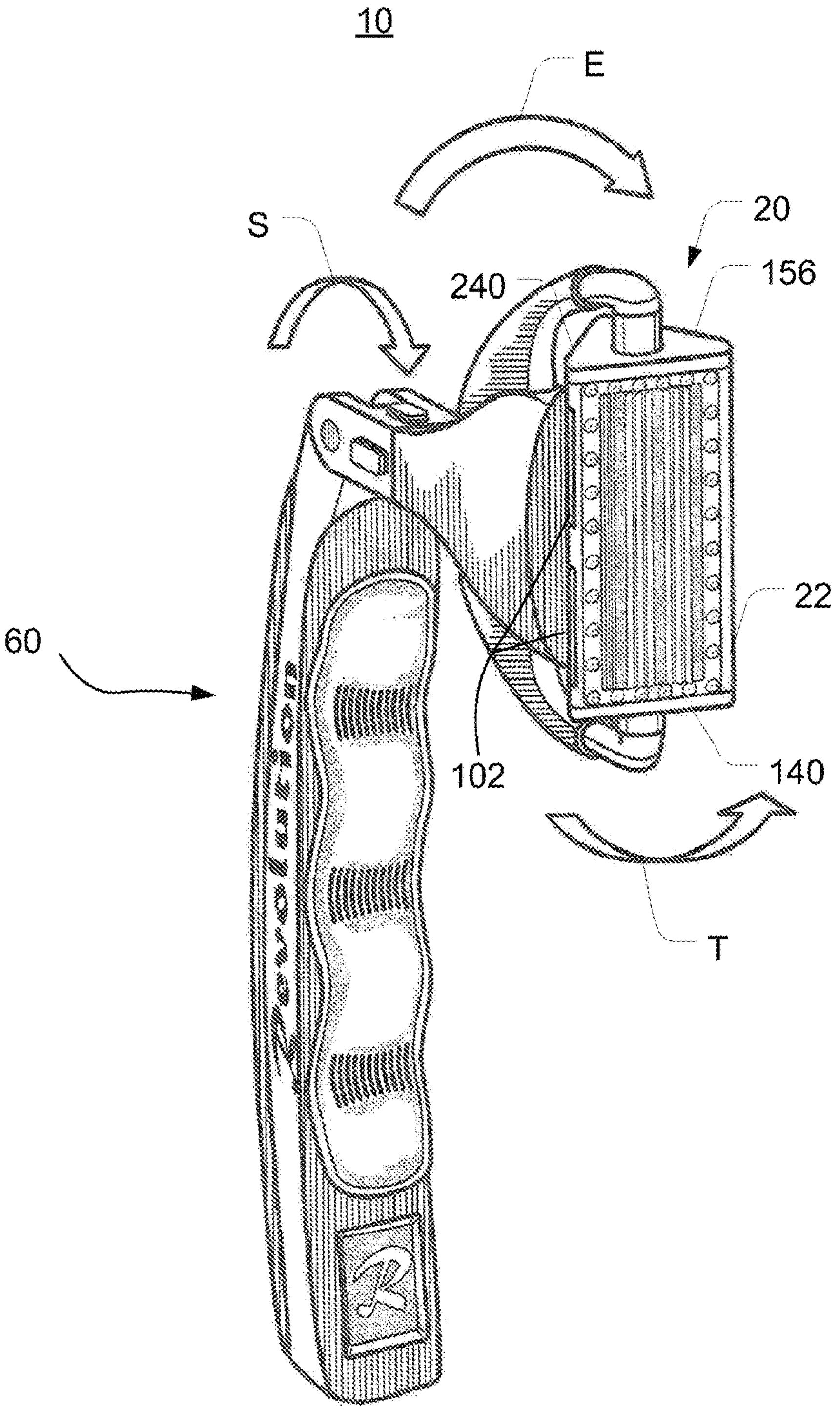
Figure 54:
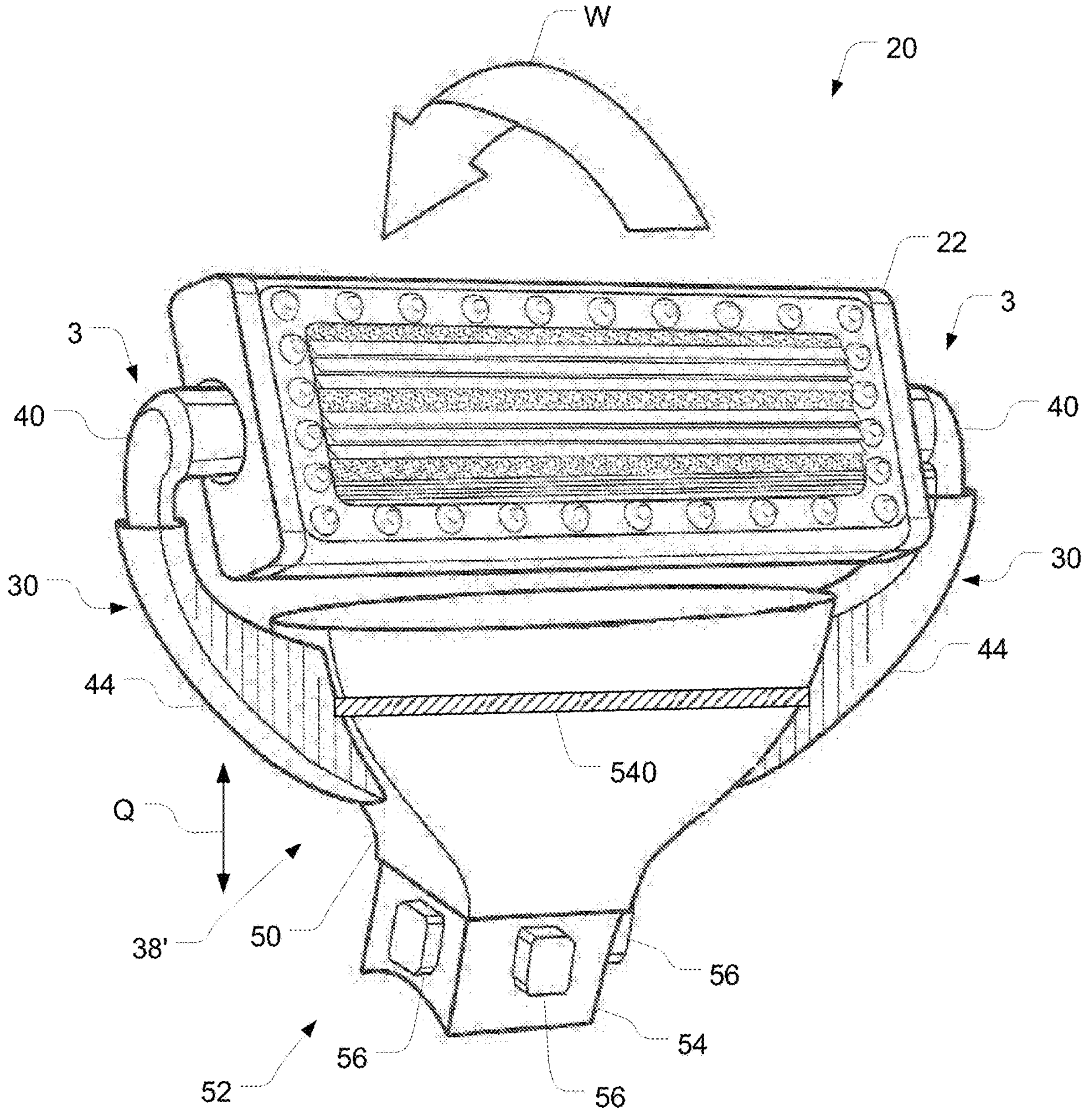
Figure 56:
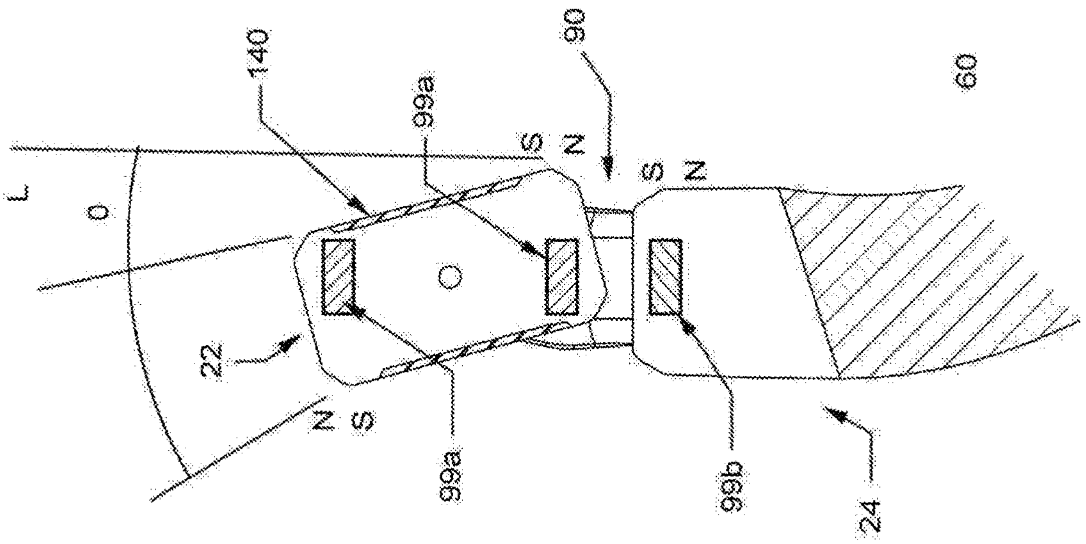
Figure 55:
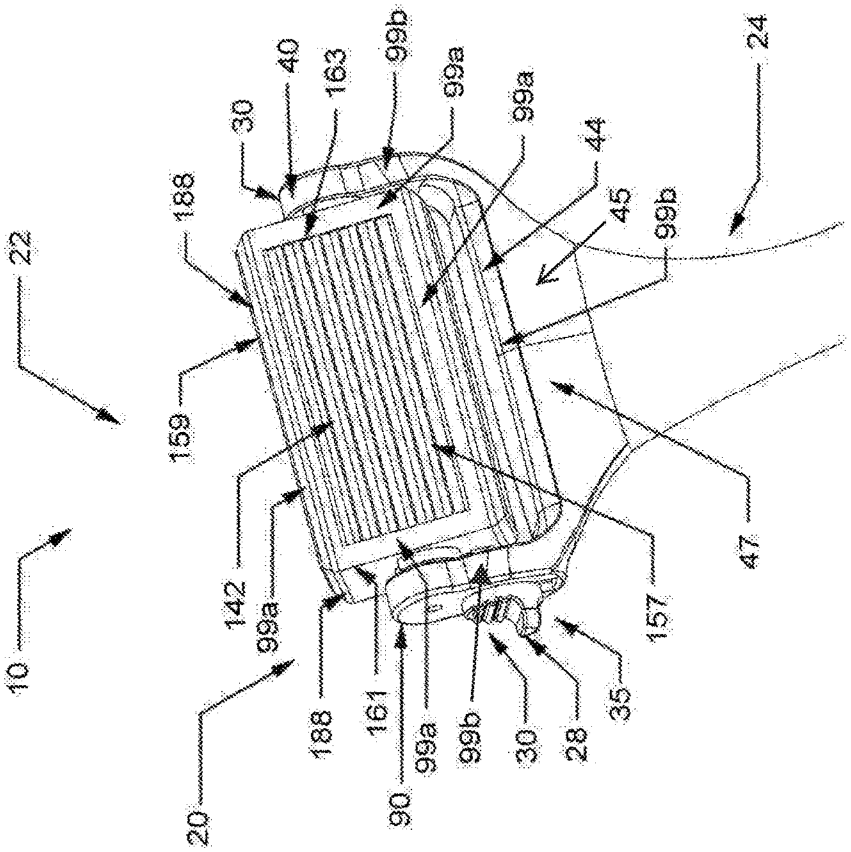
Figure 57:
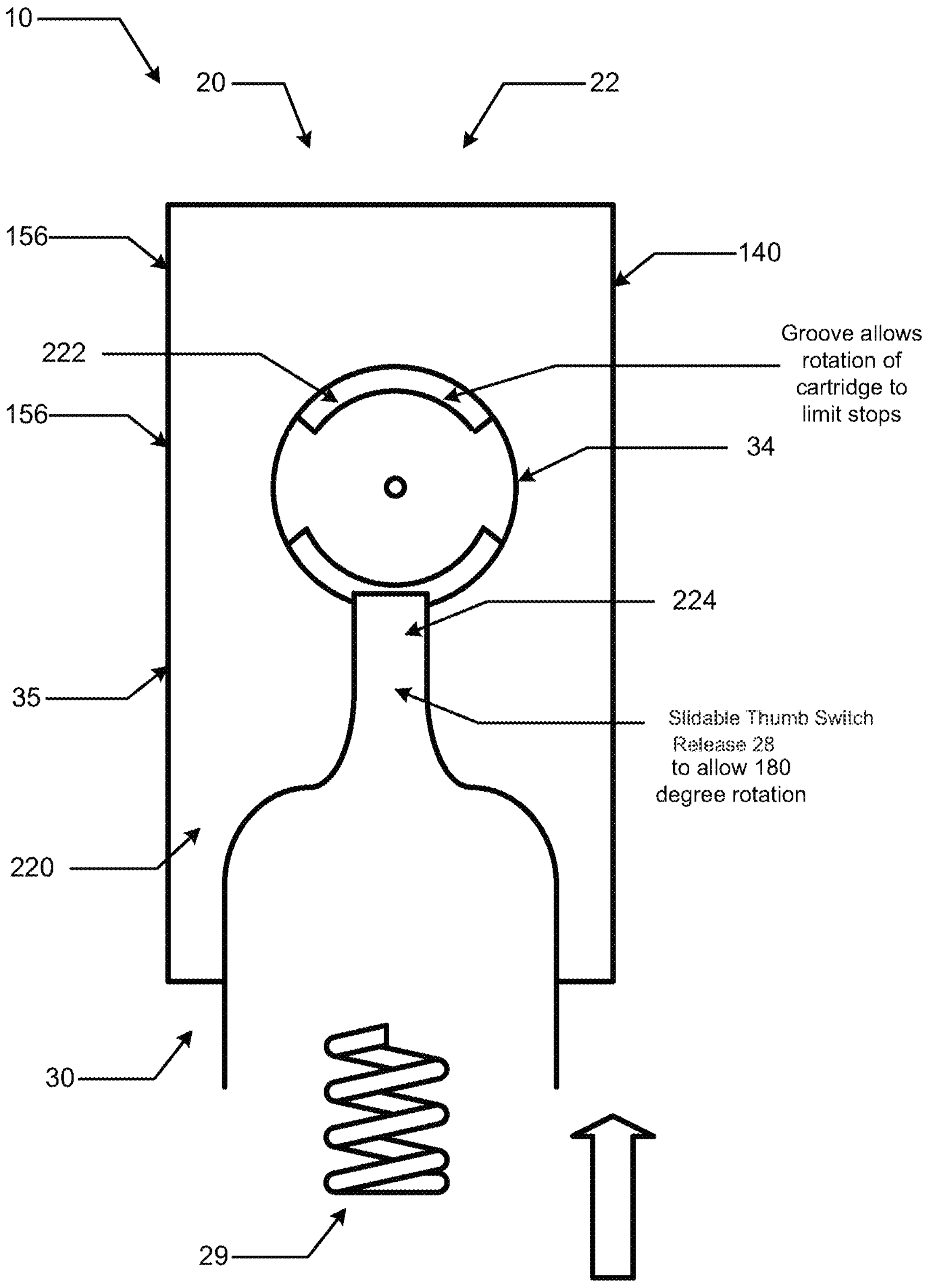
Figure 58:
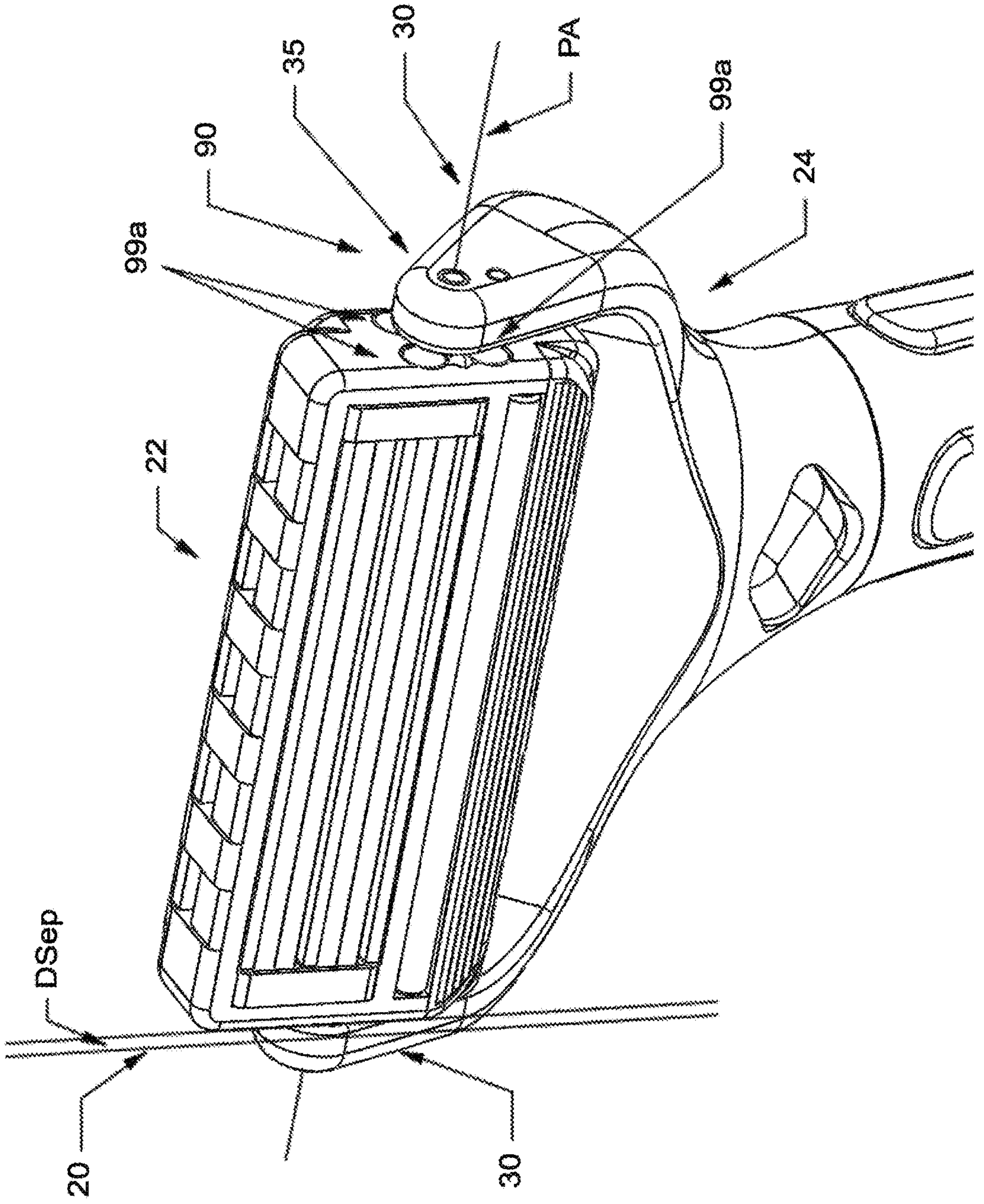
Figure 59A:
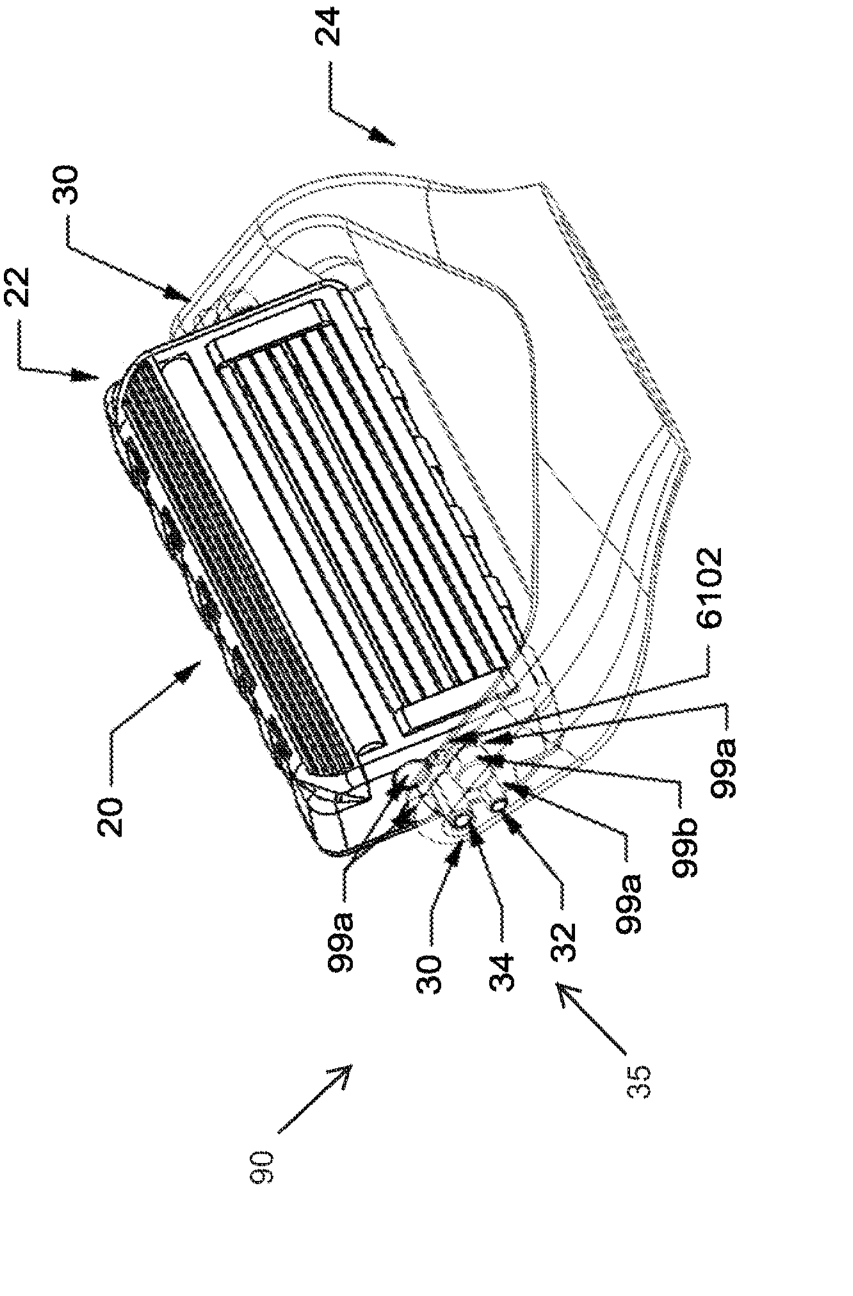
Figure 59B:
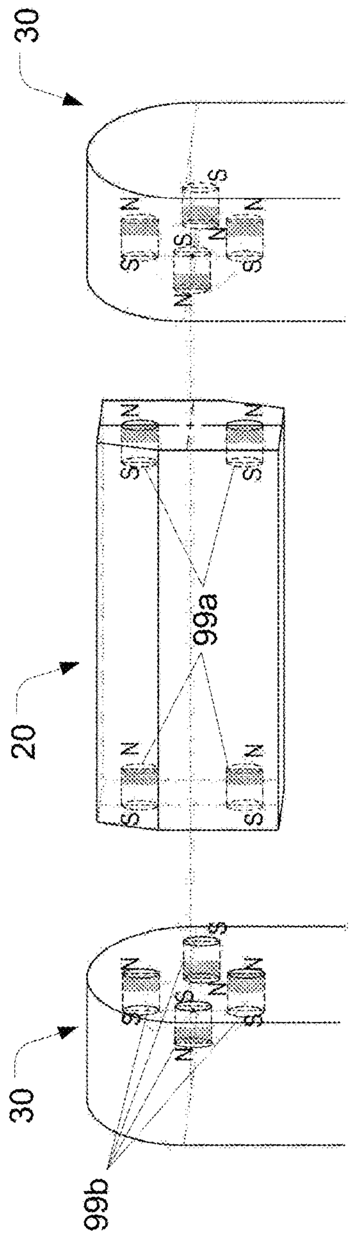
Figure 59C:
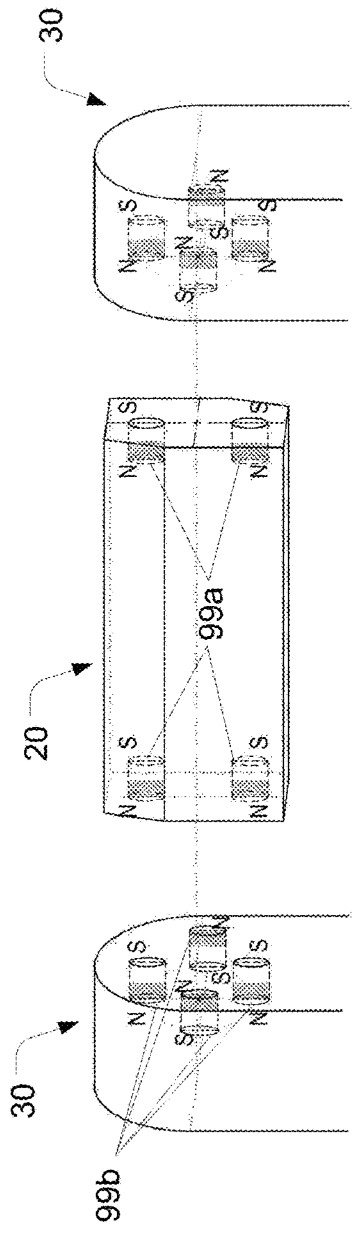
Figure 59D:
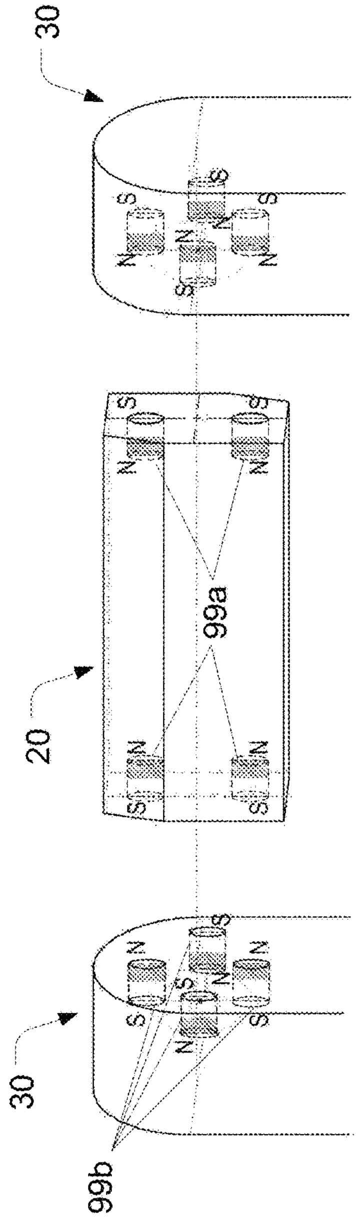
Figure 60:
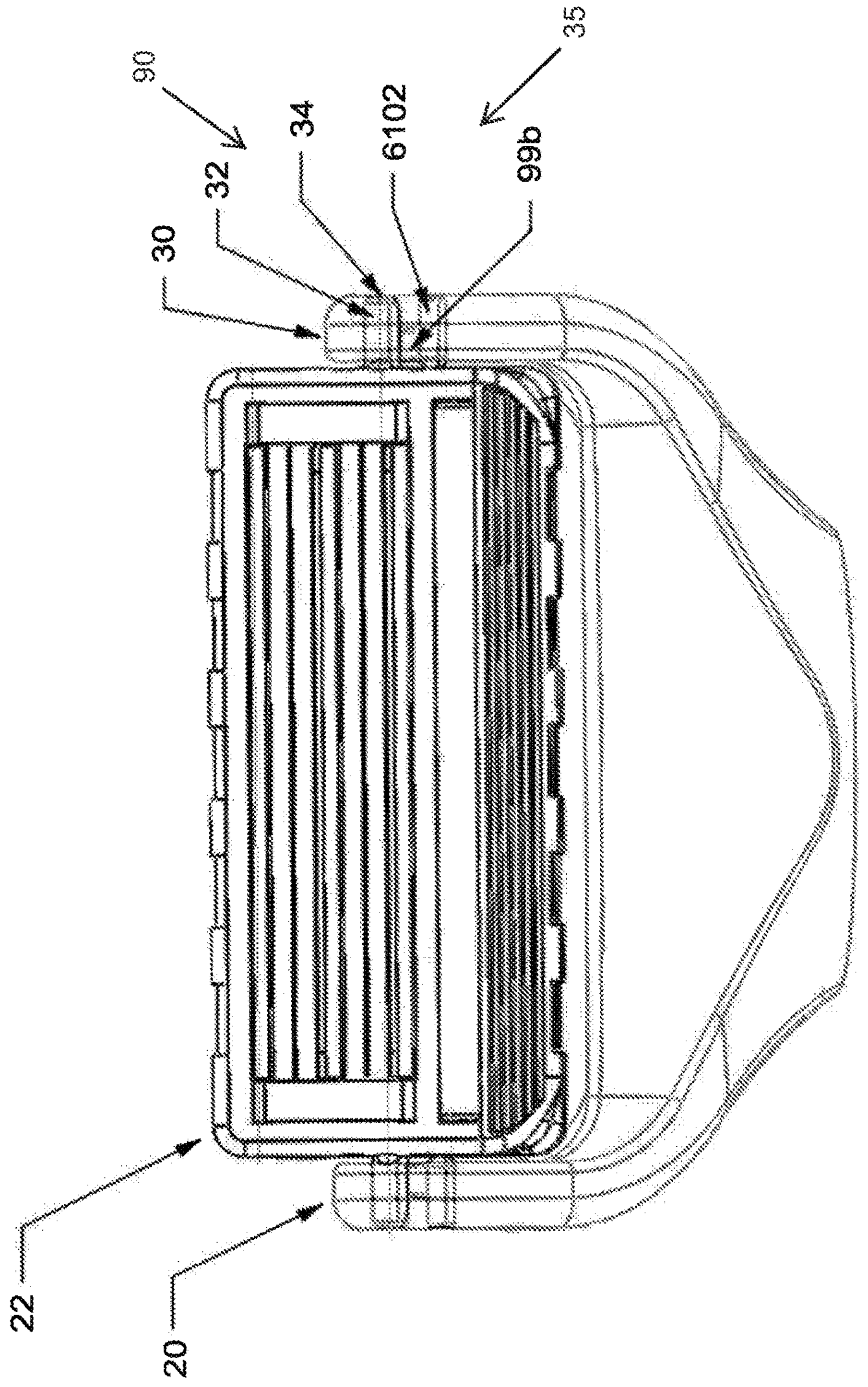
Figure 61:
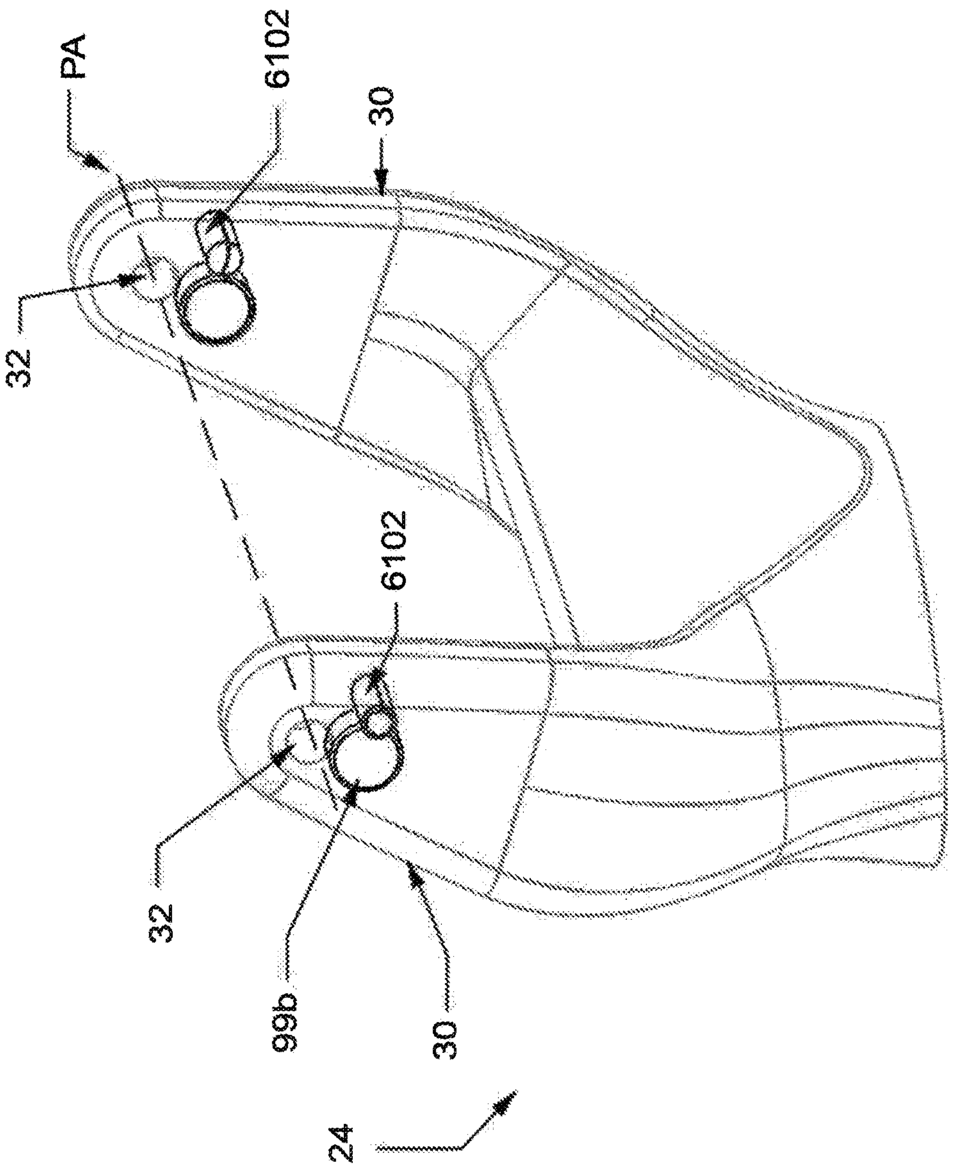
Figure 62:
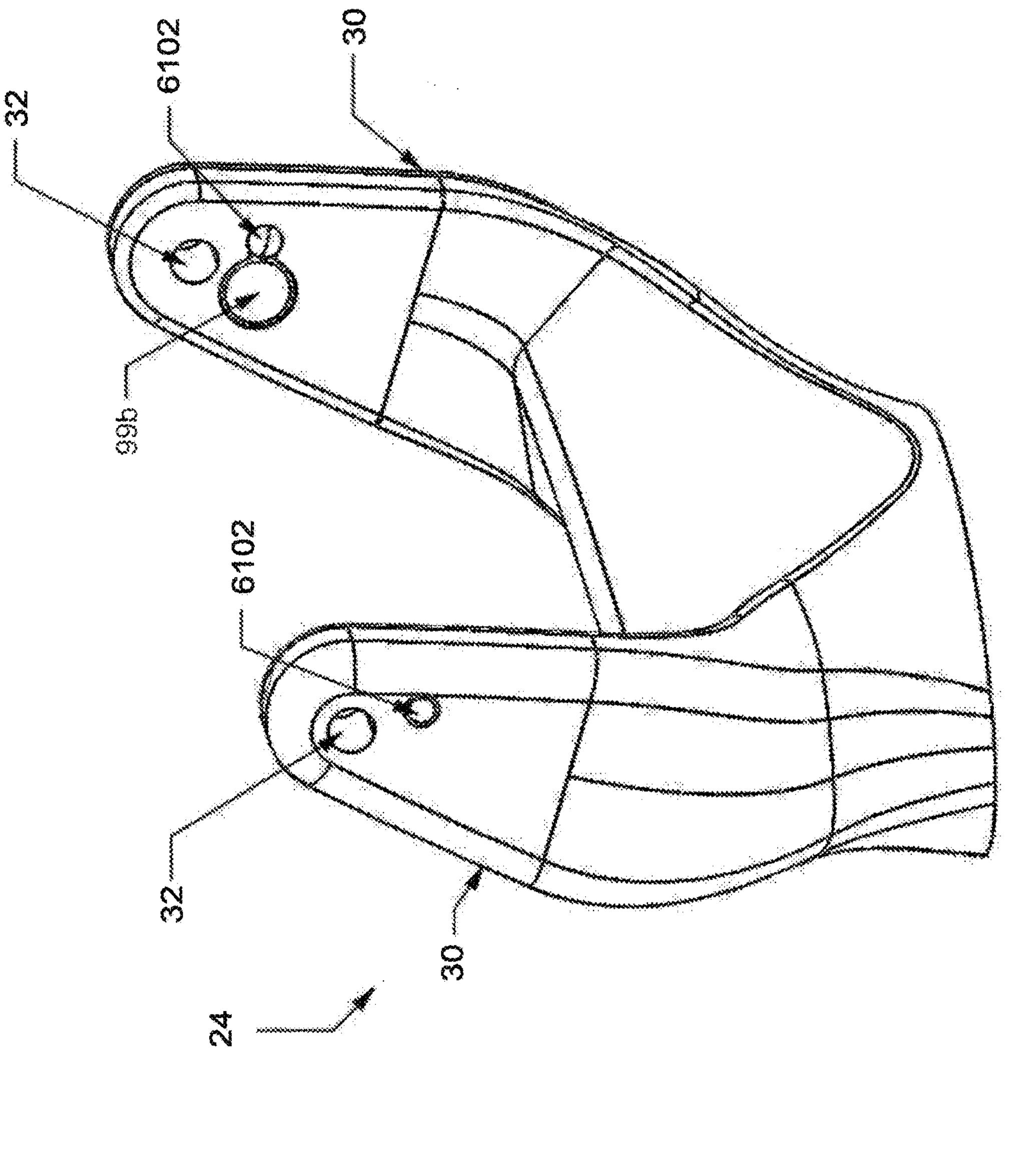
Figure 63:
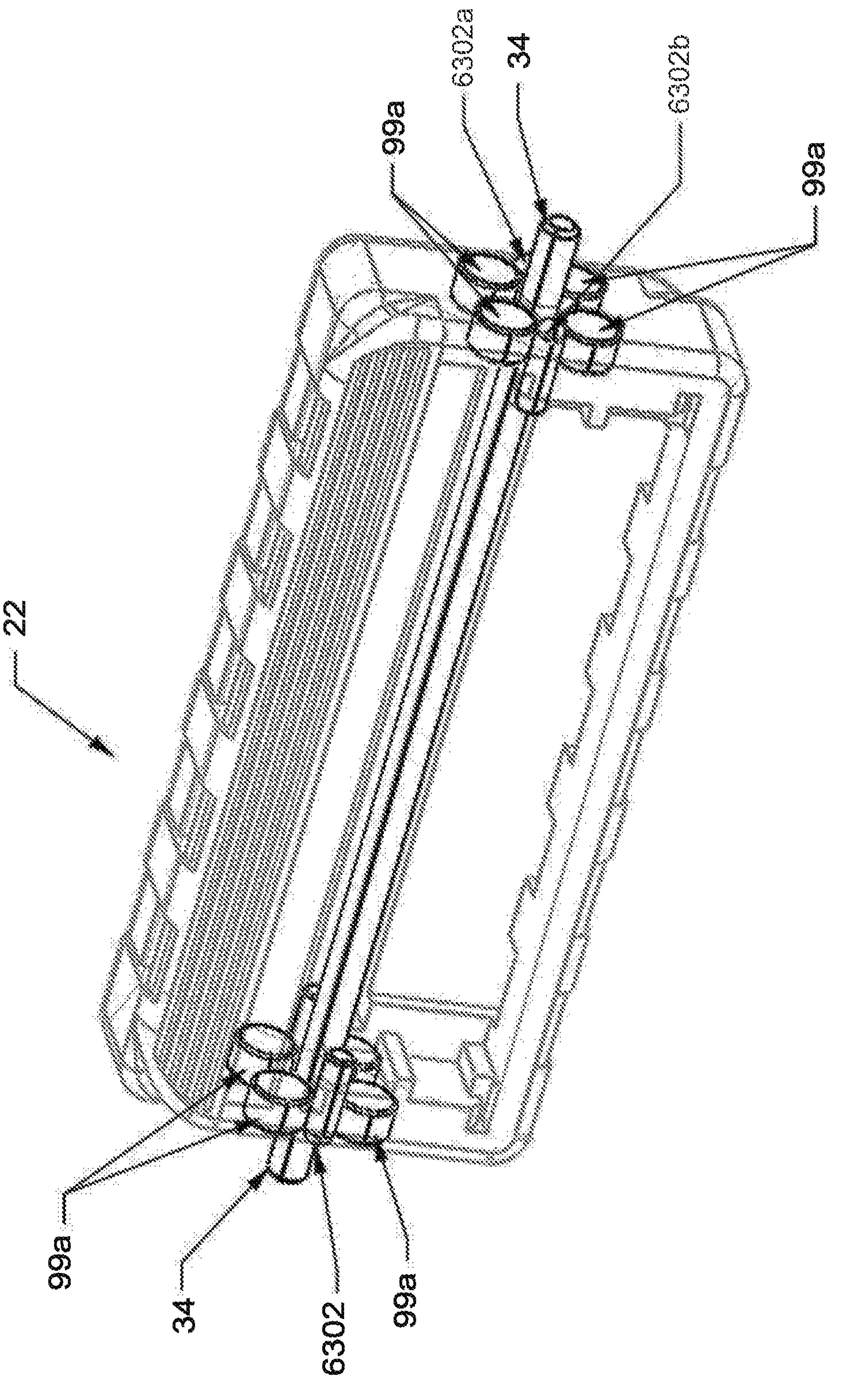
Figure 64:
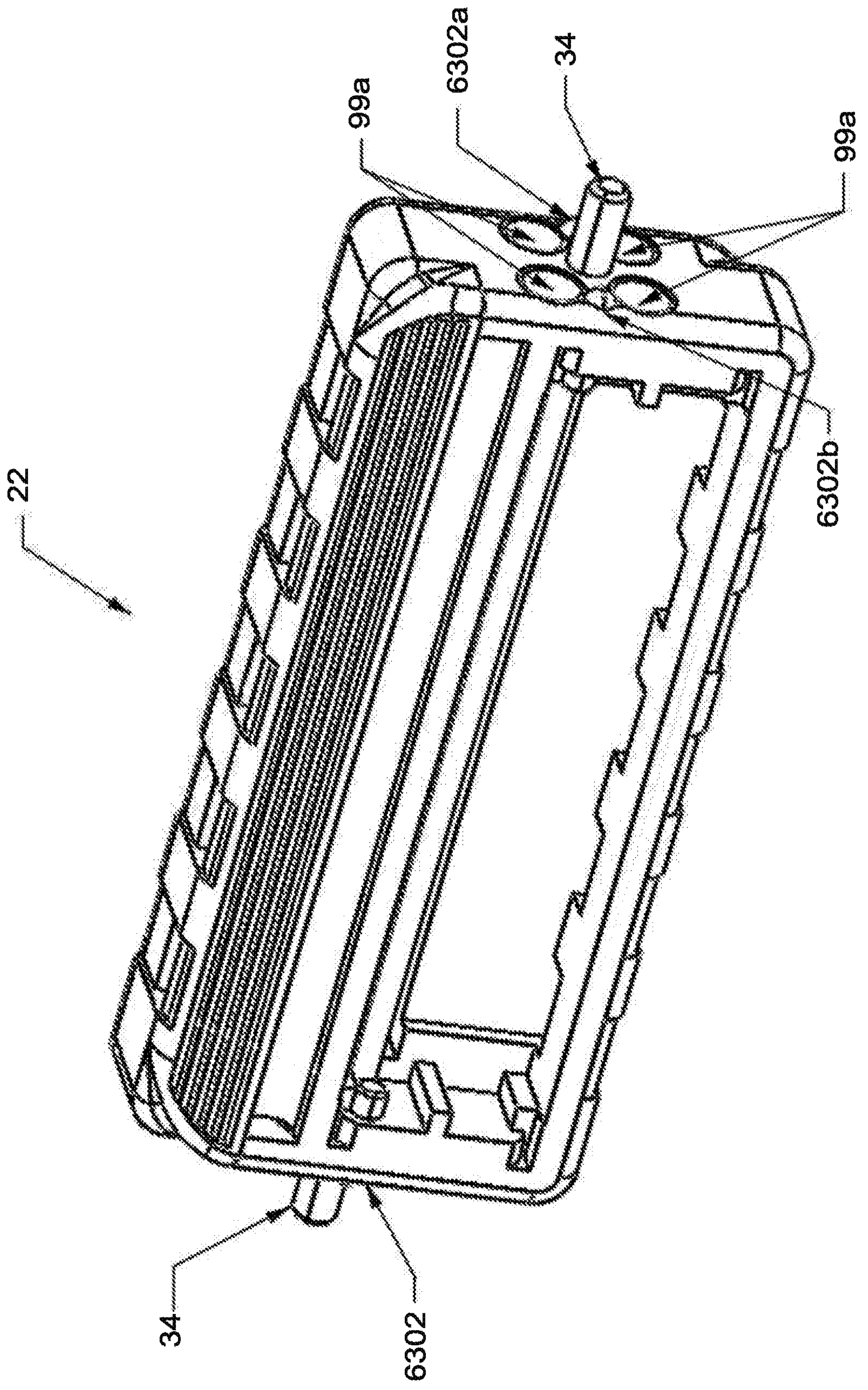
Figure 65:
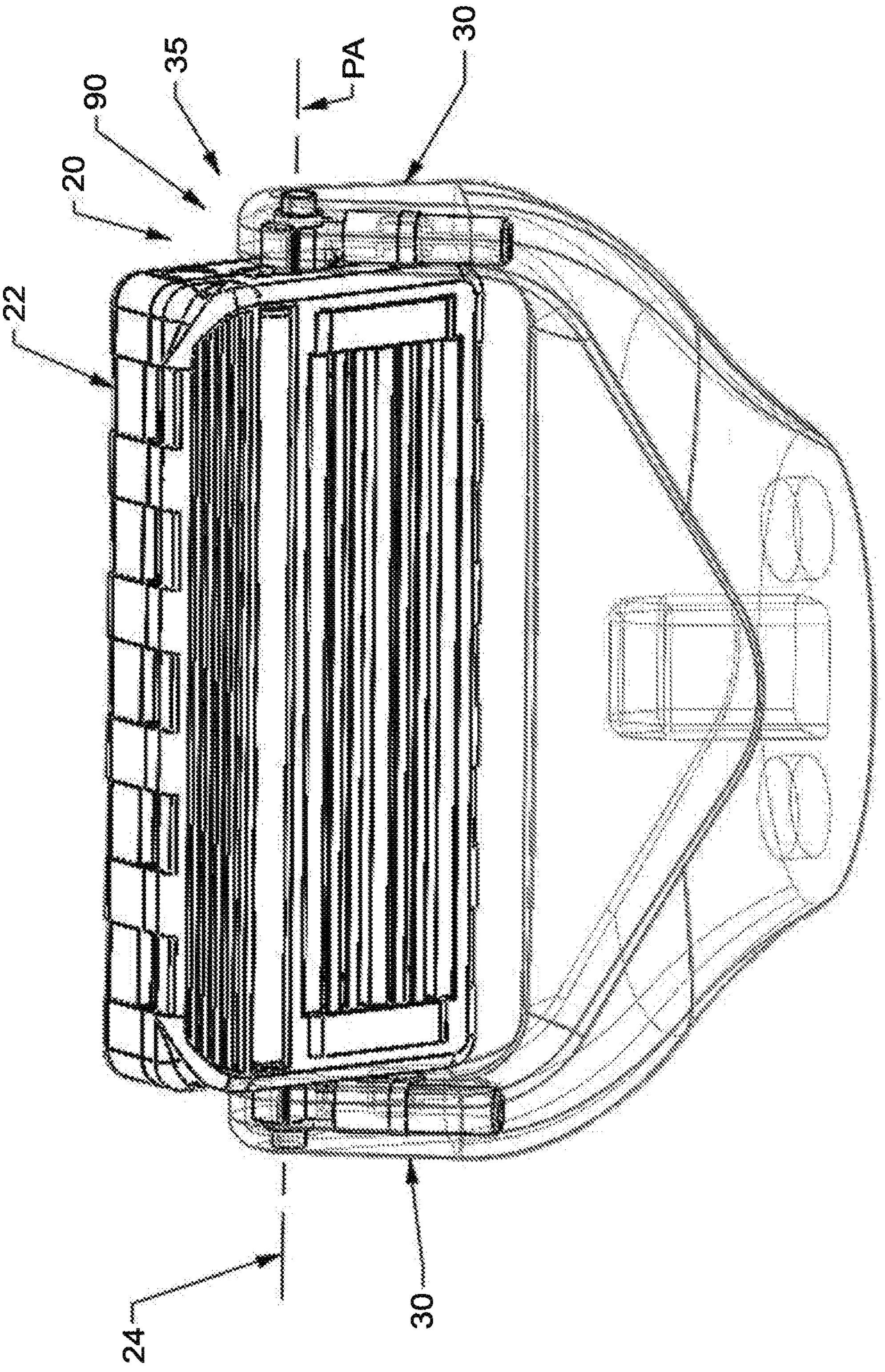
Figure 66:
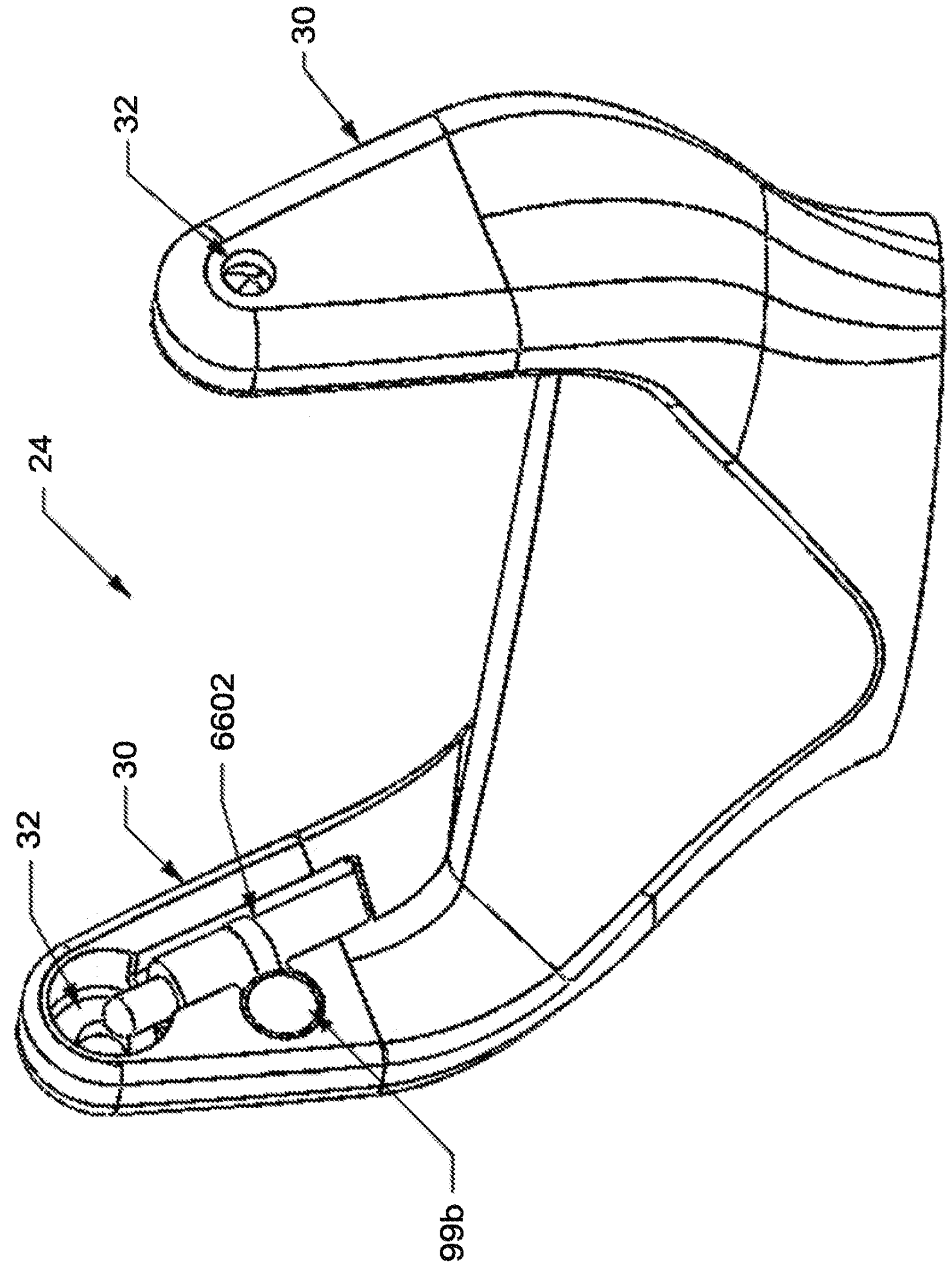
Figure 67:
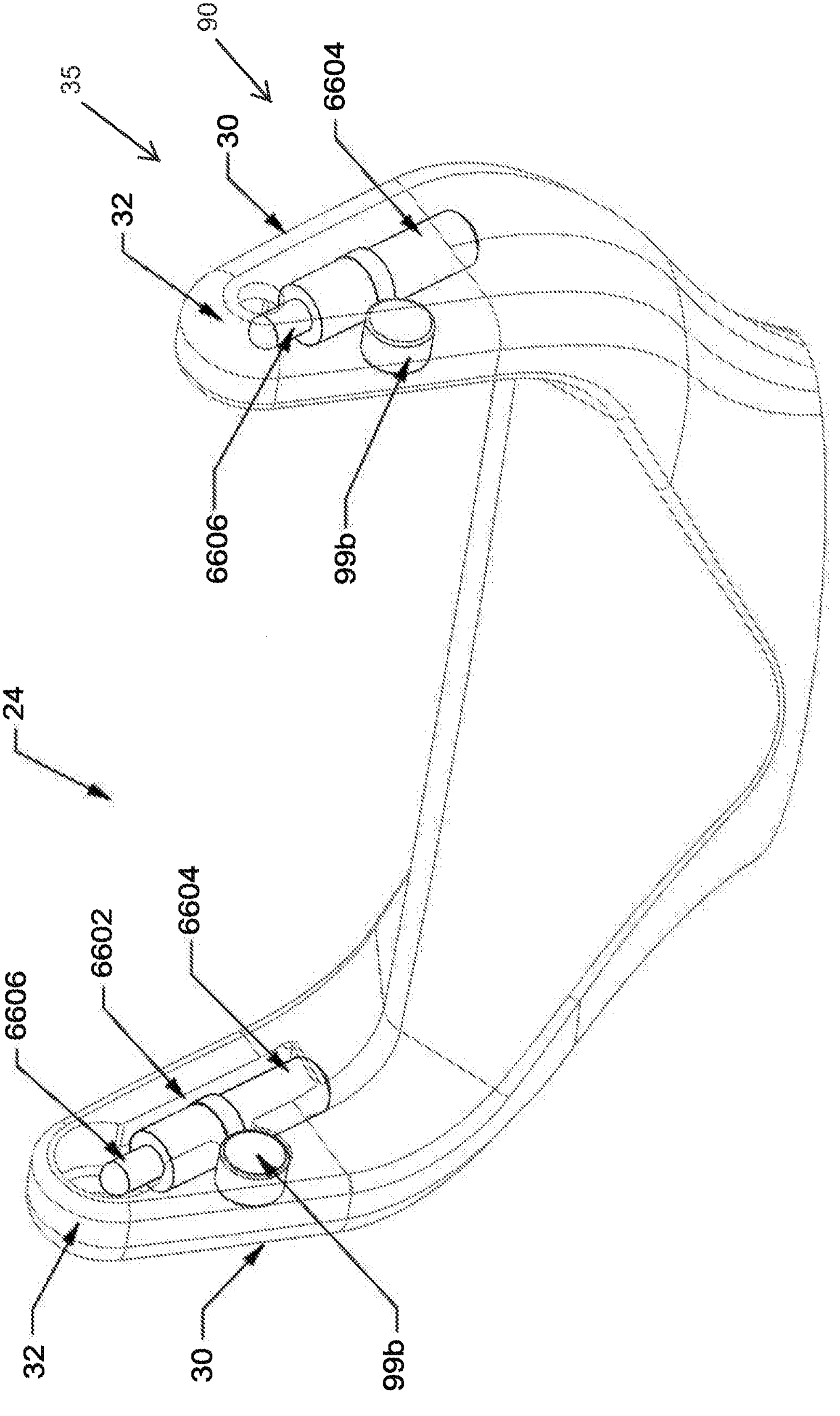
Figure 68:
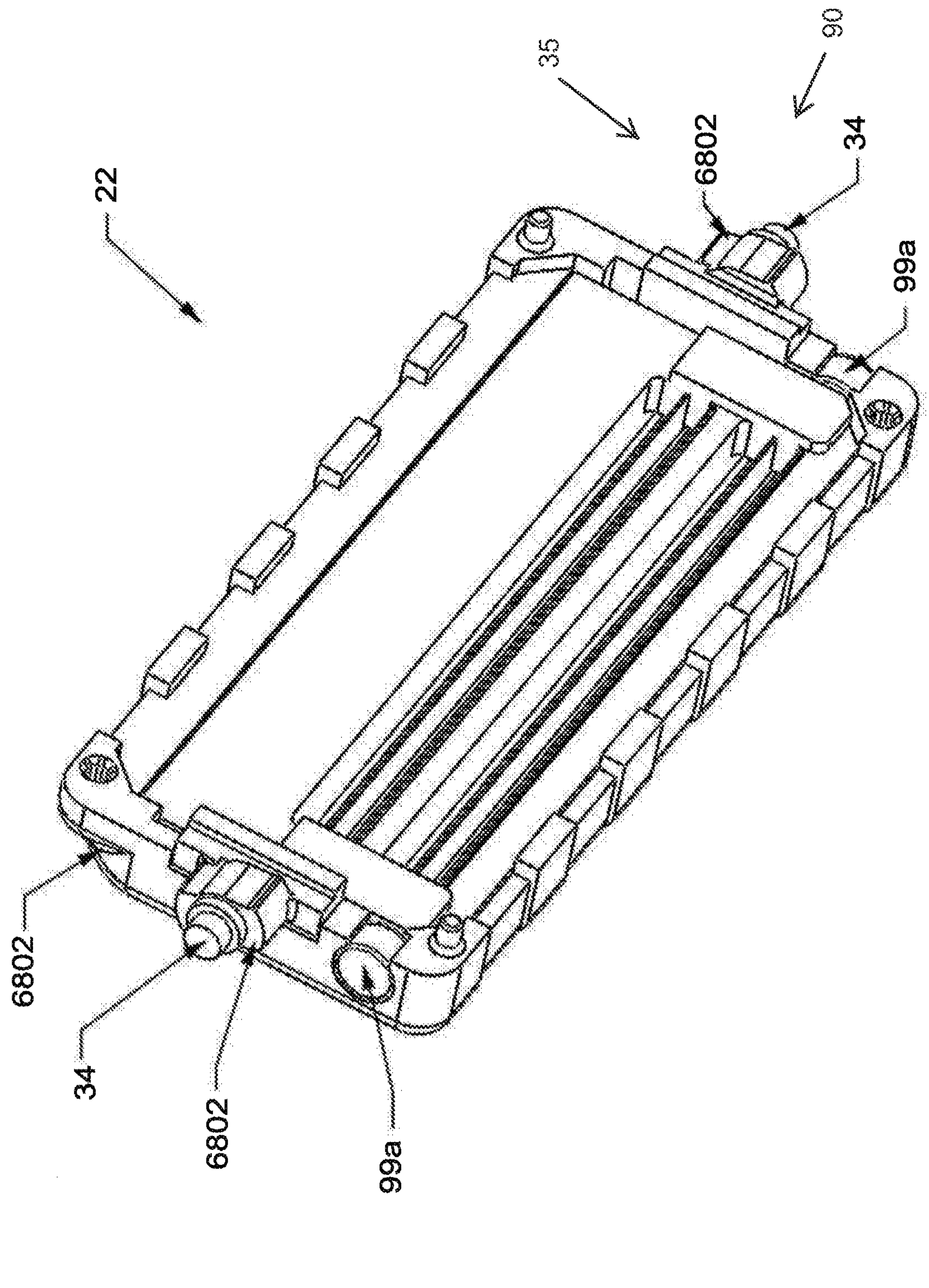
Figure 69:
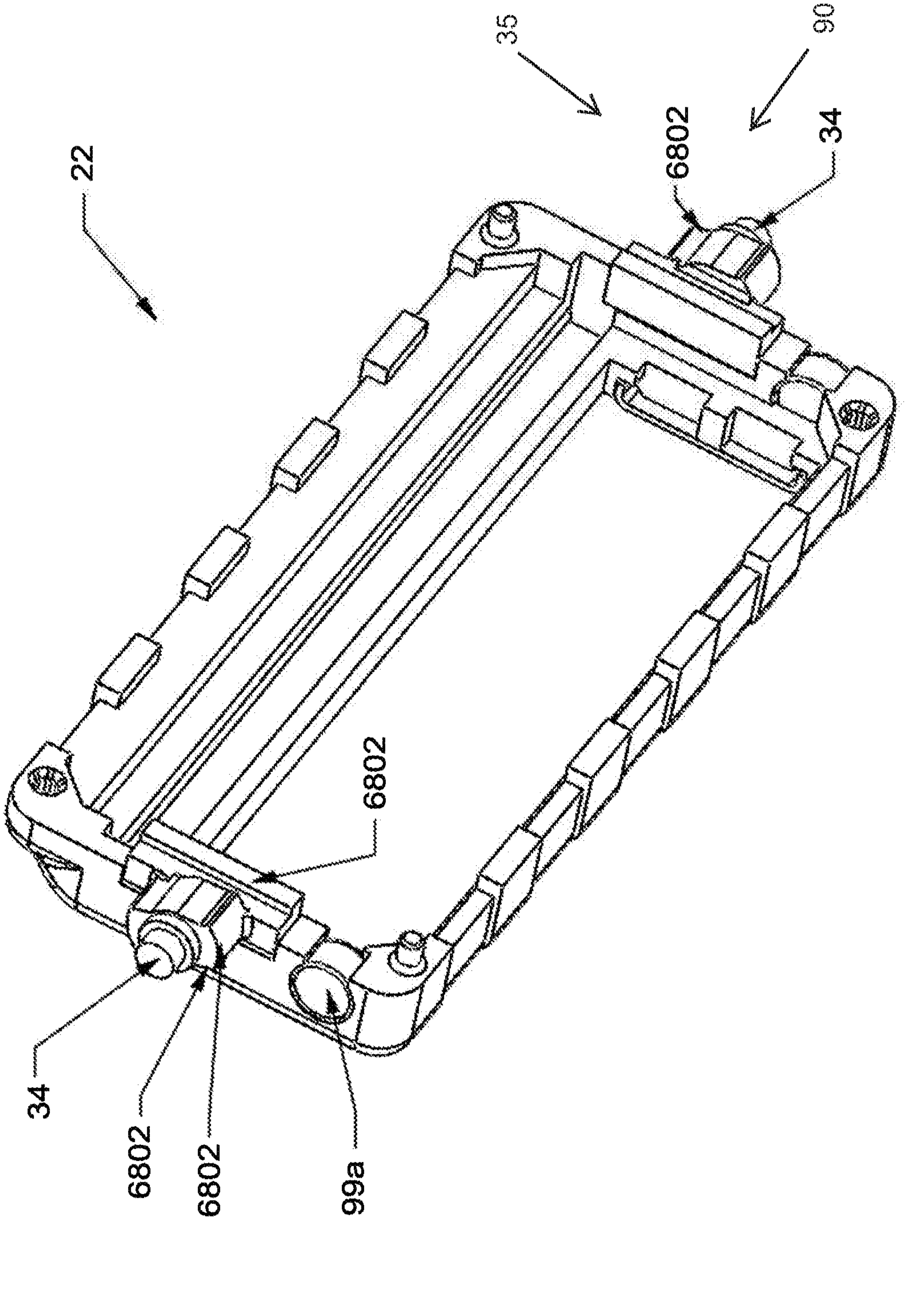
Figure 70:
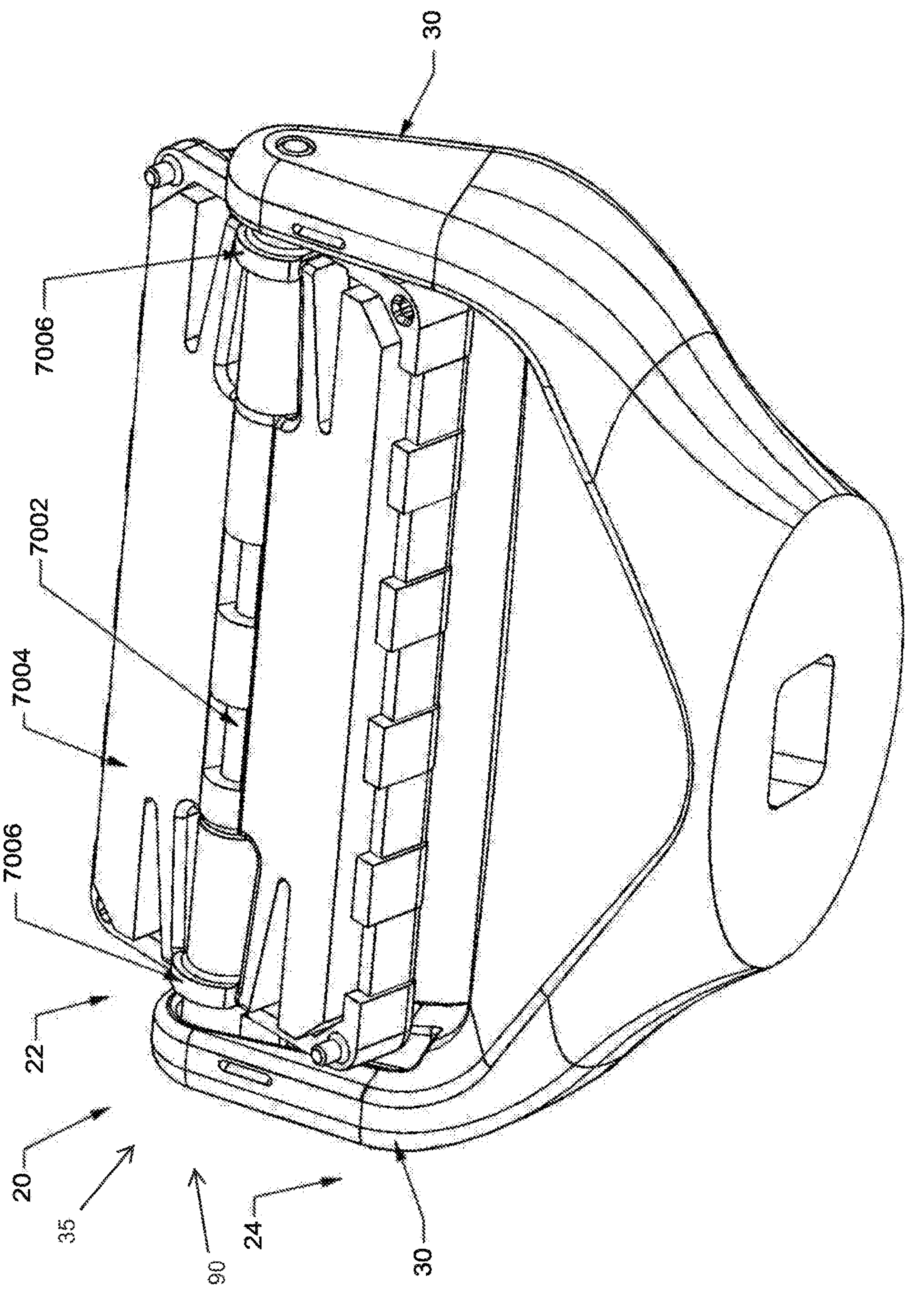
Figure 71:
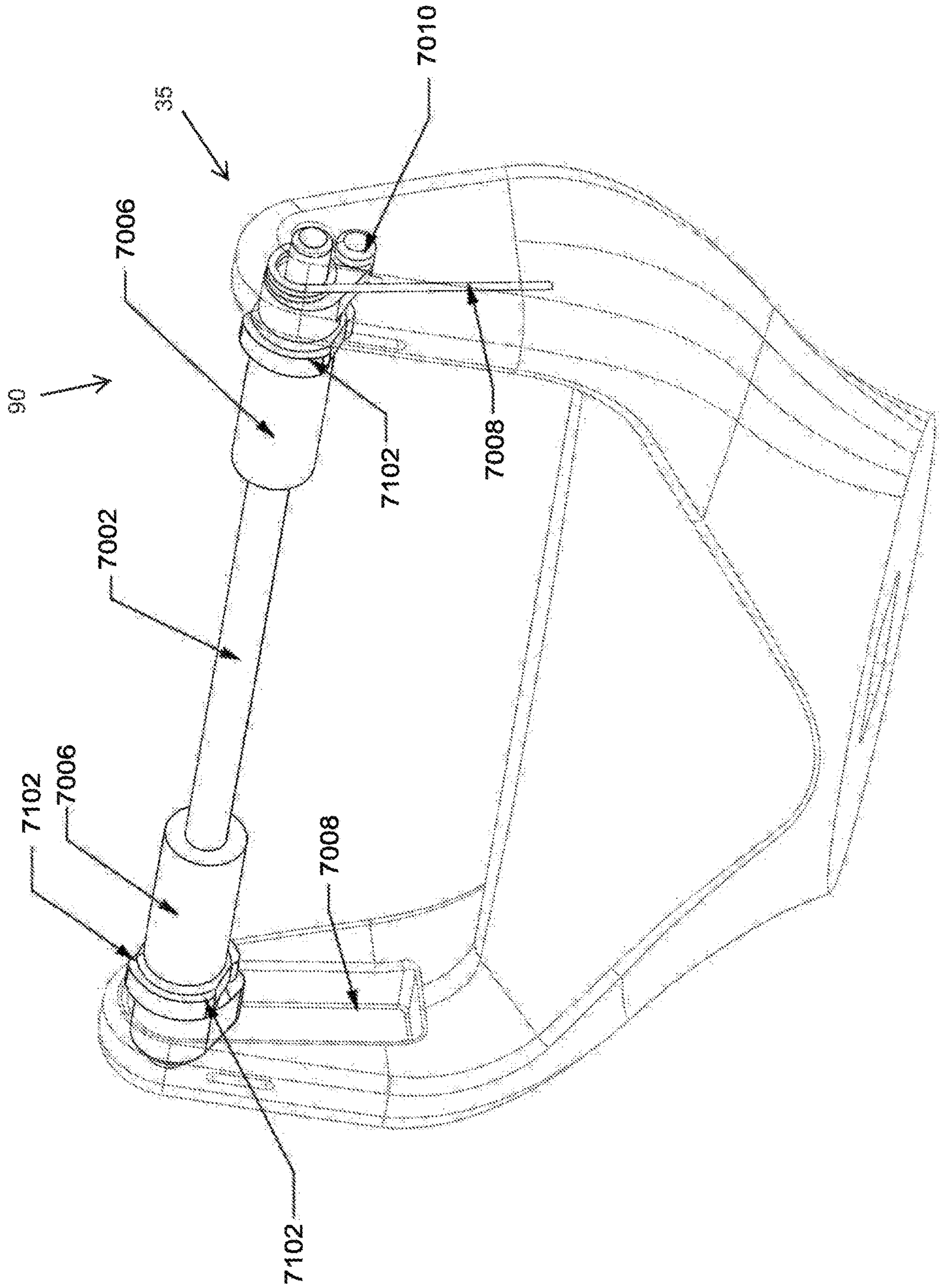
Figure 72:
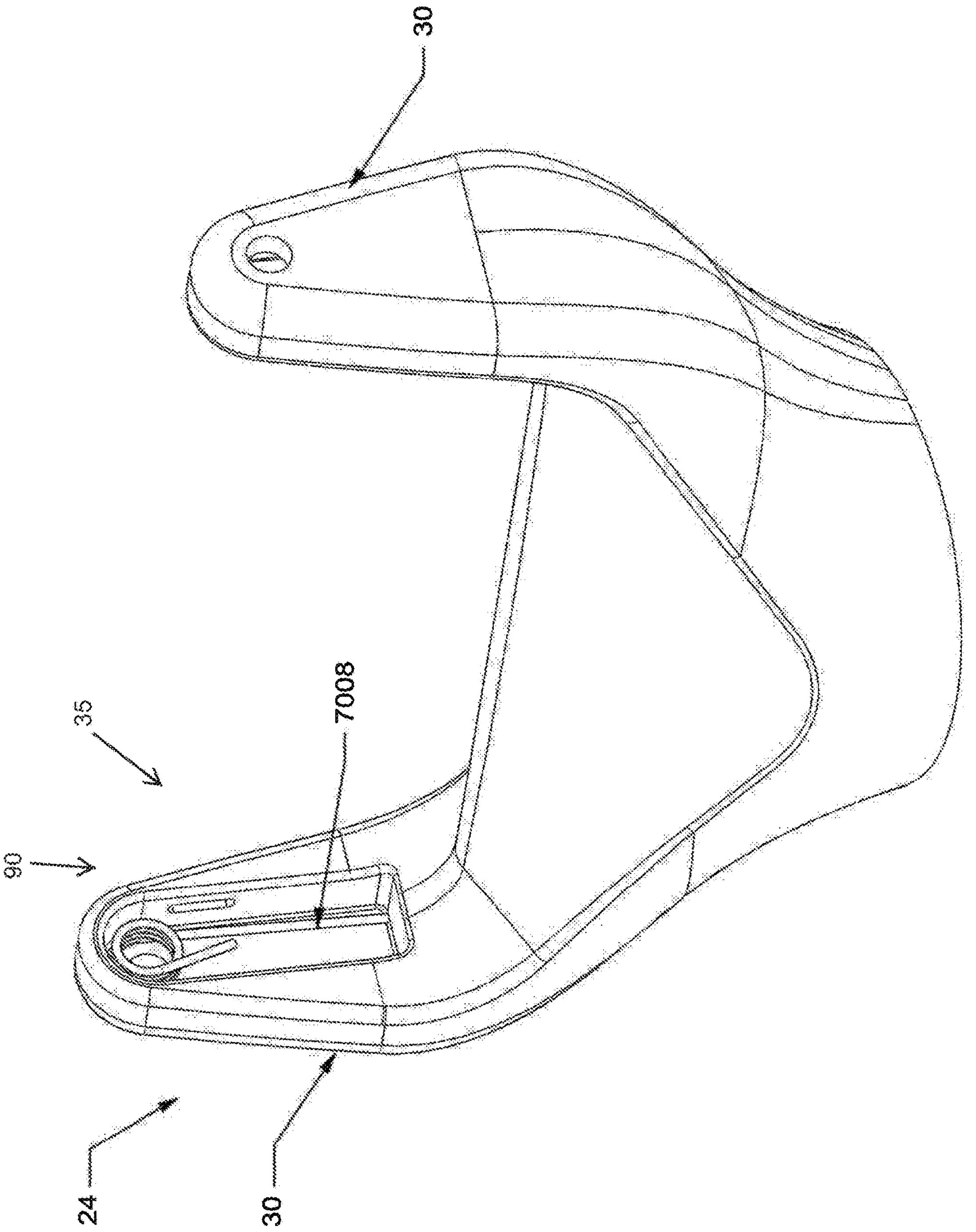
Figure 73:
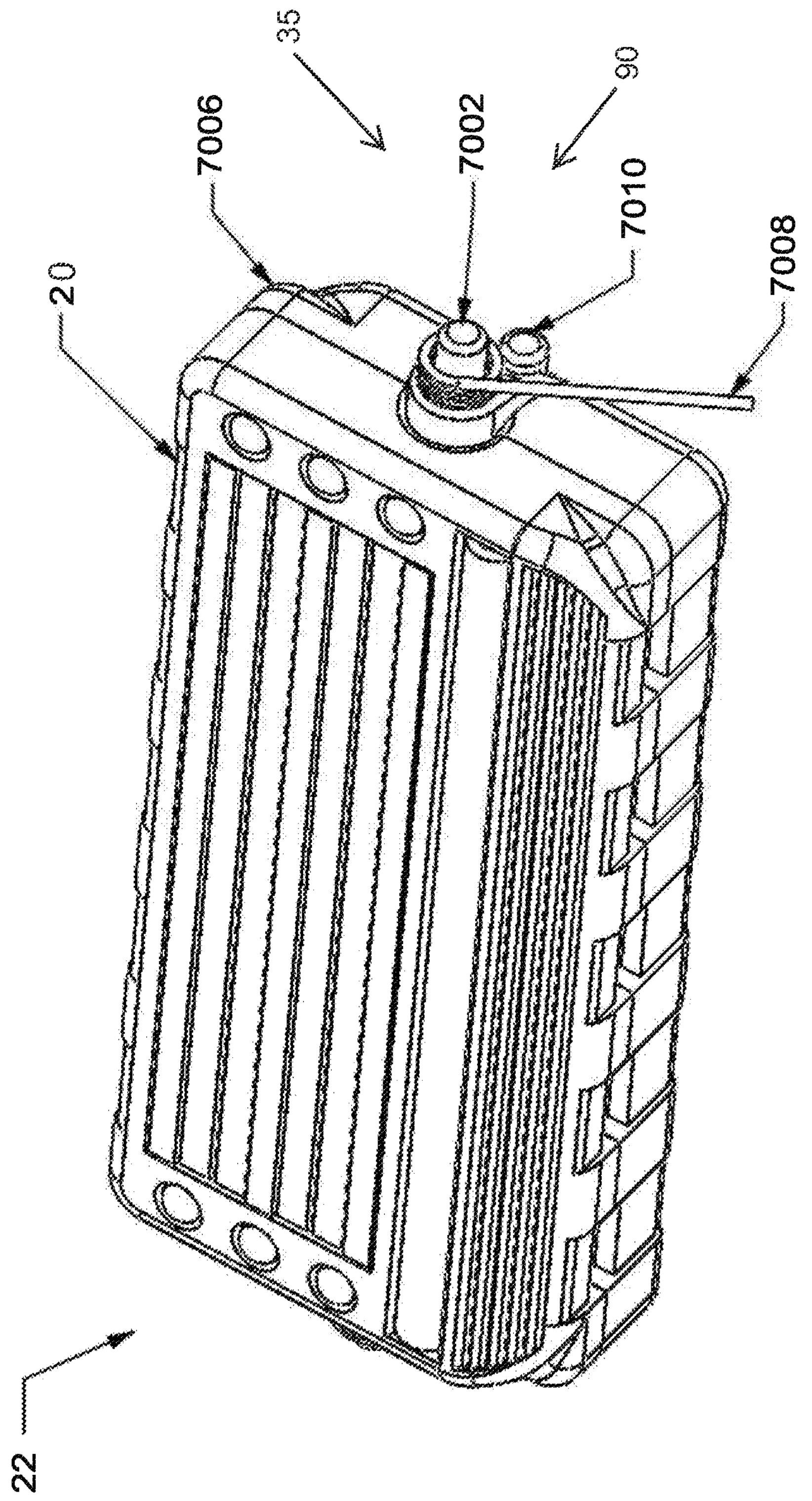
Figure 74:
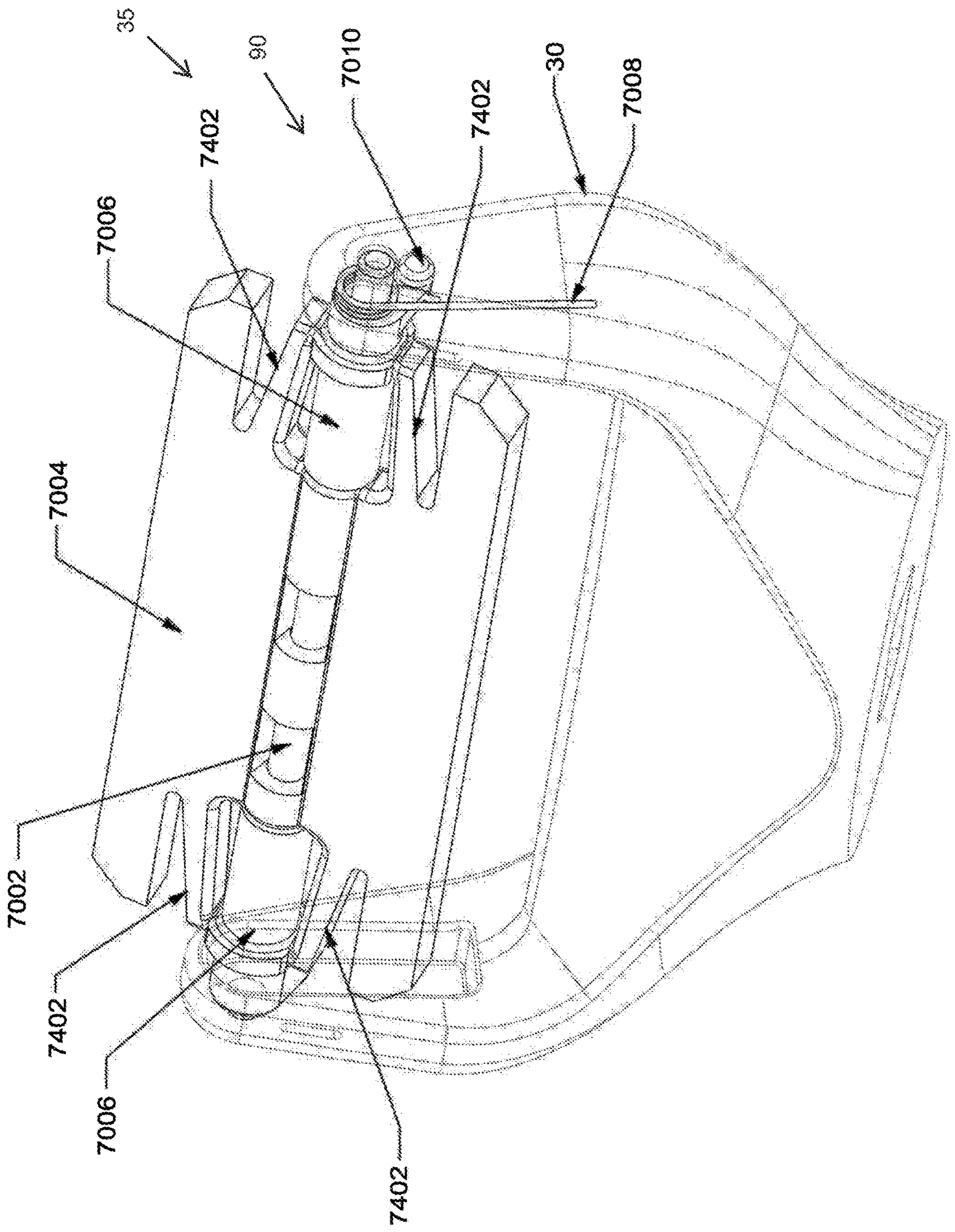
Figure 75:
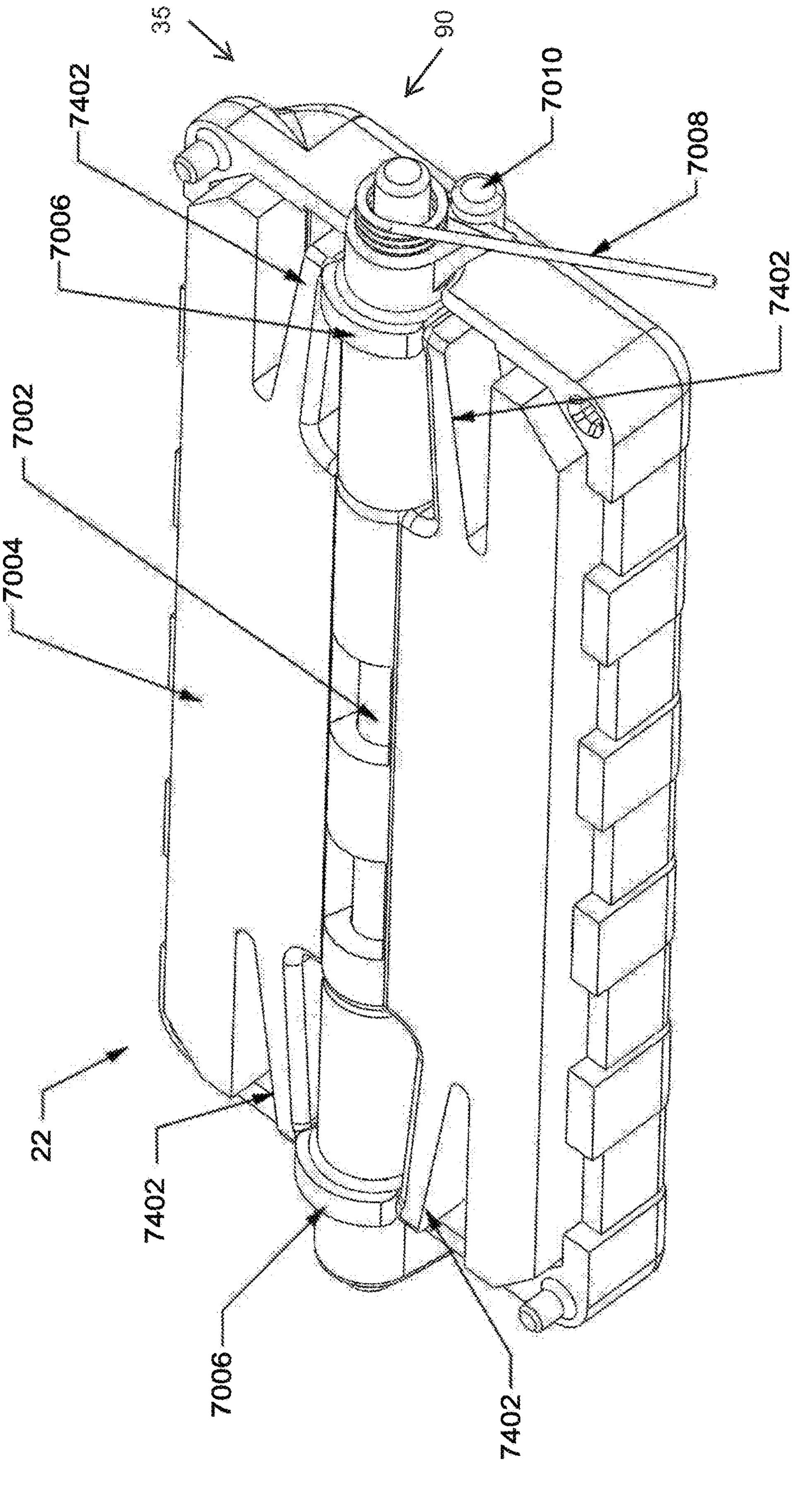
Figure 76:
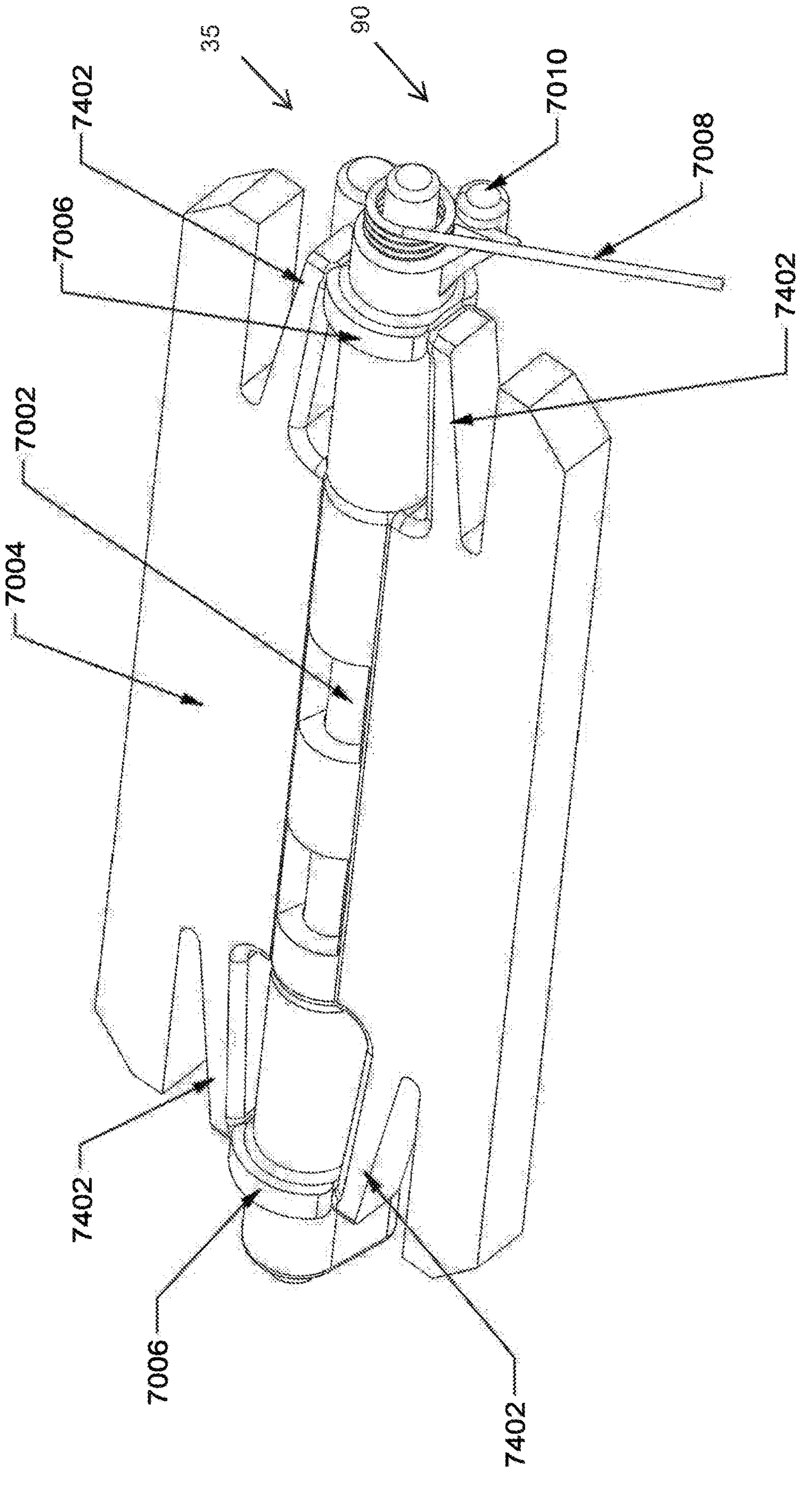
Figure 77:
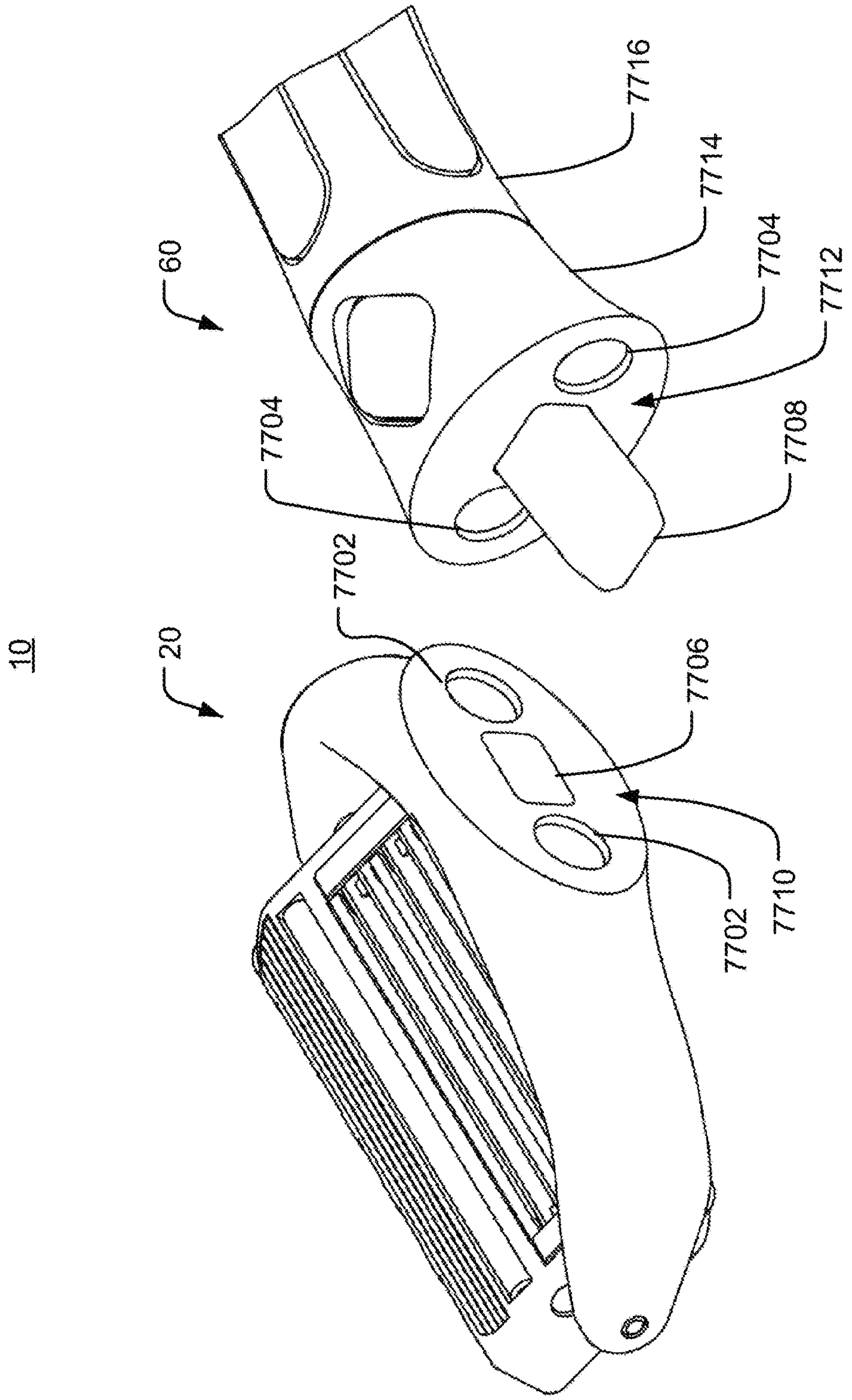
Figure 78:
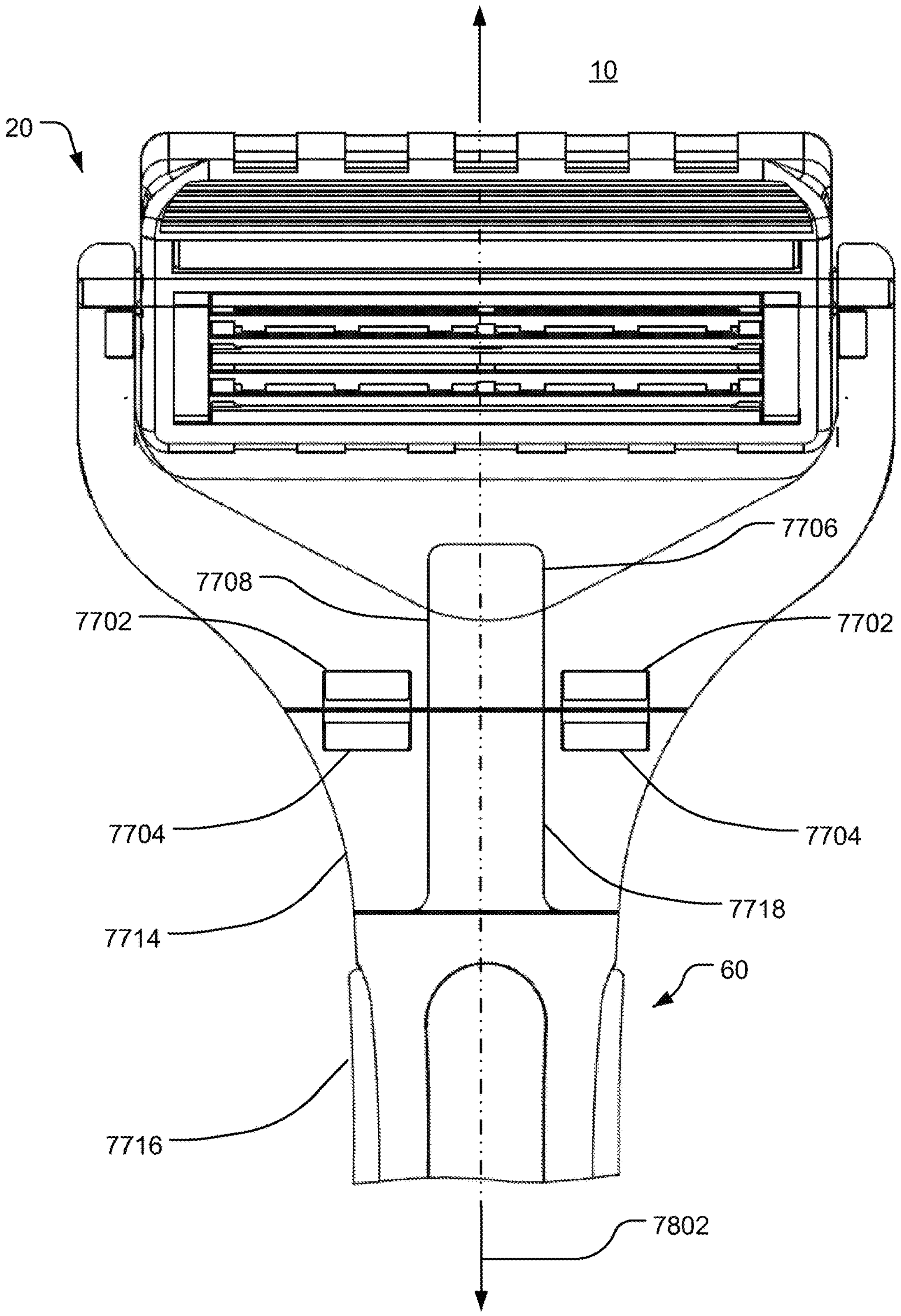
Figure 79:
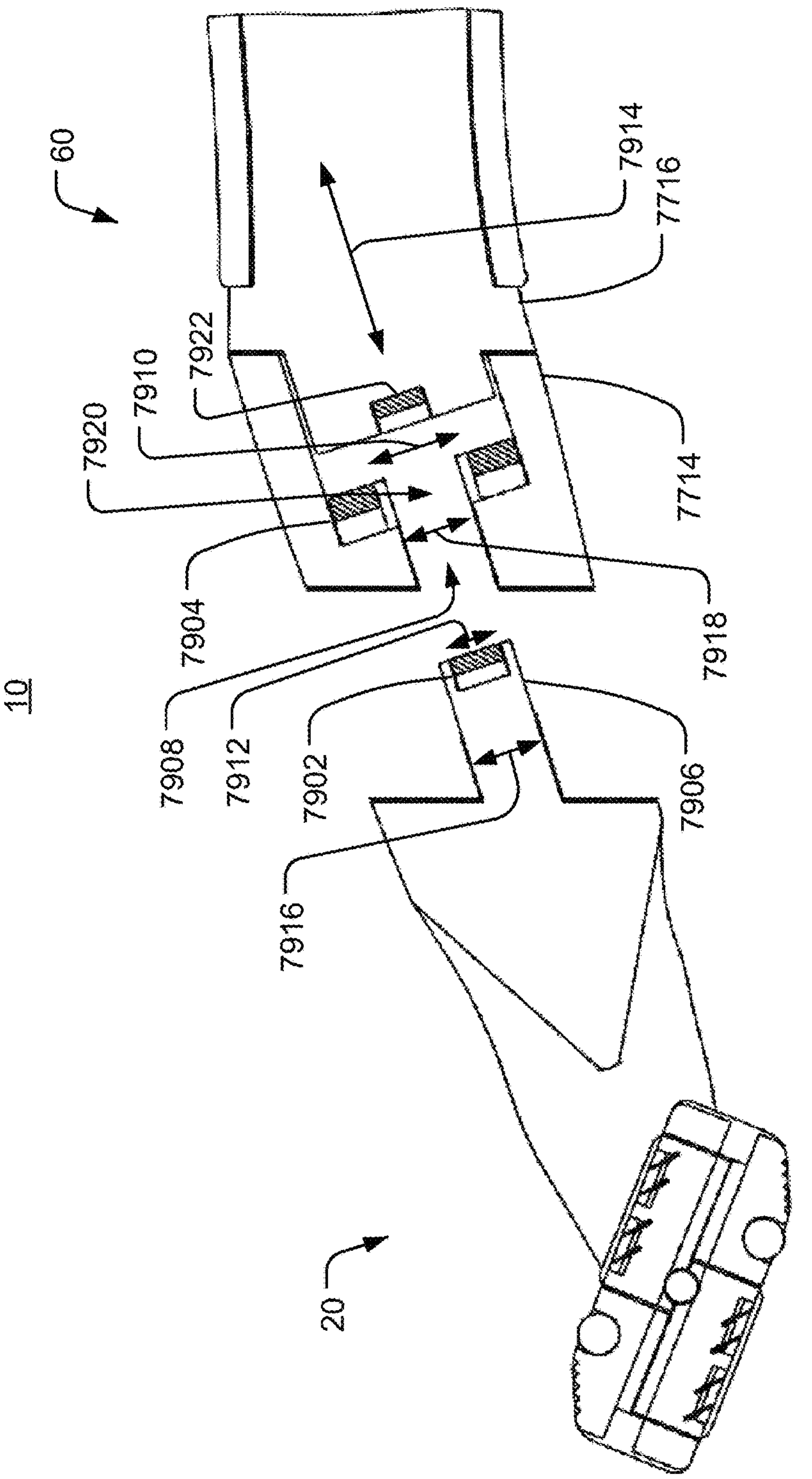
Figure 80:
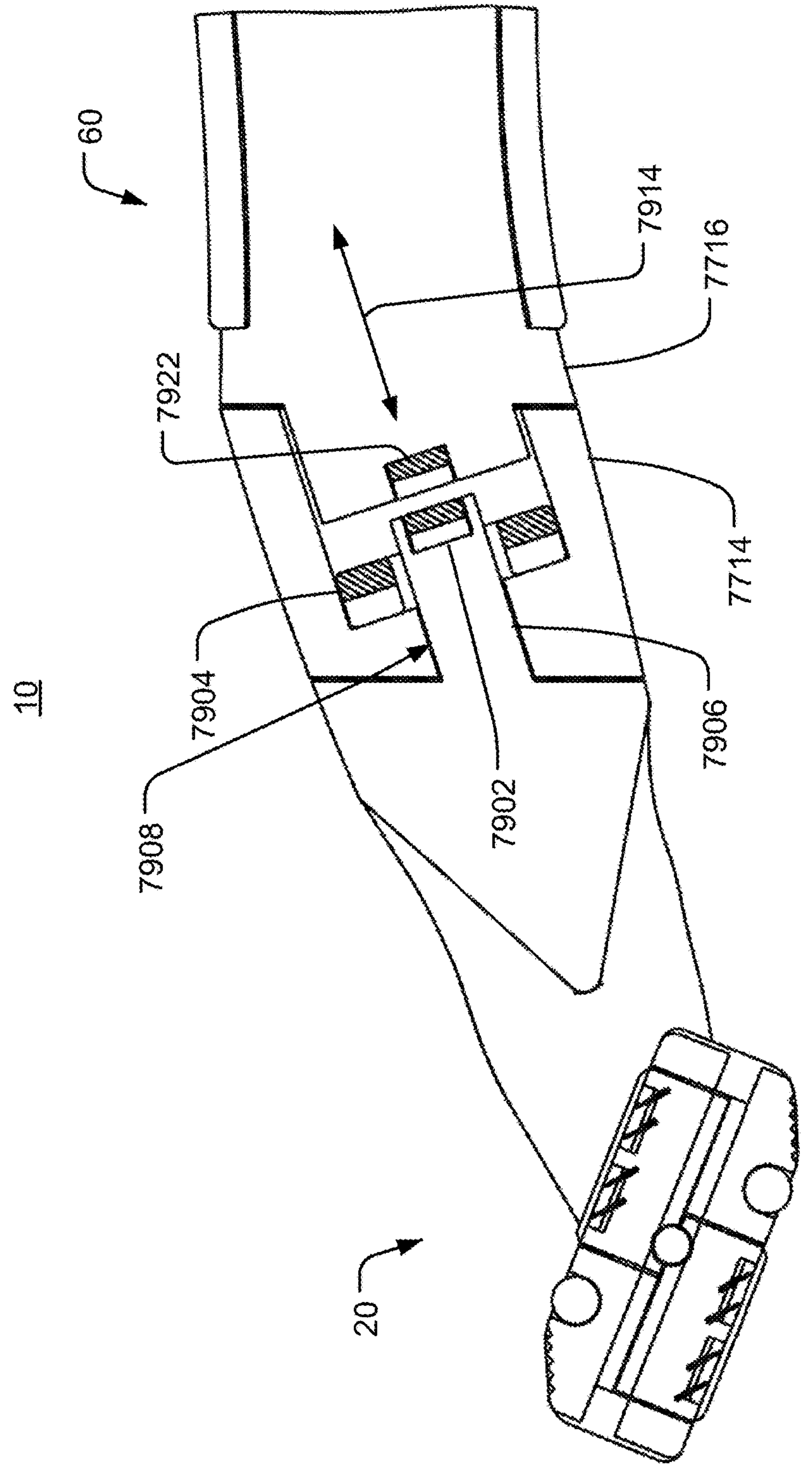
Figure 81A:
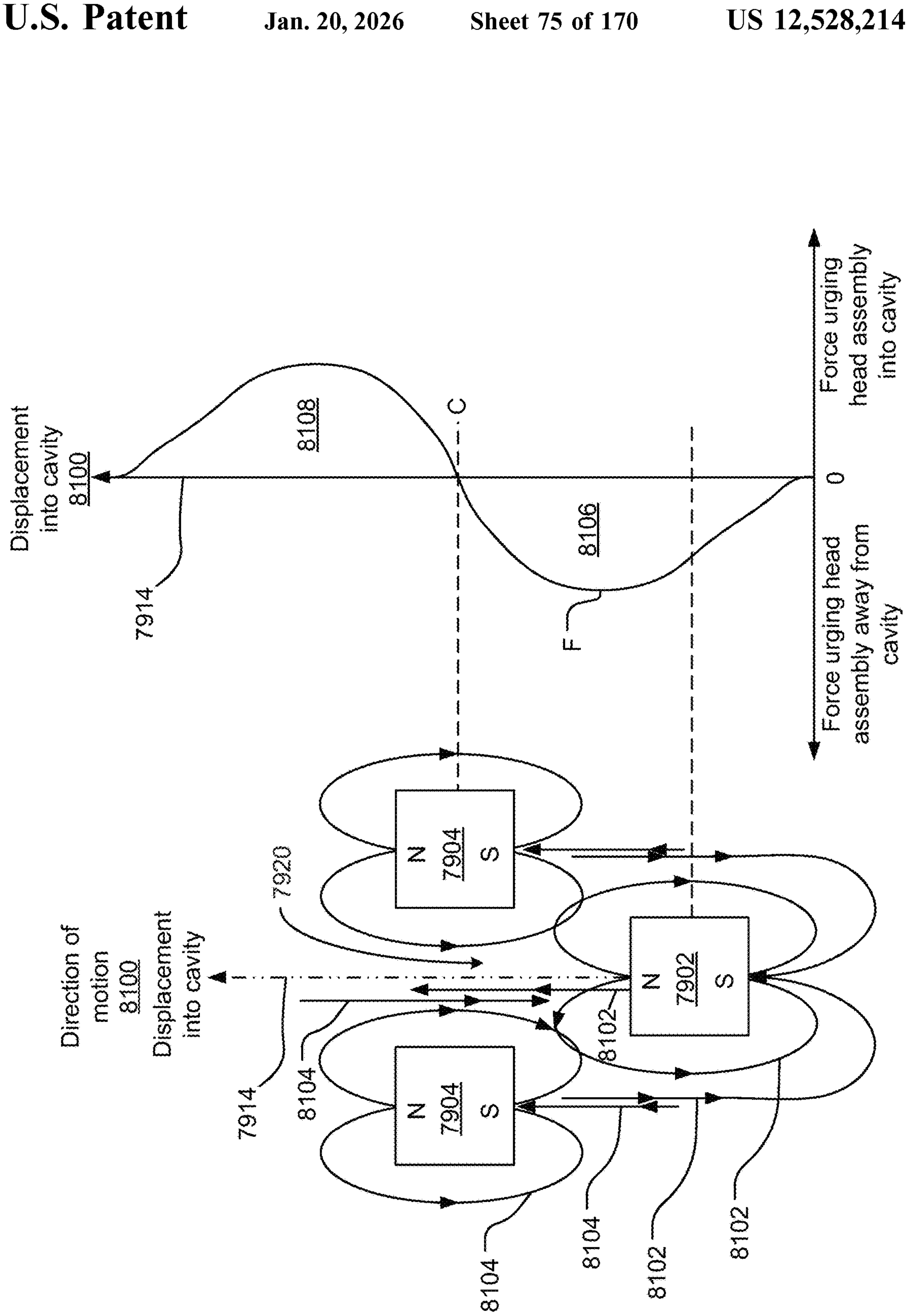
Figure 81B:
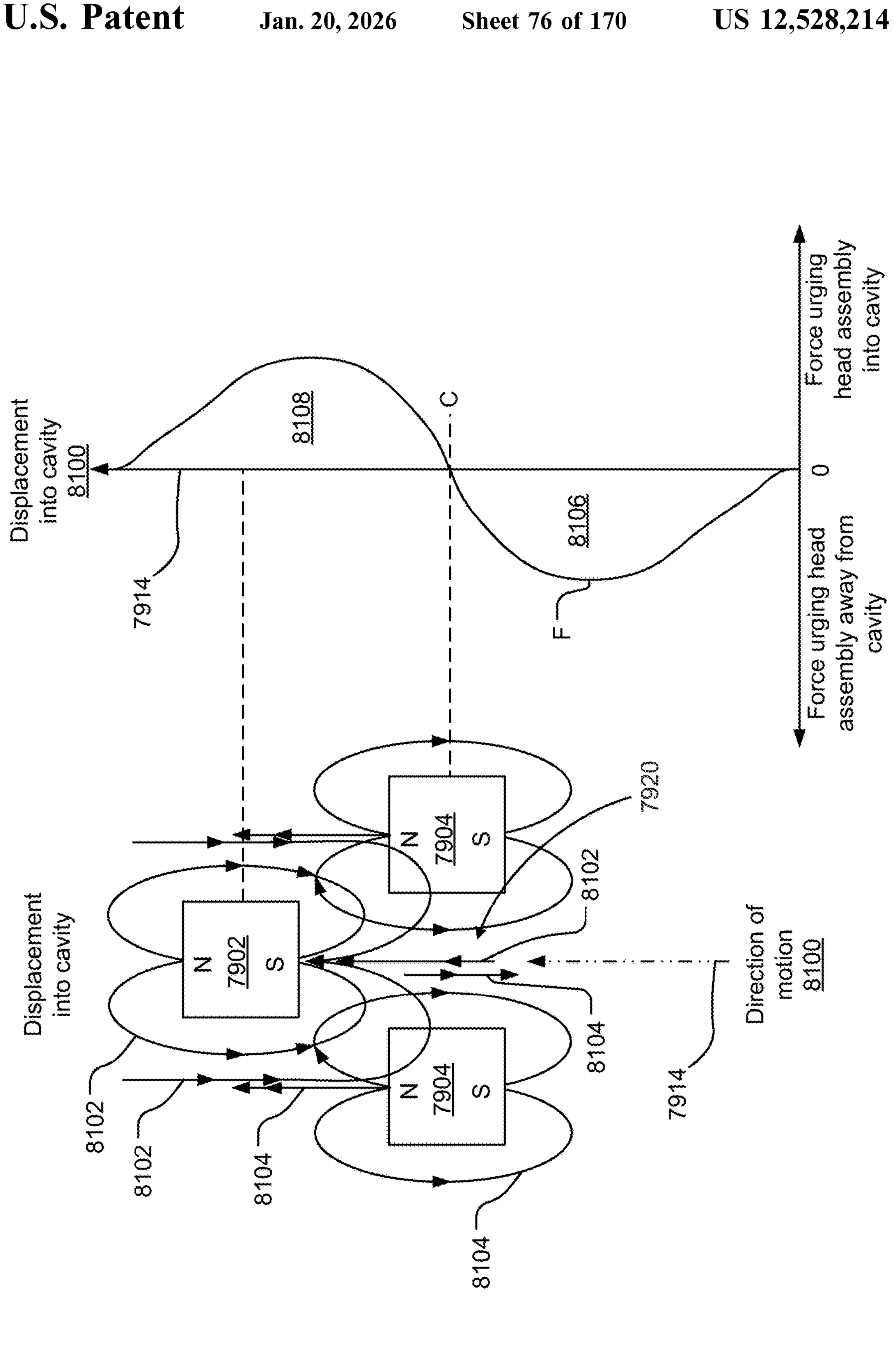
Figure 82:
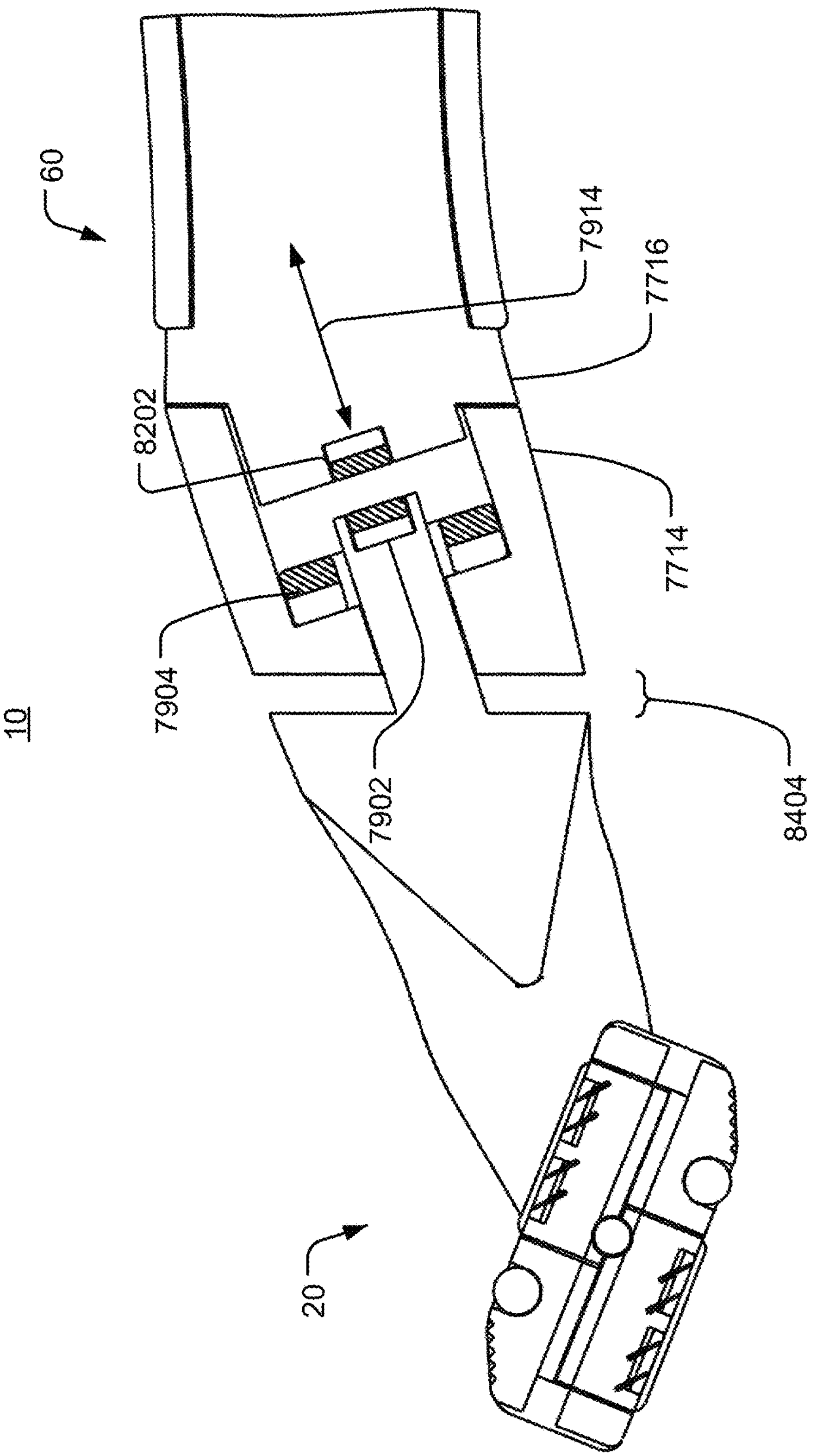
Figure 83:
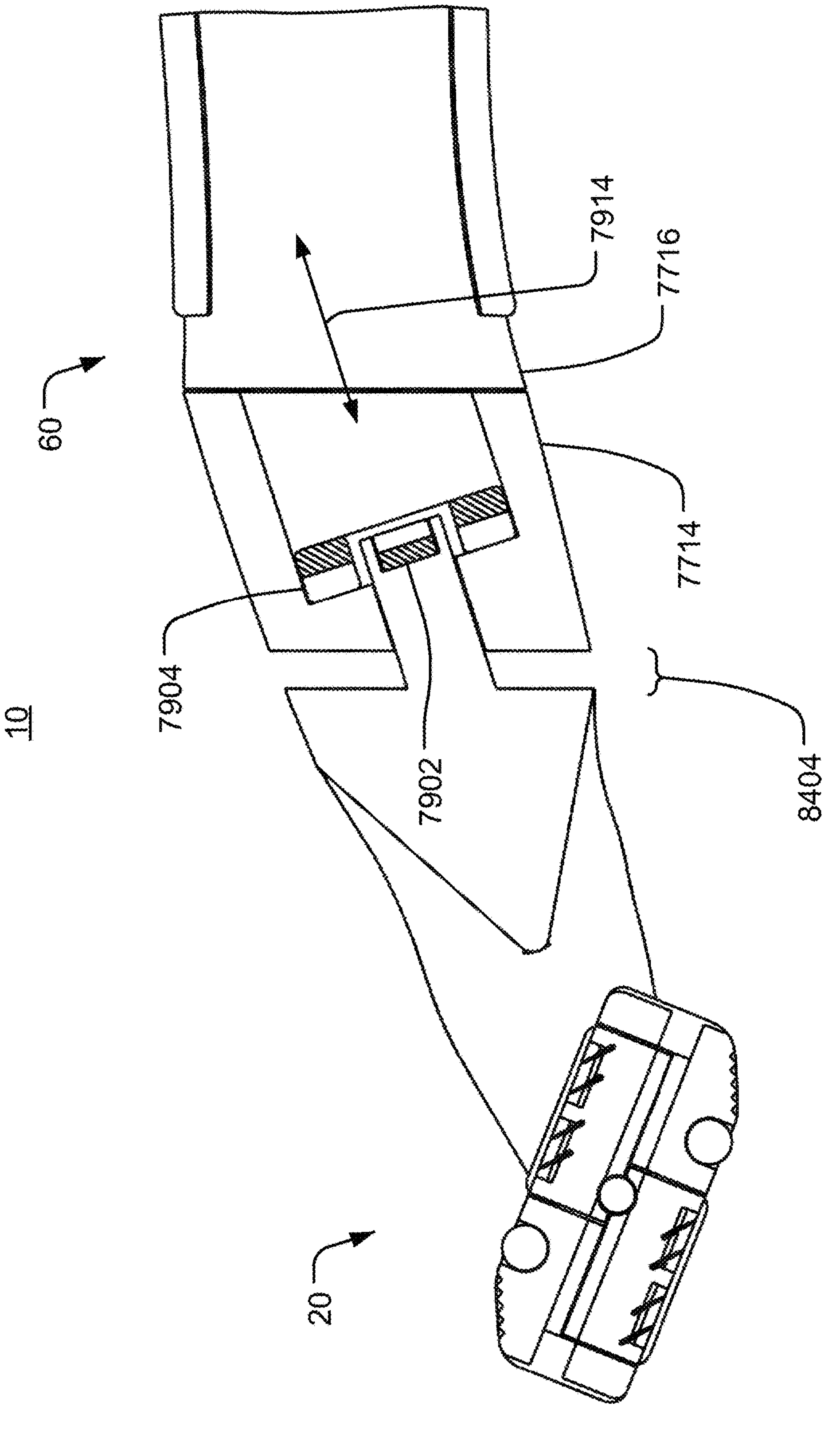
Figure 84:
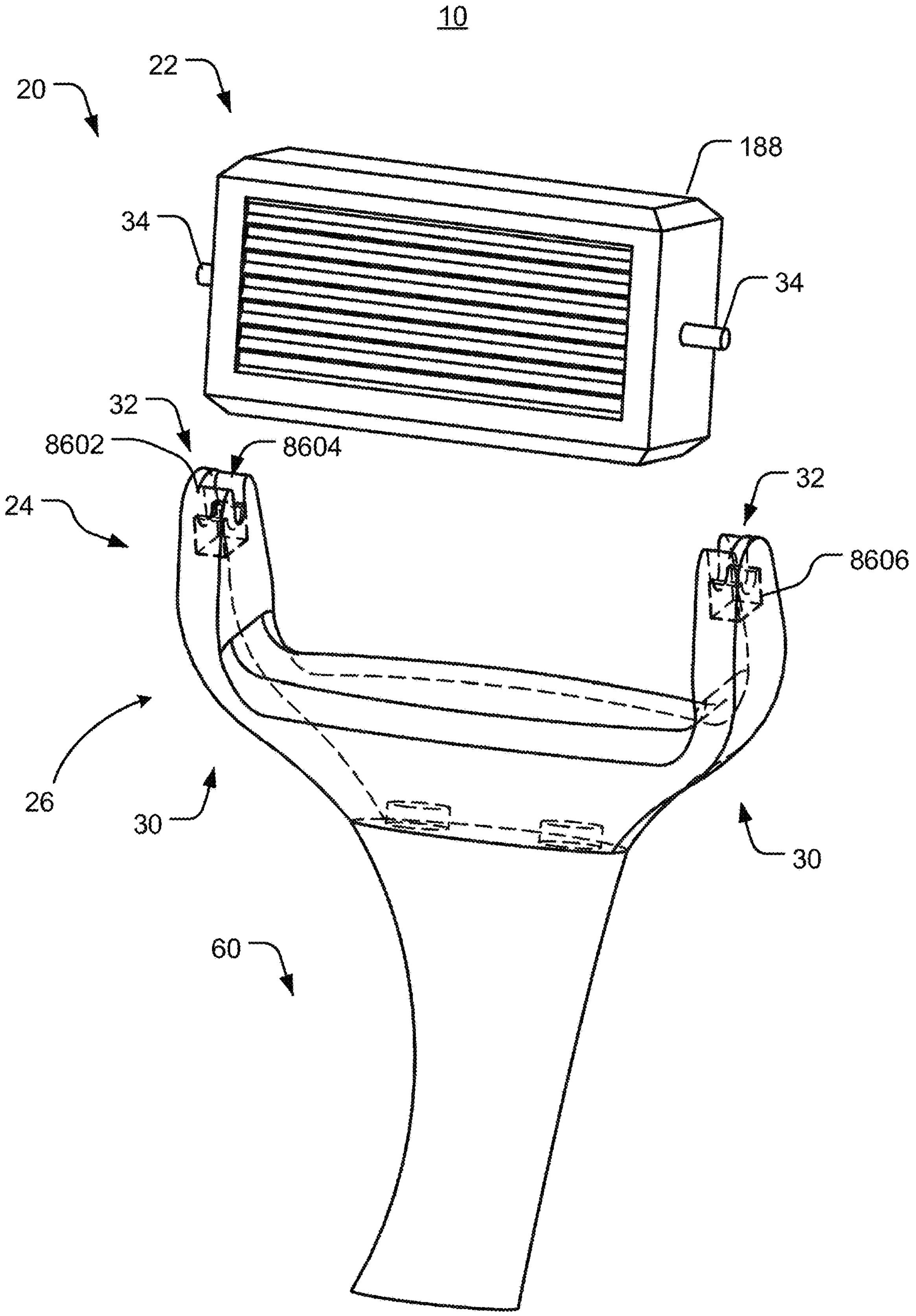
Figure 85:
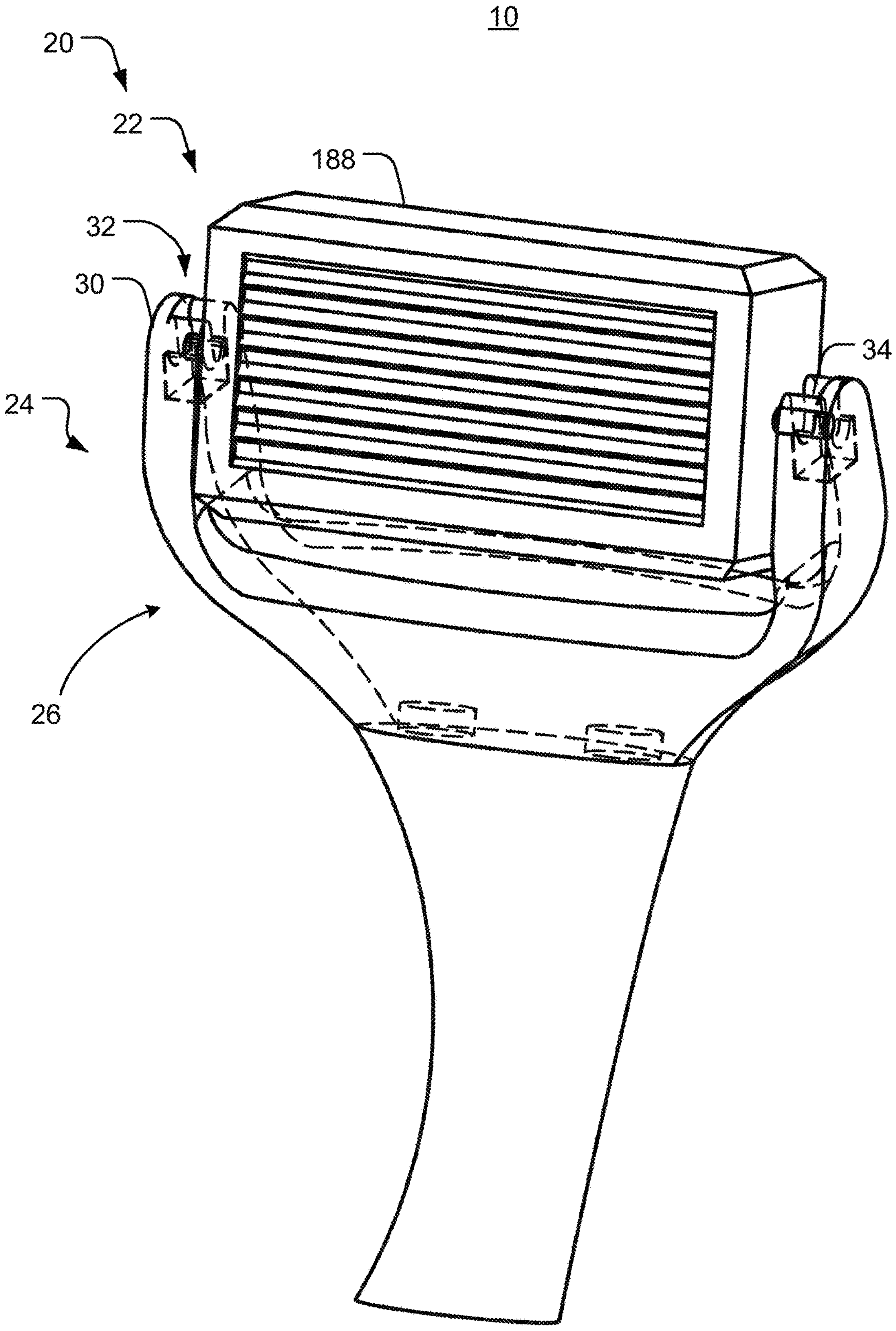
Figure 86:
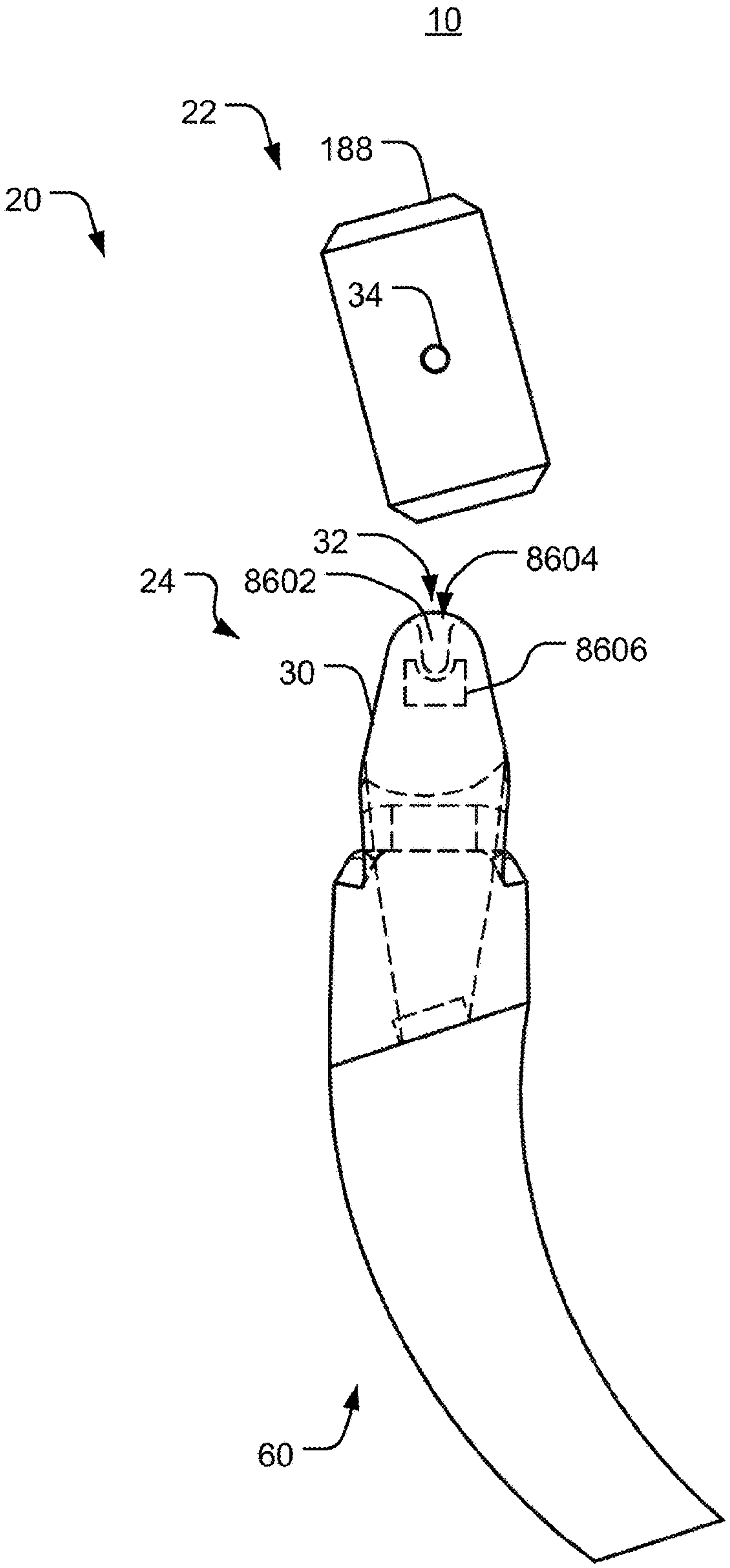
Figure 87:
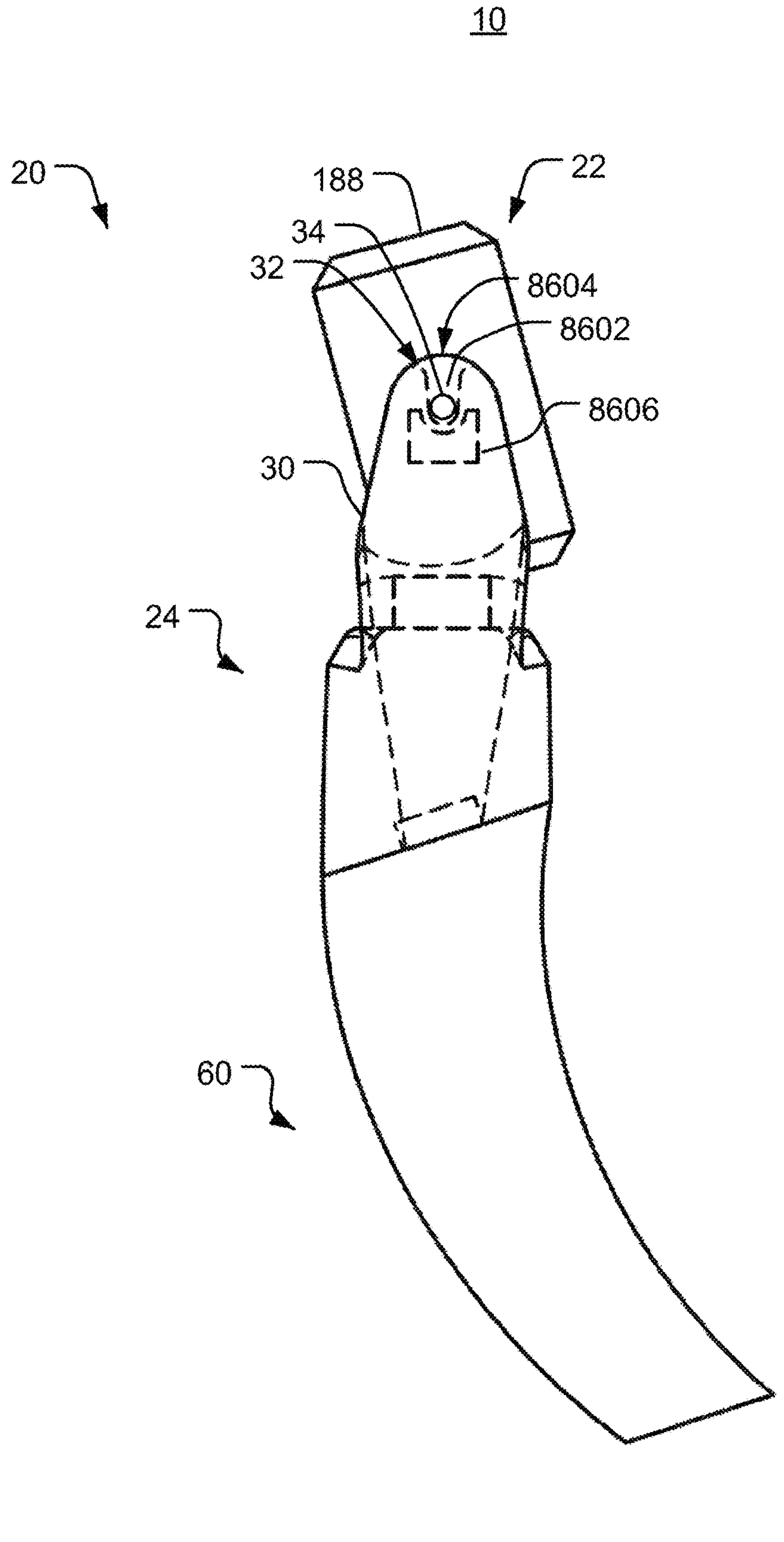
Figure 88:
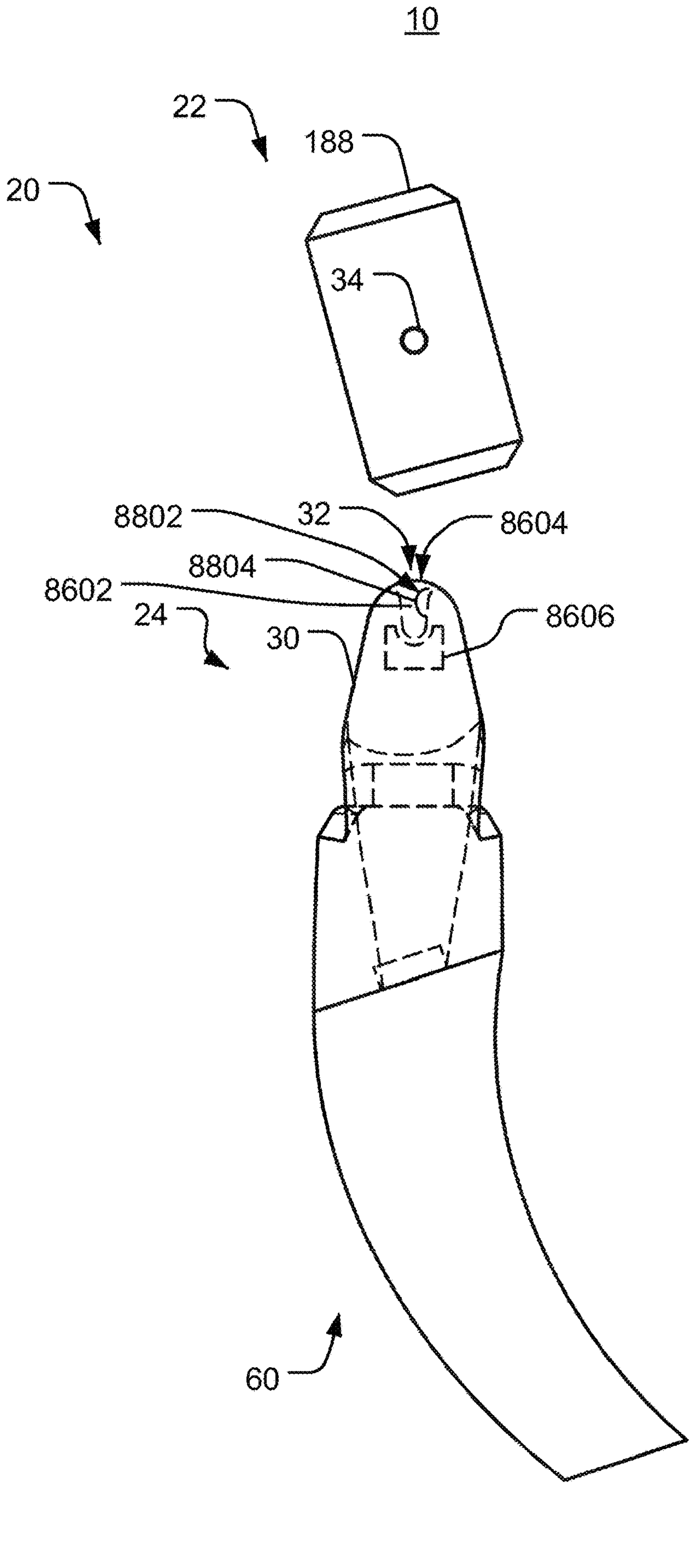
Figure 89:
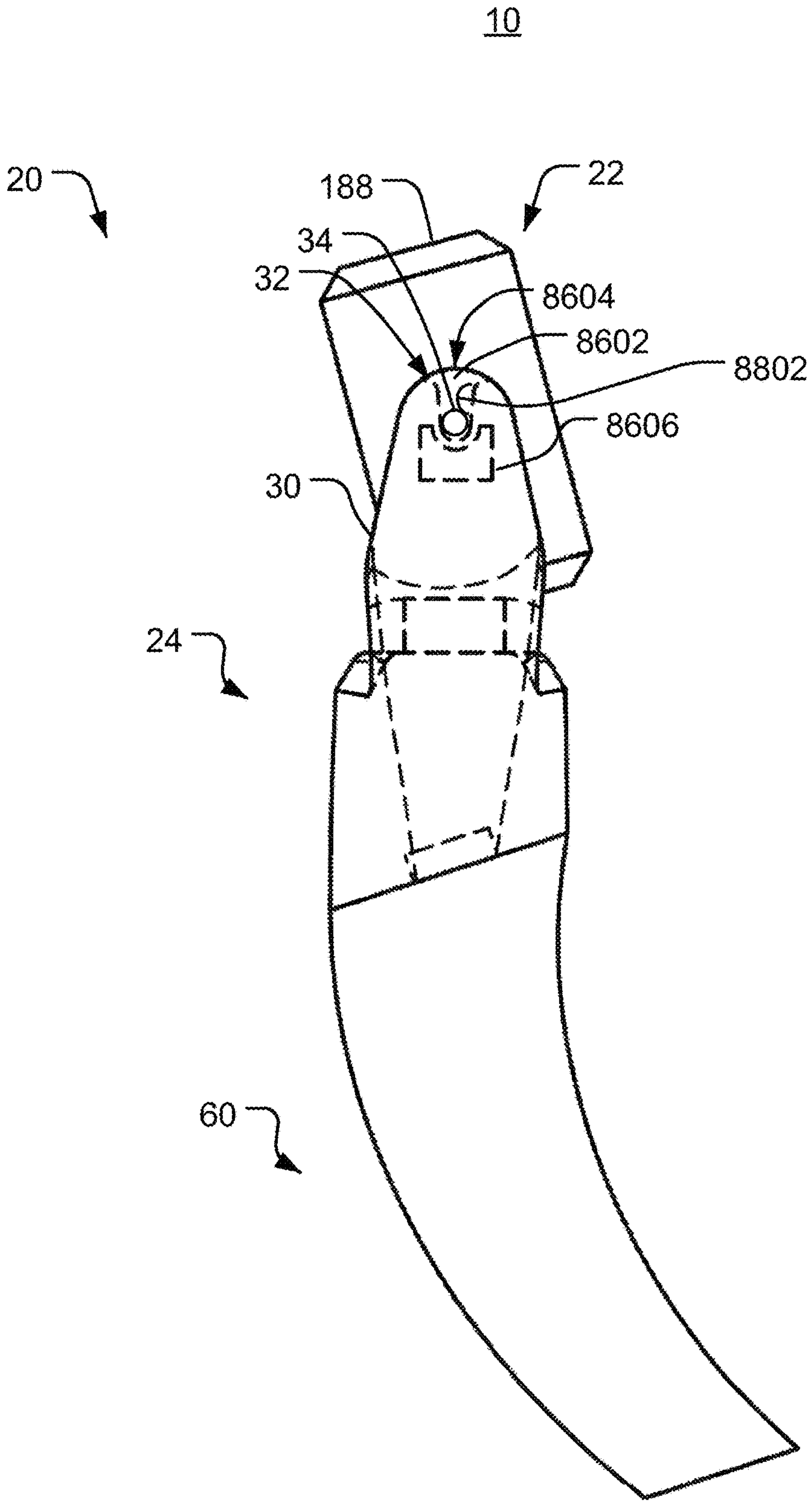
Figure 90:
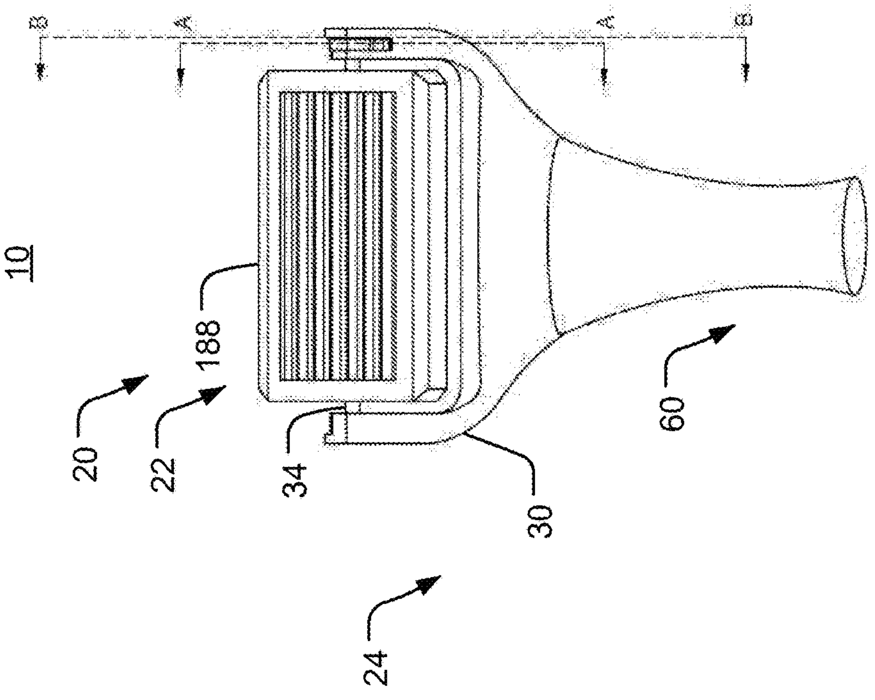
Figure 91:
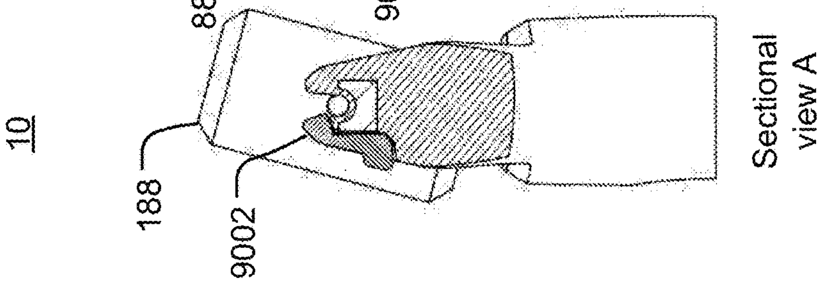
Figure 92:
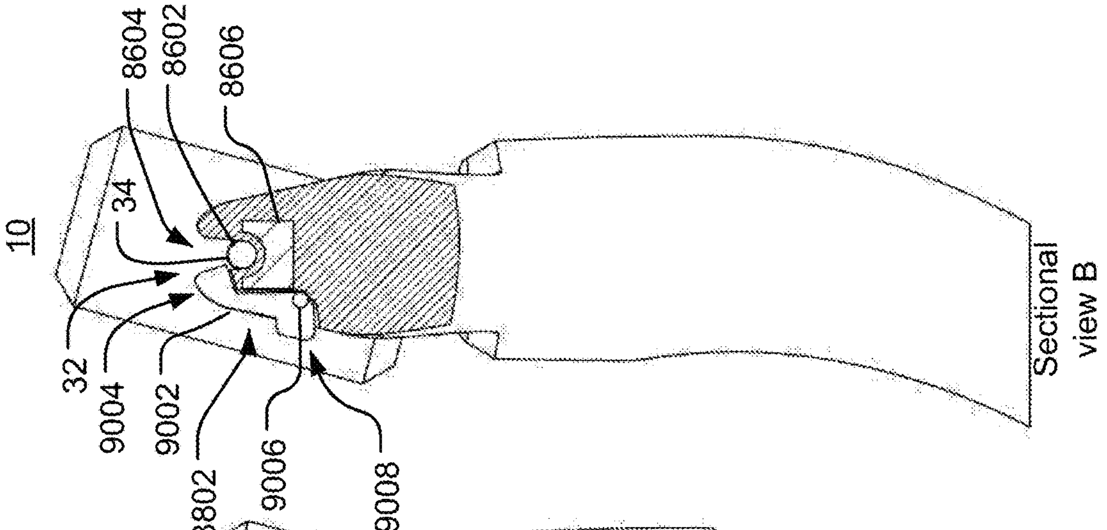
Figure 93:
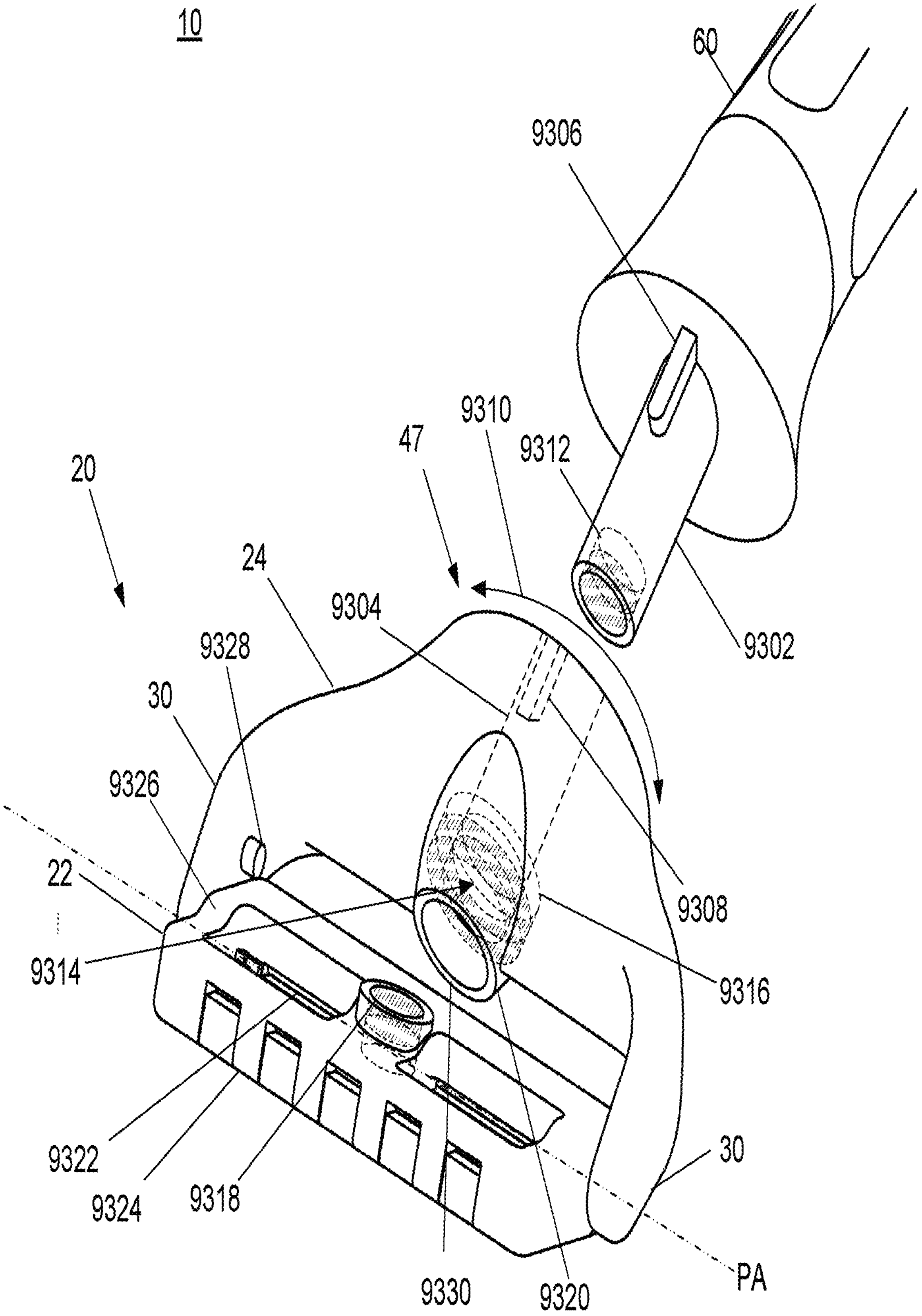
Figure 94:
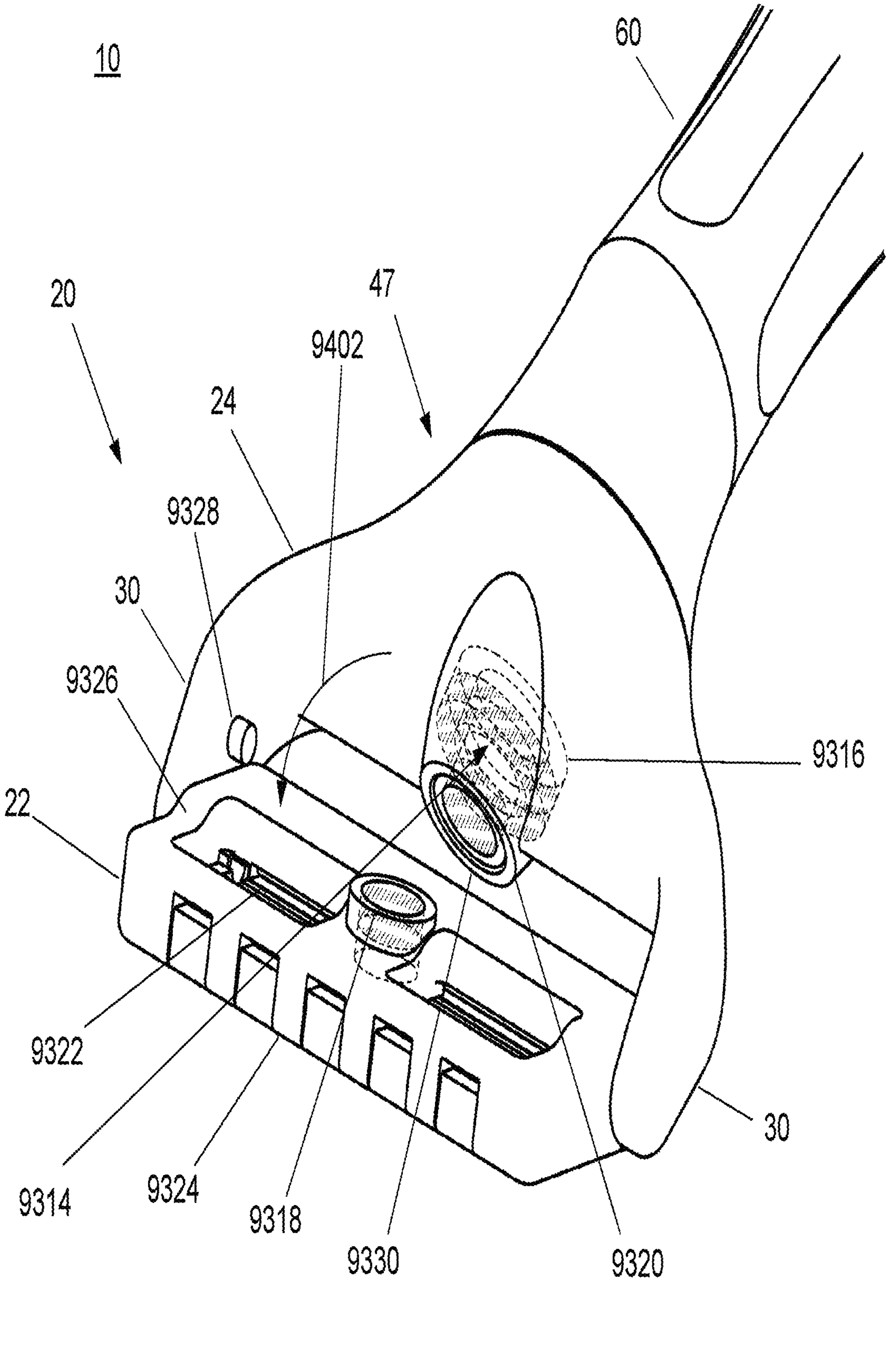
Figure 95:
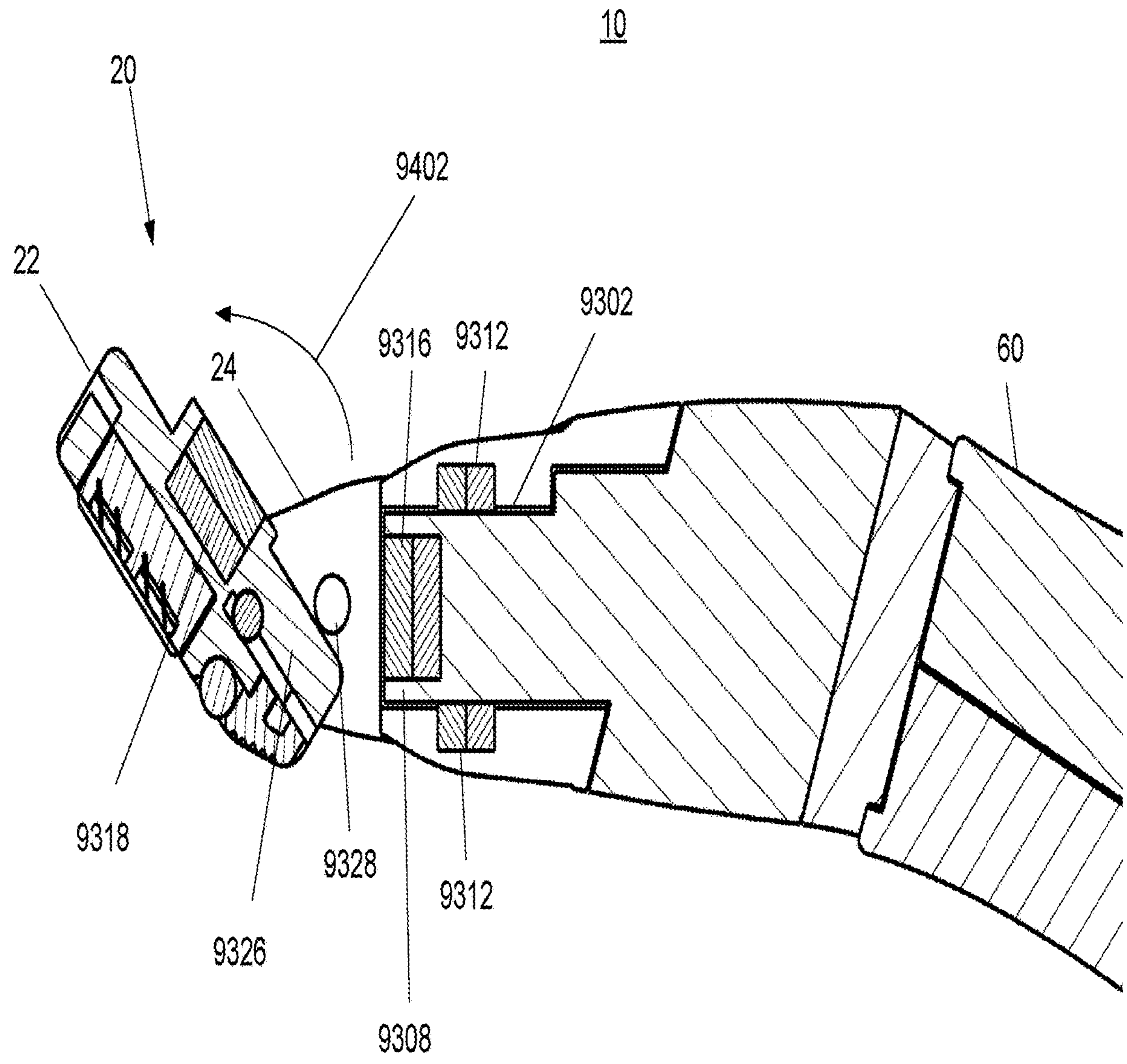
Figure 96:
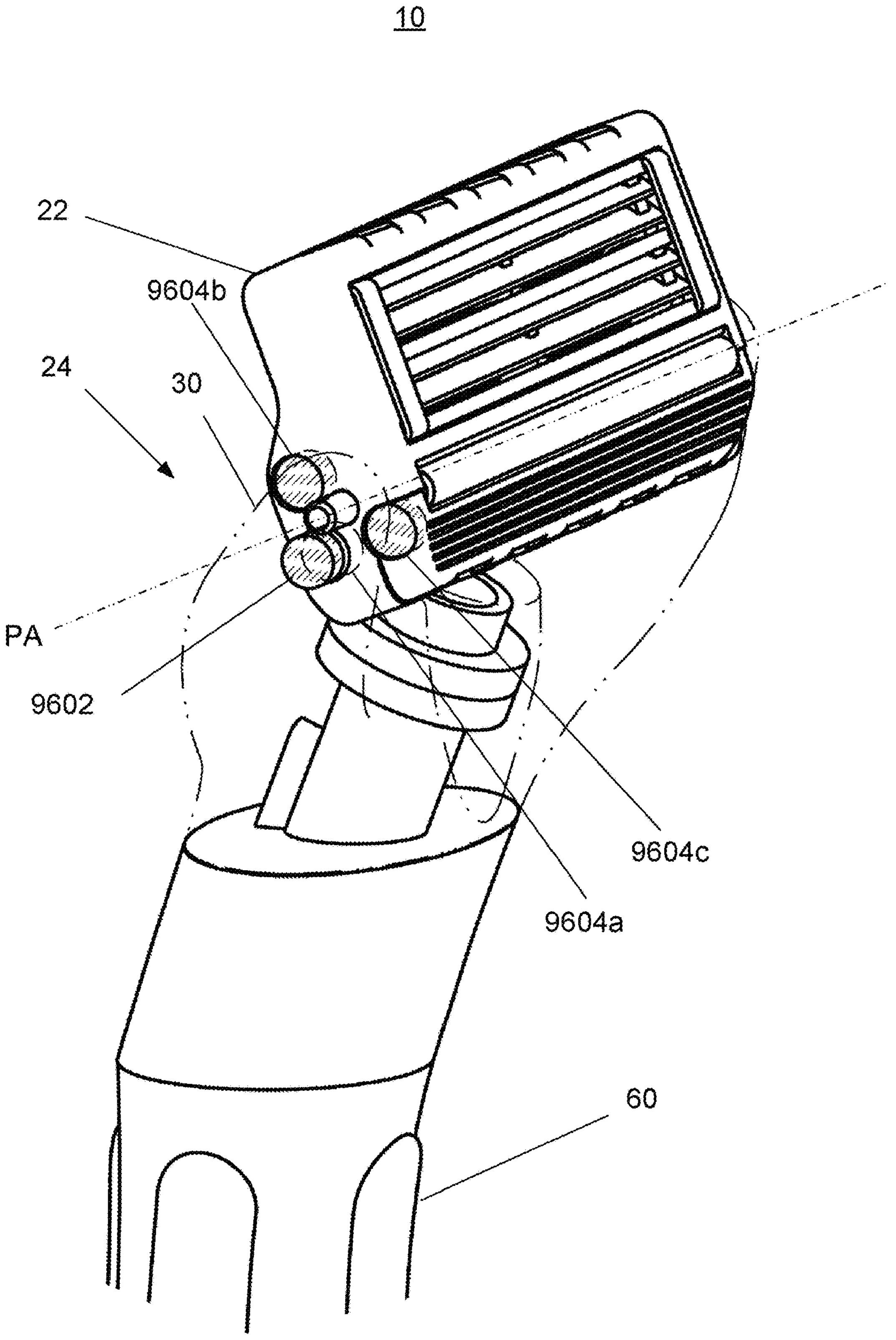
Figure 97:
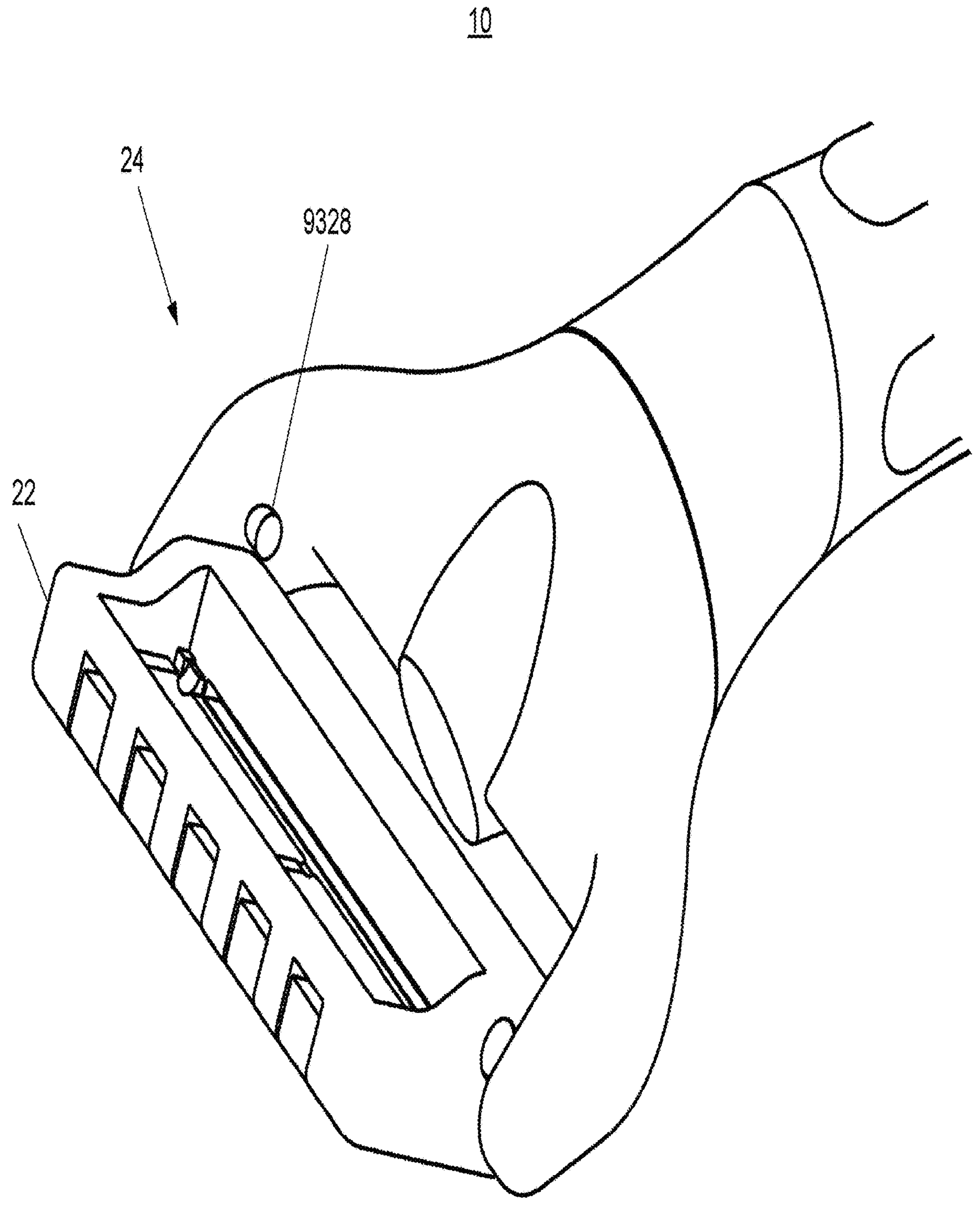
Figure 98:
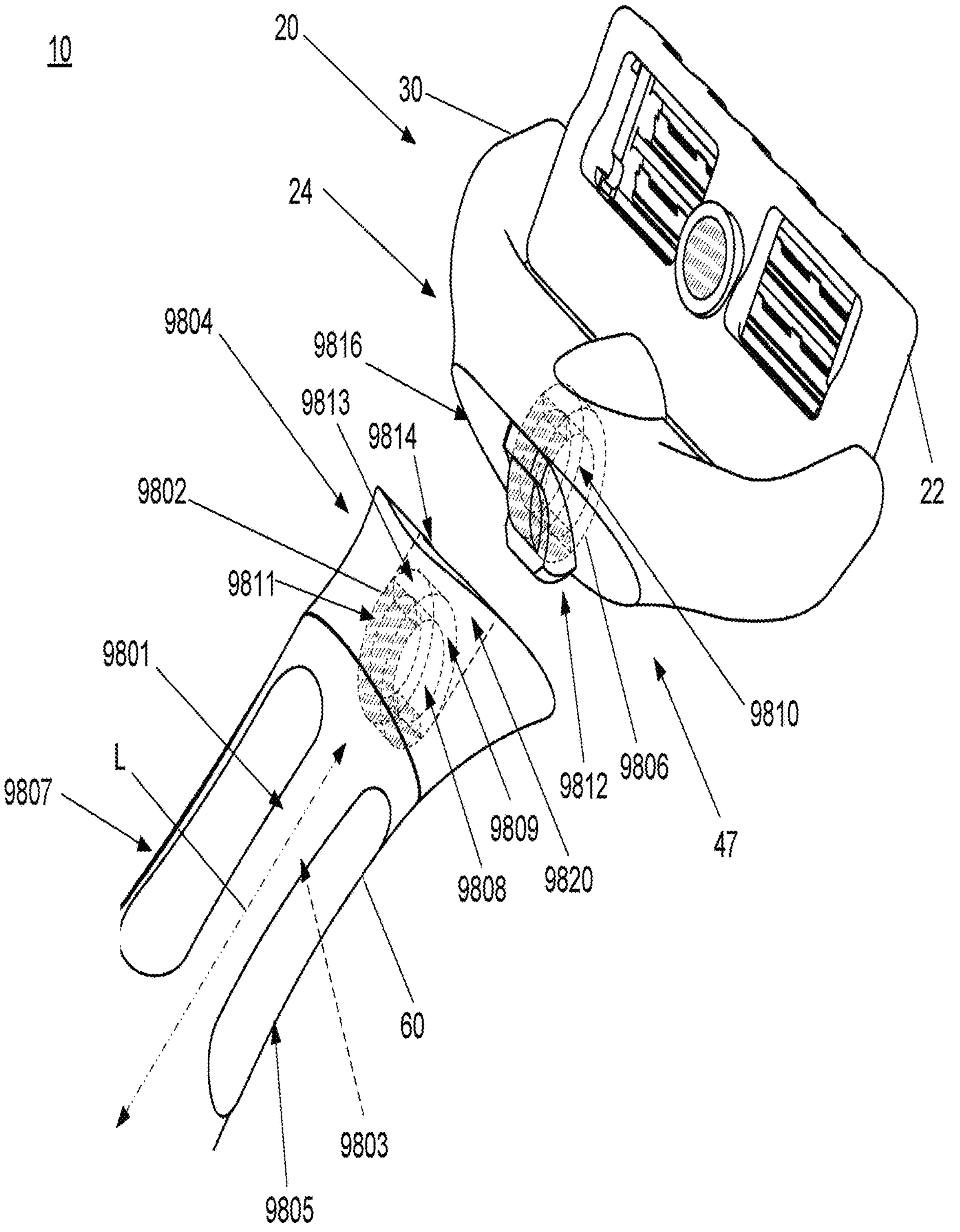
Figure 99:
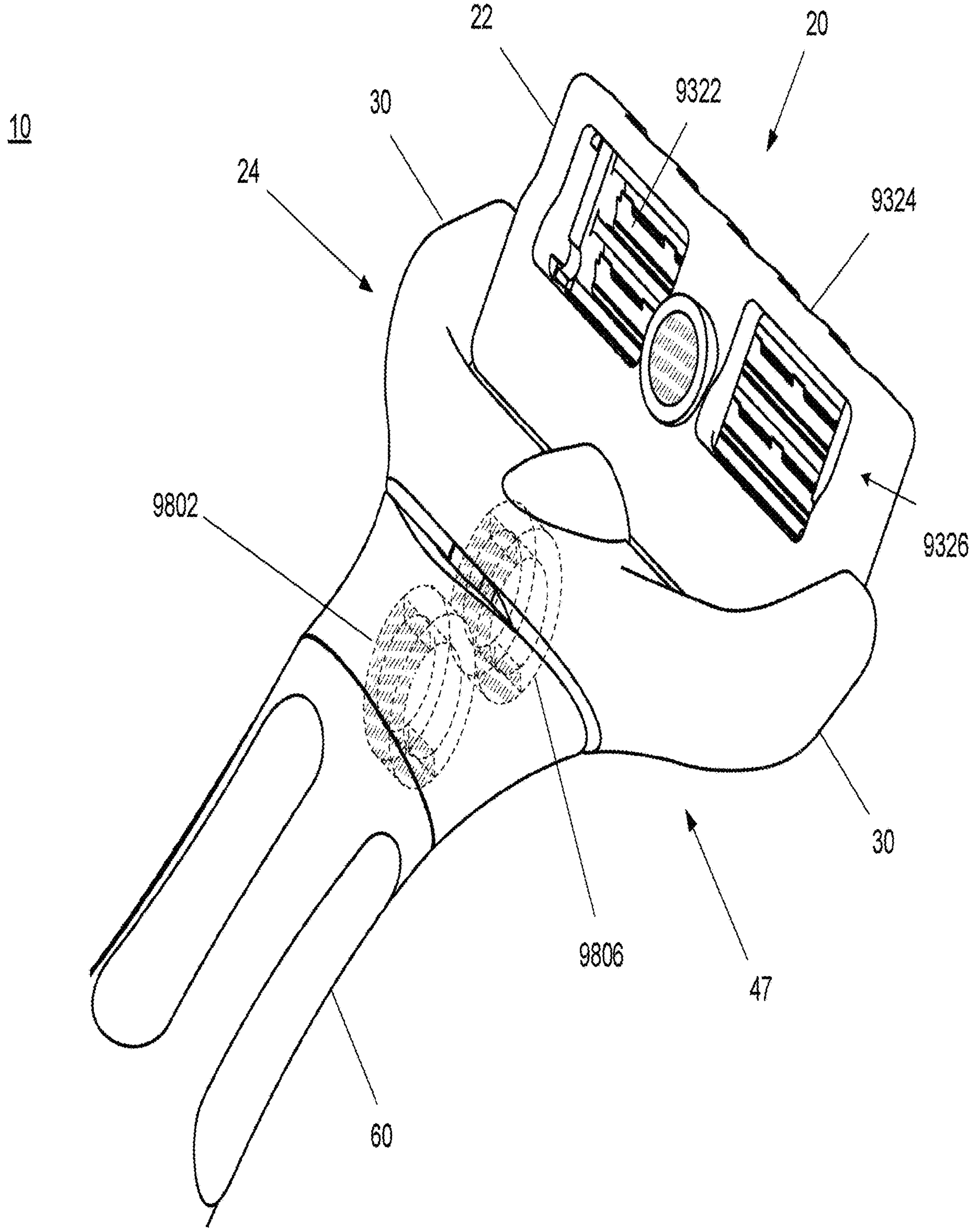
Figure 100:
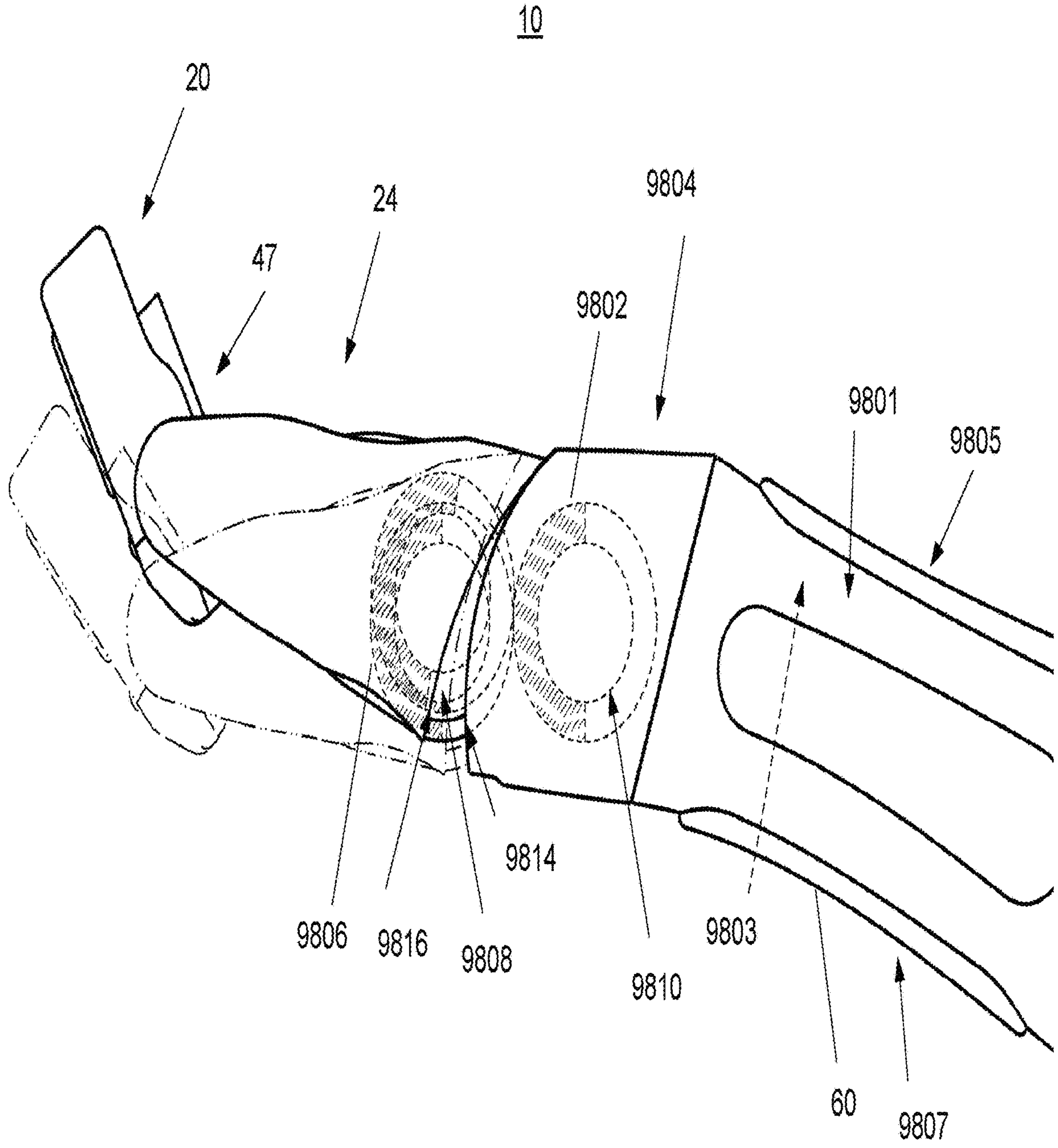
Figure 101:
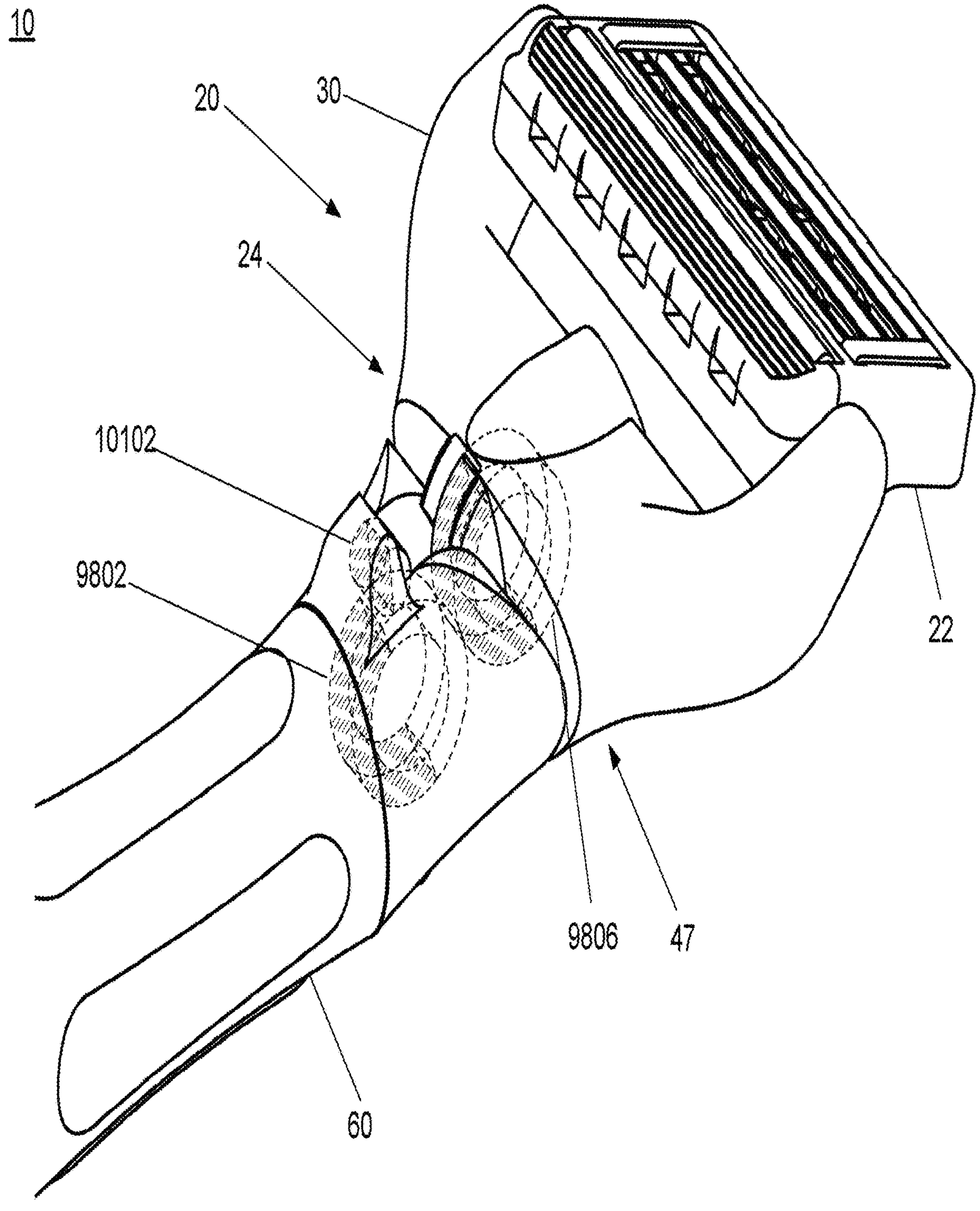
Figure 102:
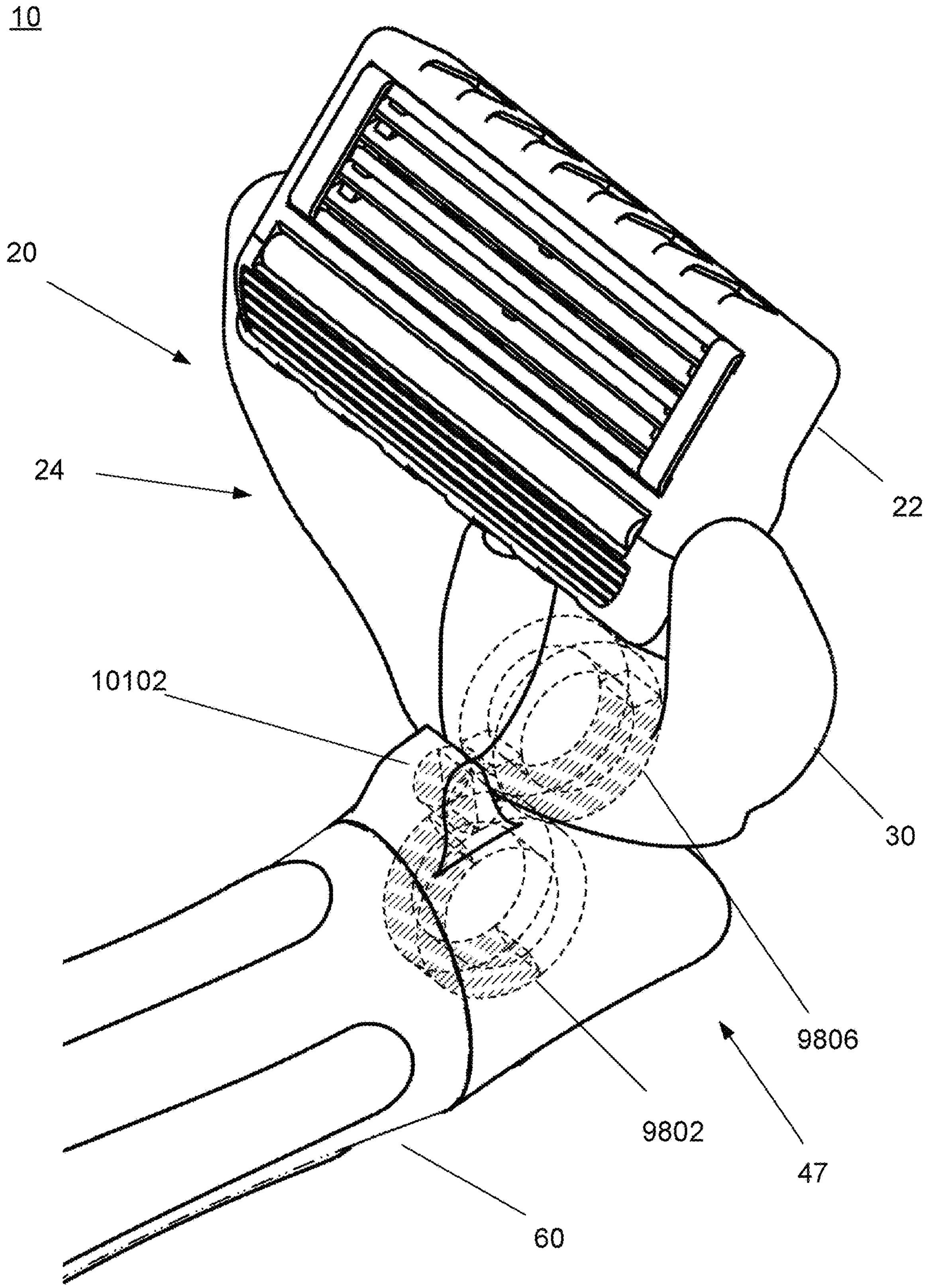
Figure 103:
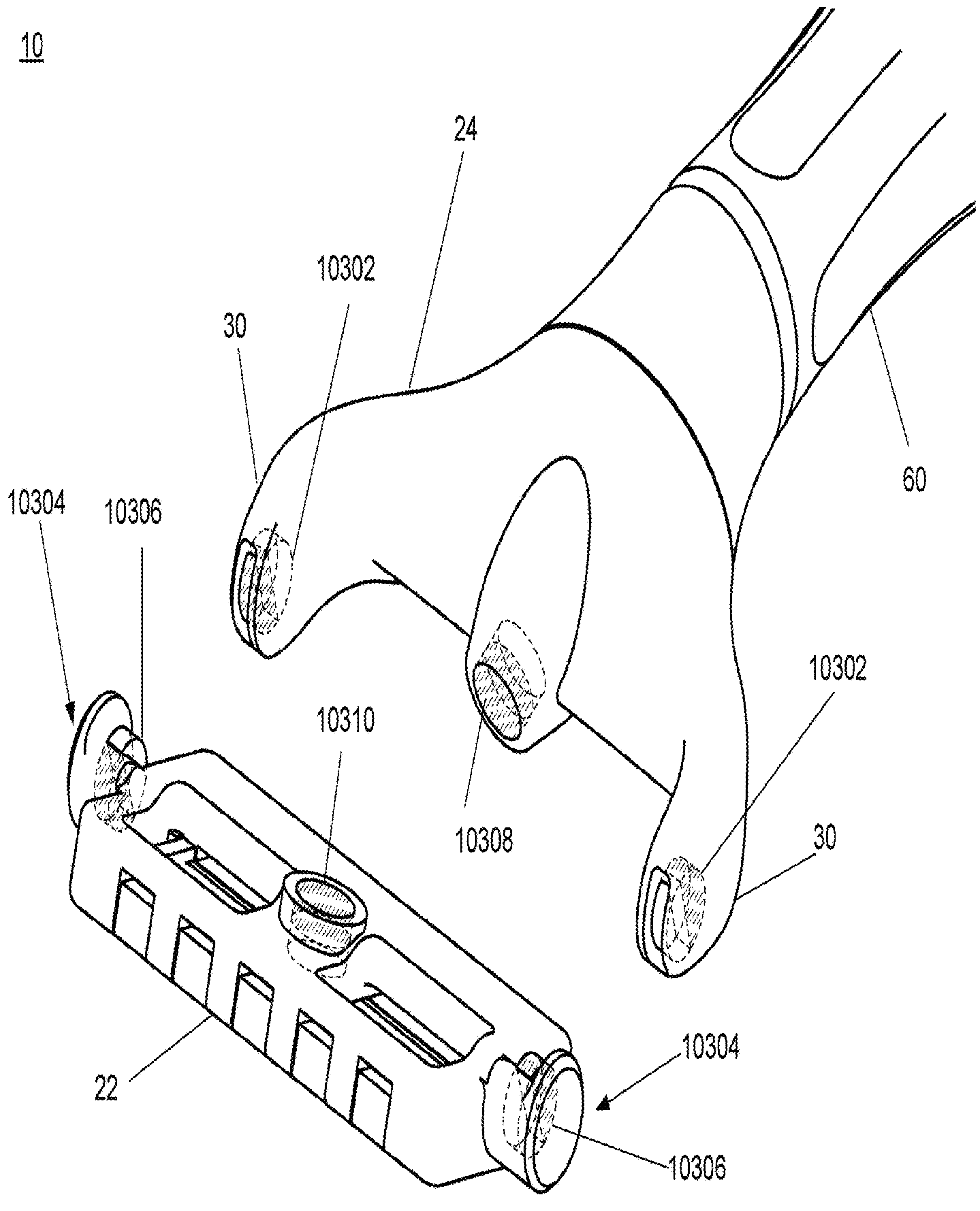
Figure 104:
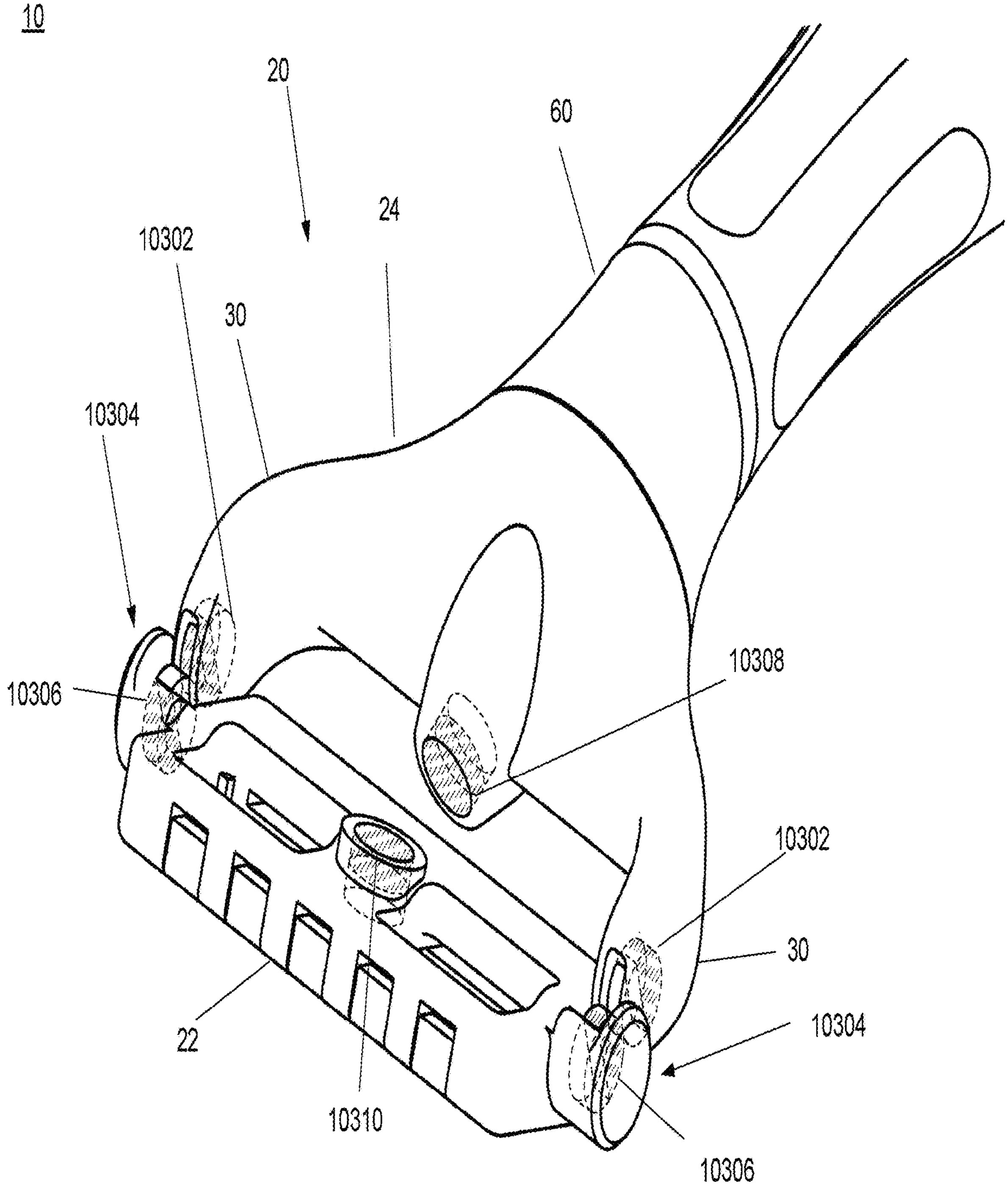
Figure 105:
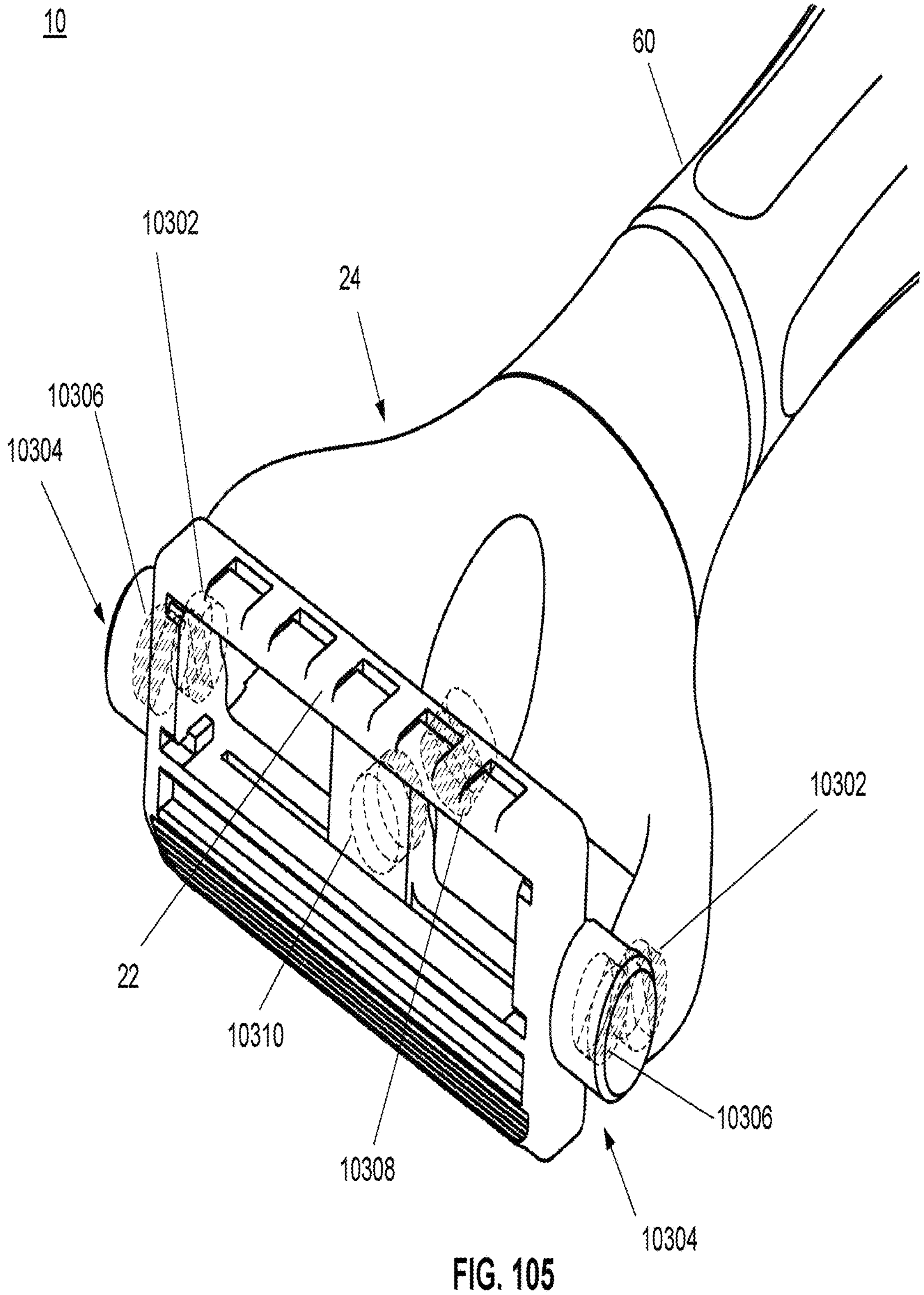
Figure 106:
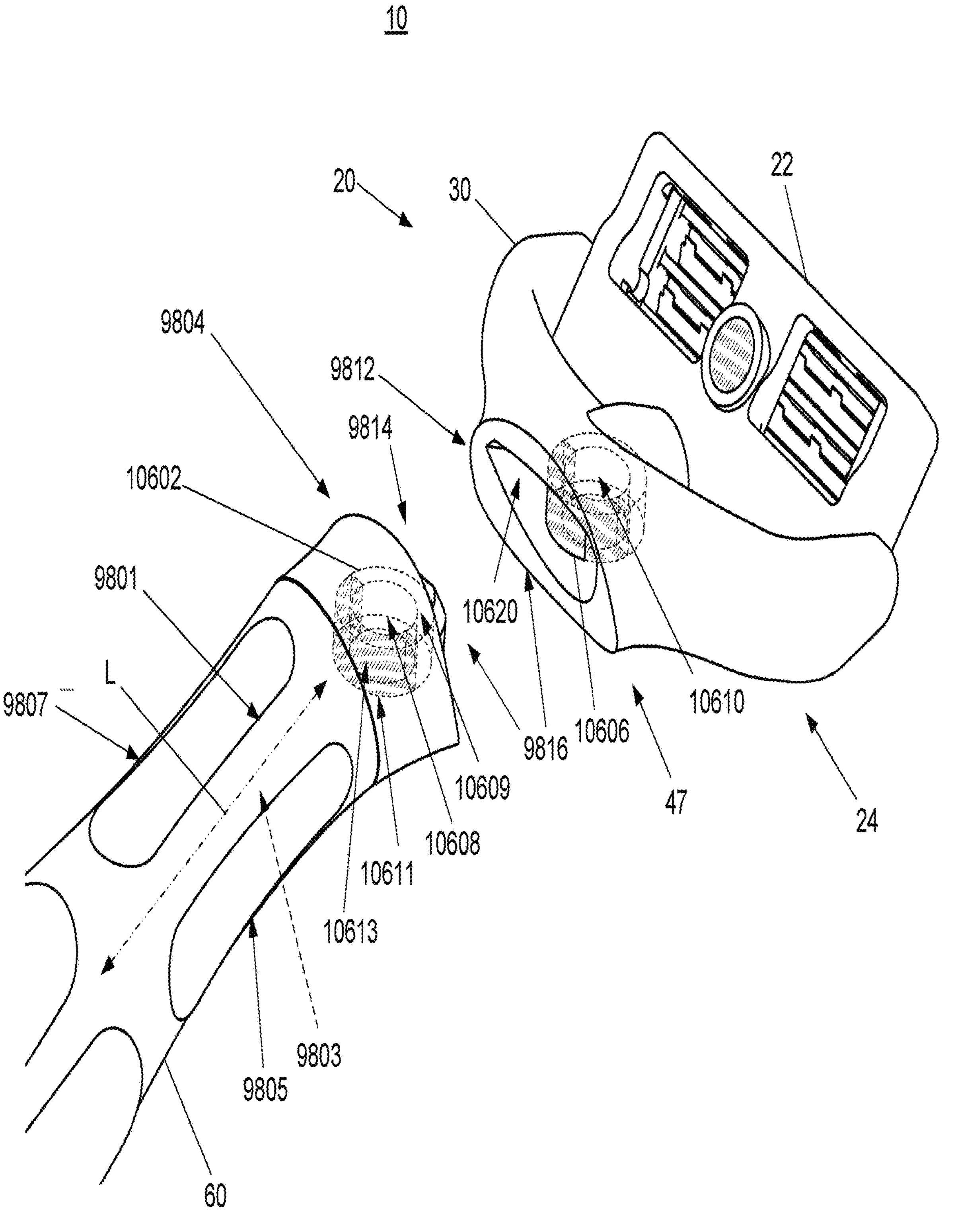
Figure 107:
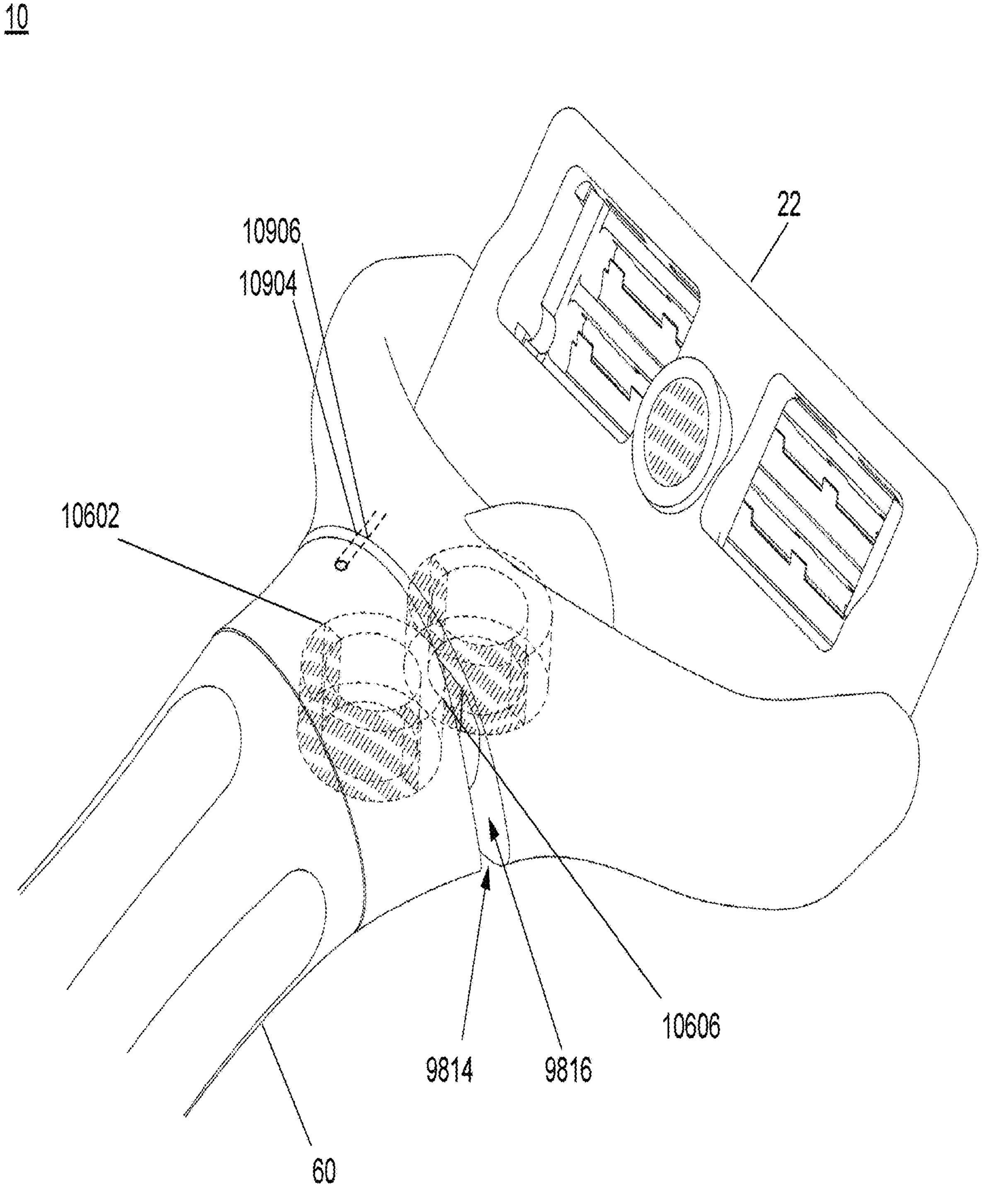
Figure 108:
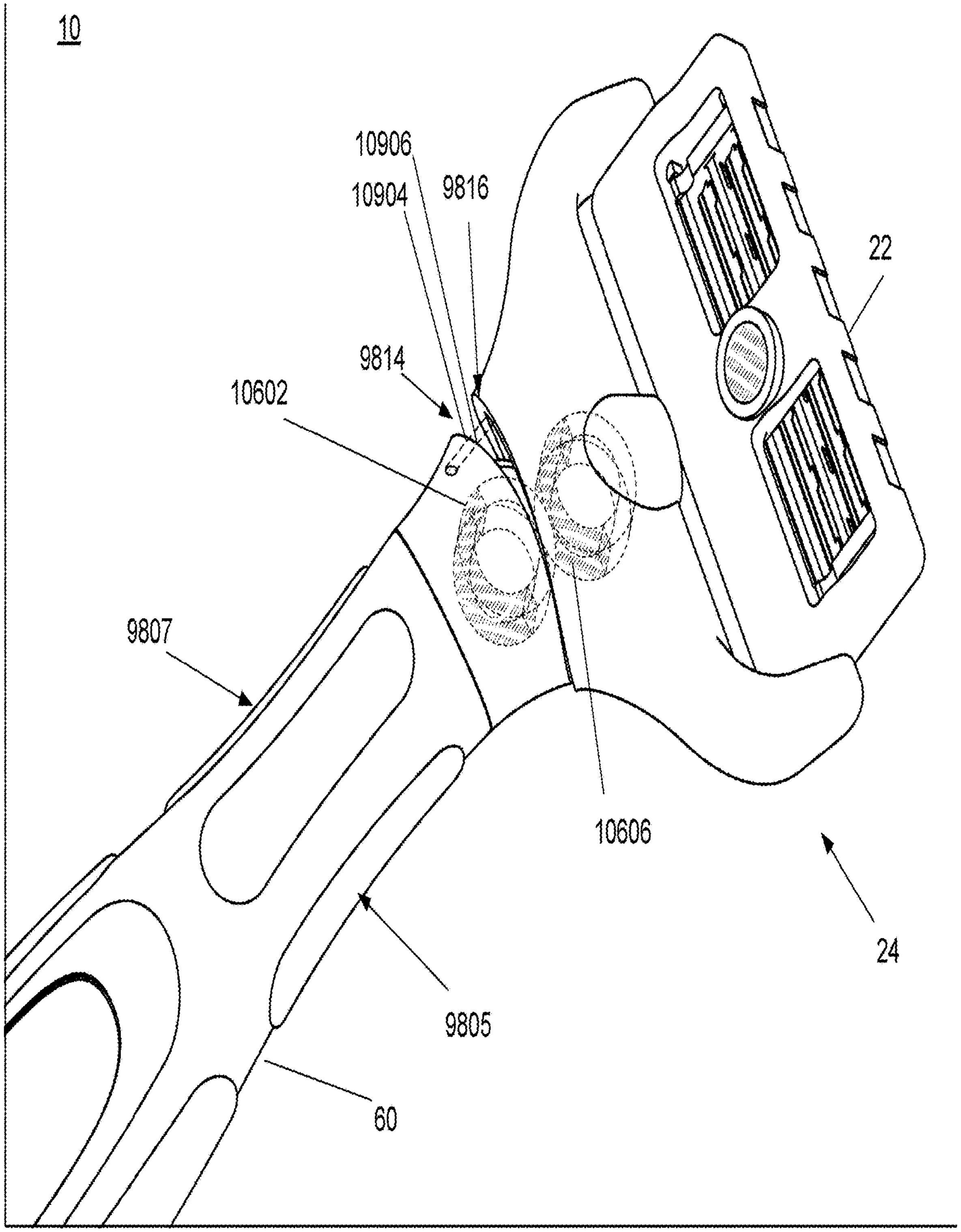
Figure 109:
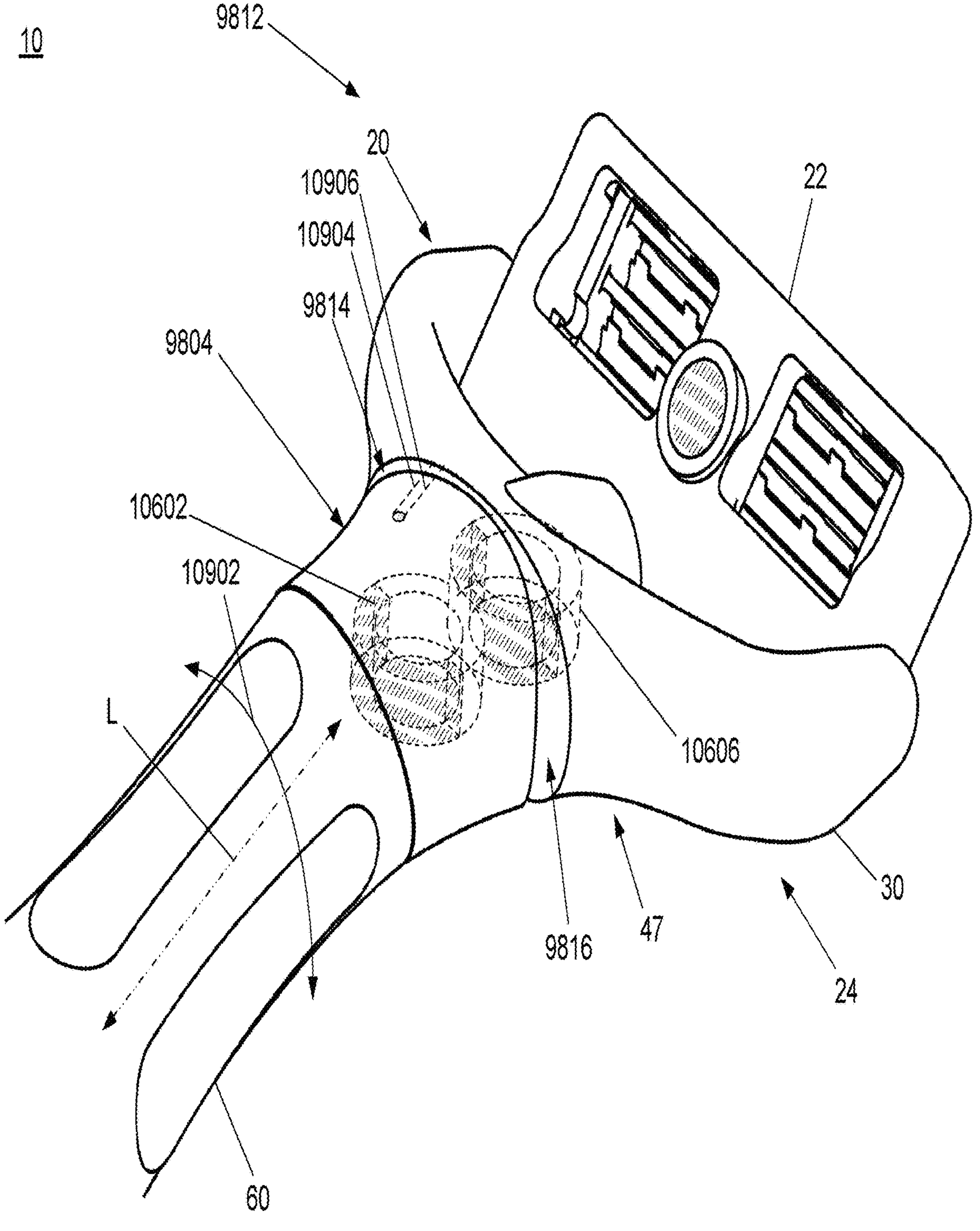
Figure 110:
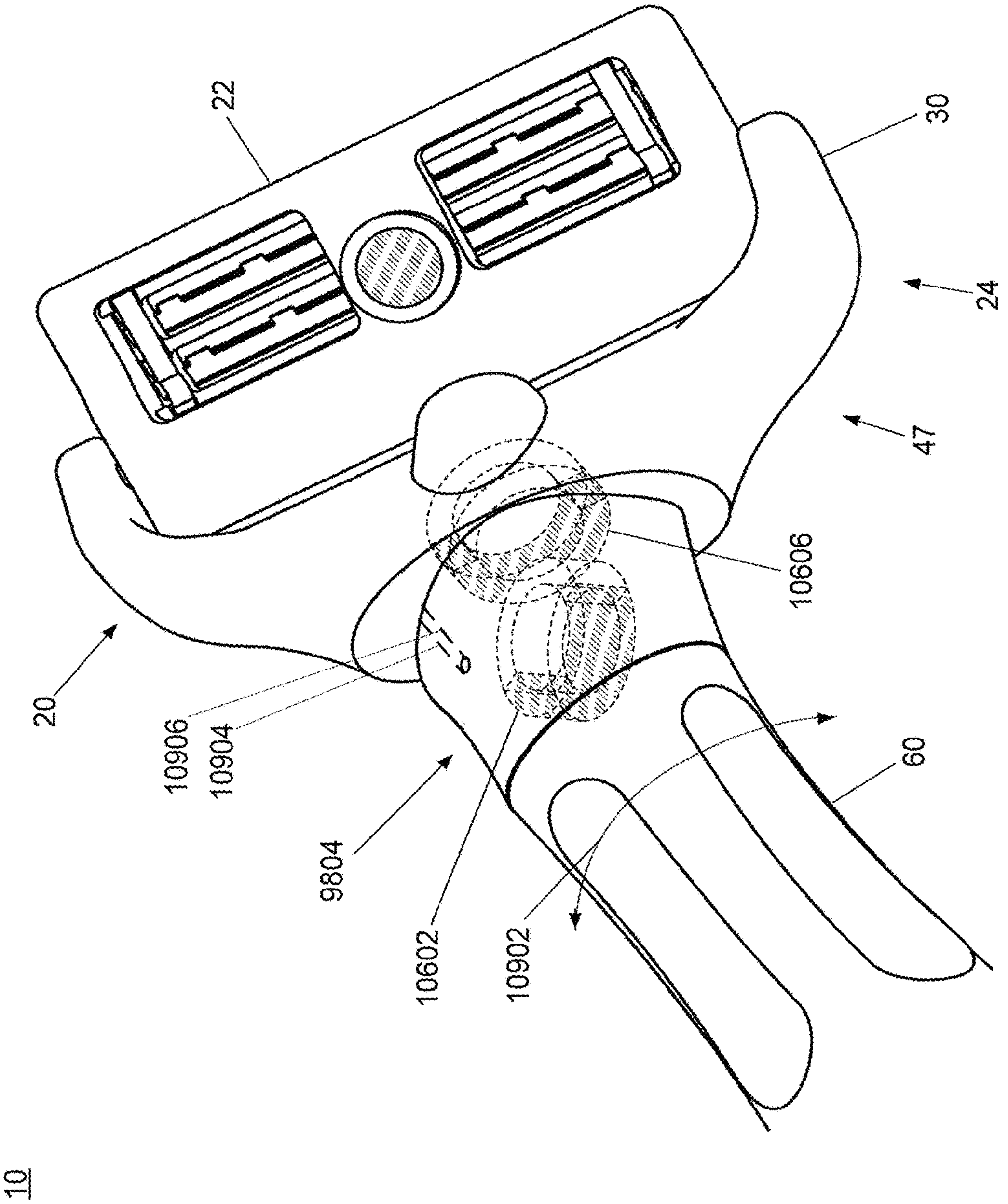
Figure 111:
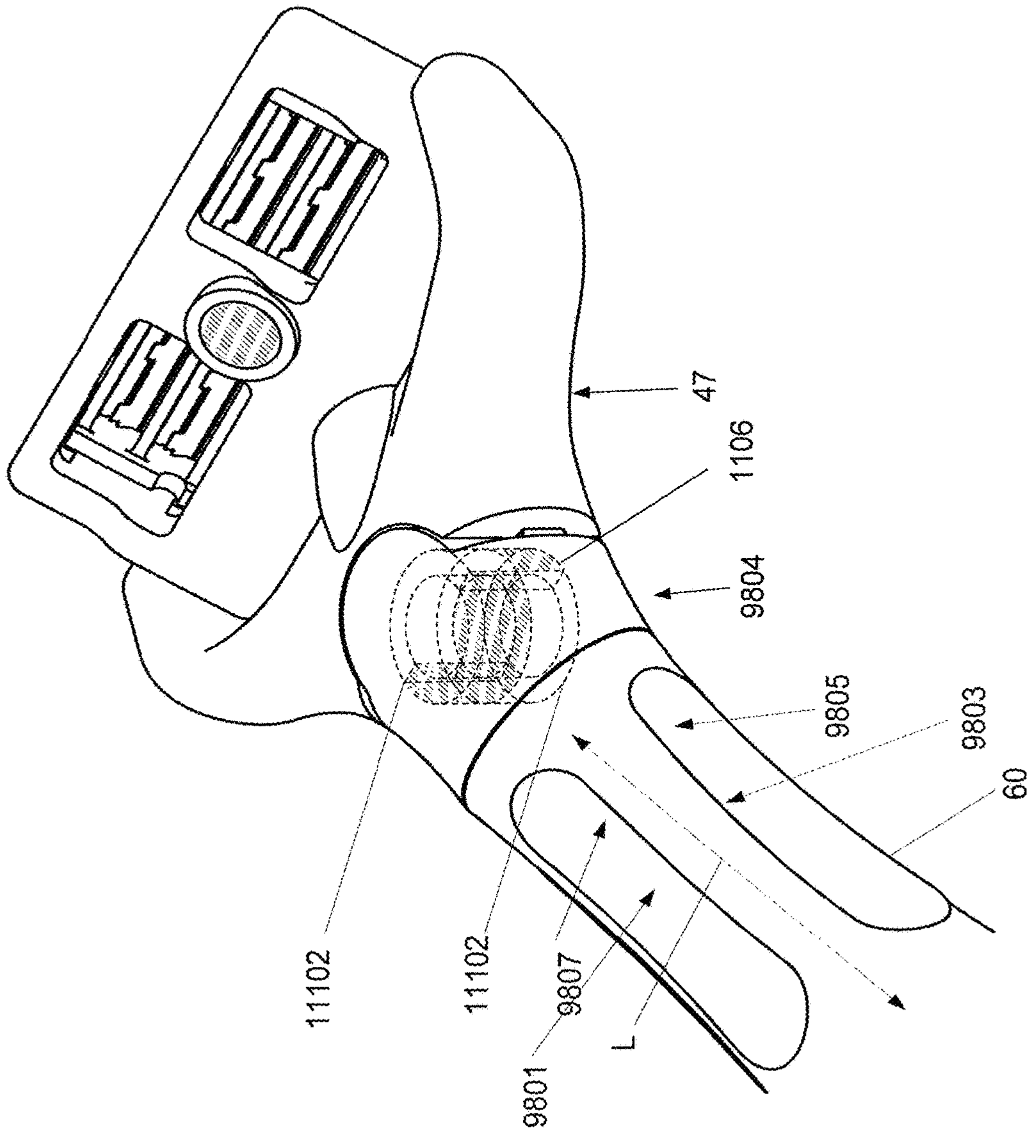
Figure 112:
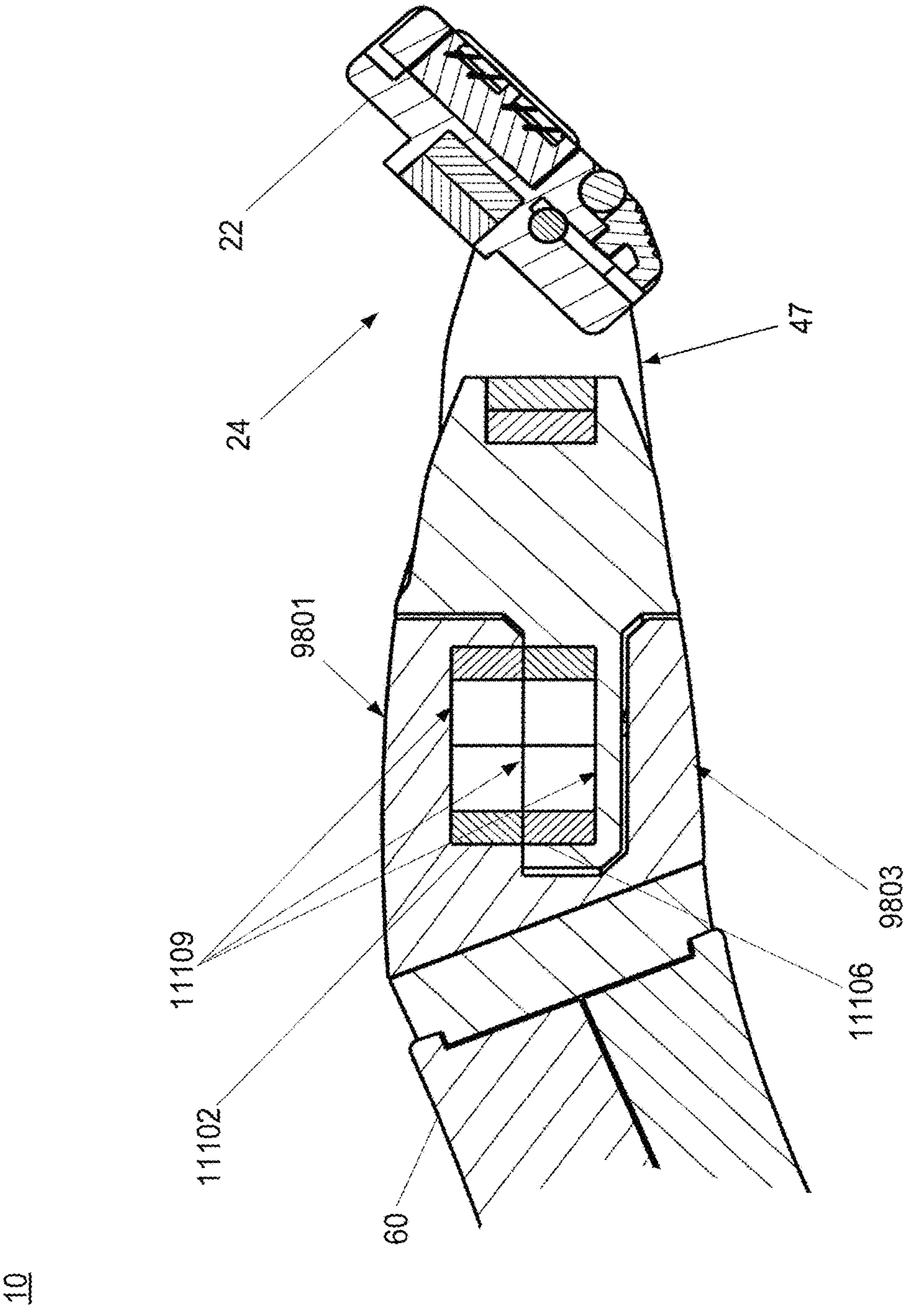
Figure 113:
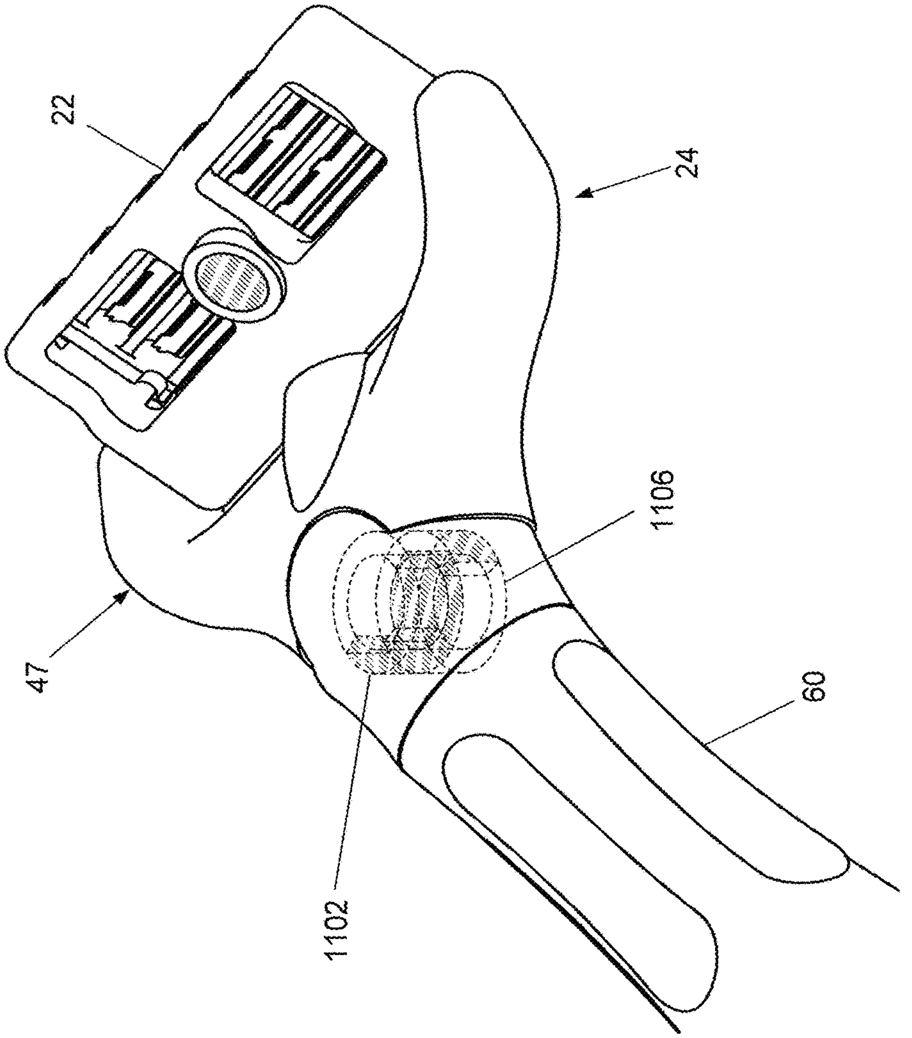
Figures 114, 115:
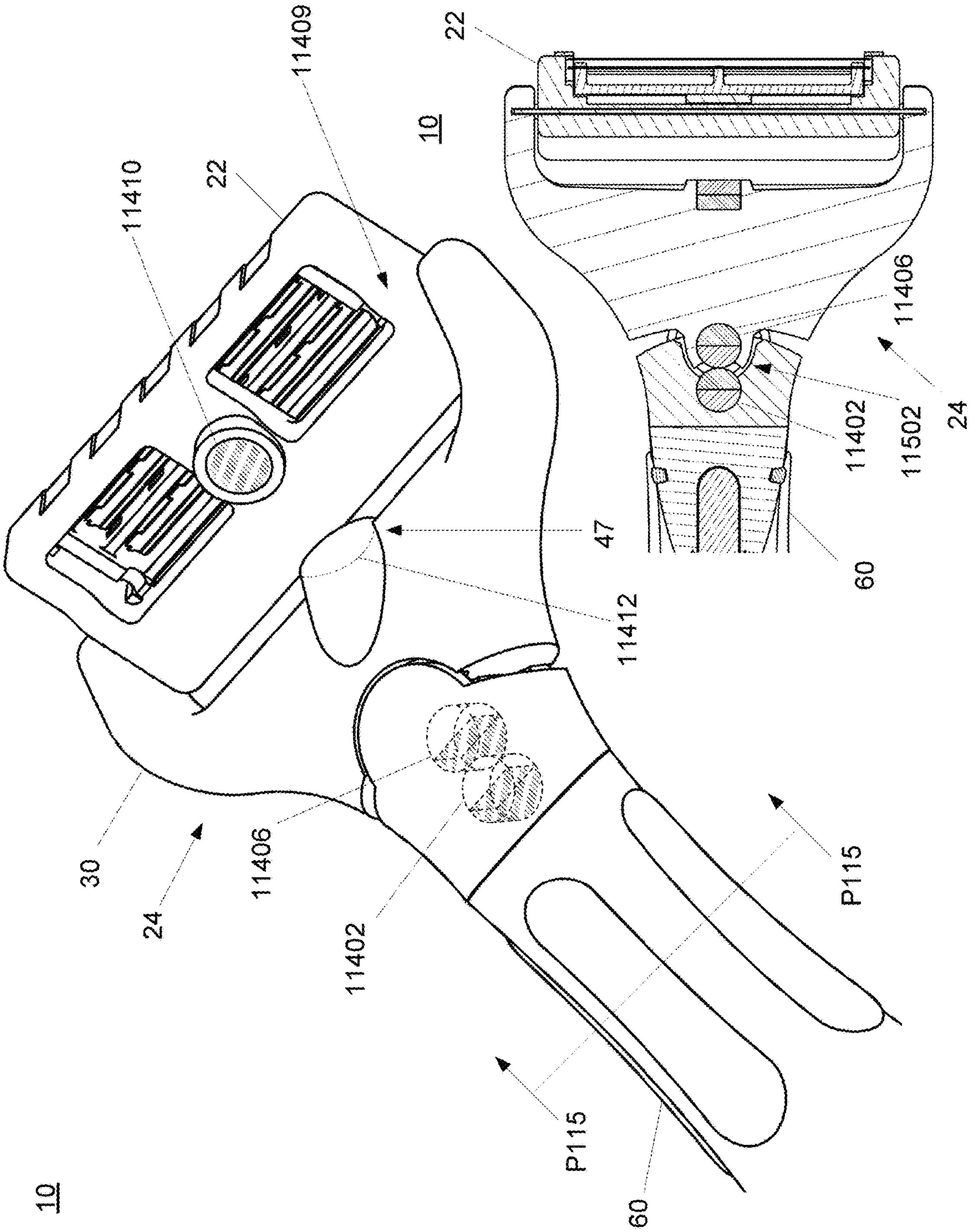
Figure 116:
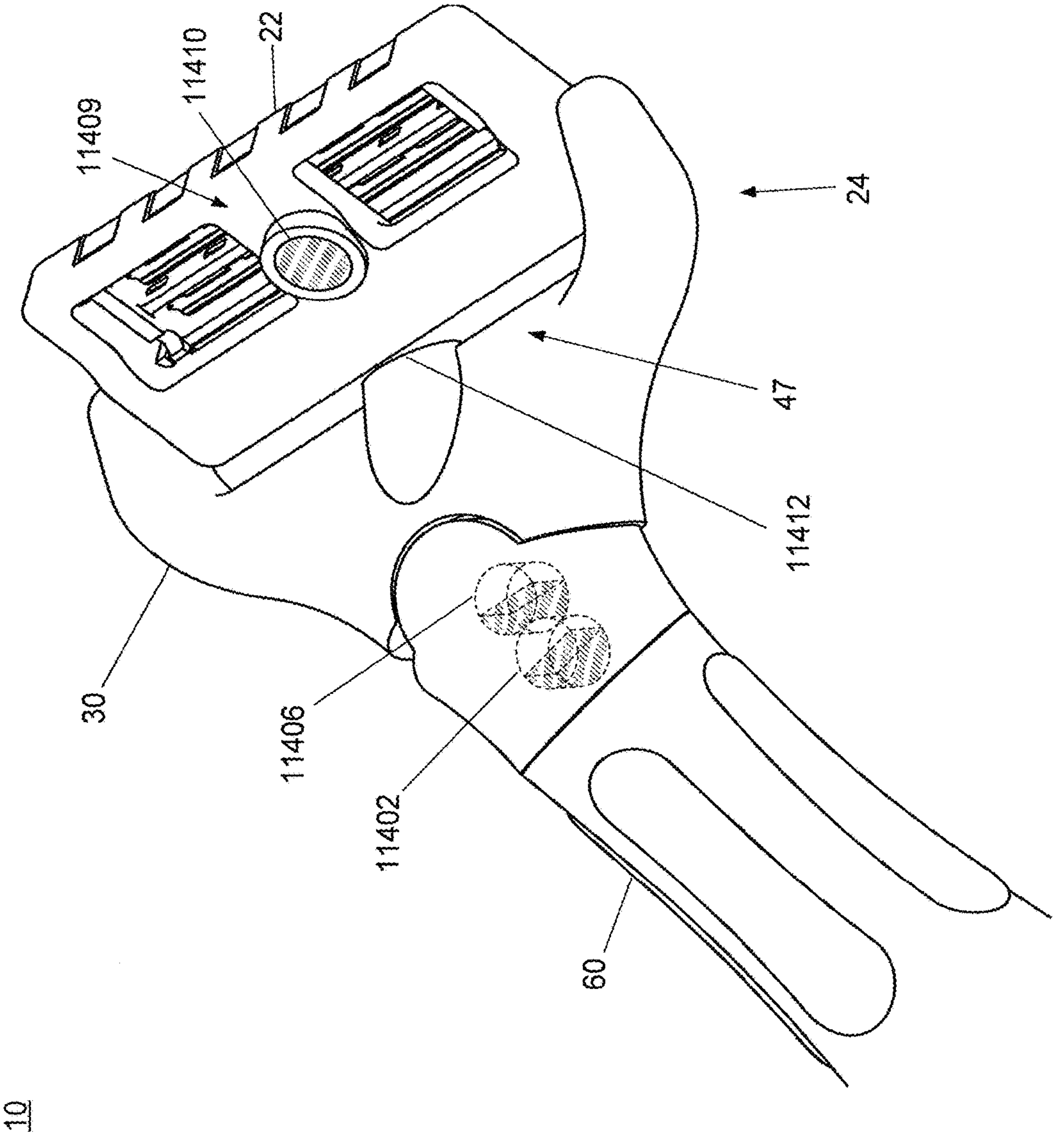
Figure 117:
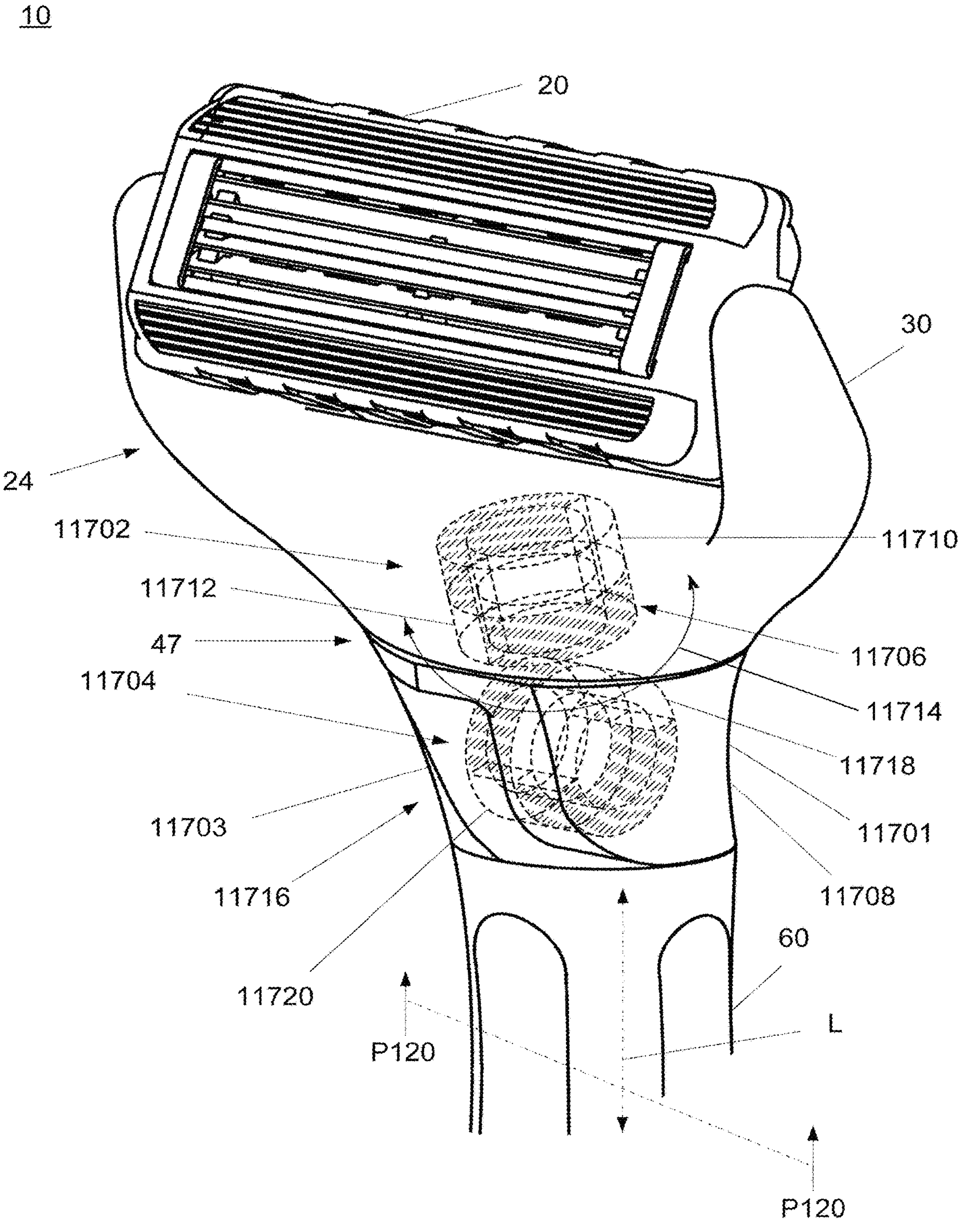
Figure 118:
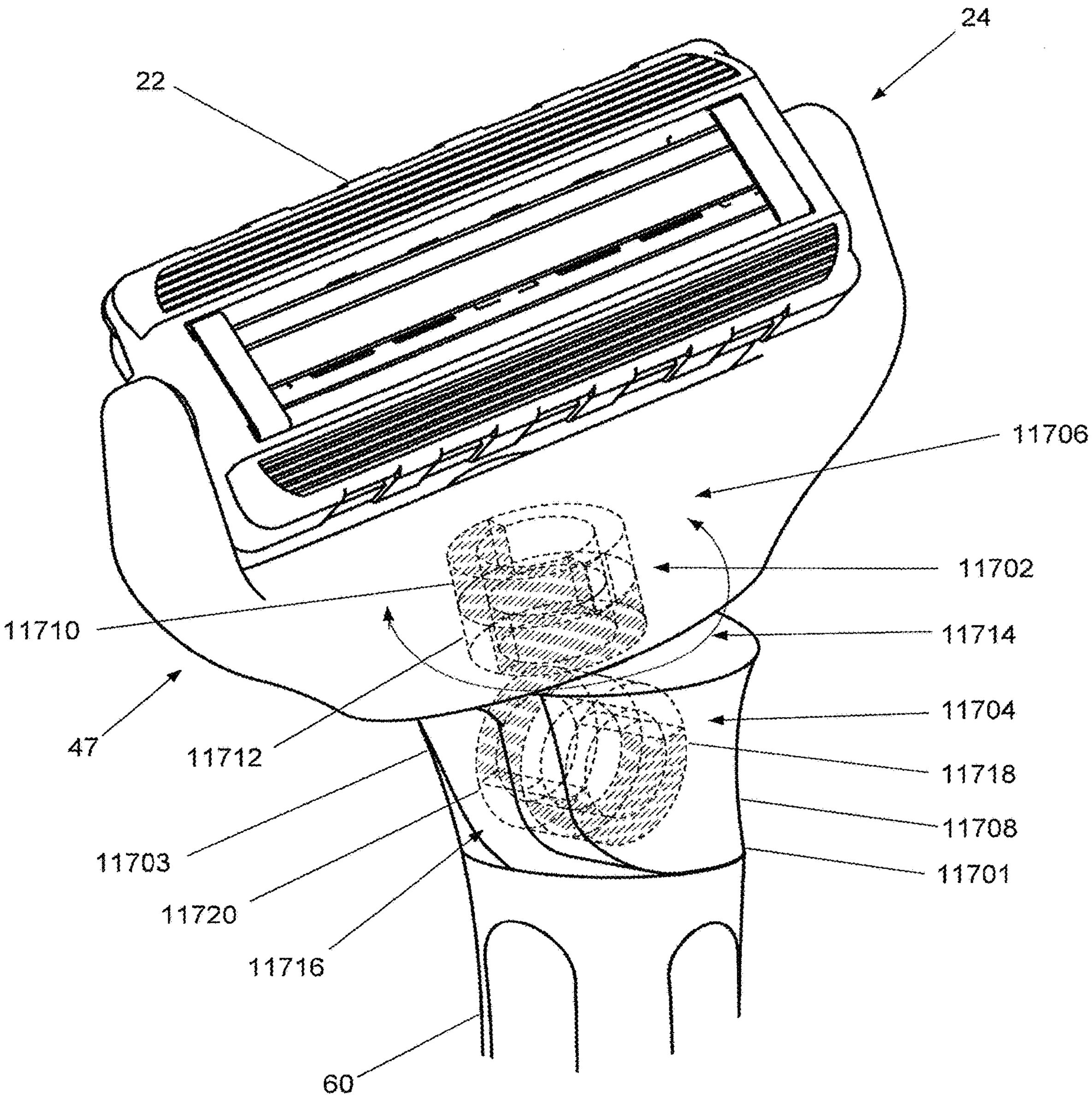
Figure 119:
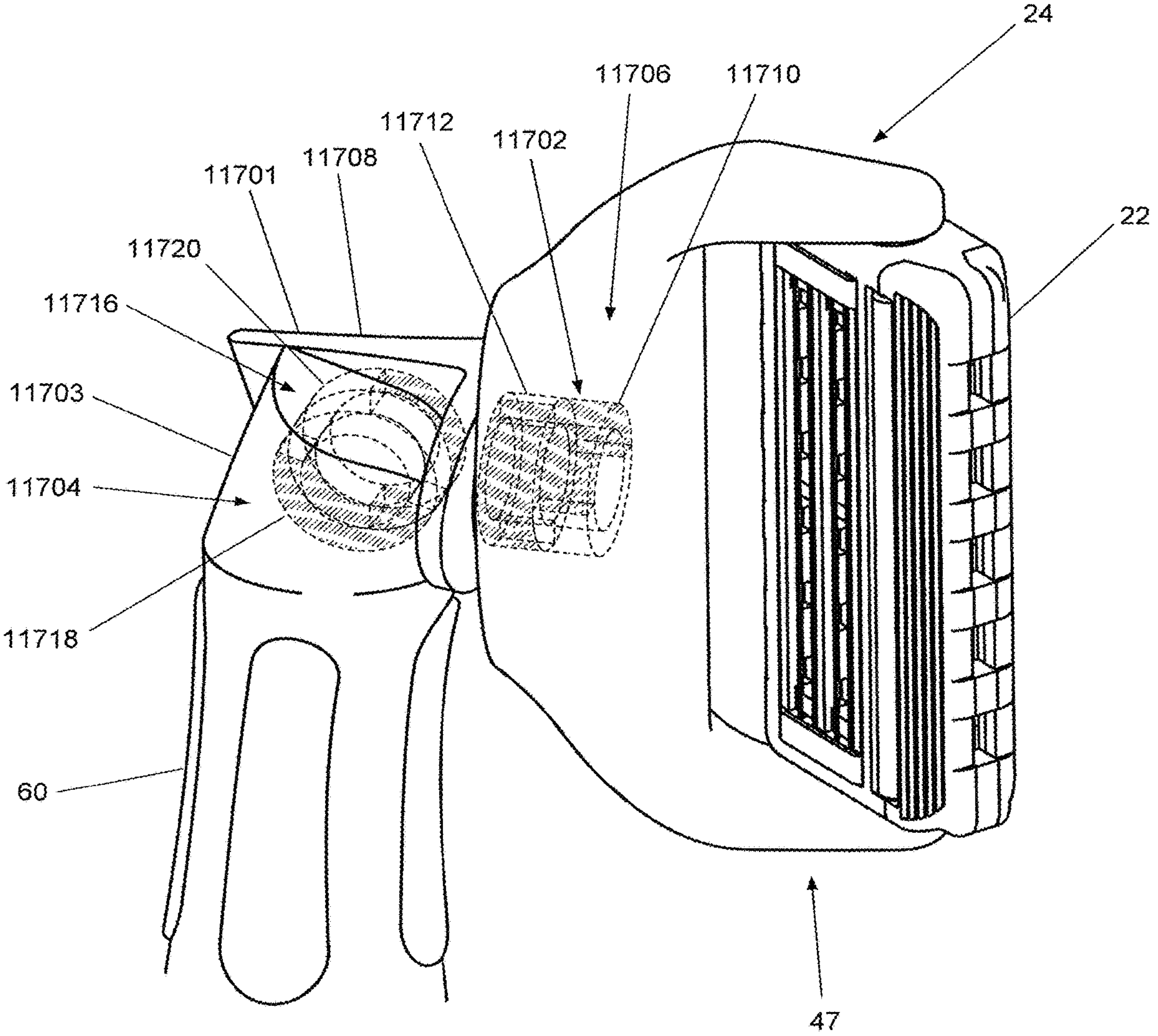
Figure 120:
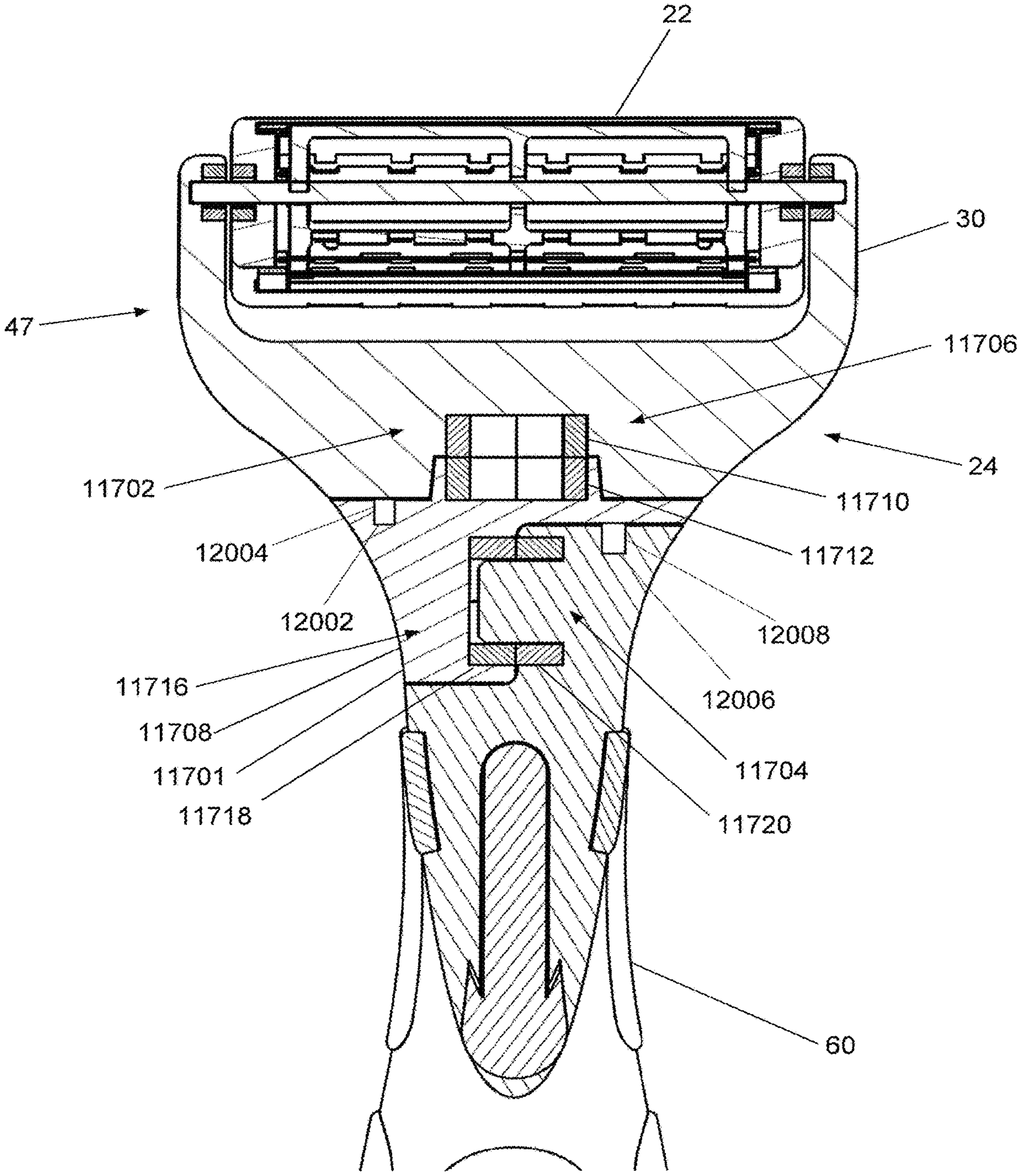
Figure 121:
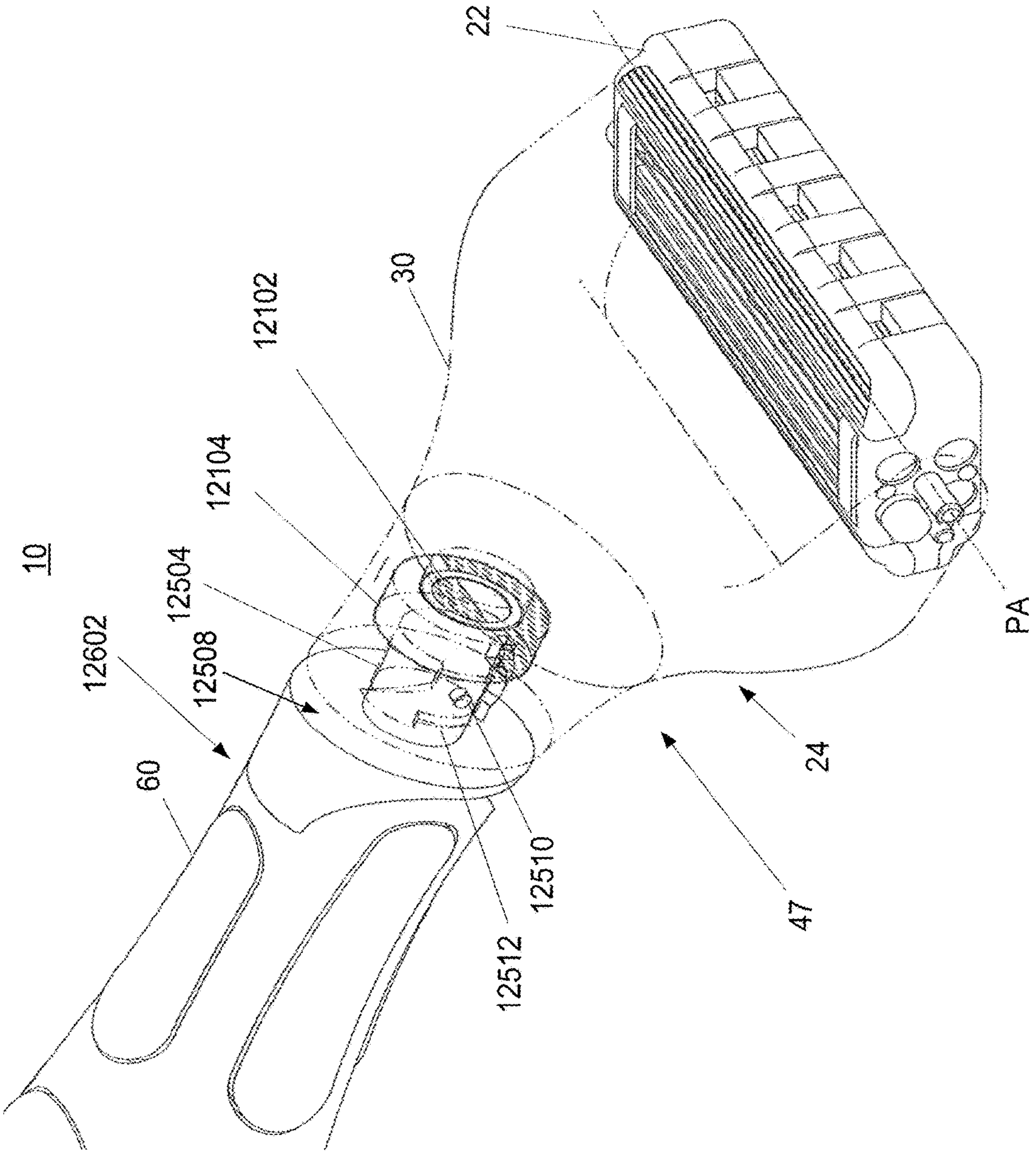
Figure 122:
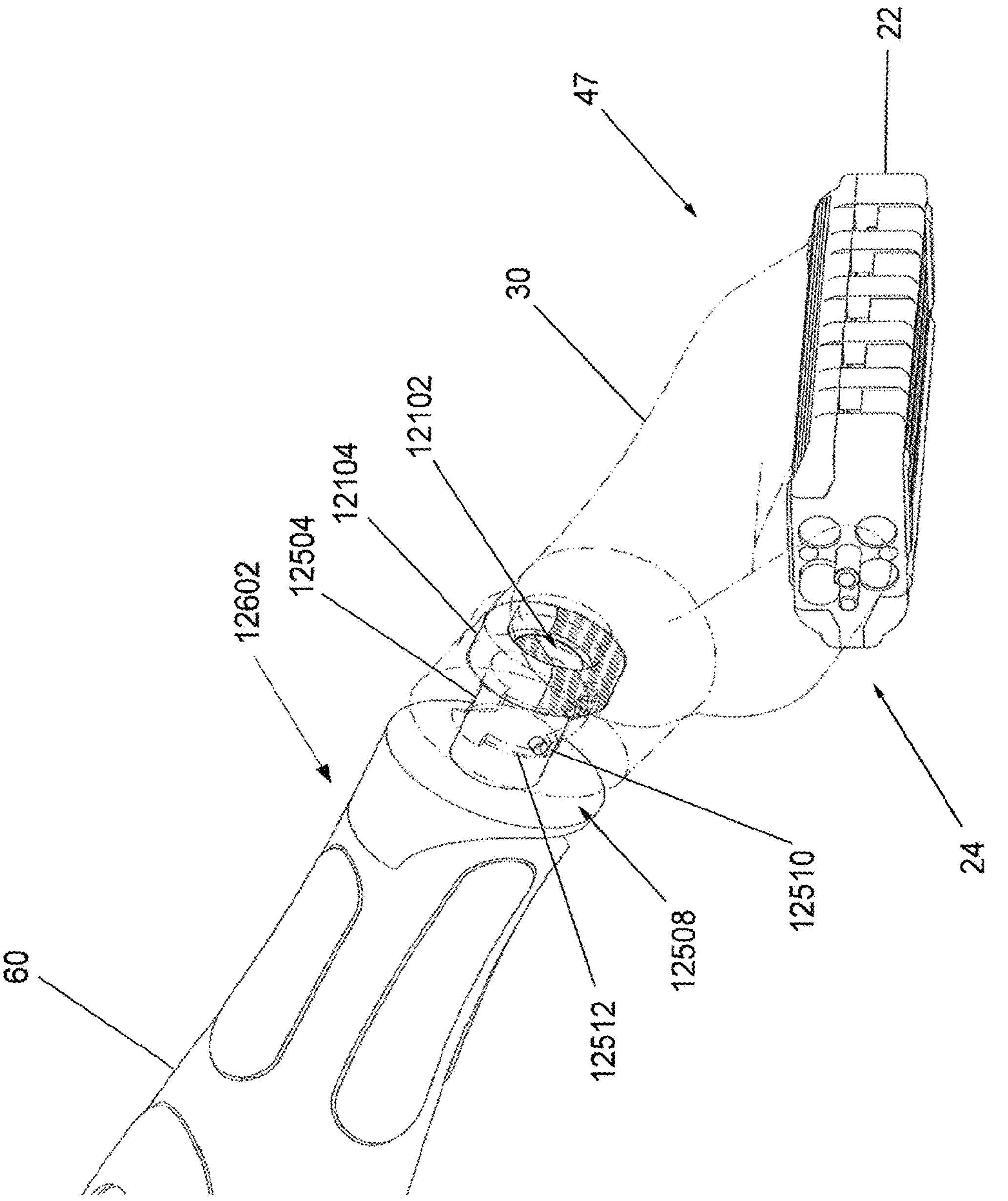
Figure 123:
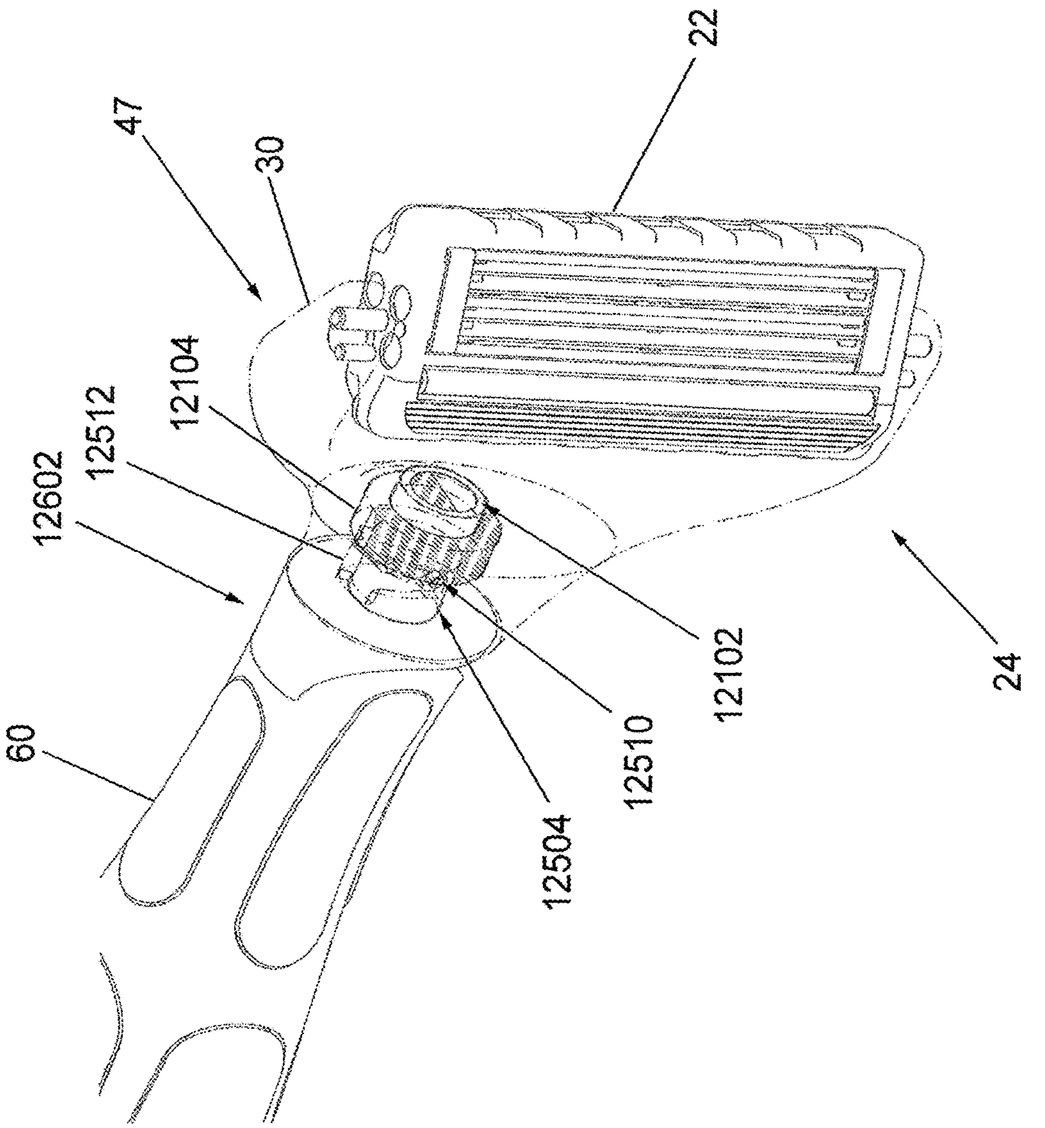
Figure 124:
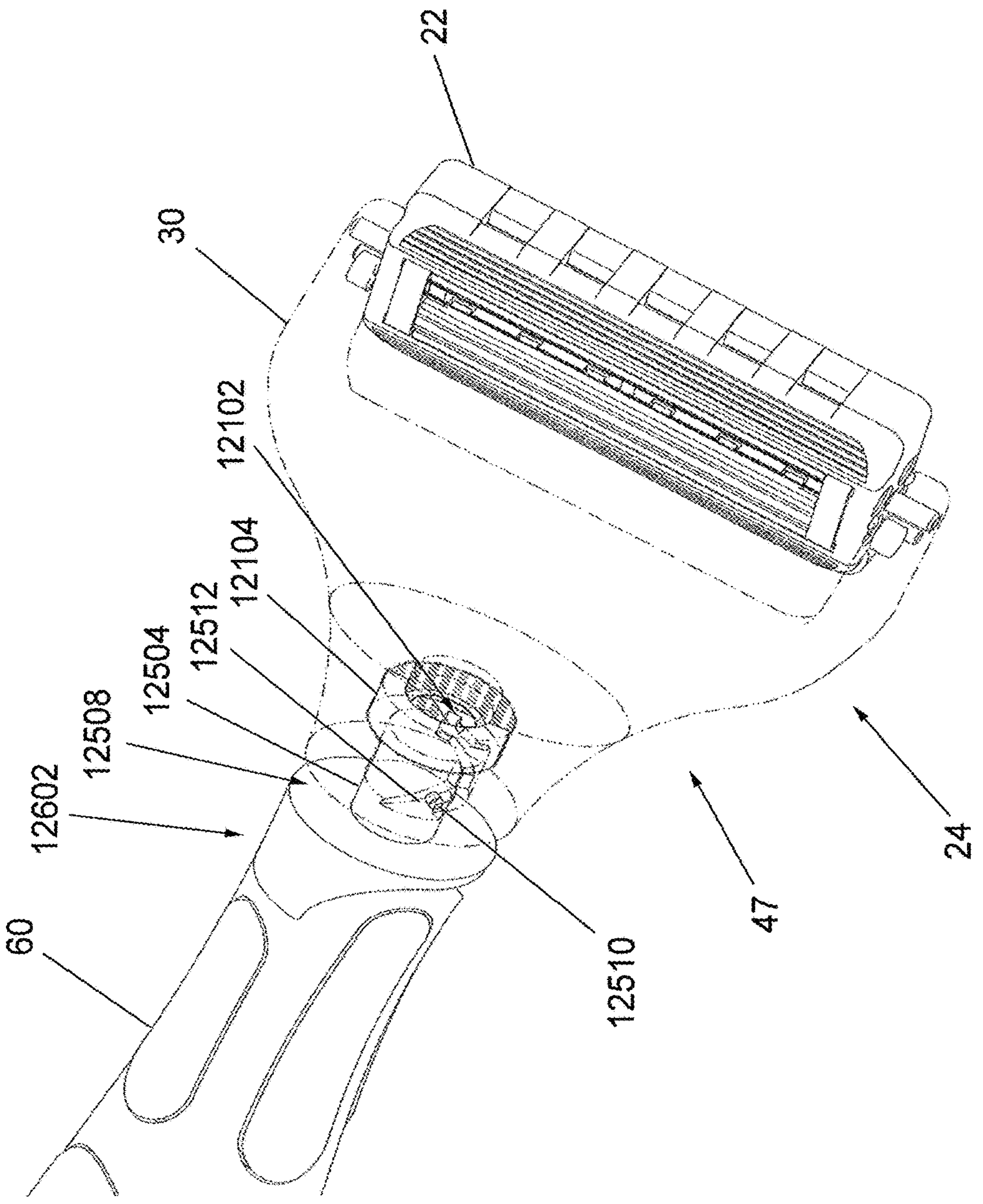
Figure 125A:
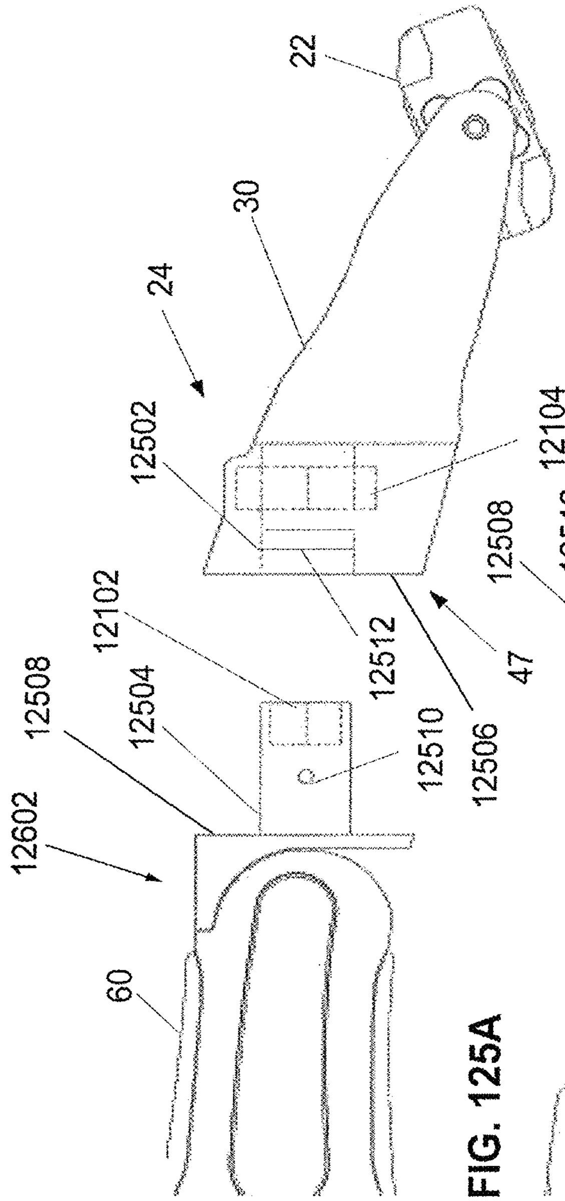
Figure 125B:
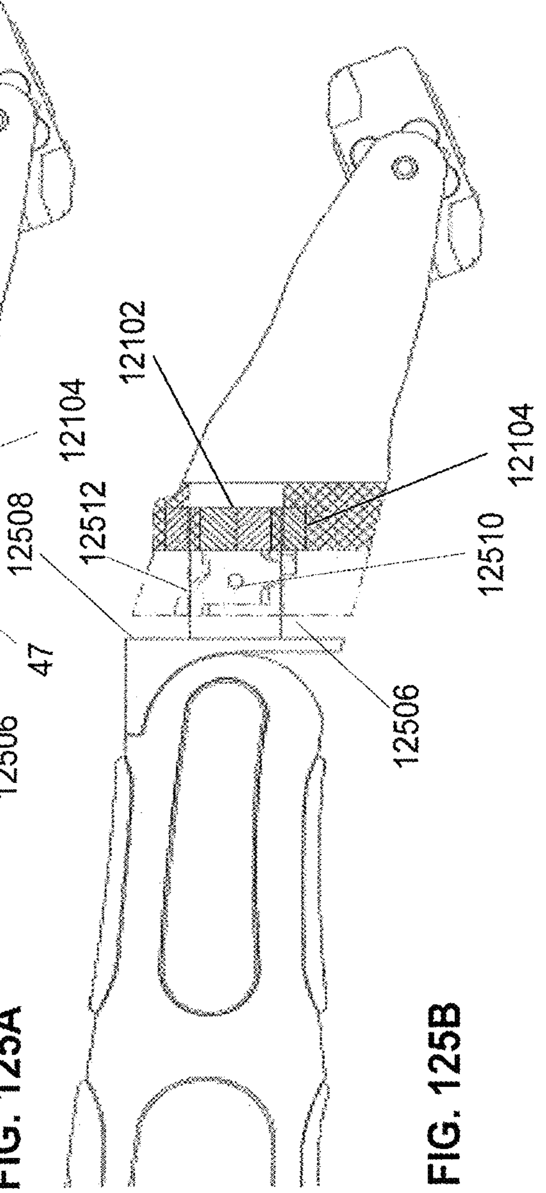
Figure 125E:
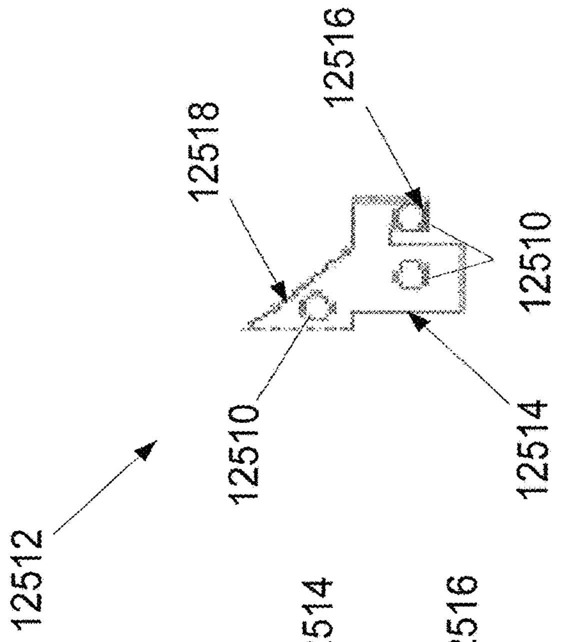
Figure 125D:
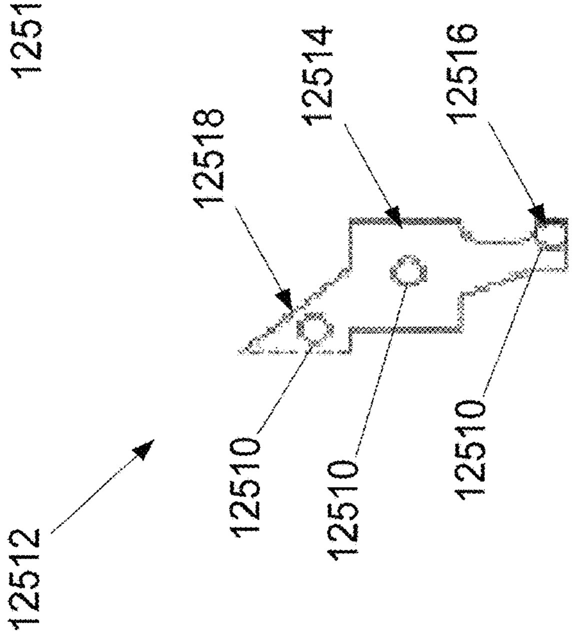
Figure 125C:
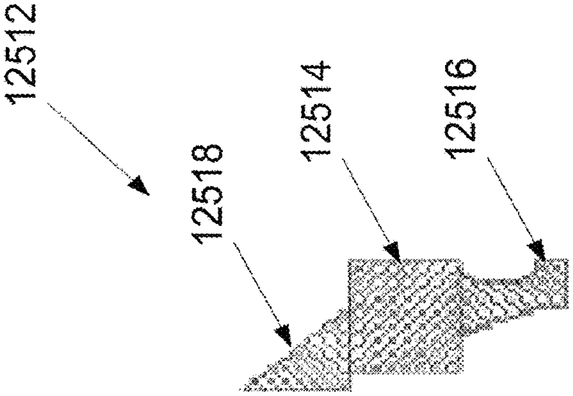
Figure 126:
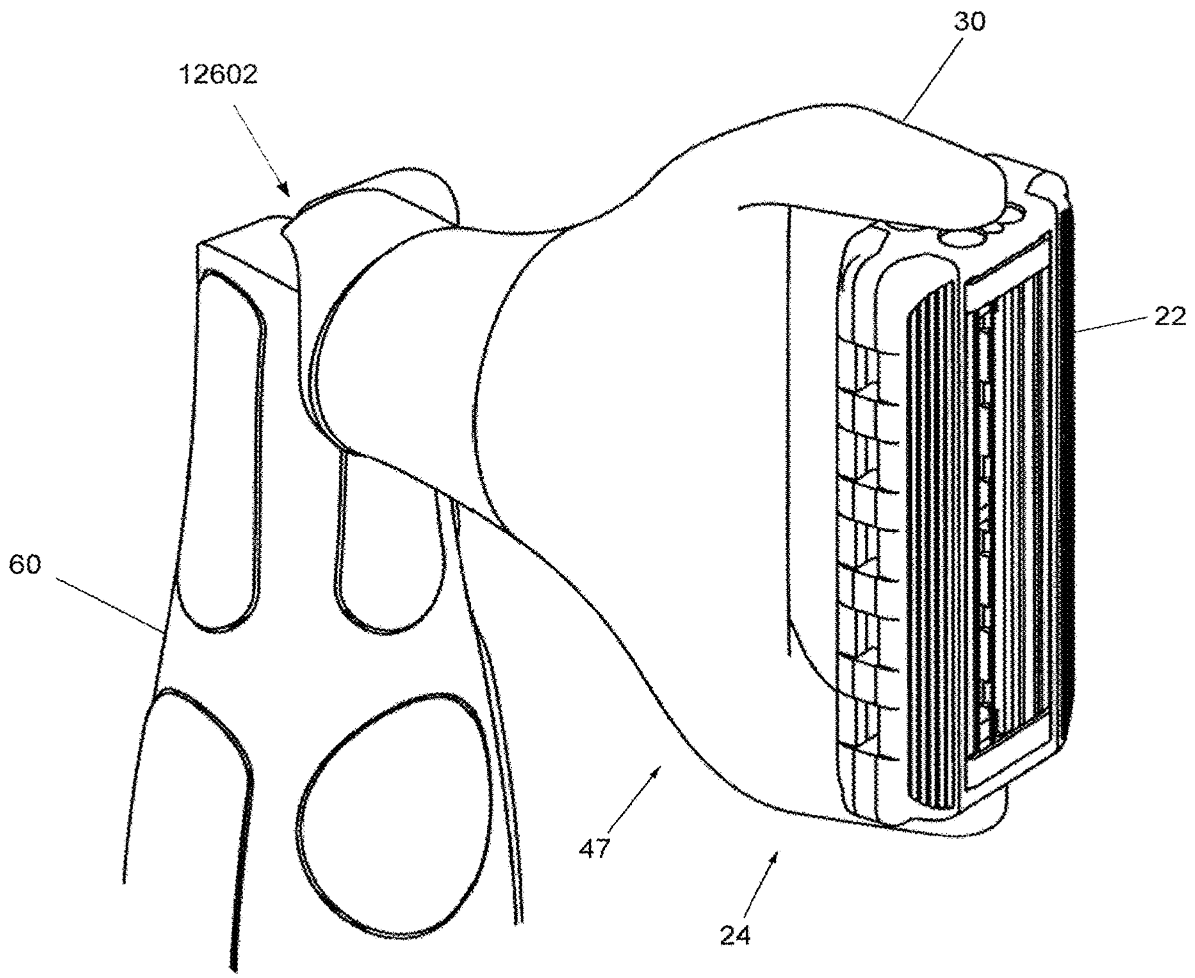
Figure 127:
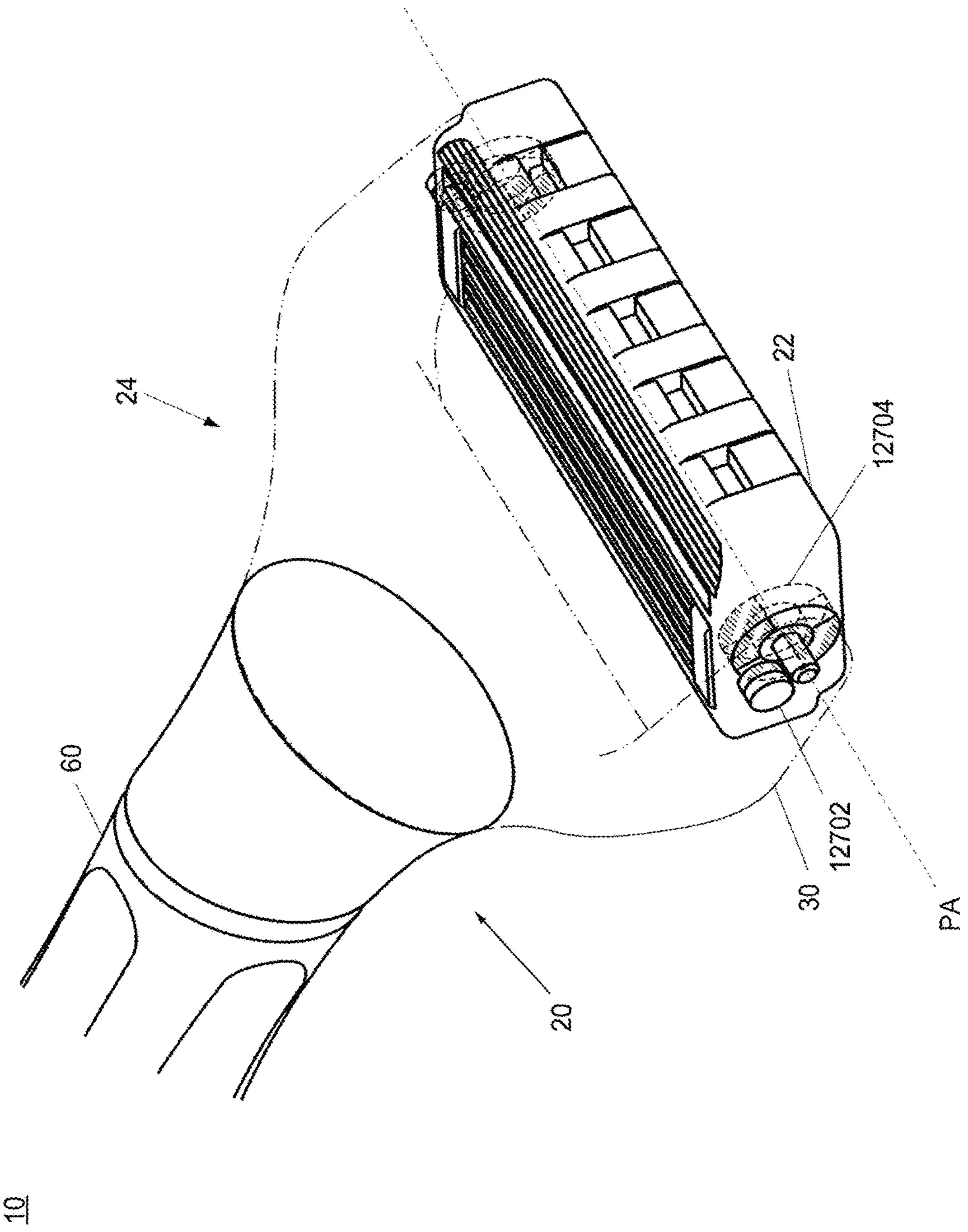
Figure 128:
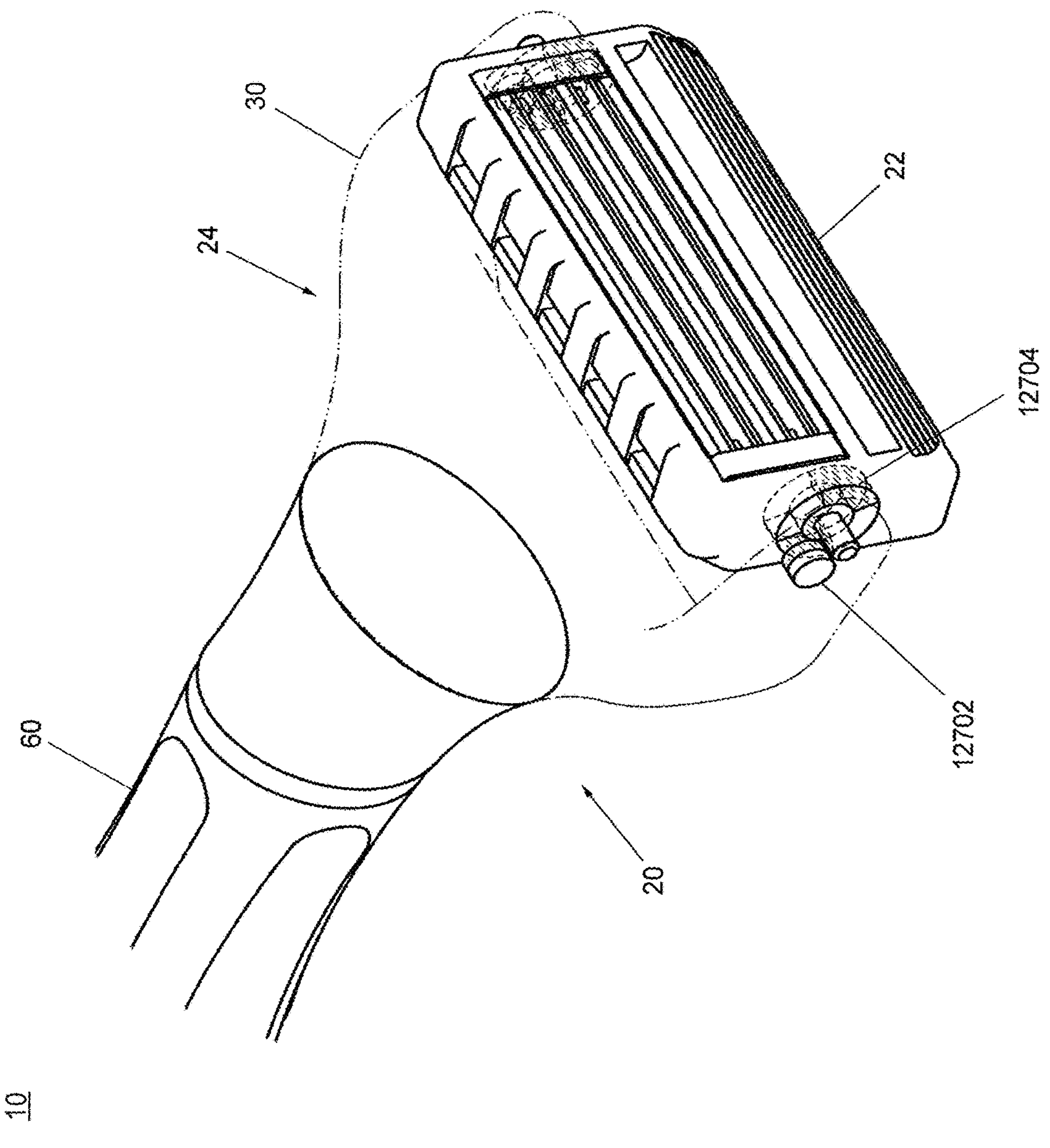
Figure 129:
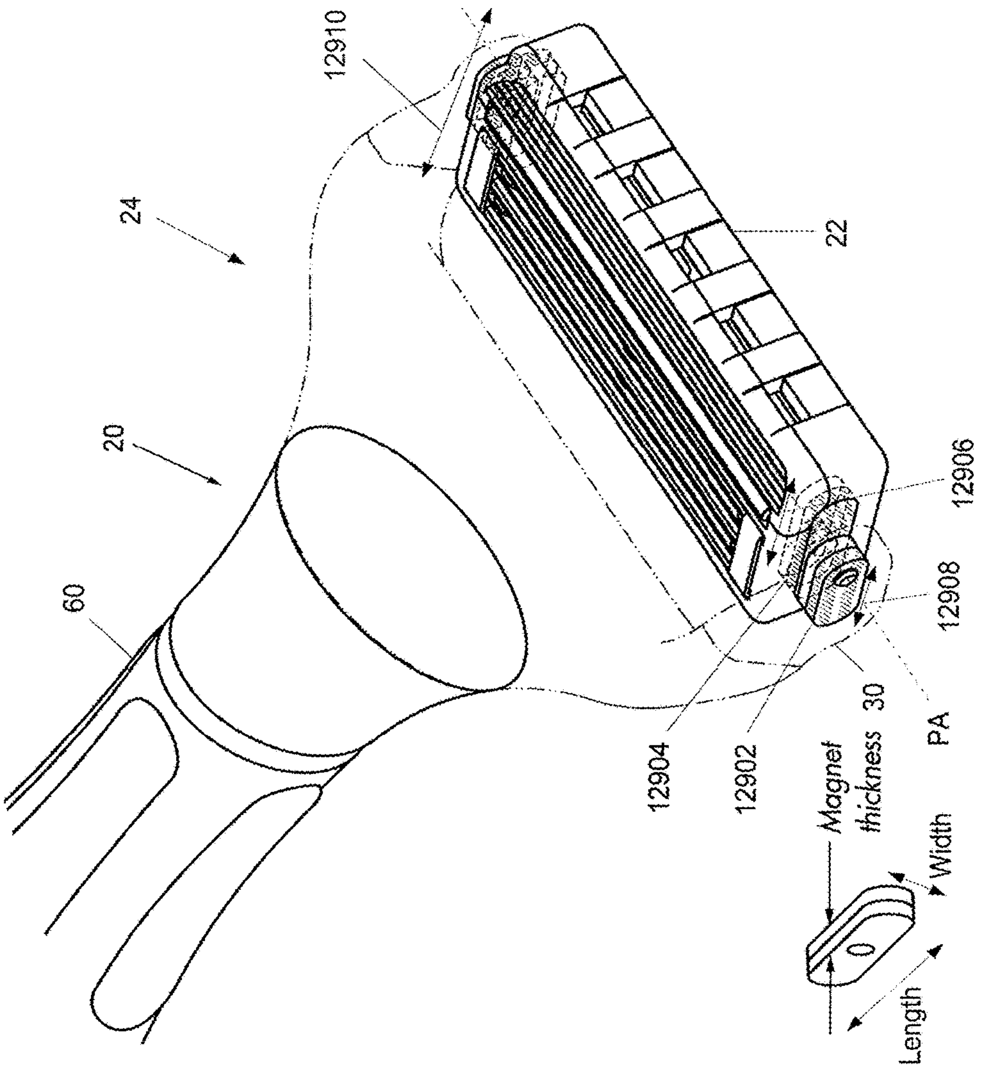
Figure 130:
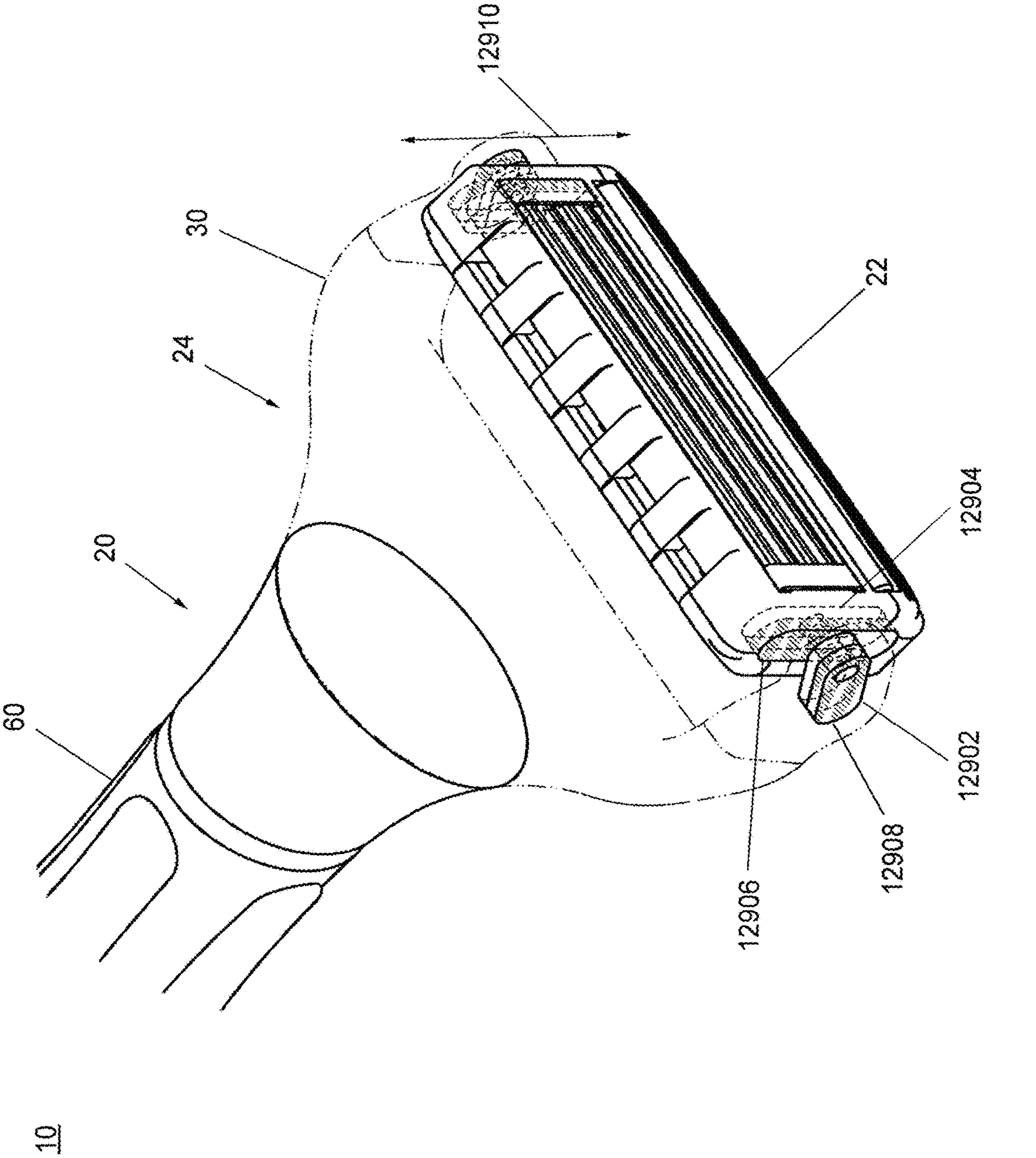
Figure 131:
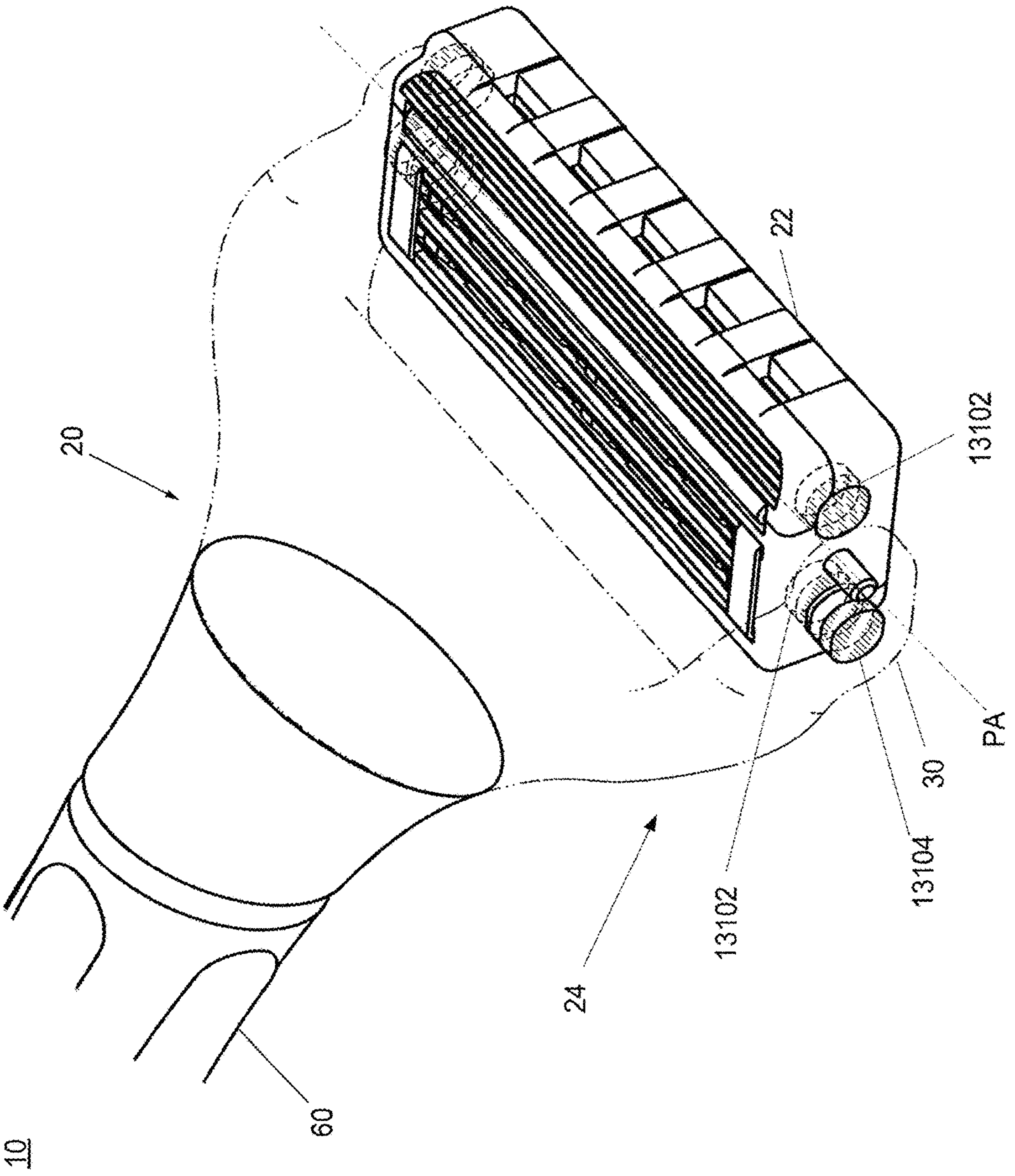
Figure 132:
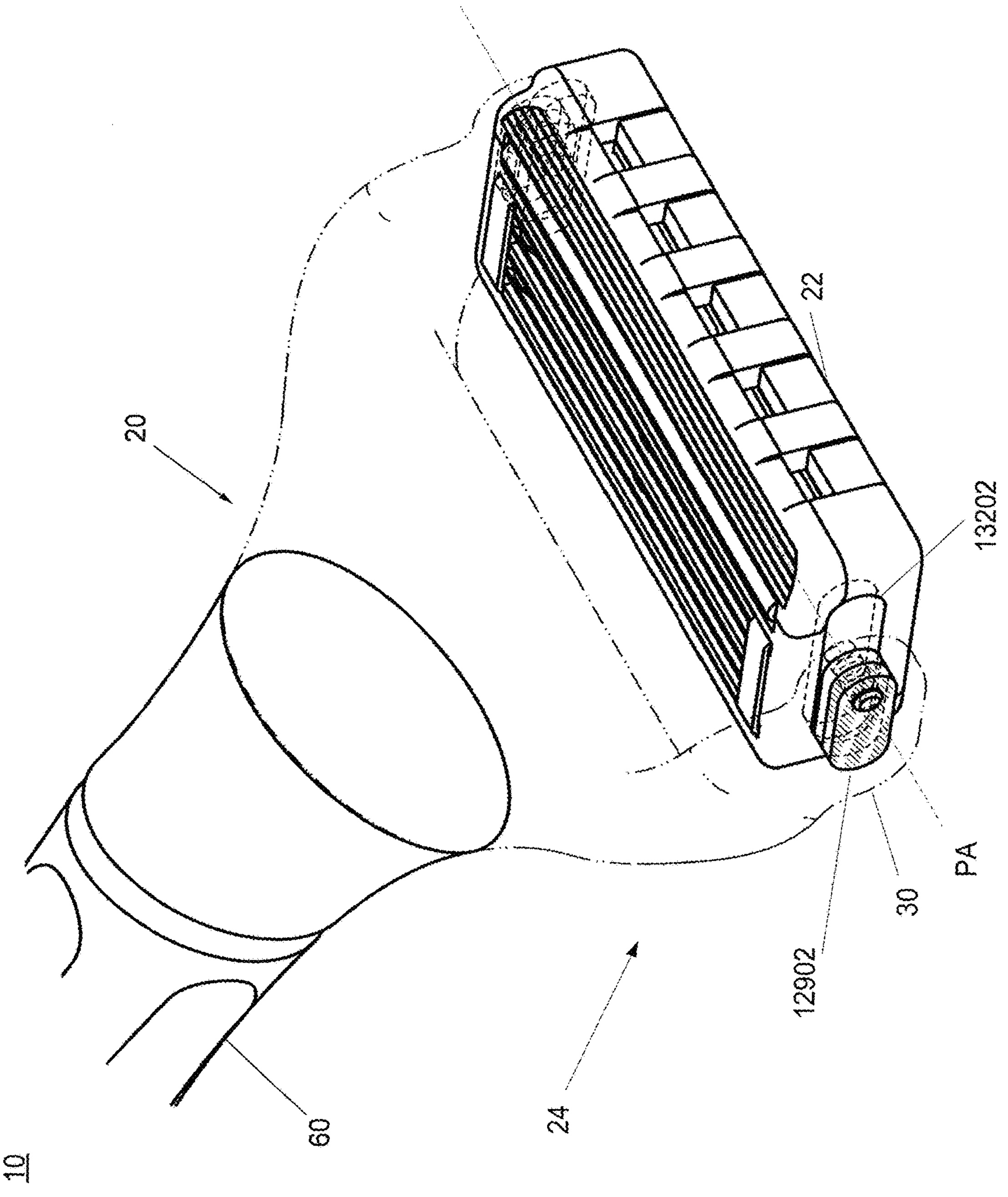
Figure 133:
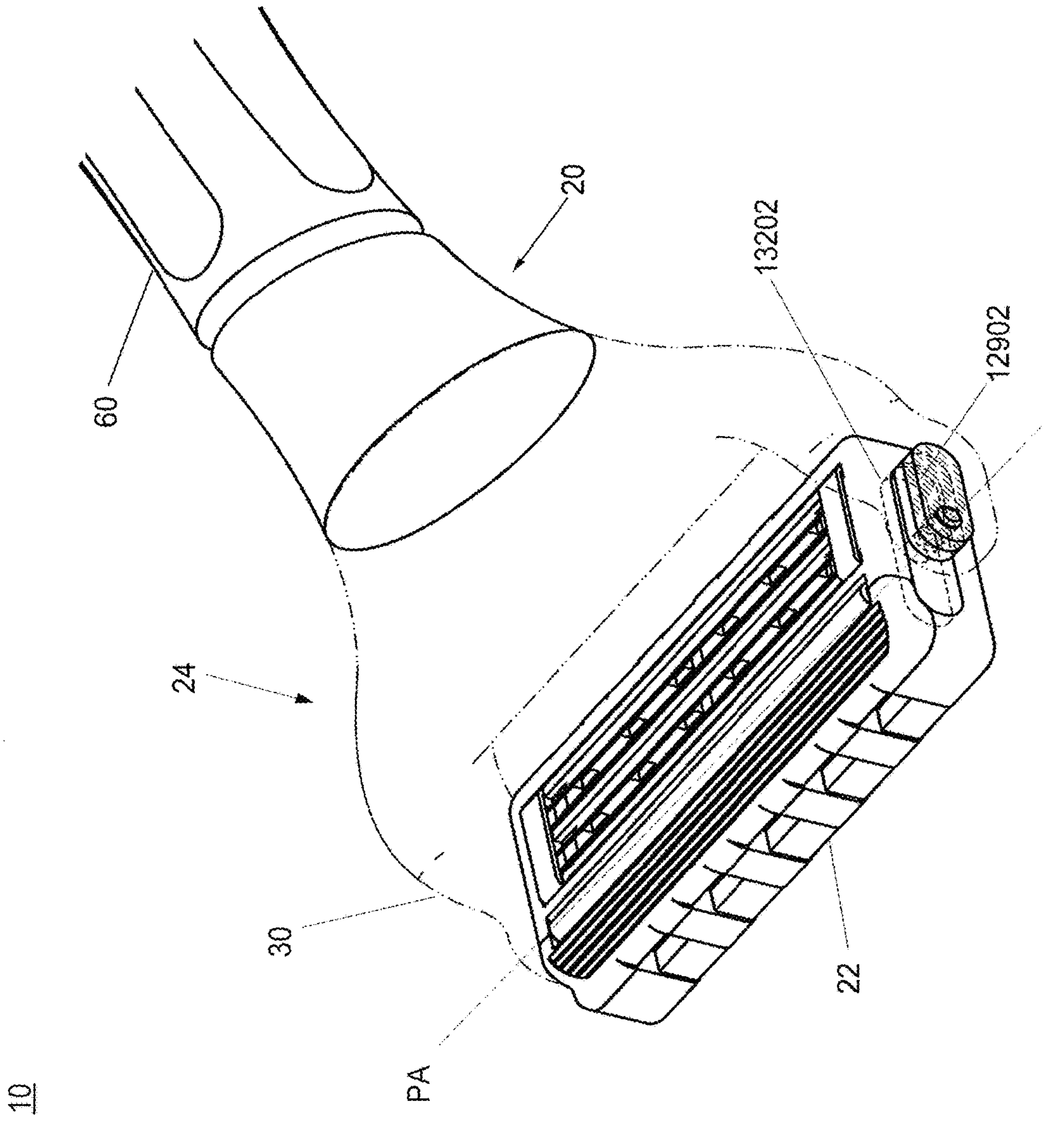
Figure 134:
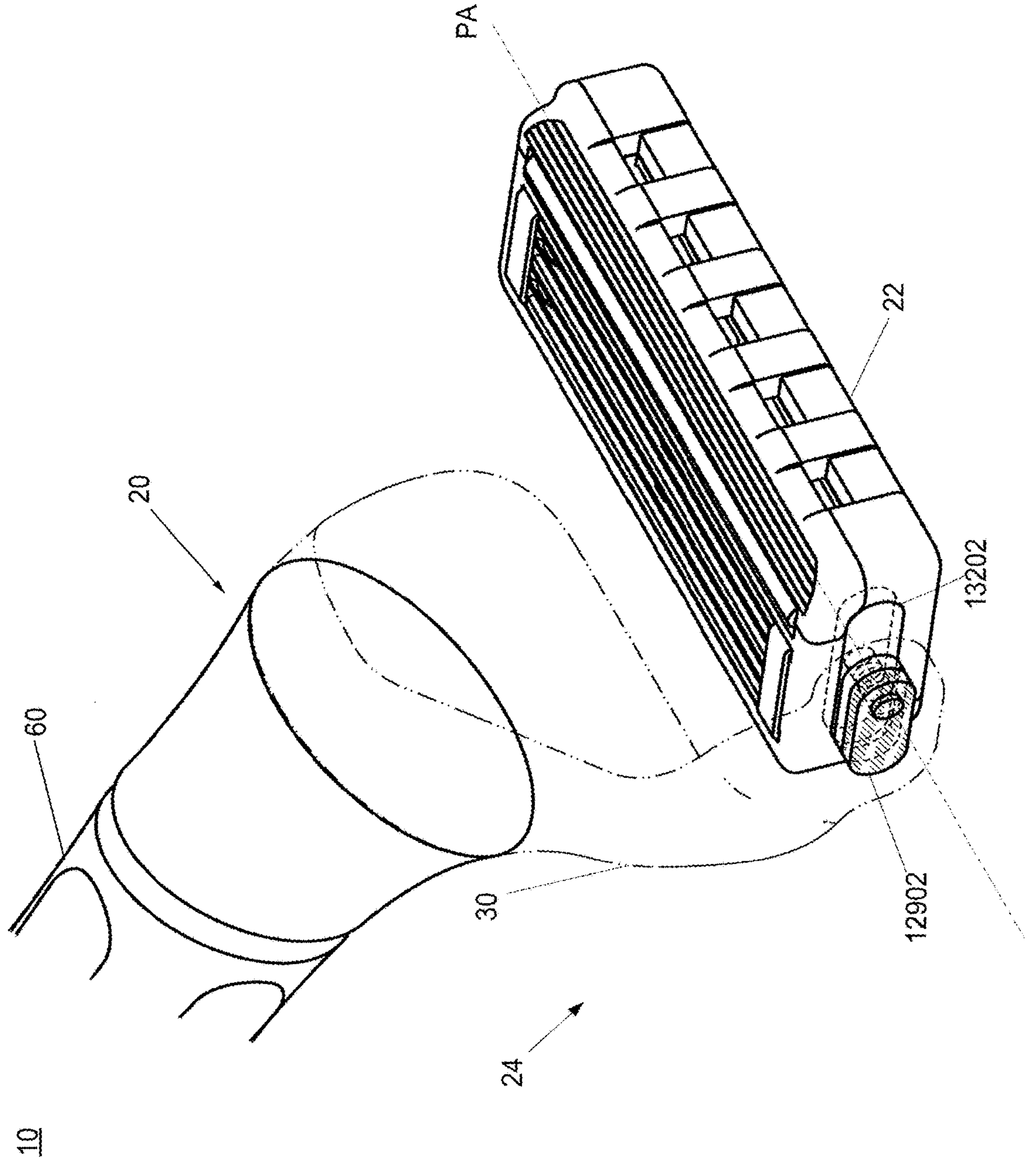
Figure 135:
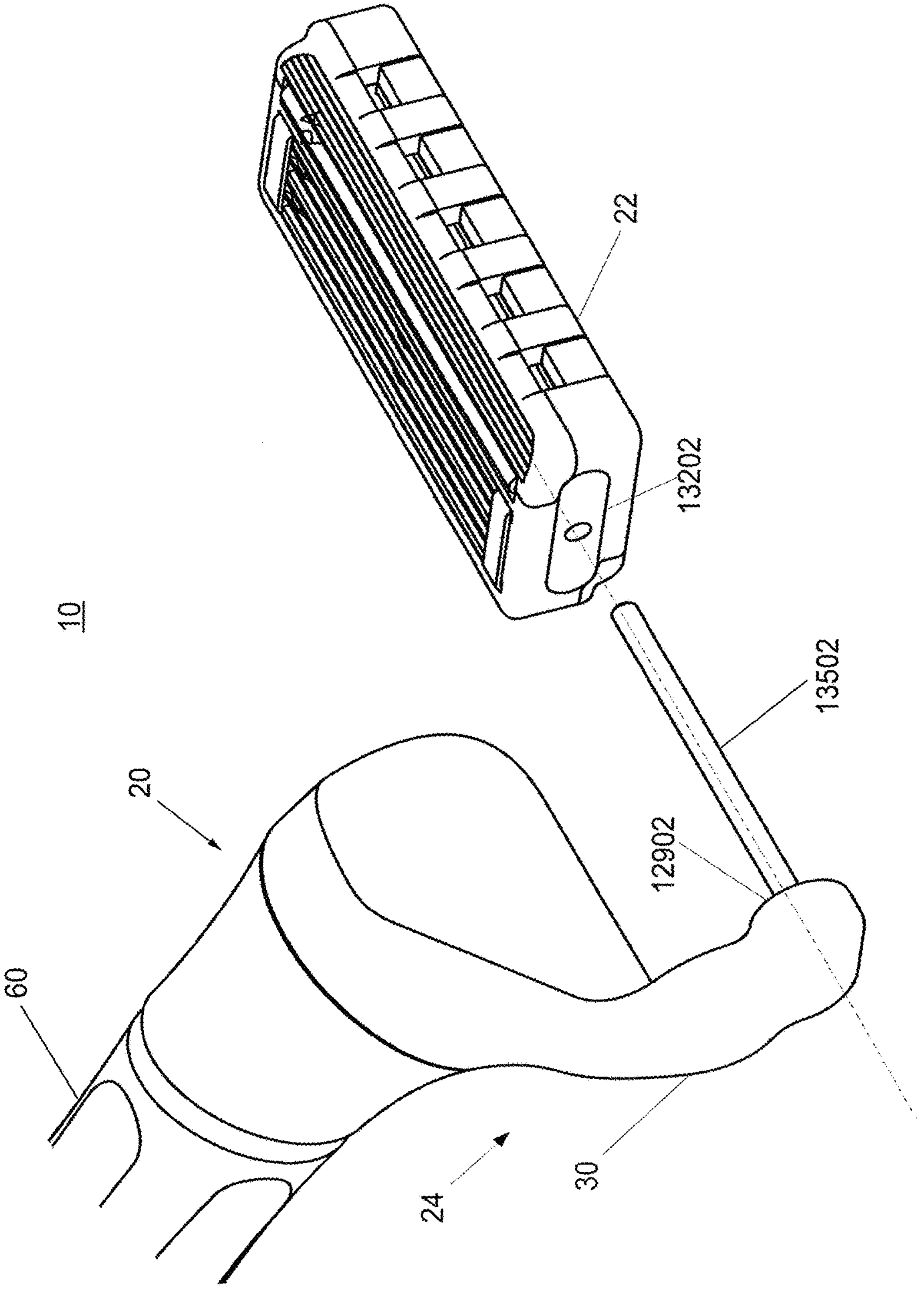
Figure 136:
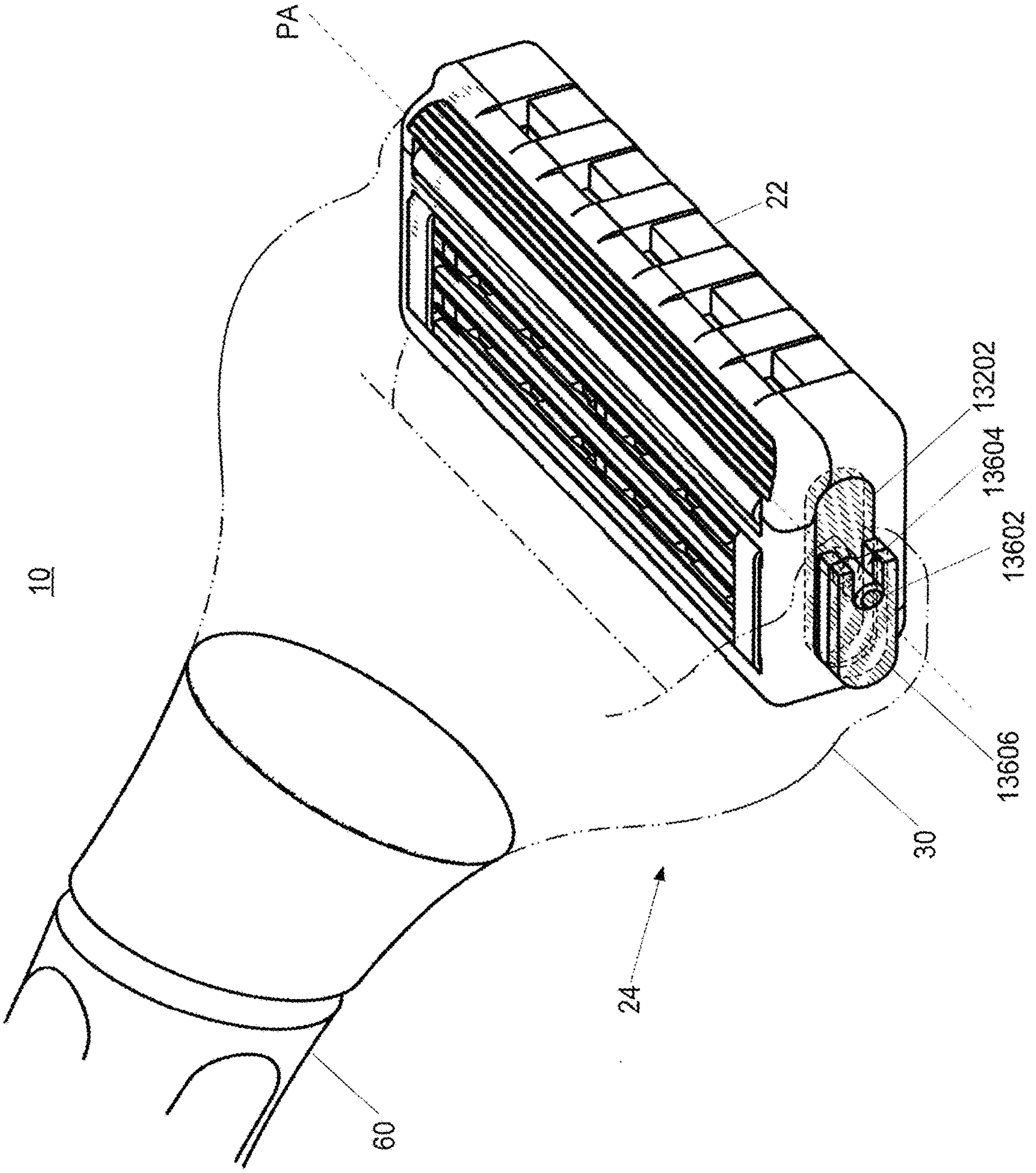
Figure 137:
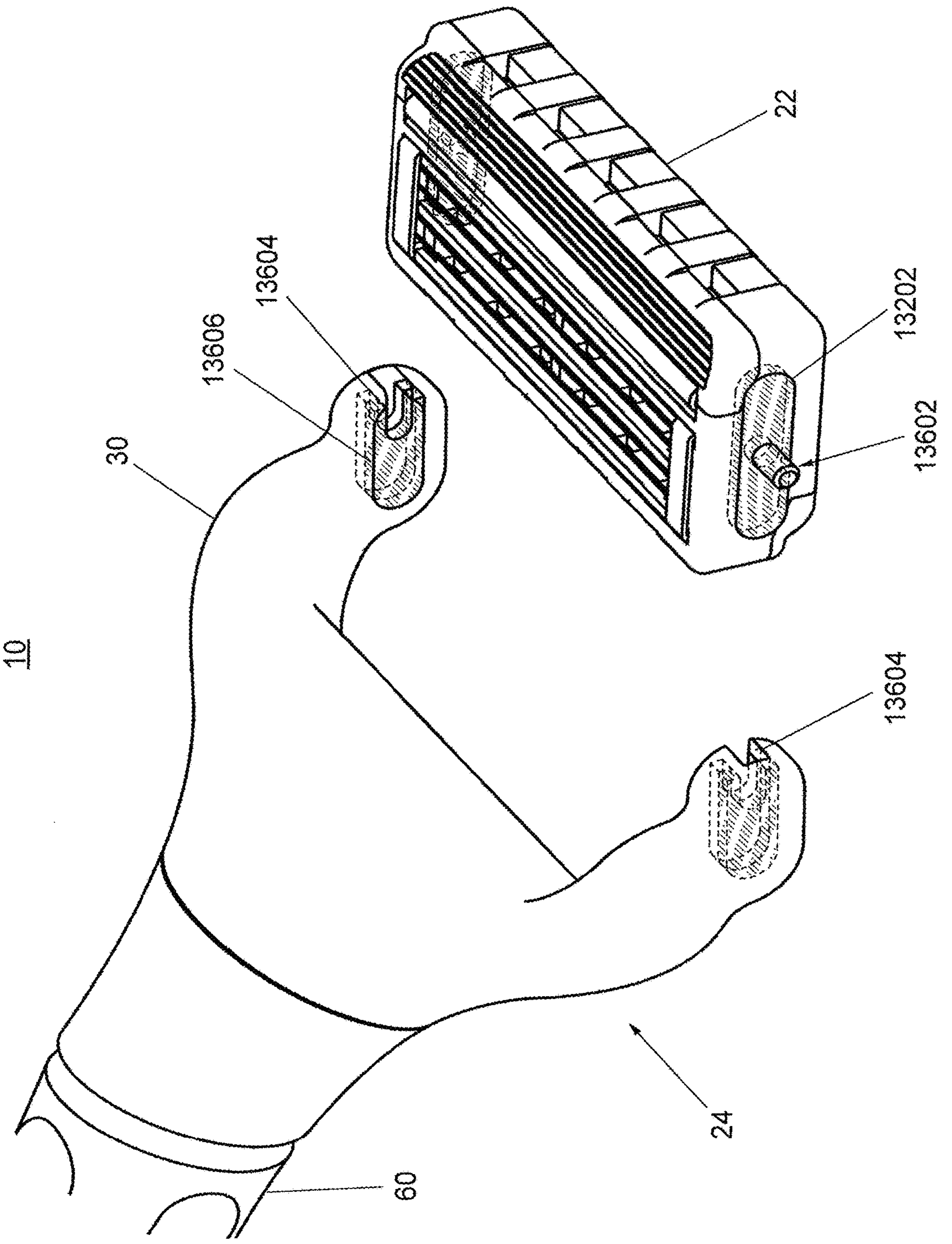
Figure 138:
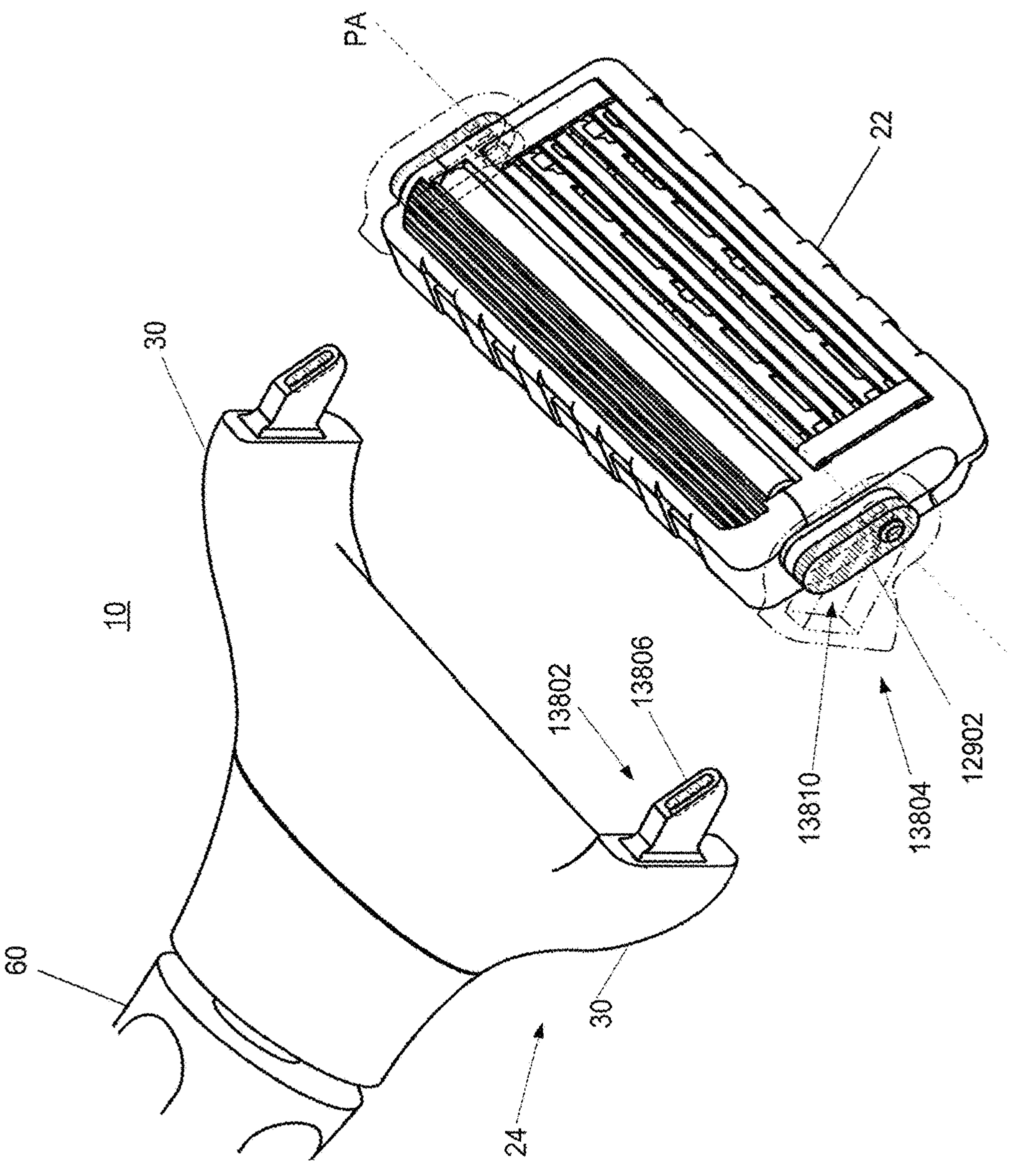
Figure 139:
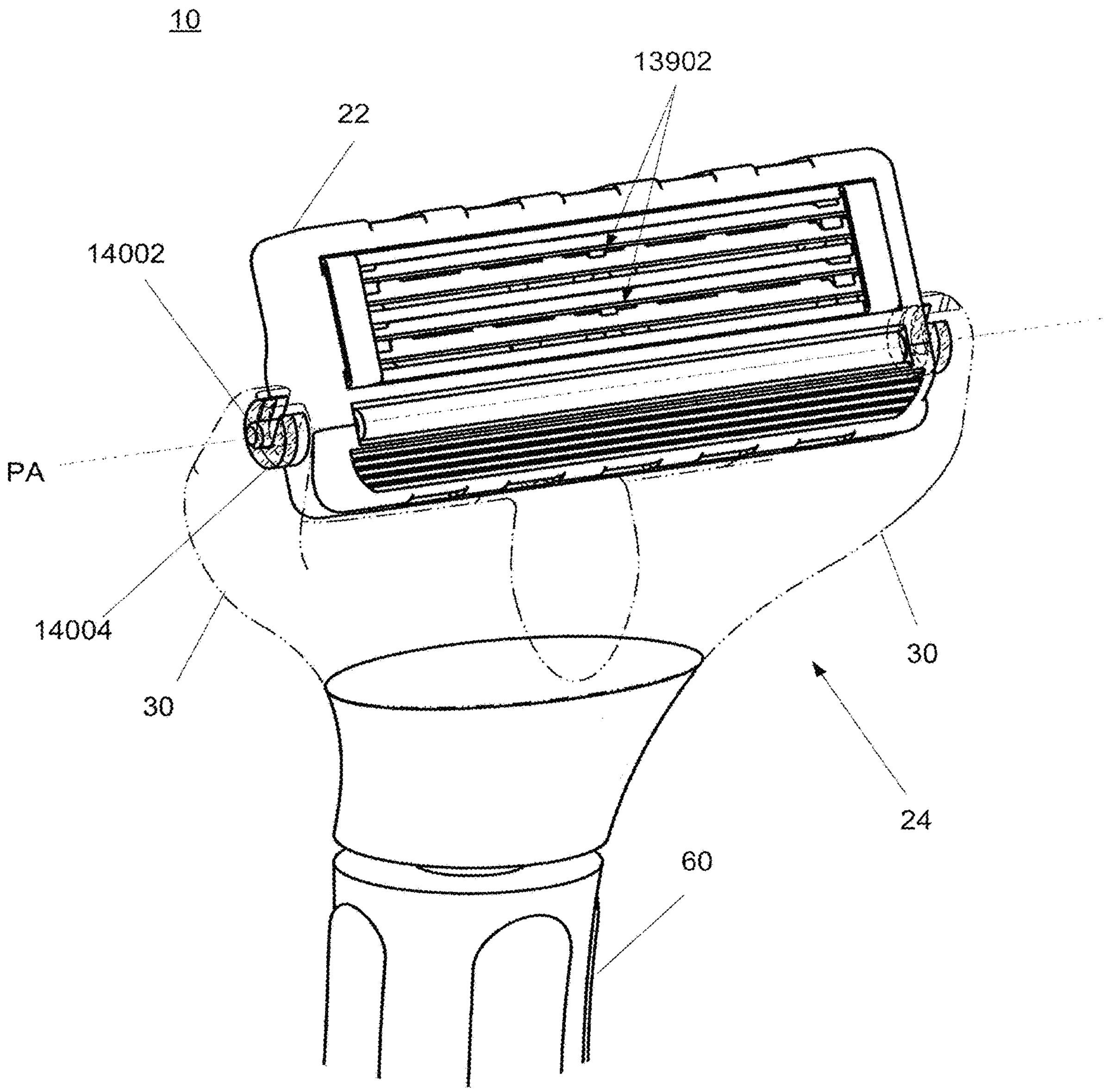
Figure 140:
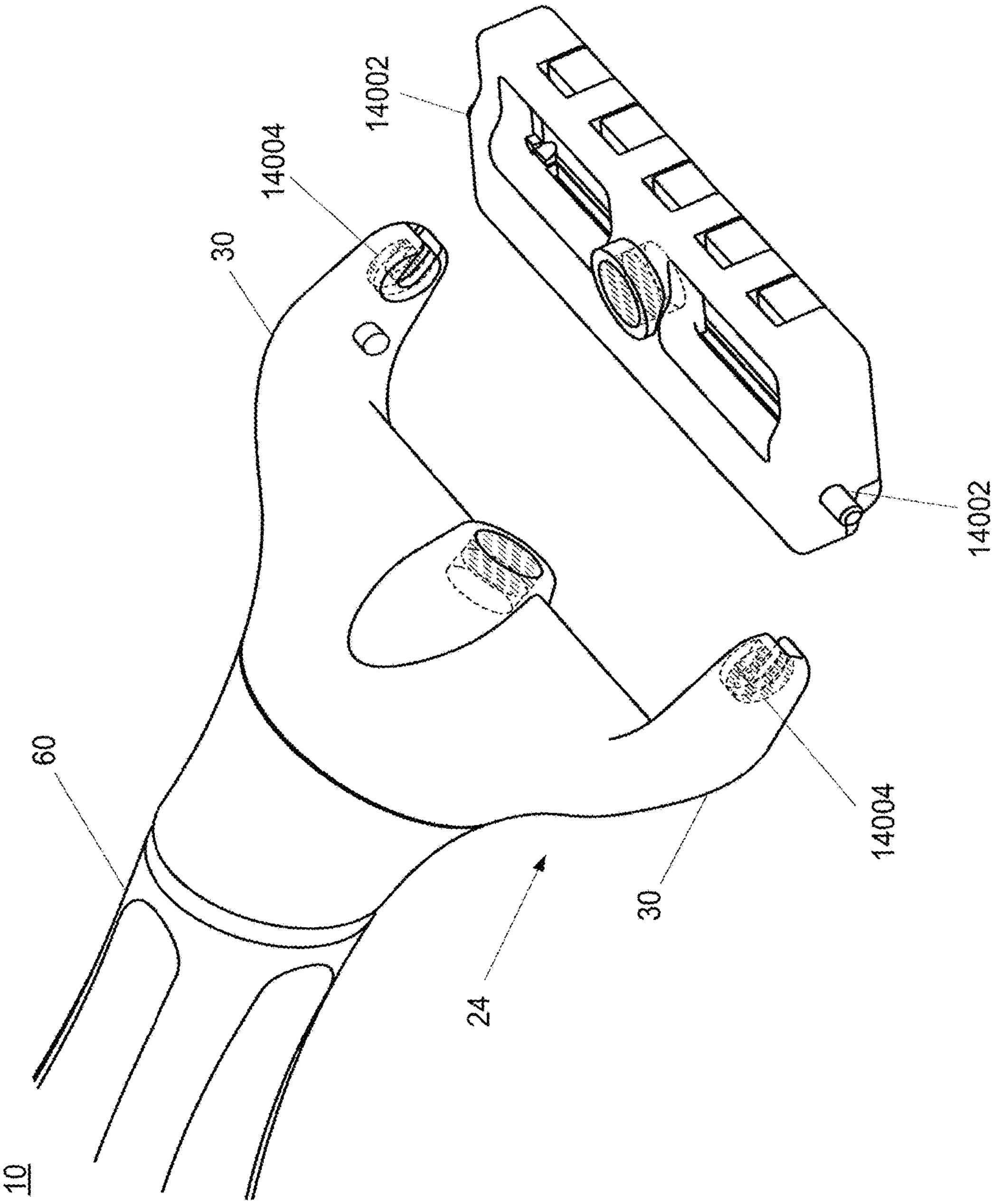
Figure 141:
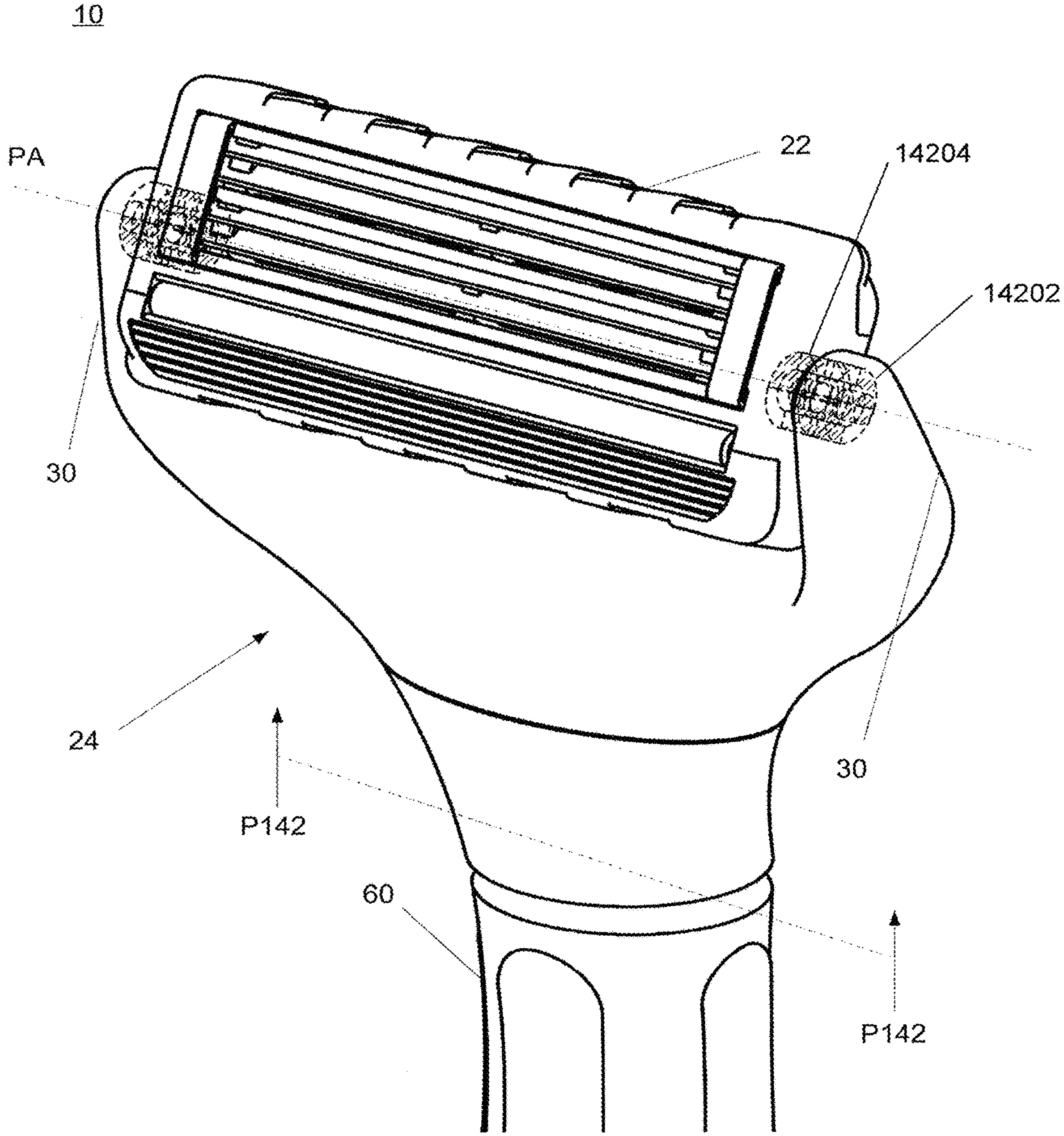
Figure 142:
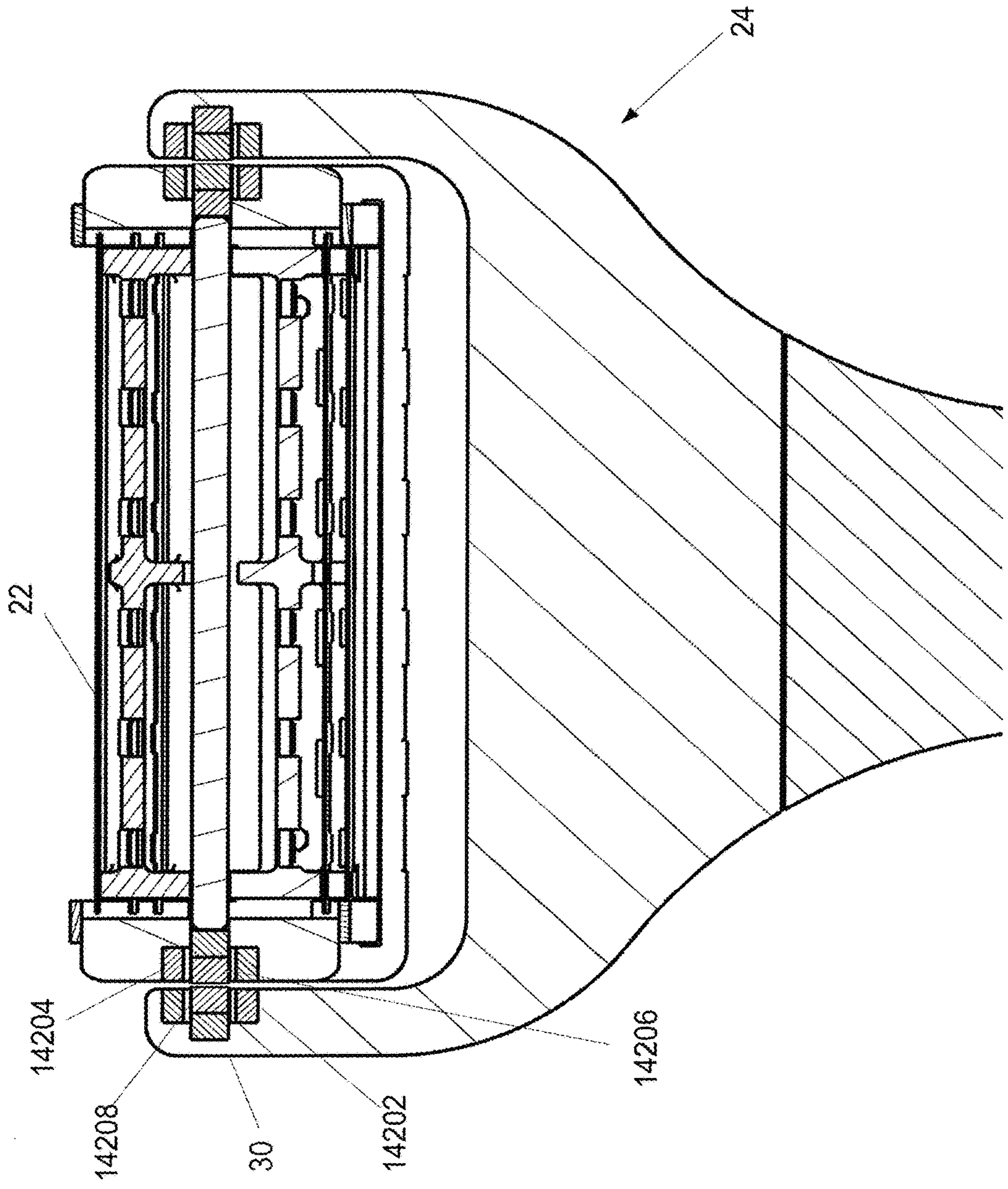
Figure 143:
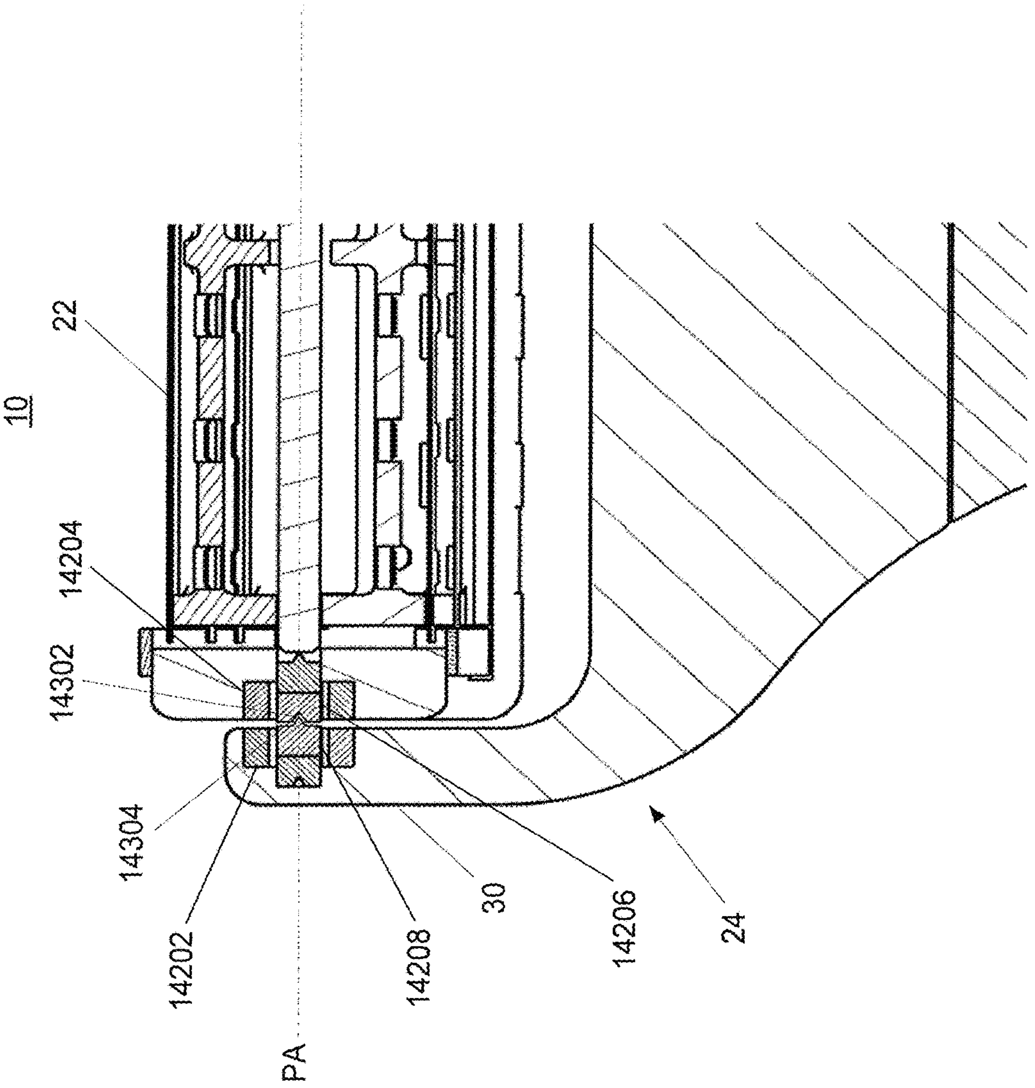
Figure 144D:
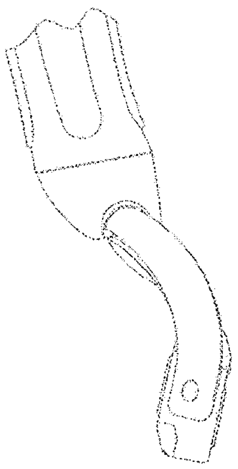
Figure 144E:
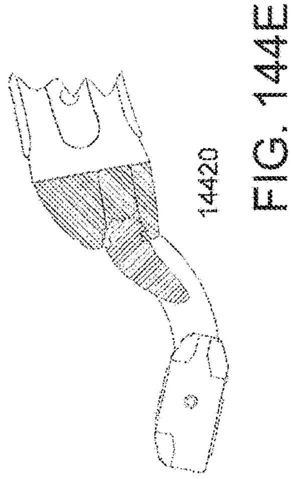
Figure 144C:
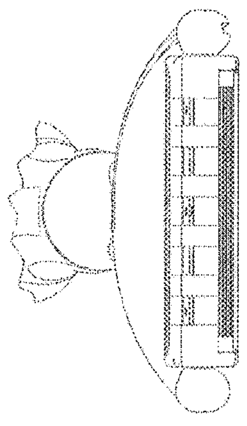
Figure 144B:
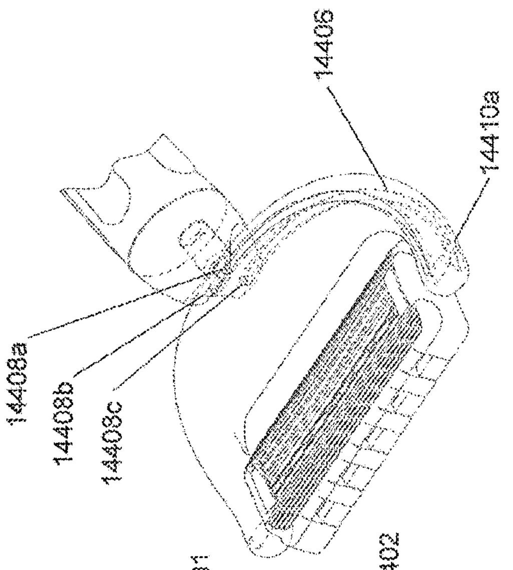
Figure 144A:
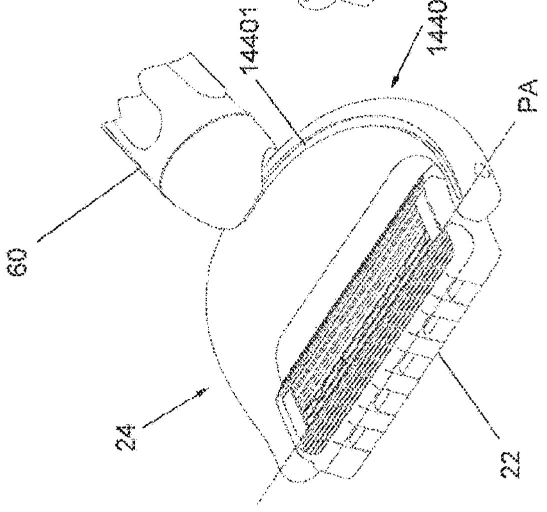
Figure 145D:
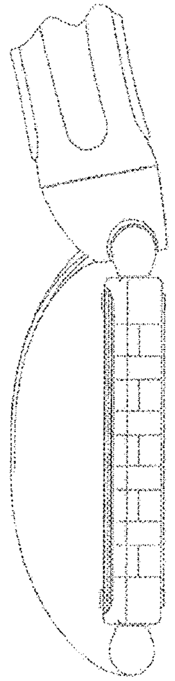
Figure 145E:
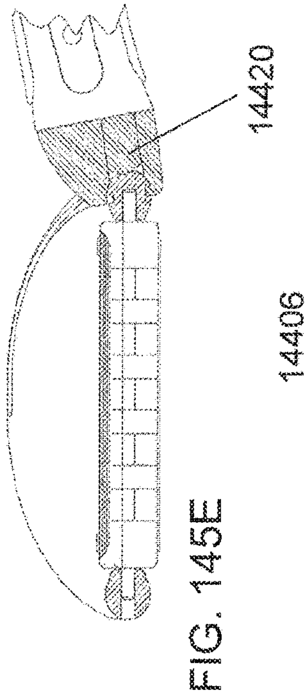
Figure 145B:
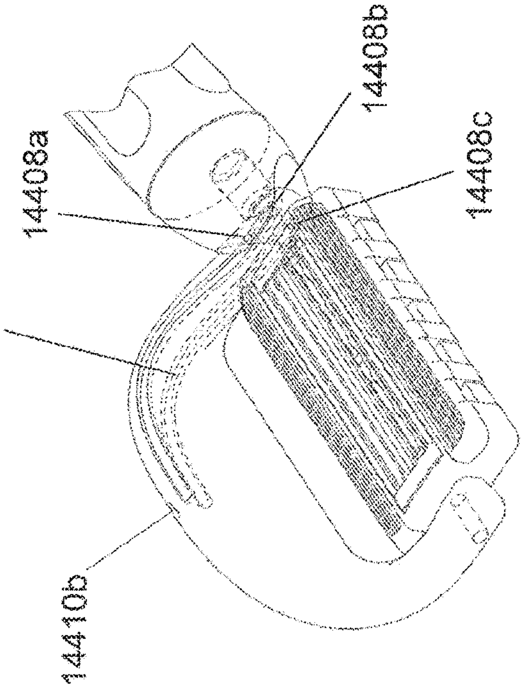
Figure 145C:
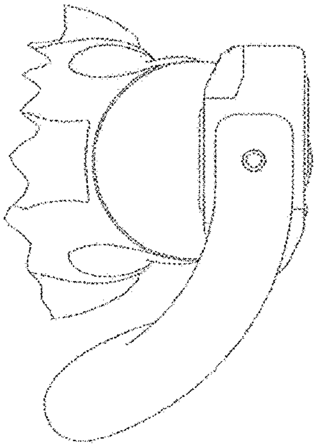
Figure 145A:
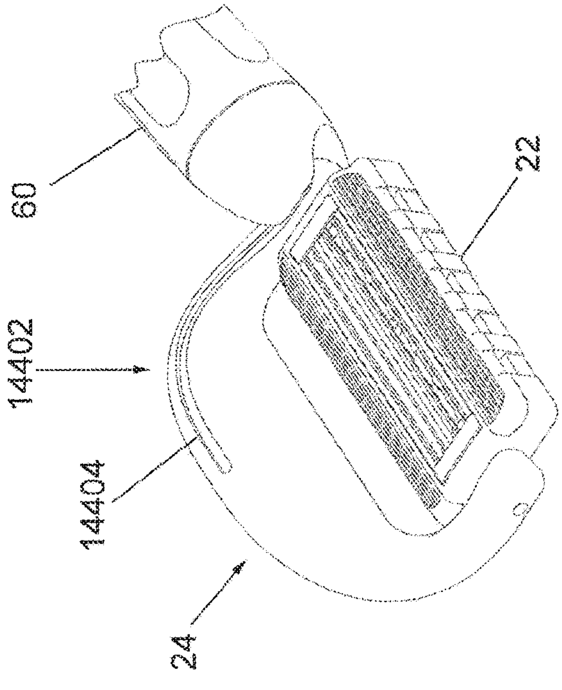
Figure 146C:
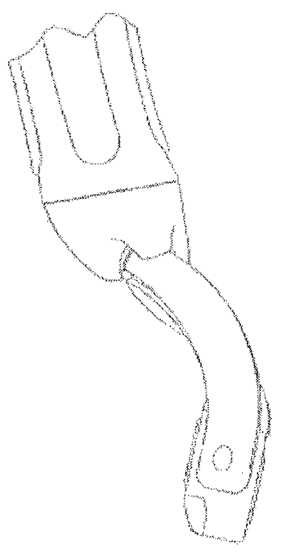
Figure 146B:
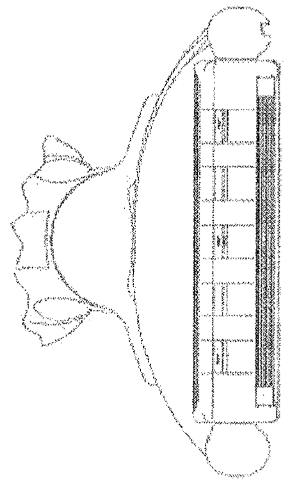
Figure 146A:
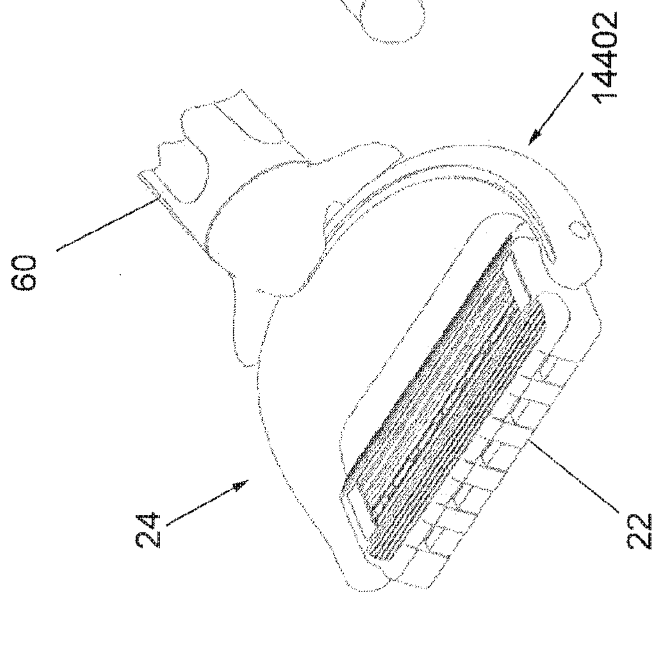
Figure 147:
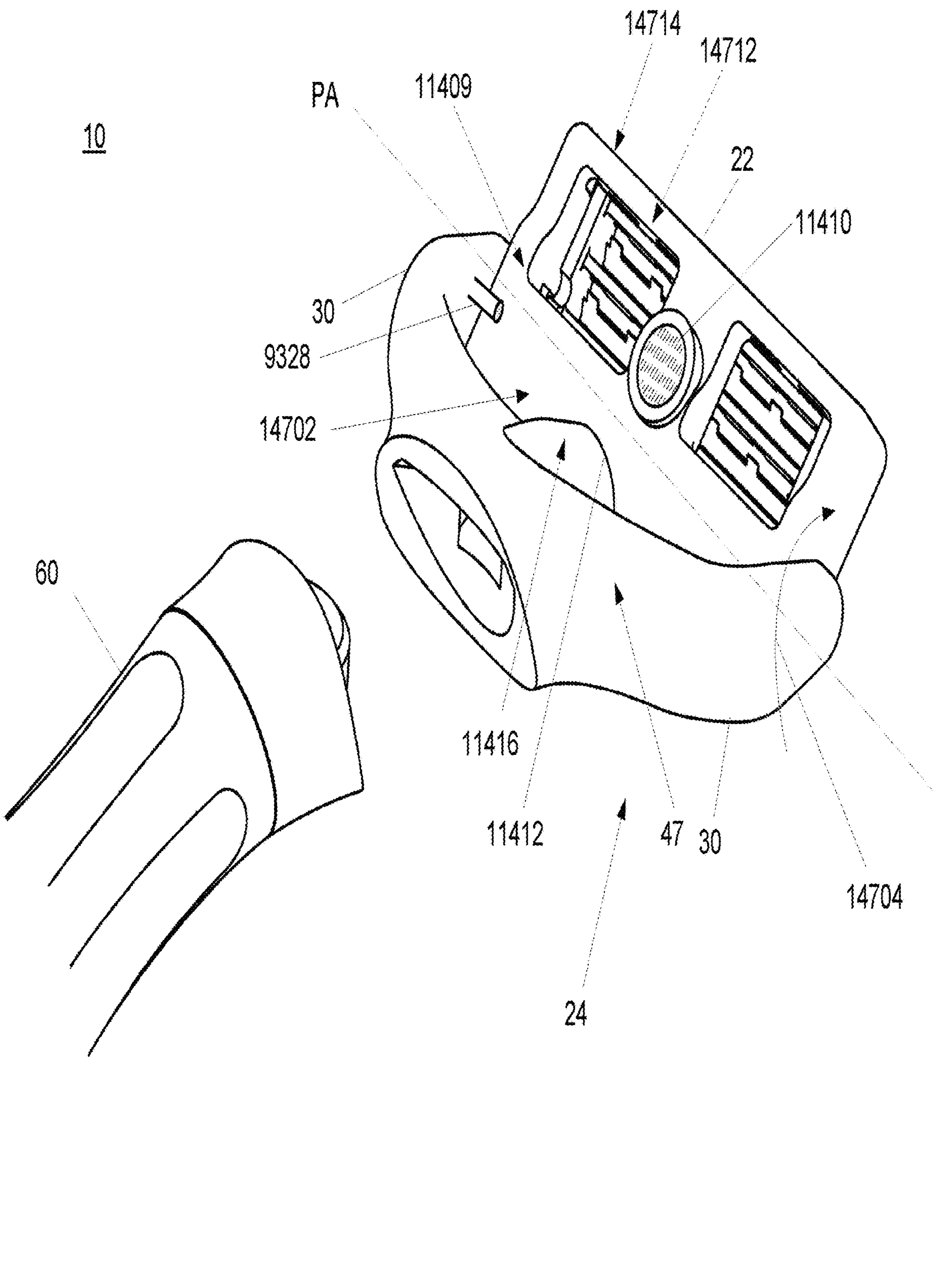
Figure 148:
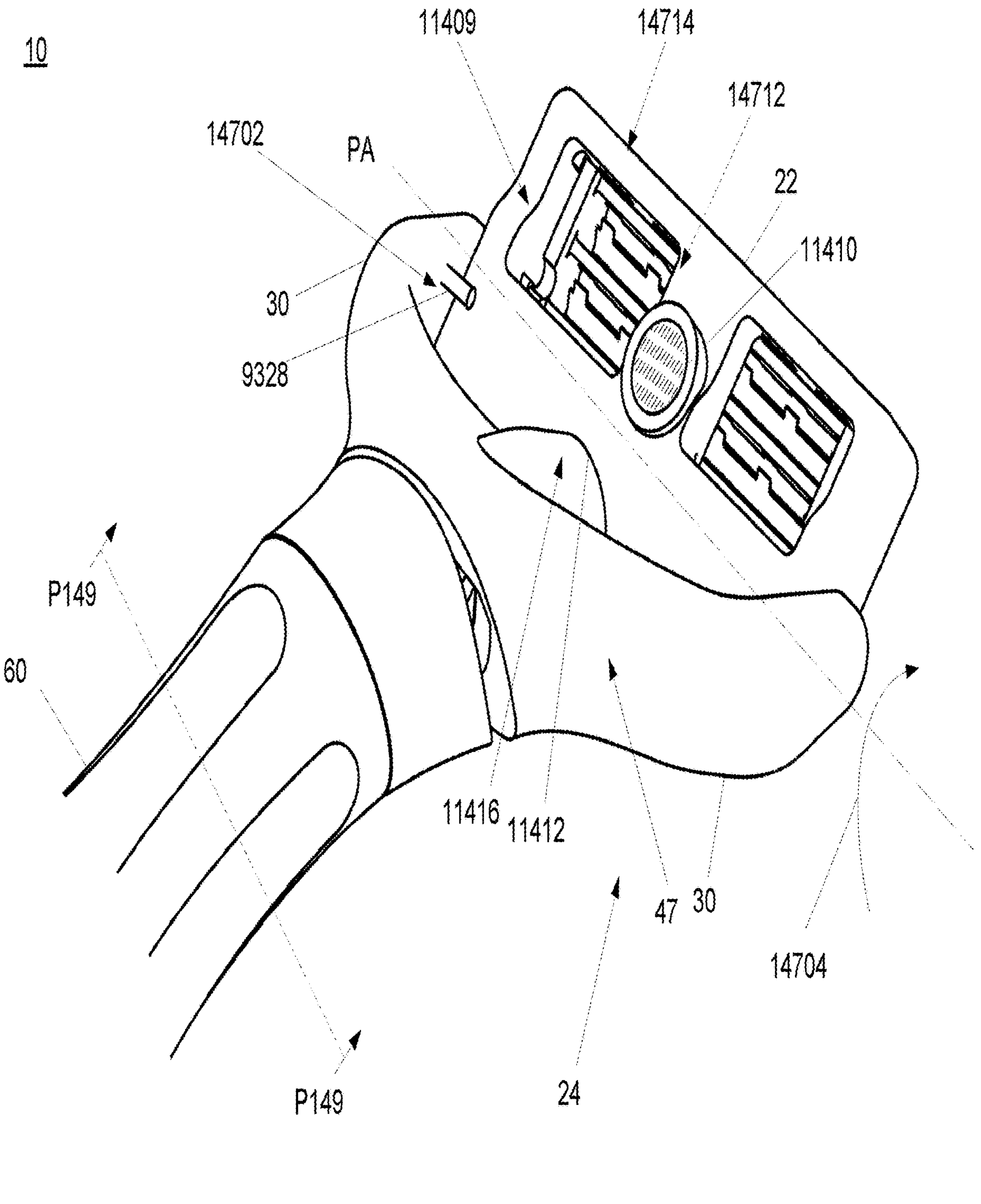
Figure 149:
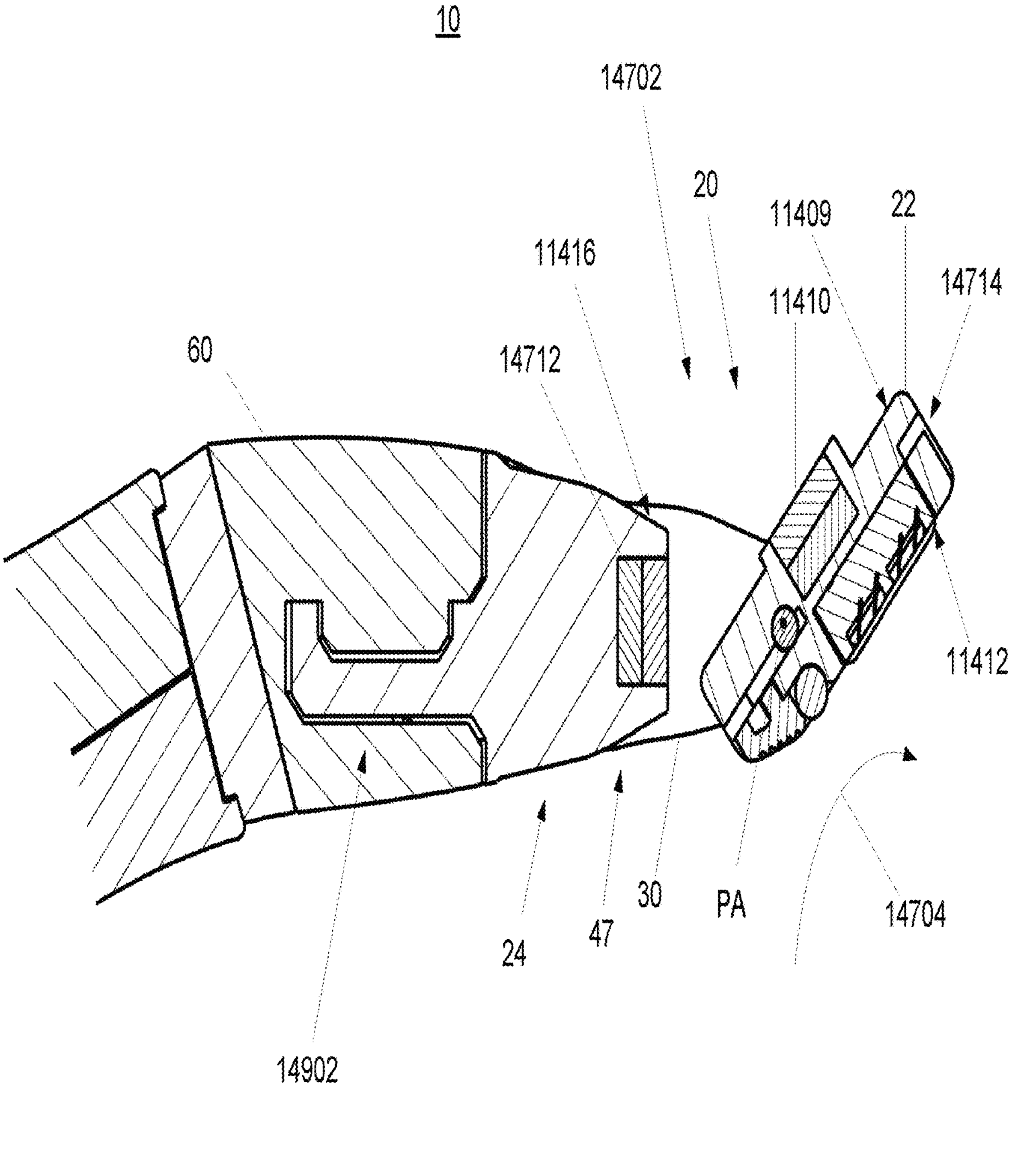
Figure 150:
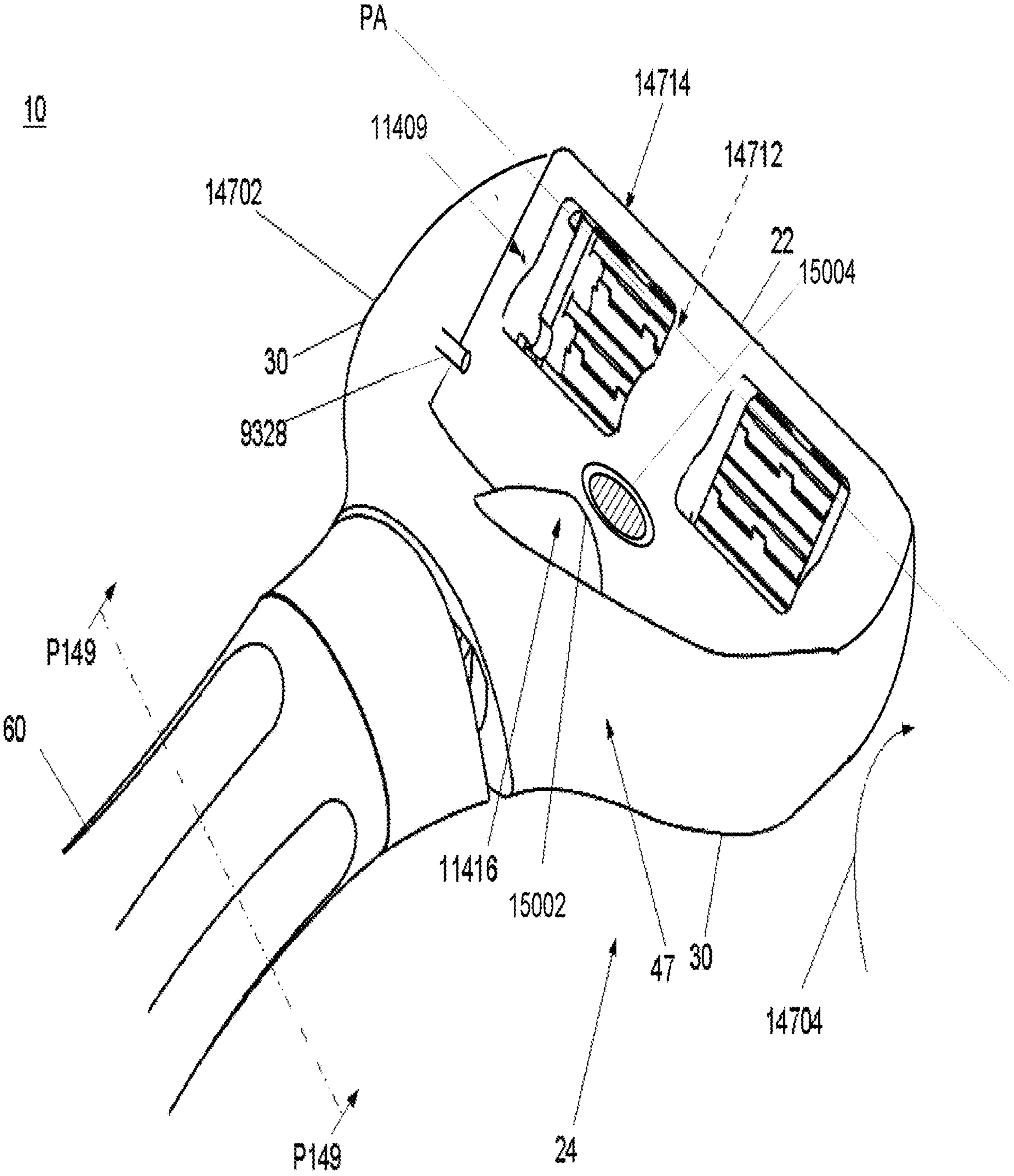
Figure 151:
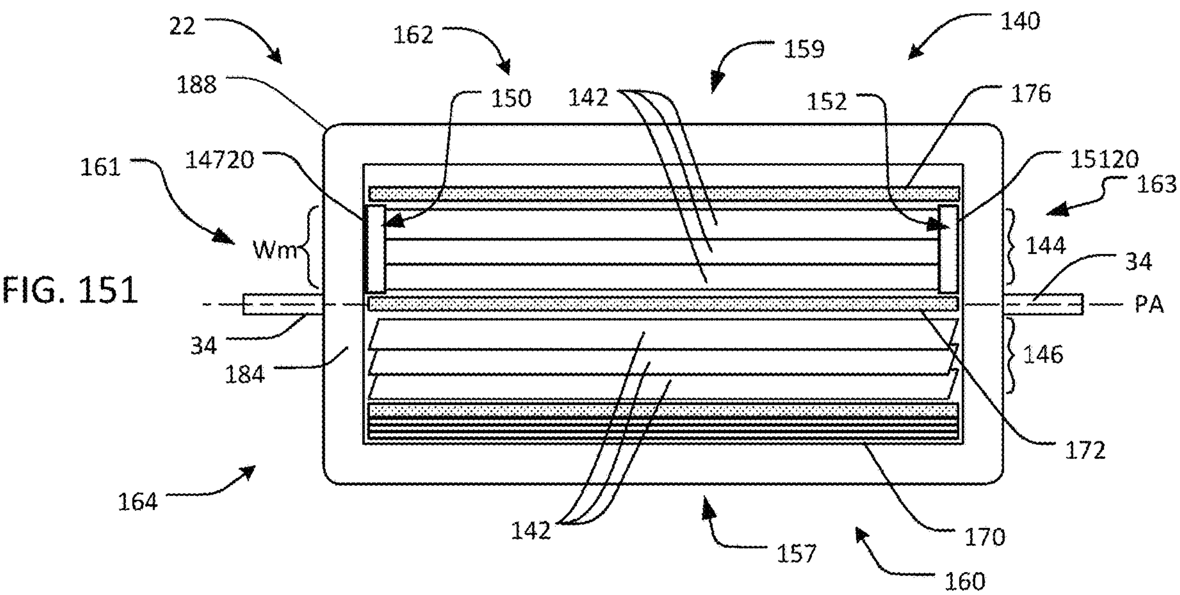
Figure 152:
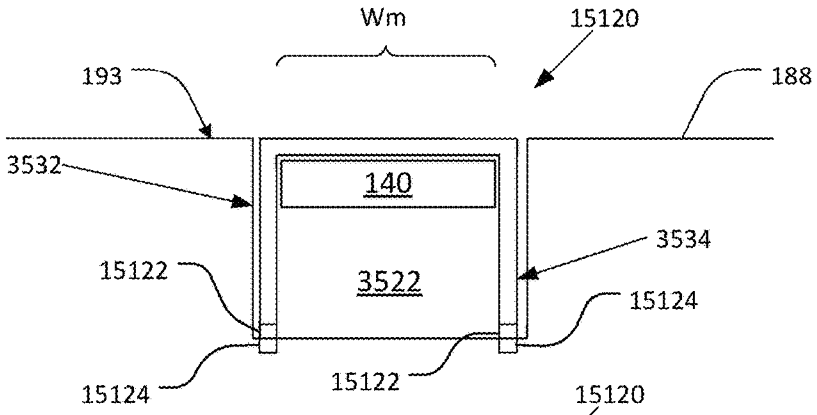
Figure 153A:
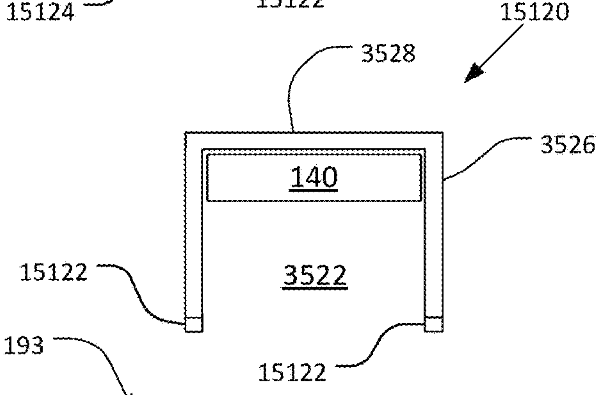
Figure 153B:
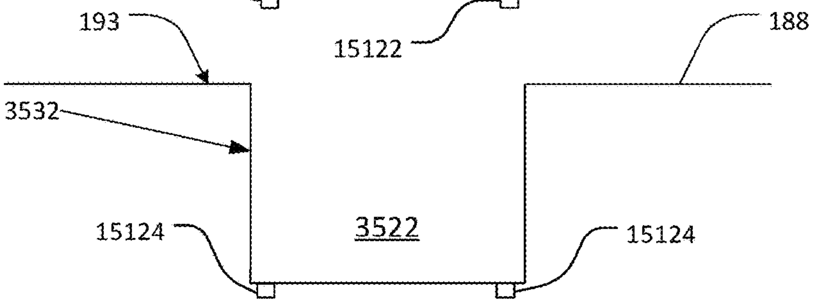
Figure 154:
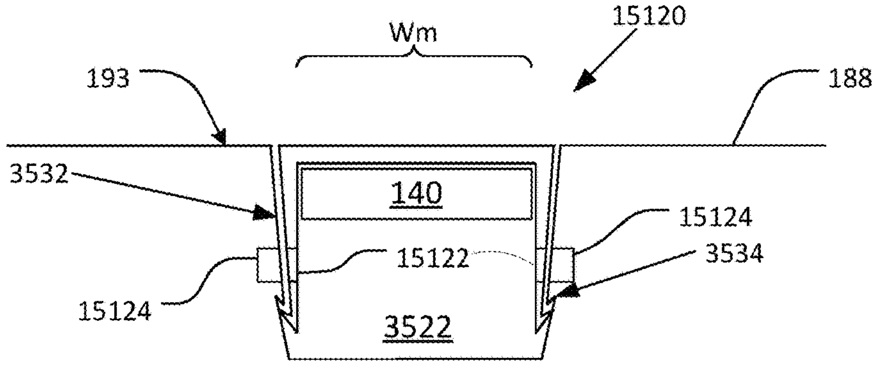
Figure 155A:
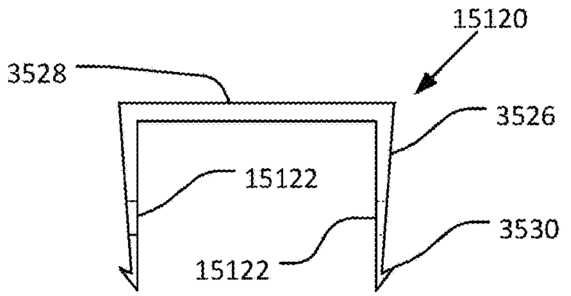
Figure 155B:
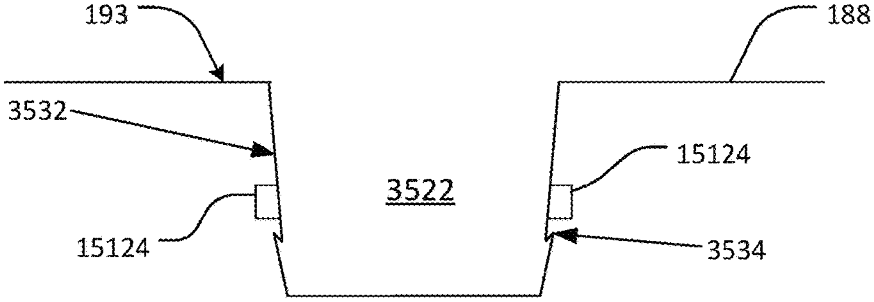
Figure 156:
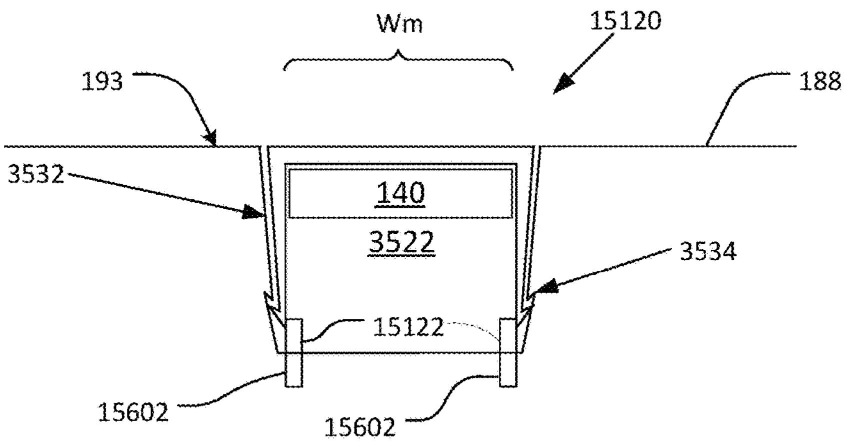
Figure 157A:
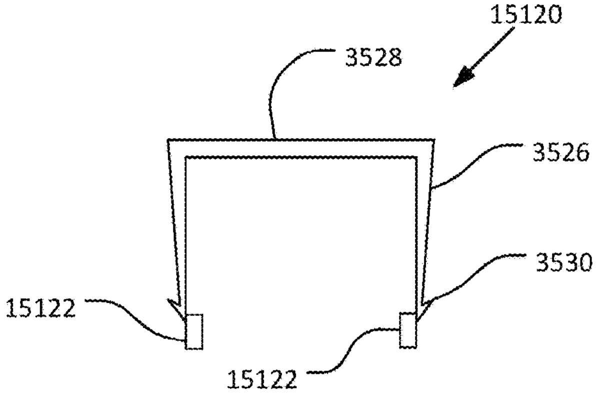
Figure 157B:
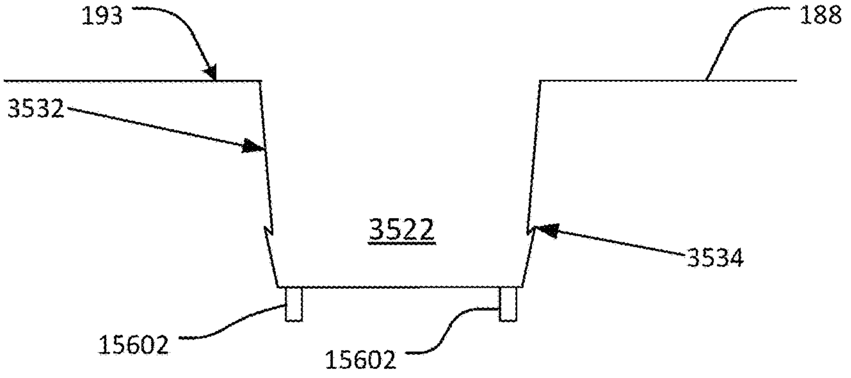
Figure 158:
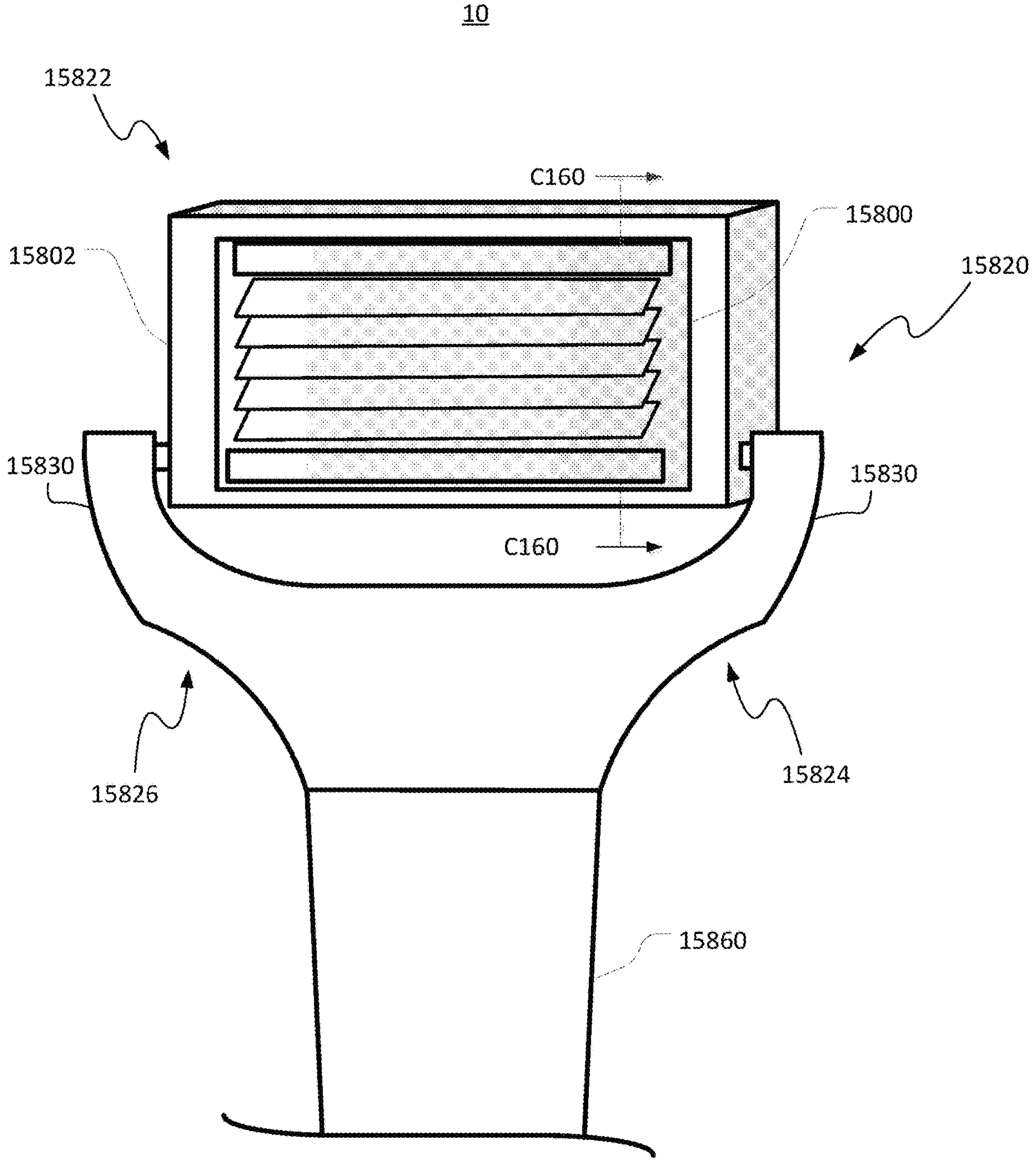
Figure 159:
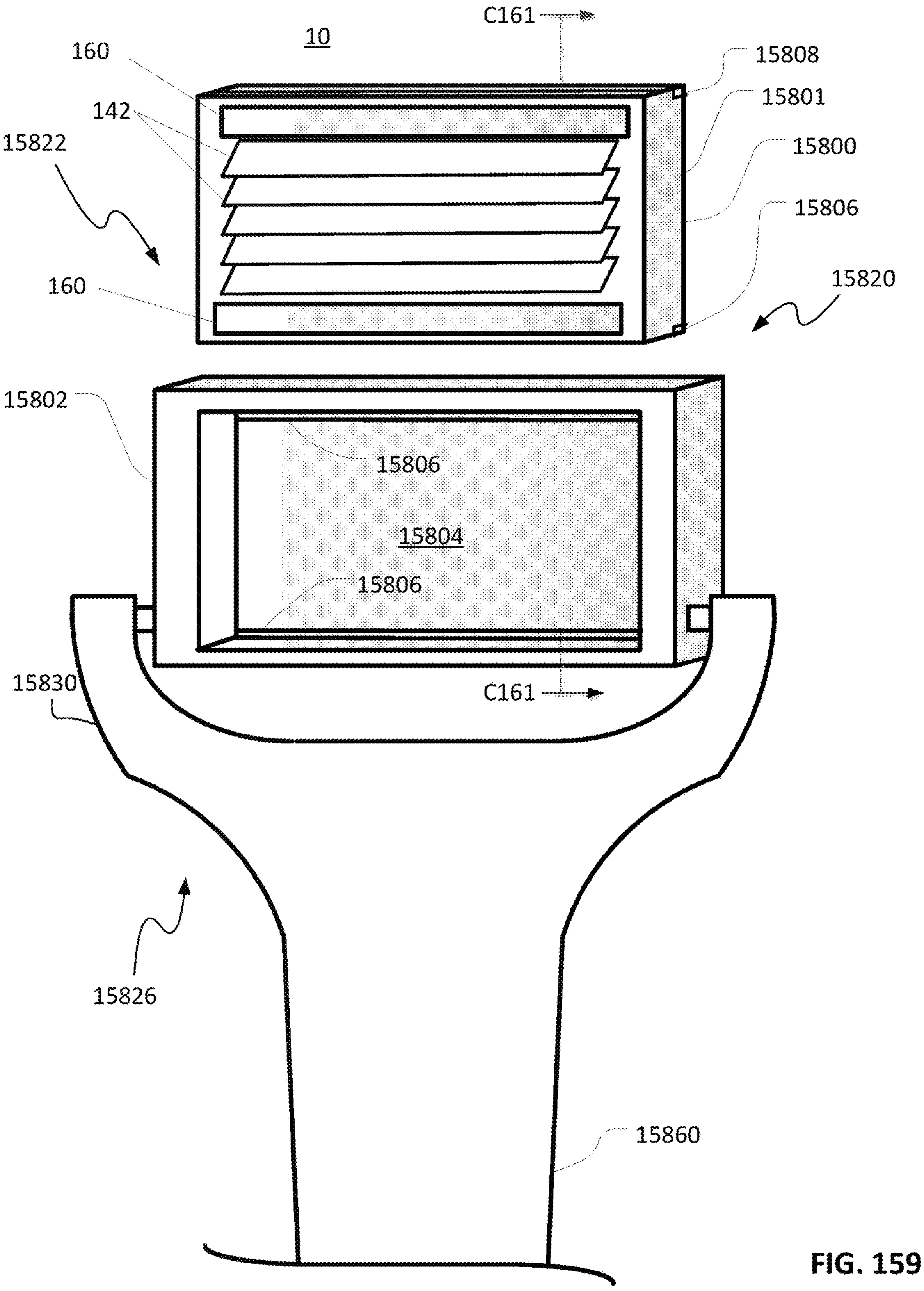
Figure 160:
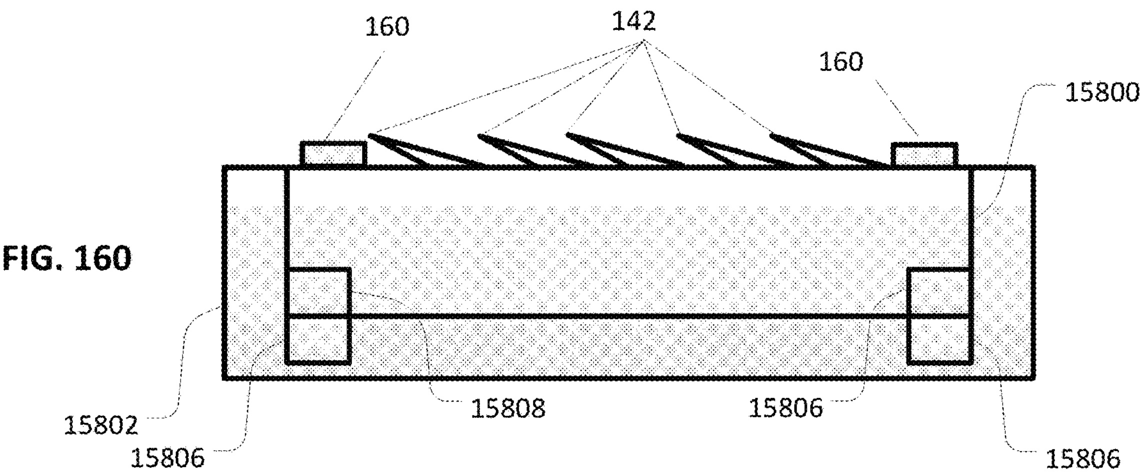
Figure 161:
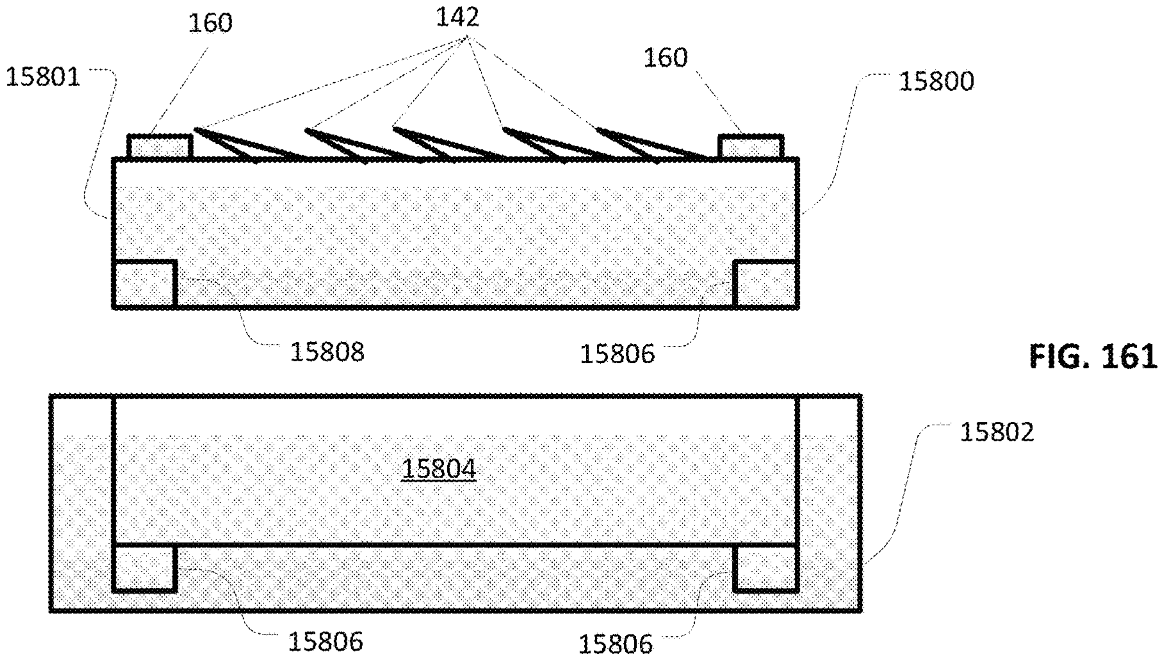
Figure 162:
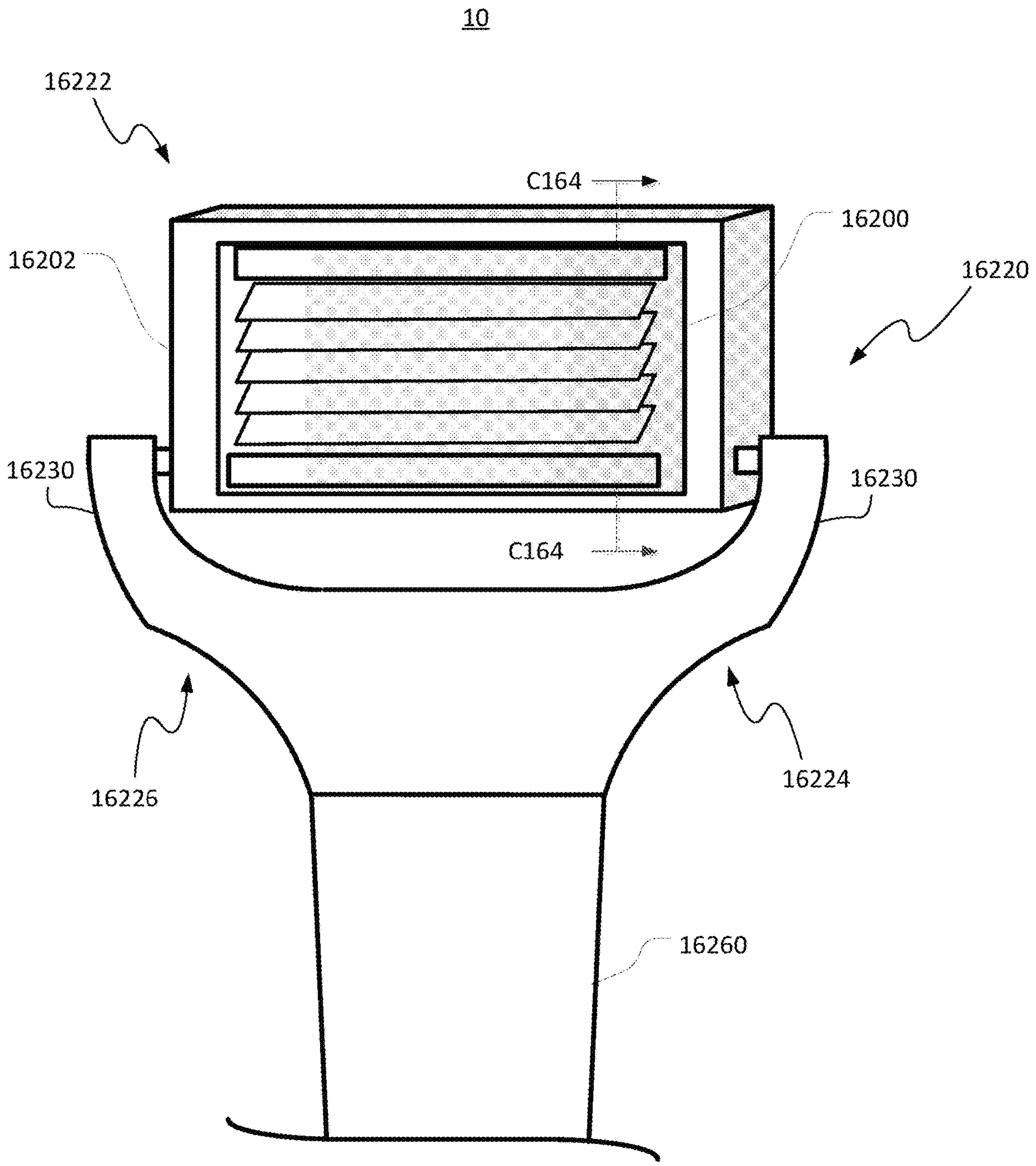
Figure 163:
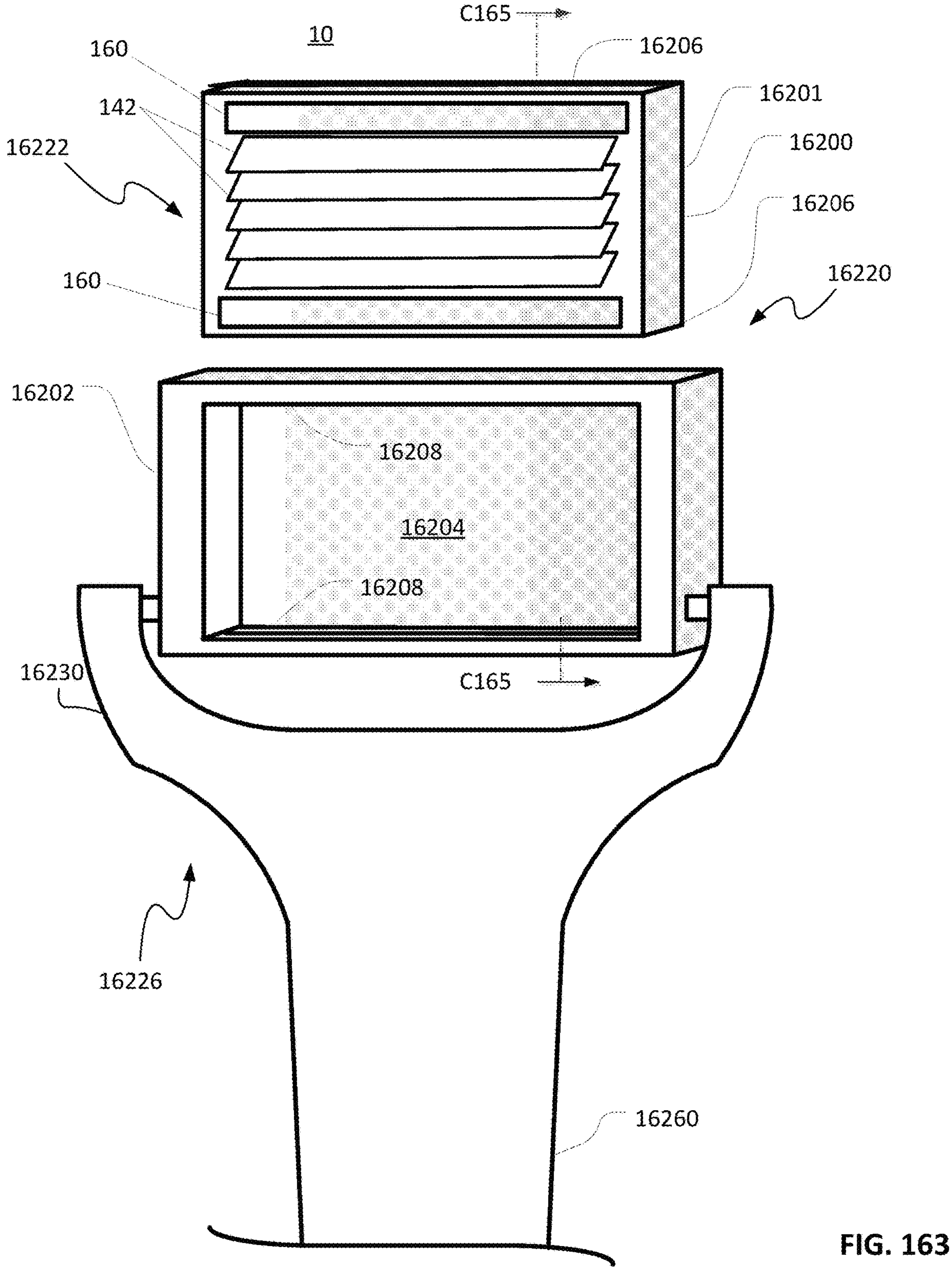
Figure 164:
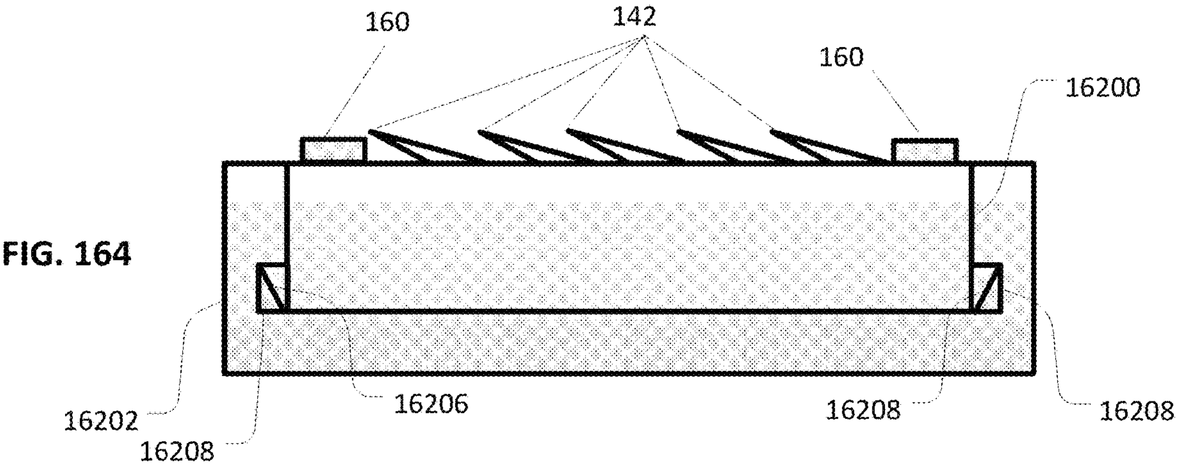
Figure 165:
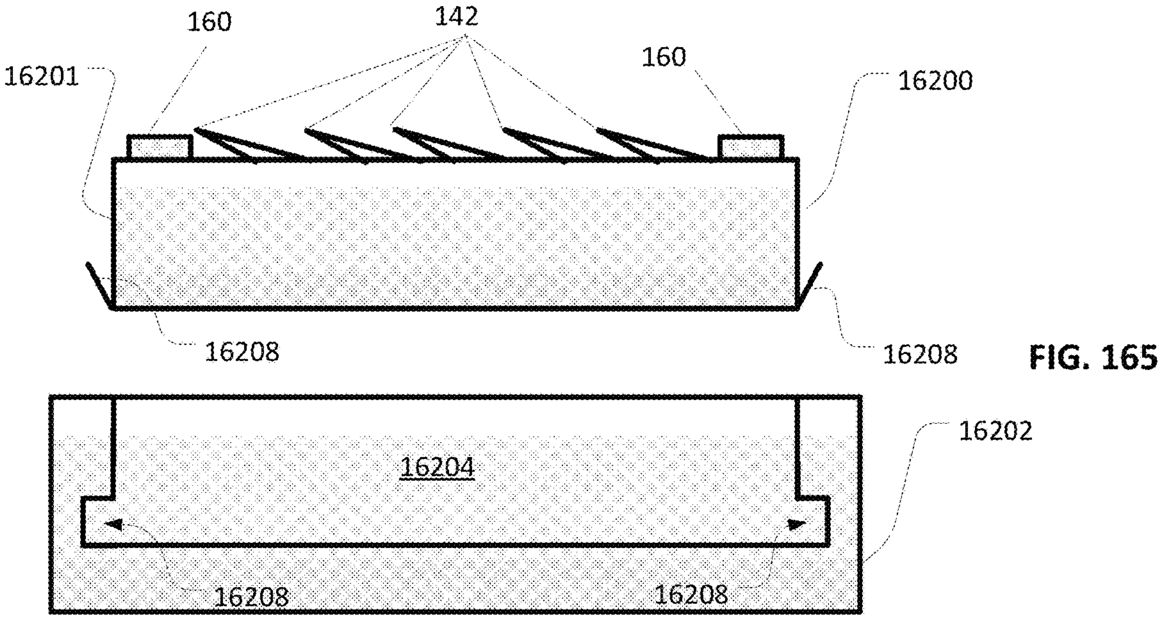
Figure 166:
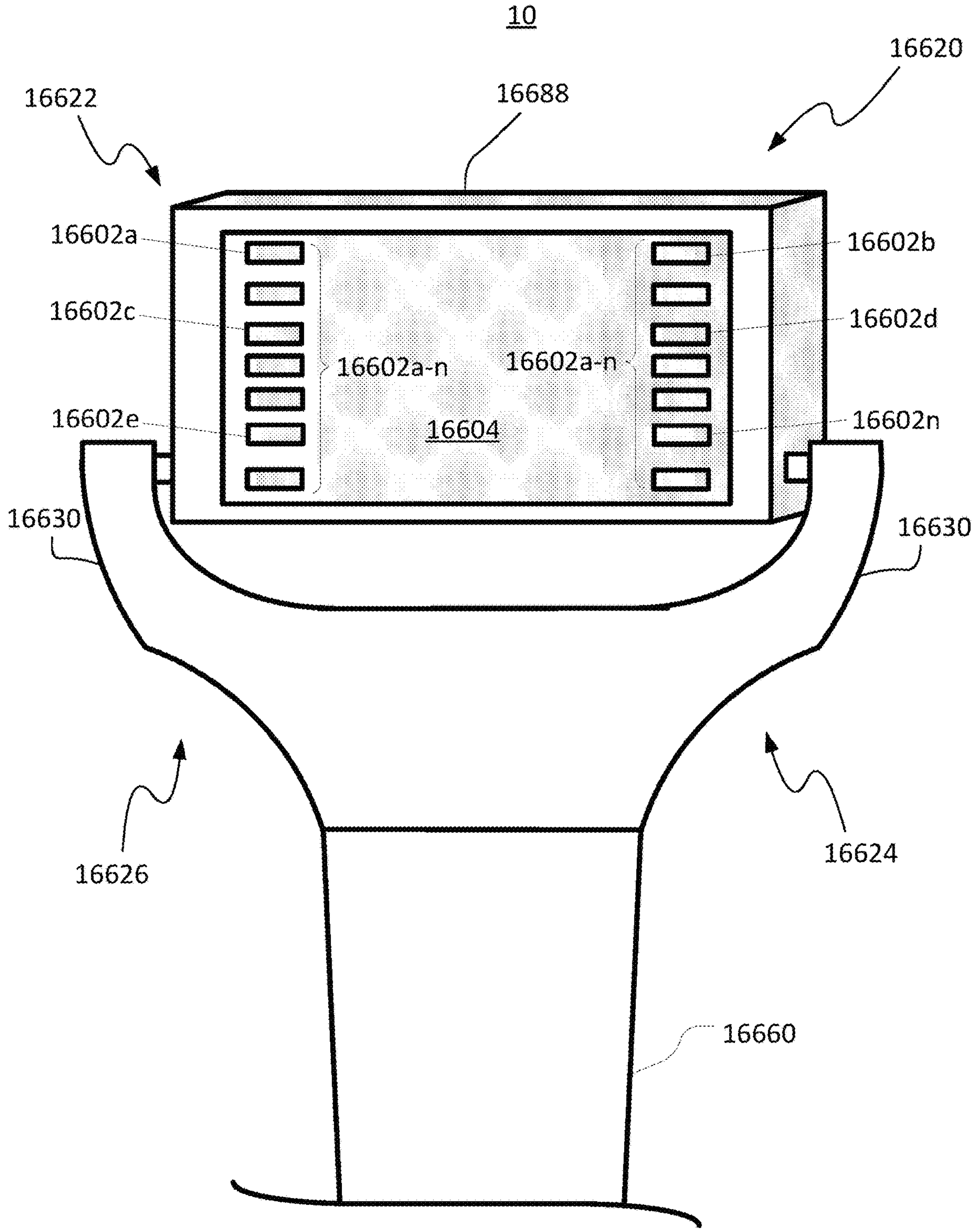
Figure 167:
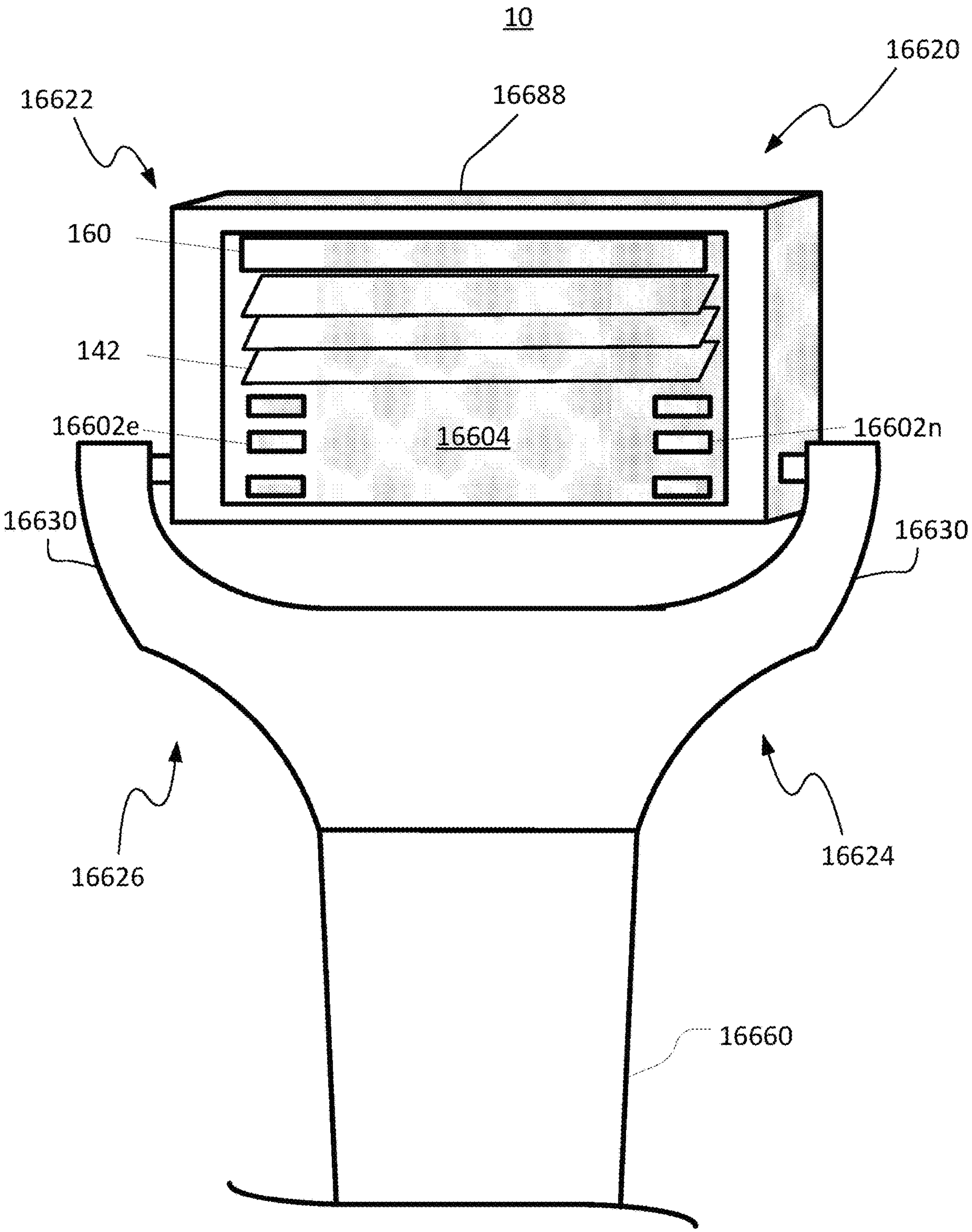
Figure 168:
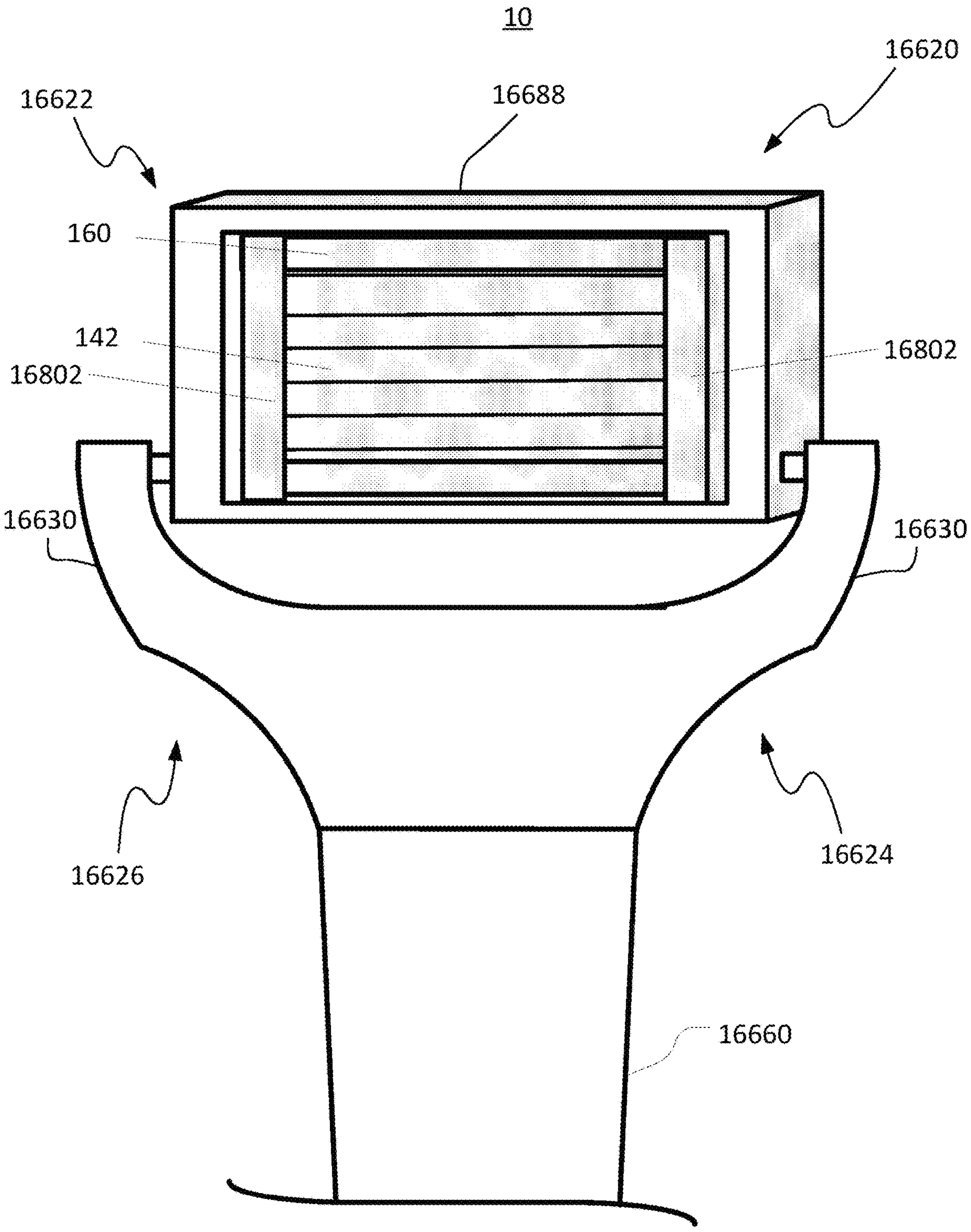
Figure 169:
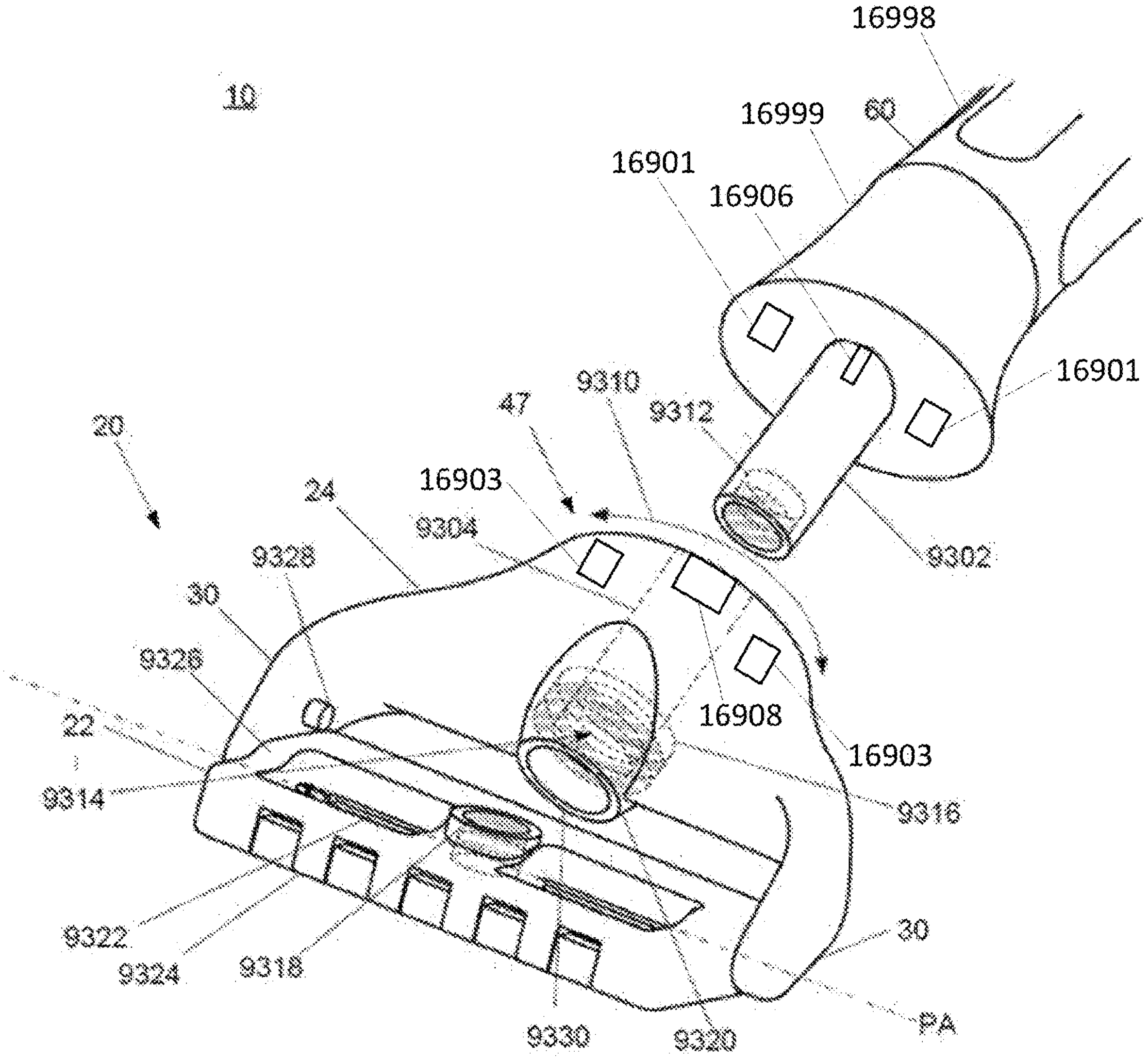
Figure 170:
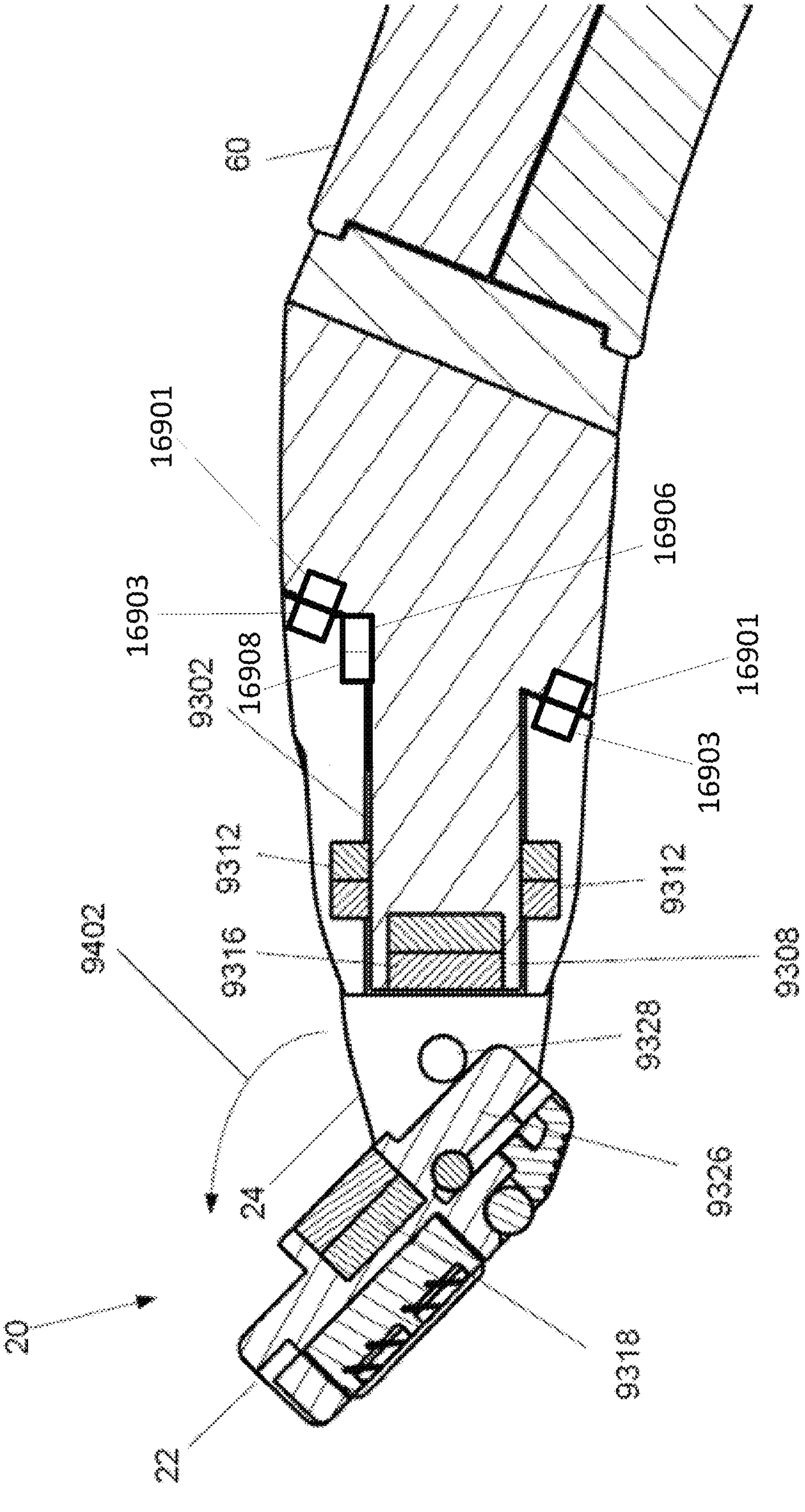
Figure 171:
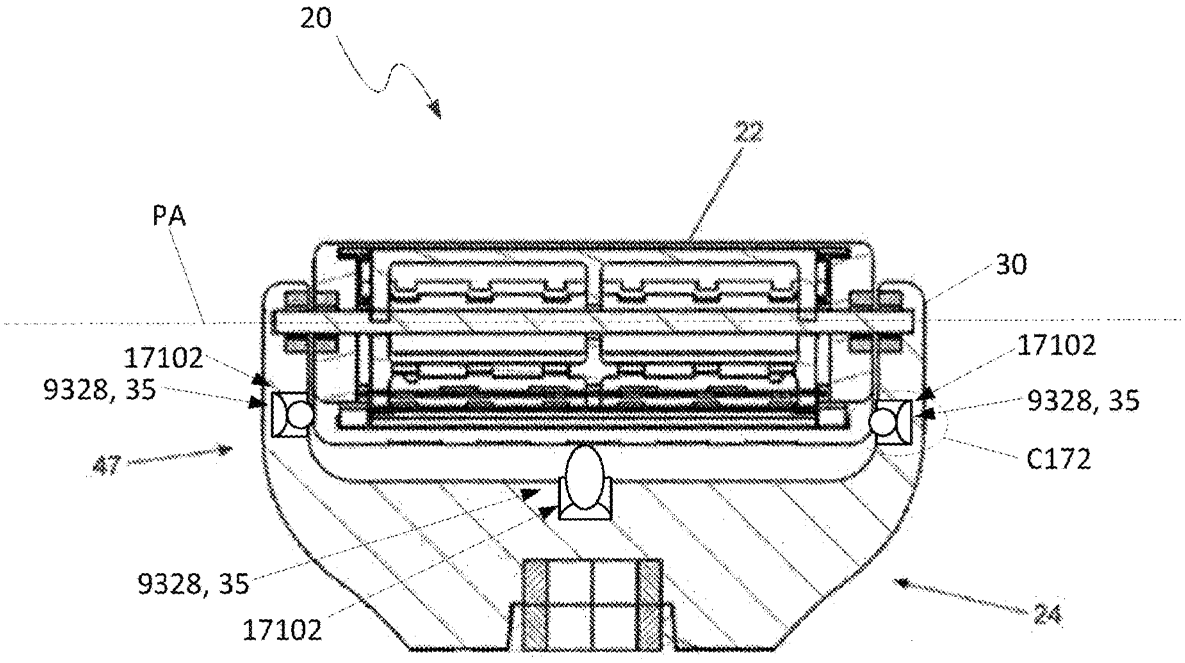
Figure 172:
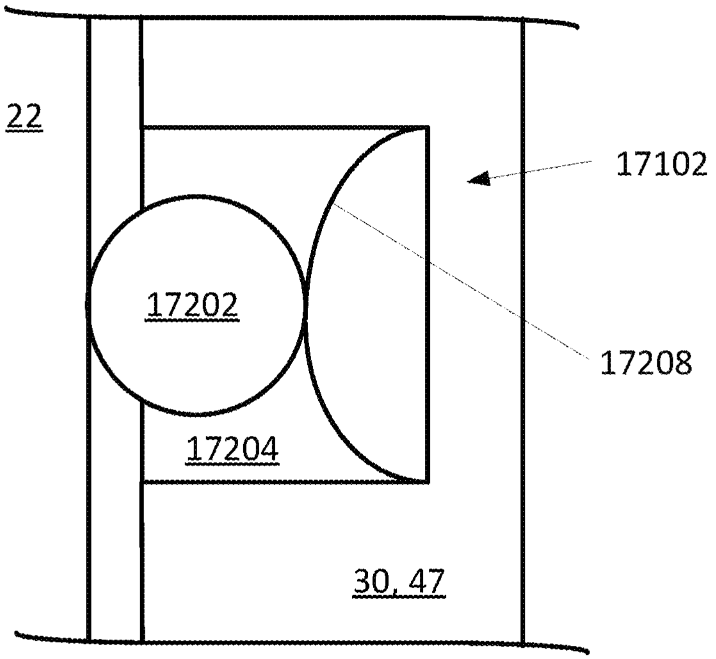
Figure 173:
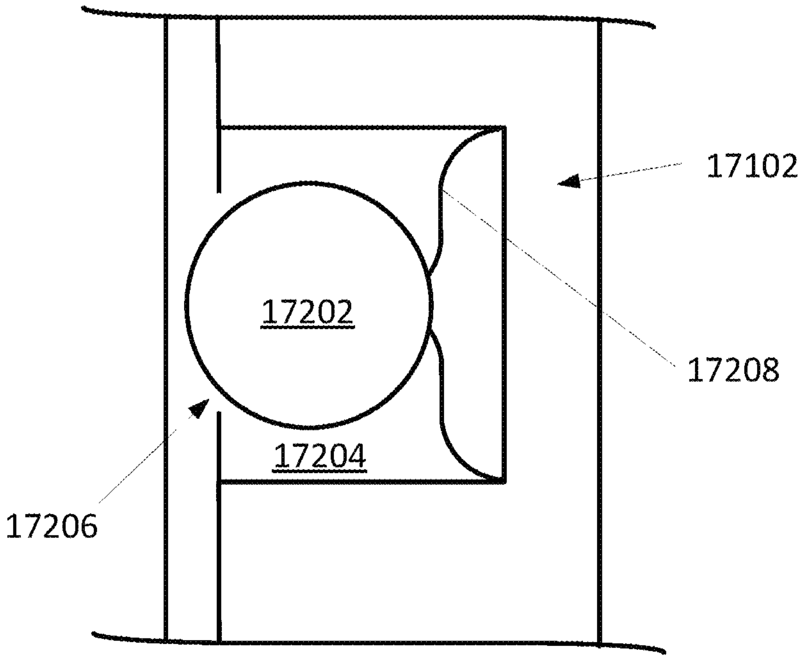
Figure 174:
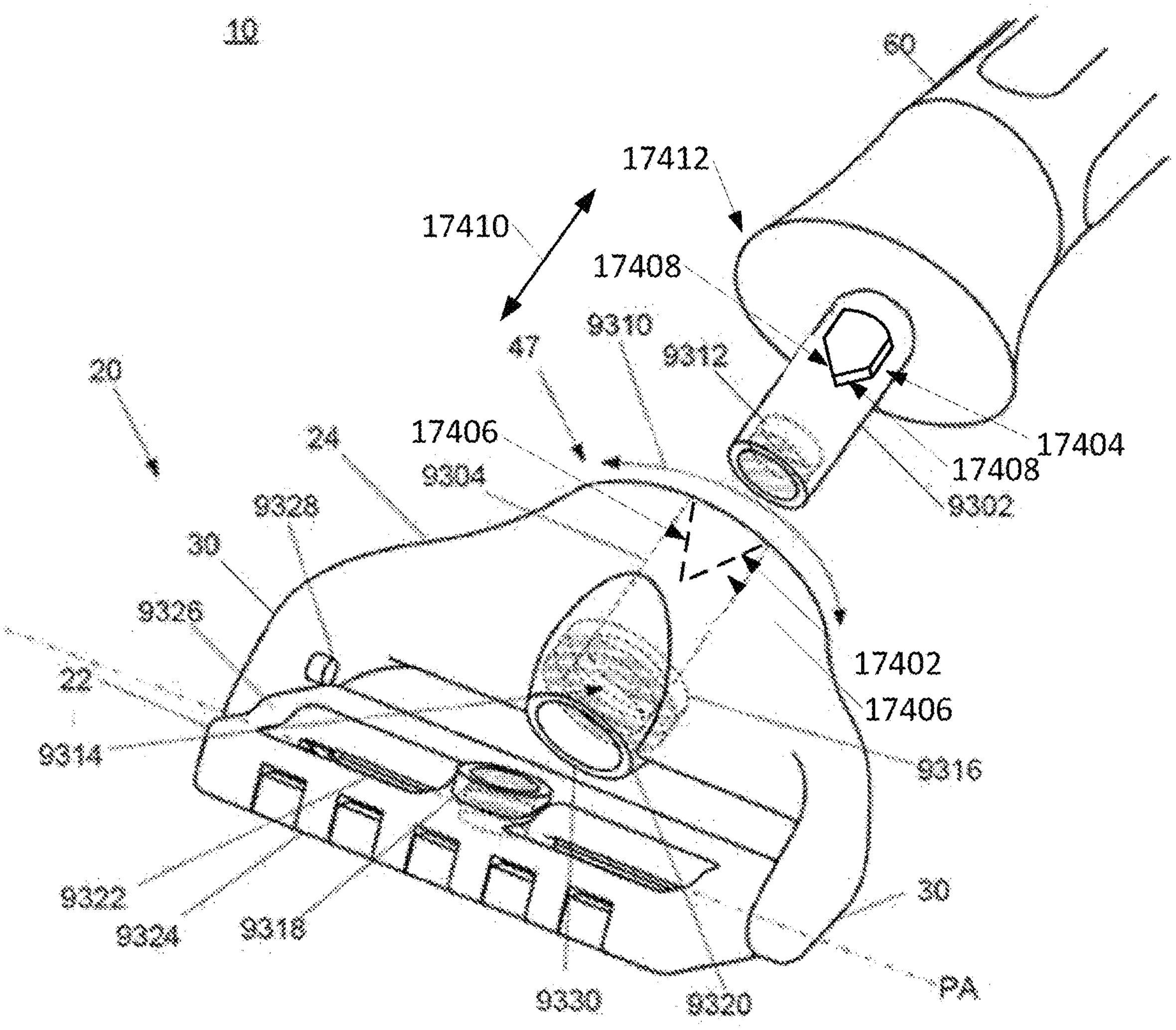
Figure 175:
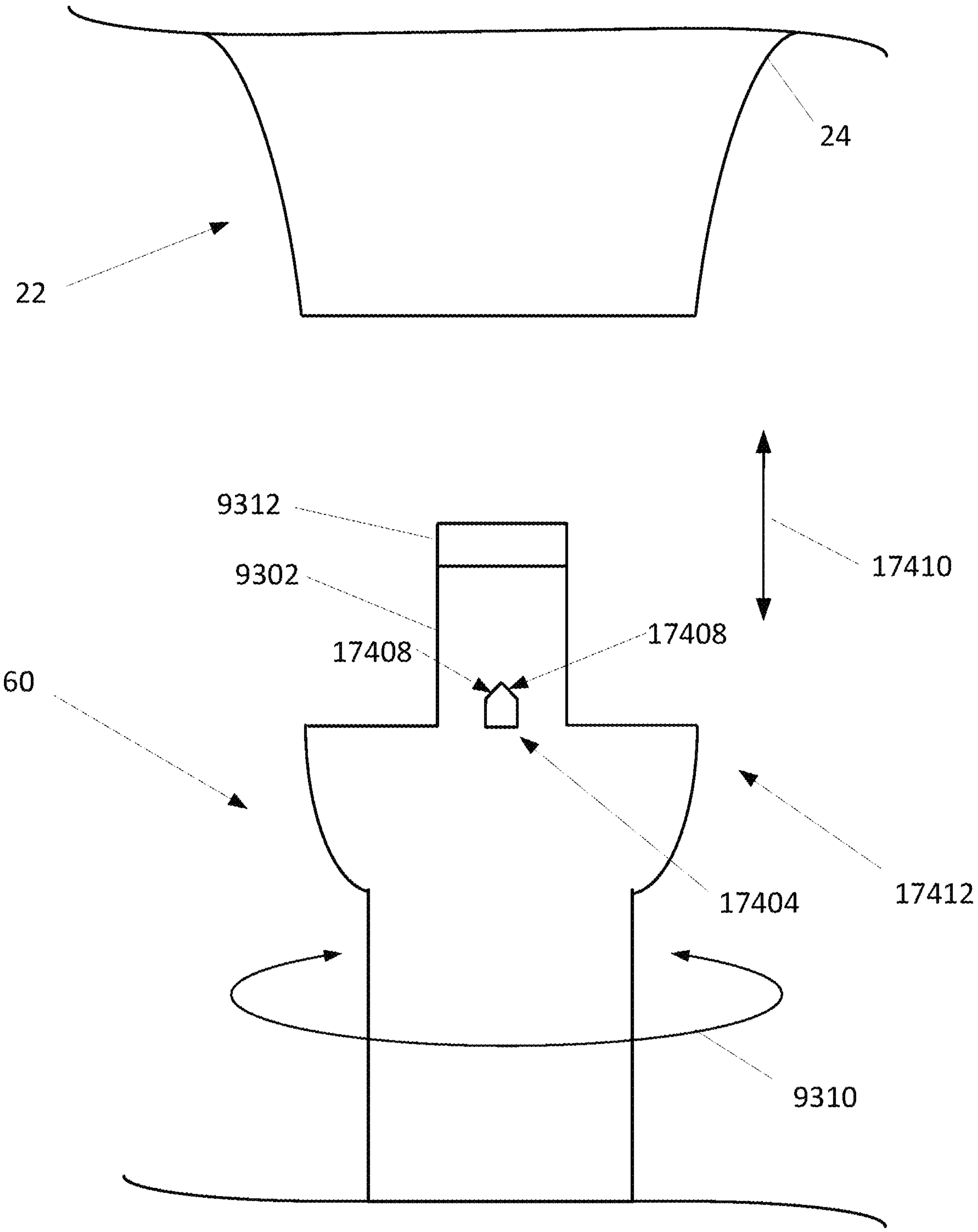
Figure 176:
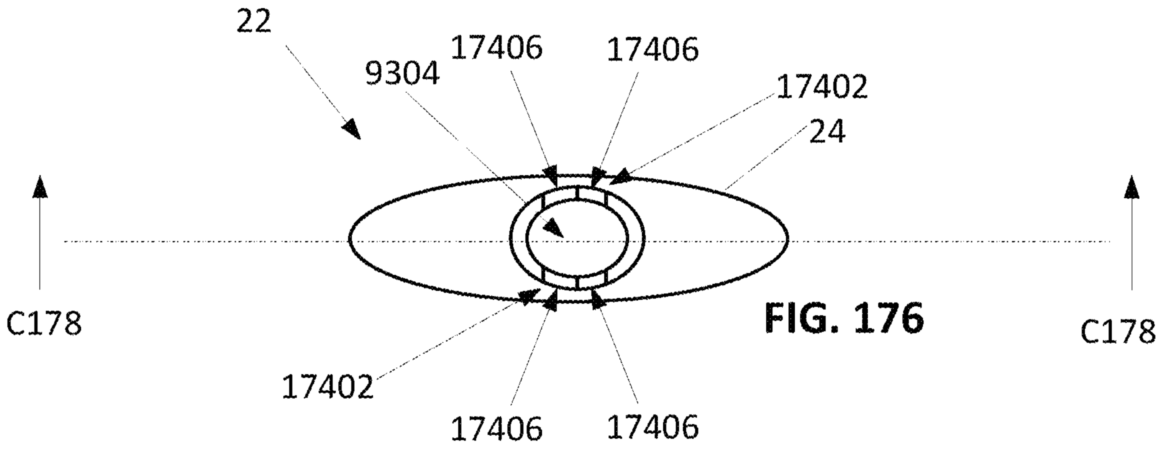
Figure 177:
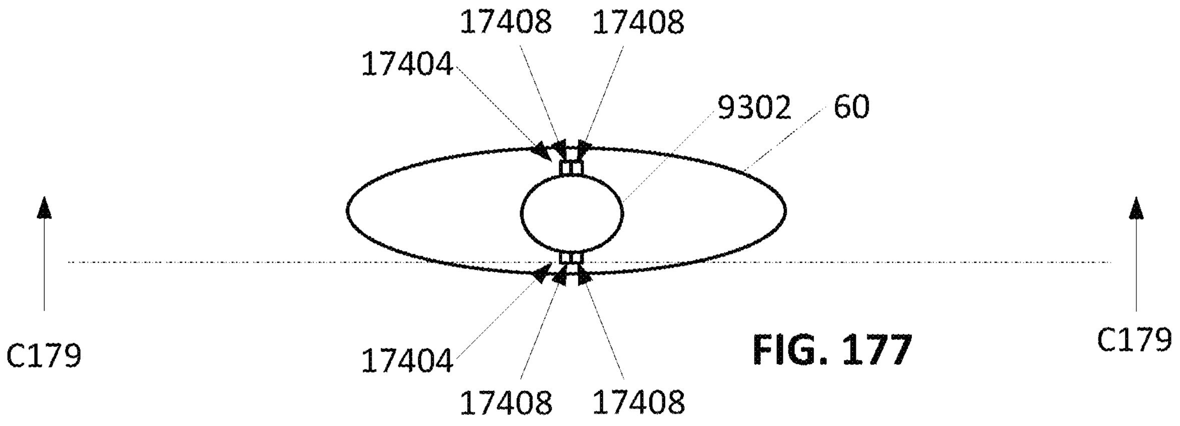
Figure 178:
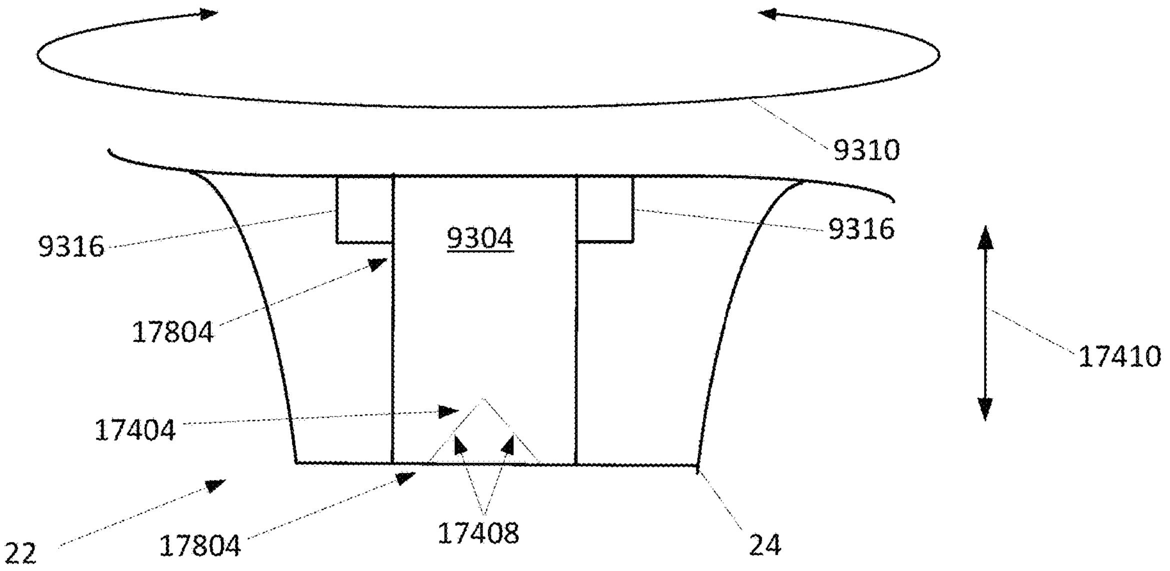
Figure 179:
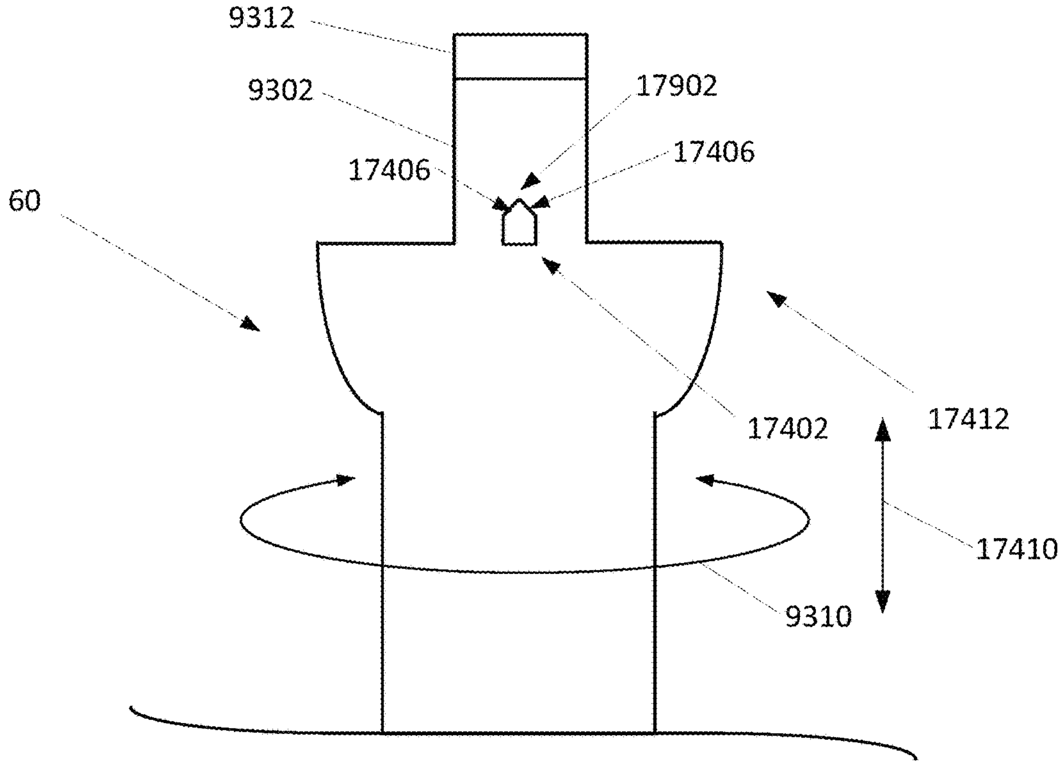
Figure 180:
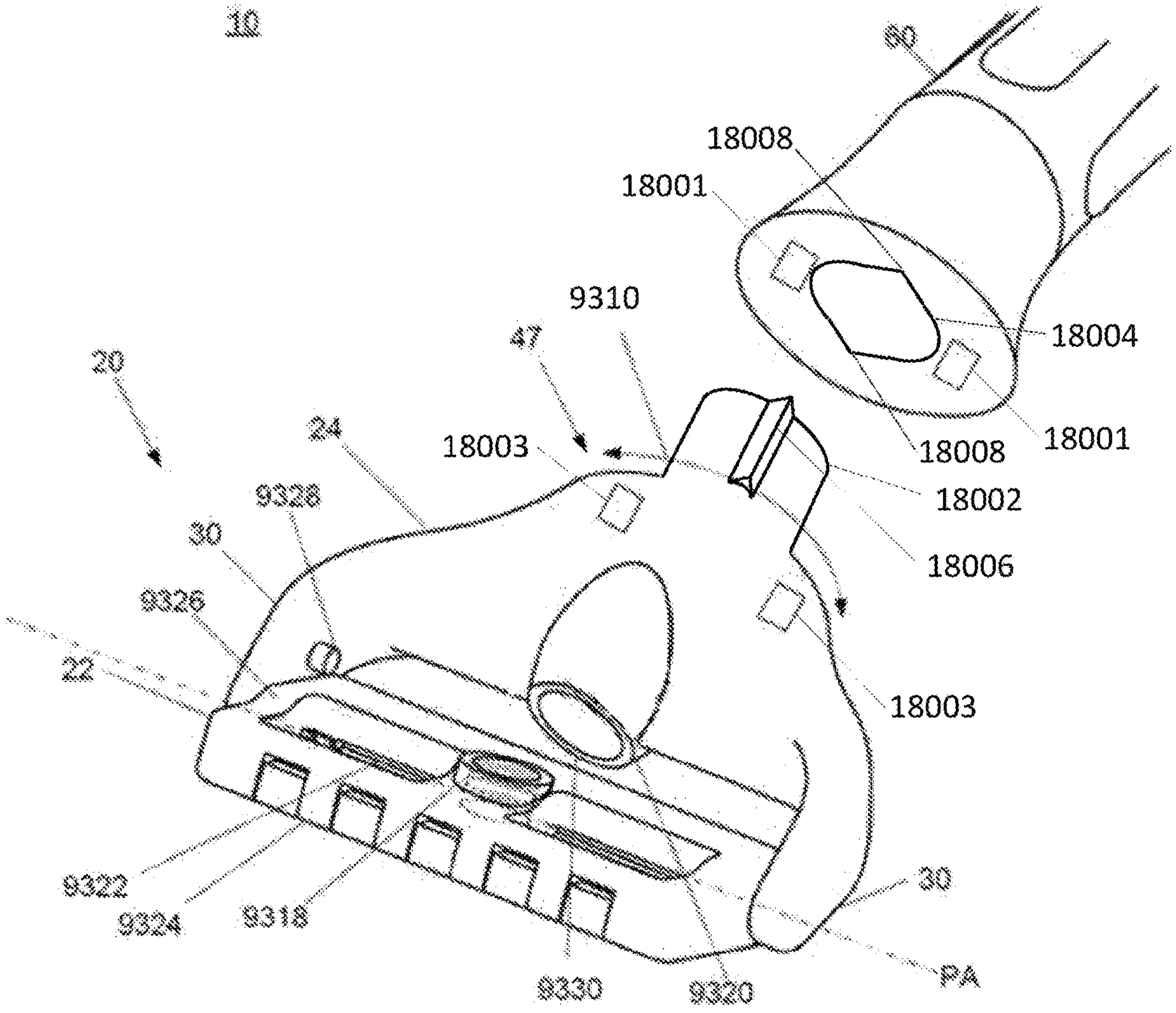
Figure 181:
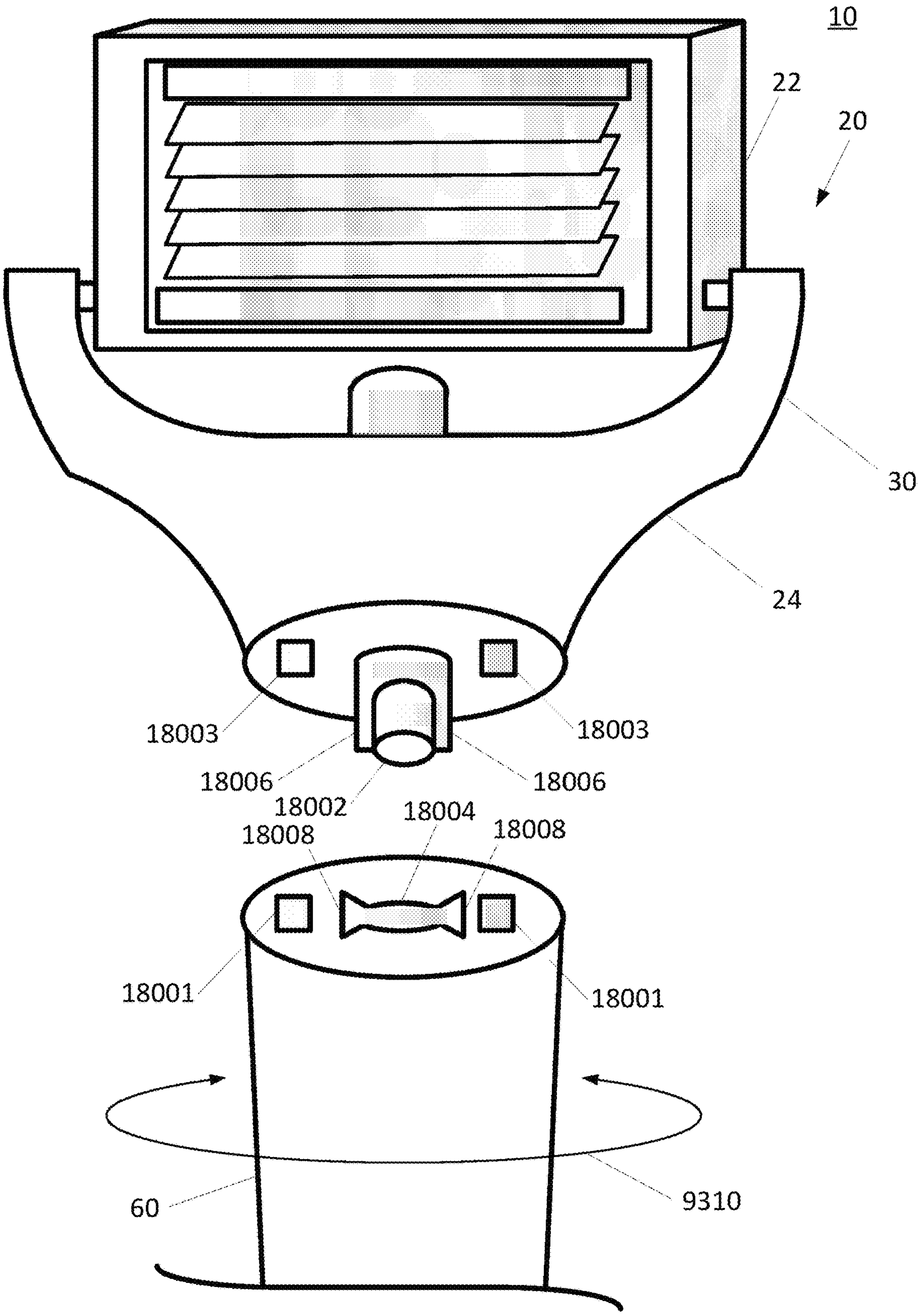
Figure 182:
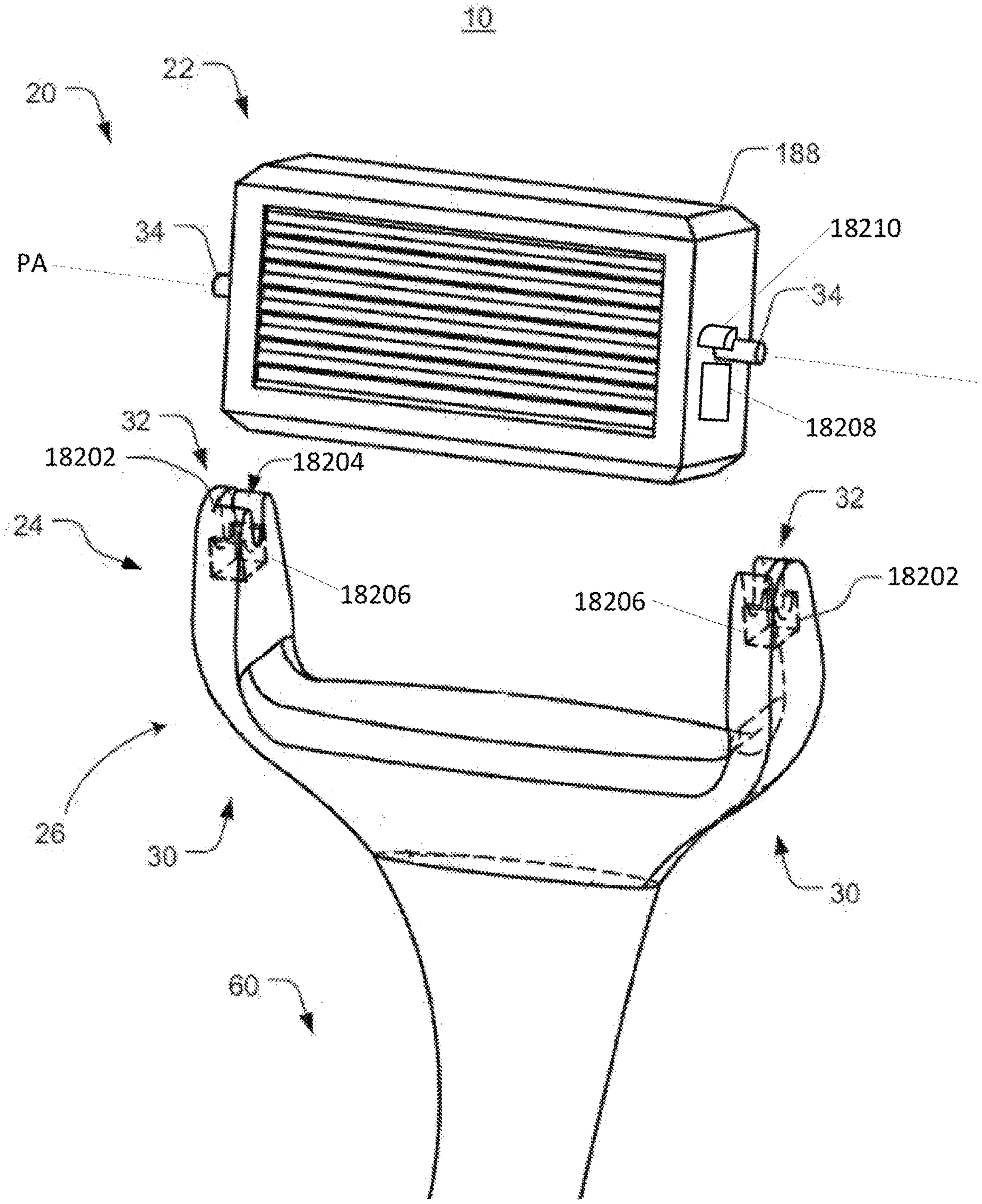
Figure 183:
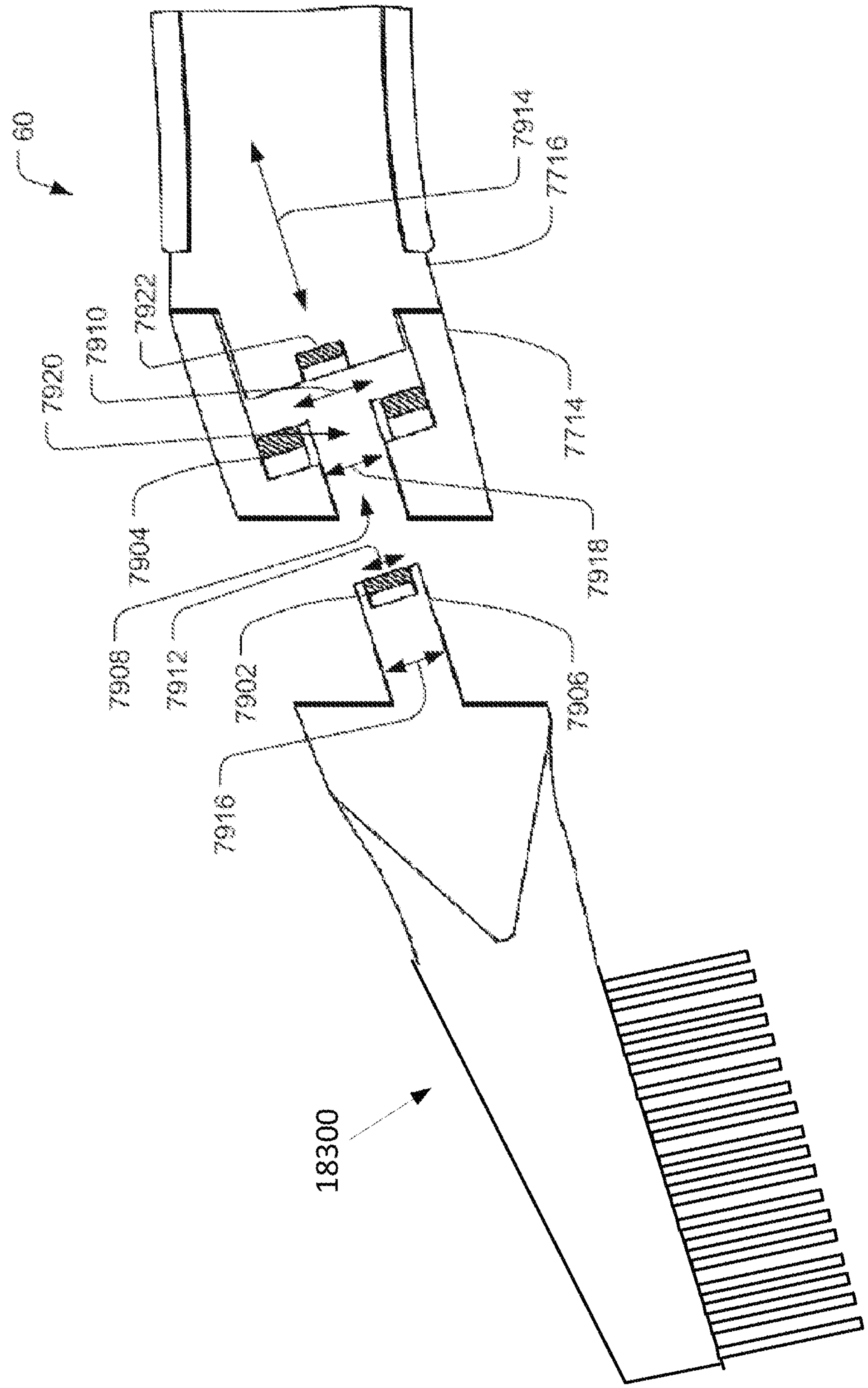
Figure 184:
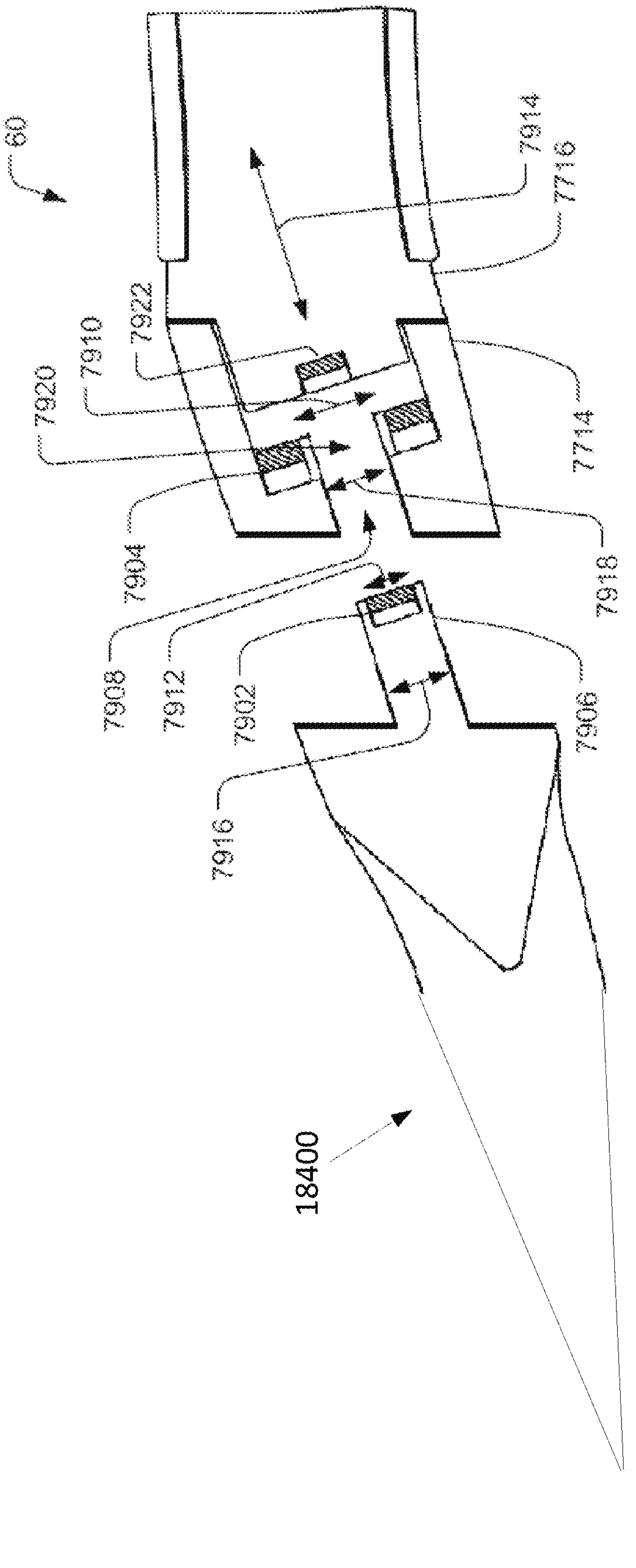
Figure 185:
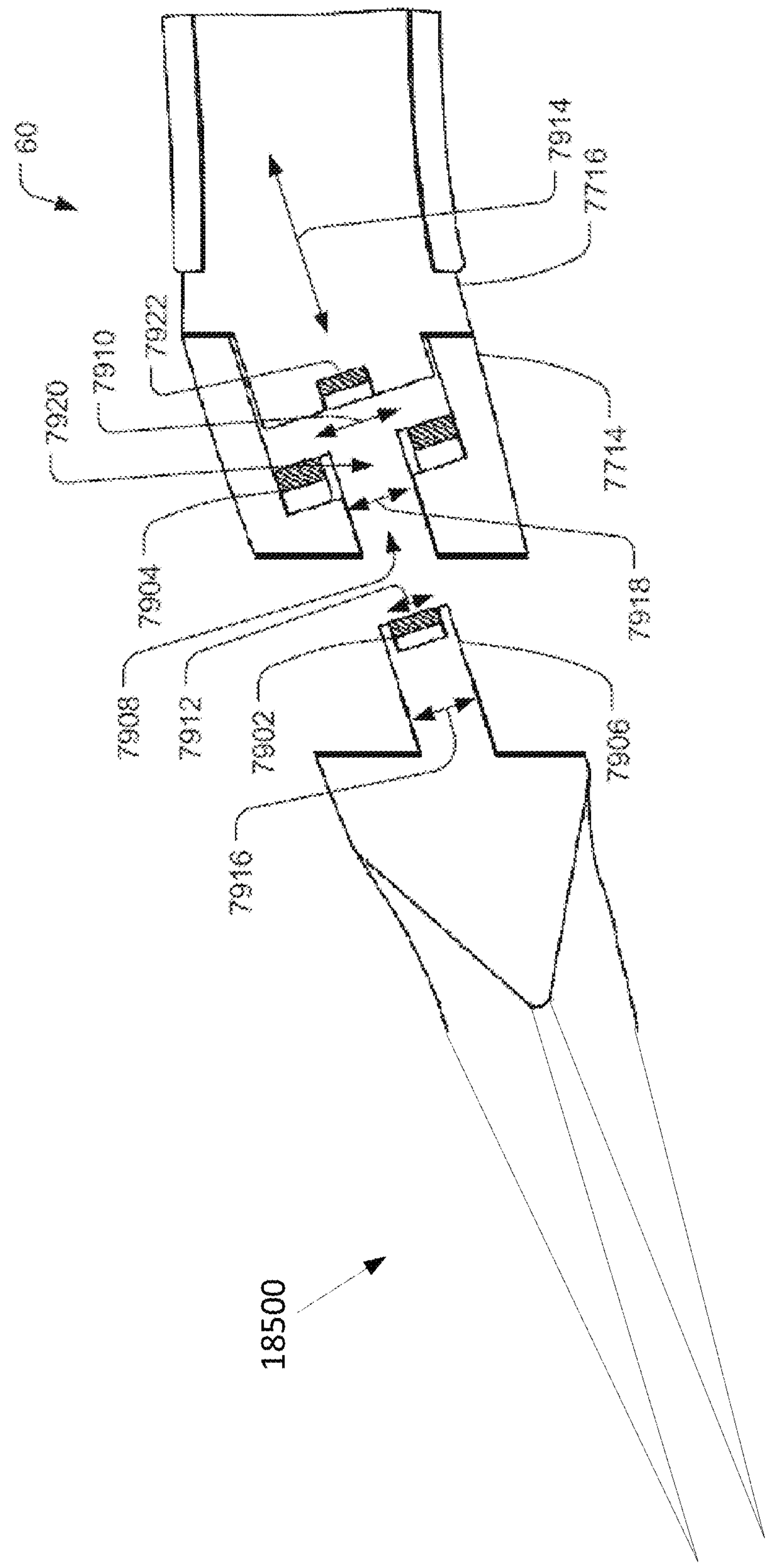
Figure 186:
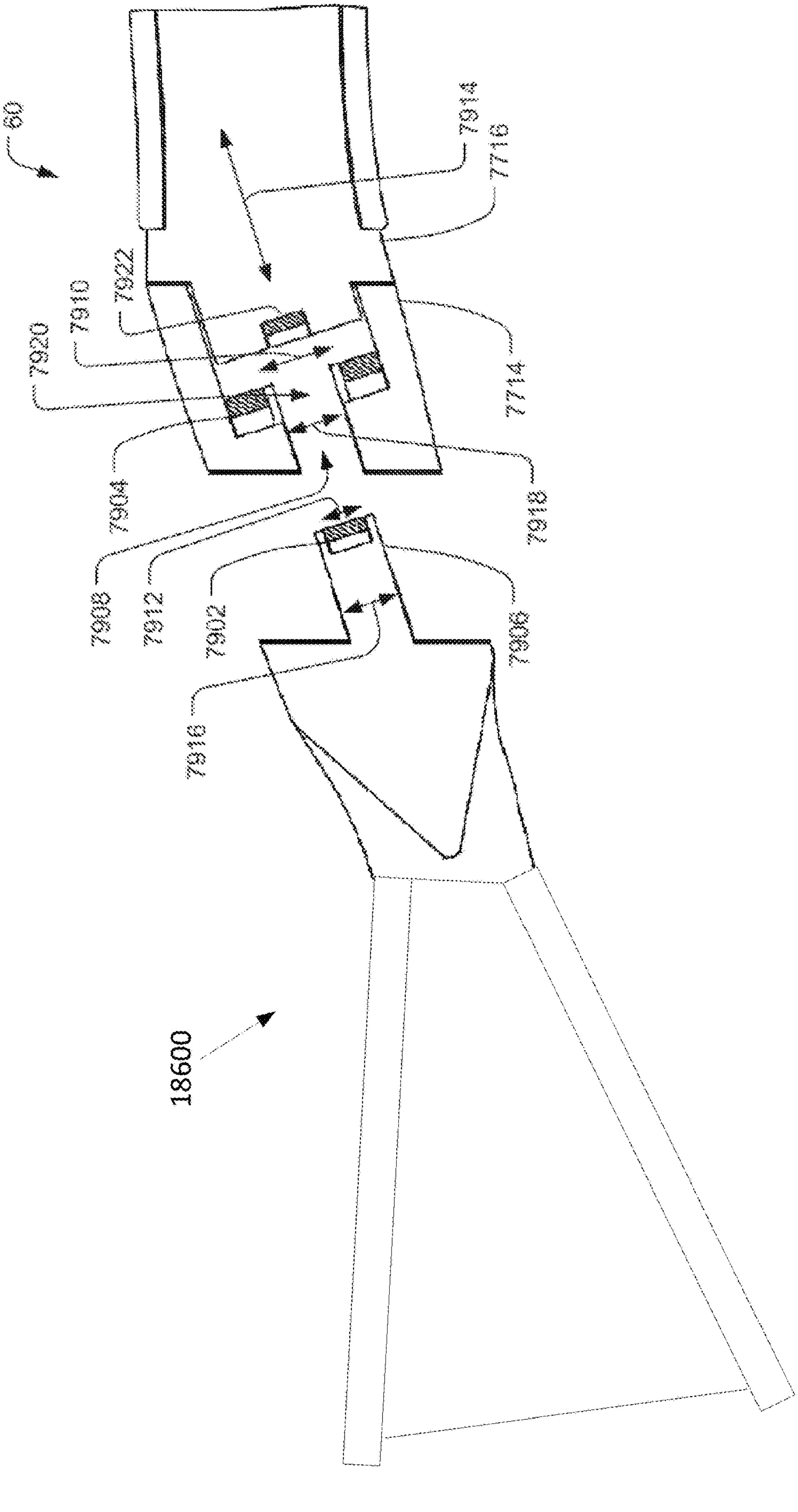

FIG. 18 generally illustrates one embodiment of a blade cartridge including a resistive pivot mechanism consistent with the present disclosure;

FIG. 19 generally illustrates one embodiment of a resistive pivot mechanism taken along lines 19-19 of FIG. 18 consistent with the present disclosure;

FIG. 20 generally illustrates one embodiment of a resistive pivot mechanism taken along lines 20-20 of FIG. 19 consistent with the present disclosure;

FIG. 21 generally illustrates another embodiment of a resistive pivot mechanism similar to those of FIGS. 19 and 20;

FIG. 22 generally illustrates another embodiment of a resistive pivot mechanism similar to those of FIGS. 19 and 20;

FIG. 23 generally illustrates another embodiment of a resistive pivot mechanism including a ballast mechanism consistent with the present disclosure;

FIG. 24 generally illustrates another embodiment of a resistive pivot mechanism including a ballast mechanism consistent with the present disclosure;

FIG. 25 illustrates one embodiment of a hinge and swivel mechanism consistent with the present disclosure;

FIG. 26 illustrates one embodiment of a hinge and swivel mechanism consistent with the present disclosure;

FIG. 27 illustrates one embodiment of a hinge and swivel mechanism consistent with the present disclosure;

FIG. 28 shows one embodiment of a blade cartridge centering mechanism;

FIG. 29 shows one embodiment of a blade cartridge centering mechanism consistent with FIG. 28;

FIG. 30A shows an enlarged front view of a blade cartridge according to one embodiment of the present disclosure;

FIG. 30B shows an enlarged front view of a blade cartridge according to another embodiment of the present disclosure;

FIG. 31 shows a cross-sectional view of a section of a blade cartridge including a retractable ball bearing according to one embodiment of the present disclosure;

FIG. 32 shows a cross-sectional view of a section of a blade cartridge including a retractable ball bearing according to another embodiment of the present disclosure;

FIG. 33 shows a cross-sectional view of a section of a blade cartridge including a retractable ball bearing according to another embodiment of the present disclosure;

FIG. 34 shows a cross-sectional view of a blade cartridge including self-lubricating retractable ball bearing/elongated ball bearing/roller pin according to another embodiment of the present disclosure;

FIG. 35A shows a cross-sectional view of a blade cartridge including self-lubricating retractable ball bearing/elongated ball bearing/roller pin according to another embodiment of the present disclosure;

FIG. 35B shows a cross-sectional view of a blade cartridge including self-lubricating retractable ball bearing/elongated ball bearing/roller pin according to another embodiment of the present disclosure;

FIG. 35C shows a retention clip for securing a ball bearing within the blade cartridge;

FIG. 35D shows a retention clip for securing a ball bearing within the blade cartridge;

FIG. 35E shows a retention clip for securing a ball bearing within the blade cartridge;

FIG. 35F shows a blade retention clip for securing one or more razor blades within the blade cartridge;

FIG. 35G shows a blade retention clip for securing one or more razor blades within the blade cartridge;

FIG. 35H shows a blade retention clip for securing one or more razor blades within the blade cartridge;

FIG. 36 shows an enlarged front view of a blade cartridge according to another embodiment of the present disclosure;

FIG. 37 shows an enlarged front view of a blade cartridge according to another embodiment of the present disclosure;

FIG. 38 shows an end view of yet another embodiment of a blade cartridge consistent with the present disclosure;

FIG. 39 shows an end perspective view of the blade cartridge consistent with FIG. 38;

FIG. 40 shows an end view of one embodiment of a pivot pin/cylinder that may be used with one embodiment of a resistive pivot mechanism in conjunction with the blade cartridge of FIGS. 38 and 39;

FIG. 41 shows a further view consistent with FIGS. 38-40;

FIG. 42 shows a further view consistent with FIGS. 38-40;

FIG. 43 shows a further view consistent with FIGS. 38-40;

FIG. 44 shows a further view consistent with FIGS. 38-40;

FIG. 45 shows a further view consistent with FIGS. 38-40;

FIG. 46 shows an additional view of a razor consistent with FIGS. 25-27;

FIG. 47 shows an additional view of a razor consistent with FIGS. 25-27;

FIG. 48 shows an additional view of a razor consistent with FIGS. 25-27;

FIG. 49 shows an additional view of a razor consistent with FIGS. 25-27;

FIG. 50 shows an additional view of a blade cartridge consistent with the present disclosure;

FIG. 51 shows an additional view of a blade cartridge consistent with the present disclosure;

FIG. 52 shows an additional view of a blade cartridge consistent with the present disclosure;

FIG. 53 shows another view of a razor consistent with the present disclosure;

FIG. 54 shows one embodiment of a razor having a resistive swing mechanism consistent with the present disclosure;

FIG. 55 shows a perspective view of another shaving device including another embodiment of a resistive pivot mechanism consistent with the present disclosure;

FIG. 56 shows a side view of the shaving device of FIG. 55 with the resistive pivot mechanism;

FIG. 57 shows a close-up side view of the shaving device of FIG. 55;

FIG. 58 shows another embodiment of a resistive pivot mechanism;

FIG. 59A shows the resistive pivot mechanism of FIG. 58 wherein the blade cartridge support member is partially transparent;

FIG. 59B shows one arrangement the blade cartridge magnets and the blade cartridge support member magnets;

FIG. 59C shows another arrangement the blade cartridge magnets and the blade cartridge support member magnets;

FIG. 59D shows yet another arrangement the blade cartridge magnets and the blade cartridge support member magnets;

FIG. 60 shows another view of the resistive pivot mechanism of FIG. 59A;

FIG. 61 shows another view of the blade cartridge support member of FIG. 58 wherein the blade cartridge support member is partially transparent;

FIG. 62 shows another view of the blade cartridge support member of FIG. 61 wherein the blade cartridge support member is solid;

FIG. 63 shows another view of the blade cartridge of FIG. 58 wherein the blade cartridge is partially transparent;

FIG. 64 shows another view of the blade cartridge of FIG. 63 wherein the blade cartridge is partially solid;

FIG. 65 shows another embodiment of a resistive pivot mechanism;

FIG. 66 shows the resistive pivot mechanism of FIG. 65 wherein the blade cartridge support member is solid;

FIG. 67 shows the resistive pivot mechanism of FIG. 65 wherein the blade cartridge support member is partially transparent;

FIG. 68 shows a cross-sectional view of the blade cartridge of FIG. 65;

FIG. 69 shows another cross-sectional view of the blade cartridge of FIG. 65;

FIG. 70 shows a cross-sectional view of another embodiment of a resistive pivot mechanism;

FIG. 71 shows the resistive pivot mechanism of FIG. 70 wherein the blade cartridge support member is partially transparent along with an axle and cams;

FIG. 72 shows another view of the blade cartridge support member of FIG. 71 without the axle and cams;

FIG. 73 shows another view of the blade cartridge of FIG. 70 wherein the blade cartridge support member is partially solid;

FIG. 74 shows another view of the resistive pivot mechanism of FIG. 70 wherein the blade cartridge support member is partially transparent along with the axle, cams, and detent plate;

FIG. 75 shows a cross-sectional view of the blade cartridge of FIG. 70;

FIG. 76 shows another cross-sectional view of the blade cartridge of FIG. 70;

FIG. 77 shows one embodiment of a head assembly and a handle configured to be coupled together using one or more magnets in an unassembled state;

FIG. 78 generally illustrates the head assembly and the handle of FIG. 77 in an assembled state;

FIG. 79 shows a cross-sectional view of the head assembly and handle of FIG. 77 in an unassembled state;

FIG. 80 shows a cross-sectional view of the head assembly and handle of FIG. 77 in an assembled state;

FIG. 81A illustrates the magnetic force at different displacements into the cavity consistent with the magnetic coupling of FIGS. 77-80;

FIG. 81B illustrates the magnetic force at different displacements into the cavity consistent with the magnetic coupling of FIGS. 77-80;

FIG. 82 shows another embodiment of a magnetic connection between the head assembly and the handle;

FIG. 83 shows a further embodiment of a magnetic connection between the head assembly and the handle;

FIG. 84 shows one embodiment of a blade cartridge connection mechanism for securing a blade cartridge to a blade cartridge support member in an unassembled state;

FIG. 85 shows the blade cartridge connection mechanism of FIG. 84 in an assembled state;

FIG. 86 shows a cross-sectional view of the blade cartridge connection mechanism of FIG. 84 in an unassembled state;

FIG. 87 shows a cross-sectional view of the blade cartridge connection mechanism of FIG. 84 in an assembled state;

FIG. 88 shows one embodiment of a blade cartridge retentioner for securing a blade cartridge to a blade cartridge support member in an unassembled state;

FIG. 89 shows the blade cartridge retentioner of FIG. 88 in an assembled state;

FIG. 90 another embodiment of a blade cartridge retentioner for securing a blade cartridge to a blade cartridge support member in an assembled state;

FIG. 91 shows a cross-section of the blade cartridge retentioner of FIG. 90 taken along lines A-A;

FIG. 92 shows a cross-section of the blade cartridge retentioner of FIG. 90 taken along lines B-B;

FIG. 93 another embodiment of a resistive pivot mechanism and/or a connection mechanism for coupling blade cartridge to the handle in an unassembled state;

FIG. 94 shows the resistive pivot mechanism and/or connection mechanism of FIG. 93 in an assembled state;

FIG. 95 shows a cross-section of the blade cartridge retentioner of FIG. 93;

FIG. 96 shows another resistive pivot mechanism and/or connection mechanism of in an assembled state;

FIG. 97 shows one embodiment of a hard stop/ISP protrusion;

FIG. 98 shows an embodiment of two or more diametrically magnetized (DM) magnets for coupling two components;

FIG. 99 shows an embodiment of two or more diametrically magnetized (DM) magnets for coupling two components;

FIG. 100 shows an embodiment of two or more diametrically magnetized (DM) magnets for coupling two components;

FIG. 101 shows another embodiment of two or more diametrically magnetized (DM) magnets for coupling two components in a first position;

FIG. 102 shows the two or more diametrically magnetized (DM) magnets for coupling two components of FIG. 101 in a second position;

FIG. 103 shows a further embodiments utilizing DM magnets;

FIG. 104 shows a further embodiment utilizing DM magnets;

FIG. 105 shows a further embodiment utilizing DM magnets;

FIG. 106 shows an embodiment of two or more DM magnets that allow lateral movement of the blade cartridge support member/blade cartridge relative to the handle;

FIG. 107 shows an embodiment of two or more DM magnets that allow lateral movement of the blade cartridge support member/blade cartridge relative to the handle;

FIG. 108 shows an embodiment of two or more DM magnets that allow lateral movement of the blade cartridge support member/blade cartridge relative to the handle;

FIG. 109 shows a further embodiment featuring two or more DM magnets;

FIG. 110 shows a further embodiment featuring two or more DM magnets;

FIG. 111 shows yet a further embodiment featuring two or more DM magnets;

FIG. 112 shows yet a further embodiment featuring two or more DM magnets;

FIG. 113 shows yet a further embodiment featuring two or more DM magnets;

FIG. 114 shows an additional embodiment featuring two or more DM magnets;

FIG. 115 shows an additional embodiment featuring two or more DM magnets;

FIG. 116 shows an additional embodiment featuring two or more DM magnets;

FIG. 117 shows an embodiment of multiple pairs of DM magnets to securely attach two components while also allowing the components to rotate about multiple axes relative to each other while tending to return to a predetermined rest position, and can be separated manually;

FIG. 118 shows an embodiment of multiple pairs of DM magnets to securely attach two components while also allowing the components to rotate about multiple axes relative to each other while tending to return to a predetermined rest position, and can be separated manually;

FIG. 119 shows an embodiment of multiple pairs of DM magnets to securely attach two components while also allowing the components to rotate about multiple axes relative to each other while tending to return to a predetermined rest position, and can be separated manually;

FIG. 120 shows an embodiment of multiple pairs of DM magnets to securely attach two components while also allowing the components to rotate about multiple axes relative to each other while tending to return to a predetermined rest position, and can be separated manually;

FIG. 121 shows an embodiment of a razor having at least two concentric, diametrically magnetized magnets to achieve a floating effect between two parts of the razor that allows motion in two degrees of freedom (angular and axial);

FIG. 122 shows an embodiment of a razor having at least two concentric, diametrically magnetized magnets to achieve a floating effect between two parts of the razor that allows motion in two degrees of freedom (angular and axial);

FIG. 123 shows an embodiment of a razor having at least two concentric, diametrically magnetized magnets to achieve a floating effect between two parts of the razor that allows motion in two degrees of freedom (angular and axial);

FIG. 124 shows an embodiment of a razor having at least two concentric, diametrically magnetized magnets to achieve a floating effect between two parts of the razor that allows motion in two degrees of freedom (angular and axial);

FIG. 125A shows an embodiment of a razor having at least two concentric, diametrically magnetized magnets to achieve a floating effect between two parts of the razor that allows motion in two degrees of freedom (angular and axial);

FIG. 125B shows an embodiment of a razor having at least two concentric, diametrically magnetized magnets to achieve a floating effect between two parts of the razor that allows motion in two degrees of freedom (angular and axial);

FIG. 125C shows an embodiment of lockout and/or ejection chamber or groove;

FIG. 125D shows the embodiment of lockout and/or ejection chamber or groove of FIG. 125C;

FIG. 125E shows an embodiment of lockout and/or ejection chamber or groove;

FIG. 126 shows one embodiment of a razor having a mechanical pivot to align the blade cartridge in a "Body Mode";

FIG. 127 shows an embodiment of a razor including magnets to position and control a rotating blade cartridge within support member;

FIG. 128 shows an embodiment of a razor including magnets to position and control a rotating blade cartridge within support member;

FIG. 129 shows an additional embodiment of a resistive pivot mechanism;

FIG. 130 shows an various embodiment of a resistive pivot mechanism;

FIG. 131 shows yet another embodiment of a razor having a resistive pivot mechanism;

FIG. 132 shows a further embodiment of a razor having a resistive pivot mechanism;

FIG. 133 shows a further embodiment of a razor having a resistive pivot mechanism having only one arm magnet;

FIG. 134 shows an embodiment similar to FIG. 132 that has been modified to remove the arm that does not include a magnet;

FIG. 135 shows an embodiment similar to FIG. 132 that has been modified to remove the arm that does not include a magnet;

FIG. 136 shows an embodiment of a variation of the embodiment of FIGS. 129-130 wherein the pivot axle is fixed to the blade cartridge rather than the arm, and passageways/grooves/slots are provided in the arm and/or magnets to allow the blade cartridge and axle to be removed from the arm;

FIG. 137 shows an embodiments of a variation of the embodiment of FIGS. 129-130 wherein the pivot axle is fixed to the blade cartridge rather than the arm, and passageways/grooves/slots are provided in the arm and/or magnets to allow the blade cartridge and axle to be removed from the arm;

FIG. 138 shows a further embodiment of a razor having a resistive pivot mechanism;

FIG. 139 shows one embodiment of a razor which includes nanotube sheets, strips or threads incorporated into the disposable head assembly;

FIG. 140 shows embodiment of a resistive pivot mechanism and a coupling mechanism;

FIG. 141 shows an embodiment of pivotably coupling the blade cartridge to the blade cartridge support member using a plurality of magnets;

FIG. 142 shows an embodiment of pivotally coupling the blade cartridge to the blade cartridge support member using a plurality of magnets;

FIG. 143 shows one embodiment wherein the repelling magnets optionally include mating features;

FIG. 144A shows another embodiment of a razor that may be selectively arranged in either "Face Mode" and "Body Mode";

FIG. 144B shows another embodiment of a razor that may be selectively arranged in either "Face Mode" and "Body Mode";

FIG. 144C shows another embodiment of a razor that may be selectively arranged in either "Face Mode" and "Body Mode";

FIG. 144D shows another embodiment of a razor that may be selectively arranged in either "Face Mode" and "Body Mode";

FIG. 144E shows another embodiment of a razor that may be selectively arranged in either "Face Mode" and "Body Mode";

FIG. 145A shows another embodiment of a razor that may be selectively arranged in either "Face Mode" and "Body Mode";

FIG. 145B shows another embodiment of a razor that may be selectively arranged in either "Face Mode" and "Body Mode";

FIG. 145C shows another embodiment of a razor that may be selectively arranged in either "Face Mode" and "Body Mode";

FIG. 145D shows another embodiment of a razor that may be selectively arranged in either "Face Mode" and "Body Mode";

FIG. 145E shows another embodiment of a razor that may be selectively arranged in either "Face Mode" and "Body Mode";

FIG. 146A shows another embodiment of a razor that may be selectively arranged in either "Face Mode" and "Body Mode";

FIG. 146B shows another embodiment of a razor that may be selectively arranged in either "Face Mode" and "Body Mode";

FIG. 146C shows another embodiment of a razor that may be selectively arranged in either "Face Mode" and "Body Mode";

FIG. 147 shows one embodiment of a magnetic biasing system for urging a blade cartridge to an initial starting position (ISP);

FIG. 148 shows one embodiment of a magnetic biasing system for urging a blade cartridge to an initial starting position (ISP);

FIG. 149 shows one embodiment of a magnetic biasing system for urging a blade cartridge to an initial starting position (ISP);

FIG. 150 shows another embodiment of a magnetic biasing system for urging a blade cartridge to an ISP;

FIG. 151 shows an embodiment of a magnetic retainer clip;

FIG. 152 shows an embodiment of a magnetic retainer clip;

FIG. 153A shows an embodiment of a magnetic retainer clip;

FIG. 153B shows an embodiment of a magnetic retainer clip;

FIG. 154 shows an embodiment of a magnetic retainer clip;

FIG. 155A shows an embodiment of a magnetic retainer clip;

FIG. 155B shows an embodiment of a magnetic retainer clip;

FIG. 156 shows an embodiment of a magnetic retainer clip;

FIG. 157A shows an embodiment of a magnetic retainer clip;

FIG. 157B shows an embodiment of a magnetic retainer clip;

FIG. 158 shows an embodiment of a replaceable blade assemblies;

FIG. 159 shows an embodiment of a replaceable blade assemblies;

FIG. 160 shows an embodiment of a replaceable blade assemblies;

FIG. 161 shows an embodiment of a replaceable blade assemblies;

FIG. 162 shows an embodiment of a replaceable blade assemblies;

FIG. 163 shows an embodiment of a replaceable blade assemblies;

FIG. 164 shows an embodiment of a replaceable blade assemblies;

FIG. 165 shows an embodiment of a replaceable blade assemblies;

FIG. 166 shows an embodiment of a razor blades and/or shaving aids that are secured to a blade cartridge using magnets;

FIG. 167 shows an embodiment of a razor blades and/or shaving aids that are secured to a blade cartridge using magnets;

FIG. 168 shows an embodiment of a razor blades and/or shaving aids that are secured to a blade cartridge using magnets;

FIG. 169 shows another embodiment of a connection system between blade cartridge and the handle;

FIG. 170 shows another embodiment of a connection system between blade cartridge and the handle;

FIG. 171 shows one embodiment of a head assembly comprising a blade cartridge biased limiter;

FIG. 172 generally illustrates region C172 of FIG. 171 including the blade cartridge biased limiter in an extended position;

FIG. 173 generally illustrates region C172 of FIG. 171 including the blade cartridge biased limiter in a retracted position;

FIG. 174 shows another embodiment of a connection system between blade cartridge and the handle;

FIG. 175 shows another embodiment of a connection system between blade cartridge and the handle;

FIG. 176 shows another embodiment of a connection system between blade cartridge and the handle;

FIG. 177 shows another embodiment of a connection system between blade cartridge and the handle;

FIG. 178 shows another embodiment of a connection system between blade cartridge and the handle;

FIG. 179 shows another embodiment of a connection system between blade cartridge and the handle;

FIG. 180 shows a further embodiment of a connection system between blade cartridge and the handle;

FIG. 181 shows a further embodiment of a connection system between blade cartridge and the handle;

FIG. 182 shows yet another embodiment of a connection system between blade cartridge and the handle; and FIG. 183 shows an embodiment of a connection system between the handle and various personal hygiene devices;

FIG. 184 shows an embodiment of a connection system between the handle and various personal hygiene devices;

FIG. 185 shows an embodiment of a connection system between the handle and various personal hygiene devices;

FIG. 186 shows an embodiment of a connection system between the handle and various personal hygiene devices.

It should be appreciated that the above descriptions of the drawings are for illustrative purposes only and must therefore be read in view of the detailed description below. Not all of the features in the above description of the drawings must be in any particular embodiment(s) of the of the drawings, other features not listed in the above description of the drawings are also described that may be included with or without the above described features of the drawings, and the features described in of drawings/detailed description may be combined and/or modified in view of other features described in other drawings.

DETAILED DESCRIPTION

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

Referring now to the figures, FIGS. 1-4 show a personal, manual (i.e. non-powered) shaving device 10 according to one embodiment of the present disclosure, which is particularly useful for shaving human hair. As shown, shaving device 10 comprises a disposable head assembly 20 to shave the hair of a user of shaving device 10, as well as a handle 60 to hold and manipulate the shaving device 10.

Figure 1A:
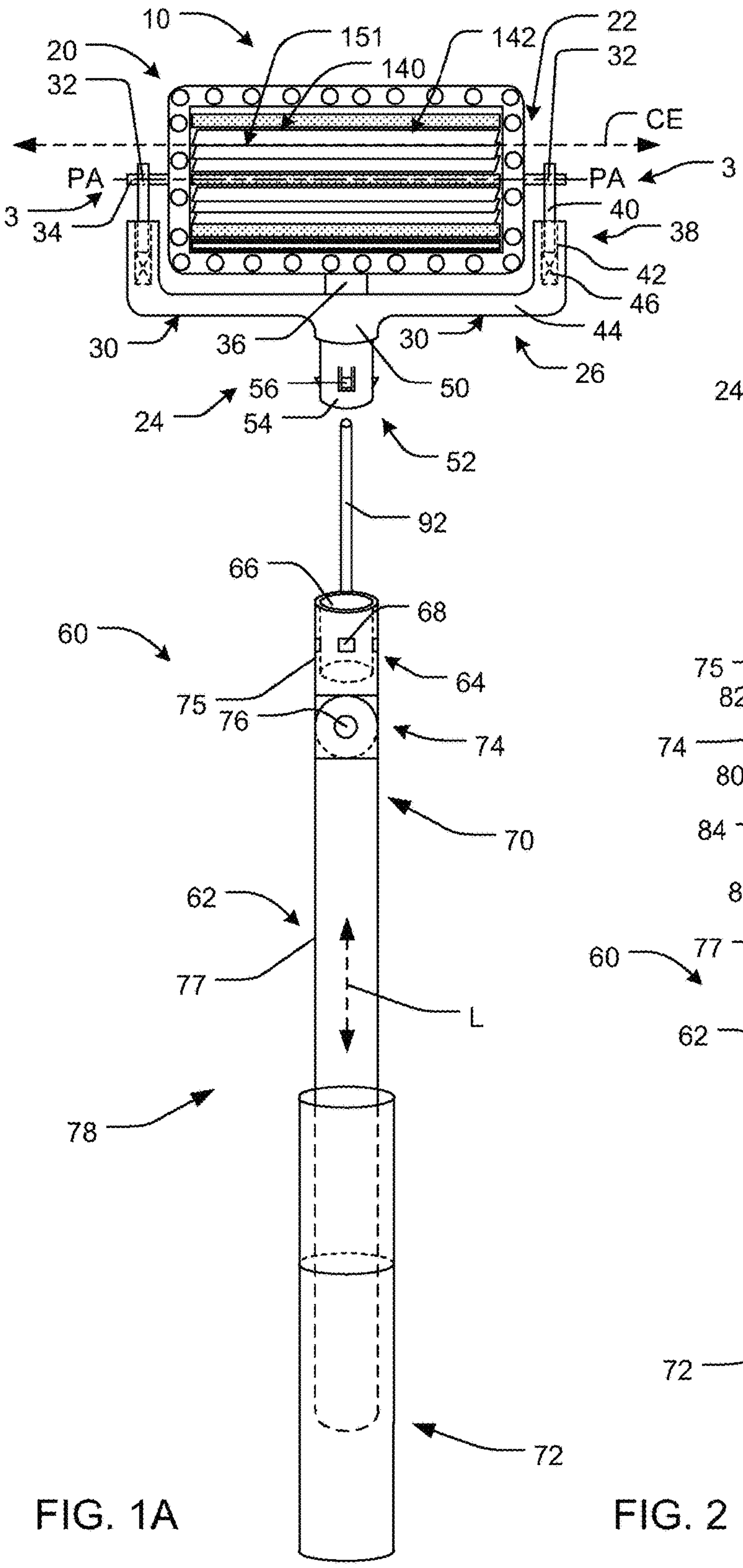
FIG. 1A shows a front view of a partially assembled shaving device consistent with one embodiment of the present disclosure.

As best shown by FIG. 1A, the disposable head assembly 20 comprises a blade cartridge 22 and a blade cartridge support member 24. As shown, blade cartridge support member 24 comprises a generally U-shaped cartridge support frame 26. U-shaped cartridge support frame 26 comprises two generally curved support arms 30. For example, the support arms 30 may have a generally C-shape or L-shape.

To facilitate pivotable attachment of blade cartridge 22 to the blade cartridge support member 24 and subsequent use thereof, the blade cartridge 22 and the blade cartridge support member 24 may include one or more hinges or pivot assemblies 3 that allows the blade cartridge 22 to rotate about a pivot axis PA (e.g., about a direction generally perpendicular to the longitudinal axis L of the handle 60.) As described herein, the hinge or pivot assembly 3 may be configured to allow the blade cartridge 22 to rotate approximately 180 degrees about pivot axis PA such that a front side 140 and rear side 156 of the blade cartridge 22 may be used. According to one embodiment, the hinge or pivot assembly 3 may be configured to allow the blade cartridge 22 to rotate approximately 360 degrees about pivot axis PA.

For example, the hinge or pivot assembly 3 may include a pivot receptacle 32 (e.g., in the form of a through-hole) disposed in each support arm 30 of the blade cartridge support member 24 (e.g., but not limited to, a distal section 40 of the support arms 30), each of which receives a pivot pin/cylinder 34 located on opposing lateral sides of the blade cartridge 22. The pivot pins/cylinders 34 may extend generally outwardly from the lateral sides of the blade cartridge 22. With the foregoing arrangement, the blade cartridge 22 is arranged between the support arms 30 and supported by each support arm 30 at a pivot connection (assembly), and the blade cartridge 22 is able to rotate about the pivot axis PA at any angle, up to and including 360° degrees. It should be appreciated that the location of one or more of the pivot receptacles 32 and the pivot pins 34 may be switched (e.g., one or more of the pivot receptacles 32 may be located in the blade cartridge 22 and one or more of the pivot pins 34 may extend outwardly from the support arms 30 of the blade cartridge support member 24)

In order to cushion use of blade cartridge 22 while shaving, one or more of the support arms 30 may include a cushioning mechanism 38. As shown, a second (distal) section 40 of each support arm 30 is configured to slide within a receptacle 42 (e.g., a slotted recess) of a first (proximal) section 44 of each support arm 30. Each receptacle 42 may include a compression (e.g., coil) spring or biasing device 46 at the bottom thereof. As used herein, proximal and distal may be understood relative to the user of shaving device 10.

In the foregoing manner, the biasing device 46 of the cushioning mechanism 38 may compress in response to a downward force placed on blade cartridge 22, with such compression biasing against the downward force. In doing so, such compression may absorb/dampen the downward force to cushion use of the blade cartridge 22. Furthermore, since the cushioning mechanism 38 of each support arm 30 is independent of one another, the cushioning mechanism 38 may enable each lateral end of the blade cartridge 22 to move and/or be cushioned independently. It should be understood that in other embodiments of shaving device 10, the blade cartridge support member 24 may not include a cushioning mechanism 38.

The head assembly 20 may be selectively detachably connectable to the handle 60 by the user. As may be appreciated, any mechanism for selectively coupling the blade cartridge support member 24 to the handle 60 may be used. For example, the blade cartridge support member 24 may include a support hub 50, which may be centrally disposed between the two support arms 30. The support hub 50 includes a mechanical connection element 52 which mechanically connects the blade cartridge support member 24 to a mechanical connection element 64 of elongated shaft 62 of handle 60.

Figure 2:
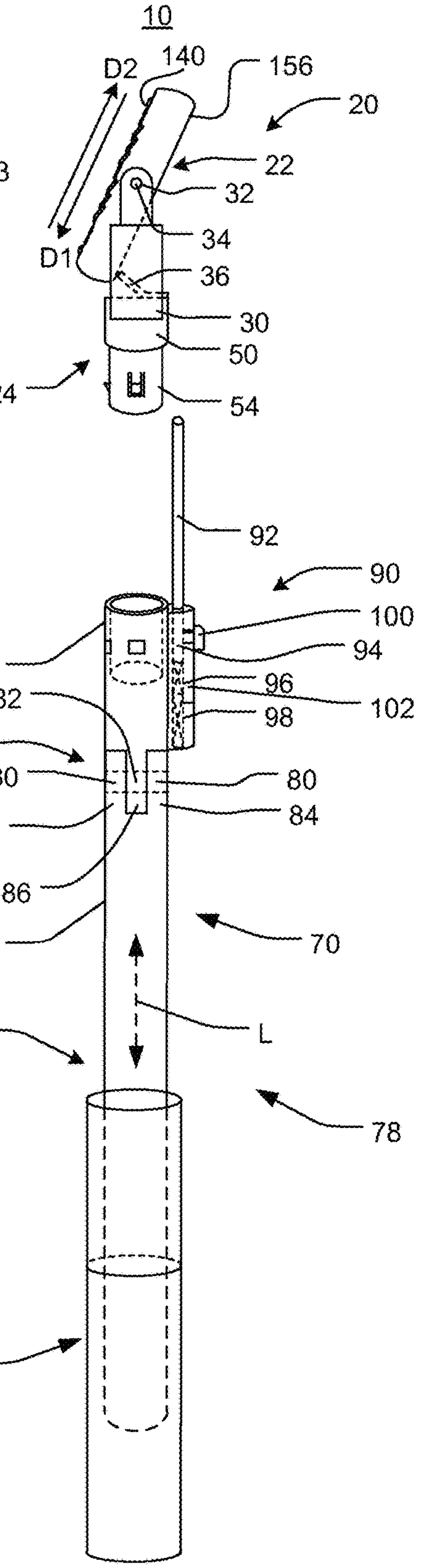
FIG. 2 shows a side view of the partially assembled shaving device of FIG. 1A.

For example, as shown by FIGS. 1A and 2, one embodiment of a connection element 52 of the blade cartridge support member 24 comprises a hollow (tubular) cylindrical shank 54 which is configured to fit within a cylindrical recess 66 of connection element 64 of handle 60. In order to provide a positive mechanical connection, cylindrical shank 54 includes a plurality of deformable (cantilevered and/or spring loaded) engagement tabs 56 which engage within engagement apertures 68. The deformable (cantilevered and/or spring loaded) engagement tabs 56 may, in one embodiment, be configured to be moved out of engagement with the engagement apertures 68 upon depressing of an actuation button 100 and/or by manually depressing each individual engagement tab with the user's hands/fingers.

Once the engagement tabs 56 are engaged within the engagement apertures 68, the head assembly 20 and handle 60 may be generally inhibited from separating from one another. Thereafter (e.g., after the useful life of the blade cartridge 22), the head assembly 20 and handle 60 may be detached from one another by depressing the engagement tabs 56 inward (e.g., by depressing a button or the like disposed on the handle 60 and/or the disposable head assembly 20 and/or by manually depressing each engagement tab with the user's hands/fingers), and pulling the cylindrical shank 54 of the blade cartridge support member 24 out of the cylindrical recess 66 of the handle 60. The used head assembly 20/blade cartridge 22 may then be replaced with a fresh head assembly 20/blade cartridge 22. Thus, as may be understood the head assembly 20 is selectively detachably connectable to the handle 60 by the user.

Figure 5:
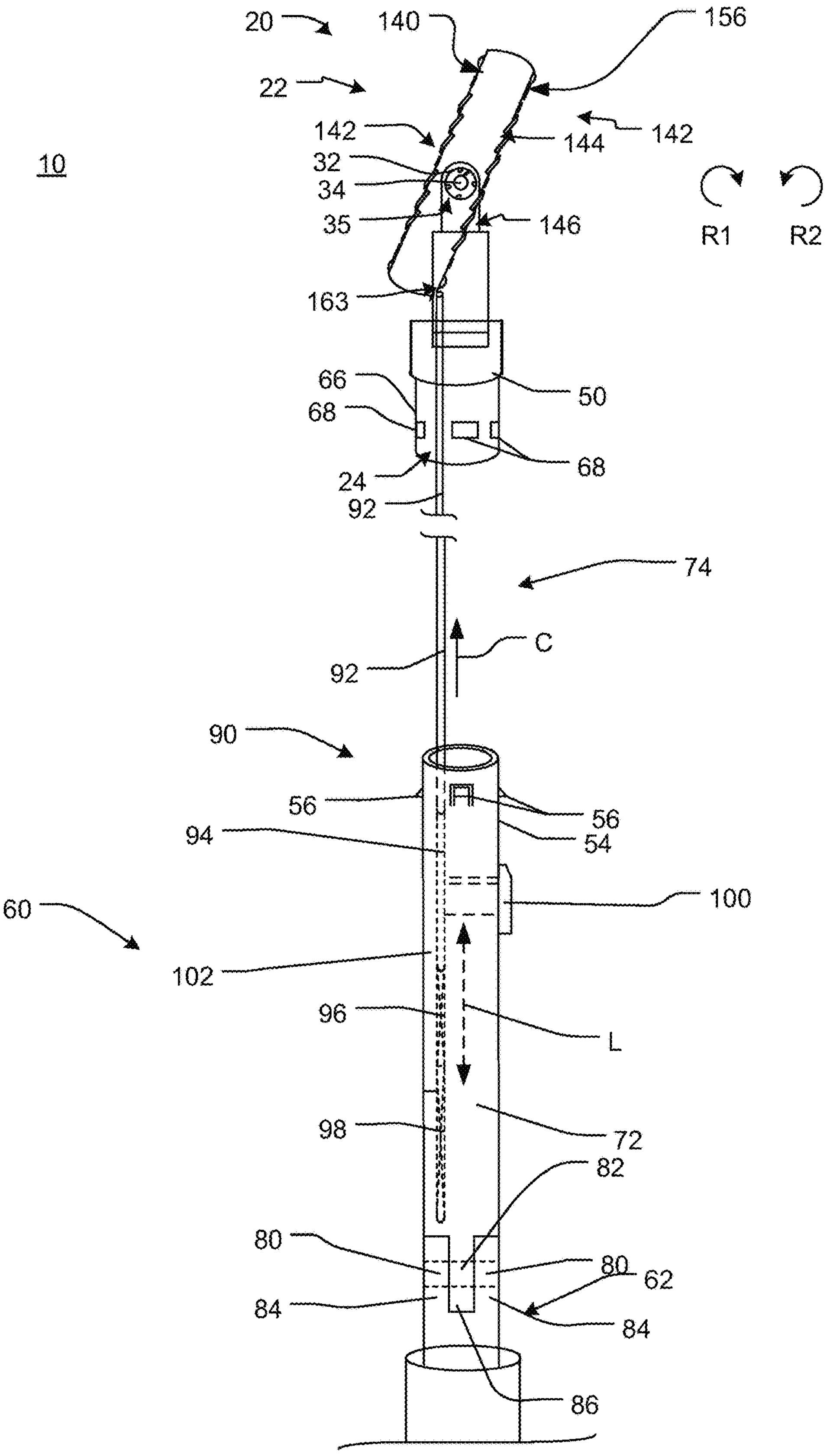
FIG. 5 shows another embodiment of the shaving device.

Although the shank 54 and recess 66 are shown as part of the blade cartridge support member 24 and the handle 60, respectively, it should be appreciated that the arrangement of the shank 54 and recess 66 may be switched (e.g., the shank 54 and recess 66 may be part of the handle 60 and the blade cartridge support member 24, respectively, see, for example, FIG. 5). Additionally, while the deformable (cantilevered and/or spring loaded) engagement tabs 56 and the engagement apertures 68 are shown as part of the shank 54 and recess 66, respectively, it should be appreciated that the arrangement of the deformable (cantilevered and/or spring loaded) engagement tabs 56 and the engagement apertures 68 may be switched (e.g., the deformable (cantilevered and/or spring loaded) engagement tabs 56 and the engagement apertures 68 may be part of the recess 66 and the shank 54, respectively). Again, it should be appreciated that the connection element 52 is not limited to arrangement illustrated and/or described herein unless specifically claimed as such, and that any connection element 52 that allows a user to selectively releasably couple the head assembly 20 to the handle 60 may be used.

The handle 60 (FIGS. 1A-1C) may optionally include one or more hinges 74 configured to allow the head assembly 20 to be selectively rotated relative to a portion of the handle 60 such that the orientation of the head assembly 20 (e.g., a longitudinal axis H of the head assembly 20) relative to the handle 60 (e.g., the longitudinal axis L of the handle 60) may be adjusted by the user. The hinge 74 may be positioned substantially anywhere along the length of the handle 60, but may be positioned proximate to a first (proximal) region of the handle 60 as generally illustrated.

Figure 1B:
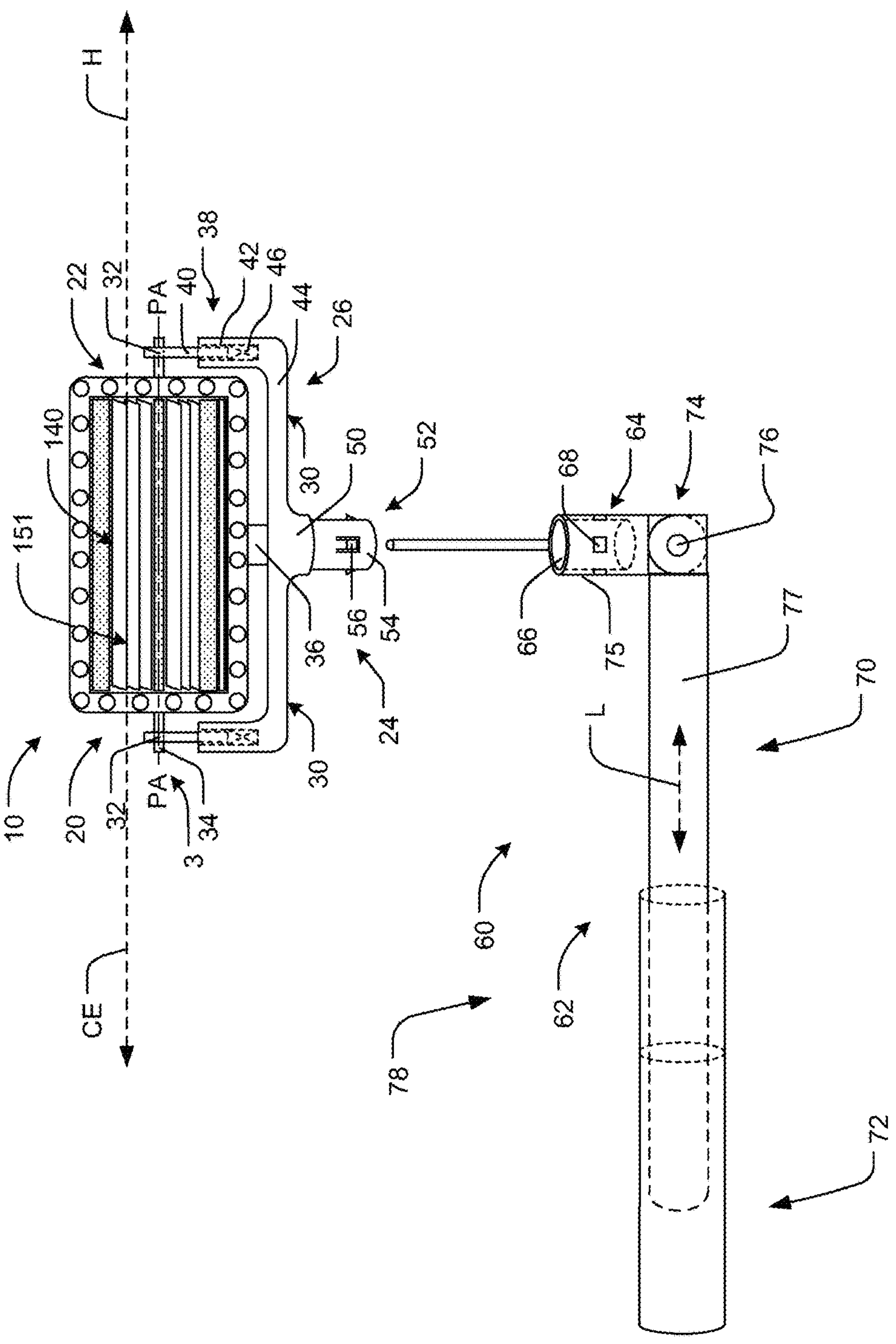
FIG. 1B shows a front view of a partially assembled shaving device of FIG. 1A with one embodiment of a hinge illustrating the head assembly generally parallel to the handle.
Figure 1C:
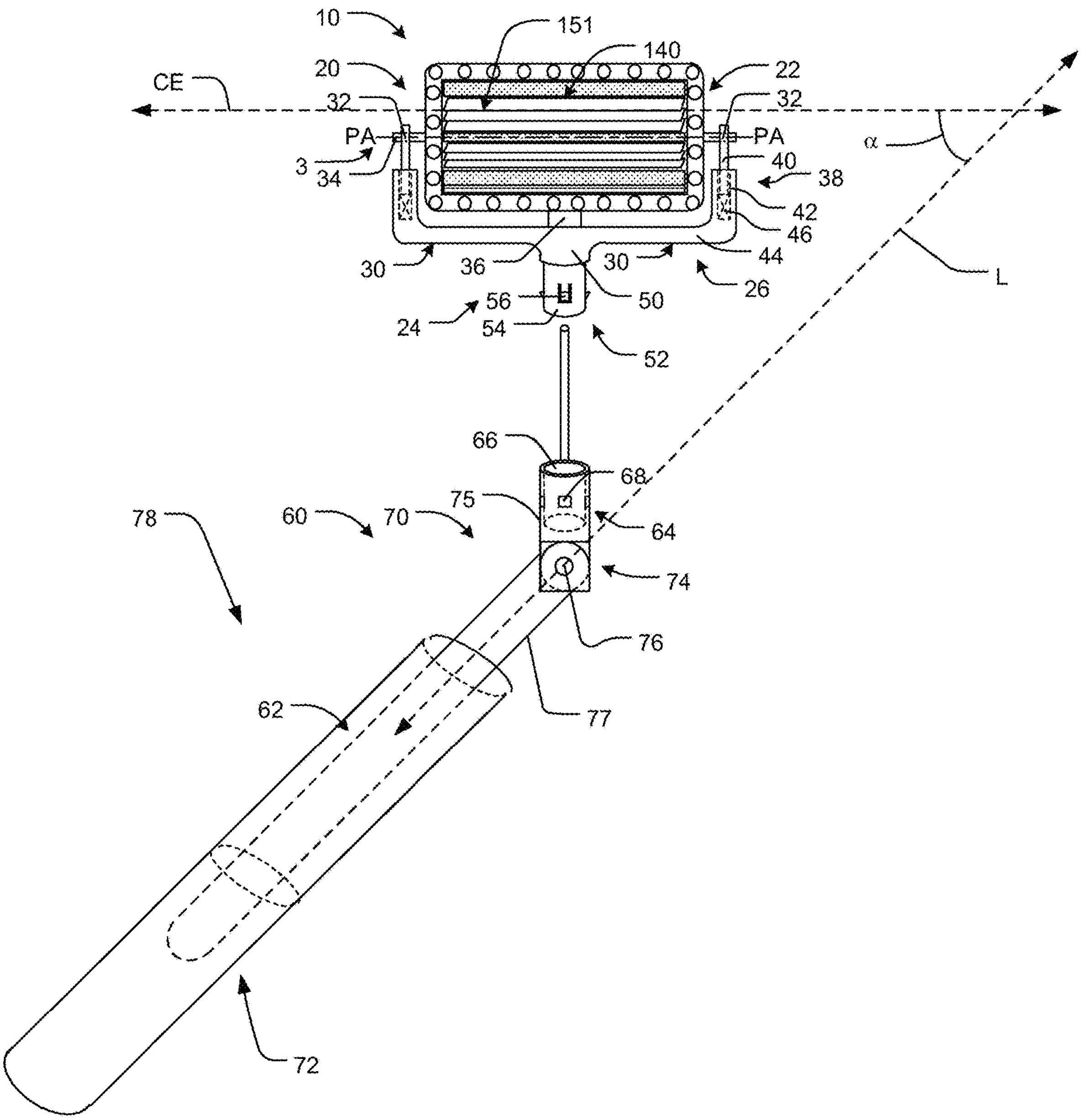
FIG. 1C shows a front view of a partially assembled shaving device of FIG. 1A with one embodiment of a hinge illustrating the head assembly at an angle α relative to the handle.

With reference to FIG. 1A, it may be appreciated that the cutting edge axis CE of the cutting edge 151 of one or more of the razor blades 142 of the head assembly 20 is aligned generally perpendicular (e.g., generally transverse/90 degrees) relative to the longitudinal axis L of the handle 60. As described herein (e.g., as generally illustrated in FIGS. 1B and 1C), the hinge 74 may be configured to allow the user to selectively rotate the head assembly 20 about a pivot point of the handle 60 such that the cutting edge axis CE of the cutting edge 151 of one or more of the razor blades 142 of the head assembly 20 is aligned at an angle $\alpha$ (see, for example, FIG. 1C) other than transverse/perpendicular/90 degrees relative to the longitudinal axis L of the handle 60. For example, FIG. 1B generally illustrates the cutting edge axis CE of the cutting edge 151 of one or more of the razor blades 142 of the head assembly 20 being generally parallel to the longitudinal axis L of the handle 60 while FIG. 1C generally illustrates the cutting edge axis CE of the cutting edge 151 of one or more of the razor blades 142 of the head assembly 20 at an angle $\alpha$ less than 90 degrees, for example, between 0 and less than 90 degrees, relative to the longitudinal axis L of the handle 60.

One embodiment of a hinge 74 consistent with the present disclosure is generally illustrated in FIGS. 1A and 2. The hinge 74 may include a hinge pin 76 that extends through receptacles 80, 82 of overlapping joint portions 84, 86 (see FIG. 2) of a first (proximal) shaft portion 75 and a second (distal) shaft portion 77 of the handle 60. In addition to enabling the first (proximal) elongated shaft section 75 and the second elongated (distal) shaft section 77 to rotate relative to one another, hinge pin 76 may also inhibit the first (proximal) shaft portion 75 and the second (distal) shaft portion 77 from separating relative to one another. The hinge 74 may optionally include a locking mechanism (e.g., but not limited to, a locking pawl, ratchet mechanism, or the like) configured to allow the user to generally lock or fix the relative position of the head assembly 20 relative to the handle 60.

It should be appreciated that the hinge 74 may also be configured to allow the user to selectively rotate the head assembly 20 about a pivot point of the handle 60 such that the cutting edge axis CE of the cutting edge 151 of one or more of the razor blades 142 of the head assembly 20 remains substantially transverse/perpendicular/90 degrees relative to the longitudinal axis L of the handle 60. For example, the arrangement of the hinge pin 76 and receptacles 80, 82 may be rotated approximately 90 degrees about the longitudinal axis L of the handle 60 from the arrangement illustrated in FIGS. 1A-1C.

The handle 60 may also optionally include an elongated shaft 62. The elongated shaft 62 optionally includes a telescoping handle extension 78 including a first and a least a second shaft section 70, 72 configured to telescopically slide relative to one another such that the overall length of the handle 60 may be adjusted by the user. It should be understood that one or more of the shaft sections 70, 72 may also optionally include one or more hinges 74 as described herein. It should also be understood that in other embodiments of shaving device 10, the elongated shaft 62 may be formed of a single section and not include the hinge 74, and the telescoping handle extension 78 may be eliminated.

Figure 3:
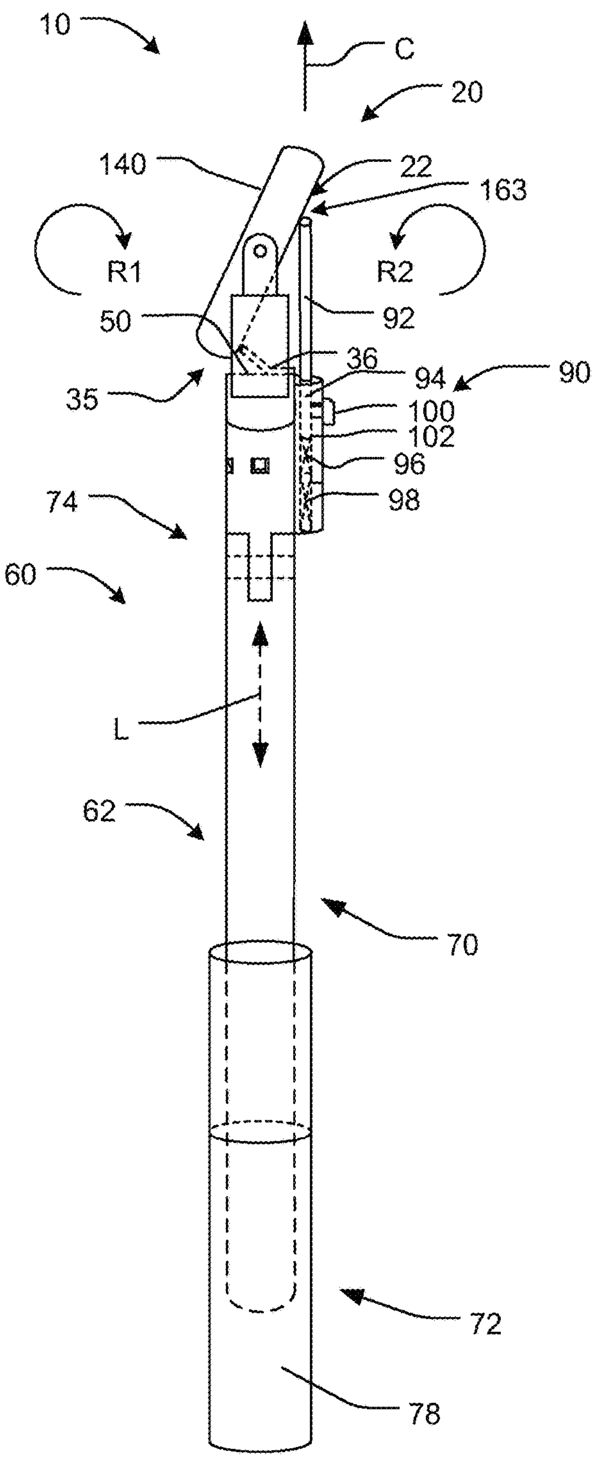
FIG. 3 shows a side view of the shaving device of FIG. 1A as fully assembled with a pivot biasing mechanism extended.
Figure 4:
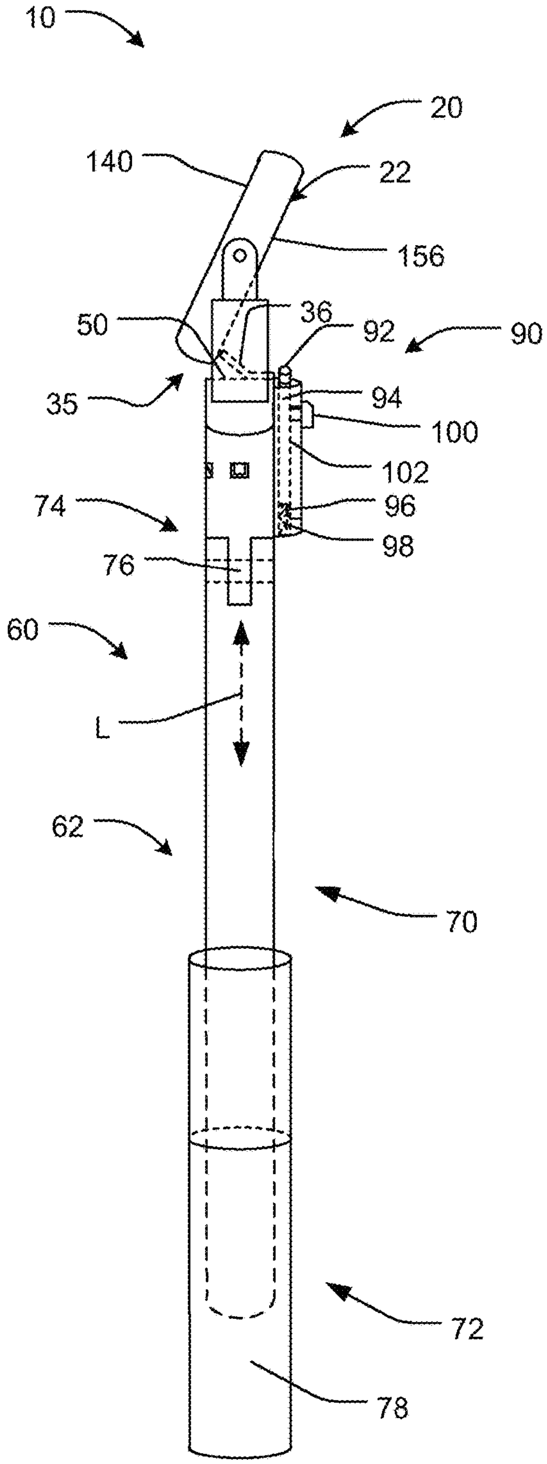
FIG. 4 shows a side view of the shaving device of FIG. 1A as fully assembled with a pivot biasing mechanism retracted.
Figure 6A:
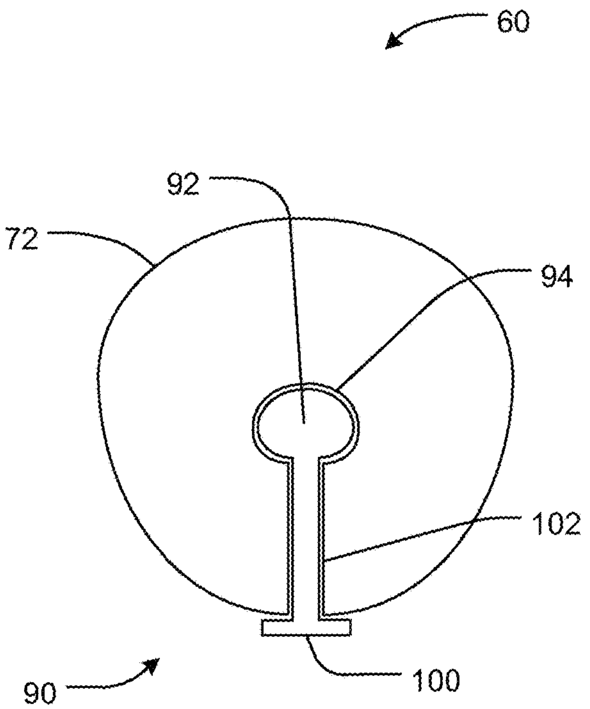
FIG. 6A shows a cross-sectional view taken through the handle of the shaving device of FIG. 6B taken along lines 6-6.
Figure 6B:
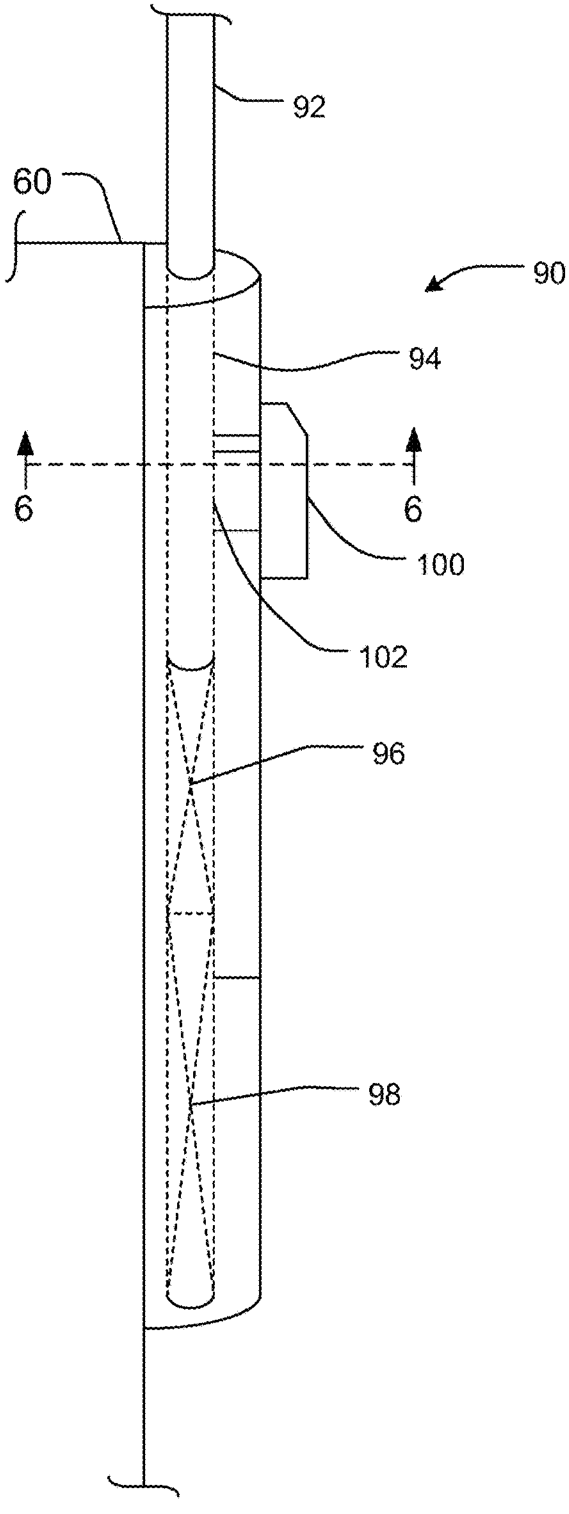
FIG. 6B shows a close-up of one embodiment of a blade cartridge pivot biasing mechanism.

With reference to FIGS. 3-5, the shaving device 10 (e.g., the handle 60) may optionally include one or more blade cartridge pivot biasing mechanisms 90 to control the rotation of the blade cartridge 22 about a pivot axis PA in a direction relative to blade cartridge support member 24. Pivot biasing mechanism 90 may include one or more elongated cylindrical rods 92 which slide within cylindrical recess 94 of handle 60. The elongated cylindrical rod 92 may be biased generally in the direction of arrow C (i.e., generally towards the blade cartridge 22 as generally illustrated in FIGS. 3 and 5). For example, the handle 60 may include a cylindrical recess 94 (best seen in FIGS. 6A and 6B) having one or more biasing devices (e.g., springs or the like) configured to urge the elongated cylindrical rod 92 generally in the direction of arrow C. In one embodiment, a first biasing device 96 (e.g., a coil spring or the like) may be disposed within the cylindrical recess 94 beneath cylindrical rod 92, and optionally a second biasing device 98 (e.g., a coil spring or the like) may also be disposed within the cylindrical recess 94 beneath the first biasing device 96. The second biasing device 98 may have a greater spring (force) constant than the first biasing device 96.

As may be appreciated, the blade cartridge 22 may pivot about pivot axis PA in rotation direction R1 and R2 during use of shaving device 10 as the blade cartridge 22 follows the contour of the skin surface being shaved. During such time, the distal end (e.g., spherical distal end) of cylindrical rod 92 makes contact with a rear side 156 of the blade cartridge 22 (i.e., the surface of the blade cartridge 22 generally opposite of the surface being used to during shaving) to urge the blade cartridge 22 to pivot about the pivot axis PA. As explained herein, the blade cartridge 22 may optionally include razor blades 142 on both the front side 140 and rear side 156. In such a case, the distal end of rod 92 may be configured to contact the blade cartridge 22 in an area 163 other than where the razor blades 142 are located.

According to one embodiment (FIGS. 3 and 4), the rod 92 may contact the blade cartridge 22 at a location above the pivot axis PA, and the pivot biasing mechanism 90 may urge the blade cartridge 22 in the opposite direction (e.g., in the direction R2). Alternatively, the rod 92 may contact the blade cartridge 22 at a location below the pivot axis PA as generally illustrated in FIG. 5, and the pivot biasing mechanism 90 may urge the blade cartridge 22 in the direction R1. As such, depending on where the biasing rod 92 contacts the blade cartridge (i.e., above the pivot axis PA in FIGS. 3-4 or below the pivot axis PA in FIG. 5), the pivot biasing mechanism 90 may urge the blade cartridge 22 generally in direction R2 (in FIGS. 3-4) or direction R1 (in FIG. 5) and may generally inhibit rotation of the blade cartridge 22 in the opposite direction of (e.g., R1 in FIG. 3-4 or R2 in FIG. 5) beyond a certain/predetermined point (degree of rotation) once the spring(s) 96, 98 bottom out.

Additionally, as explained in greater detail herein, in at least one embodiment, blade cartridge 22 may be configured to rotate approximately 180 degrees or more about the pivot axis PA such that the user can select either the front or rear surfaces 140, 156 of the blade cartridge 22. For example, the blade cartridge 22 may include shaving (razor) blades on both the front side 140 and rear side 156 thereof (see, for example, FIG. 5 or 8). Alternatively (or in addition), the blade cartridge 22 may include shaving (razor) blades on the front side 140 and a mirror on the rear side 156.

According to one embodiment, the pivot biasing mechanism 90 may optionally include an actuation button 100. The actuation button 100 may be coupled to the rod 92 and may be configured to retract the rod 92 generally in the direction opposite to arrow C (see, for example, FIGS. 3 and 5) and out of the path of the blade cartridge as the blade cartridge 22 is rotated approximately 180 degrees (or more) about the pivot axis PA as generally illustrated in FIG. 4. For example, the actuation button 100 may travel in a guide track 102 (FIGS. 6A and 6B) provided by an elongated slot formed in the handle 60. The user may urge the actuation button 100 in the direction generally opposite of arrow C to retract rod 92 with sufficient force to compress the biasing device(s) 96, 98, thereby allowing the cylindrical rod 92 to retract far enough (e.g., generally in the direction opposite of arrow C and generally away from the blade cartridge 22) such that blade cartridge 22 may be rotated approximately 180 degrees (or more) about the pivot axis PA, for example, in the direction generally opposite the biasing direction of the rod 92 (e.g., direction R1 in FIGS. 3-4 and direction R2 in FIG. 5) without contacting rod 92. It should be appreciated that while the pivot biasing mechanism 90 is illustrated on the exterior of the handle 60 in FIGS. 6A and 6B, portions of the pivot biasing mechanism 90 may be located within an interior region of the handle 60 as generally illustrated herein.

According to another embodiment, the disposable head assembly 20 may optionally include one or more blade cartridge rotation limiters 35 configured to generally limit the range of rotation of the blade cartridge 22 relative to the handle 60 and/or blade cartridge support member 24 while using either the front or rear side 140, 156. The blade cartridge rotation limiters 35 may be configured to generally inhibit the blade cartridge 22 from pivoting about pivot axis PA beyond a certain/predetermined point (degree of rotation) in rotation direction R2 (in FIGS. 3-4) or rotation direction R1 (in FIG. 5). As such, the blade cartridge rotation limiter 35 may be configured to generally prevent rotation beyond a predetermined point.

With reference to FIG. 3, one embodiment of a blade cartridge rotation limiter 35 consistent with the present disclosure is generally illustrated. The blade cartridge rotation limiter 35 may include a resilient, deformable stop member or pawl 36 configured to contact against an opposite side of the blade cartridge 22 being used. For example, the deformable pawl 36 may contact an edge region of the blade cartridge 22 at a location below the pivot axis PA once the blade cartridge 22 pivots about pivot axis PA in rotation direction R2 beyond a certain/predetermined point (degree of rotation). While the deformable pawl 36 is illustrated extending outwardly from the support hub 50 and contacting a portion of the blade cartridge 22, it should be appreciated that this arrangement may be reverse. For example, the deformable pawl 36 may also be configured to extend outwardly from the blade cartridge 22 to contact a portion of the support hub 50.

In order to rotate the blade cartridge 22 approximately 180 degrees or more about the pivot axis PA, the pin 92 may be retracted as generally illustrated in FIG. 4 and the blade cartridge 22 may be rotated in the direction R1. As the blade cartridge 22 is rotated in direction R1, the blade cartridge 22 will contact the pawl 36. The pawl 36 (which may be formed of a polymer composition, such as an elastomer, or sheet metal) will deform downward (e.g., generally towards the hub 50 and/or support arms 30 of support frame 26) to allow the blade cartridge 22 to continue to rotate in direction R1. Once the blade cartridge 22 is past the pawl/resilient deformable stop member 36, the stop member 36 will return to its initial position, and inhibit the blade cartridge 22 from rotating backwards in rotation direction R2. This resilient deformable stop member 36 permits the blade cartridge 22 to be rotated in one direction, but inhibits the blade cartridge 22 from rotating in the opposite direction. Again (as noted above), while the pawl 36 is illustrated as extending from the support frame 26, the pawl 36 may extend from the blade cartridge 22 and may similarly resiliently deform as the blade cartridge 22 is rotated about the pivot axis PA.

With reference again to FIGS. 5 and 7, another embodiment of a blade cartridge rotation limiter 35 consistent with the present disclosure is generally illustrated. The blade cartridge rotation limiter 35 may include a resilient, deformable stop member or pawl 36 configured to contact against one or more of a plurality of teeth 37. In the embodiment illustrated in FIGS. 5 and 7, the pawl 36 extends generally radially outwardly from the pivot pin 34 and the teeth 37 extending generally radially inward from the pivot receptacles 32; however, it should be appreciated that the arrangement of the pawl 36 and the teeth 37 may be switched and that the pawl 36 may extend generally radially inwardly from the pivot receptacles 32 and the teeth 37 extend generally radially outwardly from the pivot pin 34.

Figure 7:
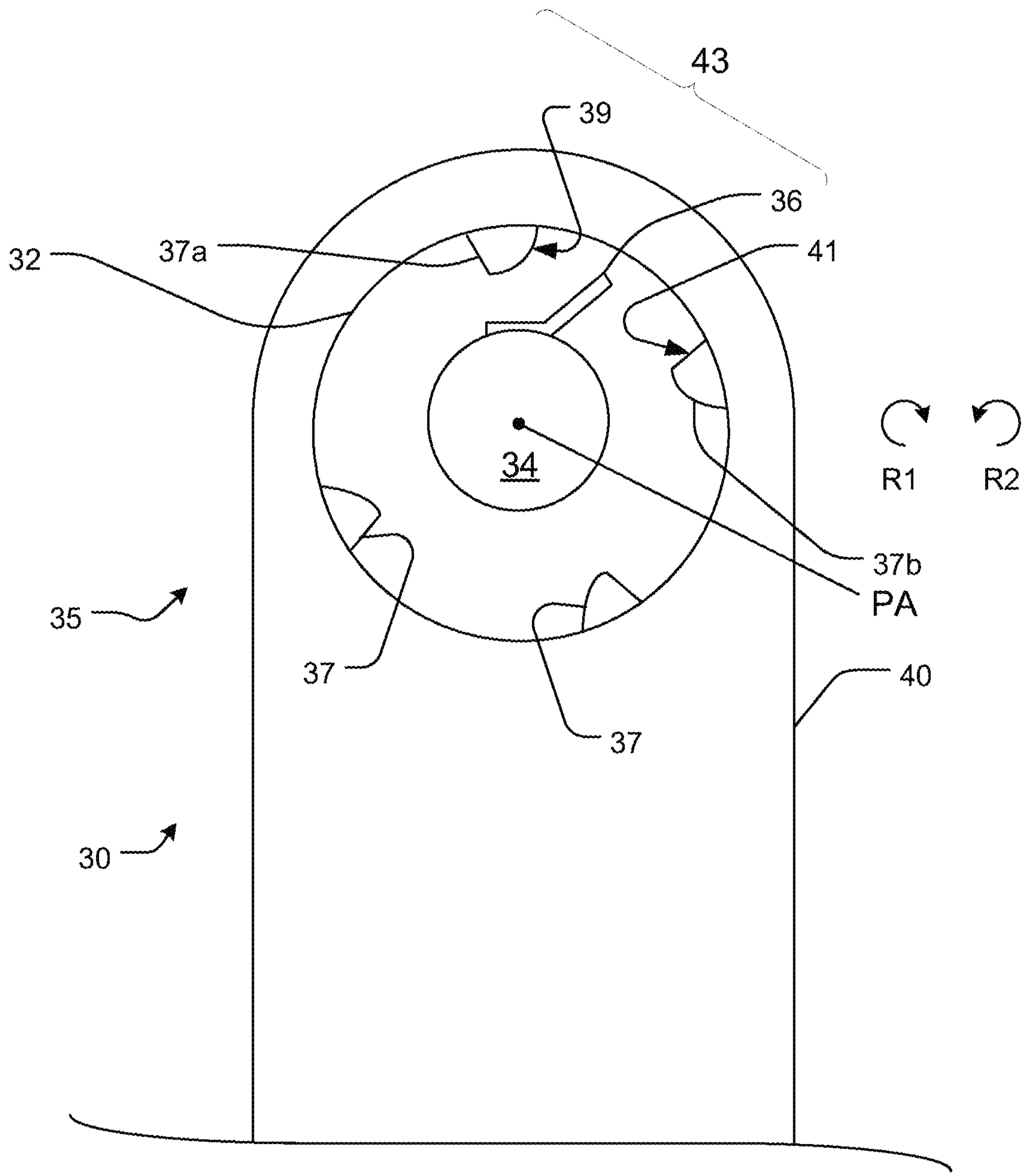
FIG. 7 shows one embodiment of a resistive pivot mechanism consistent with FIG. 5.

As best illustrated in FIG. 7, rotation of the pivot pin 34 in a first direction about the pivot axis PA (e.g., in direction R2 in the illustrated embodiment) may cause the pawl 36 to contact against a moderately sloped, tapered, curved, convex, concaved, and/or arcuate portion (e.g., first portion) 39 of a first tooth 37*a*, thereby causing the pawl 36 to resiliently deform out of the way of the first tooth 37*a* (e.g., deform generally radially inwardly in the illustrated embodiment) and allowing the pivot pin 34 to continue to rotate about the pivot axis PA in the first direction. Conversely, rotation of the pivot pin 34 in a second direction about the pivot axis PA (e.g., in direction R1 in the illustrated embodiment) may cause the pawl 36 to contact against a steeply sloped, upright, and/or generally vertical portion (e.g., second portion) 41 of a second tooth 37*b* (e.g., an adjacent tooth), thereby causing the pawl 36 to engage second portion 41 of the tooth 37*b* and generally preventing the pivot pin 34 from rotating about the pivot axis PA any further in the second direction beyond a predetermined point defined by the second tooth 37*b*. According to one embodiment, the pivot pin 34 may rotate about the pivot axis PA generally freely within a region 43 defined by two adjacent teeth (e.g., teeth 37*a*, 37*b*). The region 43 may also be considered to be a recess.

It should be appreciated that in any embodiment described herein, the spacing between the teeth may be larger and/or smaller than shown in the illustrations, which will permit a greater degree and/or smaller degree of rotation for the cartridge head.

The shaving razor 10 may optionally include a resistive pivot mechanism. The resistive pivot mechanism may be configured to allow the user to rotate the blade cartridge 22 about the pivot axis PA to select one of a plurality of sides/faces, and to allow the blade cartridge 22 to rotate within a predefined rotation range while at the selected blade/face position during normal use of the razor to conform to the user's skin contours. According to one embodiment, the resistive pivot mechanism may include a blade cartridge pivot biasing mechanism 90 (e.g., but not limited to, biasing pin 92) and/or a blade cartridge rotation limiter 35 (e.g., but not limited to, a pawl 36 and a plurality of teeth 37)). The biasing pin 92 may be configured to urge the blade cartridge 22 in the second direction (e.g., in the direction R1 in the illustrated embodiment) such that the pawl 36 contacts against the generally vertical portion 41 of the tooth 37*b*, thereby limiting the rotation of the blade cartridge 22 in the second direction (e.g., R1). The bias pin 92 may also generally prevent the blade cartridge 22 from rotating about the pivot axis PA beyond a predetermined point in the first direction (e.g., direction R2) unless the bias pin 92 is moved out of the way of the blade cartridge 22 as described herein.

With reference to FIGS. 5 and 7, a shaving force Fsu may be applied in the first direction (e.g., R2) by the user, which causes the blade cartridge 22 (and therefore the pivot pin/cylinder 34) to rotate in the first direction (e.g., R2) against the spring force of the biasing pin 92, and causing the pawl 36 to move away from the generally vertical portion 41 of the tooth 37*b*. Once force Fsu is reduced/removed, the force of the biasing pin 92 (e.g., resistive force Fres) causes the pivot pin/cylinder 34 to move back towards the initial starting position (e.g., wherein the pawl 36 is abutting against/contacting the generally vertical portion 41 of the tooth 37*b*).

To rotate the blade cartridge 22 to select a different face (e.g., either face 140 or face 156), the user may retract the bias pin 92 out of the path of the blade cartridge 22 as described herein, and may then rotate the blade cartridge 22 in the first direction (e.g., direction R2), thereby causing the pawl 36 to resiliently deform out of the way of the tooth 37*a* and allowing the pivot pin 34 to continue to rotate about the pivot axis PA in the first direction (e.g., R2). Once the user releases the biasing pin 92, the biasing pin 92 urges the blade cartridge 22 in the second direction (e.g., R1) until the pawl 36 contacts the generally vertical portion 41 of a tooth 37. As such, the rotation of the blade cartridge 22 about the pivot axis PA is generally limited to the region between the two teeth 37 adjacent to the pawl 36.

Again, it should be appreciated that the arrangement of the pawl 36 and teeth 37 with respect to the pivot pin 34 and the receptacle 32 may be switched, and as a result, the arrangement of the teeth 37 (i.e., the orientation of the first and second portions 39, 41) as well as the slope of the pawl 36 may be switched. Additionally, the arrangement of the teeth 37 (i.e., the orientation of the first and second portions 39, 41) as well as the slope of the pawl 36 may be switched depending on which direction (e.g., R1 or R2) the bias pin 92 is configured to urge the blade cartridge 22. For example, in the embodiment illustrated in FIGS. 5 and 7, the bias pin 92 is configured to urge the blade cartridge 22 in the second direction (e.g., direction R1). However, in other embodiments described herein (see, for example, FIGS. 3 and 8), the bias pin 92 is configured to urge the blade cartridge 22 in first direction (e.g., direction R2) and the orientation of the first and second portions 39, 41 of the teeth 37 as well as the slope of the pawl 36 may be switched from that shown in FIGS. 5 and 7.

Figure 8:
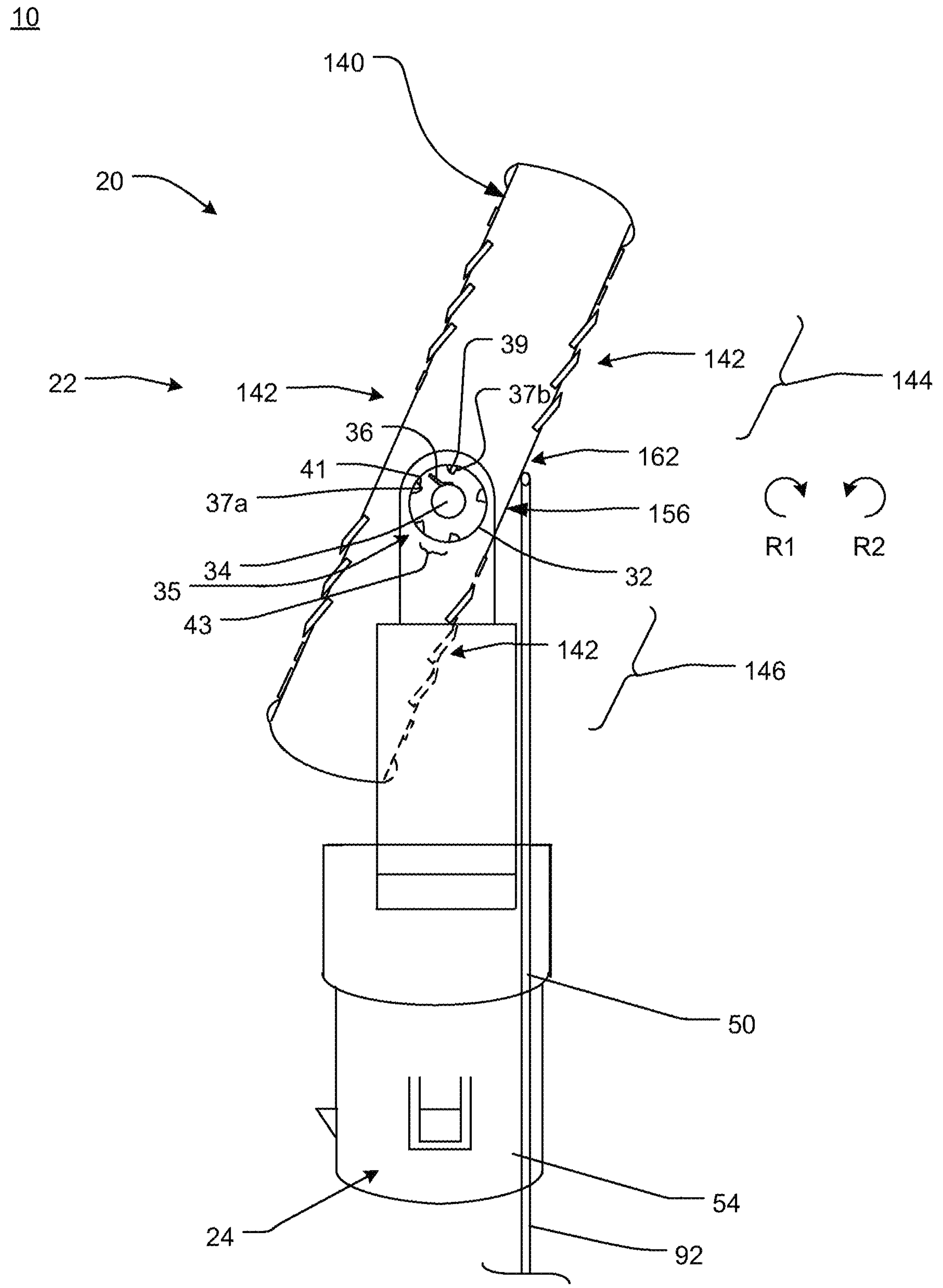
FIG. 8 shows another embodiment of a resistive pivot mechanism.

For example, with reference to FIG. 8, rotation of the pivot pin 34 in a first direction about the pivot axis PA (e.g., in direction R2 in the illustrated embodiment) may cause the pawl 36 to contact against a steeply sloped, upright, and/or generally vertical portion (e.g., second portion) 41 of a first tooth 37*a*, thereby causing the pawl 36 to engage second portion 41 of the first tooth 37*a* and generally preventing the pivot pin 34 from rotating about the pivot axis PA any further in the first direction (e.g., R2) beyond a predetermined point defined by the first tooth 37*a*. Conversely, rotation of the pivot pin 34 in a second direction about the pivot axis PA (e.g., in direction R1 in the illustrated embodiment) may cause the pawl 36 to contact against a moderately sloped, tapered, curved, convex, concaved, and/or arcuate portion (e.g., first portion) 39 of a second tooth 37*b* (e.g., an adjacent tooth), thereby causing the pawl 36 to resiliently deform out of the way of the second tooth 37*b* (e.g., deform generally radially inwardly in the illustrated embodiment) and allowing the pivot pin 34 to continue to rotate about the pivot axis PA in the second direction. According to one embodiment, the pivot pin 34 may rotate about the pivot axis PA generally freely within a region 43 defined by two adjacent teeth (e.g., teeth 37*a*, 37*b*).

The bias pin 92 may be configured to urge the blade cartridge 22 in the first direction (e.g., in the direction R2 in the illustrated embodiment) such that the pawl 36 contacts against the generally vertical portion 41 of the tooth 37*a*, thereby limiting the rotation of the blade cartridge 22 in the first direction (e.g., R2). The bias pin 92 may also generally prevent the blade cartridge 22 from rotating about the pivot axis PA beyond a predetermined point in the second direction (e.g., direction R1) unless the bias pin 92 is moved out of the way of the blade cartridge 22 as described herein.

During use of the razor 10, a shaving force Fsu may be applied in the second direction (e.g., R1) by the user, which causes the blade cartridge 22 (and therefore the pivot pin/cylinder 34) to rotate in the second direction (e.g., R1) against the spring force of the biasing pin 92, and causing the pawl 36 to move away from the generally vertical portion 41 of the tooth 37*a*. Once force Fsu is reduced/removed, the force of the biasing pin 92 (e.g., resistive force Fres of the biasing pin 92) causes the pivot pin/cylinder 34 to move back towards the initial starting position (e.g., wherein the pawl 36 is abutting against/contacting the generally vertical portion 41 of the tooth 37*a*).

To rotate the blade cartridge 22 to select a different face (e.g., either face 140 or face 156), the user may retract the bias pin 92 out of the path of the blade cartridge 22 as described herein (see, for example, FIG. 4), and may then rotate the blade cartridge 22 (FIG. 8) in the second direction (e.g., direction R1), thereby causing the pawl 36 to resiliently deform out of the way of the tooth 37*b* and allowing the pivot pin 34 to continue to rotate about the pivot axis PA in the second direction (e.g., R1). Once the user releases the biasing pin 92, the biasing pin 92 urges the blade cartridge 22 in the first direction (e.g., R2) until the pawl 36 contacts the generally vertical portion 41 of a tooth 37. As such, the rotation of the blade cartridge 22 about the pivot axis PA is generally limited to the region between the two teeth 37 adjacent to the pawl 36.

Figure 9:
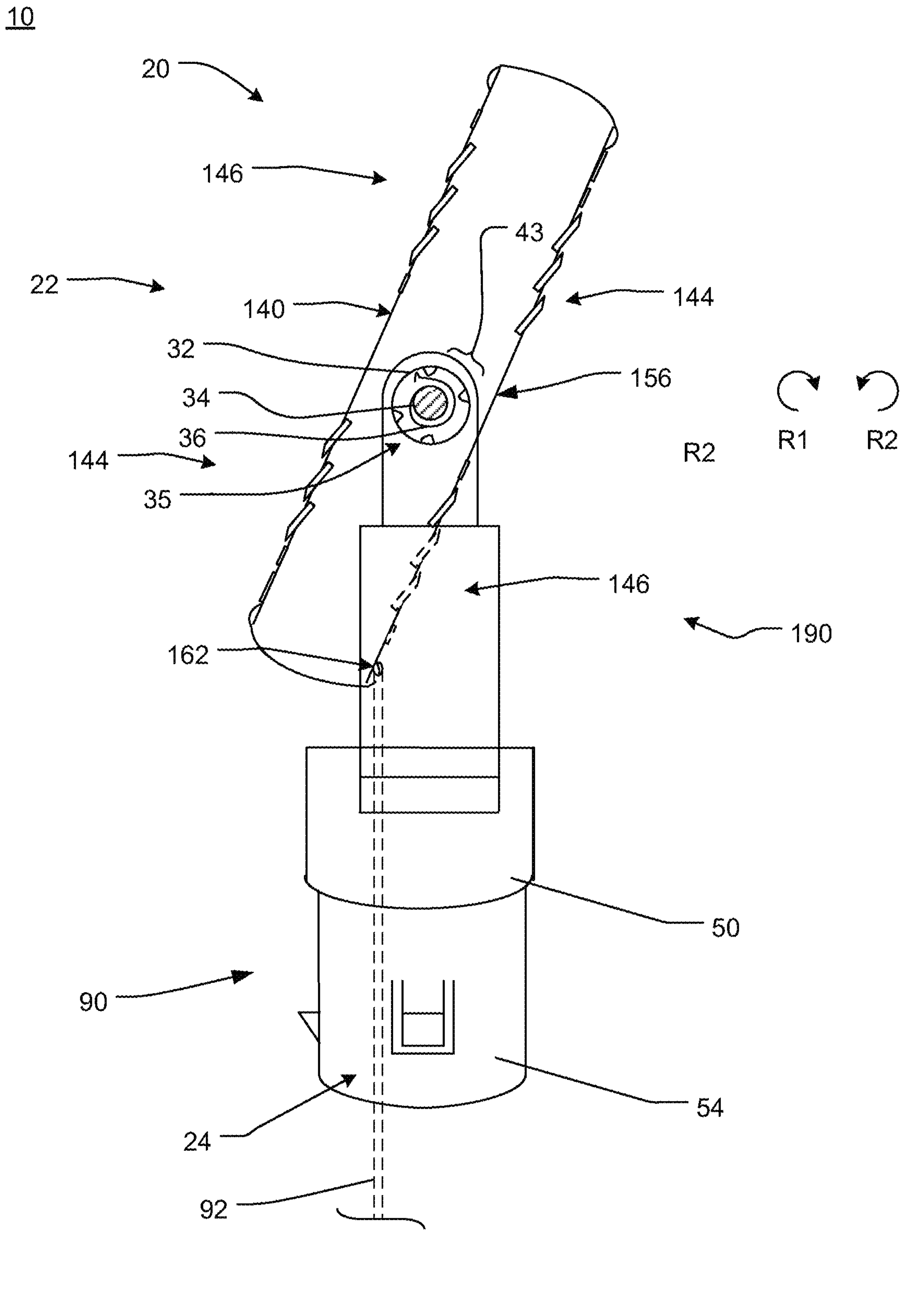
FIG. 9 shows yet another embodiment of a resistive pivot mechanism.
Figure 10:
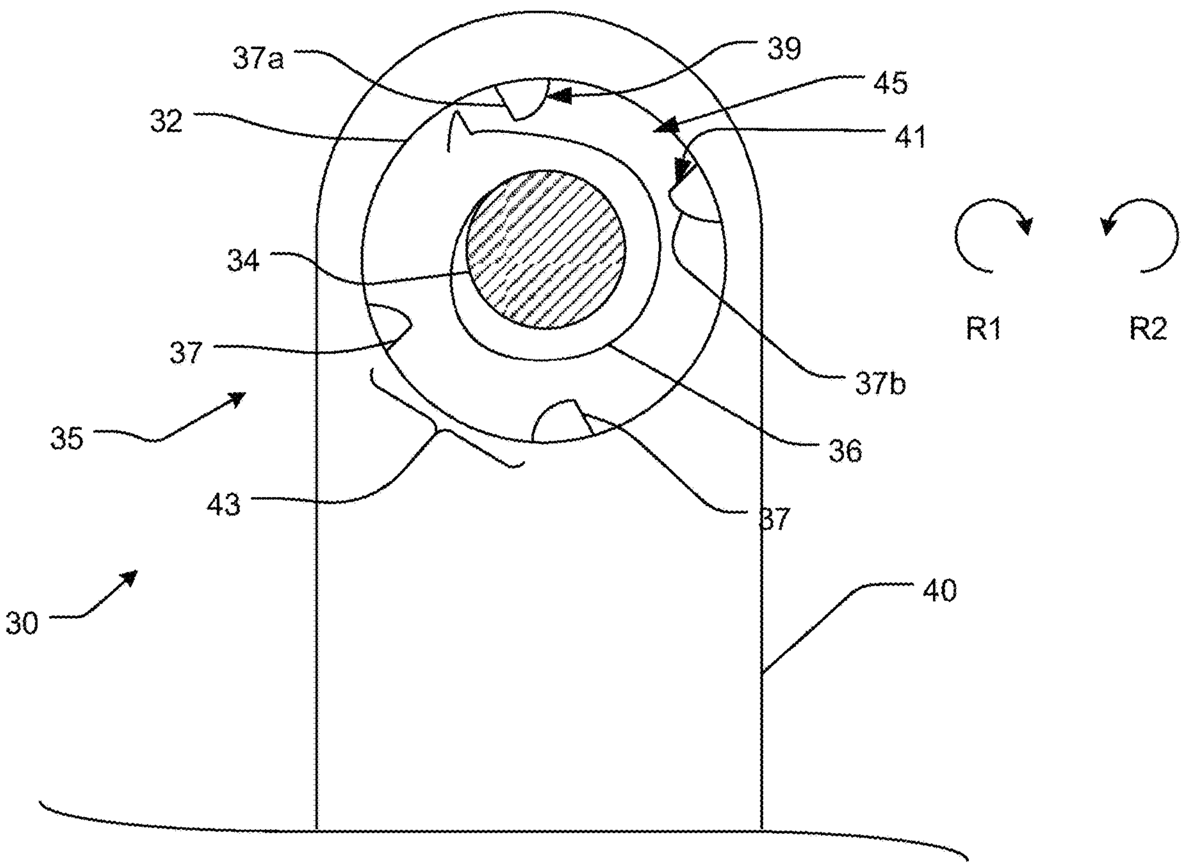
FIG. 10 shows another view of the resistive pivot mechanism consistent with FIG. 9.

Turning now to FIGS. 9 and 10, another embodiment of a resistive pivot mechanism is generally illustrated. The resistive pivot mechanism may include a blade cartridge pivot biasing mechanism 90 (e.g., but not limited to, biasing pin 92) and/or a blade cartridge rotation limiter 35 (e.g., but not limited to, a pawl/coiled pawl 36 and a plurality of teeth 37). In the illustrated embodiment, the resiliently deformable, coiled pawl 36 extends generally radially outward from the pivot pin 34 and the receptacle 32 includes a plurality of teeth 37 extending generally radially inward towards the pivot pin 34. It should be appreciated, however, that the arrangement of the coiled pawl 36 and the teeth 37 vis-à-vis the pivot pin 34 and the receptacle 32 may be switched, and that the coiled pawl 36 may extend generally radially inward from the receptacle 32 and the teeth 37 may extend generally radially outward from the pivot pin 34.

The biasing pin 92 may be configured to urge the blade cartridge 22 in the second direction (e.g., in the direction R1 in the illustrated embodiment) such that the distal end of the pawl 36 contacts against the generally vertical portion 41 of the tooth 37*a* (FIG. 10), thereby limiting the rotation of the blade cartridge 22 in the second direction (e.g., R1). The bias pin 92 may also generally prevent the blade cartridge 22 from rotating about the pivot axis PA beyond a predetermined point in the first direction (e.g., direction R2) unless the bias pin 92 is moved out of the way of the blade cartridge 22 as described herein.

During use of the razor 10, a shaving force Fsu may be applied in the second direction (e.g., R1) by the user, which causes the blade cartridge 22 (and therefore the pivot pin/cylinder 34) to rotate in the second direction (e.g., R1) against the spring force of the coiled pawl 36. Once force Fsu is reduced/removed, the force of the coiled pawl 36 (e.g., resistive coil force Fres) causes the pivot pin/cylinder 34 to move back towards the initial starting position (e.g., wherein the force of the biasing pin 92 and the coil pawl 36 are substantially equal).

The user may also apply a shaving force Fsu in the first direction (e.g., R2) causing the blade cartridge 22 (and therefore the pivot pin/cylinder 34) to rotate in the first direction (e.g., R2) against the spring force of the biasing pin 92, and optionally causing the pawl 36 to move away from the generally vertical portion 41 of the tooth 37*a*. Once force Fsu is reduced/removed, the force of the biasing pin 92 (e.g., resistive force Fres) causes the pivot pin/cylinder 34 to move back towards the initial starting position (e.g., wherein the force of the biasing pin 92 and the coil pawl 36 are substantially equal).

To rotate the blade cartridge 22 to select a different face (e.g., either face 140 or face 156), the user may retract the bias pin 92 out of the path of the blade cartridge 22 as described herein (see, for example, FIG. 4), and may then rotate the blade cartridge 22 in the second direction (e.g., direction R1), thereby causing the coiled pawl 36 to resiliently deform out of the way of the tooth 37*a* and allowing the pivot pin 34 to continue to rotate about the pivot axis PA in the second direction (e.g., R1). Once the user releases the biasing pin 92, the biasing pin 92 urges the blade cartridge 22 in the second direction (e.g., R1) until the distal end of the coiled pawl 36 contacts the generally vertical portion 41 of a tooth 37. As such, the rotation of the blade cartridge 22 about the pivot axis PA is generally limited to the region (i.e., controlled by the position) between the two teeth 37 adjacent to the pawl 36.

While the biasing pin 92 and the coil pawl 36 are illustrated in FIGS. 9 and 10 as urging the blade cartridge 22 in directions R1 and R2, respectively, it should be appreciated that the biasing pin may be configured to urge the blade cartridge 22 in direction R2 and the coil pawl 36 may be configured to urge the blade cartridge 22 in direction R1), and the orientation of the teeth 37 may also be switched. One of ordinary skill in the art would understand such modification in view of the present disclosure.

Figure 11:
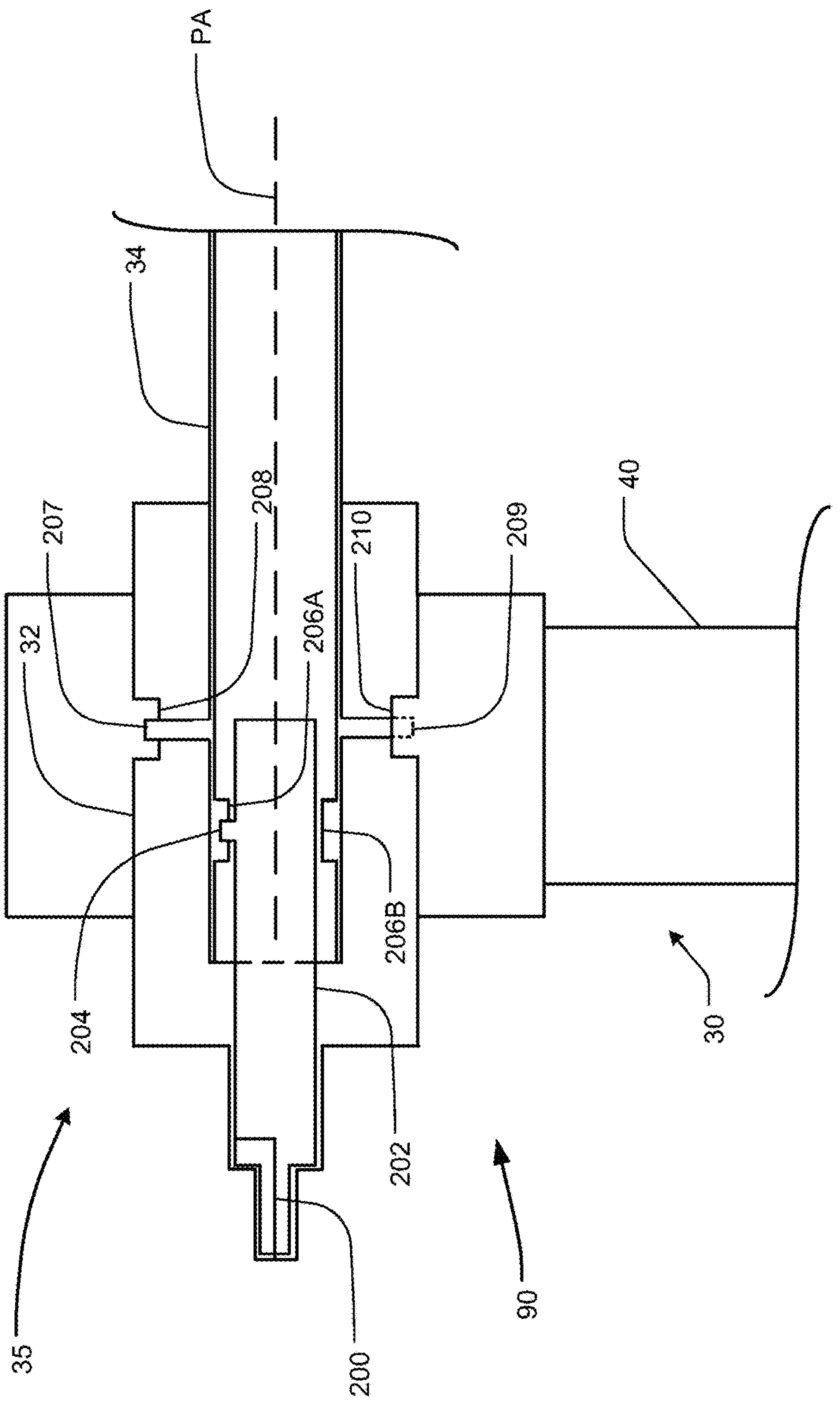
FIG. 11 shows another embodiment of a resistive pivot mechanism consistent with the present disclosure.
Figure 12:
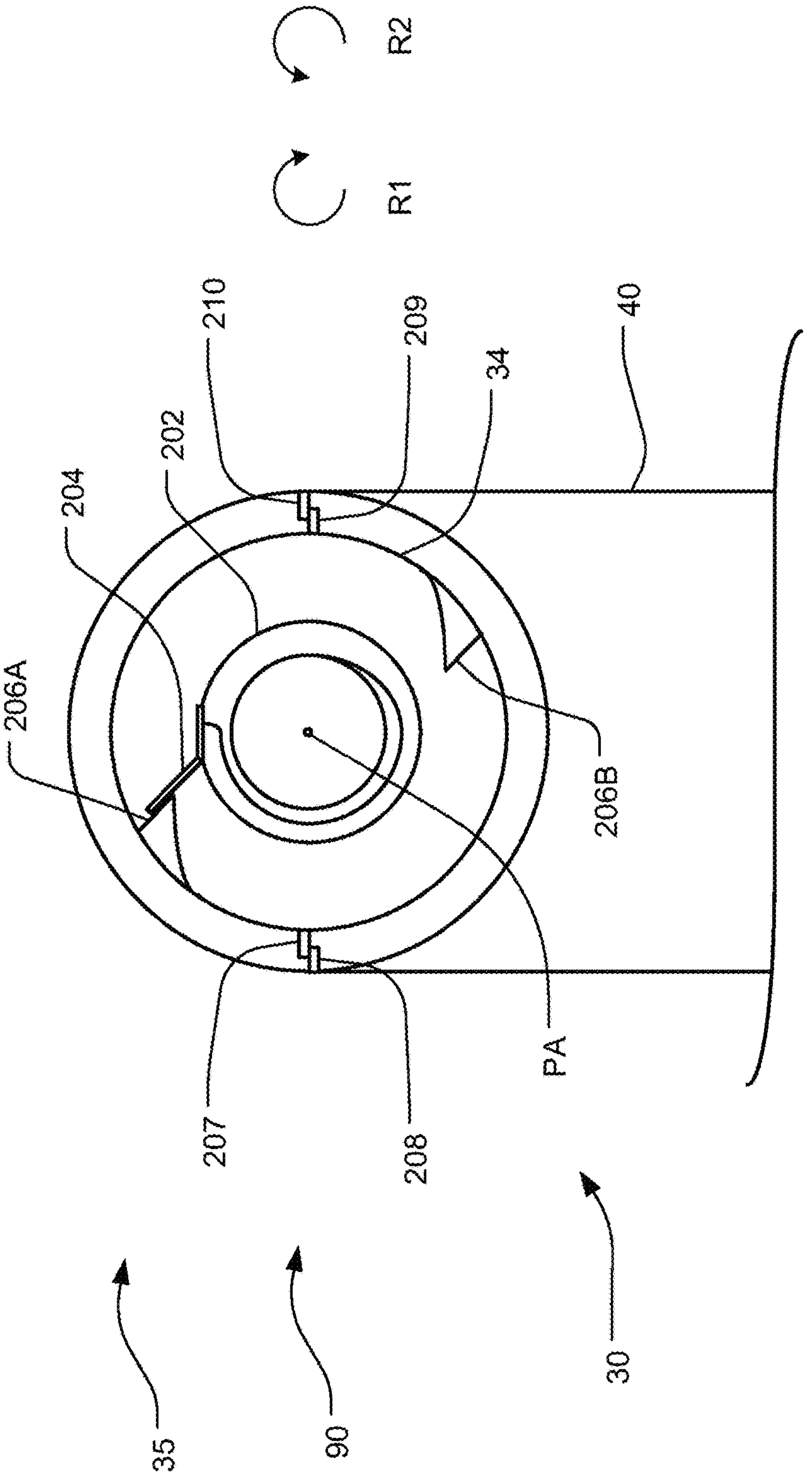
FIG. 12 shows another view of the resistive pivot mechanism consistent with FIG. 11.

Turning now to FIGS. 11 and 12, yet another embodiment of a resistive pivot mechanism is generally illustrated. The resistive pivot mechanism may include a blade cartridge pivot biasing mechanism 90 and a blade cartridge rotation limiter 35. As noted herein, the resistive pivot mechanism is configured to allow the user to rotate the blade cartridge 22 (only the pivot pin/cylinder 34 is shown for clarity) about the pivot axis PA to select one of a plurality of sides/faces, and to allow the blade cartridge 22 to rotate within a predefined rotation range while at the selected blade/face position during normal use of the razor to conform to the user's skin contours.

In the illustrated embodiment, the blade cartridge pivot biasing mechanisms 90 and blade cartridge rotation limiter 35 may include a biasing device 200 (e.g., but not limited to, a torsion spring or the like) having a first end coupled to the arm 30 and a second end configured to urge a biased pivot cylinder 202 in a first direction (e.g., rotation direction R2) about the pivot axis PA. The biased pivot cylinder 202 includes a pawl 204. The pawl or resilient pawl 204 may extend generally radially outward from the biased pivot cylinder 202. The biasing device 200 may urge the biased pivot cylinder 202 in the first direction (e.g., R2) such that the pawl 204 of the biased pivot cylinder 202 engages a first tooth 206A (which may be configured to extend generally radially inward from the pivot pin/cylinder 34), thereby urging the pivot pin/cylinder 34 in the first direction (e.g., R2) and causing one or more pivot cylinder stop members 207, 209 (which may be configured to extend generally radially outward from the pivot pin/cylinder 34) to engage one or more arm stop members 208, 210, respectively, of the arm 30. The engagement of the pivot cylinder stop members 207, 209 with the arm stop members 208, 210 generally limits the rotation of the pivot pin/cylinder 34 (and therefore the blade cartridge 22) in the first direction (e.g., R2) while the blade cartridge 22 is set at a first blade face position (e.g., a position of the blade cartridge 22 with respect to the handle 60 corresponding to a first face of the blade cartridge 22 operable to be used by a user of the razor 10). For example, the engagement of the pivot cylinder stop members 207, 209 with the arm stop members 208, 210 generally sets the initial starting position of the blade cartridge 22 while set at the first blade position.

During use of the razor 10, the shaving force Fsu is applied in a second direction (e.g., R1) by the user, which causes the blade cartridge 22 (and therefore the pivot pin/cylinder 34) to rotate in the second direction (e.g., R1) against the spring force of the biasing device 200, and causing the pivot cylinder stop members 207, 209 to move away from the arm stop member 208, 210, respectively. Once force Fsu is reduced/removed, the force of the biasing device 200 (e.g., resistive force Fres) causes the pivot pin/cylinder 34 to move back towards the initial starting position (as illustrated FIG. 11).

To rotate the blade cartridge 22 to another blade face position (e.g., a second or third blade face position corresponding to one of the other faces of the blade cartridge 22), the user applies a rotating force Fr to the blade cartridge 22 in the first direction (e.g., R2), thereby causing the pivot cylinder stop members 207, 209 to deform over arm stop members 208, 210, respectively, until the pivot cylinder stop members 207, 209 come into contact again with arm stop members 208, 210, respectively. Additionally, the rotating force Fr causes biased pivot cylinder 202 to rotate slightly about the pivot axis PA until the pawl 204 deforms over tooth 206B and the pawl 204 comes into contact with the generally vertical/straight portion of tooth 206B. The blade cartridge 22 may therefore be rotated approximately 180 degrees such that the opposite face of the blade cartridge 22 may be utilized by the user.

It should be appreciated that while FIGS. 11-12 illustrate a resistive pivot mechanism configured to allow the user to select between two faces of the blade cartridge 22, the resistive pivot mechanism may be configured to allow the user to select between more than two faces of the blade cartridge 22. In particular, the support arm 30 may include stop members 208, 210 spaced apart such that the pivot cylinder stop members 207, 209 may contact one or more of the arm stop members 208, 210 at positions corresponding to a first, second, and at least third initial starting position. The first, second, and at least a third initial starting positions correspond, respectively, to a first, second, and at least a third face of the blade cartridge 22. Additionally (or alternatively), it should be appreciated that the rotating force Fr may cause the arm stop members 208, 210 to deform over the pivot cylinder stop members 207, 209, respectively, until the pivot cylinder stop members 207, 209 come into contact again with arm stop members 208, 210, respectively. As such, either the arm stop members 208, 210 and/or the pivot cylinder stop members 207, 209 may be resiliently deformable. Moreover, it should be appreciated that the pivot pin/cylinder 34 and/or the biased pivot cylinder 202 may include bearing surfaces (not shown for clarity) configured to align the pivot pin/cylinder 34 and/or the biased pivot cylinder 202 with respect to each other and/or the receptacle in the support arm 30.

Figure 13:
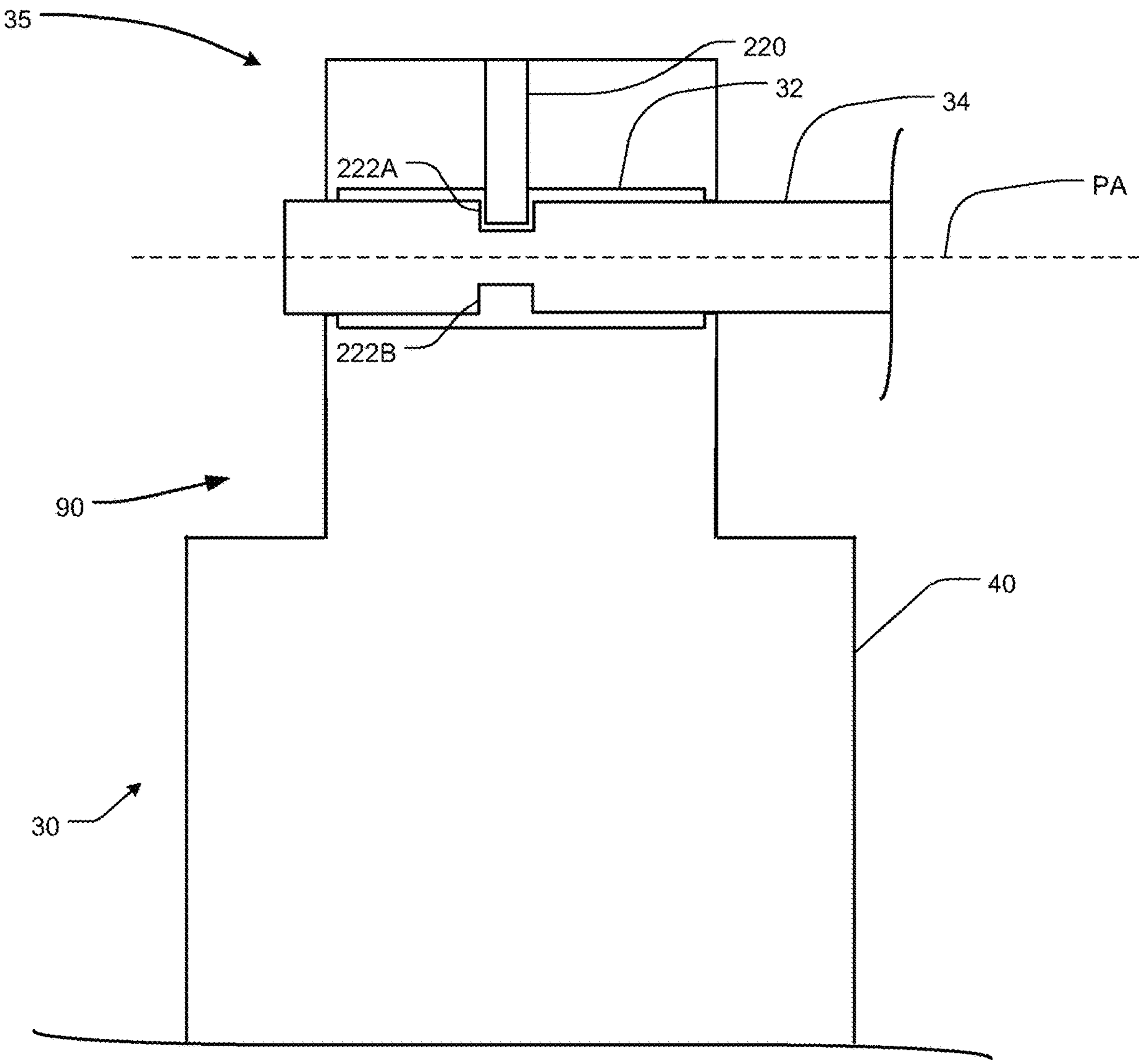
FIG. 13 shows yet another embodiment of a resistive pivot mechanism consistent with the present disclosure.
Figure 14:
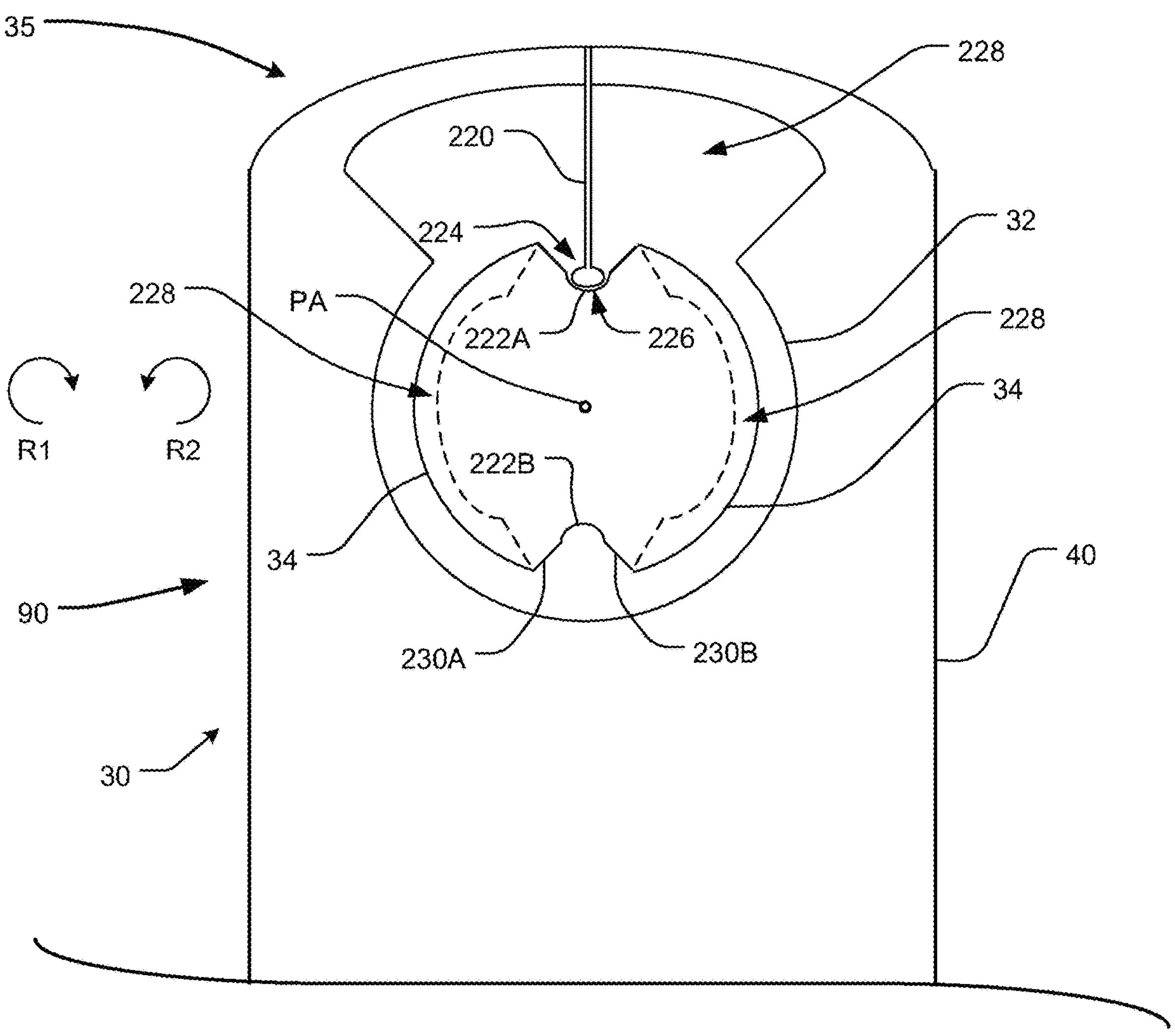
FIG. 14 shows another view of the resistive pivot mechanism consistent with FIG. 13.

With reference to FIGS. 13 and 14, a further embodiment of a resistive pivot mechanism is generally illustrated. The resistive pivot mechanism allows the user to rotate the blade cartridge 22 (only the pivot pin/cylinder 34 is shown for clarity) about the pivot axis PA to select one of a plurality of sides/faces, and that allows the blade cartridge 22 to rotate within a predefined rotation range while at the selected blade/face position during normal use of the razor to conform to the user's skin contours.

The resistive pivot mechanism may include at least one pawl or resilient pawl 220 configured to extend generally radially inward from the receptacle 32 of the arm 30. The pivot pin/cylinder 34 may include a plurality of recesses 222 configured to receive a distal end 224 of the pawl 220. According to one embodiment, the distal end 224 of the pawl 220 may have a shape generally corresponding to a portion of the recess 222A to aid in retaining the pawl 220 relative to the recess 222A. For example, the distal end 224 may have a generally spherical shape while the recess 222A may include a portion 226 having a generally hemispherical shape having a diameter approximately equal to the distal end 224. The location of the recesses 222 may each correspond to one of the plurality of faces of the blade cartridge 22. Thus, while only two recesses 222A, 222B are shown, it may be appreciated that the pivot pin/cylinder 34 may include three or more recesses 222 corresponding to three or more faces of the blade cartridge 20.

It should be appreciated that in any embodiment described herein, the length of the pawl and/or the depth and/or width of the recess may be larger and/or smaller than shown in the illustrations, which will permit a greater degree and/or smaller degree of rotation for the cartridge head within the pre-determined rotation range.

As may be appreciated, the length and flexibility/rigidity of the pawl, in combination with the design of the recesses, may determine the degree of rotation of the blade cartridge (e.g., the predefined rotation range) relative to the initial starting position corresponding to the selected face.

Figure 15:
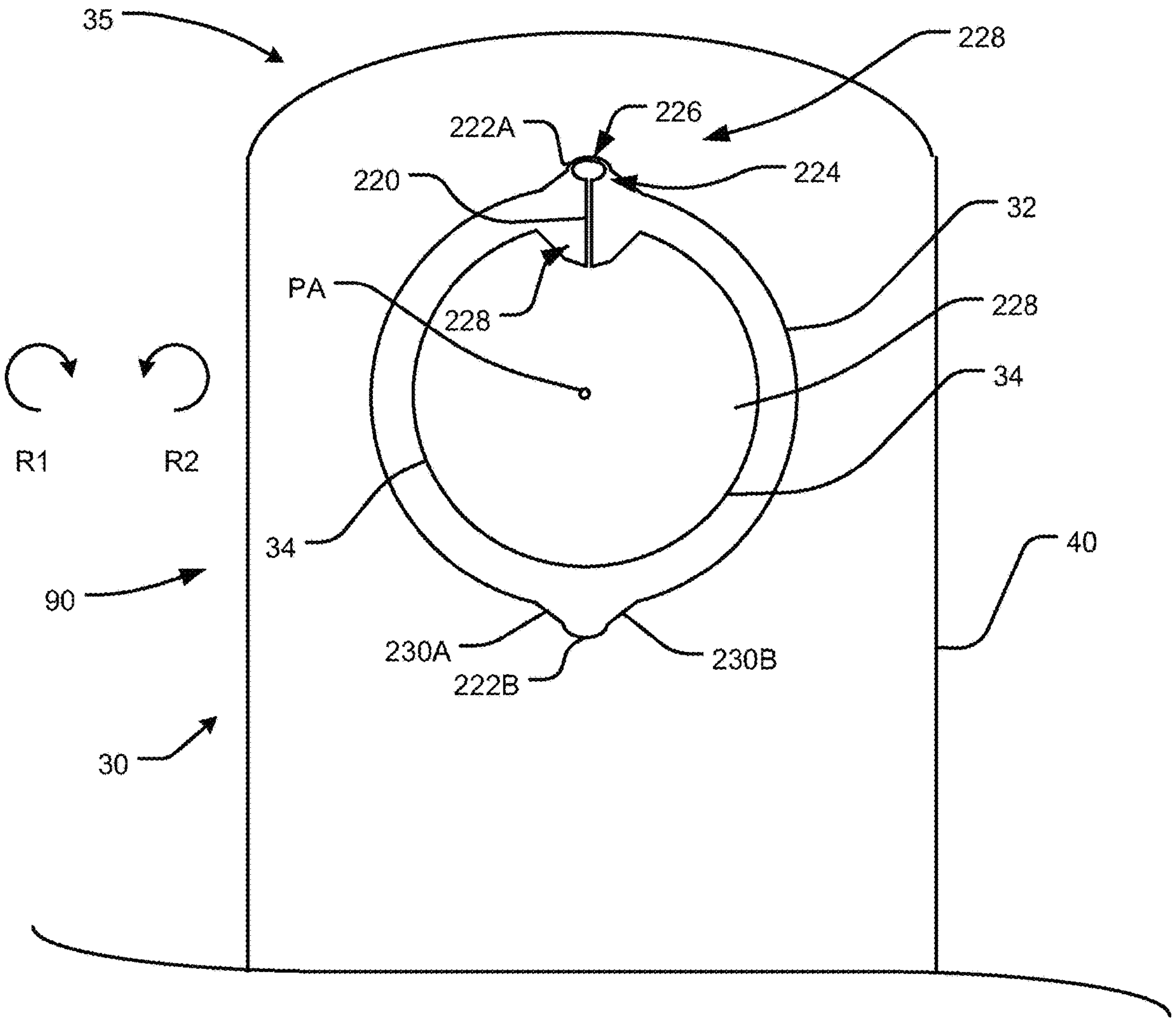
FIG. 15 shows yet a further embodiment of a resistive pivot mechanism consistent with the present disclosure.

With reference to FIG. 15, a variation of the resistive pivot mechanism of FIGS. 13 and 14 is generally illustrated. The resistive pivot mechanism of FIG. 15 is similar to that of FIGS. 13 and 14; however, the pawl 220 is configured to extend generally radially outward from the pivot pin/cylinder 34, and is configured to engage a selected one of a plurality of recesses 222 formed in the arm 30.

In practice (FIGS. 13-15), the user may rotate the blade cartridge 22 (and thus the pivot pin/cylinder 34) such that the desired face of the blade cartridge 22 is in the appropriate position relative to the handle 60. Once in the directed position, the distal end 224 of the pawl 220 may be received in the recess 222A (e.g., but not limited to, the retaining portion 226). This arrangement may be defined as the initial starting position. As a shaving force Fsu is applied to the blade cartridge 20 (and thus the pivot pin/cylinder 34), the pawl 220 applies a resistive force Fres against the blade cartridge 22 urging the blade cartridge 22 in the opposite direction of the shaving force Fsu, and generally towards the initial starting position. Thus, the blade cartridge 22 may rotate about the pivot axis PA within a range relative to the initial starting position.

The number of degrees that the blade cartridge 22 may rotate about the pivot axis PA relative to the initial starting position may depend on the intended use. For example, the blade cartridge 22 may rotate within a range of approximately 5 degrees to approximately 90 degrees about the pivot axis PA relative to the initial starting position, and any range therein. According to another embodiment, the blade cartridge 22 may rotate within a range of approximately 5 degrees to 60 degrees about the pivot axis PA relative to the initial starting position, and any range therein. According to yet another embodiment, the blade cartridge 22 may rotate within a range of approximately 5 degrees to approximately 25 degrees about the pivot axis PA relative to the initial starting position, and any range therein. According to yet a further embodiment, the blade cartridge 22 may rotate within a range of approximately 5 degrees to approximately 15 degrees about the pivot axis PA relative to the initial starting position, and any range therein.

To rotate the blade cartridge 22 to another blade face position (e.g., a second or third blade face position corresponding to one of the other faces of the blade cartridge 22), the user applies a rotating force Fr to the blade cartridge 22 in a first direction (e.g., R1 or R2), thereby causing the pivot pin/cylinder 34 (FIGS. 13-15) to rotate in the first direction (e.g., R1 or R2) until the pawl 220 resilient deforms out of the initial recess 222A. The pivot pin/cylinder 34 and/or arm 30 may optionally include one or more grooves, slots, cavities, or the like 228 (FIGS. 14 and 15) that the pawl 220 may move into as the pivot pin/cylinder 34 is rotated about the pivot axis PA. The user continues to rotate the blade cartridge 22 until the face of the blade cartridge 22 is in the desired location relative to the handle 60. Once in the desired location, the pawl 220 (e.g., the distal end 224 of the pawl 220) will be received in the corresponding recess 222B.

As may be appreciated, one or more of the recesses 222 (FIGS. 13-15) may have a generally concaved configuration. More specifically, the sides 230A, 230B of the recess 222 may slope or taper generally downwardly and/or inwardly towards the pivot axis PA, thereby providing a smoother transition as the pawl 220 enters the recess 222. Alternatively, while not shown, one or more of the recesses 222 (FIGS. 13-15) may have generally vertical, upright, and/or convex configuration, thereby increasing the amount of force needed to deform the pawl 220 out of the recess 222. This configuration may allow pawl 220 to be less rigid, while ensuring that the pawl 220 remains located within the recess 222.

Figure 16A:
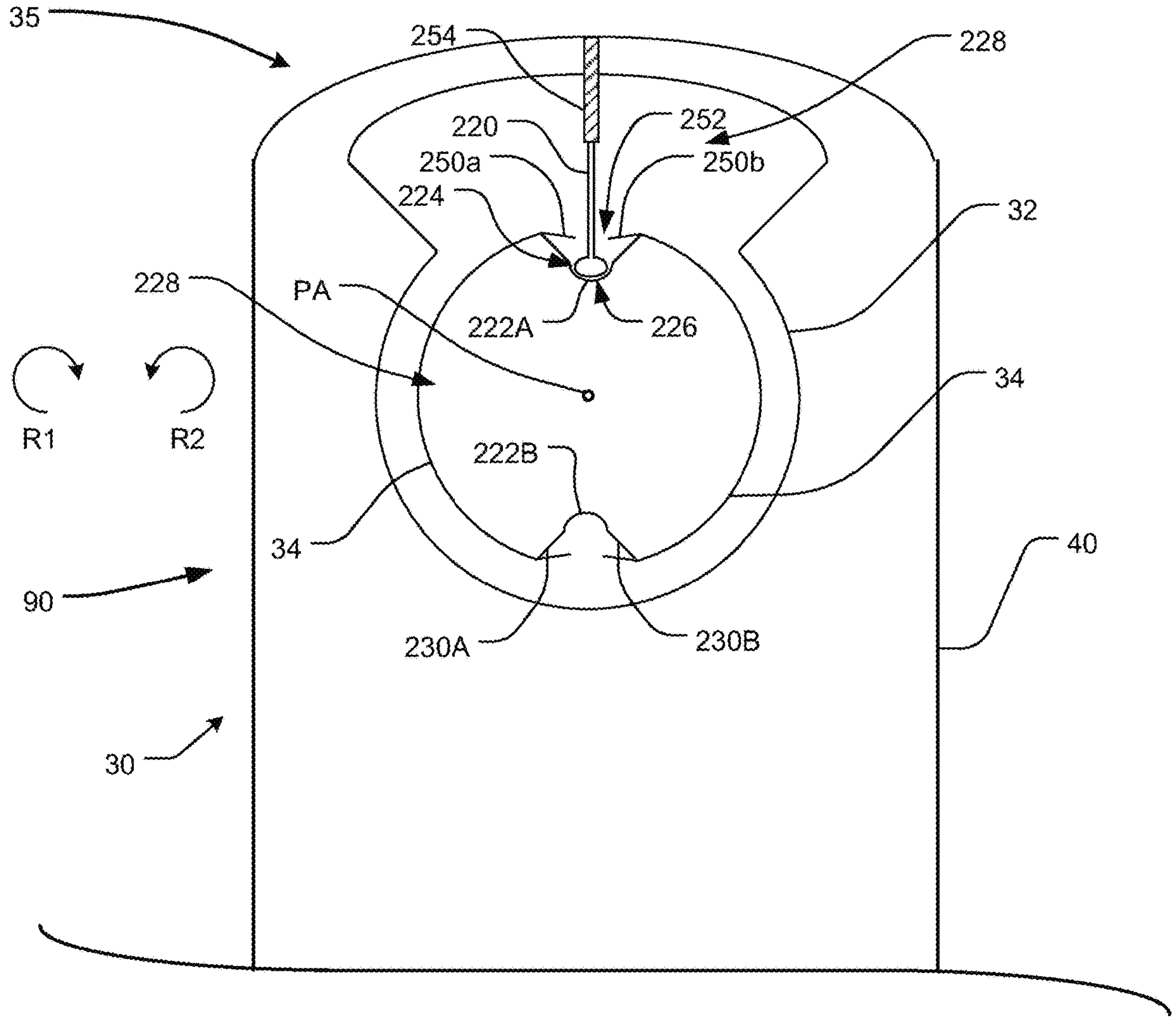
FIG. 16A shows yet an additional embodiment of a resistive pivot mechanism consistent with the present disclosure.
Figure 16B:
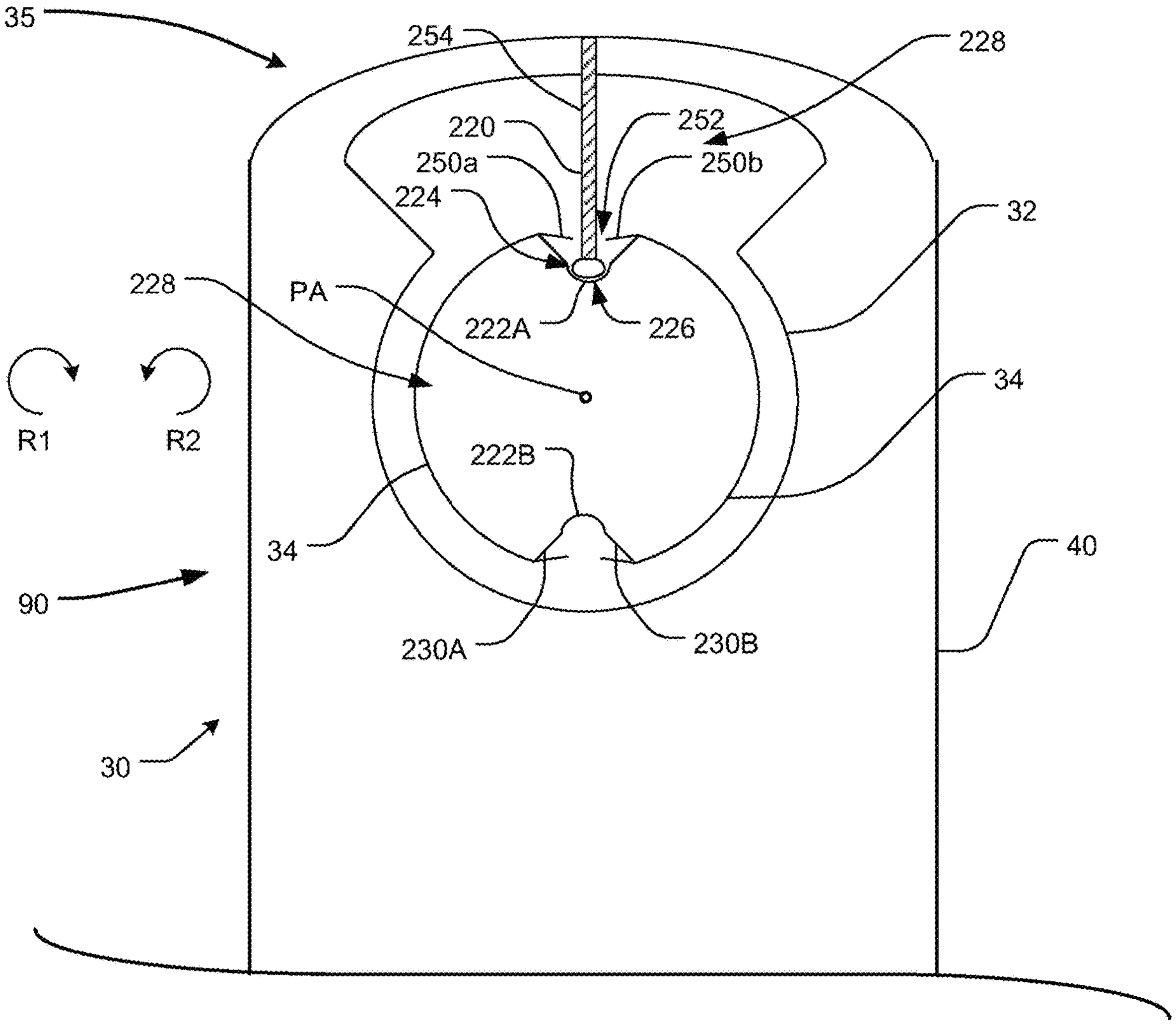
FIG. 16B shows yet an additional embodiment of a resistive pivot mechanism consistent with the present disclosure.
Figure 17A:
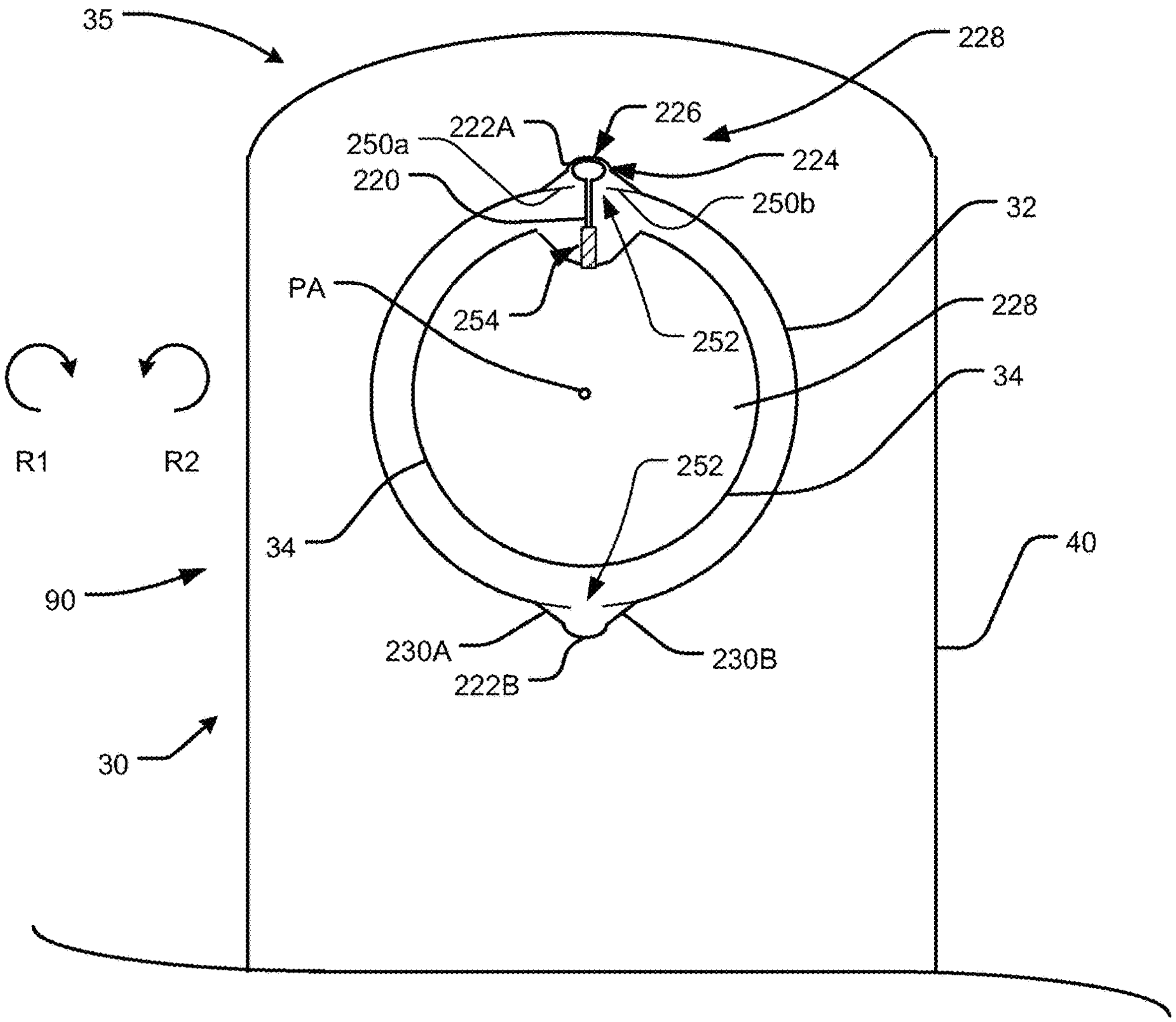
FIG. 17A shows a further embodiment of a resistive pivot mechanism consistent with the present disclosure.
Figure 17B:
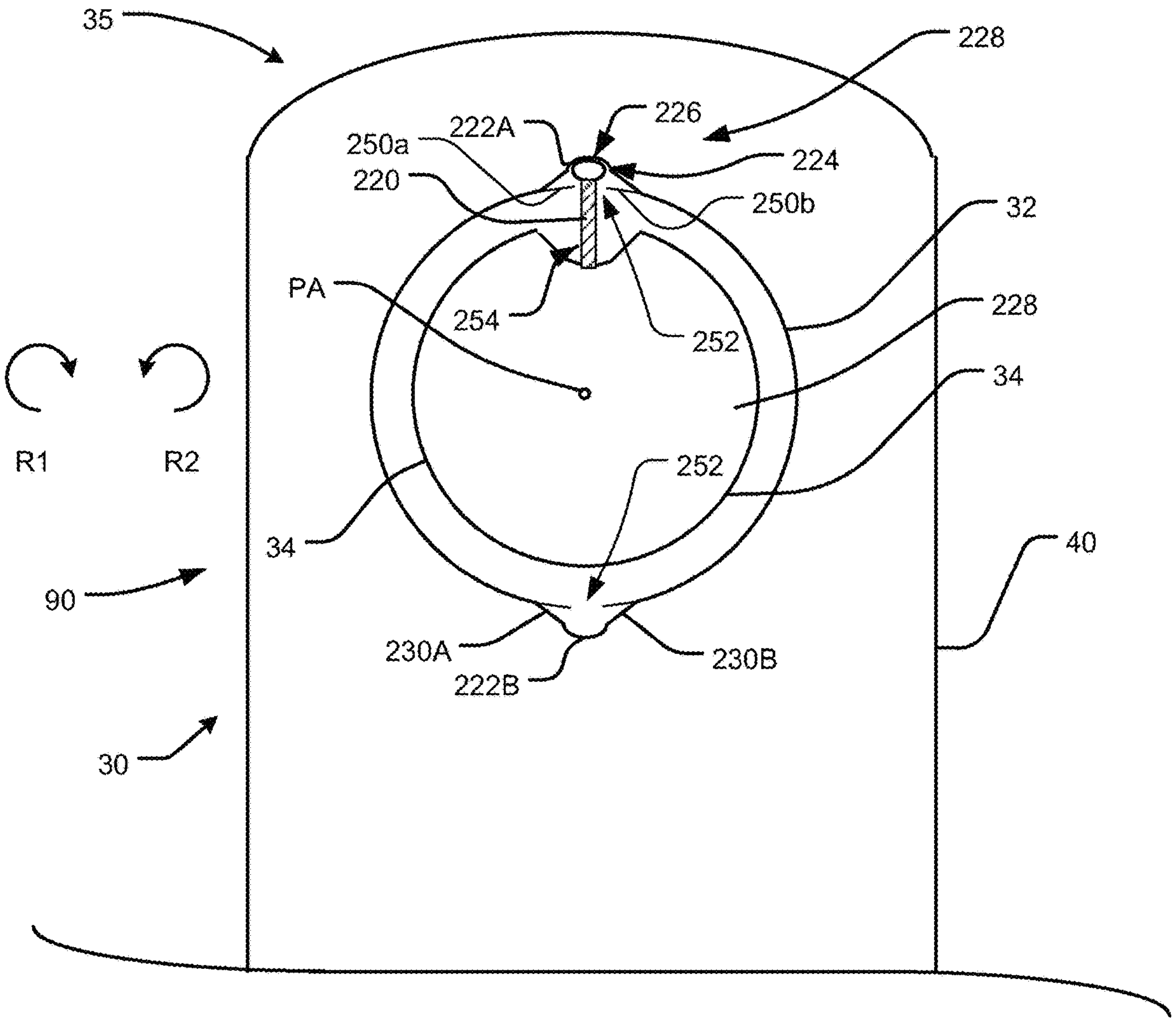
FIG. 17B shows a further embodiment of a resistive pivot mechanism consistent with the present disclosure.

Turning now to FIG. 16A, another embodiment of the resistive pivot mechanism is generally illustrated. The resistive pivot mechanism may be similar to that of FIGS. 13 and 14, however, one or more of the recesses 222 (which are formed in the pivot pin/cylinder 34) may include one or more resiliently deformable flaps 250 and the resilient pawl 220 may optionally include a spring 254. FIG. 16B is similar to FIG. 16A, but the pawl 220 includes a spring 254 extending from the receptacle 32 of the arm 30 and terminating at the distal end 224. The distal end 224 of the pawl 220 may have a shape generally corresponding to a portion of the recess 222A to aid in retaining the pawl 220 relative to the recess 222A. For example, the distal end 224 may have a generally spherical and/or oval shape while the recess 222A may include a portion 226 having a generally hemispherical and/or oval shape having a diameter approximately equal to the distal end 224. FIGS. 17A and 17B are similar to FIGS. 16A and 16B, respectively, but are based on the resistive pivot mechanism of FIG. 15 in which the recesses 222 are formed in the support arm 30 and the resilient pawl 220 extends from the pivot pin/cylinder 34.

With reference to FIGS. 16A-17B, the resiliently deformable flaps 250 extend across at least a portion of the opening of the recesses 222. For example, the resiliently deformable flaps 250 may extend from a portion of the recesses 222 and/or area surrounding the recesses 222. The first and second resiliently deformable flaps 250*a*, 250*b* may extend partially across the opening of a recess 222, and may define a deformable opening 252. The resiliently deformable flaps 250*a*, 250*b* may be configured to resiliently deform such that the distal end 224 of the pawl 220 can pass through the deformable opening 252 and be at least partially received in the recess 222. The resiliently deformable flaps 250 may aid in retaining the distal end 224 of the pawl 220 in the recesses 222.

According to one embodiment, at least a portion of the shaft of the resilient pawl 220 may optionally include a spring such as, but not limited to, a torsion spring, coil spring, or the like 254. The spring 254 may be configured to engage the recess 222 and/or the resiliently deformable flaps 250, and may allow the predefined rotation range within which the blade cartridge 22 rotates to be increased. Upon application of sufficient rotational force.

For example, the resiliently deformable flaps 250 may aid in retaining the distal end 224 of the resilient pawl 220, which in turn may engage the spring 254. Upon application of sufficient rotating force Fr to the blade cartridge 22 by the user, the spring 254 may be "maxed out" and will pull the resilient pawl 220 through the resiliently deformable flaps 250, and the blade cartridge 22 can be rotated to select a new face as described herein.

With reference now to FIGS. 18-20, yet a further embodiment of resistive pivot mechanism is generally illustrated. In particular, FIG. 18 generally illustrates one embodiment of a disposable head assembly 20 consistent with at least one embodiment of the present disclosure, FIG. 19 is a cross-section taken along lines 19-19 of FIG. 18, and FIG. 20 is a cross-section taken along lines 20-20 of FIG. 19. It should be appreciated that the disposable head assembly 20 shown in FIG. 18 is provided for illustrative purposes only, and that the resistive pivot mechanism may be used with any razor 10 and/or disposable head assembly 20 described herein.

With reference to FIGS. 19 and 20, the resistive pivot mechanism may be similar to that of FIGS. 13-17B, however, one or more recesses 322 are formed in blade cartridge 22 and one or more resiliently deformable pawl 320 are formed in a portion of the arm 30 that is recessed (e.g., countersunk) into a portion (e.g., a cavity or recess) 310 of the blade cartridge 22. As described herein, the pawl 320 may include any pawl configuration described herein. The recesses 322 (which may be formed within the cavity 310) may include any recess configuration described herein and may be arranged to generally correspond to one or more of the faces (e.g., 140, 156, etc.) of the blade cartridge 22. The pawl 320 may be engaged within the recesses 322 to allow the blade cartridge 22 to move within the predefined rotation range. For example, the pawl 320 may bend within the recess 322. Alternatively (or in addition), the pawl 320 may move within the recess 322, the size of the recess 322 may define (at least in part) the predefined rotation range. FIGS. 21 and 22 are similar to FIGS. 19 and 20, but the pawl(s) 320 extend from a portion (e.g., a cavity or recess) 310 of the blade cartridge 22 and the recess(es) 322 are formed in a portion of cavity 310 of the blade cartridge 22.

Turning now to FIGS. 23 and 24, yet a further embodiment of a resistive pivot mechanism is generally illustrated. The resistive pivot mechanism may include one or more pawls 420 and recesses 422 as generally described herein. For example, one or more pawls 420 may extend from the arm 30 and one or more recesses 422 may be formed in a portion of cavity 410 of the blade cartridge 22 as generally illustrated in FIG. 23. Alternatively (or in addition), one or more pawls 420 may extend from a portion of cavity 410 of the blade cartridge 22 and one or more recesses 422 may be formed in a portion of the arm 30 as generally illustrated in FIG. 24. It may be appreciated, however, one or more of the pawls 420 and/or recesses 422 may be located anywhere on the blade cartridge 22 and/or the pivot arm 34 as described herein.

The resistive pivot mechanism may also include one or more ballast devices 450 configured to move within at least a portion of the blade cartridge 22. For example, the ballast device 450 may be configured to slide within one or more passageways 452 defined within the blade cartridge 22. The passageways 452 may extend generally perpendicularly to the pivot arms 34. The ballast devices 450 may be configured to urge the blade cartridge 22 generally towards the initial starting position as generally illustrated. The active face of the blade cartridge 22 (i.e., the face being used by user, for example, to shave) may be arranged at an initial starting position which is generally at an angle I of approximately 10 to 30 degrees with respect to the longitudinal axis L of the handle 60.

For example, the weight of the ballast devices 450 may urge the blade cartridge 22 generally in the direction of arrow K until the pawl 420 engages against a portion of the recess 422 as generally illustrated in FIGS. 23 and 24. The blade cartridge 22 may be moved in the direction generally opposite of arrow K within the recesses 422, and the ballast device 450 will urge the blade cartridge 22 generally towards the initial starting position.

To rotate the blade cartridge 22 to another face, the user rotates the blade cartridge 22 relative to the handle 60 until the pawl 420 engages another recesses 422 as generally described herein. Once the angle I of the blade cartridge 22 exceeds 90 degrees relative to the handle 60, the ballast devices 450 may slide to the other side of the blade cartridge 22. The ballast device 450 is therefore ready to urge the blade cartridge 22 generally towards the new initial starting position.

It should be appreciated that while one ballast device 450 is illustrated, the resistive pivot mechanism may include a plurality of ballast devices 450. Additionally, while a single ballast device 450 is shown in a passageway 452, it should be appreciated that a plurality of ballast devices 450 may be disposed within one or more passageways 452. Moreover, while the resistive pivot mechanism is generally illustrated having a pawl and a recess, it should be appreciated that the recess may be defined by one or more teeth or one or more resiliently deformable pawls.

Turning now to FIGS. 25-27, another embodiment of the razor 10 having a hinge 74 is generally illustrated. While the razor 10 of FIGS. 25-27 may be used with any blade cartridge known to those skilled in the art, the razor 10 of FIGS. 25-27 may be particularly useful with a blade cartridge 22 having at least one face 140 with at least one razor 142 aligned to cut in a first shaving direction D1 and at least one razor 142 aligned to cut in a second shaving direction D2 (e.g., but not limited to, the blade cartridge 22 as generally illustrated in FIG. 37).

With reference to FIG. 25, a side view of the razor 10 is shown. The handle 60 includes a first (proximal) shaft portion 75 coupled to a second (distal) shaft portion 77 by way of one or more hinges 74. The hinge 74 may include any hinge mechanism known to those skilled in the art, and may include, for example, a locking mechanism (e.g., but not limited to, a locking pawl, ratchet mechanism, or the like) configured to allow the user to generally lock and/or fix the relative position of the first shaft portion 75 relative to the second shaft portion 77 (e.g., the head assembly 20 relative to the handle 60).

For example, the hinge 74 may be configured to allow the first shaft portion 75 to swing approximately 90 degrees generally along the direction of arc S from the position shown in FIG. 25 to the position shown in FIG. 26. It may be appreciated that the hinge 74 allows the first shaft portion 75 to swing in a direction (e.g., plane or axis) that is generally perpendicular to cutting edge axis CE of the cutting edge 151 of one or more of the razor blades 142 of the head assembly 20.

The handle 60 (e.g., the first shaft portion 75) and/or the support hub 50 may optionally include a swivel or pivot 177 configured to allow the user to manually swivel or rotate the blade cartridge 22 approximately 90 degrees in an axis that is generally parallel to the longitudinal axis Lh of the first shaft portion 75 and/or the support hub 50 such that the cutting edge axis CE of the cutting edge 151 of one or more of the razor blades 142 of the head assembly 20 is aligned generally parallel to the longitudinal axis L of the handle 60 as generally illustrated in FIG. 27. The swivel 177 may include any swivel or pivot mechanism known to those skilled in the art, and may include, for example, a locking mechanism (e.g., but not limited to, a locking pawl, ratchet mechanism, or the like) configured to allow the user to generally lock and/or fix the relative position of the blade cartridge 22 relative to the first shaft portion 75 and/or support hub 50.

A razor 10 having a hinge 74 and swivel 177 as described above (and optionally including, but not limited to, the blade cartridge as generally illustrated and described in FIG. 37 herein) may be particularly useful for shaving a user's head and/or body. In particular, having the cutting edge axis CE of the cutting edge 151 of one or more of the razor blades 142 of the head assembly 20 aligned generally parallel to the longitudinal axis L of the handle 60 as generally illustrated in FIG. 27 may facilitate shaving a user's head and/or body compared with having the cutting edge axis CE of the cutting edge 151 of the razor blades 142 aligned generally perpendicular to the longitudinal axis L of the handle 60 as generally illustrated in FIG. 25.

The blade cartridge 22 in FIGS. 25-27 may optionally include any resistive pivot mechanism described herein. While not a limitation of the present disclosure unless specifically claimed as such, the blade cartridge 22 may include any of the resistive pivot mechanisms and/or any combination of the resistive pivot mechanisms described herein. The resistive pivot mechanisms described herein that do not include a biasing pin 92 may be particularly suited for use with the hinge 74 and swivel 177. As such, the blade cartridge 22 may be located closer to the second shaft portion 77 when arranged in the position shown in FIG. 27.

Turning now to FIGS. 28 and 29, the shaving razor 10 may optionally include a blade cartridge centering mechanism 100. The blade cartridge centering mechanism 100 may be configured to generally align the blade cartridge 22 with respect to the support arms 30. For example, blade cartridge centering mechanism 100 may be configured to generally align the pivot pin 34 within the receptacle 32 as the pivot pin 34 rotates therein. According to one embodiment, the pivot pin 34 may include at least one bearing surface 102 configured to generally engage with a bearing surface 104 of the receptacle 32. The bearing surfaces 102, 104 may have outer and inner diameters such that rotation of the pivot pin 34 is generally concentric with the center of the receptacle 32. Additionally (or alternatively), the pivot pin 34 may include at least one shoulder region 106 configured to generally engage with a shoulder region 108 of the receptacle 32 to generally align the blade cartridge 22 along the pivot axis PA (e.g., left/right as generally illustrated).

Referring now to FIG. 30A, one embodiment of a blade cartridge 22 having at least a first shaving side 140 is generally illustrated. First shaving side 140 comprises at least one razor blade 142. As shown, first shaving side 140 may comprise a plurality of razor blades 142. More particularly, first shaving side 140 may comprise a first set 144 of one or more razor blades 142 and a second set 146 of one or more razor blades 142. In the illustrated embodiment, each set 144, 146 is shown having three razor blades 142, though it will be appreciated that this is not a limitation of the present disclosure unless specifically claimed as such, and that each set 144, 146 may independently have one or more blades. In the present embodiment, all the razor blades 142 of each set 144, 146 are arranged to cut hair in a first shaving stroke direction D1, and the sets 144, 146 may be separated by an intermediate skin lubricating strip 176. As described herein, the razor blades 142 in the sets 144, 146 may optionally be arranged to cut hair in different directions (e.g., one set 146 may be configured to cut hair in a first shaving stroke direction D1 and the other set 144 may be configured to cut hair in a second shaving stroke direction D2).

Blade cartridge 22 may include a continuous outer housing (frame) 188 around a periphery of the first shaving side razor blades 142, which may be formed of plastic or metal, such as stainless steel. The blade cartridge 22 (e.g., frame/housing 188) may include a front edge region 157, a rear/aft edge region 159, a first lateral edge region 161, and a second lateral edge region 163. As used herein, the terms "forward" and "aft" define the relative position between two or more things. A shaving aid "forward" of the razor blades 142, for example, is positioned so that the surface of the skin and/or hair to be shaved encounters the shaving aid before it encounters the razor blades 142, provided the shaving device 10/blade cartridge 22 is being stroked in its intended cutting direction, here direction D1. A shaving feature "aft" of the razor blades 142 is positioned so that the surface of the skin and/or hair to be shaved encounters the shaving aid after it encounters the razor blades 142, provided the shaving device 10/blade cartridge 22 is being stroked in its intended cutting direction, here direction D1. Additionally, the term "lateral" is used relative to the front and aft.

Blade cartridge 22 may optionally include one or more forward shaving aids 160 located in at least a portion of the front edge region 157 and/or one or more aft shaving aids 162 located in at least a portion of the rear/aft edge region 159. For example, a forward shaving aid 160 may be located in front of the razor blades 142 during a shaving stroke in direction D1 (e.g., in front of the first set 144 and/or second set 146) whereas an aft shaving aid 162 may be located behind the razor blades 142 during the shaving stroke in direction D1 (e.g., behind the second set 146 and/or the first set 144).

Blade cartridge 22 may also (or alternatively) include a first lateral (e.g. left) shaving aid 164 and a second lateral (e.g. right) shaving aid 166 located substantially adjacent to a first (e.g. left) longitudinal end 150 and an opposing second (e.g. right) longitudinal end 152 of the first shaving side razor blades 142, respectively, during the shaving stroke in direction D1.

As shown, forward shaving aid 160 may comprise at least one skin engaging strip 170 to provide frictional engagement with skin, particularly to be shaved by the first shaving side razor blades 142. Skin engaging strip 170 may comprise a plurality of flexible raised projections, particularly flexible elongated fins formed of a polymer composition, particularly that of an elastomer. Alternatively or in addition to the foregoing, forward shaving aid 160 may comprise at least one skin lubricating strip 172 to lubricate skin, particularly to be shaved by the first shaving side razor blades 142.

Alternatively or in addition to the foregoing, aft shaving aid 162 may also comprise at least one skin lubricating and/or moisturizing strip 174 to lubricate skin, particularly after being shaved by the first shaving side razor blades 142. Lubricating and/or moisturizing strip 174, as well as lubricating and/or moisturizing strips 172 and 176 may comprise at least one of a lubricant, a conditioner, a moisturizer, a soap, and a gel. As noted herein, the lubricating strip 176 may be disposed between the first and second sets of 144, 146 of razor blades 142. The lubricating strip 176 therefore further lubricates a portion of the user's skin having been shaved by the first set 146 of razor blades 142 before the second set 144 of razor blades 142 contacts the portion of the user's skin.

Alternatively or in addition to the foregoing, one or more of the forward shaving aid 160, the aft shaving aid 162, the first lateral shaving aid 164, and/or the second lateral shaving aid 166 may also comprise at least one roller strip, 182, 184, 186, respectively. The roller strip 180, 182, 184, 186 may include a plurality of ball bearings 190 (e.g., stainless steel) to massage/knead skin, as well as help facilitate an easier feel to shaving with a faster, smoother motion of the razor blade action regardless of the direction of shaving. According to one embodiment, the roller strips 180, 182, 184, 186 may be disposed along at least a portion of the front edge region 157, the rear/aft edge region 159, the first lateral edge region 161, and the second lateral edge region 163, respectively. In the illustrated embodiment, the ball bearings 190 are located completely around a periphery of the frame 188 and are in close proximity to each other; however, it should be appreciated that this not a limitation of the present disclosure unless specifically claimed as such, and the ball bearings 190 may be located around only a portion of the periphery of the frame 188 (e.g., about only a portion of the front edge region 157, the rear/aft edge region 159, the first lateral edge region 161, and/or the second lateral edge region 163).

With reference now to FIG. 30B, another embodiment of a blade cartridge 22 having at least a first shaving side 140 is generally illustrated. The blade cartridge 22 may be similar to the blade cartridge 22 as illustrated and described in FIG. 30A, however, one or more of the front edge region 157 and/or a rear/aft edge region 159 may also comprise at least one elongated ball bearing/roller pin 190. The elongated ball bearing/roller pin 190 may extend along a substantial portion of the front and/or rear/aft edge regions 157, 159 (e.g., along substantially the entire width of the blade cartridge 22).

Turning now to FIG. 31, a cross-sectional view of one embodiment of a blade cartridge 22 having a ball bearing 190 consistent with the present disclosure is generally illustrated. The ball bearing 190 may be located in a receptacle (bore) 192 formed in frame 188 of the blade cartridge 22. Ball bearings 190 may be inserted into the receptacle 192 from the back side of the frame 188 (e.g., a surface generally opposite of the exposed surface 193 of the blade cartridge 22 that contacts the user's skin) and may include an exposed portion 191 that is exposed through and/or extends beyond bearing opening 194 and/or exposed surface 193 of the first shaving side 140 of the frame 188. (It should be appreciated that the ball bearings 190 described herein may also be arranged on the second shaving side 156.) The receptacle 192 may then be closed at the entrance by a closure 196, which may be press fit within the receptacle 192.

The exposed portion 191 may be configured to extend beyond the exposed surface 193 of the frame 188 such that the exposed portion 191 may contact against user's skin. One or more of the ball bearings 190 may be moveable or retractable generally along line B relative to the frame 188 (e.g., generally perpendicular to the exposed surface 193 of the frame 188) such the amount of the exposed portion 191 of the ball bearing 190 extends through bearing opening 194 and/or exposed surface 193 of the frame 188 may change.

For example, one or more of the ball bearings 190 may be seated on a biasing device 198 (e.g., a compression, torsion, or coil spring). The biasing device 198 may be configured to urge the ball bearing 190 generally outwardly beyond the exposed surface 193 of the frame 188. Upon application of a force in the opposite direction of the biasing device 198, the exposed portion 191 of the ball bearings 190 may be retracted relative to the exposed surface 193 of the frame 188 (e.g., into the bore 192) and the ball bearing 190 may move generally along line B. In such a manner, the biasing device 198 may cushion rolling of the ball bearings 190 on a user's skin.

Turning now to FIG. 32, a cross-sectional view of another embodiment of a blade cartridge 22 having a ball bearing 190 consistent with the present disclosure is generally illustrated. As shown in FIG. 32, the ball bearings 190 may be installed in frame 188 of the blade cartridge 22 from exposed surface 193 of the blade cartridge 22 that contacts the user's skin (e.g., the first shaving side 140), rather than the back side of the frame 188 as generally illustrated in FIG. 31. Biasing device 198 (e.g., compression, torsion, or coil spring) may first be placed in a recess 200 formed in the frame 188, and a ball bearing 190 may then be seated on the basing device 198. Thereafter, a housing/cover 202 may be installed in recess 200 with a press fit (forming a housing unit), with the housing/cover 202 including a receptacle 204 for ball bearing 190, as well as providing bearing opening 194.

Turning now to FIG. 33, a cross-sectional view of yet another embodiment of a blade cartridge 22 having a ball bearing 190 consistent with the present disclosure is generally illustrated. The ball bearing 190 may be installed in a housing/cover 202 which is inserted in recess 200 formed in the frame 188 in a sliding manner and secured with a closure 196 formed on the opposite side of the exposed surface 193 of the frame 188. A portion 201 of the frame 188 may extend generally circumferentially around and define the bearing opening 194 such that the exposed surface 193 of the frame 188 extends across at least a portion of the cover 202. Rather than enabling retraction of just the ball bearing 190, biasing device 198 and housing/cover 202 may be arranged such that both the ball bearing 190 and the housing/cover 202 may be retracted into recess 200. The portion 201 of the frame 188 extends across the cover 202 such that as the ball bearing 190 and the housing/cover 202 retract into recess 200, the opening 194 is defined by the portion 201 of the frame 188.

With reference to FIGS. 34-35B, further embodiments of a blade cartridge 22 having a ball bearing 190 and elongated ball bearing/roller pin 190, respectively, consistent with the present disclosure are generally illustrated. When the skin first makes contact with a razor blade, it is tight and tense. As part of the shaving experience, the user may elect to wash the area to be shaved with a warm facecloth or warm water prior to engaging the blades with the skin. While this helps, warm water may not always be available.

The ball bearing 190 and elongated ball bearing/roller pin 190 as generally illustrated in FIGS. 34-35B may feature a self-lubricating ball bearing and/or elongated ball bearing/roller pin which may function as a "skin massager" and skin lubricant applicator whilst facilitating a smoother, faster and more efficient shaving stroke. The ball bearings are configured to rotate freely in any direction. This eliminates the "drag" during a shaving stroke, which is commonly associated with the "glide strips" of razors. The curved contact surface of the ball bearing 190 and/or elongated ball bearing/roller pin 190 lends itself to rolling over and kneading the skin during a shaving stroke. This essentially massages the skin, loosening it up in preparation for shaving. Any of the ball bearings 190 and elongated ball bearing/roller pins 190 may optionally include a textured surface to aid in picking-up or grabbing the lubricant as it rotates.

The self-lubricating ball bearing 190 and/or elongated ball bearing/roller pin 190 may include a lubricant 197 configured to be in contact (e.g., but not limited to, direct contact) with the ball bearing 190 and/or elongated ball bearing/roller pin 190. The lubricant 197 may include a semi-solid or solid lubricant, and may also include moisturizers, exfoliates, scented and/or non-scented, and the like. During a shaving stroke, the razor is drawn over the skin and the ball bearing(s) 190 and/or elongated ball bearing(s)/roller pin(s) 190 rotate. As the ball bearing(s) 190 and/or elongated ball bearing(s)/roller pin(s) 190 rotate, they coat themselves with the skin lubricant 197. The lubricant 197 is then applied continually to the skin, before, during and after each shaving stroke.

The ball bearing 190 and/or elongated ball bearing/roller pin 190 may be biased as described herein. For example, a biasing device (e.g., a spring or the like) 198 may be disposed beneath the lubricant as generally illustrated in FIG. 34. The biasing device 198 may urge the lubricant 197 generally against the ball bearing 190, thereby causing the lubricant 197 to also urge the ball bearing 190 towards the opening 194. The biasing device 198 may cushion and/or dampen the force placed on the lubricant 197 and promote a smoother and more fluid rotation of the ball bearing 190 and/or elongated ball bearing/roller pin 190 while a downward force is being applied during a shaving stroke. As the lubricant 197 diminishes, the biasing device 198 continues to exert an upward force, always providing a positive contact between the lubricant 197 and the ball bearing 190 and/or elongated ball bearing/roller pin 190 until finally the lubricant 197 is used up.

Alternatively (or in addition), a biasing device 198 (e.g., but not limited to a spring) may be coupled to the ball bearing 190 and/or elongated ball bearing/roller pin 190, for example, as generally illustrated in FIGS. 35A and 35B. For example, the ball bearing 190 and/or elongated ball bearing/roller pin 190 may include pins 199 extending outward from opposite portions of the ball bearing 190 and/or elongated ball bearing/roller pin 190 (e.g., at opposite ends). The biasing device 198 may urge the pins 199 and therefore the ball bearing 190 and/or elongated ball bearing/roller pin 190 towards the opening 194. When the ball bearing 190 and/or elongated ball bearing/roller pin 190 is pushed in the opposite direction of the biasing device 198 (e.g., away from the opening 194), the ball bearing 190 and/or elongated ball bearing/roller pin 190 may contact a portion of the lubricant 197. Optionally, the lubricant 197 may be disposed on a base 195 which may be urged by one or more biasing device 198 generally towards the ball bearing 190.

Turning now to both FIGS. 35C-35E, one embodiment of a retention clip 3502 for mounting, securing, and/or otherwise coupling any of the ball bearings 190 described herein is generally illustrated. In particular, FIG. 35C generally illustrates one embodiment of a retention clip 3502 along with a lubricant 197, FIG. 35D generally illustrates one embodiment of just the retention clip 3502 and one embodiment of a ball bearing 190, and FIG. 35E generally illustrates one embodiment of just the retention clip 3502 (though it should be appreciated that these figures are provided only for illustrative purposes only). The retention clip 3502 may be configured to be received at least partially within a cavity 3504 formed in the blade assembly 22. The retention clip 3502 (FIGS. 35D and 35E) may include one or more legs or extensions 3506 extending outward (e.g., downward) from a base region 3508 (which may form the opening 191). A portion of the legs 3506 (e.g., the distal region) may include one or more barbs or the like 3510. The barbs 3510 are configured to engage against a portion of the surface 3512 (FIG. 35C) sidewall of the cavity 3504 to generally retain, secure, mount, and/or couple the retention clip 3502 to the cavity 3504/blade assembly 22, and therefore generally retain, secure, mount, and/or couple the ball bearing 190 (and optionally any lubricant 191 and/or the like) to the cavity 3504/blade assembly 22. The surface 3512 (FIG. 35C) sidewall of the cavity 3504 may optionally include a shoulder, recess, and/or groove 3514 configured to engage the barb 3510 and create a mechanical connection to further facilitate retaining the retention clip 3502 within the cavity 3504. The retention clip 3502 may allow the ball bearing 190 to be loaded/inserted from the outside/exterior (front and/or rear) of the blade cartridge 22, for example, during the assembly of the blade cartridge 22.

With reference to FIGS. 35F-35H, one embodiment of a blade cartridge 22 including a blade retention clip 3520 for mounting, securing, and/or otherwise coupling one or more (e.g., a plurality) of razor blades 142 is generally illustrated. The blade retention clip 3520 described herein may be used for mounting, securing, and/or otherwise coupling any razor blade known to those skilled in the art, and is not limited to any of the embodiments described herein unless specifically claimed as such. Additionally (or alternatively), the blade retention clip 3520 may be used for mounting, securing, and/or otherwise coupling any shaving aid(s) 160, skin engaging strip(s) 170, skin lubricating strip(s) 172, 176, skin lubricating and/or moisturizing strip(s) 174, or the like. As such, the blade retention clip 3520 may be used for mounting, securing, and/or otherwise coupling one or more razor blades and/or any combination of shaving aid(s) 160, skin engaging strip(s) 170, skin lubricating strip(s) 172, 176, skin lubricating and/or moisturizing strip(s) 174, or the like.

With reference to FIG. 35F, blade cartridge 22 may include a housing and/or frame 188 which may be formed of plastic or metal, such as stainless steel. The blade cartridge 22 (e.g., frame/housing 188) may include a front edge region 157, a rear/aft edge region 159, a first lateral edge region 161, and a second lateral edge region 163. In the illustrated embodiment, a blade retention clip 3520 is used at each longitudinal end 150, 152 of the razor blade 140, though this is for illustrative purposes and only one lateral end 150, 152 of the razor blade 142 may be secured with a blade retention clip 3520.

Turning now to FIG. 35G, the blade retention clip 3520 may be configured to be received at least partially within a retention cavity 3522 formed in the blade assembly 22 (e.g., the frame 188). The blade retention clip 3520 (FIG. 35H) may include one or more legs or extensions 3526 extending outward (e.g., downward) from a base region 3528 (which may extend across the mounting width Wm of one or more of the razor blades 140, shaving aid(s) 160, skin engaging strip(s) 170, skin lubricating strip(s) 172, 176, skin lubricating and/or moisturizing strip(s) 174, or the like that are being retained by the blade retention clip 3520). A portion of the legs 3526 (e.g., the distal region) may include one or more barbs or the like 3530. The barbs 3530 are configured to engage against a portion of the surface 3532 (FIG. 35G) sidewall of the blade cavity 3522 to generally retain, secure, mount, and/or couple the blade retention clip 3520 to the blade cavity 3522/blade assembly 22, and therefore generally retain, secure, mount, and/or couple the razor(s) 140 to the blade cavity 3522/blade assembly 22. The surface 3532 (FIG. 35G) sidewall of the blade cavity 3522 may optionally include a shoulder, recess, and/or groove 3534 configured to engage the barb 3530 and create a mechanical connection to further facilitate retaining the blade retention clip 3520 within the blade cavity 3522. The blade retention clip 3520 may allow the blade(s) 140 to be loaded/inserted from the outside/exterior (front and/or rear) of the blade cartridge 22, for example, during the assembly of the blade cartridge 22.

As described herein, a blade cartridge 22 consistent with at least one embodiment described herein may include a first and at least a second shaving side 140, 156 each including one or more razor blades 142 (see, for example, FIGS. 5 and 9). In one embodiment, the faces or sides 140, 156 may include identifying indicia to allow a user to identify one face or side from another. For example, the skin engagement strips (SES) and/or the lubrication strips may be colored differently on each respective face or side 140, 156. Alternatively (or in addition), one or more of the razor blades 142 may include indicia to allow a user to identify one face or side from another. For example, one or more of the razor blades 142 may be colored differently on each respective face or side 140, 156.

The second shaving side 156 may be the same as first shaving side 140 in all aspects described herein, albeit inverted relative to first shaving side 140 to facilitate proper orientation when the blade cartridge 22 is rotated 180 degrees. With reference to FIG. 36, the front and/or rear side 140, 156 may include only one set of one or more razor blades 142. Alternatively, the front and/or rear side 140, 156 may include a first and a second set 144, 146 of at least one razor blades 142 arranged to shave in opposite shaving directions D1 and D2 as generally illustrated in FIG. 37. A blade cartridge 22 having at least one razor to cut hair in a first shaving stroke direction D1 and at least one razor to cut hair in a second shaving stroke direction D2 on the same face 140, 156 may be particularly useful for a user that wishes to shave his/her head since the user may move the razor 10 in a "back and forth" motion without having to lift the razor from the area being shaved to begin a new stroke.

For example, a "body" blade dual cartridge combination configuration may feature one or more cartridge sides/faces having two sets 144, 146 (e.g., FIG. 37) of one or more blades 142 (e.g., but not limited to, three blades in each set), wherein first and second sets 144, 146 are arranged in opposing directions of cut D1, D2. The first and second sets 144, 146, of blades 142 may be separated by a lubrication strip 176. This is a particularly useful blade arrangement for consumers that shave their head or any other awkward area of the body, as they can use a "back and forth" shaving stroke motion, without having to lift the razor from the area being shaved to begin a new stroke. Optionally, the second side/face of the cartridge may include one or more blades 142 all arranged in the same direction of cut for conventional shaving (e.g., FIG. 36). This cartridge configuration gives the user great flexibility, as only one device is required to shave any part of their anatomy. One or more of the faces or sides 140, 156 may have a SES at the lower and upper portion of the cartridge 22. This arrangement may be particularly useful for a body blade dual combination as described herein, where the side that has the blades in opposing directions of cut would be the face or side 140, 156 that have the placement of the two SESs.

Turning now to FIGS. 38-45, a further embodiment of a blade cartridge 22 consistent with the present disclosure is generally illustrated. As discussed herein, the blade cartridge 22 may include more than two faces. In the illustrated embodiment, the blade cartridge 22 is shown having a generally triangular cross-section having three faces, namely, a first face 140, a second face 156, and a third face 240, respectively, configured to be rotated about the pivot axis PA. Any of the faces 140, 156, 240 may include any arrangement of razor blades, mirrors, ball bearings, etc. as described herein. While the faces 140, 156, 240 are illustrated having substantially the same dimensions, it should be appreciated that one or more of the faces 140, 156, 240 may be smaller than, or larger than, one or more of the other faces 140, 156, 240. Additionally, it may be appreciated that any of the resistive pivot mechanisms described herein, or any combination, may be modified to allow the blade cartridge 22 to be rotated (e.g., as generally illustrated by arrow H in FIGS. 41-45) to any one of the initial starting positions corresponding to any one of the faces 140, 156, 240 of the blade cartridge 22. For example, FIG. 40 generally illustrates one embodiment of a pivot pin/cylinder 34 consistent with FIG. 14 having three recesses 222A, 222B, and 222C corresponding to the three faces 140, 156, 240. It should be appreciated, however, that this is only one embodiment and that any resistive pivot mechanism described herein may be used with the blade cartridge 22 as shown in FIGS. 38-45.

Turning now to FIG. 46, another view of a razor 10 consistent with the present disclosure is generally illustrated. The razor 10 includes a disposable head assembly 20 comprising a blade cartridge 22 and a blade cartridge support member 24. As shown, blade cartridge support member 24 comprises a generally U-shaped cartridge support frame 26. U-shaped cartridge support frame 26 comprises two generally curved support arms 30. For example, the support arms 30 may have a generally C-shape or L-shape.

To facilitate pivotable attachment of blade cartridge 22 to the blade cartridge support member 24 and subsequent use thereof, the blade cartridge 22 and the blade cartridge support member 24 may include one or more hinges or pivot assemblies 3 that allows the blade cartridge 22 to rotate about a pivot axis PA (e.g., about a direction generally perpendicular to the longitudinal axis L of the handle 60.) As described herein and generally illustrated in FIGS. 47-49, the hinge or pivot assembly 3 may be configured to allow the blade cartridge 22 to rotate (e.g., in the direction of arrow W) approximately 180 degrees about pivot axis PA such that a front side 140 and rear side 156 of the blade cartridge 22 may be used. According to one embodiment, the hinge or pivot assembly 3 may be configured to allow the blade cartridge 22 to rotate approximately 360 degrees about pivot axis PA.

Referring back to FIG. 46, the hinge or pivot assembly 3 may include a pivot receptacle 32 disposed in each support arm 30 of the blade cartridge support member 24 (e.g., but not limited to, a distal section 40 of the support arms 30), each of which receives a pivot pin/cylinder located on opposing lateral sides of the blade cartridge 22. The pivot pins/cylinders may extend generally outwardly from the lateral sides of the blade cartridge 22. With the foregoing arrangement, the blade cartridge 22 is arranged between the support arms 30 and supported by each support arm 30 at a pivot connection (assembly), and the blade cartridge 22 is able to rotate about the pivot axis PA at any angle, up to and including 360° degrees. It should be appreciated that the location of one or more of the pivot receptacles 32 and the pivot pins may be switched (e.g., one or more of the pivot receptacles 32 may be located in the blade cartridge 22 and one or more of the pivot pins may extend outwardly from the support arms 30 of the blade cartridge support member 24).

Additionally, a portion of one or more of the support arms 30 (e.g., but not limited to, the distal section 40) may be at least partially received in one or more hub recesses or pivot receptacles 32 disposed in the lateral sides of the blade cartridge 22 as generally illustrated. Alternatively, it should be appreciated that a portion of one or more of the pivot pin/cylinders may be at least partially received in one or more recesses/hubs disposed in support arms 30 (e.g., but not limited to, the distal section 40 of the support arms 30).

In order to cushion use of blade cartridge 22 while shaving, one or more of the support arms 30 may include a cushioning mechanism 38. As shown, a second (distal) section 40 of each support arm 30 is configured to slide within a receptacle (e.g., a slotted recess) of a first (proximal) section 44 of each support arm 30. Each receptacle may include a compression (e.g., coil) spring or biasing device disposed therein. Alternatively (or in addition), first section 44 may include a cushioning mechanism 38. In particular, the cushioning mechanism 38' (see, for example, FIG. 50) is configured to allow the first section 44 (e.g., an arm fin or the like, 87) to slide (e.g., generally in the direction of arrow Q) within a receptacle (e.g., a slotted recess) of support hub 50. Each receptacle may include a compression (e.g., coil) spring or biasing device 46 disposed therein.

In the foregoing manner, the biasing device of the cushioning mechanisms 38 may compress in response to a downward force placed on blade cartridge 22, with such compression biasing against the downward force. In doing so, such compression may absorb/dampen the downward force to cushion use of the blade cartridge 22. Furthermore, since the cushioning mechanisms 38 of each support arm 30 is independent of one another, the cushioning mechanism 38 may enable each lateral end of the blade cartridge 22 to move and/or be cushioned independently. It should be understood that in other embodiments of shaving device 10, the blade cartridge support member 24 may not include a cushioning mechanism 38.

Referring now to FIGS. 47 and 50, the head assembly 20 may be selectively detachably connectable to the handle 60 by the user. As may be appreciated, any mechanism for selectively coupling the blade cartridge support member 24 to the handle 60 may be used. The blade cartridge support member 24 may include a support hub 50 (e.g., as shown in FIG. 50), which may be centrally disposed between the two support arms 30. The support hub 50 includes a mechanical connection element 52 which mechanically connects the blade cartridge support member 24 to a mechanical connection element 64 of elongated shaft 62 of handle 60 (e.g., as generally illustrated in FIG. 1A).

For example, as shown by FIG. 50, one embodiment of a connection element 52 of the blade cartridge support member 24 comprises a rectangular (e.g., square) shank 54 which is configured to fit within a corresponding recess 66 (e.g., rectangular and/or square recess) of connection element 64 of handle 60. In order to provide a positive mechanical connection, rectangular shank 54 includes a plurality of deformable (cantilevered) and/or spring loaded engagement tabs 56 which engage within engagement apertures 68 and fixes (e.g., locks) the position of the head assembly 20 relative to the handle 60. The deformable (cantilevered and/or spring loaded) engagement tabs 56 may, in one embodiment, be configured to be moved out of engagement with the engagement apertures 68 upon depressing of an actuation button 100 (e.g., as shown in FIGS. 47-49). Alternatively, the engagement tabs 56 may be pressed inwardly manually by the user, for example, using his/her thumbs and/or fingers of each hand respectively.

Once the engagement tabs 56 are engaged within the engagement apertures 68, the head assembly 20 and handle 60 may be generally inhibited from separating from one another. Thereafter (e.g., after the useful life of the blade cartridge 22), the head assembly 20 and handle 60 may be detached from one another by depressing the engagement tabs 56 inward (e.g., manually using the user's fingers and/or by depressing a button or the like disposed on the handle 60 and/or the disposable head assembly 20) out of engagement with the engagement aperture 68, and pulling the shank 54 of the blade cartridge support member 24 out of the recess 66 of the handle 60. The used head assembly 20/blade cartridge 22 may then be replaced with a fresh head assembly 20/blade cartridge 22. Thus, as may be understood the head assembly 20 is selectively detachably connectable to the handle 60 by the user.

Although the shank 54 and recess 66 are shown as part of the blade cartridge support member 24 and the handle 60, respectively, it should be appreciated that the arrangement of the shank 54 and recess 66 may be switched (e.g., the shank 54 and recess 66 may be part of the handle 60 and the blade cartridge support member 24, respectively, see, for example, FIG. 5). Additionally (or alternatively), while the deformable (cantilevered or spring loaded) engagement tabs 56 and the engagement apertures 68 are shown as part of the shank 54 and recess 66, respectively, it should be appreciated that the arrangement of the deformable (cantilevered or spring loaded) engagement tabs 56 and the engagement apertures 68 may be switched (e.g., the deformable (cantilevered or spring loaded) engagement tabs 56 and the engagement apertures 68 may be part of the recess 66 and the shank 54, respectively). Again, it should be appreciated that the connection element 52 is not limited to arrangement illustrated and/or described herein unless specifically claimed as such, and that any connection element 52 that allows a user to selectively releasably couple the head assembly 20 to the handle 60 may be used.

Turning now to FIGS. 46, 51, and 52, another embodiment of the razor 10 having a hinge 74 is generally illustrated. While the razor 10 of FIGS. 25-27 may be used with any blade cartridge known to those skilled in the art, the razor 10 of FIGS. 25-27 may be particularly useful with a blade cartridge 22 having at least one face 140 with at least one razor 142 aligned to cut in a first shaving direction D1 and at least one razor 142 aligned to cut in a second shaving direction D2 (e.g., but not limited to, the blade cartridge 22 as generally illustrated in FIG. 37).

The hinge 74 may be configured to allow the head assembly 20 to rotate from the position generally illustrated in FIG. 46 to the position generally illustrated in FIGS. 51 and 52. The handle 60 may include a first (proximal) shaft portion 75 (FIGS. 51-52) coupled to a second (distal) shaft portion 77 by way of one or more hinges 74. The hinge 74 may include any hinge mechanism known to those skilled in the art, and may include, for example, a locking mechanism (e.g., but not limited to, a locking pawl, ratchet mechanism, or the like) configured to allow the user to generally lock or fix the relative position of the first shaft portion 75 relative to the second shaft portion 77 (e.g., the head assembly 20 relative to the handle 60).

For example, the hinge 74 may be configured to allow the first shaft portion 75 to swing approximately 90 degrees generally along the direction of arc S from the position shown in FIG. 46 to the position shown in FIGS. 51 and 52. It may be appreciated that the hinge 74 allows the first shaft portion 75 to swing in a direction (e.g., plane or axis) that is generally perpendicular to cutting edge axis CE (not shown for clarity) of the cutting edge of one or more of the razor blades 142 of the head assembly 20 when the razor 10 is in the position illustrated in FIG. 47.

The handle 60 (e.g., the first shaft portion 75) and/or the support hub 50 may optionally include a swivel or pivot 177 configured to allow the user to swivel or rotate the blade cartridge 22 approximately 90 degrees (e.g., as indicated by arrow E in FIGS. 51 and 52) in an axis that is generally parallel to the longitudinal axis of the first shaft portion 75 and/or the support hub 50 such that the cutting edge axis CE of the cutting edge of one or more of the razor blades 142 of the head assembly 20 is aligned generally parallel to the longitudinal axis of the handle 60 as generally illustrated in FIGS. 51 and 52. The swivel 177 may include any swivel or pivot mechanism known to those skilled in the art, and may include, for example, a locking mechanism (e.g., but not limited to, a locking pawl, ratchet mechanism, or the like) configured to allow the user to generally lock of fix the relative position of the blade cartridge 22 relative to the first shaft portion 75 and/or support hub 50.

Alternatively, the user may manually detach the head assembly 20 from the handle 60 and rotate the head assembly 20 to the desired position as shown. For example, the connection between the head assembly 20 and the handle 60 may be configured to allow the head assembly 20 to be aligned in two or more different orientations relative to the handle 60. By way of a non-limiting example, the connection between the head assembly 20 and the handle 60 may be generally symmetrical, for example, generally circular and/or square.

A razor 10 having a hinge 74 and swivel 177 as described above may be particularly useful for shaving a user's head and/or body. In particular, having the cutting edge axis CE of the cutting edge 151 of one or more of the razor blades 142 of the head assembly 20 aligned generally parallel to the longitudinal axis L of the handle 60 as generally illustrated in FIGS. 51 and 52 may facilitate shaving a user's head and/or body compared with having the cutting edge axis CE of the cutting edge of the razor blades 142 aligned generally perpendicular to the longitudinal axis L of the handle 60 as generally illustrated in FIG. 46.

The blade cartridge 22 in FIGS. 46, 51 and 52 may optionally include any hinge and/or resistive pivot mechanism described herein to allow the blade cartridge 22 to rotate about the pivot axis PA (e.g., as generally illustrated by arrow T). While not a limitation of the present disclosure unless specifically claimed as such, the blade cartridge 22 may include any of the resistive pivot mechanisms described in FIGS. 11-17. The resistive pivot mechanisms described in FIGS. 11-17 may be particularly suited for use with the hinge 74 and swivel 177 since they do not include the biasing pin 92. As such, the blade cartridge 22 may be located closer to the second shaft portion 77 when arranged in the position shown in FIGS. 51 and 52.

As discussed herein, a razor 10 having a hinge 74 and swivel 177 may be used with any blade cartridge 22 described herein. By way of a non-limiting example, a razor 10 having a hinge 74 and swivel 177 with a blade cartridge having three faces (i.e., a first face 140, a second face 156, and a third face 240) is generally illustrated in FIG. 53.

With reference to FIGS. 51-53, the razor 10 (and in particular, the blade cartridge 22) may optionally include one or more (e.g., a plurality) of wash-out apertures 102. The wash-out apertures 102 may be disposed along one or more of the edge faces 104 of the blade cartridge 22, and may be configured to generally prevent the blade cartridge 22 from clogging with hair and/or shaving cream during the shaving process. In particular, the wash-out apertures 102 may allow hair and/or shaving cream to "wash through" the wash-out apertures 102 by rinsing the blade cartridge 22 with water.

Turning now to FIG. 54, one embodiment of a head assembly 20 including a resistive swing mechanism 540 is generally illustrated. The head assembly 20 includes one or more arms 30 that are rotatably coupled to the support hub 50. The resistive swing mechanism 540 may include one or more biasing devices (e.g., but not limited to, a spring or the like) configured to urge one or more of the arms 30 in a direction generally opposite to arrow W. In use, the user may apply a force generally in the direction of arrow W while shaving and the resistive swing mechanism 540 may allow the blade cartridge 22 to swing in the direction of arrow W. It should be appreciated that while the arms 30 are illustrated moving/swinging relative to the support hub 50, first section 44 of the arms 30 may be stationary relative to the support hub 50 and second section 40 of the arms 30 may be biased as described herein to allow the blade cartridge 22 to swing in the direction of arrow W. Alternatively (or in addition), the resistive swing mechanism 540 may be incorporated into the hinge pin 76, for example, as generally illustrated in FIGS. 47-49. As such, the head assembly 20 may be biased generally in the direction opposite of arrow W relative to the handle 60, and the head assembly 20 may move generally in the direction of arrow W relative to the handle 60 when the user applies a force while shaving.

Turning to FIGS. 55-57, another embodiment of a resistive pivot mechanism is generally illustrated. The resistive pivot mechanism may include a blade cartridge pivot biasing mechanism 90 and/or a blade cartridge rotation limiter 35. As explained herein, the blade cartridge pivot biasing mechanism 90 may allow the blade cartridge 22 to rotate both clockwise and counter clockwise about the pivot axis PA relative to the initial starting position. The initial starting position may correspond to a location/orientation/position of the blade cartridge 22 relative to the blade cartridge support member 24 and/or handle 60 when no external forces are applied to the blade cartridge 22. Each face (e.g., face 140, 156) may have a corresponding initial starting position.

The resistive pivot mechanism may create a biasing force which urges the blade cartridge 22 towards an initial starting position. For example, the biasing force created by the blade cartridge pivot biasing mechanism 90 may include a spring force and/or a magnetic force. The magnetic force may be an attractive magnetic force (e.g., a magnetic force causing the blade cartridge 22 to be urged/pulled towards the blade cartridge support member 24 or handle 60) and/or a repelling magnetic force (e.g., a magnetic force causing the blade cartridge 22 to be urged away from the blade cartridge support member 24 or handle 60). The magnetic force (either attractive and/or repelling) may be between (e.g., generated by) two or more magnets having their poles aligned to either create an attractive or repelling force. For example, one or more magnets may be coupled/secured to the blade cartridge 22 and one or more magnets may be coupled/secured to the blade cartridge support member 24.

The magnetic force may be generated between one or more magnets coupled/secured to the blade cartridge 22 and a ferromagnetic material coupled/secured to the blade cartridge support member 24 (it should be appreciated that the arrangement of the magnets and the ferromagnetic material relative to the blade cartridge 22 and blade cartridge support member 24 may also be reversed).

One or more of the magnets may be either permanent magnets and/or electromagnets. It may also be appreciated that when an electromagnet is used, the current may be adjusted to selectively change the orientation of the resulting magnetic field.

With reference to FIG. 55, one embodiment of a blade cartridge pivot biasing mechanism 90 that creates a magnetic biasing force to urge the blade cartridge 22 towards the initial starting position is generally illustrated. In the illustrated embodiment, the blade cartridge pivot biasing mechanism 90 comprises at least one magnet 99*a* located in the blade cartridge 22 (which may be referred to as a blade cartridge magnet 99*a*) and at least one magnet 99*b* located in the blade cartridge support member 24 (which may be referred to as a blade cartridge support member magnet 99*b*). One or more of the blade cartridge magnet(s) 99*a* and/or the blade cartridge support member magnet(s) 99*b* may be permanent magnets and/or electromagnets. The power source (e.g., one or more batteries or the like) for the electromagnet is not shown for clarity.

As shown, one or more blade cartridge magnets 99*a* may be located within the blade cartridge frame 188. For example, one or more blade cartridge magnets 99*a* may extend longitudinally along an axis generally parallel to the pivot axis PA of the blade cartridge frame 188. In particular, one or more blade cartridge magnets 99*a* may be disposed along outer longitudinal regions 157, 159 of the blade cartridge frame 188 (e.g., adjacent blades 142), which may be further understood to be the front edge region 157 and the rear/aft edge region 159 relative to cutting direction as explained herein.

In addition to, or as an alternative to being located in the outer longitudinal region(s) 157, 159 of the blade cartridge frame 188, one or more blade cartridge magnets(s) 99*a* may be located in one or both of the outer lateral regions 161, 163 of the blade cartridge frame 188 of the blade cartridge 22. The blade cartridge magnet(s) 99*a* may be fully encapsulated within the blade cartridge frame 188 (i.e. not visible) or may have one or more exposed surfaces on the blade cartridge frame 188.

When one or more blade cartridge magnets 99*a* are located in the outer longitudinal region 157, 159 of the blade cartridge frame 188, one or more cooperating blade cartridge support member magnets 99*b* may be located in a portion of the blade cartridge support member 24 which is opposed beneath the outer longitudinal region 157, 159 of the blade cartridge frame 188 when the blade cartridge 22 is in its use position. More particularly, the blade cartridge support member magnet 99*b* may be located in the base 45 of the yoke 47 of the blade cartridge support member 24, which may include a proximal section 44 of at least one of the support arms 30.

Alternatively, or in addition to the above, when one or more blade cartridge magnets 99*a* are located in the outer lateral region 161, 163 of the blade cartridge frame 188, one or more cooperating blade cartridge support member magnets 99*b* may be located in a corresponding distal section 40 of at least one of the support arms 30.

As explained in greater detail below, the magnetic fields generated by the blade cartridge magnet(s) 99*a* and blade cartridge support member magnet(s) 99*b* may create an attractive and/or repelling biasing force that urges the blade cartridge 22 towards the initial starting position. The magnetic biasing force may urge the blade cartridge 22 towards the initial starting position as long as the blade cartridge 22 is within a range of predetermined pivot angles θ, and more particularly at an intermediate pivot angle θ in a middle of the range of predetermined pivot angles, as shown in FIG. 56.

With respect to operation, as best shown in FIG. 56, the cooperating blade cartridge magnet(s) 99*a* and blade cartridge support member magnet(s) 99*b* are arranged such that the polarity of their respective magnetic fields, as shown by their north poles N and south poles S, are either attracted and/or repelling to each other over a range of predetermined pivot angles, with the interaction of the attractive and/or repelling magnetic fields increasing towards a maximum level at the intermediate pivot angle θ in a middle of the range of predetermined pivot angles θ (e.g., generally corresponding to the initial starting position).

As shown, the range of pivot angles θ, as well as the intermediate pivot angle θ where the force of the attracting and/or repelling magnetic fields is at its greatest level, may be determined by the angle formed between the front face 140 of the blade cartridge 22 and a longitudinal axis of the longitudinal axis L of the handle 60 of the shaving device 10.

Thus, it should be understood that the cooperating blade cartridge magnet(s) 99*a* and blade cartridge support member magnet(s) 99*b* are arranged such that the magnetic interaction between the interacting (attracting and/or repelling) magnetic fields of the cooperating blade cartridge magnet(s) 99*a* and blade cartridge support member magnet(s) 99*b* varies with a rotation of the blade cartridge 22 and a rotational position of the blade cartridge 22.

Furthermore, it should also be understood, that when the cooperating blade cartridge magnet(s) 99*a* and blade cartridge support member magnet(s) 99*b* are arranged such that there is a magnetic interaction between the attracting and/or repelling magnetic fields of the cooperating blade cartridge magnet(s) 99*a* and blade cartridge support member magnet (s) 99*b*, the force of the interacting (attracting and/or repelling) magnetic fields will rotate the blade cartridge 22 towards the intermediate pivot angle θ in a middle of the range of predetermined pivot angles θ, i.e. to a position where the blade cartridge magnet(s) 99*a* and blade cartridge support member magnet(s) 99*b* are aligned (e.g., fully aligned) with one another and the interaction of the magnetic fields is at its greatest force (e.g., the initial starting position), absent any overriding biasing force.

Referring now to FIG. 57, shaving device 10 may optionally include a blade cartridge rotation limiter 35. Blade cartridge rotation limiter 35 allows the user to rotate the blade cartridge 22 about the pivot axis PA to select one of a plurality of sides/faces 140, 156, and that allows the blade cartridge 22 to rotate within a predefined rotation range while at the selected blade/face position during normal use of the razor to conform to the user's skin contours.

Blade cartridge rotation limiter 35 may include at least one pawl 220 configured to extend generally upward from arm 30. The pivot pin/cylinder 34 of blade cartridge 22 may include a plurality of recesses 222 configured to receive a distal end 224 of the pawl 220. The location of the recesses 222 may each correspond to one of the plurality of faces 140, 156 of the blade cartridge 22. When the distal end 224 of the pawl 220 is engaged in recess 222, each recess 222 may allow the blade cartridge 22 to rotate in a range of 1 to 90 degrees, and more particularly in a range of 2 to 45 degrees, and even more particularly in a range of 5 to 30 degrees.

The pawl 220 may be located at the end of a slidable thumb switch release 28 (FIG. 57), which is biased by upward (engagement) by a spring 29. Slidable thumb switch release 28 may be depressed downward against the bias of spring 29 to remove the distal end 224 of the pawl 220 from recess 222 to rotate blade cartridge 22 outside the confines and limitations of recess 222. After being retracted, the slidable thumb switch release 28 may be released, and the distal end 224 of the pawl 220 may enter a different recess 222 corresponding to another face (e.g., 140, 156) of the blade cartridge 22 after rotation of the blade cartridge 22 thereto. The size of the recess 222 and the pawl 220 will therefore determine the range of rotation corresponding to each face (e.g., 140, 156) of the blade cartridge 22.

In the foregoing embodiment, pawl 220 and more particularly distal end 224, may be rigid and non-deformable. However, in an alternative embodiment, at least the distal end 224 of the pawl 220 may be resiliently deformable and slidable thumb switch release 28 may be eliminated. In such embodiment, pawl 220 and more particularly distal end 224, may be disengaged from recess 222 by deformation of the pawl 220 with a rotation force applied to the blade cartridge 22.

It should also be appreciated that while the recess 222 is illustrated as being part of the blade cartridge 22 and the pawl 220 is illustrated as being coupled to the blade cartridge support member 24, the orientation of these components may be reversed.

It should be appreciated that the blade cartridge pivot biasing mechanism 90 of FIGS. 55-57 may be incorporated into any resistive pivot mechanism described herein. For example, the blade cartridge pivot biasing mechanism 90 of FIGS. 55-57 may be combined within any blade cartridge rotation limiter 35 described herein.

Turning now to FIGS. 58-64, yet another embodiment of a resistive pivot mechanism is generally illustrated. With reference to FIG. 58, the resistive pivot mechanism may include a blade cartridge pivot biasing mechanism 90 configured to apply a magnetic biasing force to urge the blade cartridge 22 towards the initial starting position while allowing the blade cartridge 22 to rotate clockwise and counter clockwise about the pivot axis PA, and/or a blade cartridge rotation limiter 35 to allow the blade cartridge 22 to rotate within a predefined range from the initial starting position.

Turning now to FIGS. 59A and 60, a partially transparent view of the blade cartridge pivot biasing mechanism 90 and blade cartridge rotation limiter 35 is generally illustrated in which the blade cartridge support member 24 is partially transparent. Similar to the embodiment of FIGS. 55-57, the blade cartridge pivot biasing mechanism 90 of FIGS. 58-64 features a plurality of magnets 99*a*, 99*b* that are arranged such that the magnetic fields cause the blade cartridge 22 to be biased towards the initial starting position. Additionally, blade cartridge rotation limiter 35 of FIGS. 58-64 features one or more detents, pawls (e.g., resiliently deformable pawls), and/or recesses on the blade cartridge 22 and/or the blade cartridge support member 24 that are configured to generally limit the rotation of the blade cartridge 22 within a predefined range of rotation relative to the initial starting position and/or to provide an indication to the user that another face (e.g., 140 or 156) of the blade cartridge 22 is being selected.

With continued reference to FIGS. 59-60 as well as FIGS. 61-62, one embodiment of the blade cartridge support member 24 is generally illustrated. The blade cartridge support member 24 includes one or more blade cartridge support member magnets 99*b* coupled to one or more of the support arms 30. The blade cartridge support member magnets 99*b* may be placed anywhere on the blade cartridge support member 24 such as, but not limited to, generally below or above the pivot axis PA/pivot receptacles 32. While the blade cartridge support member magnets 99*b* are generally illustrated having a generally cylindrical shape, it should be appreciated that the blade cartridge support member magnets 99*b* may have other shapes. For example, the blade cartridge support member magnets 99*b* may have a generally arcuate shape that generally extends along a rotation radius from pivot axis PA that generally corresponds to the distance (i.e., radius) of the blade cartridge magnet 99*a* from the pivot axis PA as described herein. Additionally, while only one blade cartridge support member magnet 99*b* is shown coupled to each arm 30, one or more arms 30 may have a plurality of blade cartridge support member magnets 99*b* or no blade cartridge support member magnets 99*b*.

The blade cartridge support member 24 may also optionally include one or more detents, pawls, and/or recesses 6102 that engage with corresponding elements of the blade cartridge 22 to generally limit the rotation of the blade cartridge 22 within a predefined range of rotation relative to the initial starting position and/or to provide an indication to the user that another face (e.g., 140 or 156) of the blade cartridge 22 is being selected. In the illustrated embodiment, the blade cartridge support member 24 is shown having one detent 6102 extending generally outwardly from each support arm 30. The detent 6102 may be resiliently deformable or generally rigid. While each support arm 30 is shown having one detent 6102, it may be appreciated that one or more of the support arms 30 may include a plurality of detents 6102 or no detents 6102. Additionally, it should be appreciated that one or more of the support arms 30 may include one or more recesses and/or pawls configured to engage with a detent, pawl, or recess on the blade cartridge 22.

With continued reference to FIGS. 59-60 as well as FIGS. 63-64, one embodiment of the blade cartridge 22 is generally illustrated. The blade cartridge 22 includes one or more blade cartridge magnets 99*a* coupled thereto. For example, the blade cartridge 22 may include one or more (e.g., a plurality) of blade cartridge magnets 99*a* coupled to one or more lateral ends of the blade cartridge 22. The blade cartridge magnets 99*a* may be arranged about the pivot axis PA, for example, about the pivot pin/cylinders 34, and may be disposed a distance (e.g., radius) from the pivot axis PA such that the blade cartridge magnets 99*a* and the blade cartridge support magnets 99*b* are generally aligned at generally the same distance (radius) from the pivot axis PA. The magnets 99*a*, 99*b* may also be aligned such that the separation distance D sep (FIG. 59A) between the blade cartridge magnets 99*a* and the blade cartridge support magnets 99*b* is generally minimized when the magnets 99*a*, 99*b* are aligned and generally facing each other. Aligning the magnets 99*a*, 99*b* such that the radius from the pivot axis PA is generally the same may enhance the biasing force of the magnets 99*a*, 99*b*, thereby increasing the biasing force urging the blade cartridge 22 towards the initial starting position.

While the blade cartridge 22 in FIGS. 63 and 64 is illustrated having four blade cartridge magnets 99*a* on each end, it should be appreciated that this is an illustrative example and that the blade cartridge 22 may have greater than or less than four blade cartridge magnets 99*a*. Additionally, one or more of the blade cartridge magnets 99*a* may have a generally arcuate shape having a radius that generally corresponds to the distance (e.g., radius) of the blade cartridge support magnets 99*b* from the pivot axis PA. Moreover, while the blade cartridge support member 24 in FIGS. 61 and 62 is illustrated having one blade cartridge support member magnet 99*b* on each arm 30, it should be appreciated that this is an illustrative example and that the blade cartridge support member 24 may have greater than or less than one blade cartridge support member magnet 99*b* on each arm 30 (e.g., only one arm 30 may include one or more blade cartridge support member magnet 99*b* or both arms may include at least one blade cartridge support member magnet 99*b*).

As discussed herein, the blade cartridge magnets 99*a* and the blade cartridge support member magnets 99*b* may be arranged to bias the blade cartridge towards an initial starting position. The blade cartridge magnets 99*a* and the blade cartridge support member magnets 99*b* may therefore be arranged in any manner to achieve this effect. For example, FIGS. 59B, 59C, and 59D generally illustrate various embodiments of possible arrangements of the blade cartridge magnets 99*a* and the blade cartridge support member magnets 99*b*, along with possible alignments of the various poles of the blade cartridge magnets 99*a* and the blade cartridge support member magnets 99*b*. It should be appreciated that this is provided for illustrative purposes only, and that the present disclosure is not limited to a particular arrangement of the blade cartridge magnets 99*a* and the blade cartridge support member magnets 99*b* unless specifically claimed as such.

The blade cartridge 22 may also optionally include one or more detents, pawls, and/or recesses 6302 that engage with corresponding detents, pawls, and/or recesses 6102 of the blade cartridge support member 24 to generally limit the rotation of the blade cartridge 22 within a predefined range of rotation relative to the initial starting position and/or to provide an indication to the user that another face (e.g., 140 or 156) of the blade cartridge 22 is being selected.

In the illustrated embodiment, the blade cartridge 22 is shown having one or more detents 6302 extending generally outwardly from one or more lateral ends of the blade cartridge 22. The detents 6302 may be arranged about the pivot axis PA, for example, about the pivot pin/cylinders 34, and may be disposed a distance (e.g., radius) from the pivot axis PA such that the detents 6302 of the blade cartridge 22 and the detent 6102 of the blade cartridge support member 24 are generally aligned at generally the same distance (radius) from the pivot axis PA. The detents 6102, 6302 may extend outwardly from blade cartridge support member 24 and the blade cartridge 22, respectively, such that detents 6102, 6302 generally interfere with each as the blade cartridge 22 is rotated about the pivot axis PA. For example, the detents 6102, 6302 may generally contact each other as the blade cartridge 22 is rotated about the pivot axis PA. The contact of the detents 6102, 6302 may generally inhibit further rotation of the blade cartridge 22 in the clockwise and/or counter clockwise direction.

For example, two detents 6302*a*, 6302*b* may be aligned on generally opposite sides of the pivot axis PA (e.g., generally 180 degrees apart from each other). Aligning the detents 6302*a*, 6302*b* 180 degrees apart from each other will generally allow the blade cartridge 22 to rotate approximately 90 degrees in each direction (e.g., clockwise and counter clockwise) from the initial starting position. It should be appreciated that the number of and alignment of the detents 6302 may be selected to allow the blade cartridge 22 to rotate within any predefined range. By way of example, additional detents 6302 may be arranged less than 180 degrees from each (e.g., less than 90 degrees from the initial starting position) to allow the blade cartridge 22 to rotate less than 90 degrees from the initial starting position.

According to one embodiment, the detents 6102, 6302 may be generally rigid. As such, contact between the detents 6102, 6302 will generally prevent further rotation of the blade cartridge 22 without application of a face selection force. As used herein, a face selection force is defined as an amount of force in excess of the normal force applied to the blade cartridge 22 during normal shaving. To rotate the blade cartridge 22 beyond the predefined rotation range to select a different face (e.g., 140 or 156), the user may apply a face selection force to the blade cartridge 22 that may cause one or more of the support arms 30 of the blade cartridge support member 24 to deflect outwardly and increase the separation distance D sep between the blade cartridge 22 and the blade cartridge support member 24, thereby allowing the detents 6302 of the blade cartridge 22 to rotate past the detents 6102 of the blade cartridge support member 24. Once the detents 6302 of the blade cartridge 22 past beyond the detents of the blade cartridge support member 24, the resistive force applied by the blade cartridge support member 24 against the blade cartridge 22 will significantly decrease, thereby indicating to the user that another face (e.g., 140, 156) has been selected. The face selection force may be selected such that user will have to deliberately apply the necessary force to select a face so that another face cannot be selected accidentally during normal shaving use.

It should be appreciated that while the blade cartridge 22 and blade cartridge support member 24 are shown having two detents 6302 and one detent 6102 on each end, respectively, the number and arrangement of the detents 6302, 6102 may be switched and/or changed depending on the intended application.

Additionally, it should be appreciated that while the detents 6302, 6102 have been described as being rigid, one or more of the detents 6302, 6102 may be resiliently deformable. In such an arrangement, the support arms 30 may be generally rigid (i.e., the support arms 30 do not have to deflect in order to select another face).

Moreover, it should be appreciated that one or more of the detents 6302, 6102 may be replaced with a recess and/or a pawl. By way of a non-limiting example, the detents 6302 on the blade cartridge 22 may be replaced with a recess, and a detent 6102 on the blade cartridge support member 24 may be received within the recess. The length of the recess may generally correspond to the desired predefined range of rotation about the pivot axis PA. To select another face, the user will apply a face selection force that either deforms the detent 6102 and/or deflects the support arms 30. Of course, the detent 6102 on the blade cartridge support member 24 may be replaced with a recess and the detent 6302 on the blade cartridge 22 may be received within the recess. Alternatively, in case, one or more of the detents 6302, 6102 may be replaced with a pawl (e.g., a resiliently deformable pawl) that engages a corresponding recess on the blade cartridge 22 and/or blade cartridge support member 24. Moreover, one or more of the detents 6302, 6102 may engage a corresponding pawl (e.g., resiliently deformable pawl) on the blade cartridge 22 and/or blade cartridge support member 24.

It should further be appreciated that the blade cartridge pivot biasing mechanism 90 of FIGS. 58-64 may be incorporated into any resistive pivot mechanism described herein. For example, the blade cartridge pivot biasing mechanism 90 of FIGS. 58-64 may be combined within any blade cartridge rotation limiter 35 described herein. Moreover, the blade cartridge rotation limiter 35 of FIGS. 58-64 may be used with any blade cartridge pivot biasing mechanism 90 described herein. While the magnets 99*a*, 99*b* are shown on the lateral ends of the blade cartridge 22 and the support arms 30 of the blade cartridge support member 24, it should be appreciated that the magnets 99*a*, 99*b* may be disposed in the front edge region 157 and a rear/aft edge region 159 as well as in the yoke region 47 (e.g., as generally illustrated in FIGS. 55-57).

It should also be further appreciated that while the cartridge pivot biasing mechanism is shown having both blade cartridge magnets 99*a* and blade cartridge support member magnets 99*b*, either of these magnets 99*a*, 99*b* may be eliminated and replaced with a ferromagnetic element such that the remaining magnet 99*a* or 99*b* will generate an attractive magnetic biasing force urging the blade cartridge 22 towards the initial starting position.

Turning now to FIGS. 65-69, a further embodiment of a resistive pivot mechanism is generally illustrated. The resistive pivot mechanism may include a blade cartridge pivot biasing mechanism 90 and/or a blade cartridge rotation limiter 35. As explained herein, the blade cartridge pivot biasing mechanism 90 may allow the blade cartridge 22 to rotate both clockwise and counter clockwise about the pivot axis PA relative to the initial starting position. The initial starting position may correspond to a location/orientation/position of the blade cartridge 22 relative to the blade cartridge support member 24 and/or handle 60 when no external forces are applied to the blade cartridge 22. Each face (e.g., face 140, 156) may have a corresponding initial starting position.

The cartridge pivot biasing mechanism 90 may include any cartridge pivot biasing mechanism 90 described herein. In the embodiment illustrated in FIGS. 65-69, the cartridge pivot biasing mechanism 90 includes one or more magnets 99*a* and/or 99*b* configured to create a magnetic biasing force as described herein. Thus, for the sake of brevity, the details of the cartridge pivot biasing mechanism 90 will not be described in further detail.

With continued reference to FIG. 65 as well as FIGS. 66-67, one embodiment of the blade cartridge support member 24 is generally illustrated. The blade cartridge support member 24 may include one or more biased pawls or pins 6602. The biased pawls or pins 6602 may include a cylinder 6604 and a pin 6606 biased, for example, by a spring, pneumatic pressure, or the like. The cylinder 6604 may be separate from the blade cartridge support member 24 or integral (e.g., the cylinder 6604 may be formed by the support arms 30). The pin or pawl 6606 may be biased to extend outwardly from the cylinder 6604. While each support arm 30 is illustrated with a biased pawl/pin 6602, it may be appreciated that each support arm 30 may have more than one biased pawl/pin 6602 or no biased pawl/pin 6602.

With continued reference to FIG. 65 as well as FIGS. 67-69, one embodiment of the blade cartridge 22 is generally illustrated. The blade cartridge 22 may include one or more cams or recesses 6802 corresponding to each face (e.g., 140, 156) of the blade cartridge 22. The cam or recess 6802 may be coupled to one or more of the pivot pin/cylinders 34. The cam or recess 6802 may be configured to receive and/or engage the pin or pawl 6606 of the biased pawl/pin 6602. The contour and/or length of the cams or recesses 6802 and the pin/pawl 6606 may determine the predefined rotation range for the blade cartridge 22. For example, the pin/pawl 6606 may be received in and engage a contoured surface (e.g., cam surface) such that the blade cartridge 22 may rotate with relative ease within the predefined rotation range during normal shaving use. To rotate the blade cartridge 22 to select another face (e.g., 140, 156), the user may apply a face selection force to the blade cartridge 22. The face selection force may be sufficient to cause the pin/pawl 6606 to be retracted against the force of the biasing mechanism within the cylinder 6604 (e.g., spring or the like) such that the pin/pawl 6606 may disengage the cam or recess 6802. As the user continues to rotate the blade cartridge 22, the pin/pawl 6606 will engage another cam/recess 6802 corresponding to the selected face (e.g., 140, 156). It should be appreciated that the arrangement of the biased pawl/pins 6602 and the cams 6802 may be switched.

Turning now to FIGS. 70-76, a further embodiment of a resistive pivot mechanism is generally illustrated. The resistive pivot mechanism may include a blade cartridge pivot biasing mechanism 90 and/or a blade cartridge rotation limiter 35. As explained herein, the blade cartridge pivot biasing mechanism 90 may allow the blade cartridge 22 to rotate both clockwise and counter clockwise about the pivot axis PA relative to the initial starting position. The initial starting position may correspond to a location/orientation/position of the blade cartridge 22 relative to the blade cartridge support member 24 and/or handle 60 when no external forces are applied to the blade cartridge 22. Each face (e.g., face 140, 156) may have a corresponding initial starting position.

With reference to FIG. 70, one embodiment of head assembly 20 is generally illustrated in which the blade cartridge 22 is shown in cross-section with parts removed. The blade cartridge 22 is coupled to an axle 7002 by way of a detent plate 7004 that engages one or more cams 7006 of the axle 7002. The axle 7002 is biased clockwise and/or counter-clockwise about the pivot axis PA by way of one or more biasing devices (e.g., one or more springs including, but not limited to, one or more torsion springs 7008 that are coupled to one or more support arms 30 of the blade cartridge support member 24 as generally illustrated in FIGS. 71-73). For example, one or more of the support arms 30 may include a cavity, groove, or the like to receive at least a portion of one or more springs 7008. In particular, at least two springs 7008 may be at least partially wound around a portion of the axle 7002 and may engage against one or more arms/ears 7010 (e.g., FIG. 71) extending outwardly from one or more of the cams 7006 to urge the arms/ears and the cams 7006 clockwise or counter-clockwise, respectively, about the pivot axis PA. Because the cams 7006 are coupled to the axle 7002, and the axle 7002 is coupled to the blade cartridge 22 through the detent plate 7004, the springs 7008 thereby urge the blade cartridge 22 either clockwise or counter-clockwise about the pivot axis PA relative to an initial starting position.

The detent plate 7004 is coupled/secured to the frame of the blade cartridge 22. As noted above, the detent plate 7004 couples the blade cartridge 22 to the axle 7002. In particular, the detent plate 7004 (FIGS. 74-76) includes one or more resiliently deformable detents 7402 that engage against cam surfaces 7102 (best seen in FIG. 71) of the cams 7006 to releasably couple the detent plate 7004 (and thus the frame of the blade cartridge 22) to the cams 7006, and thus releasably couple the frame of the blade cartridge 22 to the axle 7002.

To select another face, the user may apply a face selection force to the blade cartridge 22 to urge the blade cartridge 22 either clockwise or counter-clockwise. As the blade cartridge 22 rotates, the springs 7008 will apply a resistive force. Once resistive force of the springs exceeds the clamping force of the resiliently deformable detents 7402, the resiliently deformable detents 7402 will disengage from the cam surface 7102, thereby allowing the detent plate 7004 (and thus the frame of the blade cartridge 22) to rotate relative to the cams 7006 and the axle 7002. As the user continues to rotate the blade cartridge 22 around the cams 7006 and axle 7002, the resiliently deformable detents 7402 will engage against the cam surface in an alignment corresponding to the selected face (e.g., 140, 156). For example, the user may rotate the blade cartridge 22 approximately 180 degrees once the resiliently deformable detents 7402 disengage from the cams 7006. Once the desired face of the blade cartridge 22 has been selected, the user releases the blade cartridge 22 and the springs 7008 will cause the blade cartridge 22 to be aligned (e.g., centered) at the new initial starting position within the predefined rotation range.

According to another feature of the present disclosure, the head assembly 20 may be coupled to the handle 60 using one or more magnets. For example, one or more magnets may be coupled/secured to a portion of the head assembly 20 and one or more magnets may be coupled/secured to a portion of the handle 60 (e.g., the collar). The magnets in the head assembly 20 and handle 60 may be configured to generate an attractive magnetic force that is sufficient to join the head assembly 20 to the handle 60 during normal shaving use. Additionally, one or more mechanical fasteners (e.g., clips, snaps, threads, posts, recesses, etc.) may be used. For example, the head assembly 20 may include a recess/cavity configured to receive a post/protrusion extending from the handle 60. While the head assembly 20 and the handle 60 may each include magnets, it should be appreciated that only the head assembly 20 or the handle 60 may include one or more magnets, and the other component may include a ferromagnetic material that is attracted by the magnetic field of the magnets. One or more of the magnets may include an electromagnet and/or permanent magnet. It should also be appreciated that the magnetic coupling of the head assembly 20 and the handle 60 may be used with any head assembly 20 and handle 60 described herein.

Turning now to FIGS. 77-78, one embodiment of a head assembly 20 and a handle 60 configured to be coupled together using one or more magnets consistent with the present disclosure is generally illustrated. In particular, FIG. 77 generally illustrates the head assembly 20 and the handle 60 in a dissembled state, while FIG. 78 generally illustrates the head assembly 20 and the handle 60 in an assembled state. It should be appreciated that the magnetic connection described herein may be used with any head assembly known to those skilled in the art including, but not limited to, any head assembly described herein.

As may be seen, one or more magnets 7702 may be coupled/secured to a portion of the head assembly 20 and one or more magnets 7704 may be coupled/secured to a portion of the handle 60 (e.g., the collar 7714). The magnets 7702, 7704 in the head assembly 20 and handle 60 may be configured to generate an attractive magnetic force that is sufficient to join the head assembly 20 to the handle 60 during normal shaving use. Additionally, one or more mechanical fasteners (e.g., clips, snaps, threads, posts, recesses, etc.) may be used. For example, the head assembly 20 may include a recess/cavity 7706 configured to receive a post/protrusion 7708 extending from the handle 60 (though it should be appreciated that the arrangement of the recess/cavity 7706 and post/protrusion 7708 may be switched).

While the head assembly 20 and the handle 60 may each include magnets 7702, 7704, optionally the head assembly 20 or the handle 60 may include one or more magnets, and the other component may include a ferromagnetic material that is attracted by the magnetic field of the magnets. One or more of the magnets 7702, 7704 may include an electromagnet and/or permanent magnet. It should also be appreciated that the magnetic coupling of the head assembly 20 and the handle 60 may be used with any head assembly 20 and handle 60 described herein.

One or more magnets 7702, 7704 may be exposed to the exterior surface 7710, 7712 of the head assembly 20 and/or handle 60. In such an embodiment, one or more magnets 7702, 7704 may contact each other when in the assembled state.

Alternatively (or in addition), one or more magnets 7702, 7704 may be covered by the exterior surface 7710, 7712 of the head assembly 20 and/or handle 60. In such an embodiment, one or more magnets 7702, 7704 may not contact each other and instead, a magnetic space or gap may exist between the magnets 7702, 7704 when in the assembled state. Providing a magnetic space or gap between the magnets 7702, 7704 when in the assembled state may allow the head assembly 20 to move longitudinally (e.g., generally along arrow 7802 in FIG. 78) relative to the handle 60. This movement of the head assembly 20 relative to the handle 60 may provide a shock absorbing effect while shaving and/or serve as an indicator to the user that the user is applying too much pressure while shaving. According to one embodiment, the post/protrusion 7708 may be biased forward such that the post/protrusion 7708 contacts the base of the recess/cavity 7706 when initially assembled. During use, force applied to either the head assembly 20 and/or handle 60 may cause the head assembly 20 to apply a force against the bias force of the post/protrusion 7708, thereby moving the post/protrusion 7708 against the biasing force and allowing the head assembly 20 to move relative to the handle 60. As discussed herein, the handle 60 may include a collar 7714 which is mounted, secured, and/or otherwise coupled to the body portion 7716 of the handle 60 or is moulded as part of the handle. Optionally, the collar 7714 may be incorporated as part of the body portion 7716 as a singular unit. According to one embodiment, the post/protrusion 7708 may extend generally outward from the body portion 7716 and may be at least partially received within a post cavity 7718 in the collar 7714. One advantage to this arrangement is that the magnets 7704 may be secured (e.g., but not limited to, overmolded) into the collar 7714, and the collar 7714 may then be secured to the body portion 7716. This may allow for the number, size, shape, and/or arrangement of the magnets 7704 to be easily changed for various designs without having to change the manufacturing (e.g., but not limited to, molding) of the body portion 7716. It may also allow for a single collar 7714 to be used with a plurality of different body portions 7716. Turning now to FIGS. 79-80, another aspect of a head assembly 20 and a handle 60 configured to be coupled together using one or more magnets consistent with the present disclosure is generally illustrated. In particular, FIG. 79 generally illustrates the head assembly 20 and the handle 60 in a dissembled state, while FIG. 80 generally illustrates the head assembly 20 and the handle 60 in an assembled state. It should be appreciated that the magnetic connection described herein may be used with any head assembly known to those skilled in the art including, but not limited to, any head assembly described herein.

Whereas the embodiments described in FIGS. 77-78 may utilize magnetic attractive force to couple the head assembly 20 and the handle 60 together (e.g., the poles of one or more of the magnets 7702, 7704 are aligned such that the magnetic field(s) create an attractive force urging the head assembly 20 and the handle 60 towards each other), the head assembly 20 and handle 60 of FIGS. 79-80 include at least two magnets (e.g., central magnet 7902 and annular magnet 7904) having their poles aligned such that their magnetic fields create a magnetic repulsion force which, as described herein, couples the head assembly 20 and the handle 60 together.

For example, the head assembly 20 may include a protrusion (e.g., head protrusion) 7906 which includes one or more central magnets 7902 configured to be at least partially received in a cavity (e.g., handle cavity) 7908 including one or more annular magnets 7904, and also configured to be at least partially received in a central region of the annular magnet 7904. The annular magnet 7904 may include one or more annular, annulus, and/or toroid (e.g., circular, ring-shaped, discoid, or the like) shaped magnets (e.g., either permanent magnet and/or electromagnet). Alternatively (or in addition), the annular magnet 7904 may include a plurality of (e.g., array) of magnets disposed about in a generally annular, annulus, and/or toroid (e.g., circular, ring-shaped, discoid, doughnut, or the like) configuration to generate a generally annular, annulus, and/or toroid magnetic field (e.g., a magnetic field having magnetic field lines that form a generally annular, annulus, and/or toroid pattern). The central magnet 7902 may include any magnet (e.g., permanent magnet and/or electromagnet) such as, but not limited to, a disc magnet or the like.

As mentioned above, the head assembly 20 and handle 60 may be coupled together using repulsive magnetic forces between the head assembly magnets 7902 and the handle magnets 7904. In particular, the inventors have discovered that if a central magnet 7902 and an annular magnet 7904 (having an inside dimension ID 7910 that is equal to or larger than the outside dimension OD 7912 of the central magnet 7902) are constrained to move generally axially along axis 7914 relative to one another (e.g., by virtue of the OD 7916 of the protrusion 7906 relative to the ID 7918 of the cavity 7908) such that the central magnet 7902 can pass through the central region 7920 of the annular magnet 7904, and are further orientated such that the magnetic poles face in the same direction along the axis 7914, then the resulting force vs. displacement curve (see, e.g., FIGS. 81A-81B) closely resembles that of a traditional mechanical detent.

In particular, with reference to FIGS. 81A and 81B, diagrams illustrating the displacement (e.g., movement) of the central magnet 7902 relative to the annular magnet 7904, along with the resulting magnetic force (e.g., into or away from the cavity 7908) is generally illustrated. With reference to FIG. 81A, as the magnets 7902, 7904 approach each other in direction 8100 along axis 7914 (e.g., the head assembly 20 is advanced towards the handle 60), the repulsive force F created by the magnetic fields 8102, 8104 therebetween will initially create a force (e.g., region 8106) resisting the movement of the head assembly 20 towards the cavity 7908 and will grow (e.g., increase) as the central magnet 7902 approaches the annular magnet 7904 and then begin to decrease (e.g., substantially to zero) when the magnets 7902, 7904 are aligned at position C (e.g., the magnetic fields 8102, 8104 of the magnets 7902, 7904 will balance each other, and substantially no force will be created that urge the head assembly 20 and the blade 60 along the axis 7914). It may be appreciated that when the central magnet 7902 and the annular magnet 7904 are aligned at position C, an unstable equilibrium is achieved. It may be difficult to get the central magnet 7902 and the annular magnet 7904 to stay at this position. This unstable equilibrium is what creates the detent feel.

With reference to FIG. 81B, as the magnet 7902 continues to move in direction 8100 along axis 7914 past position C (e.g., they begin to pass through the central region 7920 of the annular magnet 7904), the repulsive force F created by the magnetic fields 8102, 8104 therebetween switch relative to region 8106 and create a force (e.g., region 8108) urging the head assembly 20 towards the handle 60. This region 8108 of force initially continues to grow until the magnetic fields begin to dissipate. In region 8108, the force begins to push the central magnet 7902 away from annular magnet 7904, thereby urging the head assembly 20 towards the handle 60. From the standpoint of the user pushing the head assembly 20 towards the handle 60, the perception is of an initial resistance increasing to a peak force, followed by an "assist" as the central magnet 7902 passes through the central region 7920 of the annular magnet 7904 and the opposite direction repulsive force takes over. If a hard stop is properly placed (e.g., the protrusion 7906 "bottoms out" relative to the cavity 7908 by virtue of either the distal end of the protrusion 7906 contacting the base of the cavity 7908, the base region of the protrusion 7906 contacting the proximal surface surrounding the opening to the cavity 7908, and/or tapered surfaces of the protrusion 7906 and the cavity 7908 contacting each other), the repulsive force in region 8108 will hold the head assembly 20 against the handle 60, resulting in secure retention between the head assembly 20 and the handle 60.

The repulsive magnetic connection is the result of a feature of the interaction between magnetic field lines of the central magnet 7902 passing through a central region 7920 of an annular magnet 7904 (e.g., that there are field lines in the central region 7920 of the annular magnet 7904 that are directionally opposed to the field lines emanating from the face (e.g., flat face) between the ID and OD. As a result, as the central magnet 7902 approaches the ID of the annular magnet 7904 (FIG. 81A), even though the poles of the central magnet 7902 and annular magnet 7904 are orientated with opposite poles toward each other (which would cause an attractive magnetic force if there were no hole or central region 7920 in the annular magnet 7904), the annular magnet's field 8104 within the ID opposes the magnetic field 8102 of the central magnet 7902, causing a repulsive magnetic force. Again, it should be appreciated that the same effect may be created if the annular magnet 7904 is replaced by a plurality of discrete magnets arranged in a generally circular array.

Turning back to FIGS. 79 and 80, an optional helper magnet 7922 may be provided proximate to the base of the cavity 7908. The helper magnet 7922 may have poles aligned with respect to the central magnet 7902 to create an attractive magnetic force therebetween. The attractive magnetic force between the central magnet 7902 and the helper magnet 7922 may further increase the retention force between the head assembly 20 and the handle 60, while still retaining the unique "detent" feature which the user would experience during insertion of the head assembly 20 into the handle 60.

In the illustrated embodiment, the annular magnet 7904 and the cavity 7908 are part of the collar 7714, though it should be appreciated that this is not a limitation of the present disclosure unless specifically claimed as such. Additionally, it should be appreciated that while the head assembly 20 and the handle 60 are illustrated having a head protrusion 7906 received within a handle cavity 7908, this arrangement may be reversed (e.g., the head assembly 20 may include a head assembly cavity having the annular magnet 7904 and the handle 60 may include a handle protrusion having the central magnet 7902), and a person of ordinary skill in the art would understand any additional modifications necessary based on the instant disclosure.

The repulsive magnetic force between the central magnet 7902 and annular magnet 7904 may also be used to generate an ejection feature. More specifically, when the blade cartridge 22 is coupled to the handle 60 using the repulsive magnetic force between the central magnet 7902 and annular magnet 7904, the user may apply a removal/disassembly force to urge the blade cartridge 22 away from the handle 60. When a sufficient removal/disassembly force is applied to urge the central magnet 7902 through the central region 9314 of the annular magnet 7904, the repulsive force between the central magnet 7902 and annular magnet 7904 may urge/repel the blade cartridge 22 away from the handle 60, thereby creating an "ejection feature." In order for the disposable cartridge head assembly 20 to be ejected, an equal amount of force should be applied on either side of the base of the yoke 47 because the geometry between the protrusion of the handle 60 and the cavity of the base of the yoke 47 may prevent an accidental ejection of the head assembly 20 if removal/disassembly force is accidentally applied on only one side on the base of the yoke 47.

Turning now to FIG. 82, another embodiment of a magnetic connection between the head assembly 20 and the handle 60 is generally illustrated. The magnetic connection may be similar to the arrangement illustrated in FIGS. 79-80, except the optional helper magnet 7922 may be replaced with a floating/repulsion magnet 8202. In particular, the floating/repulsion magnet 8202 may have its poles reversed compared to the helper magnet 7922 so that it repels, rather than attracts, the central magnet 7902. The floating/repulsion magnet 8202 thereby causes the central magnet (and thus the head assembly 20) to balance (or hover or float) at a point between the annular magnet 7904 and the floating/repulsion magnet 8202. If a suitable gap or space 8404 is left between the mating surfaces of the head assembly 20 and the handle 60, the head assembly 20 will appear to float axially along axis 7914, while always returning to the balance point following deflection, thereby giving the razor system 10 a small shock absorbing effect. The head assembly 20 may therefore move axially within the space 8404 along axis 7914. It may be appreciated that as the central magnet 7902 is urged towards the floating/repulsion magnet 8202, the repulsive force therebetween increases as the central magnet 7902 and the floating/repulsion magnet 8202 get closer, until they touch at which point the perception is of a hard stop. This closely mimics the behavior of a compression spring which increases in resistive force with displacement until ultimately attaining solid height.

Similar to FIGS. 79-80, it should be appreciated that while the head assembly 20 and the handle 60 are illustrated having a head protrusion 7906 received within a handle cavity 7908, this arrangement may be reversed (e.g., the head assembly 20 may include a head assembly cavity having the annular magnet 7904 and floating/repulsion magnet 8202 and the handle 60 may include a handle protrusion having the central magnet 7902), and a person of ordinary skill in the art would understand any additional modifications necessary based on the instant disclosure. The space 8404 may optionally be covered with a resiliently deformable sock, gaiter, or the like. Additionally, it should be appreciated that the magnetic connection described herein may be used with any head assembly known to those skilled in the art including, but not limited to, any head assembly described herein.

Turning now to FIG. 83, another embodiment of a magnetic connection between the head assembly 20 and the handle 60 is generally illustrated. Similar to FIG. 82, the magnetic connection may include a floating feature, however, the floating/repulsion magnet 8202 of FIG. 82 may be omitted and instead, the balancing may be achieved by the relationship of the poles of the central magnet 7902 relative to the annular magnet 7904 (i.e., such that the poles of the central magnet 7902 are opposite the poles of the annular magnet 7904). The effect of the detent can still be achieved manually, although the resistance as the head assembly 20 approaches the handle 60 during insertion may be reduced compared to the arrangement illustrated in FIGS. 79-80. The balance point between the central magnet 7902 and the annular magnet 7904 occurs when the two magnets 7902, 7904 are coplanar or substantially coplanar; minor deflection in either direction along axis 7914 will be followed by a return to the balance point. For short deflections, the behavior is very similar to that of the arrangement illustrated in FIG. 82; however, the return force of FIG. 83 decreases with larger deflection (rather than increasing as in the arrangement of FIG. 82) since in the absence of the floating/repulsion magnet 8202, the only return force is generated by the attraction between the central magnet 7902 and the annular magnet 7904 which grow farther away with increasing deflection. It should be appreciated that the magnetic connection described herein may be used with any head assembly known to those skilled in the art including, but not limited to, any head assembly described herein.

Turning now to FIGS. 84-85, a blade cartridge connection mechanism for securing a blade cartridge 22 to a blade cartridge support member 24. In particular, FIGS. 84 and 85 generally illustrate a perspective view of the blade cartridge 22 and blade cartridge support member 24 in an unassembled and an assembled state, respectively, while FIGS. 86 and 87 generally illustrate a cross-sectional side view of the blade cartridge 22 and blade cartridge support member 24 in an unassembled and an assembled state, respectively.

The blade cartridge 22 may include any blade cartridge known to those skilled in the art including, but not limited to, any blade cartridge 22 described herein. The head assembly 20 may optionally include any resistive pivot mechanism described herein such as, but not limited to, a magnetic resistive pivot mechanism. As shown, blade cartridge support member 24 comprises a generally U-shaped cartridge support frame 26 having two generally curved support arms 30 (a generally C-shape or L-shape); however, it should be appreciated that this is not a limitation of the present disclosure unless specifically claimed as such.

The blade cartridge 22 may include a frame 188 (which may be either one piece or multi-piece such as, but not limited to, a clam-shell design) having one or more pivot pin/cylinder 34 extending outwardly from the lateral edges of the frame 188 (e.g., a single pivot pin/cylinder 34 that extends across the entire frame 188 or a first and a second pivot pin/cylinder 34 extending outwardly from a first and a second lateral edge of the frame 188, respectively). One or more portions (e.g., distal end regions) of the pivot pin/cylinder 34 may include one or more magnets and/or ferrous materials.

The blade cartridge support member 24 includes one or more pivot receptacles 32. For example, each support arm 30 may include a pivot receptacle 32. At least one of the pivot receptacles 32 may include a receiving pocket or cavity 8602 (best seen in FIG. 86) configured to receive at least a portion of the pivot pin/cylinder 34 located on one of the opposing lateral sides of the blade cartridge 22 (e.g., as generally illustrated in FIGS. 85 and 87).

With reference again to FIG. 86, the pocket or cavity 8602 may include an open end 8604 through which the pivot pin/cylinder 34 may be received into the pocket or cavity 8602. The pocket or cavity 8602 may also include tapered entry and/or tapered sidewalls to facilitate entry of the pivot pin/cylinder 34 into the pocket or cavity 8602. According to one embodiment, the pivot receptacle 32 includes one or more blade cartridge pivot and retention magnets 8606 (e.g., one or more permanent magnets and/or electromagnets) configured to create an attractive magnetic force with the pivot pin/cylinder 34 received therein. For example, the pivot pin/cylinder 34 may include a ferrous material that is magnetically attracted to the blade cartridge pivot and retention magnets 8606, thereby mounting, securing, and/or otherwise coupling the blade cartridge 22 to the blade cartridge support member 24. Alternatively (or in addition), the pivot pin/cylinder 34 may include a magnet having its poles align such that it is magnetically attracted to the blade cartridge pivot and retention magnets 8606, thereby mounting, securing, and/or otherwise coupling the blade cartridge 22 to the blade cartridge support member 24. In either case, the blade cartridge 22 may rotate about the pivot axis PA relative to the blade cartridge support member 24 at any angle, up to and including 360° degrees.

In practice, the user may position the unassembled blade cartridge 22 proximate to the opening 8604 of the pocket or cavity 8602 until the magnetic attraction generated between the pivot pin/cylinder 34 and the pocket or cavity 8602 (by the one or more blade cartridge pivot and retention magnets 8606) causes the pivot pin/cylinder 34 (and therefore the blade cartridge 22) to attach to the pocket or cavity 8602 of the pivot receptacle 32. Likewise, the user may dispose (e.g., remove) the blade cartridge 22 from the pivot receptacle 32 by manually (or using a tool) pry or dislodge the pivot pin/cylinder 34 (and therefore the blade cartridge 22) from the pocket or cavity 8602 of the pivot receptacle 32.

It should be appreciated that while the pivot receptacle 32 is illustrated having one or more blade cartridge pivot and retention magnets 8606, the blade cartridge pivot and retention magnets 8606 may optionally be disposed in only one or more of the pivot pin/cylinders 34. In such an arrangement, the pivot receptacle 32 may include a ferrous material that is magnetically attracted to the blade cartridge pivot and retention magnets 8606 of the pivot pin/cylinder 34.

It should also be appreciated that while each arm 30 of the blade cartridge support member 24 is shown having a pivot receptacle 32 including one or more blade cartridge pivot and retention magnets 8606, only one arm 30 may include the pivot receptacle 32 having one or more blade cartridge pivot and retention magnets 8606

Moreover, the location of one or more of the pivot receptacles 32 and the pivot pins 34 may be switched (e.g., one or more of the pivot receptacles 32 may be located in the blade cartridge 22 and one or more of the pivot pins/cylinders 34 may extend outwardly from the support arms 30 of the blade cartridge support member 24).

Additionally, while the blade cartridge 22 is shown being releasably coupled to the handle 60, the blade cartridge support member 24 and the handle 60 may optionally be an integral, unitary or one-piece construction.

Turning now to FIGS. 88-92, any one of the embodiments described herein with respect to FIGS. 84-87 may optionally include one or more blade cartridge retentioners 8802. The blade cartridge retentioners 8802 may be configured to reduce and/or prevent accidental removal/ejection of the blade cartridge 22 from the blade cartridge support member 24. According to one embodiment, (as illustrated in FIGS. 88-89), the blade cartridge retentioners 8802 may include one or more biasing devices such as, but not limited to, a spring clip and/or resiliently deformable protrusion 8804. The blade cartridge retentioners 8802 may extend outward from a portion of the cavity 8602, e.g., proximate to the opening thereof. In practice, the user may insert the pivot pin/cylinder 34 into the cavity 8602. As the pivot pin/cylinder 34 is inserted into the cavity 8602, the blade cartridge retentioners 8802 may be resiliently deformed, deflected, and/or moved out of the way until the pivot pin/cylinder 34 passes by the blade cartridge retentioners 8802 and the pivot pin/cylinder 34 is seated within the cavity 8602. Once seated/received in the cavity 8602 (as generally illustrated in FIG. 89), the blade cartridge retentioners 8802 may generally prevent the pivot pin/cylinder 34 from moving out of engagement with the cavity 8602 unless a sufficiently large force is exerted to deform, deflect, and/or move the blade cartridge retentioners 8802 out of the way.

Alternatively (or in addition), the blade cartridge retentioners 8802 may include one or more biasing devices such as, but not limited to, a detent, resiliently deformable pawl, lever, or the like 9002 as generally illustrated in FIGS. 90-92. For example, the lever 9002 may be spring biased (spring not visible) and may include an engagement portion (e.g., an engagement ramp) 9004 configured to extend at least partially across an opening of the cavity 8602 when in a retention position (as generally illustrated in FIGS. 90-92), and to pivot about a pivot point 9006 such that the lever 9002 may be rotated out of the way and the pivot pin/cylinder 34 may enter and/or exit the cavity 8602. The lever 9002 may also include an actuation region 9008 (e.g., but not limited to, a raised portion) that allows the user to rotate the lever 9002 about the pivot 9006. As may therefore be appreciated, the lever 9002 may be biased to the engagement position.

Again, it should be appreciated that the arrangement of the cavity 8602 and the pivot pin/cylinder 34 with respect to the blade cartridge 22 and the blade cartridge support member 24 may be reversed, and as such the blade cartridge retentioners 8802 may be reversed. It should also be appreciated that the cartridge pivot and retention magnets 8606 may be eliminated.

Any of the magnets described herein may be either permanent magnets and/or electromagnets. It may also be appreciated that when an electromagnet is used, the current may be adjusted to selectively change the orientation of the resulting magnetic field. The magnets may include any type of magnet such as, but not limited to, rare-earth (lanthanide) magnets (including, but not limited to, neodymium magnets and samarium-cobalt magnets), single-molecule magnets, single-chain magnets, nano-structured magnets, Alnico magnets, or the like. The magnets may include magnetic coverings and/or layers. For example, the magnets may include magnetically doped materials such as, but not limited to, magnetic paint, magnetic polymers, magnetic ceramics, magnetic composites, and/or the like.

The razor blades 142 of the head assembly 20 may be front and/or rear loaded during assembly of the head assembly 20.

Previous embodiments herein describe an axially magnetized disc as it passes through an axially magnetized ring, with the poles of the two magnets facing in the same direction. For example (and without limitation), some embodiments as illustrated in FIGS. 79-82 generally include a ring or annular magnet 7904 affixed to the handle 60 of a razor and the disc or central magnet 7902 affixed to the blade cartridge 22, which produces an effect similar to that of a traditional mechanical detent as the cartridge was being installed on the razor handle. As may be appreciated based on the present disclosure, the magnetic detent, or snap effect remains the same regardless of which element (handle 60 or blade cartridge 22) contains the ring or annular magnet 7704 and which element contains the disc or central magnet 7902; and furthermore, that this effect could be obtained with mating features (e.g., protrusion 7906 and/or cavity 7908) of any suitable shapes or orientation (e.g., protrusion 7906 extending from the handle 60 and cavity 7908 formed in the blade cartridge 22).

Moreover, as described previously herein, two magnets with like poles facing each other can be used to replace the mechanism that traditionally returns the cartridge head to its initial starting position (ISP) after it has been deflected during a shaving stroke.

Turning now to FIGS. 93-96, another embodiment of a resistive pivot mechanism and/or a connection mechanism for coupling blade cartridge to the handle is generally illustrated. In the illustrated embodiment, the handle 60 includes a handle protrusion, projection, or post 9302 that is sized and shaped to be at least partially received within a support member cavity 9304 form in the blade cartridge support member 24, e.g., a portion of the yoke or yoke region 47 that generally locates the position of the disposable head assembly 20 (e.g., the blade cartridge support member 24) relative to the handle 60 (e.g., generally prevents side to side motion). In the illustrated embodiment, the handle post 9302 has a generally cylindrical shape and the support member cavity 9304 has a generally tubular shape having an interior diameter that generally corresponds to the outer diameter of the handle post 9302 to generally prevent relative movement between the handle 60 and the blade cartridge support member 24. Optionally, the handle post 9302 may include one or more locking features 9306 that engages a one or more corresponding locking features 9308 of the support member cavity 9304 to generally limit and/or prevent rotation of the blade cartridge support member 24 in the direction generally illustrated by arrow 9310). For example, the locking features 9306, 9308 may engage each other in a lock-and-key type arrangement that generally prevents rotation. In one embodiment, the locking feature 9306 may include a protrusion and the locking feature 9308 may include a cavity having a size and shape generally corresponding size and shape of the protrusion (though it should be appreciated that the arrangement of the protrusion and cavity may be switched). Alternatively (or in addition), the handle post 9302 and the support member cavity 9304 may have a non-circular cross-section such that the inner surface of the blade cartridge cavity 9304 engages the outer surface of the handle post 9302 to prevent rotation therebetween.

The handle post 9302 may include one or more disc or central magnets 9312 that at least partially pass through a central region 9314 of one or more ring or annular magnets 9316 coupled to the blade cartridge support member 24 (e.g., the support member cavity 9304 and/or a central portion of the yoke region 47) as generally illustrated in FIGS. 94 and 95. As may be seen, the support member cavity 9304 and the central region 9314 of the annular magnet 9316 may be substantially concentric. According to one embodiment, the blade cartridge support member 24 may optionally include a turret 9320 that extends outwardly generally towards the blade cartridge 22. A distal portion of the central magnet 9312 may be substantially coplanar with an opening or inner face of the turret 9320 or may extend through the opening.

As described herein (see, e.g., FIGS. 79-82 and the corresponding description), the poles of the central magnet 9312 and the annular magnet 9316 are aligned such that a repulsive magnetic force is generated between the magnets 9312, 9316 thereby urging the blade cartridge support member 24 and the handle 60 together. The combination of the repulsive magnetic force and the interaction of the handle post 9302 with the support member cavity 9304 (and optionally the locking features 9306, 9308 and/or non-circular cross-sections) may generally secure and/or fix the blade cartridge support member 24 and the handle 60 with respect to each other, thus forming a connection therebetween.

The blade cartridge 22 may be pivotably coupled to one or more arms 30 of the blade cartridge support member 24 and may include one or more razor blades 9322 disposed on one or more faces 9324. In the illustrated embodiment, the blade cartridge 22 includes a plurality of razor blades 9322 on a first face 9324. The opposing face 9326 may include one or more cartridge magnets 9318. While the cartridge magnet 9318 is shown in the middle of the opposing face 9326, it should be appreciated that one or more cartridge magnets 9318 may be disposed anywhere on the face 9326.

The cartridge magnet 9318 has its pole aligned with the central magnet 9312 to generate a repulsive magnetic force when the blade cartridge support member 24 is coupled to the handle 60 (e.g., as generally illustrated in FIGS. 94 and 95). The repulsive magnetic force may generally urge the blade cartridge 22 away from the yoke 47 and/or handle 60, for example, as generally illustrated by arrow 9402. The blade cartridge support member 24 and/or blade cartridge 22 may include one or more IPS protrusions, shoulders, ridge, and/or extensions 9328 that sets the Initial Starting Position (ISP) of the blade cartridge 22 relative to the blade cartridge support member 24 and the handle 60. As may be appreciated, the ISP is the position of the blade cartridge 22 relative to the blade cartridge support member 24 and the handle 60 when no force is applied and the position that the blade cartridge 22 returns to after an external force has been removed. Put another way, when an external force is applied to the blade cartridge 22 during shaving, the external force may overcome the repulsive magnetic force between the cartridge magnet 9318 and the central magnet 9312 such that the blade cartridge 22 moves in a direction generally opposite to arrow 9402. When the external force is removed and/or reduced, the repulsive magnetic force between the cartridge magnet 9318 and the central magnet 9312 urges the blade cartridge 22 back towards the IPS. The ISP protrusion 9328 thus sets the initial starting position of the blade cartridge 22 relative to the blade cartridge support member 24 and limits the rotation of the blade cartridge 22 in the direction of arrow 9402 and/or may also limit/prevent the over rotation of the blade cartridge 22 during a shaving stroke.

In the illustrated embodiment, the ISP protrusion 9328 may extend outward from either the blade cartridge support member 24 a sufficient distance to engage (e.g., directly contact) the blade cartridge 22 and prevent the blade cartridge 22 from rotating about the pivot axis PA any further. For example, the ISP protrusion 9328 may be located on the inside of one or more of the yoke arms 30 below the pivot axis PA (e.g., proximate to the yoke 47), though as mentioned, this is not a limitation of the present disclosure unless specifically claimed as such. Alternatively (or in addition), the ISP protrusion 9328 may extend outward from either the blade cartridge 22 a sufficient distance to engage (e.g., directly contact) the blade cartridge support member 24 and prevent the blade cartridge 22 from rotating about the pivot axis PA any further. The ISP protrusion 9328 therefore sets or defines the 0 position of the blade cartridge 22. The blade cartridge 22 may rotate about the pivot axis PA within a predefined rotation range. For example, the predefined rotation range may be up to 100 degrees, for example, less than 90 degrees or less than 45 degrees. The rotation of the blade cartridge 22 in the direction generally opposite to arrow 9402 (e.g., the deflection direction) may also be limited by ISP protrusion 9328 and/or another protrusion, shoulder, ridge, and/or extension (e.g., a maximum deflection point (MDP) projection) that extends from either the blade cartridge 22 and/or the blade cartridge support member 24. The rotation limit in the deflection direction is referred to as the maximum deflection point (MDP). The ISP protrusion 9328 may therefore function as both an ISP protrusion and a MDP protrusion. This embodiment offers the advantage of generating a return force over a greater range of angular displacement relative to a spring—exceeding 90 degrees, given appropriate adjustments to the surrounding geometrical constraints. In order to minimize the number of magnets in the assembly, the annular magnet 9316 is affixed to the blade cartridge support member 24 and the central magnet 9312 is affixed to the handle 60. The annular magnet 9316, in turn, is then used to repel one or more cartridge magnets 9318 placed on the back side 9326 of the blade cartridge 22, thus performing two functions.

Because the central magnet 9312 and annular magnet 9316 are oriented with their poles facing in the same direction (see cross-section of the assembled unit in FIG. 95), a small return force (e.g., urging the blade cartridge 22 in the direction of arrow 9402) is present even when the disposable head assembly 20 is not coupled to the handle 60, as the annular magnet 9316 repels the cartridge magnet 9318 on the back face 9326 of the blade cartridge 22. However, upon installation, the force generated by the combination of the central magnet 9312 and/or annular magnet 9316 is much greater and closely simulates that of a compression spring, serving to return the blade cartridge 22 to its ISP.

Additional retention force (supplemental to that created by the magnetic detent/coupling effect between the central magnet 9312 and annular magnet 9316), which may serve to make the blade cartridge support member 24 and therefore the blade cartridge 22 more difficult to accidentally pull or knock off of the handle 60, may be created in several ways. One possible method of increasing retention force includes the addition of a helper ring magnet inside the handle 60. The helper magnet may be axially magnetized and oriented in the same direction as the annular magnet 9316 in the blade cartridge support member 24, placed at the base of the handle post 9302 that contains the central magnet 9312. Thus, when the blade cartridge support member 24 is installed onto the handle 60, the helper magnet would present the opposite pole to the closest face of the approaching annular magnet 9316 in the blade cartridge support member 24, generating a pulling force on the blade cartridge support member 24 and serving to increase the forces of attachment (during installation) and retention (after installation). Another possible configuration for increasing retention force includes a compliant ring 9330 in the support member cavity 9304, with an inside diameter slightly smaller than the outside diameter of the handle post 9302, positioned such that the compliant ring 9330 grips a portion of the handle post 9302 (e.g., but not limited to, the distal tip) when it was fully inserted into the support member cavity 9304. Additionally (or alternatively), one or more of the locking features 9306, 9308 may include a compliant receiving receptacle that engages the corresponding locking feature on the opposite component (e.g., but not limited to, a compliant receiving receptacle 9308 on the yoke 47 that would be engaged by the opposing locking feature 9306 located on the handle 60). The protrusion 9306 on the handle post 9302 may engage the sides of the compliant receptacle 9308 to increase the retention force. This may be achieved with an elastomeric compliance ring (or the like) positioned either on the protrusion or the receptacle. These configurations may not increase the attachment force, but the friction generated through deflection of the compliant material due to interference with the post tip or yoke receptacle may serve as an additional impediment to the blade cartridge support member 24 being accidentally dislodged from the handle 60 once it was installed.

The use of the magnetic detent/coupling system does not restrict the configuration of returning the blade cartridge 22 to its ISP to the use of the detent-generating magnets. Any one of embodiments described herein may be used, including but not limited to mechanical means such as a resiliently-deformable pawl (RDP) or other magnetic configurations such as, but not limited to, the magnetic configuration illustrated in FIG. 96. For example, one or more arm magnets 9602 may be mounted to one or more of the arms 30 (e.g., a pair that faces each other) and the blade cartridge 22 may include one or more blade cartridge magnets 9604 having their axes parallel to the pivot axis PA of rotation of the blade cartridge 22. The arm magnet 9602 may be attracted to a central/middle blade cartridge magnet 9604 in the blade cartridge 22 due to their opposite poles being oriented facing each other. According to one embodiment, adjacent blade cartridge magnets 9604*b*, 9604*c* in the blade cartridge 22 may be arranged on one or more sides of a middle blade cartridge magnet 9604*a* with the like poles facing the arm magnet 9602. Thus, the blade cartridge 22 tends to come to rest with the center/middle blade cartridge magnet 9604*a* coaxial to the arm magnet 9602, which determines the ISP. If the blade cartridge 22 is displaced (e.g., rotated) around the pivot axis PA, a resistive torque is experienced due to the combination of attraction to the center/middle blade cartridge magnet 9604*a* and repulsion by the outer blade cartridge magnets 9604*b*, 9604*c*, and when the blade cartridge 22 is released it returns to its ISP. For small displacements, this action also simulates that of a spring. Displacement is limited by a hard stop/ISP protrusion 9328 as generally illustrated in FIG. 97. Depending upon the position of the hard stop ISP protrusion 9328, one or more of the outer blade cartridge magnets 9604*b*, 9604*c* may be redundant (i.e. if the maximum rotation in the direction of one or more of the outer blade cartridge magnets 9604*b*, 9604*c* is very small, its influence will be negligible compared to that of the attractive center/middle blade cartridge magnet 9604*a* and it will not be needed to return the blade cartridge 22 to its ISP). It should be appreciated that the magnet array arrangement may be used in one or both arms 30. It should also be appreciated that the arrangement of the blade cartridge magnets 9604*a*-9604*c* may be replaced with one or more programmable magnets having multiple poles and/or nano-structured magnets having a plurality areas programmed to provide the various poles described herein.

Turning now to FIGS. 98-104, various embodiments of two or more diametrically magnetized (DM) ring and/or disc magnets for coupling two components (e.g., razor handle/cartridge and/or cartridge yoke/cartridge head) are described wherein the two components are securely fixed to each other (e.g., do not separate) but can move, in certain prescribed and limited ways, relative to each other while tending to return to a predetermined rest position; and optionally can be separated manually when sufficient force is applied, for example during replacement of a used razor cartridge with a new one.

With reference to FIGS. 98-100, a first embodiment is illustrated generally illustrated. For example, FIG. 98 generally illustrates the head assembly 20 and the handle 60 in an unassembled state, FIG. 99 generally illustrates the head assembly 20 and the handle 60 in an assembled state in the ISP, and FIG. 100 generally illustrates the head assembly 20 and the handle 60 in a deflected position relative to the ISP.

In particular, one or more handle DM magnets 9802 are permanently and fixedly coupled, secured, and/or otherwise mounted to distal end 9804 of the handle 60 and one or more blade cartridge support member DM magnets 9806 are permanently and fixedly coupled, secured, and/or otherwise mounted to a portion of the blade cartridge support member 24 (e.g., but not limited to, the yoke 47). In the illustrated embodiment, a single handle DM magnet 9802 and a single blade cartridge support member DM magnet 9806 are illustrated; however, it should be appreciated that the handle 60 and/or the blade cartridge support member 24 may include a plurality of DM magnets 9802, 9806. The handle DM magnet 9802 is also illustrated being at least partially received within a handle cavity 9820, while the support member DM magnet 9806 is illustrated partially extending beyond a rear mating face of the blade cartridge support member 24, though it should be appreciated that the cavity 9820 may be formed in the blade cartridge support member 24 and the arrangement may therefore be reversed.

Additionally, the handle DM magnet 9802 and the blade cartridge support member DM magnets 9806 are illustrated as ring magnets. The ring magnet configuration may aid in preventing the DM magnets 9802, 9806 from rotating within their respective components (e.g. handle 60 and blade cartridge support member 24). For example, the central regions 9808, 9810 of the DM ring magnets 9802, 9806 may have non-circular shaped that may be coupled to and/or overmolded with components 60, 24 (e.g. handle 60 and blade cartridge support member 24), to prevent rotation of the DM ring magnets 9802, 9806. It should be appreciated, however, that one or more of these DM magnets 9802, 9806 may be DM disc magnets with no central hole. The DM disc magnets 9802, 9806 may optionally include a non-cylindrical post or an offset post extending outwardly from one or more of the planar faces of the DM disc magnets 9802, 9806 that may also prevent rotation. Additionally (or alternatively), a portion of either the DM disc or ring magnets 9802, 9806 may be noncircular (e.g., the disc or ring may have a generally oblong or oval shape) to prevent rotation of the magnets 9802, 9806 relative to handle 60 and blade cartridge support member 24, respectively.

The handle 60 may be described as having a top surface 9801, a bottom surface 9803, and a right and left surface 9805, 9807 when viewed from the perspective in FIG. 98. The handle DM magnet 9802 may be described as having a first and a second planar face 9809, 9811 and an outer circumferential surface 9813 extending therebetween. The handle DM magnet 9802 may secured to the handle 60 such that the planar faces 9809, 9811 are aligned generally parallel to a longitudinal axis L of the handle and generally perpendicular to the top and bottom surfaces 9801, 9803 and generally parallel to the right and left surfaces 9805, 9807.

The DM magnets 9802, 9806 are mounted to the handle 60/blade cartridge support member 24 such that, when the handle 60 and blade cartridge support member 24 are brought close to each other during the process of installing the disposable head assembly 20 to the handle 60, the opposite poles of the DM magnets 9802, 9806 attract and complete the attachment procedure. According to one embodiment, the DM magnets 9802, 9806 generally tangentially contact each other. The DM magnets 9802, 9806, when positioned tangent to each other, will always seek out the position at which the two opposite poles are in contact. This position will be referred to as the predetermined rest position or initial starting position (ISP). In this embodiment, the two DM magnets 9802, 9806 are installed such that in the predetermined rest position or ISP, the handle 60 and blade cartridge support member 24 are aligned in a straight line (as on a traditional razor).

The distal region 9804 of the handle 60 adjacent/proximate to the handle DM magnet 9802 and the proximal region 9812 of the blade cartridge support member 24 adjacent/proximate to the blade cartridge support member DM magnet 9806 may define a handle interface region 9814 and a support member interface region 9816, respectively. The interface regions 9814, 9816 may have a shape and contour to allow for limited rotational longitudinal motion of the handle 60 and blade cartridge support member 24 relative to one another. The DM magnets 9802, 9806 will allow this motion to occur, but provide noticeable resistance, mimicking the behavior of a spring. In fact the DM magnets 9802, 9806 remain tangent to each other throughout the motion as the contact point between them moves farther away from the poles, so that their behavior resembles that of a pair of gears (i.e. each DM magnet 9802, 9806 not only rotates on its own axis but also "orbits" about the axis of the opposite magnet). Such a displacement, in this case a longitudinal motion (e.g., in a plane extending generally parallel to the longitudinal axis L of the handle 60 and generally perpendicular to the top and bottom surfaces 9801, 9803) is illustrated in FIG. 100. The rotation of the blade cartridge support member 24 relative to the handle 60 in either direction may be set and/or limited by the contours of the interfaces 9814, 9816.

When the handle 60 and blade cartridge support member 24 are released, the DM magnets 9802, 9806 act to reposition themselves relative to each other at the predetermined rest position or ISP, which in turn returns and/or urges the blade cartridge 22 to its original alignment with respect to the handle 60. This feature can be useful for hard to reach shaving areas by manually holding the blade cartridge support member 24 (e.g., yoke 47) and blade cartridge 22 in an angled forward position with a finger. The angle can be easily adjusted depending on the force applied to the blade cartridge support member 24 and blade cartridge 22.

Turning now to FIGS. 101-102, another embodiment utilizing DM magnets is generally illustrated. The arrangement may be similar to the embodiment in FIGS. 98-100, but may also include one or more locking 10102 magnets. The locking magnet 10102 may include, but is not limited to, a DM ring or cylindrical magnets 10102. The locking magnet 10102 may be coupled, secured, or otherwise mounted to handle 60 in a fixed location and orientation relative to the DM handle magnet 9802. When properly oriented, the locking magnet 10102 has the effect of attracting and retaining the blade cartridge support member DM magnet 9806 when the blade cartridge support member 24/blade cartridge 22 is subjected to a sufficient angular displacement to bring the locking magnet 10102 and the blade cartridge support member DM magnet 9806 into close proximity to each other, such that the blade cartridge support member 24/blade cartridge 22 remains in the displaced position when it is released as generally illustrated in FIG. 102. Because the original predetermined rest position (PRP) or ISP shown in FIG. 101, with DM magnets 9802, 9806 aligned with opposite poles adjacent to each other, remains, the result is the existence of two possible conditions, selectable by the user, in which the blade cartridge support member 24/blade cartridge 22 can be either at rest in its predetermined rest position with a spring-like return feature responding to small angular displacements (FIG. 101); or at rest in the displaced position and securely held in place (FIG. 102).

Optionally, a retraction mechanism may be provided to retract the locking magnet 10102 into the handle 60 when it is not being used to affix the blade cartridge support member 24/blade cartridge 22 in the flexed/displaced position. The retraction mechanism allows the locking magnet 10102 to be concealed when the blade cartridge support member 24/blade cartridge 22 is in its predetermined rest position or ISP, so that it would not adversely impact the feel of the razor handle 60 in the user's hand and/or collect debris. The retraction mechanism may include any arrangement for retracting the locking magnet 10102 such as, but not limited to, a manual lever wherein the user would need to deploy the third magnet before moving the cartridge into the flexed position, or with a properly sized gear train that would automatically position the locking magnet 10102 at the same time as the support member 24/blade cartridge 22 was being moved from its predetermined rest position/ISP to its flexed/displaced position.

While the blade cartridge 22 is illustrated having razors on only a single side, it should be appreciated that the blade cartridge 22 may be double-sided.

The attachment of the blade cartridge 22 to the blade cartridge support member 24 and the limitation and control of the rotation of the blade cartridge 22 within the blade cartridge support member 24 may be accomplished in any number of ways that have been described herein, including but not limited to, mechanical means such as a physical axle feature and a RDP (resiliently deformable pawl) or magnetic arrangements such as alternating attracting/repelling magnets, multi-pole or programmable magnets or the like. In the illustrated embodiments, a single-sided blade cartridge 22 whose ISP is determined by a pair of repelling magnets, one located on the back of the blade cartridge 22 and the other on the leading edge of the center web of the blade cartridge support member 24/yoke 47, has been shown; however, this is not a limitation of present disclosure unless specifically claimed as such.

Additionally, it should be noted that the blade cartridge DM magnet 9806 can also be used to generate the magnetic force (e.g., repel and/or attract) the blade cartridge magnets 11410 (see, e.g., the blade cartridge magnets 11410 in FIGS. 145-147). As such, the DM magnet 9806 may be used to generate the magnetic force in addition to, or in replace of, the blade cartridge support member magnets 11412.

Turning now to FIGS. 103-105, a further embodiment utilizing DM magnets is generally illustrated. Rather than having a handle DM magnet 9802 and a blade cartridge support member DM magnet 9806 as described above, one or more of the arms 30 may include an arm DM magnet 10302 and one or more of the lateral ends 10304 of the blade cartridge 22 may include corresponding blade cartridge DM magnets 10306. The primary responsibilities of the DM magnets 10302, 10306 are to keep the blade cartridge 22 attached to the blade cartridge support member 24/arms 30 and allow it to deflect upward during a shaving stroke as generally illustrated in FIG. 105. The blade cartridge DM magnets 10306 may be exposed or could be disposed within an interior portion of the blade cartridge 22 so as not to protrude from the lateral ends 10304 of the blade cartridge 22. The ISP of the blade cartridge 22 may be established by the locations of the poles of the DM magnets 10302, 10306, and will occur at the angle at which the opposite poles of the DM magnets 10302, 10306 are adjacent to each other. Although the DM magnets 10302, 10306 also partially serve to return the cartridge head to its ISP when it has been subjected to an angular deflection (similar to the way they return the cartridge to its predetermined rest position in the embodiments described above), this function may also be performed by a repelling pair of magnets 10308, 10310 in the blade cartridge support member 24 and blade cartridge 22, respectively. In one embodiment, the blade cartridge support member 24 may remain part of the handle 60 and the blade cartridge 22 may be removed. Alternatively, the blade cartridge 22 and blade cartridge support member 24 may be considered an assembly in which case the blade cartridge support member 24 may be removably coupled to the handle 60 using any arrangement described herein, including but not limited to, a modified twist-lock-eject system utilizing a diametrically magnetized ring and disc pair.

Two or more DM magnets (e.g., but not limited to, ring and/or disc DM magnets) may be utilized to achieve attachment between two components (such as, but not limited to, a razor handle 60 and a blade cartridge 22) such that the two components are securely fixed to each other but can move, in certain prescribed and limited ways, relative to each other while tending to return to a predetermined rest position; and can be separated manually when sufficient force is applied, for example during replacement of a used razor cartridge with a new one.

With reference to FIGS. 106-108, one embodiment of two or more DM magnets that allows lateral movement of the blade cartridge support member 24/blade cartridge 22 relative to the handle 60 is generally illustrated. In particular, one or more handle DM magnets 10602 are permanently and fixedly coupled, secured, and/or otherwise mounted to distal end 9804 of the handle 60 and one or more blade cartridge support member DM magnets 10606 are permanently and fixedly coupled, secured, and/or otherwise mounted to a portion of the blade cartridge support member 24 (e.g., but not limited to, the yoke 47). In the illustrated embodiment, a single handle DM magnet 10602 and a single blade cartridge support member DM magnet 10606 are illustrated; however, it should be appreciated that the handle 60 and/or the blade cartridge support member 24 may include a plurality of DM magnets 10602, 10606. The blade cartridge support member DM magnet 10606 is also illustrated being at least partially received within a blade cartridge support member cavity 10620 formed in the blade cartridge support member 24, while the handle DM magnet 10602 is illustrated partially extending beyond a distal end 9804 of the handle 60, though it should be appreciated that the cavity 10620 may be formed in the handle 60 and the arrangement may therefore be reversed.

Additionally, the handle DM magnet 10602 and the support member DM magnet 10606 are illustrated as ring magnets. The ring magnet configuration may aid in preventing the DM magnets 10602, 10606 from rotating within their respective components (e.g., handle 60 and blade cartridge support member 24). For example, the central regions 10608, 10610 of the DM ring magnets 10602, 10606 may have non-circular shape that may be coupled to and/or overmolded with the handle 60, blade cartridge support member 24 to prevent rotation of the DM ring magnets 10602, 10606. It should be appreciated, however, that one or more of these DM magnets 10602, 10606 may be DM disc magnets with no central hole. The DM disc magnets 10602, 10606 may optionally include a non-cylindrical post or an offset post extending outwardly from one or more of the planar faces of the DM disc magnets 10602, 10606 that may also prevent rotation. Additionally (or alternatively), a portion of either the DM disc or ring magnets 10602, 10606 may be noncircular (e.g., the disc or ring may have a generally oblong or oval shape) to prevent rotation.

The handle 60 may be described as having a top surface 9801, a bottom surface 9803, and a right and left surface 9805, 9807 when viewed from the perspective in FIG. 106. The handle DM magnet 10602 may be described as having a first and a second planar face 10609, 10611 and an outer circumferential surface 10613 extending therebetween. The handle DM magnet 10602 may secured to the handle 60 such that the planar faces 10609, 10611 are aligned generally parallel to the longitudinal axis L of the handle 60 and generally perpendicular to right and left surfaces 9805, 9807 and generally parallel to the top and bottom surfaces 9801, 9803. The lateral movement of the blade cartridge support member 24/blade cartridge 22 relative to the handle 60 therefore corresponds to motion in a plane extending generally parallel to the longitudinal axis L of the handle 60 and generally perpendicular to the right and left surfaces 9805, 9807 (e.g., from side-to-side).

The DM magnets 10602, 10606 are mounted to the handle 60/blade cartridge support member 24 such that, when the handle 60 and blade cartridge support member 24 are brought close to each other during the process of installing the disposable head assembly 20 to the handle the opposite poles of the DM magnets 10602, 10606 attract and complete the attachment procedure. According to one embodiment, the DM magnets 10602, 10606 generally tangentially contact each other. The DM magnets 10602, 10606, when positioned tangent to each other, will always seek out the position at which the two opposite poles are in contact. This position will be referred to as the predetermined rest position or initial starting position (ISP). In this embodiment, the two DM magnets 10602, 10606 are installed such that in the predetermined rest position or ISP, the handle 60 and support member 24 are aligned in a straight line (as on a traditional razor).

The distal region 9804 of the handle 60 adjacent/proximate to the handle DM magnet 10602 and the proximal region 9812 of the blade cartridge support member 24 adjacent/proximate to the support member DM magnet 10606 may define a handle interface region 9814 and a blade cartridge support member interface region 9816, respectively. The interface regions 9814, 9816 may have a shape and contour to allow for limited rotational lateral motion of the handle 60 and blade cartridge support member 24 relative to one another. The DM magnets 10602, 10606 will allow this motion to occur, but provide noticeable resistance, mimicking the behavior of a spring. In fact the DM magnets 10602, 10606 remain tangent to each other throughout the motion as the contact point between them moves farther away from the poles, so that their behavior resembles that of a pair of gears (i.e. each DM magnet 10602, 10606 not only rotates on its own axis but also "orbits" about the axis of the opposite magnet). Such a displacement, in this case a lateral motion (e.g., in a plane extending generally parallel to the longitudinal axis L of the handle 60 and generally perpendicular to the right and left surfaces 9805, 9807) is illustrated in FIG. 108. The rotation of the blade cartridge support member 24 relative to the handle 60 in either direction may be set and/or limited by the contours of the interfaces 9814, 9816.

When the handle 60 and blade cartridge support member 24 are released, the DM magnets 10602, 10606 act to reposition themselves relative to each other at the predetermined rest position or ISP, which in turn returns and/or urges the blade cartridge 22 to its original alignment with respect to the handle 60.

Additionally, it should be noted that the blade cartridge support member DM magnet 10606 can also be used to generate the magnetic force (e.g., repel and/or attract) the blade cartridge magnets 11410 (see, the e.g., the blade cartridge magnets 11410 in FIGS. 147-150). As such, the blade cartridge support member DM magnet 10606 may be used to generate the magnetic force in addition to, or in replace of, the blade cartridge support member magnets 11412. Turning now to FIGS. 109-110, another embodiment featuring two or more DM magnets is generally illustrated. This embodiment is similar to the embodiment described above with respect to FIGS. 106-108, however, the interfaces 9814, 9816 of the handle 60 and the blade cartridge support member 24 have a contour configured to allow not only lateral motion, but also to allow the blade cartridge support member 24/blade cartridge 22 to twist relative to the handle 6 about the longitudinal axis L approximately parallel to the handle 60 (e.g., in a direction generally illustrated by arrow 10902). Optionally, the twist motion may be limited by design due to the engagement of one or more protruding pins 10904 (e.g., but not limited to, a pin extending from the blade cartridge support member 24/yoke 47) that engages and/or is received within receptacle well/groove 10906 (e.g., on handle 60). It should be appreciated that the arrangement of the pin 10904 and groove 10906 may be switched. The pin 10904 and groove 10906 may be configured to limit the twist of the blade cartridge support member 24/blade cartridge 22 relative to the handle 60 to less than 360°, for example, less than 270° or less than 180°. The behavior when the two DM magnets 10602, 10606 are manipulated in this way is a result of the DM magnets 10602, 10606 being in tangential contact with each other. If the DM magnets 10602, 10606 are twisted relative to each other such that their axes are no longer parallel (as generally illustrated in FIG. 110), the DM magnets 10602, 10606 will tend to return to a position in which the axes are parallel because the DM magnets 10602, 10606 are drawn to have the maximum area of contact between them, which occurs when the axes are parallel.

Turning now to FIGS. 111-113, another embodiment featuring two or more DM magnets is generally illustrated. As best illustrated in FIGS. 111 and 112, one or more handle DM magnets 11102 are permanently and fixedly coupled, secured, and/or otherwise mounted to distal end 9804 of the handle 60 and one or more blade cartridge support member DM magnets 11106 are permanently and fixedly coupled, secured, and/or otherwise mounted to a portion of the blade cartridge support member 24 (e.g., but not limited to, the yoke 47). The DM magnets 11102, 11106 may include any size, shape, and/or configuration described herein.

In the illustrated embodiment, the DM magnets 11102, 11106 are aligned such that the planar faces 11109 (see, e.g., FIG. 112) are aligned generally parallel to the longitudinal axis L of the handle 60 (e.g., the longitudinal axis of the collar) and generally parallel to the top and bottom surface 9801, 9803 of the handle 60. The DM magnets 11102, 11106 are oriented concentrically with their poles 180 degrees opposite each other. This is the predetermined rest position due to the force attracting each pair of opposing poles to one another. One or more of the DM magnets 11102, 11106 may be at least partially received within a cavity and one or more of the DM magnets 11102, 11106 may partially extend outwardly from a portion of its respective component 60, 24 such that it may be received at least partially received in the cavity to align the DM magnets 11102, 11106 concentrically.

When the blade cartridge support member 24/blade cartridge 22 and handle 60 are rotated relative to each other around the shared axis of the DM magnets 11102, 11106, the poles of the DM magnets 11102, 11106 draw away from each other circumferentially, causing a torque to be applied as the DM magnets 11102, 11106 attempt to return the two components (e.g., handle 60 and blade cartridge support member 24) to the predetermined rest position. For small angular displacements such as that shown in FIG. 113, the DM magnets 11102, 11106 have a tendency to remain concentric throughout the displacement, such that a mechanical pivot feature is optional. For larger angular displacements this effect is reduced, and a mechanical pivot may be required. In such a case, ring DM magnets 11102, 11106 (as opposed to disc DM magnets 11102, 11106) would offer the advantage of a natural location for this mechanical pivot, i.e. a pin protruding from one component through the inside diameter of both magnets, acting as an axle. Attachment and detachment procedure for the handle 60 and the blade cartridge support member 24 may vary depending upon whether a mechanical pivot feature was present. In the absence of such a feature, the two DM magnets 11102, 11106 may approach each other either radially or axially and ultimately adopt the predetermined rest position naturally. If a mechanical pivot feature is present, the two DM magnets 11102, 11106 may need to be attached to each other via an axial motion.

As may be appreciated, any one or more of the DM magnets described in this embodiment, or any other embodiment, may be replaced with one or more programmable magnets (PMs) comprising multiple pole segments. The PMs may allow for multiple positions of stable equilibrium instead of just one, which would create the effect of indexing or detents as the blade cartridge support member 24 is rotated about the common axis of the magnets. The bs24 could thus be placed in any one of several positions for optimal shaving results. The number of possible positions, and thus the resolution of the magnetic detent system, would be limited only by the maximum number of pole segments that could be applied to the magnets.

Turning now to FIGS. 114-116, a further embodiment featuring two or more DM magnets is generally illustrated. This embodiment is similar to the embodiment described above with respect to FIGS. 106-108 in that two DM magnets 11402, 11406 are placed tangentially; however, in this case the blade cartridge support member DM magnets 11406 is constrained to rotate about an axis that is fixed relative to the handle 60, so it no longer rolls around the circumference of the handle DM magnet 11402. As illustrated in FIG. 114, this is accomplished through the use of a modified "ball and socket" design 11502 (best seen in FIG. 115) in which the motion of the blade cartridge support member 24 is constrained to a single plane. The blade cartridge support member DM magnets 11406, in the shape of a disc or ring, seats in a mating socket in the handle 60. Its predetermined rest position is a result of the tendency of the two DM magnets 11402, 11406 to align such that their opposing poles are as close as possible together. When a lateral rotation is applied as in FIG. 116, the user will experience resistance to the motion, and when the blade cartridge support member 24 is released, the blade cartridge support member 24 will resume its predetermined rest position with respect to the handle 60 as a result of the DM magnets 11402, 11406 re-aligning with each other.

The above-described embodiments are illustrated wherein the blade cartridge support member 24 would comprise a yoke and a blade cartridge 22, assembled such that the blade cartridge 22 can rotate relative to the yoke 47/arm 30 and return to a known location (the initial starting position, or ISP), though this is not a limitation of the present disclosure unless specifically claimed as such. The blade cartridge 22 may be single-sided, such that the axis of rotation exists close to one longitudinal edge of the blade cartridge 22 and the blade cartridge 22 rotation is limited (e.g. 90 degrees upward only); or it may be double-sided, such that the 114 axis of rotation exists at the geometric center of the blade cartridge 22 and the blade cartridge 22 can rotate a full 360 degrees, with two positions of stable equilibrium, selectable by the user and 180 degrees apart. The attachment of the blade cartridge 22 to the yoke 47/arm 30 and the limitation and control of the rotation of the blade cartridge 22 within the yoke 47/arm 30 could be accomplished in any number of ways that have been described herein, including but not limited to mechanical devices such as a physical axle feature and an RDP (resiliently deformable pawl) or magnetic configurations such as (but not limited to) alternating attracting/repelling magnets, multi-pole or programmable magnets or the like. While the embodiment has been illustrated using a single-sided blade cartridge whose ISP is determined by a pair of repelling magnets 11410, 11412, one 11410 located on the back 11409 of the blade cartridge 22 and the other 11412 on the leading edge of the center web of the yoke 47, this is for illustrative purposes only and that any configuration described herein may be used. It should be noted that the repelling magnet 11412 does not necessarily need to be a separate magnet in the assembly, but rather one of the magnets 11402, 11406 in the handle 60 or blade cartridge support member 24 connection can be utilized to generate the repulsive magnetic force with the magnet 11410 in the blade cartridge 22.

Turning now to FIGS. 117-120, multiple pairs of diametrically magnetized (DM) ring and/or disc magnets to achieve attachment between two components (e.g., but not limited to, a razor handle 60 and blade cartridge support member 24) such that the two components are securely fixed to each other but can rotate about multiple axes relative to each other while tending to return to a predetermined rest position; and can be separated manually when sufficient force is applied, for example during replacement of a used head assembly 20 with a new one.

As noted herein, DM cylindrical magnets, when allowed to be in close proximity with planar sides facing each other, will align themselves coaxially such that opposite poles are adjacent; and further. Additionally, if one DM magnet is displaced rotationally from its rest position relative to the other, it will return to its rest position in a manner that closely mimics the behavior of a spring.

Through the use of two or more set of pairs 1702, 1704 of DM magnets, the blade cartridge support member 24 may be rotated from a first position (as generally illustrated in FIG. 117), to a second position (as generally illustrated in FIG. 118) using a first of the pair 1702 of DM magnets, and ultimately to a third position (as generally illustrated in FIG. 118) using a second pair 1704 of the DM magnets. The first pair 11702 of DM magnets may for a yoke joint and the second pair 11704 of DM magnets may form a center joint.

In the illustrated embodiment, the yoke joint 11706 connects the blade cartridge support member 24/yoke 47 to a portion of an intermediate knuckle 11708. The blade cartridge support member 24/yoke 47 and a first portion of the intermediate knuckle 11708 each include one of at least one DM magnet 11710, 11712 of the first pair 11702 of DM magnets, respectively. The DM magnets 11710, 11712 tend to keep the blade cartridge support member 24 and intermediate knuckle 11708 assembled and in the predetermined rest position (as generally illustrated in FIG. 117), but the blade cartridge support member 24 can be twisted relative to the intermediate knuckle 11708 about the shared axis of the DM magnets 11710, 11712 in the direction generally of arrow 11714 by the user applying a torque to the blade cartridge support member 24. Upon release of the force, the tendency of the DM magnets 11710, 11712 to align with their poles adjacent will generate a torque which returns the blade cartridge support member 24 to its predetermined rest position relative to the intermediate knuckle 11708.

The center joint 11716 includes the second pair 11704 of DM magnets and connects the intermediate knuckle 11708 to the razor handle 60. A second portion of the intermediate knuckle 11708 and the handle 60 each include one of at least one DM magnet 11718, 11720 of the second pair 11704 of DM magnets, respectively. It should be appreciated that the intermediate knuckle 11708 may be considered part of the handle 60. For example, the intermediate knuckle 11708 and the portion of the handle 60 that includes the DM magnet 11720 may form a first and a second portion 11701, 11703 of the collar of the handle 60.

As with the yoke joint 11706, the DM magnets 11718, 11720 keep the portions 11701, 11703 assembled and in the predetermined rest position (as generally illustrated in FIG. 117) such that the position of the blade cartridge 22 relative to the handle 60 is similar to that of a traditional razor. The user may turn the blade cartridge support member 24/blade cartridge 22 downward or upward, but will experience spring-like resistance to this motion as a result of the tendency of the DM magnets 11718, 11720 to align with their poles adjacent, and upon release the blade cartridge 22 will return to its predetermined rest position.

For both the yoke and center joints 11706, 11716, given small angular displacements the DM magnets have a tendency to remain concentric throughout the displacement, such that a mechanical pivot feature is optional. For larger angular displacements this effect is reduced, and a mechanical pivot may be used. In such a case, DM ring magnets (as opposed to DM disc magnets) may offer the advantage of a natural location for this mechanical pivot, i.e. a pin protruding from one component through the inside diameter of both magnets, acting as an axle. Attachment and detachment procedure for the two parts would vary depending upon whether a mechanical pivot feature was present. In the absence of such a feature, the two DM magnets could approach each other either radially or axially and ultimately adopt the predetermined rest position naturally. If a mechanical pivot feature is present, the two DM magnets may need to be attached to each other via an axial motion.

Because of the tendency of the DM magnets in both joints 11706, 11716 to assume the predetermined rest position, if the user desires to utilize the razor 10 in a configuration that differs from the predetermined rest position (which is illustrated, for exemplary purposes only, to resemble the configuration of a traditional razor), a manner of locking the joints may be used. One possible system of locks would include two shaving modes, "Face Mode" and "Body Mode". In Face Mode, the center joint 11716 may be locked in its predetermined rest position but the yoke joint 11706 may be allowed to rotate to a limited degree. This mode is illustrated in FIG. 117. Body Mode (e.g., as generally illustrated in FIG. 119) may be adopted through rotating both joints 11706, 11716 90 degrees, so that the blade cartridge support member 24 rotation axis within the yoke 47 is parallel to the handle longitudinal axis L. Because the DM magnets in this condition would be attempting to return both joints 11706, 11716 to their predetermined rest position, mechanical locks may be used to keep both joints 11706, 11716 at the 90 degree position. The process of changing between Face Mode and Body Mode would involve two actions: 1) Rotating the center joint 11716 90 degrees as shown in FIG. 118 and 2) Rotating the yoke joint 11706 90 degrees (illustrated in FIG. 119), with the resulting configuration shown in FIG. 119. These two actions could be performed in either order. With reference to FIG. 120, the blade cartridge support member 24 may include one or more limiting protrusions 12002 that are s at least partially received within one or more limiting cavities or groves 12004 formed in the intermediate knuckle 11708 (e.g., portion 11701). Similarly, the handle 60 (e.g., portion 11703) may include one or more limiting protrusions 12006 that are s at least partially received within one or more limiting cavities or groves 12008 formed in the intermediate knuckle 11708 (e.g., portion 11701). Of course, the arrangement of the limiting protrusions 12002, 12006 and limiting grooves 12004, 12008 relative to the blade cartridge support member 24, intermediate knuckle 11708 (portion 11701), and/or handle 60 (portion 11703) may be reversed. The limiting protrusions 12002, 1206 and limiting grooves 12004, 12008 may restrict the movement of the yoke and center joints 11706, 11716 to a predefined range. As may be appreciated, the predefined range does not have to be symmetrical about the predetermined rest position. As such, the limiting protrusions 12002, 1206 and limiting grooves 12004, 12008 may allow, for example, 90 degrees of rotation in one direction and less than 20 degrees in the opposite direction (these values are just for illustrative purposes).

It should be appreciated that any one of the DM magnets may be replaced by one or more programmable magnets (PMs) comprising multiple pole segments. The result would be multiple positions of stable equilibrium instead of just one, which would create the effect of indexing or detents as the blade cartridge support member 24 is rotated about the common axis of the magnets. The blade cartridge support member 24 could thus be placed in any one of several positions for optimal shaving results. The number of possible positions, and thus the resolution of the magnetic detent system, would be limited only by the maximum number of pole segments that could be applied to the magnets.

The above-described embodiments are illustrated wherein the blade cartridge support member 24 would comprise a yoke and a blade cartridge 22, assembled such that the blade cartridge 22 can rotate relative to the yoke 47/arm 30 and return to a known location (the initial starting position, or ISP), though this is not a limitation of the present disclosure unless specifically claimed as such. The blade cartridge 22 may be single-sided, such that the axis of rotation exists close to one longitudinal edge of the blade cartridge 22 and the blade cartridge 22 rotation is limited (e.g. 90 degrees upward only); or it may be double-sided, such that the 114 axis of rotation exists at the geometric center of the blade cartridge 22 and the blade cartridge 22 can rotate a full 360 degrees, with two positions of stable equilibrium, selectable by the user and 180 degrees apart. The attachment of the blade cartridge 22 to the yoke 47/arm 30 and the limitation and control of the rotation of the blade cartridge 22 within the yoke 47/arm 30 could be accomplished in any number of ways that have been described herein, including but not limited to mechanical devices such as a physical axle feature and an RDP (resiliently deformable pawl) or magnetic configurations such as (but not limited to) alternating attracting/repelling magnets, multi-pole or programmable magnets or the like. For example (and without limitation), the blade cartridge 22 may include a double-sided cartridge head whose ISP is determined by a pair of multi-pole magnets, located concentrically to the blade cartridge's axis of rotation.

As described herein (see, for example, but not limited to, FIG. 82), two more magnets may be used to create a hovering/floating effect between two components (e.g., but not limited to, a connection between the handle 60 and the blade cartridge support member 24). Turning now to FIGS. 121-126, one embodiment of a razor 10 having at least two concentric, diametrically magnetized magnets 12102, 12104 to achieve a floating effect between two parts of the razor (e.g., but not limited to, between the blade cartridge support member 24 and the handle 60) that allows motion in two degrees of freedom (angular and axial). The razor 10 may additional include use of a repulsive magnetic force between the DM magnets 12102, 12104 to achieve both a lockout and ejection effect between the two parts.

In particular, the razor 10 includes a diametrically magnetized (DM) disc 12102 attached to one razor part (e.g., but not limited to, the handle 60) is positioned concentric to a diametrically magnetized (DM) ring magnet 12104 attached to the other part (e.g., but not limited to, the blade cartridge support member 24), and the poles are arranged such that opposite poles of the two DM magnets 12102, 12104 face each other in the ID of the ring DM magnet 12104, the effect is to cause the DM magnet 11204 of the blade cartridge support member 24 and disc DM magnet 12102 of the handle 60 to balance, float, or hover, at the point at which the DM magnets 12102, 12104 are coplanar.

According to one embodiment, the blade cartridge support member 24 may include a cavity 12502 (best seen in FIG. 125A) and the handle 60 may include a post 12504 extending axially outward. The post 12504 may include the disc DM magnet 12102 and may be configured to be at least partially received within the cavity 12502 which may include the DM disc magnet 12102 such that the disc DM magnet 12102 may be aligned such that opposite poles of the two DM magnets 12102, 12104 face each other in the ID of the ring DM magnet 12104 (e.g., the float position). The cavity 12502 may also be configured to allow the post 12504 to continue to move forward beyond the float position as described herein. Of course, the arrangement of the DM disc magnet 12102 and DM ring magnet 12104, as well as the cavity 12502 and post 12504, may be reversed, and additional combinations of DM disc magnet 12102 and DM ring magnet 12104 may also be included.

If a suitable gap is left between the mating faces 12506, 12508 (best seen in FIG. 125B) of the blade cartridge support member 24 and handle 60, the blade cartridge support member 24 will appear to float axially with respect to the handle 60 while always returning to the balance point following deflection, thus giving the impression of razor 10 having a small shock absorber between the blade cartridge support member 24 and the handle 60. If the blade cartridge support member 24 is given a small axial and/or angular displacement around the shared axis of the DM magnets 12102, 12104 (as generally illustrated in FIG. 122), the attraction of the two DM magnets 12102, 12104 will cause the blade cartridge support member 24 to return to its original angular position (as generally illustrated in FIG. 121) at the balance point. The range of axial and/or angular displacement within which the attraction of the two DM magnets 12102, 12104 will return the two parts to their original juxtaposition is referred to as the "return range."

Optionally, the post 12504 may include a guide pin 12510 (best seen in FIGS. 125A and 125B) which is received within lockout and/or ejection chamber or groove 12512 disposed in the blade cartridge support member 24. For example, the lockout and/or ejection chamber or groove 12512 may include an opening that allows the guide pin 12510 to be received therein. Once inside the lockout and/or ejection chamber or groove 12512, the movement of the guide pin 12510 (and thus the handle 60 relative to the blade cartridge support member 24) is restricted (e.g., subject to mechanical constraints) to keep the relative motion of the two parts within a return range, with the exception of two conditions outlined below.

The lockout and/or ejection chamber or groove 12512 may have one or more different regions or ranges that allow a predetermined motion and/or generally prevent (e.g., generally fix, retain, and/or lock) motion of the blade cartridge support member 24 relative to the handle 60. For example, one embodiment of a lockout and/or ejection chamber or groove 12512 is generally illustrated in FIGS. 125C and 125D. As may be appreciated, the lockout and/or ejection chamber or groove 12512 may extend radially about a portion of blade cartridge support member 24. FIG. 125C generally illustrates the lockout and/or ejection chamber or groove 12512 having a return range 12514, a lockout range 12516, and/or an eject range 12518 (which allows the guide pin 12510 to either enter and/or exit the lockout and/or ejection chamber or groove 12512), and FIG. 125D generally illustrates the guide pin 12510 disposed in different positions within the ranges 12514, 12516, 12518. FIG. 125E illustrates an alternative embodiment of the lockout (e.g., having a 90 degree lockout) and/or ejection chamber or groove 12512 having a return range 12514, an eject range 12518, and/or an alternative lockout range 12516 (e.g., having a 0 degree lockout), along with the guide pin 12510. It should be appreciated that while the guide pin 12510 is shown in FIGS. 125D and 125E being disposed in multiple ranges at once, this is only for illustrative purposes and that the guide pin 12510 would only be in one range at any given time.

In the absence of a mechanical constraint, when a sufficient angular displacement is applied to the blade cartridge support member 24, the "return range" 12514 is exceeded and the DM magnets 12102, 12104 begin to assume a position at which they mutually repel. In the case of a diametrically magnetized disc/ring pair 12102, 12104, the effect of this repulsion is to impart an axial motion such that the two DM magnets 12102, 12104 no longer remain coplanar. Again in the absence of a mechanical constraint, this axial motion is equally likely to occur in either direction. One possible direction of axial motion has the effect of drawing the two parts together, and the other has the effect of pushing them apart. If a mechanical constraint is added (e.g., the guide pin 12510 and lockout and/or ejection chamber or groove 12512), the direction of axial motion which occurs upon exiting the return range can be controlled based on user input.

Turning now to FIG. 123, the razor 10 is illustrated in a position/alignment that encourages the two parts (e.g., the blade cartridge support member 24 and the handle 60) to draw together when the blade cartridge support member 24 is turned in one particular direction (e.g., but not limited to, clockwise, in the embodiment shown). The guide pin 12510 on the handle 60 (e.g., the post 12504) impacts a ramp within the lockout range 12516 of the lockout and/or ejection chamber or groove 12512, which directs the handle 60 and the blade cartridge support member 24 toward each other as rotation continues, to the point at which the gap closes completely and the parts are in intimate contact after turning 90 degrees relative to each other. The result is a "lockout" or elimination of any floating effect, axial or rotational. As illustrated in FIGS. 123, 125C-D, the lockout may optionally include a detent feature whereby the blade cartridge support member 24 must be manually pulled away from the handle 60 in order to overcome the lockout and return the blade cartridge support member 24 to the floating condition.

Turning now to FIG. 124, the razor 10 is illustrated in a position/alignment that encourages the parts (e.g., the blade cartridge support member 24 and the handle 60) to separate axially. In this case, when the blade cartridge support member 24 is turned in one particular direction (e.g., but not limited to, counterclockwise in this embodiment), the guide pin 12510 impacts a ramp within the eject range 12518 which pushes the blade cartridge support member 24 and the handle 60 away from each other. Because of the interaction of the DM magnets 12102, 12104, this feature can be designed to drive the parts to a point at which they will forcefully separate, resulting in an "ejection" effect, if the guide pin 12510 is given an appropriate escape path. If both of these systems (e.g., the lockout and the ejection) are incorporated into a single device, and the "lockout" and "ejection" occur when the blade cartridge support member 24 is turned in two different directions, the result is as shown in FIGS. 125B and 125D, where the guide pin 12510 can exist within three different ranges—the return range 12514, the lockout range 12516, or the ejection range 12518. In this scenario, the user can choose the action to impart to the blade cartridge support member 24 based on which direction he or she turns the blade cartridge support member 24 relative to the handle 60.

As noted above, FIG. 125E also illustrates an alternative lockout mechanism in which the lockout position is angularly identical to the nominal floating position. This could be useful in the event a user wishes to utilize the razor 10 in the traditional orientation but temporarily disable the shock absorber effect inherent in the design. In this case (e.g., "0 lockout") the lockout is achieved by, in sequence, turning the blade cartridge support member 24 counterclockwise, pushing it inward toward the handle 60, turning it clockwise as far as it will go and releasing it. In doing so, the guide pin 12510 is induced to follow a U-shaped path into a lockout position 12516 which results in the blade cartridge support member 24 being at the same angle at which it started. Releasing the blade cartridge support member 24 from this lockout position 12516 would involve reversing the above steps to place the guide pin 12510 back into the return range 12514.

While the razor 10 has been illustrated having a head assembly 20 (including a blade cartridge support member 24 and a blade cartridge 22) having a two-sided blade cartridge 22, pivoting relative to the arms 30 about a pivot axis PA located at its geometric center, with two positions of stable equilibrium (initial starting positions or ISP's), selectable by the user and 180 degrees apart, this is not a limitation of the present disclosure unless specifically claimed as such and the DM magnets (and any of the associated described features) may be used with any blade cartridge described herein. Additionally, the rotation (and control thereof) can be achieved using any resistive pivot mechanism described herein such as, but not limited to, a RDP (resiliently deformable pawl) or magnetic means such as alternating attracting/repelling magnets (chosen illustratively for FIGS. 121-125), multi-pole or programmable magnets or the like Additionally, any side of the blade cartridge 22 may contain multiple blades angled in the same direction (as in a traditional razor utilized for Face Mode) on one face and/or one or more faces having an even number of blades with half the blades angled in one direction and half angled in the other (to allow shaving in either direction utilized for Body Mode). In such a scenario, the user may find it advantageous to utilize one of the two cartridge head positions when the cartridge is in its floating condition and another when it is locked out. This system can be further arranged into a second fixed position—"Body Mode" (FIG. 126). This embodiment may include a handle/collar optionally having a mechanical pivot 12602 that can lock at 90° downwards from the traditional handle position (FIG. 121) or Face Mode and the yoke/cartridge head assembly 90° Lockout position (FIG. 123). The process of changing between Face Mode and Body Mode would involve two actions: 1) Rotating the collar joint 90 degrees as shown in FIG. 126 and 2) Rotating the yoke joint 90 degrees FIG. 123, with the resulting configuration shown in FIG. 126. These two actions could be performed in either order.

As noted above, while a dual-side blade cartridge 22 is illustrated, this is for illustrative purposes only and the blade cartridge may include a single-sided cartridge head. In such a case, the cartridge head may pivot on an axis close to one longitudinal edge of the blade cartridge support member 24 and fixed between the yoke arms 30. The single ISP could be determined in one of a number of ways described herein, including but not limited, to magnetic arrangements such as a pair of repelling magnets, one of which would reside on the back side of the cartridge head and the other on the leading edge of the web spanning the yoke arms.

With reference to FIGS. 127-138, various embodiment of a razor 10 including magnets to position and control a rotating blade cartridge 22 within blade cartridge support member 24 (e.g., a yoke 47) is generally illustrated. The blade cartridge 22 may be disposed at the end of the arm(s) 30 of the yoke 47, and rotates about a pivot axis PA fixed relative to the arm(s) 30, and may include two orientations of stable equilibrium (also called initial starting positions, or ISP's), 180 degrees apart, to be selected by the user. When in either of these orientations, the blade cartridge 22 may be urged back to return to its ISP when subjected to a small (<90 degrees) angular displacement, for example during a shaving stroke, and that the torque required to accomplish this is produced by combinations of magnets and/or ferrous elements in place of a traditional cartridge biasing mechanism. The limitation and control of the rotation of the blade cartridge 22 within the blade cartridge support member 24 may be accomplished in any number of ways that have been described herein, including but not limited to, mechanical means such as a physical axle feature and a RDP (resiliently deformable pawl) or magnetic arrangements such as alternating attracting/repelling magnets, multi-pole or programmable magnets or the like.

Turning now to FIGS. 127-128, one embodiment of a razor 10 having a resistive pivot mechanism consistent with the above is generally illustrated. As shown, one or more fixed arm magnets 12702 (e.g., but not limited to, a disc magnet) are located within one or more of two arms 30 of the blade cartridge support member 24. The arm magnet 12702 may be located off-axis relative to the pivot axis PA and its orientation is known. A ring magnet 12704 which has been diametrically magnetized in four quadrants alternating between north and south may be disposed within and fixed to one or more of the lateral edges of the blade cartridge 22 and generally faces the fixed arm magnet 12702.

Due to the off-axis position of the arm magnet 12702, the arm magnet 12702 has the ability to transmit a torque to the blade cartridge 22 depending upon the quadrant of the ring magnet 12704 that is adjacent to the arm magnet 12702. As a result, the ring magnet(s) 12704 are oriented such that the when the blade cartridge 22 is in one of its two ISP's, the quadrant of each ring magnet 12704 that is adjacent to its corresponding arm magnet 12702 is of opposite polarity to the adjacent face of the disc magnet 12704. As a result, the blade cartridge 22, when subjected to a small rotational displacement about its pivot axis PA, will be urged back toward its nearest (and most recent) ISP.

To switch between the two possible ISP's, the user will intentionally rotate the blade cartridge 22 in either direction about the pivot axis PA until the rotation has passed 90 degrees, at which angle there is a point of unstable equilibrium when like poles of the ring magnet 12704 and fixed arm magnet 12702 are adjacent to, and thus repelling, each other. This condition is illustrated in FIG. 128. In the absence of any significant source of friction, it is generally not possible to balance the blade cartridge 22 at one of these points of unstable equilibrium, so the blade cartridge 22 will naturally continue to rotate past this point and come to rest at the next ISP, which is the point of stable equilibrium 180 degrees apart from the previous ISP. It should be noted that, given magnets 12702, 12704 of sufficient strength, this same behavior may be able to be attained with magnets 12702, 12704 on only one side of the blade cartridge 22 and in one arm 30 of the blade cartridge support member 24 rather than at both lateral ends of the blade cartridge 22 and arms 30 as generally illustrated.

Turning now to FIGS. 129-130, another embodiment of a razor 10 having a resistive pivot mechanism consistent with the above is generally illustrated. As shown, one or more fixed arm magnets 12902 are located within one or more of two arms 30 of the blade cartridge support member 24, and may have an oblong, oval, and/or elongated shape. The arm magnets 12902 may be magnetized across the thickness (depth) of the magnet. The arm magnet 12902 may be located at least partially off-axis relative to the pivot axis PA and its orientation is known. A blade cartridge magnet 12904 may be disposed within and fixed to one or more of the lateral edges of the blade cartridge 22 and generally faces the fixed arm magnet 12902. The blade cartridge magnet 12904 may also have an oblong, oval, and/or elongated shape, however, the blade cartridge magnet 12904 may have a length 12906 that is longer than the length 12908 of the arm magnet 12902. The blade cartridge magnet 12904 may be magnetized across the thickness (depth) of the magnet.

In this embodiment, the magnets 12902, 12904 are always oriented with opposite poles facing each other, so the repelling qualities of the magnets 12902, 12904 are not utilized. This configuration is illustrated in FIG. 129. The magnets 12904 in the blade cartridge 22 may be centered on the pivot axis PA and oriented such that the length 12906 of the magnet 12902 is parallel to the width 12910 of the blade cartridge 22. The magnets 12902 in the blade cartridge support member 24/arm 30 are shorter and positioned behind and surrounding the pivot axis PA. The driving torque inducing the blade cartridge 22 to assume one of the two ISP's derives from the magnets' 12902, 12904 tendency to align such that the mating surfaces have the maximum overlap area. When an angular displacement is applied to the blade cartridge 22, the overlap area between the magnets 12902, 12904 is reduced due to the long axes of the magnet shapes no longer being aligned. If the angular displacement is small (as shown in FIG. 130) the blade cartridge 22 will return to its nearest (and most recent) ISP when released. As with the above embodiment, there is a position of unstable equilibrium when the magnets 12902, 12904 are oriented 90 degrees to each other. Hence if the displacement exceeds 90 degrees, the blade cartridge 22 will flip to the other ISP, which is the point of stable equilibrium 180 degrees apart from the previous ISP.

Turning now to FIG. 131, yet another embodiment of a razor 10 having a resistive pivot mechanism consistent with the above is generally illustrated. This embodiment is similar to those of either FIGS. 127-128 and/or 129-130, however, the magnets may be replaced with one or more magnetized, nanotube-enhanced thermoplastic zones 13102, 13104 that are molded integrally to the blade cartridge 22 and/or arms 30, respectively. The areas 13102, 13104 denoted in FIG. 131 are for illustrative purposes only. The areas 13102, 13104 indicated may not be detectable or visible on the final end product. These areas 13102, 13104 may be programmed such that opposite poles face each other across the gap between the inner surface of the yoke arm 30 and the side surface of the blade cartridge 22; as such, repulsion is not utilized and the behavior of the blade cartridge 22 is driven entirely by varying levels of attraction between the magnetized zones. The ISP's are determined by the blade cartridge 22 positions at which overlap between the magnetized zones 13102, 13104, and hence attraction, is greatest. As is the case with the embodiment of FIGS. 129-130, when the blade cartridge 22 is given a small rotational displacement (<90 degrees), the reduction of overlap area and attraction between the two magnetized zones 13102, 13104 serves to return the blade cartridge 22 to its nearest (and most recent) ISP. When the blade cartridge 22 is rotated 90 degrees from an ISP, it encounters a position of unstable equilibrium and will flip to the other ISP, which is the point of stable equilibrium 180 degrees apart from the previous ISP.

Turning now to FIG. 132, an additional embodiment of a razor 10 having a resistive pivot mechanism consistent with the above is generally illustrated. This embodiment is similar to the embodiment described in FIGS. 129-130, however, one or more of the oblong magnets in the blade cartridge 22 and/or arm 30 may be replaced with ferrous elements. In the illustrated embodiment, the blade cartridge magnet 12904 in the blade cartridge 22 have been replaced with ferrous elements 13202, though it should be appreciated that the arm magnet 12902 may be replaced with a ferrous element and that the blade cartridge magnet 12904 may remain.

Because the embodiment described in FIGS. 129-130 does not make use of repulsion, and the behavior of the blade cartridge 22 in FIG. 132 is governed by varying levels of attraction between the magnetic element 12902 and the ferrous element 13202 as the blade cartridge 22 rotates about its pivot axis PA, it is feasible to replace one set of magnets 12902, 12904 with ferrous bars 13202. This would may offer advantages from cost and manufacturability standpoints while offering similar performance to the paired-magnet 12902, 12904 scenario featured in FIGS. 129-130.

As noted above, the combination of a magnet (either magnet 12902 or magnet 12904) may be disposed in both arms 30 and ends of the blade cartridge 22 (as generally illustrated in FIG. 132) or a single arm 30 and single end of the blade cartridge 22 as generally illustrated in FIG. 133. With reference to FIGS. 134-135, the configuration of FIG. 132 may be modified to remove the arm 30 that does not include a magnet. In this embodiment, the blade cartridge 22 is both constrained and controlled by a single yoke arm 30 and the pivot axis PA is cantilevered from the end of the arm 30 rather than spanning the distance between two symmetrical yoke arms 30 as generally illustrated in FIG. 133. The pivot axis PA for the blade cartridge 22 may be designed such that the blade cartridge 22 can slide off the axle 13502, as generally illustrated in FIG. 135. In this case, the magnetic element(s) (e.g., magnet in the arm 30 and ferrous bar and/or magnet in the blade cartridge 22) serve not only to position the blade cartridge 22 angularly relative to the arm 30, but also to hold the blade cartridge 22 onto the arm 30. Replacing of the blade cartridge 22 would be a simple matter of pulling laterally on the used blade cartridge 22 to overcome the magnetic resistance, sliding the blade cartridge 22 off the axle 13502 and sliding a new blade cartridge 22 on. Due to the magnetic attraction between the arm magnet 12902 and the body ferrous element 13202, the new blade cartridge 22 would adopt its proper position laterally and also adopt one of the two ISP's automatically.

The razors 10 of FIGS. 127-135 are shown having a user-replaceable, disposable blade cartridge 22 that is removable from the handle 60. This could be accomplished in one of a number of ways that have been described in herein, including but not limited to magnetic configurations (e.g., but not limited to, mating diametrically magnetized (DM) discs and/or rings or magnetic detent/snap systems) or mechanical/magnetic configurations such as a modified twist/lock/eject system. In addition (or alternatively), only the blade cartridge 22 may be replaced and the blade cartridge support member 24 may remain part permanently coupled/integrated into the handle 60. In such an embodiment, part or all of the blade cartridge support member 24 would remain with the handle 60 when the blade cartridge 22 are being replaced, rather than being discarded with the blade cartridge 22. These variants offer the advantage of reducing the material usage and part count in the disposable portion of the razor system.

Turning now to FIGS. 136-137, a variation of the embodiment of FIGS. 129-130 is generally illustrated. Whereas the blade cartridge 22 is generally permanently coupled to the blade cartridge support member 24 in the embodiment of FIGS. 129-130, the pivot axle 13602 of FIGS. 136-137 is fixed to the blade cartridge 22 rather than the arm 30, and passageways/grooves/slots 13604 are provided in the arm 30 and/or magnets 13606 to allow the blade cartridge 22 and axle 13602 to be removed from the arm 30. In one embodiment, the slots 13602 may include blind slots that extend through the ends of the arms 30 and end at the desired axis of rotation. The blade cartridge 22 may be held magnetically in the arm 30 due to the fact that the yoke magnets 13606 exist behind the pivot axis PA and, in addition to determining the ISP's, also tend to pull the blade cartridge 22 into the arm 30 until the axle 13602 reach the ends of the blind slots 13604. Replacement of the blade cartridge 22 may involve pulling on the used blade cartridge 22 in a direction away from the handle 60 to overcome the magnetic resistance, removing the blade cartridge 22 and axle 13602, and sliding the axle 13602 of the new blade cartridge 22 into the slots 13604 as generally illustrated in FIG. 137. It should be appreciated that the ferrous element 13202 on the blade cartridge 22 may be replaced with one or more magnets, and the yoke magnets 13606 may be replaced with a ferrous element.

Turning now to FIG. 138, a further embodiment of a razor 10 having a resistive pivot mechanism consistent with the above is generally illustrated. The razor 10 includes two-piece arms 30 having a first portion 13802 permanently coupled to the blade cartridge support member 24 and a second portion 13804 coupled to the blade cartridge 22. The first portion 13802 of the arms 30 includes an arm magnet 13806 having its poles aligned with a blade cartridge magnet 13808 coupled to the blade cartridge 22 to create an attractive magnetic force thereby coupling the blade cartridge 22 to the blade cartridge support member 24. The second portion 13804 may include a cavity 13810 to allow the blade cartridge magnet 13808 to rotate about the pivot axis PA.

For example, a pair of mortise-and-tenon style features may be used to attach each yoke arm tip (e.g., second portion 13804) to the yoke frame (e.g., first portion 13802). Because the yoke arm tips 13804 already have magnets present for blade cartridge 22 positioning purposes (see, e.g., the embodiment of FIG. 132), these magnets can also be used to hold the yoke arm tips 13804 in place if additional magnets or ferrous elements are positioned in the yoke frame 13802 at the junctions between the frame and tips. Removal of the blade cartridge 22 in this instance would involve pulling on the used blade cartridge 22 in a direction away from the handle 60 to overcome the attraction between the magnets in the yoke arm tips 13804 and the magnets or ferrous elements in the yoke frame 13802, and sliding the mortise-and-tenon features apart. The new blade cartridge 22 may be installed by aligning the mortise-and-tenon features on both yoke arm tips 13804 with their corresponding features in the yoke frame 13802, and allowing the magnetic attraction between the elements in the tips 13804 and frame 13802 to complete the attachment. This embodiment may include magnets in both yoke arms 30 (if two arms 30 are present), not only because they are used to affix the yoke arm tips 13804 to the frame 13802, but also because they would assist in aligning the yoke arm tips 13804 relative to the blade cartridge 22 in the same orientation which would be required to properly and simultaneously mate the mortise-and-tenon features on each side during installation of a new blade cartridge 22.

Turning now to FIG. 139, one embodiment of a razor 10 which includes nanotube sheets, strips or threads 13902 incorporated into the disposable head assembly 20 (e.g., but not limited to, the blade cartridge 22) is generally illustrated. The nanotube sheets, strips or threads 13902 may be energized by electric current to warm the skin of the user during shaving. Warmth from the nanotube sheets, strips or threads 13902 is conveyed via IR radiation bands. For example, far infrared radiation (FIR) transfers energy purely in the form of heat which can be perceived by the thermoreceptors in human skin and is felt almost instantaneously. FIR is experienced by the user's body as gentle radiate heat which can penetrate up to 1.5" beneath the skin. FIR is both absorbed and emitted by the human body, so heat generated by the nanotubes is perceived as natural and potentially therapeutic in feel. Nanotube fibers have been successfully impregnated in fabrics, wraps, and garments to deliver FIR to attain health benefits form its effects. Of significance is that the nanotube sheets, strips or threads 13902 are not used to heat any part of the razor 10, but rather only to heat the user's skin. As such, the razor 10 may feel "cool" (e.g., ambient temperature) to the touch.

A power source (e.g., batteries) may be connected electrically to nanotube sheets, strips or threads 13902 which are mounted on, in, or near to the face of a blade cartridge 22, for example, as generally illustrated in FIG. 139. Heating may be controlled by the user through the activation of an electrical switch located on the razor 10 (e.g., the handle 60 and/or the head assembly 20). The batteries or another power source may be located within some section of the razor assembly (e.g. the handle 60) or external to it, and electrical current may flow through the nanotube sheets, strips or threads 13902 via wires or other electrical connections. The nanotube sheets, strips or threads 13902 may be applied to any head assembly 20 described herein.

With reference to FIGS. 139 and 140, another embodiment of a resistive pivot mechanism and a coupling mechanism is generally illustrated. In particular, the pivot axle 14002 (best seen in FIG. 140) may include a ferrous material that is fixed to the blade cartridge 22. U-shaped or slotted magnets 14004 are mounted in the tips of the yoke arms 30, the shape of the magnets 14004 defining a passageway having an opening to allow the blade cartridge 22 (e.g., the axles 14002) to be removed. FIG. 139 generally illustrates the blade cartridge 22 installed/coupled to the blade cartridge support member 24. The passageways are illustrated as blind slots that extend through the ends of the arms 30 and into the magnets 14004, ending at the location of the desired axis of rotation. Because of the intimate contact between the ferrous axle 14002 and the U-shaped magnets 14004, the blade cartridge 22 is held magnetically in the arms and the pivot axis PA is correctly positioned with the axle tips at the ends of the blind slots. Replacement of the blade cartridge 22 involves pulling on the used blade cartridge 22 in a direction away from the handle 60 to overcome the magnetic force binding the ferrous axle 14002 to the magnets 14004, removing the blade cartridge 22 and axle 14002, and sliding the axle 14002 of the new blade cartridge 22 into the slots. The magnetic attraction between the ferrous axle 14002 and the slotted magnets 14004 completes the assembly process. Optionally, the previously described assembly and ISP mechanism can be replaced by the utilization of a programmed magnetic axle (particularly the tips) seating into a slotted programmed magnet receptacle (Magnet with slot to receive pivot pin/s).

Turning now to FIGS. 141-142, one embodiment of pivotably coupling the blade cartridge 22 to the blade cartridge support member 24 using a plurality of magnets is generally illustrated. As explained herein, the connection between the blade cartridge 22 and the blade cartridge support member 24 may appear as if the blade cartridge 22 is hovering with respect to the blade cartridge support member 24.

In particular, the blade cartridge 22 is able to rotate about a pivot axis PA fixed relative to the yoke arms 30, but have the tendency to return to its initial starting position (ISP) when subjected to a small (<90 degree) angular displacement, for example during a shaving stroke. In addition, this behavior is desired to be accomplished in the absence of a traditional axle feature, such that the blade cartridge 22 "hovers" (or appears to hover) while remaining centered on its pivot axis PA, and in the absence of a traditional mechanical biasing mechanism.

To create this effect, a pair of round magnets 14202, 14204 (best seen in FIG. 142) is mounted concentric to the pivot axis PA in each arm 30 and each lateral end of the blade cartridge 22, respectively. A pair of small, axially magnetized disc magnets 14206, 14208 are mounted opposing each other, one 14206 fixed to the lateral ends of the blade cartridge 22 and one 14208 fixed to the yoke arm 30. These magnets 14206, 14208 are oriented such that they repel each other, which in the absence of the identical magnet pair on the opposite side of the blade cartridge 22 would tend to push the blade cartridge 22 away from the yoke arm 30; however due to the pair 14206, 14208 on the opposite end, the two repulsion forces cancel each other out and result in the blade cartridge 22 being centered between the yoke arms 30.

In the absence of additional forces, the blade cartridge 22 would not remain coaxial to the repelling magnets because that position would be one of unstable equilibrium; the blade cartridge 22 would be forced to separate radially from the blade cartridge support member 24. However, surrounding the pair of small axially magnetized discs 14206, 14208 is a pair of larger diametrically magnetized rings 14202, 14204. As with the discs 14206, 14208, one ring 14204 is fixed to the blade cartridge 22 and the other 14202 is fixed to the yoke arm 30. However, these rings 14202, 14204 are oriented such that when the blade cartridge 22 is at its ISP, the opposite poles of the rings 14202, 14204 are adjacent to one another, such that they attract. This arrangement (stacked face to face) of diametrically magnetized rings 14202, 14204 have a tendency to remain positioned coaxially to one another. It is this force that counteracts the radial force imparted by the pairs of repelling discs 14206, 14208 and keeps the blade cartridge 22 positioned within the yoke arms 30 on the pivot axis PA. Furthermore, two stacked diametrically magnetized rings 14202, 14204 which are positioned with opposite poles adjacent to one another remain concentrically located even when subjected to a limited amount of rotation relative to each other about their shared axis, under which condition the magnets 14202, 14204, upon release, tend to rotate back to their preferred juxtaposition with their opposite poles adjacent. It is this feature that leads to the desired biasing behavior as described above. Thus, the task of the inner, axially magnetized disc magnets 14206, 14208 is to create the hovering effect, while the task of the outer, diametrically magnetized ring magnets 14202, 14204 is to keep the blade cartridge 22 positioned on the pivot axis PA and to return it to its ISP when it is subjected to a small rotational displacement.

A variation of this is to incorporate multi-pole, or programmed, magnetic rings in place of the diametrically magnetized rings 14202, 14204. These magnets, like the diametrically magnetized rings 14202, 14204, would be positioned such that their opposite poles were adjacent to each other, however there would be more than two poles per magnet. This would result in there being multiple ISP's or positions of stable equilibrium. A special case of this scenario would utilize four-pole rings, resulting in two ISP's 180 degrees apart. The embodiment is particularly suited for use with a double-sided cartridge head 22, which the user could position at will at one of two possible ISPs.

The blade cartridge 22 may be replaced along with the blade cartridge support member 24 according to any embodiment described herein; however, it is also possible that only the blade cartridge 22 may be removed and that the blade cartridge support member 24 may be integral to the handle 60.

With reference to FIG. 143, the repelling disc magnets 14206, 14208 may optionally include a mating feature such as, but not limited to, dimples 14302 on one magnet and a bump 14304 on the other, located along the pivot axis PA. The bump 14304 may be configured to be at least partially received within the dimple 14302 to introduce an additional element of control in that the blade cartridge 22 may allowed a small amount of radial movement relative to the pivot axis PA, but not be able to be dislodged completely. In such an instance, the blade cartridge support member 24 and blade cartridge 22 may be compose as permanent assembly, and an attachment mechanism between the blade cartridge support member 24 and handle 60 such as was described above may be used.

Turning now to FIGS. 144-146, another embodiment of a razor 10 that may be selectively arranged in either "Face Mode" and "Body Mode" is generally illustrated. In Face Mode, it is anticipated that the blade cartridge 22 will be perpendicular to the handle 60 in the top view, and will have an ideal starting angle relative to the plane of the skin surface that is non-zero. In Body Mode, it is anticipated that the blade cartridge 22 will be parallel to the handle 60 in the top view, and is also best positioned parallel to the plane of the skin surface. As described herein, the razor 10 includes a compound-curvature track 14402 to produce multiple positions of a blade cartridge 22 with respect to the handle 60 (e.g., the Face Mode and Body Mode) and automatically changes the cartridge head ISP (initial starting position) based on the position of the blade cartridge 22 being in either the Face Mode or Body Mode. The compound-curvature track 14402 therefore not only repositions the alignment of the blade cartridge 22 with respect to the handle 60, but also automatically alters the IPS as part of the reorienting of the blade cartridge 22 relative to the handle 60.

The pivoting of the blade cartridge 22 about the pivot axis PA may be accomplished using any embodiment described herein, and may optionally include any resistive pivot mechanism or any combination described herein. Additionally, in the illustrated embodiment one side of the blade cartridge 22 may include multiple blades angled in the same direction (as in a traditional razor) and the other side may include an even number of blades with half the blades angled in one direction and half angled in the other (to allow shaving in either direction). These two sides will be referred to as the "Face Side" and the "Body Side" respectively.

Face Mode is illustrated in the several views in FIG. 144, and Body Mode is illustrated in FIG. 145. The transition between the two modes may be accomplished through the use of the compound-curvature track 14402 including a pair of helical tracks 14404, 14406 (e.g., an upper track 14404 and a lower track 14406) that traverse a compound curve along the perimeter of the blade cartridge support member 24. Engaging these tracks 14404, 14406 are three guide pins **14408*a*, 14408*b*, 14408*c* located in a groove in the collar (affixed to the razor handle 60). Two pins 14408*a*, 14408*b* engage one track 14404 and one pin 14408*c* engages the other track 14406. As illustrated in FIGS. 144 and 145, the two pins 14408*a*, 14408*b* engage the top track 14404 and the single pin 14408*c* engages the bottom track 14406, however this could be reversed with the same results. Changing the position of the blade cartridge 22 (e.g. from Face Mode to Body Mode) involves nothing more than sliding the blade cartridge support member 24 through the groove in the collar. Because three points of contact are sufficient to fully locate the blade cartridge support member 24 in space, the blade cartridge support member 24 is constrained to change its angle as it is being moved through the groove. The helical tracks 14404, 14406 force the blade cartridge support member 24 to reorient itself during this operation such that when the movement is complete and the blade cartridge 22 position relative to the handle 60 has been changed from perpendicular to parallel, the blade cartridge 22 has also changed from being angled to being parallel to the plane of the skin. At this point the blade cartridge 22 can optionally be rotated within the blade cartridge support member 24** from the Face Side to the Body Side.

An optional feature may include multiple detents spaced throughout the range of motion of the blade cartridge support member 24 within the collar, with the purpose of helping to keep the blade cartridge support member 24 in a selected position during shaving strokes. As illustrated in FIGS. 144, 145, two detents **14410*a*, 14410*b* are included, one at each extreme of motion (e.g., corresponding to the Body Mode and Face Mode, respectively). These detents 14410*a*, 14410*b* could be accomplished using one of several possible methods, including a spring-loaded plunger (illustrated) 14420 or mating magnets. An additional optional feature may include a customizable, removable/replaceable dress plate which could exist on the blade cartridge support member 24 in the area spanned by the compound curved feature 14402 which contains the helical tracks 14404, 14406**. This dress plate could be used for branding and/or printed instructions or iconography intended to assist the user in selecting the appropriate yoke position.

A design consideration is the angle formed between the razor handle 60 and the blade cartridge 22 in the side view when the blade cartridge 22 is in Body Mode (see, e.g., FIG. 145). This angle is dictated by the degree of twist in the helical track 14402 as it traverses the perimeter of the blade cartridge support member 24 (zero twist would result in the blade cartridge 22 and handle 60 being perfectly parallel in the side view). The designer can select this angle to maximize the number of possible ways to hold the razor 10, especially when shaving hard-to-reach areas. Optionally, there may be tracks 14402 on both sides of the blade cartridge support member 24 rather than just one. In such a case, the range of motion of the blade cartridge support member 24 within the collar would be doubled: The center position may represent Face Mode and there may be two Body Mode positions, one at each end of the tracks 14402. Because the tracks 14402 on the two sides would be independent of each other, the two Body Mode positions could be mirror images of each other (i.e. the only difference would be the side of the handle 60 to which the blade cartridge support member 24 was moved) or they could have different degrees of twist. In such a case, the user could, by choosing which side to slide the blade cartridge support member 24 to, have his or her choice of two resultant angles between the handle 60 and blade cartridge 22 in the side view.

Additionally, the razor 10 may automatically move the blade cartridge 22 to present the Face Side or the Body Side to the skin surface depending upon which mode was selected by the user via his or her positioning of the blade cartridge support member 24 (in Face Mode or Body Mode, respectively). This could be accomplished with a system of cams or gears or through some other configuration. A consideration for such a design would be whether or not the blade cartridge 22 was constrained by the mechanical system to adopt the orientation corresponding to the blade cartridge support member 24 position, or if the user would still have the option to override the system and place the blade cartridge 22 in either orientation.

An additional optional feature is illustrated in FIG. 146. In this configuration, the end of the handle 60 or collar is adapted to include a feature which appears to blend into the curve of the blade cartridge support member 24. In either the configuration with or without this feature, the durable/disposable boundary could be at the juncture between the blade cartridge support member 24 and the collar, the collar and handle, or between the blade cartridge 22 and blade cartridge support member 24. Attachment and release of the disposable portion from handle to the yoke/cartridge head may be achieved using any configuration described herein.

Turning now to FIGS. 147-149, one embodiment of a magnetic biasing system 14702 for urging a blade cartridge to an initial starting position (ISP) is generally illustrated. The magnetic biasing system 14702 may include one or more blade cartridge magnets 11410 (only one shown for clarity) and one or more blade cartridge support member magnets 11412 having their poles configured to generate a repulsive magnetic force that urges the blade cartridge 22 away from blade cartridge support member 24 about the pivot axis PA. In the illustrated embodiment, the magnetic biasing system 14702 is configured to urge the blade cartridge 22 in the direction generally illustrated by arrow 14704; however, it should be appreciated that blade cartridge 22 may be rotated in any direction including, but not limited to, a direction generally opposite of arrow 14704.

According to one embodiment, the blade cartridge magnets 11410 may be located on the back side 11409 of a single-sided blade cartridge 22 (e.g., a side of the blade cartridge 22 generally opposite to the razor blades which are disposed on the front side 14712). For example, the blade cartridge magnets 11410 may be located above the pivot axis PA (e.g., closer to the top edge 14714 of the blade cartridge 22 which is furthest away from the handle 60). The repulsive magnetic force generated by the repulsive magnets 11410, 11412, along with the blade cartridge magnets 11410 being located above the pivot axis PA, urges the blade cartridge 22 to rotate in the direction of arrow 14704 about the pivot axis PA towards the initial starting position (ISP).

The blade cartridge support member 24 and/or blade cartridge 22 may optionally include one or more IPS protrusions, shoulders, ridge, and/or extensions 9328 that sets the Initial Starting Position (ISP) of the blade cartridge 22 relative to the blade cartridge support member 24 and the handle 60. As may be appreciated, the ISP is the position of the blade cartridge 22 relative to the blade cartridge support member 24 and the handle 60 when no force is applied and the position that the blade cartridge 22 returns to after an external force has been removed. Put another way, when an external force is applied to the blade cartridge 22 during shaving, the external force may overcome the repulsive magnetic force between the blade cartridge magnets 11410 and the blade cartridge support member magnets 11412 such that the blade cartridge 22 moves in a direction generally opposite to arrow 14704. When the external force is removed and/or reduced, the repulsive magnetic force between the magnets 11410, 11412 urges the blade cartridge 22 back towards the IPS. The ISP protrusion 9328 thus sets the initial starting position of the blade cartridge 22 relative to the blade cartridge support member 24 and limits the rotation of the blade cartridge 22 in the direction of arrow 14704 and also limits/prevents the over rotation of the cartridge during a shaving stroke.

In the illustrated embodiment, the ISP protrusion 9328 is located on the inside of one or more of the yoke arms 30 below the pivot axis PA (e.g., proximate to the yoke 47), though as mentioned, this is not a limitation of the present disclosure unless specifically claimed as such. The ISP protrusion 9328 therefore sets or defines the 0 position of the blade cartridge 22. The blade cartridge 22 may rotate about the pivot axis PA within a predefined rotation range. For example, the predefined rotation range may be up to 100 degrees, for example, less than 90 degrees or less than 45 degrees. The rotation of the blade cartridge 22 in the direction generally opposite to arrow 14702 may also be limited by ISP protrusion 9328 and/or another protrusion, shoulder, ridge, and/or extension. This embodiment offers the advantage of generating a return force over a greater range of angular displacement relative to a spring—exceeding 90 degrees, given appropriate adjustments to the surrounding geometrical constraints.

While the repulsive magnet 11410, 11412 are illustrated being located in the center of the blade cartridge support member 24 and blade cartridge 22, the repulsive magnets 11410, 11412 may be located anywhere along the blade cartridge support member 24 and/or blade cartridge 22. Moreover, while the repulsive magnets 11410, 11412 are illustrated as being visible, this is for illustrative purposes only and one or more of the repulsive magnets 11410, 11412 may be embedded into the blade cartridge support member 24 and/or blade cartridge 22. Optionally, the blade cartridge support member magnets 11412 may be located in one or more protrusions (e.g., "turrets") 14716 the may extend outwardly from a portion of the blade cartridge support member 24 generally toward the blade cartridge 22. The turret 14716 may allow the blade cartridge support member magnet 11412 to be located closer to the blade cartridge magnet 11410, thereby increasing the repulsive magnetic force urging the blade cartridge 22 toward the IPS. Additionally, the turret 11416 may increase the overall clearance between blade cartridge 22 and the blade cartridge support member 24, thereby allowing the blade cartridge 22 to pivot about the pivot axis PA more freely during use (e.g., to allow for room for shaving cream, debris/hair, etc.).

It should be noted that the blade cartridge support member magnet 11412 does not necessarily need to be a separate magnet in the assembly, but rather one or more of the magnets described herein for coupling the blade cartridge support member 24 to handle 60 can be utilized to generate the repulsive magnetic force with the blade cartridge support member magnet 11410 in the blade cartridge 22. Additionally, it is possible that one or more of the razor blades of the blade cartridge 22 may be magnetized to form the blade cartridge magnet 11410.

While the magnetic biasing system 14702 is illustrated in combination with a single-sided blade cartridge 22, it should be appreciated that this is not a limitation of the present disclosure unless specifically claimed as such and that the magnetic biasing system 14702 may be used with multi-sided blade cartridge 22 (e.g., dual-sided blade cartridge 22). For example, the blade cartridge 22 may include multiple blade cartridge magnets 11410 disposed on opposite sides of a multi-face blade cartridge 22 having their poles aligned in opposite directions such that when the blade cartridge 22 is rotated to a selected face, the blade cartridge support member magnet 11412 associated with the selected face (e.g., the blade cartridge magnet 11410 closest to the support member magnet 11412) has its pole aligned with the blade cartridge support member magnet 11412 to generate the repulsive magnetic force.

The magnetic biasing system 14702 may be used with any handle 60 head assembly described herein including, but not limited to, disposable head assemblies 20 (e.g., including embodiments wherein both the blade cartridge support member 24 and blade cartridge 22 are removably coupled to the handle 60 and/or embodiments wherein only the blade cartridge 22 is removably coupled to the blade cartridge support member 24, and the blade cartridge support member 24 remains part (e.g., integral or unitary component) of the handle 60) as well as head assemblies that are integral or unitary components of the handle 60 (e.g., disposable razors in which the blade cartridge cannot be removed from the handle 60). Additionally, while the magnetic biasing system 14702 is illustrated in combination with a single-sided blade cartridge 22, it should be appreciated that this is not a limitation of the present disclosure unless specifically claimed as such and that the magnetic biasing system 14702 may be used with multi-sided blade cartridge 22 (e.g., dual-sided blade cartridge 22).

In the illustrated embodiment, the blade cartridge support member 24 is coupled to the handle 60 using any mechanical connection and/or fastener described herein and/or known to those skilled in the art (e.g., but not limited to, removable fastener/clip 14902 as generally illustrated in FIG. 149). Alternatively (or in addition), any of the magnetic connections described herein may be used to couple the blade cartridge support member 24 to the handle 60.

With reference to FIG. 150, a razor 10 is generally illustrated having one or more magnets 15002, 15004 disposed on the blade cartridge support member 24 and blade cartridge 22, respectively, having their poles aligned to create an attractive magnetic force. In particular, the blade cartridge magnet 15004 may be disposed on the back side 11409 of the blade cartridge 22, below the pivot axis PA (e.g., closer to the blade cartridge support member 24 and generally opposite of the top edge 14714). The blade cartridge support member magnet 15002 may be disposed anywhere on the blade cartridge support member 24 provided that the attractive magnet is generated. The attractive magnetic force may urge the blade cartridge 22 in the direction generally opposite to arrow 14704 to the ISP as illustrated in FIG. 150. As the user applies a force against the blade cartridge 22 during shaving, the external force may overcome the attractive magnetic force and the blade cartridge 22 may move generally in the direction of arrow 14704. As the external force is removed and/or reduced, the attractive magnetic force may urge the blade cartridge 22 generally in the direction opposite of arrow 14704 back to the ISP. One or more ISP protrusions 9328 may be located blade cartridge support member 24 above and/or below the pivot axis PA to limit motion of the blade cartridge 22 in either direction and/or to set/establish the IPS. It should be appreciated the attractive magnetic force generated by magnets 15002, 15004 may optionally be combined with one or more of the magnets 11410, 11412 to generate both an attractive magnetic force and a repulsive magnetic force (in the same and/or opposite directions).

It should also be appreciated that any one or more of the magnets 11410, 11412 and/or 15002, 15004 may be replaced with nanoparticle magnets as described herein. The nanoparticle magnets may be embedded (e.g., molded into) one or more portions of the blade cartridge support member 24 and/or blade cartridge 22, and may be programed to have the desired poles to create the repulsive magnetic force and/or attractive magnetic force to urge the blade cartridge 22 to the IPS.

Various embodiments have been illustrated herein having a magnetic biasing system 14702 generally consistent with FIGS. 147-149; however, it should be appreciated that this is for illustrative purposes only and that other biasing systems described herein may be used.

With reference to FIG. 151, one embodiment of a blade cartridge 22 including a blade retention clip 14720 for mounting, securing, and/or otherwise coupling one or more (e.g., a plurality) of razor blades 142 is generally illustrated. The blade retention clip 15120 described herein may be used for mounting, securing, and/or otherwise coupling any razor blade known to those skilled in the art, and is not limited to any of the embodiments described herein unless specifically claimed as such. Additionally (or alternatively), the blade retention clip 15120 may be used for mounting, securing, and/or otherwise coupling any shaving aid(s) 160, skin engaging strip(s) 170, skin lubricating strip(s) 172, 176, skin lubricating and/or moisturizing strip(s) 174 (not shown), or the like. As such, the blade retention clip 15120 may be used for mounting, securing, and/or otherwise coupling one or more razor blades 142 and/or any combination of shaving aid(s) 160, skin engaging strip(s) 170, skin lubricating strip(s) 172, 176, skin lubricating and/or moisturizing strip(s) 174, or the like.

As discussed herein, the blade cartridge 22 may include a housing and/or frame 188 which may be formed of plastic or metal, such as stainless steel. The blade cartridge 22 (e.g., frame/housing 188) may include a front edge region 157, a rear/aft edge region 159, a first lateral edge region 161, and a second lateral edge region 163. In the illustrated embodiment, a blade retention clip 15120 is used at each longitudinal end 150, 152 of the razor blade 140, though this is for illustrative purposes and only one lateral end 150, 152 of the razor blade 142 may be secured with a blade retention clip 15120.

Turning now to FIG. 152, one embodiment of a blade retention clip 15120 may be configured to be at least partially received within a retention cavity 3522 formed in the blade assembly 22 (e.g., the frame 188) is generally illustrated. With reference to both FIGS. 152 and 153A, the blade retention clip 15120 may include one or more legs or extensions 3526 extending outward (e.g., downward) from a base region 3528 (which may extend across the mounting width Wm of one or more of the razor blades 142, shaving aid(s) 160, skin engaging strip(s) 170, skin lubricating strip(s) 172, 176, skin lubricating and/or moisturizing strip(s) 174, or the like that are being retained by the blade retention clip 15120). The blade retention clip 15120 may allow the blade(s) 140 to be loaded/inserted from the outside/exterior (front and/or rear) of the blade cartridge 22, for example, during the assembly of the blade cartridge 22.

The blade retention clip 15120 may optionally include one or more blade retention clip magnets 15122 (best seen in FIG. 153A). The blade retention clip magnets 15122 may be configured to secure and/or aid in securing the blade retention clip 15120 to the blade assembly 22 (e.g., frame 188). For example, the blade retention clip magnets 15122 may be configured to generate an attractive and/or repulsive magnetic force with one or more frame magnets 15124 (FIG. 152). The frame magnets 15124 (FIG. 153B) may be located anywhere on the blade assembly 22 (e.g., frame 188). In the illustrated embodiment, the frame magnets 15124 are located proximate to the sidewalls 3532 of the blade cavity 3522, though this is not a limitation of the present disclosure unless specifically claimed.

Turning now to FIGS. 154-155B, a portion of the legs 3526 (e.g., the distal region) of the blade retention clip 15120 may optionally include one or more barbs or the like 3530. The barbs 3530 may be configured to engage against a portion of the surface 3532 (FIGS. 154 and 155B) of the sidewall of the blade cavity 3522 to generally retain, secure, mount, and/or couple the blade retention clip 15120 to the blade cavity 3522/blade assembly 22, and therefore generally retain, secure, mount, and/or couple the razor(s) 140 to the blade cavity 3522/blade assembly 22. The surface 3532 (FIGS. 154 and 155B) of the sidewall of the blade cavity 3522 may optionally include a shoulder, recess, and/or groove 3534 configured to engage the barb 3530 and create a mechanical connection to further facilitate retaining the blade retention clip 15120 within the blade cavity 3522.

The magnetic force generated by the blade retention clip magnets 15122 and/or frame magnets 15124 may be configured to urge the legs 3526 into engagement (e.g., frictional and/or form lock connections). In the illustrated embodiment, the magnetic force generated by the blade retention clip magnets 15122 and/or frame magnets 15124 may be configured to urge the barbs 3520 into contact with at least a portion of the surface 3532 (FIG. 154) of the sidewall of the blade cavity 3522 (e.g., shoulder 3534) to generally retain, secure, mount, and/or couple the blade retention clip 15120 to the blade cavity 3522/blade assembly 22, and therefore generally retain, secure, mount, and/or couple the razor(s) 140 to the blade cavity 3522/blade assembly 22.

It should be appreciated that the blade cartridge 22 does not have to have both the blade retention clip magnets 15122 and the frame magnets 15124, but rather may include only one of the magnets 15122, 15124. For example, FIGS. 156-157B generally illustrate one embodiment in which only the blade retention clip 15120 includes a blade retention clip magnet 15122 (i.e., the frame 188 does not include the frame magnet 15124). In particular, one or more blade retention clip magnets 15122 may be magnetically attracted towards one or more ferrous members 15602 (e.g., ferrous strips, ferrous plates, or the like) secured to a portion of the frame 188 (e.g., but not limited to, proximate to sidewalls 3532 of the blade cavity 3522), thereby securing the blade retention clip 15120 within the blade cavity 3522. Again, this is merely one example, and other embodiments are possible such as, but not limited to, the frame 188 including one or more frame magnets 15124 configured to be magnetically attracted towards one or more ferrous members 15602 of the blade retention clip 15120.

Referring now to FIGS. 158-161, another embodiment of a shaving device 10 is generally illustrated. In particular, FIG. 158 generally illustrates one embodiment of the shaving device 10 in an assembled state, FIG. 159 generally illustrates the shaving device 10 of FIG. 158 in an exploded, unassembled state, FIG. 160 is a cross-sectional view of the shaving device 10 of FIG. 158 taken along lines C160-C160, and FIG. 161 is a cross-sectional view of the shaving device 10 of FIG. 159 taken along lines C161-C161.

The shaving device 10 may include a head assembly 15820 and a handle 15860. The head assembly 15820 comprises a blade cartridge 15822 and a blade cartridge support member 15824. As shown, blade cartridge support member 15824 comprises a generally U-shaped cartridge support frame 15826 including at least one arm 15830, though this is not a limitation of the present disclosure unless specifically claimed and the support frame 15826 may include any configuration. The support frame 15826 may be either permanently coupled and/or integral with the handle 15860 (e.g., a unitary piece with the handle 15860) or may be removably coupled to the handle 15860 in any manner known to those skilled in the art and/or described herein.

The blade cartridge 15822 is configured to be pivotally coupled to the blade cartridge support member 15824 in any manner known to those skilled in the art and/or described herein. The blade cartridge 15822 further comprises one or more replaceable blade assemblies 15800 configured to be removably coupled to a blade cartridge retention frame 15802. The replaceable blade assemblies 15800 may include a replaceable blade assembly body 15801 and one or more razor blades 142, shaving aid(s) 160, skin engaging strip(s) 170, skin lubricating strip(s) 172, 176, skin lubricating and/or moisturizing strip(s) 174 (not all shown for clarity) coupled thereto.

The blade cartridge retention frame 15802 may define one or more replaceable blade cavities 15804 configured to receive at least a portion of one or more replaceable blade assemblies 15800. While the blade cartridge retention frame 15802 is illustrated having a single replaceable blade cavity 15804 configured to receive a single replaceable blade assemblies 15800 on a single face of the blade cartridge retention frame 15802, it should be appreciated that the blade cartridge retention frame 15802 may include more than one replaceable blade cavity 15804 on one or more faces thereof and/or that one or more of the replaceable blade cavities 15804 may be configured to at least partially receive more than one replaceable blade assembly 15800.

The replaceable blade assemblies 15800 and/or the blade cartridge retention frame 15802/replaceable blade cavities 15804 may include one or more replaceable blade assembly magnets 15806. For example, both the replaceable blade assemblies 15800 and the blade cartridge retention frame 15802/replaceable blade cavities 15804 may each include one or more replaceable blade assembly magnets 15806 configured to generate an attractive and/or repulsive magnetic force to removably couple the replaceable blade assembly 15800 to the blade cartridge retention frame 15802/replaceable blade cavities 15804.

Alternatively (or in addition), the replaceable blade assemblies 15800 may include one or more ferrous members 15808 (e.g., ferrous strips, ferrous plates, or the like) and the blade cartridge retention frame 15802/replaceable blade cavities 15804 may include one or more replaceable blade assembly magnets 15806. The replaceable blade assembly magnets 15806 of the blade cartridge retention frame 15802/replaceable blade cavities 15804 may be configured to be magnetically attracted towards the ferrous members 15808 of the replaceable blade assemblies 15800, thereby securing the replaceable blade assembly 15800 to the blade cartridge retention frame 15802/replaceable blade cavities 15804. It should be appreciated, however, that the replaceable blade assembly 15800 may include one or more replaceable blade assembly magnets 15806 configured to be magnetically attracted towards one or more ferrous members 15808 of the blade cartridge retention frame 15802/replaceable blade cavities 15804.

Referring now to FIGS. 162-165, another embodiment of a shaving device 10 is generally illustrated. In particular, FIG. 162 generally illustrates one embodiment of the shaving device 10 in an assembled state, FIG. 163 generally illustrates the shaving device 10 of FIG. 162 in an exploded, unassembled state, FIG. 164 is a cross-sectional view of the shaving device 10 of FIG. 162 taken along lines C164-C164, and FIG. 165 is a cross-sectional view of the shaving device 10 of FIG. 163 taken along lines C165-C165.

The shaving device 10 may include a head assembly 16220 and a handle 16260. The head assembly 16220 comprises a blade cartridge 16222 and a blade cartridge support member 16224. As shown, blade cartridge support member 16224 comprises a generally U-shaped cartridge support frame 16226 including at least one arm 16230, though this is not a limitation of the present disclosure unless specifically claimed and the support frame 16226 may include any configuration. The support frame 16226 may be either permanently coupled and/or integral with the handle 16260 (e.g., a unitary piece with the handle 16260) or may be removably coupled to the handle 16260 in any manner known to those skilled in the art and/or described herein.

The blade cartridge 16222 is configured to be pivotally coupled to the blade cartridge support member 16224 in any manner known to those skilled in the art and/or described herein. The blade cartridge 16222 further comprises one or more replaceable blade assemblies 16200 configured to be removably coupled to a blade cartridge retention frame 16202. The replaceable blade assemblies 16200 may include a replaceable blade assembly body 16201 and one or more razor blades 142, shaving aid(s) 160, skin engaging strip(s) 170, skin lubricating strip(s) 172, 176, skin lubricating and/or moisturizing strip(s) 174 (not all shown for clarity) coupled thereto.

The blade cartridge retention frame 16202 may define one or more replaceable blade cavities 16204 configured to receive at least a portion of one or more replaceable blade assemblies 16200. While the blade cartridge retention frame

16202 is illustrated having a single replaceable blade cavity 16204 configured to receive a single replaceable blade assemblies 16200 on a single face of the blade cartridge retention frame 16202, it should be appreciated that the blade cartridge retention frame 16202 may include more than one replaceable blade cavity 16204 on one or more faces thereof and/or that one or more of the replaceable blade cavities 16204 may be configured to at least partially receive more than one replaceable blade assembly 16200.

The replaceable blade assembly 16200 may include one or more locking features 16206 configured to engage with one or more corresponding locking features 16208 of the blade cartridge retention frame 16202/replaceable blade cavities 16204 to releasably couple the replaceable blade assembly 16200 to the blade cartridge retention frame 16202/replaceable blade cavities 16204. One or more of the locking features 16206, 16208 may include a ratchet, deformable pawl, clip, detent, protrusion, or the like configured to engage a corresponding ratchet, deformable pawl, clip, detent, groove, slot, opening, cavity, passageway, or the like. For example, the locking feature 16206 of the replaceable blade assembly 16200 may include a biased, deformable pawl configured to releasably engage a cavity 16208 of the blade cartridge retention frame 16202/replaceable blade cavities 16204, though this is merely an example and that the present disclosure is not limited to this arrangement unless specifically claimed as such. Also, it should be appreciated that the replaceable blade assembly 16200 and/or the blade cartridge retention frame 16202/replaceable blade cavities 16204 may optionally include one or more replaceable blade assembly magnets 15806 and/or ferrous members 15808 as described herein.

Referring now to FIGS. 166-168, one embodiment of a shaving device 10 is generally illustrated in which one or more razor blades 142 and/or any combination of shaving aid(s) 160, skin engaging strip(s) 170, skin lubricating strip(s) 172, 176, skin lubricating and/or moisturizing strip(s) 174, or the like are secured to a blade cartridge 22 as generally illustrated in FIG. 168. With reference to FIG. 166, the shaving device 10 may include a head assembly 16620 which may either removably or permanently coupled to a handle 16660 as described herein. The head assembly 16620 comprises a blade cartridge 16622 and a blade cartridge support member 16624. As shown, blade cartridge support member 16624 comprises a generally U-shaped cartridge support frame 16626 including at least one arm 16630, though this is not a limitation of the present disclosure unless specifically claimed and the support frame 16626 may include any configuration. The blade cartridge 16622 is configured to be pivotally coupled to the blade cartridge support member 16624 in any manner known to those skilled in the art and/or described herein.

The blade cartridge 16622 includes a frame 16688 including one or more blade cartridge retaining magnets 16602*a-n*. The blade cartridge retaining magnets 16602 may be proximate to and/or disposed within a blade cartridge retaining cavity 16604 formed in the frame 16688. The blade cartridge retaining magnets 16602*a-n* may be used during process of assembling the blade cartridge 16622 to properly align one or more razor blades 142 and/or any combination of shaving aid(s) 160, skin engaging strip(s) 170, skin lubricating strip(s) 172, 176, skin lubricating and/or moisturizing strip(s) 174. For example, a first set of blade cartridge retaining magnets 16602*a*, 16602*b* (FIG. 166) may be disposed at generally opposite lateral ends of the frame 16688/blade cartridge retaining cavity 16604 and may be used to align and/or generally retain a shaving aid 160 (FIG. 167). Similarly, another set of blade cartridge retaining magnets 16602*c*, 16602*d* (FIG. 166) may be disposed at generally opposite lateral ends of the frame 16688/blade cartridge retaining cavity 16604 and may be used to align and/or generally retain a razor blade 142 (FIG. 167). The blade cartridge 16622 may include a set of blade cartridge retaining magnets 16602 corresponding to each razor blade 142 and/or shaving aid 160. It should be appreciated that the first and/or second sets of blade cartridge retaining magnets 16602 may include one or more blade cartridge retaining magnets 16602.

The known methods of assembling razor blades into a cartridge assembly involve the use of expensive, precision machinery. The use of the blade cartridge retaining magnets 16602 may eliminate the need for this expensive, precision machinery. In particular, the blade cartridge retaining magnets 16602 may be secured to the frame 16688, and thereafter, the razor blades 142 and/or shaving aids 160 may be "pulled", drawn, attracted into place/alignment within the frame 16688/blade cartridge retaining cavity 16604. The razor blades 142 and/or shaving aids 160 may include a material that is magnetically attracted to the blade cartridge retaining magnets 16602 such as, but not limited to, ferrous materials and/or magnetic materials.

Once the razor blades 142 and/or shaving aids 160 are aligned with respect to the frame 16688/blade cartridge retaining cavity 16604, one or more retaining clips 16802 may be used to secure the razor blades 142 and/or shaving aids 160. The retaining clips 16802 may include any retaining clip known to those skilled in the art and/or described herein.

It should be appreciated that one or more of the blade cartridge retaining magnets 16602*a-n* may be configured to generate a repulsive magnetic force with the razor blades 142, thereby causing a biasing/blade cushioning action between the razor blades 142 and the blade cartridge retaining magnets 16602*a-n*. The razor blades 142 may be generally secured to the blade cartridge 16222 by way of one or more retaining clips 16802, however, the blade cartridge retaining/biasing magnets 16602*a-n* may allow the razor blades 142 to move inwardly toward the blade cartridge 16222 upon application of an external force during a razor stroke. In such an embodiment, each lateral edge of the blade cartridge retaining cavity 16604 may include one or more blade cartridge retaining/biasing magnets 16602*a-n* which may bias one or more razor blades 142. The blade cartridge retaining/biasing magnets 16602*a-n* may be used in lieu of traditional spring fingers.

Turning now to FIGS. 169-170, another embodiment of shaving device 10 is generally illustrated. In the illustrated embodiment, the handle 60 includes a handle protrusion, projection, or post 9302 that is sized and shaped to be at least partially received within a support member cavity 9304 form in the blade cartridge support member 24, e.g., a portion of the yoke or yoke region 47 that generally locates the position of the disposable head assembly 20 (e.g., the blade cartridge support member 24) relative to the handle 60. In the illustrated embodiment, the handle post 9302 has a generally cylindrical shape and the support member cavity 9304 has a generally tubular shape having an interior diameter that generally corresponds to the outer diameter of the handle post 9302, though this is for illustrative purposes only and it should be appreciated that many other shapes are possible.

The handle post 9302 may include one or more disc or central magnets 9312 that at least partially pass through a central region 9314 of one or more ring or annular magnets 9316 coupled to the blade cartridge support member 24 (e.g., the support member cavity 9304 and/or a central portion of the yoke region 47) as generally described herein. The support member cavity 9304 and the central region 9314 of the annular magnet 9316 may be substantially concentric. According to one embodiment, the blade cartridge support member 24 may optionally include a turret 9320 that extends outwardly generally towards the blade cartridge 22. A distal portion of the central magnet 9312 may be substantially coplanar with an opening or inner face of the turret 9320 or may extend through the opening.

As described herein (see, e.g., FIGS. 79-82 and the corresponding description), the poles of the central magnet 9312 and the annular magnet 9316 are aligned such that a repulsive magnetic force is generated between the magnets 9312, 9316 thereby urging the blade cartridge support member 24 and the handle 60 together. It should be appreciated, however, that the shaving device of FIGS. 169-170 is not limited to the resistive pivot mechanism and/or a connection mechanism illustrated in FIGS. 79-82 and/or 169-170, and that any resistive pivot mechanism and/or connection mechanism described herein may be used.

The handle 60 may include one or more handle rotation magnets 16901 configured to generate an attractive magnetic force with one or more blade cartridge rotation magnets 16903 of the blade cartridge 22/support member 24. The attractive magnetic force between the handle rotation magnets 16901 and blade cartridge rotation magnets 16903 may allow the blade cartridge support member 24 to rotate/twist with respect to the handle 60 clockwise and counter-clockwise from an initial or central starting position in the direction of arrow 9310, and may urge the blade cartridge support member 24 back towards the initial/central starting position in which the poles of the handle rotation magnets 16901 and blade cartridge rotation magnets 16903 are aligned. Optionally, the attractive magnetic force between the handle rotation magnets 16901 and blade cartridge rotation magnets 16903 may aid in generally securing and/or retaining the blade cartridge support member 24 to the handle 60.

Optionally, the handle post 9302 may include one or more rotation limiters 16906 that engage one or more corresponding rotation limiters 16908 of the support member cavity 9304. The rotation limiters 16906, 16908 may generally limit the rotation of the blade cartridge support member 24 with respect to the handle 60 in the direction generally illustrated by arrow 9310, thereby ensuring that the attractive magnetic force between the handle rotation magnets 16901 and blade cartridge rotation magnets 16903 is sufficient to urge the blade cartridge support member 24 back to the central position by ensuring that the poles of the handle rotation magnets 16901 and blade cartridge rotation magnets 16903 from separating too far. By way of a non-limiting example, the rotation limiters 16906, 16908 may include a protrusion and groove that engage each other to generally limit the rotation to a predefined range.

In the illustrated embodiment, the handle 60 and blade cartridge 22/support member 24 each include two handle rotation magnets 16901 and blade cartridge rotation magnets 16903, respectively. The two handle rotation magnets 16901 and blade cartridge rotation magnets 16903 may be disposed approximately 180 degrees opposite from each other with respect to the handle 60 and blade cartridge 22/support member 24. It should be appreciated, however, that the handle 60 and/or the blade cartridge 22/support member 24 may include one or more handle rotation magnets 16901 and blade cartridge rotation magnets 16903. For example, one or more of the handle rotation magnets 16901 and/or blade cartridge rotation magnets 16903 may include an arcuate shaped and/or ring shaped magnet.

It should also be appreciated that one or more handle rotation magnets 16901 and blade cartridge rotation magnets 16903 (and optionally the rotation limiters 16906, 16908) may be located between main portion 16998 and collar portion 16999 of the handle 60. In such an embodiment, the blade cartridge 22 may be coupled to the handle 60 in any manner known to those skilled in the art and/or described herein.

Turning now to FIGS. 171-173, one embodiment of an ISP protrusion 9328 and/or blade cartridge rotation limiter 35 (collectively referred to as a blade cartridge biased limiter 17102) is generally illustrated. In particular, FIG. 171 generally illustrates a head assembly 20, FIG. 172 generally illustrates region C172 of FIG. 171 including the blade cartridge biased limiter 17102 in an extended position, and FIG. 173 generally illustrates the blade cartridge biased limiter 17102 of FIG. 172 in a retracted position.

With reference to FIG. 171, the head assembly 20 may include a blade cartridge 22 pivotally coupled to a blade cartridge support member 24. It should be appreciated that the head assembly 20 may include any blade cartridge 22 and blade cartridge support member 24 described herein. The blade cartridge support member 24 may include one or more arms 30 extending outwardly from a yoke 47 as generally described herein. One or more of the arms 30 and/or yoke 47 may include one or more blade cartridge biased limiters 17102. As described herein, the blade cartridge biased limiters 17102 may set an initial starting positon of the blade cartridge 22 and/or may generally limit the rotation of the blade cartridge 22 about the pivot axis PA.

Turning now to FIG. 172, one embodiment of the blade cartridge biased limiters 17102 is generally illustrated. The blade cartridge biased limiters 17102 may include a detent and/or pawl 17202 at least partially disposed within a detent cavity 17204. The detent cavity 17204 may be formed in any portion of the blade cartridge support member 24 such as, but not limited to, the arm 30 and/or yoke 47. The detent cavity 17204 includes a detent opening 17206 (best seen in FIG. 173). The detent 17202 may have a size and shape configured to allow a portion of the detent 17202 to extend through the detent opening 17204 when the blade cartridge biased limiters 17102 in the extended position as shown in FIG. 172 while also generally preventing the detent 17202 from passing entirely through the detent opening 17206.

The detent 17202 is biased in the extended position by one or more biasing devices 17208 (e.g., but not limited to, a spring, coil spring, torsion spring, elastomeric/rubber material, deformable material or the like) such that a portion of the detent 17202 may contact against a portion of the blade cartridge 22 as generally illustrated in FIG. 171. When in the extended position, the detent 17202 may engage the blade cartridge 22 to set the initial starting positon of the blade cartridge 22 and/or may generally limit the rotation of the blade cartridge 22 about the pivot axis PA as described herein. Upon application of a sufficient force to the blade cartridge 22, the force of the biasing member 17208 may be overcome and the detent 17202 may be urged at least partially into the detent cavity 17204 such that the blade cartridge 22 may pass by the detent 17202 as generally illustrated in FIG. 173.

While the blade cartridge biased limiters 17102 is illustrated as part of the blade cartridge support member 24 and engaging the blade cartridge 22, it should be appreciated that this arrangement may be reversed. For example, the blade cartridge biased limiters 17102 may be part of the blade cartridge 22 and may engage a portion of the blade cartridge support member 24.

With reference now to FIGS. 174-179, another embodiment of shaving device 10 is generally illustrated. In particular, FIG. 174 is an end perspective view of the shaving device 10 in an exploded, unassembled state, FIG. 175 a top view of part of the blade cartridge 22 and handle 60 of FIG. 174, FIG. 176 is an end view of the blade cartridge 22 of FIG. 175, FIG. 177 is an end view of the handle 60 of FIG. 175, FIG. 178 is a cross-sectional view of the blade cartridge 22 taken into the page along lines C178-C178 of FIG. 176, and FIG. 179 is a cross-sectional view of the handle 60 taken into the page along lines C179-C179 of FIG. 177.

With reference to FIG. 174, the handle 60 includes a handle protrusion, projection, or post 9302 that is sized and shaped to be at least partially received within a support member cavity 9304 form in the blade cartridge support member 24, e.g., a portion of the yoke or yoke region 47 that generally locates the position of the disposable head assembly 20 (e.g., the blade cartridge support member 24) relative to the handle 60. In the illustrated embodiment, the handle post 9302 has a generally cylindrical shape and the support member cavity 9304 has a generally tubular shape having an interior diameter that generally corresponds to the outer diameter of the handle post 9302, though this is for illustrative purposes only and it should be appreciated that many other shapes are possible.

The handle post 9302 may include one or more disc or central magnets 9312 that at least partially pass through a central region 9314 of one or more ring or annular magnets 9316 coupled to the blade cartridge support member 24 (e.g., the support member cavity 9304 and/or a central portion of the yoke region 47) as generally described herein. The support member cavity 9304 and the central region 9314 of the annular magnet 9316 may be substantially concentric. According to one embodiment, the blade cartridge support member 24 may optionally include a turret 9320 that extends outwardly generally towards the blade cartridge 22. A distal portion of the central magnet 9312 may be substantially coplanar with an opening or inner face of the turret 9320 or may extend through the opening. As described herein (see, e.g., FIGS. 79-82 and the corresponding description), the poles of the central magnet 9312 and the annular magnet 9316 are aligned such that a repulsive magnetic force is generated between the magnets 9312, 9316 thereby urging the blade cartridge support member 24 and the handle 60 together.

It should be appreciated that the handle 60, rotating/twisting mechanism described above, collar and blade cartridge support member 24 may all one integral unit and the blade cartridge 22 may attach/detach at the top of the arms 30 (e.g., but not limited to, as shown in FIG. 182).

With reference now to FIGS. 174-179, the blade cartridge support member 24 (e.g., the support member cavity 9304) and the handle 60 (e.g., the handle post 9302) may also include at least one set of cooperating ramps 17402, 17404. The cooperating ramps 17402, 17404 each include a ramp surface 17406, 17408, respectively, configured to allow the blade cartridge support member 24 to rotate/twist with respect to the handle 60 clockwise and counter-clockwise from an initial or central starting position in the direction of arrow 9310 and to urge the blade cartridge support member 24 longitudinally relative to the handle 60 in the direction of arrow 17410. The longitudinal movement 17410 of the blade cartridge support member 24 relative to the handle 60 creates a longitudinal displacement/gap between a portion of the blade cartridge support member 24 (e.g., a portion of the yoke 47) and the distal end 17412 of the handle 60 proximate to the handle post 9302). The longitudinal displacement/gap cause the magnets 9312, 9316 to become closer to each other, thereby increasing the repulsive magnetic force between the blade cartridge support member 24 and the handle 60. Once the twisting force is removed, the repulsive magnetic force generated by the magnets 9312, 9316 (along with the ramp surfaces 17406, 17408 of the cooperating ramps 17402, 17404) urges the blade cartridge support member 24 back towards the initial/central starting position relative to the handle 60.

In the illustrated embodiment, the ramp member 17402 of the blade cartridge support member 24 includes one or more grooves, recesses, and/or notches that is open to a portion of the support member cavity 9304 and extends from a proximal region 17802 (FIG. 178) of the support member cavity 9304 partially towards a distal region 17804 of the support member cavity 9304. The grooves, recesses, and/or notches include one or more arcuate (e.g., but not limited to, V-shaped and/or U-shaped) ramp surfaces 17406. The ramp member 17404 of the handle 60 includes a protrusion extending outwardly from a portion of the handle post 9302. A distal region 17902 (FIG. 179) of the protrusion includes one or more arcuate (e.g., but not limited to, V-shaped and/or U-shaped) ramp surfaces 17408. The ramp members 17402, 17404 are configured such that when the handle post 9302 of the handle 60 is received in the support member cavity 9304, the ramp surfaces 17406, 17408 contact each other. Rotation of the blade cartridge 22 relative to the handle 60 in the direction of arrow 9310 may cause the ramp surfaces 17406, 17408 to slide against each other, thereby causing the blade cartridge support member 24 to move longitudinally away from the handle 60 in the direction of arrow 17410. As discussed above, when the rotational force is removed/reduced, the repulsive magnetic force between the magnets 9312, 9316 urge the blade cartridge support member 24 back towards the handle 60, and the ramp surfaces 17406, 17408 slide against each other causing the blade cartridge support member 24 to rotate in a direction that is opposite to the initially rotation direction. Once the ramp surfaces 17406, 17408 reach an inflection point, the blade cartridge support member 24 stops moving relative to the handle 60 and is set back at the central/initial starting position.

The blade cartridge support member 24 and the handle 60 may each include a plurality of cooperating ramps 17402, 17404. For example, the blade cartridge support member 24 and the handle 60 may each include two cooperating ramps 17402, 17404 arranged on generally opposites sides of the support member cavity 9304 and handle post 9302. Additionally, it should be appreciated that the arrangement of notched and protrusion surfaces 17406, 17408, and of the cooperating ramps 17402, 17404 may be reversed (i.e., the support member cavity 9304 may include a protrusion surface 17408 and handle post 9302 may include a notch surface 17406).

Turning now to FIGS. 180-181, another embodiment of shaving device 10 is generally illustrated. The blade cartridge support member 24 (e.g., a portion of the yoke or yoke region 47) includes a protrusion, projection, or post 18002 that is sized and shaped to be at least partially received within a cavity 18004 form in the handle 60 that generally locates the position of the disposable head assembly 20 (e.g., the blade cartridge support member 24) relative to the handle 60. In the illustrated embodiment, the post 18002 has a generally cylindrical shape and the cavity 18004 has a generally tubular/cylindrical shape having an interior diameter that generally corresponds to the outer diameter of the post 18002, though this is for illustrative purposes only and it should be appreciated that many other shapes are possible.

The handle 60 may include one or more handle rotation magnets 18001 configured to generate an attractive magnetic force with one or more blade cartridge rotation magnets 18003 of the blade cartridge 22/support member 24. The attractive magnetic force between the handle rotation magnets 18001 and blade cartridge rotation magnets 18003 may generally secure and/or retain the blade cartridge support member 24 to the handle 60. Additionally, the attractive magnetic force between the handle rotation magnets 18001 and blade cartridge rotation magnets 18003 may allow the blade cartridge support member 24 to rotate/twist with respect to the handle 60 clockwise and counter-clockwise from an initial or central starting position in the direction of arrow 9310, and may urge the blade cartridge support member 24 back towards the initial/central starting position in which the poles of the handle rotation magnets 18001 and blade cartridge rotation magnets 18003 are aligned.

Optionally, the post 18002 includes one or more rotation limiters 18006 configured to engage one or more corresponding rotation limiters 18008 of the cavity 18004. The rotation limiters 18006, 18008 may generally limit the rotation of the blade cartridge support member 24 with respect to the handle 60 in the direction generally illustrated by arrow 9310, thereby ensuring that the attractive magnetic force between the handle rotation magnets 18001 and blade cartridge rotation magnets 18003 is sufficient to urge the blade cartridge support member 24 back to the central position by ensuring that the poles of the handle rotation magnets 18001 and blade cartridge rotation magnets 18003 from separating too far. By way on a non-limiting example, the rotation limiters 18006, 18008 may include a protrusion and groove that engage each other to generally limit the rotation to a predefined range.

In the illustrated embodiment, the handle 60 and blade cartridge 22/support member 24 each include two handle rotation magnets 18001 and blade cartridge rotation magnets 18003, respectively. The two handle rotation magnets 18001 and blade cartridge rotation magnets 18003 may be disposed approximately 180 degrees opposite from each other with respect to the handle 60 and blade cartridge 22/support member 24. It should be appreciated, however, that the handle 60 and/or the blade cartridge 22/support member 24 may include one or more handle rotation magnets 18001 and blade cartridge rotation magnets 18003. For example, one or more of the handle rotation magnets 18001 and blade cartridge rotation magnets 18003 may include an arcuate shaped and/or ring shaped magnet.

Additionally, it should be appreciated that while the blade cartridge 22 is illustrated with a post 18002 and the handle 60 is illustrated with a cavity 18004, this arrangement may be reversed. Additionally, the arrangement of the protrusion and groove of the rotation limiters 18006, 18008 may also be reversed.

Turning now to FIG. 182, a blade cartridge connection mechanism for securing a blade cartridge 22 to a blade cartridge support member 24. The blade cartridge 22 may include any blade cartridge known to those skilled in the art including, but not limited to, any blade cartridge 22 described herein. The head assembly 20 may optionally include any resistive pivot mechanism described herein such as, but not limited to, a magnetic resistive pivot mechanism. As shown, blade cartridge support member 24 comprises a generally U-shaped cartridge support frame 26 having two generally curved support arms 30 (a generally C-shape or L-shape); however, it should be appreciated that this is not a limitation of the present disclosure unless specifically claimed as such.

The blade cartridge 22 may include a frame 188 (which may be either one piece or multi-piece such as, but not limited to, a clam-shell design) having one or more pivot pin/cylinder 34 extending outwardly from the lateral edges of the frame 188 (e.g., a single pivot pin/cylinder 34 that extends across the entire frame 188 or a first and a second pivot pin/cylinder 34 extending outwardly from a first and a second lateral edge of the frame 188, respectively). One or more portions (e.g., distal end regions) of the pivot pin/cylinder 34 may include one or more magnets and/or ferrous materials.

The blade cartridge support member 24 includes one or more pivot receptacles 32. For example, each support arm 30 may include a pivot receptacle 32. At least one of the pivot receptacles 32 may include a receiving pocket or cavity 18202 configured to receive at least a portion of the pivot pin/cylinder 34 located on one of the opposing lateral sides of the blade cartridge 22.

The pocket or cavity 18202 may include an open end 18204 through which the pivot pin/cylinder 34 may be received into the pocket or cavity 18202. The pocket or cavity 18202 may also include tapered entry and/or tapered sidewalls to facilitate entry of the pivot pin/cylinder 34 into the pocket or cavity 18202. According to one embodiment, the pivot receptacle 32 includes one or more arm magnets 18206 (e.g., one or more permanent magnets and/or electromagnets). The arm magnets 18206 may be configured to create an attractive magnetic force with the pivot pin/cylinder 34 received therein. For example, the pivot pin/cylinder 34 may include a ferrous material that is magnetically attracted to the arm magnets 18206, thereby mounting, securing, and/or otherwise coupling the blade cartridge 22 to the blade cartridge support member 24. Alternatively (or in addition), the pivot pin/cylinder 34 may include a magnet having its poles align such that it is magnetically attracted to the arm magnets 18206, thereby mounting, securing, and/or otherwise coupling the blade cartridge 22 to the blade cartridge support member 24. In either case, the blade cartridge 22 may rotate about the pivot axis PA relative to the blade cartridge support member 24 at any angle, up to and including 360° degrees.

The blade cartridge 22 may include one or more blade cartridge magnets 18208 coupled and fixed to one or more of the lateral edges of the blade cartridge 22 and generally facing the arm magnets 18206. Similar to the arm magnets 18206, the blade cartridge magnets 18208 may also have a square, rectangular, oblong, oval, and/or elongated shape. The arm magnets 18206 and the blade cartridge magnets 18208 may be aligned to generate an attractive magnetic force.

The lateral edges of the blade cartridge 22 may also include one or more rotation limiters 18210. The rotation limiters 18210 may be disposed proximate to the pivot pin/cylinder 34, and may be configured to engage a portion of the arm 30 to generally limit the rotation of the blade cartridge 22 about the pivot axis PA to a predefined range. It should be appreciated that one or more arms 30 may include one or more rotation limiters 18210 which may engage against a portion of the blade cartridge 22 (e.g., but not limited to, the rotation limiters 18210 of the blade cartridge 22).

In practice, the user may position the unassembled blade cartridge 22 proximate to the opening 18204 of the pocket or cavity 18202 until the magnetic attraction generated between the pivot pin/cylinder 34 and/or blade cartridge magnets 18208 and the pocket or cavity 8602 (by the one or more arm magnets 18206) causes the pivot pin/cylinder 34 to attach to the pocket or cavity 18202 of the pivot receptacle 32, and the arm magnets 18206 to align with the blade cartridge magnets 18208 in the initial starting position. Likewise, the user may dispose (e.g., remove) the blade cartridge 22 from the pivot receptacle 32 by manually placing a thumb and forefinger on each lateral end of blade cartridge 22 (or use a tool) to pry or dislodge the pivot pin/cylinder 34 (and therefore the blade cartridge 22) from the pocket or cavity 18202 of the pivot receptacle 32.

It should be appreciated that while the pivot receptacle 32 is illustrated having one arm magnet 18206 in each arm 30, the arm magnets 18206 may optionally be disposed in only one or more of the pivot pin/cylinders 34/arms 30. Moreover, the location of one or more of the pivot receptacles 32 and the pivot pins 34 may be switched (e.g., one or more of the pivot receptacles 32 may be located in the blade cartridge 22 and one or more of the pivot pins/cylinders 34 may extend outwardly from the support arms 30 of the blade cartridge support member 24).

Additionally, while the blade cartridge 20 is shown being releasably coupled to the handle 60, the blade cartridge support member 24 and the handle 60 may optionally be an integral, unitary or one-piece construction (i.e. a disposable razor).

Turning now to FIGS. 183-185, any of the connection systems for removably connecting a disposably head assembly 20/blade cartridge 22 to the handle 60 may be used to removably secure other devices to the handle 60. For example, the connection systems described herein (such as, but not limited to, the attractive and/or repulsive magnetic connection systems) may be used to removably connect a brush 18300 (FIG. 183) (e.g., hair brush and/or toothbrush) to the handle 60, a tooth pick 18400 (FIG. 184) to the handle 60, tweezers 18500 (FIG. 185) to the handle 60, and/or dental floss 18600 (FIG. 186) to the handle 60. It should be appreciated that this is not an exhaustive list of implements/devices that may be coupled to the handle 60, and that other personal hygiene implements/devices may be removably coupled to the handle 60.

Any of the magnets described herein may include nanotechnology materials. It should be appreciated that any of the resistive pivot mechanisms described herein or any combination described herein (such as, but not limited to, the magnetic resistive pivot mechanisms) may be used with any head assembly, and is therefore not limited to a multi-faced head assembly. For example, the resistive pivot mechanisms described herein may be used with a head assembly having razor blades only a single face, and that only pivots about the single face. The resistive pivot mechanisms described herein may also be used with a head assembly of any conventional shaving device, which may have razor blades disposed on only one face of a single sided cartridge head assembly that only pivots about the single side containing the razor blades. It should be further appreciated that any of the resistive pivot mechanisms described herein (such as, but not limited to, the magnetic resistive pivot mechanisms) may provide the added benefit of greatly increasing the predefined degree of rotation, particularly compared to traditional single sided razors, thereby providing the user with a more contoured shave.

Any one of the embodiments described herein may include a head assembly 20 which is rotatable about the longitudinal axis of the handle 60. For example, the user may select a new face by simply rotating the head assembly 20 in a plane that is substantially perpendicular to the longitudinal axis of the handle 60.

A razor consistent with one or more of the embodiments described herein may feature numerous benefits and/or advantages. For example, a razor consistent with at least one embodiment may feature a more environmentally friendly design because certain components of the dual and tri sided cartridge systems may utilize less material during the manufacturing process, than that of any two standard single sided cartridges and their packaging that are assembled individually such as, but not limited to, the connection hub, the support arms and the cartridge housing and packaging.

Additionally, or alternatively, packaging that currently holds four or five standard single sided cartridges would only need a slight modification to be able to accommodate the equivalent number of dual-sided razors consistent with at least one embodiment of the present disclosure. Essentially enabling the manufacturer to transport the equivalent of eight to ten standard single cartridges in a slightly modified container that previously held only four or five standard single cartridges. Consistent with at least one embodiment of the present disclosure, this may promote a more environmentally friendly design as the amount of containers needed to transport cartridges is dramatically reduced and roughly cut in half.

According to another embodiment, a blade cartridge having a pivot point located at or approximately the center of the cartridge head assembly, is advantageous to the user. For example, this design allows and maximizes the amount of "surface area blade contact" with the skin. Particularly over contoured areas with difficult terrain, such as the head, neck chin, body anatomy of the trunk area (including the genitals) and the legs. In contrast to the pivot point described herein, having the pivot point located at the bottom of the cartridge is disadvantageous because the bottom portion of the cartridge naturally lifts away from the surface of the skin when the biasing rod "bottoms out" as the razor is drawn over the area being shaved. This results in missed hairs and causes the user to perform additional shaving strokes. The reason this happens is because after the biasing rod bottoms out, the user continues to apply rotation to the cartridge by raising the handle upwards whilst performing a downward shaving stroke or vice versa. This in turn continues to rotate the cartridge, lifting it away from the skin, which as mentioned previously, causes missed hairs and forces the user to perform additional shaving strokes. At least one embodiment of the blade cartridge described herein addresses this problem because having the pivot point located at the center of the cartridge head assembly, coupled with the resistive pivot mechanism, allows the razor cartridge to follow the exact contour of the skin. This increases the surface area blade contact with the area being shaved and results in fewer missed hairs.

According to yet another embodiment, a razor with a dual or tri-sided rotating cartridge as described herein has significant advantages to both the consumer and the manufacturer. To the consumers and manufacturers that are environmentally sensitive and cost conscious, this design addresses both of these important concerns. A recently released consumer report from the EPA, indicated that in the USA alone, over 2 billion disposable razor cartridges are discarded annually. As described herein, one or more embodiments of the present disclosure addresses both the economic advantages to the manufacturer and the important environmental issue mentioned above because as previously mentioned, during the manufacturing process certain components of the dual cartridge system may utilize less material than that of two standard single cartridges which are assembled individually. For example, the arms, the connection hub and the cartridge head assembly may all use less material during manufacturing than that of the standard single cartridges which were assembled individually. Therefore, it is reasonable to assume that a dual or tri-sided razor cartridge system (including the containers in which the cartridges are packaged and shipped) may use less material during manufacturing than that of any two standard single cartridges and their respective containers and may be more economical to manufacture and subsequently much kinder to the environment. One important reason for this is because the reduction in manufacturing and packaging material causes the amount of cartridge containers required for shipping to be reduced. This lowers the frequency of transportation needs for distribution purposes, which cuts back on the amount of fuel being burned and released into the atmosphere, and generally reduces both green house gas emissions as well as unnecessary environmental waste.

As may be appreciated, it is becoming increasingly more popular to shave various parts of ones anatomy, and there are numerous shaving devices to facilitate this. As may be appreciated, having numerous shaving devices is expensive and cumbersome. At least one embodiment of the present disclosure features blade cartridges that will have different blade configurations depending on which cartridge the user selects, thereby giving the user the distinct advantage of needing only one device (where multiple devices were previously required) to perform multiple shaving tasks.

For example, a "standard" dual cartridge configuration may feature each cartridge side having a "3 & 3" blade arrangement in which six blades are all facing the same direction of cut, separated in the center by a lubrication strip. This configuration is particularly useful for conventional shaving purposes.

A "body" blade dual cartridge combination configuration may feature each cartridge side having a "3 & 3" blade arrangement in which six blades are separated in the center by a lubrication strip, but each side will be configured differently. On one side of the cartridge, the two sets of three blades may be separated by the lubrication strip in the center, and will be arranged in opposing directions of cut. This is a particularly useful blade arrangement for consumers that shave their head or any other awkward area of the body, as they can use a "back and forth" shaving stroke motion, without having to lift the razor from the area being shaved to begin a new stroke. Alternatively, on the second side of the cartridge, all of the blades may be in the same direction of cut for conventional shaving. This cartridge configuration gives the user great flexibility, as only one device is required to shave any part of their anatomy.

Lubrication is an essential component in the never ending quest to give the user a smoother, faster, more efficient and nick free shaving experience. Therefore, at least one embodiment consistent with the present disclosure may feature lubrication strips placed before the blades make contact to the skin and after the shaving stroke is completed. In contrast, placing the lubrication strip at the top edge of the cartridge to lubricate the skin at the end of a shaving stroke may be adequate; however, this arrangement does not provide for lubrication during the motion of a shaving stroke. At least one embodiment consistent with the present disclosure addresses this critical issue by placing a lubrication strip in the center of the cartridge, thereby dividing the blade configuration and further lubricating the skin during the midst of a shaving stroke. As a result, a smoother, faster and more efficient shaving stroke may be provided resulting in an all-round better shaving experience for the user.

Moreover, at least one embodiment consistent with the present disclosure may feature a cushioning mechanism. Having a cushioning mechanism located within the arms (and optionally again at the end of each arm where it attaches to the connection hub assembly), gives this design the significant advantage of independently cushioning each end of the cartridge, thereby providing the blade cartridge a greater range of movement and facilitating a closer and more contoured shaving experience.

At least one embodiment of the present disclosure may feature an extendable/telescoping handle with a hinged neck and detachable head assembly. This arrangement may permit the user to position the cartridge at a right angle to the handle and allow the user to rotate the position of the cartridge head, such that it is aligned generally parallel to the longitudinal axis of the handle. This cartridge position is particularly useful when shaving awkward or hard to reach areas of the user's body like the head, back and legs etc.

According to one aspect, the present disclosure may feature a shaving device comprising a head assembly. The head assembly may include a support member configured to be detachably coupled to a handle and a blade cartridge having a first and a second face wherein at least one of the first or second faces comprises at least one razor blade. The blade cartridge may be configured to be rotatably coupled to the support member about a pivot axis PA such that the blade cartridge is pivotable by a user to select one of the first or second faces.

According to another aspect, the present disclosure may feature a shaving device comprising a handle and a head assembly. The head assembly may include a support member and a blade cartridge. The support member may be configured to be detachably coupled to the handle and include a first and a second support arm comprising a first and a second pivot receptacle. The blade cartridge may include a first and a second face wherein at least one of the first or second faces comprises at least one razor blade extending generally parallel to a longitudinal axis of the blade cartridge. The blade cartridge may further include a first and a second pivot pin extending outwardly from opposing lateral sides of the blade cartridge along a pivot axis PA of the blade cartridge. The pivot axis PA may extend generally parallel to the longitudinal axis of the blade cartridge, and the first and the second pivot pins may be configured to be rotatably coupled to the first and the second pivot receptacles, respectively, such that the blade cartridge may be pivoted about the pivot axis PA to select a first or a second initial starting position corresponding to the first or the second face, respectively.

The shaving device may optionally include a resistive pivot mechanism configured to allow a user to rotate the blade cartridge about the pivot axis PA to select one of a first or second face position corresponding to the first and second faces of the blade cartridge, respectively. The resistive pivot mechanism may be configured to allow the blade cartridge to rotate within a predefined rotation range while at the selected face position. The number of degrees that the blade cartridge may rotate about the pivot axis PA relative to the initial starting position may depend on the intended use. For example, the blade cartridge may rotate within a range of approximately 5 degrees to approximately 90 degrees about the pivot axis PA relative to the initial starting position, and any range therein. According to another embodiment, the blade cartridge may rotate within a range of approximately 5 degrees to 60 degrees about the pivot axis PA relative to the initial starting position, and any range therein. For example, the blade cartridge may rotate within a range of approximately 5 degrees to 45 degrees about the pivot axis PA relative to the initial starting position. According to yet another embodiment, the blade cartridge may rotate within a range of approximately 5 degrees to approximately 25 degrees about the pivot axis PA relative to the initial starting position, and any range therein. According to yet a further embodiment, the blade cartridge may rotate within a range of approximately 5 degrees to approximately 15 degrees about the pivot axis PA relative to the initial starting position, and any range therein.

According to another aspect, the present disclosure may feature a method comprising rotating a blade cartridge coupled to a support member about a pivot axis PA to select one of a plurality of faces of the blade cartridge, wherein at least one of the plurality of faces includes at least one razor blade.

While preferred embodiments of the present disclosure have been described, it should be understood that various changes, adaptations and modifications can be made therein without departing from the spirit of the invention(s) and the scope of the appended claims. The scope of the present disclosure should, therefore, be determined not with reference to the above description, but instead should be determined with reference to the appended claims along with their full scope of equivalents. Furthermore, it should be understood that the appended claims do not necessarily comprise the broadest scope of the invention(s) which the applicant is entitled to claim, or the only manner(s) in which the invention(s) may be claimed, or that all recited features are necessary.

What is claimed is:

1. A shaving device comprising:

a handle;

a first arm and a second arm;

a blade cartridge configured to be removably secured to said first arm and said second arm and to pivot about a pivot axis during shaving with said shaving device at a selected position, said blade cartridge including a first face and a second face each having at least one razor blade;

a first arm magnet fixedly coupled to said first arm;

wherein said blade cartridge is configured to be aligned with said first arm magnet in a first position relative to said handle, said first position corresponding to a first use position of the first face of said blade cartridge;

wherein said blade cartridge is configured to be aligned with said first arm magnet in a second position relative to said handle, said second position corresponding to a second use position of the second face of said blade cartridge; and wherein the selected position includes the first position and the second position.

2. The shaving device of claim 1, further comprising a first pair of blade cartridge magnets including a first blade cartridge magnet and a second blade cartridge magnet disposed on opposite sides of said pivot axis.

3. The shaving device of claim 2, wherein said first pair of blade cartridge magnets are configured to rotate with said blade cartridge about said pivot axis.

4. The shaving device of claim 3, wherein said first pair of blade cartridge magnets are fixed to a first lateral edge of the blade cartridge.

5. The shaving device of claim 2, wherein said first arm magnet is configured to generate a first attractive magnetic force with said first blade cartridge magnet when said blade cartridge is aligned in the first use position, and wherein said first arm magnet is configured to generate a second attractive magnetic force with said second blade cartridge magnet when said blade cartridge is aligned in said second use position.

6. The shaving device of claim 1, further comprising a single blade cartridge magnet disposed on opposite sides of said pivot axis.

7. The shaving device of claim 6, wherein said single blade cartridge magnet is configured to rotate with said blade cartridge about said pivot axis.

8. The shaving device of claim 7, wherein said single blade cartridge magnet is fixed to a first lateral edge of the blade cartridge.

9. The shaving device of claim 6, wherein said first arm magnet is configured to generate a first attractive magnetic force with said single blade cartridge magnet when said blade cartridge is aligned in the first use position, and wherein said first arm magnet is configured to generate a second attractive magnetic force with said single blade cartridge magnet when said blade cartridge is aligned in the second use position.

10. The shaving device of claim 1, further comprising at least one ferrous component configured to rotate with said blade cartridge about said pivot axis, wherein said first arm magnet is configured to generate an attractive magnet force with said at least one ferrous component to align said blade cartridge in said first and said second use positions.

11. The shaving device of claim 1, wherein rotation of said blade cartridge greater than 90 degrees about said pivot axis from said first use position causes said first arm magnet to generate a magnetic force that urges said blade cartridge to rotate to said second use position.

12. The shaving device of claim 1, wherein rotation of said blade cartridge less than 90 degrees about said pivot axis from said first use position causes said first arm magnet to generate a magnetic force that urges said blade cartridge to rotate back to said first use position.

13. A shaving device comprising:

a handle;

a first arm and a second arm;

a blade cartridge configured to be removably secured to said first arm and said second arm and to pivot about a pivot axis during shaving with said shaving device at a selected position, said blade cartridge including a first face and a second face each having at least one razor blade;

a first arm magnet fixedly coupled to said first arm;

a first pair of blade cartridge magnets including a first blade cartridge magnet and a second blade cartridge magnet disposed on opposite sides of said pivot axis;

wherein said first blade cartridge magnet is configured to be aligned with said first arm magnet when said first face of said blade cartridge is arranged in a first position relative to said handle;

wherein said second blade cartridge magnet is configured to be aligned with said first arm magnet when said second face of said blade cartridge is arranged in a second position relative to said handle; and wherein the selected position includes the first position and the second position.

14. The shaving device of claim 13, wherein said first position corresponds to a first use position of the first face of said blade cartridge and said second position corresponds to a second use position of the second face of said blade cartridge.

15. The shaving device of claim 13, wherein said first pair blade of cartridge magnets are configured to pivot with said blade cartridge about said pivot axis.

16. The shaving device of claim 13, wherein rotation of said blade cartridge greater than 90 degrees about said pivot axis from said first use position causes said first arm magnet to generate a magnetic force that urges said blade cartridge to rotate to said second use position.

17. The shaving device of claim 13, wherein rotation of said blade cartridge less than 90 degrees about said pivot axis from said first use position causes said first arm magnet to generate a magnetic force that urges said blade cartridge to rotate back to said first use position.

18. A shaving device comprising:

a handle;

a support frame including a first arm and a second arm;

a blade cartridge configured to be secured to said support frame and to pivot about a pivot axis during shaving with said shaving device at a selected position, said blade cartridge including a first face and a second face each having a plurality of razor blades;

a first arm magnet fixedly coupled to said first arm;

a first blade cartridge magnet configured to pivot with said blade cartridge about said pivot axis during use of said shaving device;

wherein said first blade cartridge magnet and said first arm magnet are configured to generate a first magnet force that urges said blade cartridge to a first initial starting position relative to said handle, the selected position including the first initial starting position.

19. The shaving device of claim 18, wherein said blade cartridge is removably secured to said support frame.

20. The shaving device of claim 18, wherein said first magnet force includes an attractive magnetic force.

* * * * *